US007949728B2

(12) United States Patent
Rivette et al.

(10) Patent No.: US 7,949,728 B2
(45) **Date of Patent: *May 24, 2011**

(54) SYSTEM, METHOD, AND COMPUTER PROGRAM PRODUCT FOR MANAGING AND ANALYZING INTELLECTUAL PROPERTY (IP) RELATED TRANSACTIONS

(75) Inventors: Kevin G. Rivette, Palo Alto, CA (US); Irving S. Rappaport, Palo Alto, CA (US); Luke Hohmann, Mountain View, CA (US); David Puglia, Los Gatos, CA (US); David Goretsky, Sunnyvale, CA (US); Adam Jackson, Sunnyvale, CA (US); Charles Rabb, Jr., Sunnyvale, CA (US); David W. Smith, Mountain View, CA (US); Brian Park, Palo Alto, CA (US); Warren Thornthwaite, Menlo Park, CA (US); Jorge A. Navarrete, Menlo Park, CA (US); Robert J. Muller, San Francisco, CA (US); Harvey Alcabes, Belmont, CA (US); Donald Brannon, Santa Clara, CA (US); Matthew Schnitz, Mountain View, CA (US)

(73) Assignee: Rose Blush Software LLC, Los Altos, CA (US)

( * ) Notice: Subject to any disclaimer, the term of this patent is extended or adjusted under 35 U.S.C. 154(b) by 976 days.

This patent is subject to a terminal disclaimer.

(21) Appl. No.: 11/513,360

(22) Filed: Aug. 31, 2006

(65) Prior Publication Data

US 2007/0208669 A1 Sep. 6, 2007

Related U.S. Application Data

(63) Continuation of application No. 11/178,367, filed on Jul. 12, 2005, now Pat. No. 7,437,471, which is a continuation of application No. 09/545,608, filed on Apr. 7, 2000, now Pat. No. 6,963,920, and a continuation-in-part of application No. 08/921,369, filed on Aug. 29, 1997, now Pat. No. 6,339,767, which is a continuation-in-part of application No. 08/867,392, filed on Jun. 2, 1997, now Pat. No. 5,991,751, said application No. 09/545,608 is a continuation-in-part of application No. 09/138,368, filed on Aug. 21, 1998, now abandoned, which is a continuation-in-part of application No. 08/921,369, filed on Aug. 29, 1997, now Pat. No. 6,339,767, said application No. 09/545,608 is a continuation-in-part of application No. 09/260,079, filed on Mar. 2, 1999, now abandoned, which is a continuation-in-part of application No. 09/138,368, filed on Aug. 21, 1998, now abandoned, said application No. 09/545,608 is a continuation-in-part of application No. 09/057,557, filed on Apr. 19, 1998, now Pat. No. 6,389,434, which is a continuation of application No. 08/632,801, filed on Apr. 17, 1996, now Pat. No. 5,806,079, which is a continuation-in-part of application No. 08/423,676, filed on Apr. 18, 1995, now Pat. No. 5,623,679, which is a continuation-in-part of application No. 08/341,129, filed on Nov. 18, 1994, now abandoned, which is a continuation-in-part of application No. 08/155,752, filed on Nov. 19, 1993, now Pat. No. 5,623,681.

(60) Provisional application No. 60/128,405, filed on Apr. 8, 1999.

(51) Int. Cl.
*G06F 15/16* (2006.01)

(52) U.S. Cl. ......... 709/219; 709/203; 709/217; 709/230

(58) Field of Classification Search .................. 709/203, 709/217, 219, 223, 230, 246
See application file for complete search history.

(56) References Cited

U.S. PATENT DOCUMENTS

| | | | |
|---|---|---|---|
| 4,205,780 | A | 6/1980 | Burns et al. |
| 4,270,182 | A | 5/1981 | Asija |
| 4,486,857 | A | 12/1984 | Heckel |
| 4,533,910 | A | 8/1985 | Sukonick et al. |
| 4,555,775 | A | 11/1985 | Pike |

| | | | | |
|---|---|---|---|---|
| 4,622,545 | A | | 11/1986 | Atkinson |
| RE32,632 | E | | 3/1988 | Atkinson |
| 4,736,308 | A | | 4/1988 | Heckel |
| 4,748,618 | A | | 5/1988 | Brown et al. |
| 4,772,882 | A | | 9/1988 | Mical |
| 4,785,408 | A | | 11/1988 | Britton et al. |
| 4,788,538 | A | | 11/1988 | Klein et al. |
| 4,812,834 | A | | 3/1989 | Wells |
| 4,847,604 | A | | 7/1989 | Doyle |
| 4,873,623 | A | | 10/1989 | Lane et al. |
| 4,884,223 | A | | 11/1989 | Ingle et al. |
| 4,899,136 | A | | 2/1990 | Beard et al. |
| 4,914,732 | A | | 4/1990 | Henderson et al. |
| 4,931,783 | A | | 6/1990 | Atkinson |
| 4,935,865 | A | | 6/1990 | Rowe et al. |
| 4,939,507 | A | | 7/1990 | Beard et al. |
| 4,959,769 | A | | 9/1990 | Cooper et al. |
| 4,977,455 | A | | 12/1990 | Young |
| 4,985,863 | A | | 1/1991 | Fujisawa et al. |
| 4,991,087 | A | | 2/1991 | Burkowski et al. |
| 5,008,853 | A | | 4/1991 | Bly et al. |
| 5,062,060 | A | | 10/1991 | Kolnick |
| 5,072,412 | A | | 12/1991 | Henderson, Jr. et al. |
| 5,120,944 | A | | 6/1992 | Kern et al. |
| 5,142,674 | A | | 8/1992 | Barker et al. |
| 5,148,154 | A | | 9/1992 | MacKay et al. |
| 5,155,806 | A | | 10/1992 | Hoeber et al. |
| 5,157,768 | A | | 10/1992 | Hoeber et al. |
| 5,163,104 | A | | 11/1992 | Ghosh et al. |
| 5,222,160 | A | | 6/1993 | Sakai et al. |
| 5,228,123 | A | | 7/1993 | Heckel |
| 5,237,158 | A | | 8/1993 | Kern et al. |
| 5,241,671 | A | | 8/1993 | Reed et al. |
| 5,253,362 | A | | 10/1993 | Nolan et al. |
| RE34,476 | E | | 12/1993 | Norwood |
| 5,276,616 | A | | 1/1994 | Kuga et al. |
| 5,283,894 | A | | 2/1994 | Deran |
| 5,319,745 | A | | 6/1994 | Vinsonneau et al. |
| 5,349,170 | A | | 9/1994 | Kern |
| 5,392,428 | A | | 2/1995 | Robins |
| 5,402,336 | A | | 3/1995 | Spiegelhoff et al. |
| 5,404,514 | A | | 4/1995 | Kageneck et al. |
| 5,428,778 | A | | 6/1995 | Brookes |
| 5,432,897 | A | | 7/1995 | Tatsumi et al. |
| 5,440,481 | A | | 8/1995 | Kostoff et al. |
| 5,442,778 | A | | 8/1995 | Pedersen et al. |
| 5,444,615 | A | | 8/1995 | Bennett et al. |
| 5,481,666 | A | | 1/1996 | Nguyen et al. |
| 5,511,186 | A | | 4/1996 | Carhart et al. |
| 5,519,857 | A | | 5/1996 | Kato et al. |
| 5,537,526 | A | | 7/1996 | Anderson et al. |
| 5,544,302 | A | | 8/1996 | Nguyen |
| 5,544,352 | A | | 8/1996 | Egger |
| 5,550,976 | A | | 8/1996 | Henderson et al. |
| 5,551,055 | A | | 8/1996 | Matheny et al. |
| 5,557,722 | A | | 9/1996 | DeRose et al. |
| 5,557,785 | A | | 9/1996 | Lacquit et al. |
| 5,559,942 | A | | 9/1996 | Gough et al. |
| 5,568,639 | A | | 10/1996 | Wilcox et al. |
| 5,576,954 | A | | 11/1996 | Driscoll |
| 5,581,686 | A | | 12/1996 | Koppolu et al. |
| 5,583,982 | A | | 12/1996 | Matheny et al. |
| 5,584,035 | A | | 12/1996 | Duggan et al. |
| 5,592,607 | A | | 1/1997 | Weber et al. |
| 5,592,608 | A | | 1/1997 | Weber et al. |
| 5,594,837 | A | | 1/1997 | Noyes |
| 5,596,700 | A | | 1/1997 | Darnell et al. |
| 5,604,901 | A | | 2/1997 | Kelley et al. |
| 5,615,112 | A | | 3/1997 | Liu Sheng et al. |
| 5,615,362 | A | | 3/1997 | Jensen et al. |
| 5,623,679 | A | | 4/1997 | Rivette et al. |
| 5,623,681 | A | | 4/1997 | Rivette et al. |
| 5,625,833 | A | | 4/1997 | Levine et al. |
| 5,628,003 | A | | 5/1997 | Fujisawa et al. |
| 5,630,125 | A | | 5/1997 | Zellweger |
| 5,632,031 | A | | 5/1997 | Velissaropoulos et al. |
| 5,638,519 | A | | 6/1997 | Haluska |
| 5,642,502 | A | | 6/1997 | Driscoll |
| 5,696,963 | A | | 12/1997 | Ahn |
| 5,721,910 | A | | 2/1998 | Unger et al. |
| 5,748,956 | A | | 5/1998 | Lafer et al. |
| 5,754,840 | A | | 5/1998 | Rivette et al. |
| 5,757,983 | A | | 5/1998 | Kawaguchi et al. |
| 5,765,152 | A | | 6/1998 | Erickson |
| 5,774,833 | A | | 6/1998 | Newman |
| 5,794,257 | A | | 8/1998 | Liu et al. |
| 5,799,325 | A | | 8/1998 | Rivette et al. |
| 5,806,079 | A | | 9/1998 | Rivette et al. |
| 5,808,615 | A | | 9/1998 | Hill et al. |
| 5,809,318 | A | | 9/1998 | Rivette et al. |
| 5,832,476 | A | | 11/1998 | Tada et al. |
| 5,845,301 | A | | 12/1998 | Rivette et al. |
| 5,848,409 | A | | 12/1998 | Ahn |
| 5,860,073 | A | * | 1/1999 | Ferrel et al. .................. 715/255 |
| 5,870,770 | A | | 2/1999 | Wolfe |
| 5,953,528 | A | | 9/1999 | Sullivan |
| 5,991,751 | A | | 11/1999 | Rivette et al. |
| 5,999,907 | A | | 12/1999 | Donner |
| 6,003,033 | A | | 12/1999 | Amano et al. |
| 6,012,098 | A | * | 1/2000 | Bayeh et al. .................. 709/246 |
| 6,021,426 | A | * | 2/2000 | Douglis et al. ................ 709/217 |
| 6,125,391 | A | * | 9/2000 | Meltzer et al. ................ 709/223 |
| 6,226,675 | B1 | * | 5/2001 | Meltzer et al. ................ 709/230 |
| 6,339,767 | B1 | | 1/2002 | Rivette et al. |
| 6,343,297 | B1 | | 1/2002 | D'Anjou et al. |
| 6,389,434 | B1 | | 5/2002 | Rivette et al. |
| 6,401,118 | B1 | | 6/2002 | Thomas |
| 6,501,856 | B2 | * | 12/2002 | Kuwano et al. ............... 382/194 |
| 6,507,856 | B1 | | 1/2003 | Chen et al. |
| 6,963,920 | B1 | | 11/2005 | Hohmann et al. |
| 7,437,471 | B2 | | 10/2008 | Hohmann et al. |
| 2005/0256965 | A1 | | 11/2005 | Hohmann et al. |
| 2007/0078886 | A1 | | 4/2007 | Rivette et al. |

FOREIGN PATENT DOCUMENTS

| | | | |
|---|---|---|---|
| EP | 0 239 884 | A1 | 10/1987 |
| JP | 5-135109 | | 6/1993 |
| JP | 6-231141 | | 8/1994 |
| JP | 8-221435 | | 8/1996 |
| WO | WO 98/16890 | A1 | 4/1998 |
| WO | WO 98/34179 | A1 | 8/1998 |
| WO | WO 98/44430 | A1 | 10/1998 |
| WO | WO 98/55945 | A1 | 12/1998 |

OTHER PUBLICATIONS

Barth et al., “XML, patent information and the Web,” Proceedings of the 1998 International Chemical Information Conference, Proceedings of the 10.sup.th International Chemical Conference, Nimes, France, Oct. 18-21, 1998, pp. 92-111. Brewin, Paul, “SGML and Patent Document Processing, Part I: WIPO Standard ST.32,” World Patent Information, Elsevier Science Publishing, vol. 18, No. 4, pp. 183-192, Dec. 1996.

Brewin, Paul, “SGML and Patent Document Processing. Part II: Experience in the EPO,” World Patent Information, Elsevier Sciences Publishing, vol. 19, No. 1, pp. 3-10, Mar. 1997.

Dudeck, Joachim, “Aspects of implementing and harmonizing healthcare communication standards,” International Journal of Medical Informatics, Elsevier Scientific Publishers, vol. 48, No. 1-3, pp. 163-171, Feb. 1998.

Kristensen, Anders, “Template resolution in XML/HTML,” Computer Networks and ISDN Systems, vol. 30, No. 1-7, pp. 239-249, Apr. 1998, North Holland Publishing.

Information Dissemination Organizations—Office of Electronic Information Products, “U.S. Patent and Trademark Office Patent Date/SGML”, Mar. 1998, pp. A1-A42.

International Search report issued Dec. 18, 2000 for PCT/US00/09427, 7 pages.

English Language Patent Abstract (JPO & Japio) for JP 06-231141, published Aug. 19, 1994, p. 1.

Aberdeen Group—Profile, Dataware Technologies, “BRS/Search”, Sep. 1996.

“Agent Searching,” Executive Technologies, Inc., Last Updated: Jan. 12, 1996.

Albert, M., "CD-ROM: The Next PC Revolution," Fortune Magazine, Jun. 29, 1992.
Albert, M., "Ease Access to Patents," Fortune Magazine, Jun. 29, 1992.
Alexander, "Visualizing Cleared-Off Desktops," Computerworld, May 6, 1991, p. 20.
Banet, "Creating a CD-ROM: overview of the product field," The Seybold Report on Desktop Publishing, vol. 7, No. 6, p. 3(29), Feb. 1993.
Becker, "Voyager kit: Ticket to books on-line," MacWeek, vol. 7, No. 8, Feb. 22, 1993, p. 57.
Berk et al. (eds.), Hypertext/Hypermedia Handbook, pp. 209-224, 285-297, 329-355, 529-533, Jan. 1991.
Bermant, "Finding It Fast: New Software Features That Search Your System," Personal Computing, vol. 11, No. 11, Nov. 1987, pp. 125-131.
Bish, "An Essential ingredient: Post recognition processing," Imaging World, vol. 5, Issue 3, Mar. 1996.
Blatt, J., "A Primer on User Interface Software Patents," The Computer Lawyer, vol. 9, No. 4, Apr. 1992.
Boedeker et al., "Choosing Imaging Software," Law Office Computing, vol. 5, Issue 3, Jun./Jul. 1995, pp. 50-55.
"Boolean Searching," Executive Technologies, Inc., Last Updated: Jan. 12, 1996.
Bradbury, "Expanded Book Toolkit," MacUser, vol. 9, No. 3, Mar. 1993, p. 85.
Briggs, "CD-ROM publishing boom is Dataware's delight," MIS Week, vol. 10, No. 38, Sep. 25, 1989, pp. 40-41.
Briggs, "Dataware Comes to U.S. With CD-ROM Publishing," MIS Week, vol. 10, No. 5, Jan. 30, 1989, p. 21.
Brockschmidt, Inside OLE 2, Microsoft Press, Redmond, WA, Copyright 1994.
Brockschmidt, "What OLE Is Really About," OLE Development, Microsoft Corporation, Copyright 1997, pp. 1-59.
"BRS/Search: An Industrial Strength Document Warehouse Solution—Profile," Dataware Technologies, Copyright May 1996, pp. 1-12.
"BRS/Search," Dataware Technolgies, Inc., date unclear.
Catchings et al., "Price Delineats Text-Retrieval Software," PC Week, vol. 8, No. 20, May 20, 1991, pp. 120-123.
Catchings et al., "Retrieval Technologies Inc.:re:Search 2.0" PC Week, vol. 8, No. 20, p. 121(2), May 1991.
Catlin et al., "InterNote: Extending A Hypermedia Framework to Support Annotative Collaboration," Hypertext '89 Proceedings, pp. 365 to 378, Nov. 1989.
"CD Author/CD Answer," Dataware Technologies, date unclear.
Chan, Patrick P., Learning Considerations in User Interface Design: The Room Model, Software Protability Laboratory, University of Waterloo, Waterloo, Ontario, Canada, Jul. 1984.
"Chapter 1: Component Object Model Introduction," OLE Development, Microsoft Corporation, Copyright 1997, pp. 1-37.
Christodoulakis, S., et al., Browsing Within Time-Driven Multimedia Documents, Institute for Computer Research, University of Waterloo, Waterloo, Ontario, Canada, pp. 219-227, Jul. 1988.
Classified Search and Image Retrieval Student Manual, U.S. Patent and Trademark Office, May 1991.
Cohen, "Browsers get BookWorm for Mac," MacWeek, vol. 7, No. 39, Oct. 4, 1993, p. 4.
Commands and Settings, OmniPage Professional Windows Version 5, Caere Corporation, Chapter 1, pp. 1-1 to 1-70, 1988-1993.
The Complete Document Profiling and Retrieval System for Windows, World Software Corporation, WORLDOX, Copyright World Software Corp., 1992.
Conklin, "Hypertext: An Introduction and Survey," Computer, pp. 17-41, Sep. 1987.
Cooper et al., "Oh! Pascal!," pp. 389-399, Jan. 1982.
Cote et al., "Searching for Common Threads," Byte, vol. 17, No. 6, Jun. 1992, pp. 290-305.
Creation/Modification of the Audio Signal Processor Setup for a PC Audio Editor, IBM Technical Disclosure Bulletin, vol. 30, No. 10, Mar. 1988.
Curran, "Growing company changes data entry," IrnagingWorld, vol. 4, Issue 3, Mar. 1995.
"Dataware Technologies: Products and Services," Dataware Technologies, Copyright 1996.
Dintzer, J.P. and J. Van Thielen, "Image Handling at the European Patent Office: BACON and First Page," World Patent Information, vol. 13, No. 3, pp. 152-154, 1991.
Doherty, "New Op-Disk Peripherals Displayed at Conference," Electronic Engineering Times, No. 339, Jul. 22, 1985, p. 15.
Duncan, "ZyIMAGE's Use of Windows Interface Falls Short of Mark," LAN Times, vol. 10, Issue 10 May 24, 1993, pp. 70 and 79.
"Eastern Electricity: BRS/Search Customer Profile," Dataware Technologies, Copyright 1995.
Editing Recognized Documents, OmniPage Profession Windows Version 5, Caere Corporation, Chapter 3, pp. 3-1, to 3-20, 1988-1993.
"EZ-C + DE2 Images: The New Standard in Data Capture," Textware Corporation, Copyright 1994, pp. 1-8.
The Fastest, Most Powerful Full Text Retrieval System, ZyINDEX 5.2 for Windows, Zylab, 1994.
Fersko-Weiss, "3-D Reading with the Hypertext Edge," PC Magazine, vol. 10, No. 10, May 28, 1991, pp. 241-282.
Fish et al., "Quilt: a collaborative tool for coopertive writing," Conf. on Information Systems '88, pp. 30 to 37, Jan. 1988.
"Forms Processing Products & Services," TextWare Corporation, Copyright 1996.
"FormWare for Windows 95/NT," TexcWare Corporation, Copyright 1996.
"Fuzzy Searching," Executive Technolgies, Inc., Last Updated: Jan. 12, 1996.
Gerber, "Lotus rolls out gateway for Notes, cc: Mail," InfoWorld, vol. 14, No. 46, p. 1(2), Nov. 1992.
Halasz et al., "Issues in the Design of Hypermedia Systems," CHI '90 Tutorial, Jan. 1990.
Harney, "TextWare's FormWare—Complex Data Capture that Puts Simpicity First," Imaging Magazine, Apr. 1996.
Haskin, "Textware 4.0: Text Retrieval for Electronic Documents," Computer Shopper, vol. 13, No. 8, Aug. 1993, p. 334-335.
Haskin, "Zylmage Finds Images and Text," PC-Computing, vol. 6, No. 5, May 1993, p. 60.
Help Yourself! With PCT Patent Search on CD-ROM, MicroPatent, New Haven, CT, appears to be before Jul. 1, 1993.
"Hip Products," ZyLab Europe BV, Copyright 1996.
Holtz, Mastering Ventura; Second Edition, pp. 360-375, Jan. 1989.
How to Install and Use the USAPat Demonstration Disc, USAPTO Office of Information Products Development, 1994(?).
HyperCard Basics, Apple Computer, Inc., 1990.
"IDI brings Basis plus down to workgroups," The Seybold Report on Publishing Systems, vol. 22, No. 14, p. 16(2), Apr. 1993.
"InnerView for Windows 3.0, For Evaluation Only, Version 2.2 Pre-Release #6," TMS, Inc. Copyright 1991-1992.
Ishii, H., et al., "Clearface: Translucent Multiuser Interface for Team Work Station," ECSCW, Sep. 1991, pp. 6-10.
Ishii, H., et al., "Toward an Open Shared Workspace," Communications of the ACM, Dec. 1991, vol. 34, No. 12, pp. 37-50.
Jonckheere, C., "EPOQUE (EPO Query service) the Inhouse Host Computer of the European Patent Office," World Patent Information, vol. 12, No. 3, pp. 155-157, 1990.
Karraker, "Voyager Toolkit stretches Expanded Book concept to let users pen their own," MacWeek, vol. 6, No. 11, Mar. 16, 1992, p. 9.
Knibbe, "Zylmage 2 boosts OCR, batch duties," Info World, vol. 15, Issue 51, Dec. 20, 1993, p. 20.
Knibbe, "Zylmage 3.0 will facillitate distribution on CD-ROMs; Boasts integration with WordScan OCR software," InfoWorld, vol. 16, No. 38, Sep. 19, 1994, p. 22.
Lexis-Nexis Printout of a Business Wire Article Entitled: TMS Announces Contract With Major Insurance Information Provider, Business Wire Inc., Feb. 11, 1991.
Lexis-Nexis Printout of a Business Wire Article Entitled: TMS Announces Easy View Available for CD-ROM Publishers, Business Wire Inc., Mar. 9, 1992.
Lexis-Nexis Printout of a Business Wire Article Entitled: TMS Announces Release of Inner View 2.1 Software, Business Wire Inc., Mar. 18, 1991.

Lougher et al., "Supporting long-term collaboration in software maintenance," Conf. on Organizational Computing Systems, pp. 228-238, 1993.
Lucas, Jay, "The Progress of Automation at the U.S. Patent and Trademark Office," World Patent Information, vol. 14, No. 3, pp. 167-172, 1992.
McEvoy, Ed., Object Linking and Embedding: Programmer's Reference, Version 1, Microsoft Press, Redmond, WA, Copyright 1992.
Mallory, "New for Mac: text/graphics retrieval software from TMS," Newsbytes,Jul. 1992.
Marshall, "Text retrieval alternatives: 10 more ways to pinpoint important information,"Infoworld, vol. 14, No. 12, Mar. 23, 1992, pp. 88-89.
Marshall, "ZyImage adds scanning access to ZyIndex," InfoWorld, vol. 16, No. 15, Apr. 11, 1994, pp. 73, 76, and 77.
Marshall, "ZyImage is ZyIndex plus a scan interface integrated," InfoWorld, vol. 15, Issue 10, Mar. 8, 1993, p. 100.
Marshall et al., "ZyIndex for Windows, Version 5.0" InfoWorld, vol. 15, No. 21, May 1993, pp. 127, 129, 133 and 137.
"MasterView for Microsoft Windows," TMS Inc., Copyright 1993.
Matazzoni, "Expanded Book Toolkit 1.0.1," Macworld, vol. 10, No. 6, Jun. 1993, p. 158.
Mendelson, "HyperWriter for Windows," PC Magazine, vol. 14, No. 3, Feb. 7, 1995, pp. 140, 142, and 143.
Moore, "Detaware lands $6.6M GPO pact," Federal Computer Week, vol. 9, No. 27, Sep. 11, 1995, pp. 84 and 86.
Moore, "The Forms Processing Paradigm Shift," Imaging Magazine, Mar. 1995.
"NetAnswer Hosting Service," Dataware Technologies, Inc., Copyright 1995.
"NetAnswer: Information Super Server for the World Wide Web," Dataware Technolgies, Inc., Copyright 1995.
"NetAnswers: Organizations Worldwide Take Content Onto the Web with NetAnswer," Dataware Technolgies, Spring 1996.
OmniPage Professional Tutorials, Windows Version 5, Caere Corp., Jan. 1993.
Ores, "Hypertext Publishing: Edit Trail," PC Magazine, vol. 14, No. 3, Feb. 7, 1995, pp. 132, 134, 136, and 138.
Patents on CD-ROM, Track Technology, Focus R& D, Watch Competitors, Speed Products to Market, Cut Online/Copy Costs, A World of Opportunities, from MicroPatent, MicroPatent USA, New Haven, CT, appears to be before Sep. 1, 1992.
"PatenImages, User Profile European Patents, Search & Tech Tips, Conference Calendar," MicroPatent World Newsletter, Spring 1991, New Haven, CT.
Pelham, A., "A Wave of the Wand for Litigators. Tools of the Trade Go High-Tech, Focus on Technology," Legal Times, Jan. 24, 1994.
Perenson, "Retrieving Text on the Net," PC Magazine, vol. 14, No. 20, Nov. 21, 1995, p. 61.
Previewing the Letter, WordPerfect Workbook for IBM Personal Computers, WordPerfect Corporation, Version 5.0, Lesson 4, p. 24 and Lesson 13, pp. 108-109, 1988.
Quattro Pro User's Guide, Borland Int'l, Inc., p. 245, Jan. 1989.
"re:Search V.2.6," Software Product Specification, Computer Select, Nov. 1993.
Rooney, "Text-retrieval veterans prepare Windows attack," PC Week, vol. 9, No. 24, p. 46, Jun. 1992.
Rooney, "ZyLab partners with Calera: films roll out document-image system," PC Week, vol. 10, No. 3, Jan. 25, 1993, p. 22.
Schroeder, "Low Price Point Is Key for Buyers Of Text Databases," PC Week, vol. 8, No. 20, May 20, 1991, pp. 120 and 122.
Schroeder, "Multimedia offerings target expanded platform support," PC Week, vol. 10, No. 13, Apr. 5, 1993, pp. 59 and 73.
Schwartz, "Dataware Plants CD-ROM Seeds," Computer Systems News, No. 403, Feb. 6, 1989, p. 33.
Search Results from Dialog Search for MicroPatent for News Releases and Corporate Announcements Relating to APS, FullText, PatenImages, Espace, Dialog Files: 148, 479 and 648, 1989-1991.
Simon, "ZyImage: A Winning Combination of OCR and Text Indexing," PC Magazine, vol. 12, No. 6, Mar. 30, 1993, p. 56.
Simpson, Mastering WordPerfect 5.1 & 5.2 for Windows, p. 58, Jan. 1993.
Somers, "Personal Text-Retrieval Software Works with Calera's WordScan," PC Magazine, vol. 14, No. 2, Jan. 24, 1995, p. 68.
Spencer, "Tijuana data entry shop logs 500K forms/day," ImagingWorld, vol. 4, Issue 4, Apr. 1995.
Spitzer, "Needles in Document Haystacks" DBMS, vol. 9, No. 1, Jan. 1996, pp. 84-87.
Sullivan, "Dataware's CD Author System To Boast Hypertext Capability," PC Week, vol. 8, No. 31, Aug. 5, 1991, pp. 31-32.
"Text Retrieval Products & Services," TextWare Corporation, Copyright 1996.
"TextWare: Instant Information Access," TextWare Corporation, Copyright 1995.
"TextWare Pricing," TextWare Corporation, Effective Mar. 26, 1996.
Thompson et al., Full Write Professional—A User's Guide, pp. 99-122, 1988.
Torgan, "ZyImage: Document Imaging and Retrieval System," PC Magazine, vol. 12, No. 3, Feb. 9, 1993, p. 62.
"Toshiba America Information Systems: CD-ROM Customer Profile," Dataware Technologies, Copyright 1995.
"Total Recall," Dataware Technologies, Copyright 1995.
Tredennick, Jr., C., "Full-Text Search and Retrieval Winning Big With Computers," Law Practice Management, vol. 19, No. 8, Nov./Dec. 1993.
Tribute, "Searching CeBit for publishing products; Power Mac draws the crowds at Hannover show," Seybold Report on Publishing Systems, vol. 23, No. 15, Apr. 22, 1994, pp. 5-8.
Ueda, H., et al., "An Interactive Natural-Motion-Picture Dedicated Multi-Media Authoring System," Mar. 1991, pp. 343-350.
Understanding OCR, OmniPage Professional Windows Version 5, Caere Corporation, Chapter 6, pp. 6-1 to 6-8 and Glossary pp. 1-8, 1988-1993.
"Voyager cd-roms," Voyager, Spring, 1996.
"Voyager: cd-rom catalog," Voyager, 1996-1997.
Wiggins, R.W., Networked Hypermedia: The World-Wide Web and NCSA Mosaic, The Internet for Everyone—A Guide for Users and Providers, Chapter 13, pp. 245-290, McGraw-Hill, Inc., 1995.
"WorldView V. 1.1 and WorldView Press V. 1.0.2," Software Product Specification, Computer Select, Nov. 1993.
Young, "UK Police Put Criminals On-Line With New National Computer," Imaging Magazine, Aug. 1995.
"ZyImage," ZyLab International, Inc., Copyright 1996.
"ZyImage: Common Questions Asked About ZyImage," ZyLab Europe BV, Copyright 1996.
"ZyImage Web Server," ZyLab Europe, BV, Copyright 1996.
ZyIndex Developer's Toolkit Version 5.0 for Windows, Programmers Guide, Information Dimensions, 1992.
"ZyIndex for Windows User's Guide," ZyLab Division, Copyright 1992, pp. 1-262.
"ZyLab: The Full Text Retrieval & Publishing Experts," ZyLab Europe BV, Copyright 1996.
"ZyLab retrieval engine optimized for CD-ROM; ZyLab, Progressive Technologies merge," Seybold Report on Desktop Publishing, vol. 8, No. 10, Jun. 6, 1994, p. 40.
Ishii, H. "TeamWorkStation: Towards a seamless shared workspace", Proceedings of CSCW '90, Oct. 1990, pp. 13-26.
Canzil, G. et al., "SDDS: Scientific Document Delivery System", TEX for Scientific Documentation, ed. By D. Lucarella, pp. 15-25, (1985).
Cefriel, S. P. et al., "ALIVE: A distributed live-link documentation", Electronic Publishing, vol. 5(3), pp. 131-142, (Sep. 1992).
Chamberlain, D.D. et al., "JANUS: An interactive document formatter based on declarative tags", IBM Systems Journal, vol. 21, No. 3, pp. 250-271, (1982).
Croft, W. Bruce, et al., "A Loosely-Coupled Integration of a Text Retrieval System and an Object-Oriented Database System", 15.sup.th Annual International SIGIR '92, pp. 223-232.
Dengel, Andreas et al., "From Paper to Office Document Representation", Computer, Jul. 1992, pp. 63-67.
Ferguson, Michael J., "TEX is Multilingual", 1988 Conference Proceedings of the TEX Users Group, pp. 179-187.
Using FrameMaker: FrameMaker 4 X/Motif Version, pp. 27-1 thru 27-30, Copyright 1986-1993 Frame Technology Corporation.

Furuta, Richard, "Important papers in the history of document preparation systems: basic sources", Electronic Publishing, vol. 5(1), pp. 19-44, (Mar. 1992).
Haan, Bernard J. et al., "IRIS: Hypermedia Services", Communications of the ACM, vol. 35, No. 1, pp. 36 and 38-51, (Jan. 1992).
Kahn, Paul, "Linking Together Books: Experimental in Adapting Published Material into Intermedia Documents", Hypermedia, vol. 1, No. 2, pp. 111-145, (1989).
Knuth, Donald E., The TEXbook, Addison-Wesley Publishing Company, 1986.
Knuth, Donald E. and Michael F. Plass, "Breaking Paragraphs into Lines", Software-Practice and Experience, vol. 11, pp. 1119-1184, (1981).
Koons, W. Randall et al., "The Computer Sciences Electronic Magazine: Translating From Paper To Multimedia", CHI '92 Conference Proceedings, pp. 11-18, (May 3-7, 1992).
Lesk, Michael, "The Core Electronic Chemistry Library", SIGIR '91 Proceedings of the Fourteenth Annual International ACM/SIGR Conference on Research and Development in Information Retrieval, 93-112, (Oct. 13-16, 1991).
Meyrowitz, Norman, "Intermedia: The Architecture and Construction of an Object-Oriented Hypermedia System and Application Framework", OOPSLA '86 Proceedings, pp. 186-201, (Sep. 1996).
Miyazawa, M. et al., "An Electronic Book: APTBook" Proceedings of the IFIP TC 13 Third International Conference on Human-Computer Interaction, pp. 513-519, (1990).
Myers, Brad A., "Text Formating By Demonstration", Human factors in Computing Systems: Reaching Through Technology, CHI '91 Conference Proceedings, pp. 251-256, (1991).
Nelson, Theodor H., "Replacing the Printed Word: A Complete Literary System", Information Processing 80: Proceedings of IFIP Congress 80, pp. 1013-1021, (1980).
Raymond, Darrell R. And Frank Wm. Tompa, "Hypertext and the Oxford English Dictionary", Communications of the ACM, vol. 31, No. 7, pp. 871-879, (Jul. 1988).
Rubinstein, Richard, Digital Typography: An Introduction to Type and Composition for Computer System Design, pp. 195-233, (Addison-Wesley Publishing Company 1988).
Savoy, Jacques, "The electronic book Ebook3", International Journal of Man-machine Studies, vol. 30, pp. 505-523, (1989).
Story, Guy A., "The RightPages Image-Based Electronic Library for Alerting and Browsing", Computer, pp. 17-25, (Sep. 1992).
Text Search and Retrieval Reference Manual for the Automated Patent System, by the U.S. Department of Commerce and the U.S. Patent and Trademark Office, Section 4, pp. 1-6, (Oct. 1992).
Yankelovich, N. et al., "Reading and Writing the Electronic Book", Computer, pp. 15-29, (Oct. 1985).
Yankelovich, N. et al., "Intermedia: The Concept and the Construction of a Seamless Information Environment", Computer, pp. 81-96, (Jan. 1988).
Lamping et al., A Focus+Context Technique Based on Hyperbolic Geometry for Visualizing Large Hierarchies, obtained via the Internet at http://www.acm.org/sigchi/chi95/electronic/documents/papers/j1.sub.13 bdy.html, Jan. 1995.
"IBM Selects RSS's Royalties Payable Solution: Real Software Systems Provides IBM with Worldwide Software Royalty Payments Solution", from http://www.elcamino.com/rss/7b.htm, Nov. 18, 1996, (2Pages).
"Intellectual Property Management Issues", from http://ww.elcamino.com/rss/2.htm, Copyright 1995, 1997, (2 Pages).
"Real Software Systems, Inc.", from http://ww.elcamino.com/rss/, Copyright 1995, 1997, (2Pages).
"Real Software Systems, Inc.: Alliant Participation Management & Accounting", from http://www.elcamino.com/rss/3b.htm, Copyright 1995, 1997, (4 Pages).
"Real Software Systems, Inc.: Home Video & Title Based Distribution", from http://www.elcamino.com/rss/3d.htm, Copyright 1995, 1997, (3 Pages).
"Real Software Systems, Inc.: Rights Licensing", from http://www.elcamino.com/rss/3c.htm, Copyright 1995, 1997, (3 Pages).
"Real Software Systems, Inc.: Royalties Payable", from http://www.elcamino.com/rss/3a.htm, Copyright 1995, 1997, (4 Pages).
Samtani, Rajan, "Following the Money: Managing Intellectual Property in the Digital Managing Age", from http://www.elcamino.com/rss/7a.htm, Copyright 1995, 1997, (5 Pages).
"Solutions For managing Intellectual Property", from http://www.elcamino.com/rss/3.htm, Copyright 1995, 1997, (2 Pages).
"Specialized Services", from http://www.elcamino.com/rss/4.htm, Copyright 1995, 1997, (2 pages).
"Universal Selects RSS To Provide Worldwide television Licensing Solution", from http://www.elcamino.com/rss/7c.htm, Apr. 30, 1997, (2 Pages).
"What our customers say about us.", from http://www.elcamino.com/rss/5.htm, Copyright 1995, 1997, (2 Pages).
Dialog Pocket Guide, by Knight-Ridder Information, Inc., Copyright 1995.
Kramer, J., "An Evaluation of the Internet as a Searching Tool for Patents and Intellectual Property: Alternative or Complementary?", from http://www.fplc.edu/ipmall/ipcorner/evals97/ipsi97/intemetpatsearch.htm, Publication date appears to be before Jun. 2, 1997, Downloaded May 8, 1998.
"IBM Announces Free On-Line Patent Info Service", Communications Media Center at New York Law School Web Page, Mar. 9, 1997.
"Asian MicroPatent.RTM. Representatives", from http:www.micropat.com/info.asreps.htm, Printed Dec. 6, 1996.
Alexander, S., "Users find tangible rewards digging into data mines", INFOWORLD, vol. 19, Issue 27, pp. 61-62, (Jul. 1997).
"Bertelsmann Portrait", from http://www.bertelmann.de/bag/englisch/prtrait, Date Unknown.
"CHI Research, Inc.: Tracking the World's Technology", from http://www.chiresearch.com, Date Unknown.
"CHI Research, Inc.: Technology Indicators Consulting Services and Products", from http://www.chiresearch.com/services.html, Copyright 1996.
"Derwent Patents Citation Index", from http://www.derwent.com/products/database/pcidesc.html, Date Unknown.
"The Digital Patent Office", Smartpatents, Inc., Date Unknown.
"Essentials for Mapping Your Intellectual Property: Annuities Master Data Center", Prentice Hall Legal Practice Management, 1993.
"Manning & Napier Information Services HomePage", from http://www.mnis.net, Date Unknown.
"Manning & Napier Information Services: Competitive Intelligence", from http://www.mnis.net/compete.shtml. Date Available on Internet Unknown.
"Maiming & Napier Information Services: Intellectual Property", from http://www.mnis.net/intellect.shtml, Date Available on Internet Unknown.
"MAPit: Prevent Patent Infringement with the Virtual Patent Advisor", from http://www.mnis.net/mapitdemo, Date Available on Internet Unknown.
"Manning & Napier Information Services: Crawler Technology (Trygon)", from http://www.mnis.net/trygon.shtml, Date Available on Internet Unknown.
"Manning & Napier Information Services: AFCEA Intelligence Professionals Adopt New Paradigm for Information Analysis", from http://www.mnis.net/press10.shtml, Jun. 11, 1997.
"Manning & Napier Information Services: Manning & Napier and RTI announce alliance for corporate information market", from http://www.mnis.net/press9.shtml, May 15, 1997.
"Maiming & Napier Information Serivces: Competitive Intelligence Tools Migrating from Government Labs to Corporations", from http://www.mnis.net/press8.shtml, May 15, 1997.
"Manning & Napier: Manning & Napier Information Services", from http://www.mnis.net/press7.shtml, Apr. 25, 1997.
"Manning & Napier Information Services: Patent Licensing Made Easier With MNIS Data Mining Tools", from http://www.mnis.net/press6.shtml, Jan. 30, 1997.
"Manning & Napier Information Services: Manning & Napier Offers Broad Coverage of Computer and Software Technology Databases", from http://www.mnis.net/press5.shtml, Dec. 3, 1996.
"Manning & Napier Information Services: Innovative Technology Tool Unveiled", from http://www.mnis.net/press4.shtml, Dec. 3, 1996.

"Manning & Napier Information Services: Zolowicz To Head Intellectual Property Unit at Manning & Napier Information Services", from http://www.mnis.net/press3.shtml, Nov. 18, 1996.
"Manning & Napier Information Services: Breakthrough in Intelligent Information Analysis From Software That Thinks Like Humans", from http://www.mnis.net/press2.shtml, Sep. 16, 1996.
"Manning & Napier Information Services: MNIS Announces System for Improving Software Patents—At ABA Conference", from http://www.mnis.net/press.shtml, Jun. 28, 1996.
"Master Data Center: PC Master Patent Lite for Windows", Master Data Center, Date Unknown.
"Master Data Center: PC Master Trademark Lite for Windows", Master Data Center, Date Unknown.
MDC Patent Rules Update, May 1996.
MDC Trademark Rules Update, Apr. 1996.
Mogee Research & Analysis Associates, Homepage URL:http://www.mogee.com, (What We Do) and Hyperlinks (Who We Are(1); Who We Are(2); Competitive Technology Reports; Competitive Technology Report:GPS; Competitive Technology Report:Medical Implants; Data resources; Consulting Services), 1996.
Lucena, John J., "Merlot Design Specification", Version 1.0—D2, Last modified Jun. 24, 1996.
"'New Wave' MetricsWare—Metrics Software You Just Gotta Have", IT Metrics Strategies (Reprint), vol. II, No. 10, Cutter Information Corp.TM., 1996.
"Patent Abstracts of Japan—Now on CDROM", from http://www.netaxs.com/.about.aengel/PAJ/PAJInfo.html, Last Updated Dec. 22, 1995.
PC Master Lite Booklet, Master Data Center Intellectual Property Software and Services, 1996.
"Performance Management: The Way It Should Be . . . ", Panorama Business Views, Inc., Date Unknown.
"Platinum technology and Sybase Inc. Expand Partnership to Deliver Wider Selection of Data Warehouse Solutions", from http:www.platinum.com/press/1996/dw_sybas.htm, Jun. 11, 1996.
Rappaport, I., "Time To Count Your Patents The Way You Would Beans", PCWeek, vol. 14, No. 2, Jan. 13, 1997.
SmartPatent Quarterly Newsletter, vol. 2, No. 3, Winter 1996-1997.
SmartPatent Quarterly Newsletter, vol. 2, No. 4, Spring/Summer 1997.
Stewart, T.A., "Getting Real About Brainpower", Fortune, Nov. 27, 1995, (pp. 201-203).
Stewart, T.A., "Mapping Corporate Brainpower", Fortune, Oct. 30, 1995, (pp. 209-211).
Vantive Corporation Home p. (Delivering TRUE Customer Asset Management) and Various Hyperlinks (Vantive Products and Services; Solution Partners; Vantive HelpDesk; Vantive Sales; Free White Paper), Vantive, 1996.
"Welcome to MicroPatent's PatentWEB.TM . . . for Patent Information", from http:www.micropat.com/info/welcome.htm, Printed Dec. 6, 1996.
"The History of MicroPatent", from http:www.micropat.com/info/history.htm, Printed Dec. 6, 1996.
"A Few Facts About MicroPatent", from http:www.micropat.com/info/facts.htm, Printed Dec. 6, 1996.
"MicroPatent: Providers of Patent and Trademark Information", from http:www.micropat.com/info/mission.htm, Printed Dec. 6, 1996.
"Patent Searching and Document Delivery Resources", from http:www.micropat.com/info/websrch.htm, 1996.
"MicroPatent's CD-ROM Products", from http:www.micropat.com/info/about.htm, 1996.
"PatentQuery: Search & Deliver", from http:www.micropat.com/info/prelegal.htm, Printed Dec. 6, 1996.
"MicroPatent PatentWEB and Trademark WEB Service Agreement", from http:www.micropat.com/cgi-bin/servagree, Printed Dec. 6, 1996.
"Advanced Patent Data Mining and Visualization Capabilities for Information Users," Apparent Press Release, London, apparent publication date of Dec. 3, 1996 (printed from Manning & Napier Information Services web page at www.mnis.net).
"CHI Research Competitor Assessments," printed from the CHI Research web page at www.chiresearch.com, pp. 1-2, 1996.
"CHI Research Corporate Brain Mapping," printed from the CHI Research web page at www.chiresearch.com, pp. 1-2, 1996.
"CHI Research Merger & Acquisition Technology Due Diligence," printed from the CHI Research web page at www.chiresearch.com, pp. 1-2, 1996.
"CHI Research Tracking the World's Technology (About CHI Research, Consulting Services and Information Products, History of CHI Research, Science and Technology Indicators, Patent Citation Analysis, and Key Technology Indicators: Number of Patents, Current Impact Index, Technological Strength, Technology Cycle Time, Science Linkage)," printed from the CHI Research web page at www.chiresearch.com, pp. 1-6, 1996.
Edvinsson, Leif et al., Intellectual Capital: Realizing Your Company's True Value By Finding Its Hidden Brainpower, HarperBusiness, New York, NY, 1997.
Kahaner, Larry, Competitive Intelligence: From Black Ops to Boardrooms—How Businesses Gather. Analyze. and Use Information to Succeed in the Global Marketplace, Simon & Schuster, New York, NY, 1996.
Stewart, Thomas, Intellectual Capital: The New Wealth of Organizations, Doubleday, 1997.
Stewart, Thomas A., "Your Company's Most Valuable Asset: Intellectual Capital," Fortune, vol. 130, No. 7, Oct. 3, 1994, pp. 68-74.
"Tech-Line CD User Manual Part I Abridged Version for the World Wide Web," printed from the CHI Research web page at www.chiresearch.com, pp. 1-3, 1996.
"Turning Information Into Insight," Press Release, The Business Wire, Apr. 25, 1997 (printed from Manning & Napier Information Services web page at www.mnis.net).
Sibley, J.F., "The EPOQUE Suite of Applications," World Patent Information, Elsevier Science Ltd., 1996, vol. 18, No. 3, pp. 141-148.
Sibley, J.F., "STN Express 4.0, a professional software for successful online searches," World Patent Information, Elsevier Publishing, Mar. 1, 1997, vol. 19, No. 1, pp. 73-75.
Williams, J. et al., "STN Easy: point-and-click patent searching on the World Wide Web," World Patent Information, Elsevier Science Ltd., 1997, vol. 19, No. 3, pp. 161-166.
Iandiorio, Joseph S., "From Start to Finish: Protecting Ideas and Inventions wit Intellectual Property ," Electro/95 International Professional Program Proceedings, Jun. 21-23, 1995, Hynes Convention Center, Boston, MA, pp. 141-149.
International Search Report from PCT Appl. No. PCT/US00/05080, 6 pages, mailed Dec. 18, 2000.
"Where will we be?", from http:www.micropat.com/info/shows.htm, 1996.
"Why should you be interested in Patent Information?", from http:www.micropat.com/info/interested.htm, Printed Dec. 6, 1996.
"United States MicroPatent.RTM. Representatives", from http:www.micropat.com/info.usreps.htm, Printed Dec. 6, 1996.
"Canadian MicroPatent.RTM. Representatives", from http:www.micropat.com/info/canreps.htm, Printed Dec. 6, 1996.
"European MicroPatent.RTM. Representatives", from http:www.micropat.com/info/epreps.htm, Printed Dec. 6, 1996.
"Business Objects Announces Data Mining Partnership With DataMind Corporation," Apparent Press Release, Cupertino, CA, apparent publication date of May 20, 1996 (printed from DataMind web page at www.datamindcorp.com).
"Business Objects to Offer Data Mining for the Masses," Apparent Press Release, San Jose, CA, apparent publication date of Nov. 18, 1996 (printed from Business Objects web page at wwww.businessobjects.com).
Creating Value Through Knowledge Management Conference, Conference handouts, San Francisco, CA, Feb. 20 and 21, 1997.
Kim et al., "Patent Technology Portfolio for SAW Filters," Proceedings 1994 IEEE Ultrasonics Symposium, vol. 1, pp. 139-142, 1994.
Kumamoto, K., "Commercial Databases: The Keypoints and Practical Use. 10. Patent and Trademark," Joho Kanri, vol. 36, No. 10, pp. 914-938, Jan. 1994 (article in Japanese and English abstract submitted herewith).
Narin, Francis, Presentation Figures, "In the Realm of Technology, Asia Looms Ever Larger: Patent Citation as Measures of Corporate and National Strength, Presented at: Stanford University, Asia/Pacific Research Center, Stanford, California," Oct. 29, 1992.

Otake, Y., "Information Each Department in Corporate Needs from the Standpoint of R&D Department," Joho Kanri, vol. 34, No. 7, pp. 635-646, Oct. 1991 (article in Japanese and English abstract submitted herewith).
Stewart, Thomas A., "Trying to Grasp the Intangible," Fortune, vol. 132, No. 7, Oct. 2, 1995, pp. 157-159.
Tech-Line CD Indicators of Technological Excellence Manual Including Introduction to Company Evaluation Using Technology Indicators, Bertelsmann Informations Service, CHI Research Inc., TT-Technologie-Transfer GmbH, 1994.
Warshofsky, Fred, The Patent Wars: The Battle to Own the World's Technology, John Wiley & Sons, Inc., 1994.
"Patent-Monitor", from http:www.fachinformation.bertelsmann.de/verlag/wb/profil.htm, Date Unknown.
"Welcome to ISTA", from http://www.netaxs.cotril.about.aengel/ista.htm, Date Unknown.
"Welcome to the MicroPatent PatentWeb", from http:www.micropat.com/patentwebindex.htm, 1996.
Tsugaru, Ryosuke, A Japanese Patent Information Retrieval System in the Internet, Using Dual Database of SGML/HTML and Special Gazette Viewer, Information Processing, Japan, Information Processing Society of Japan, Apr. 15, 1998, vol. 39, No. 4, p. 352-357.
Lawton et al., "The Knowledge Weasel Hypermedia Annotation System," Proceedings of the Fifth ACM conference on Hypertext, 1993.
Leland et al., "Collaborative Document Production Using Quilt," Proceedings of the 1988 ACM Conference on Computer-Supported Cooperative Work, 1988.
Akscyn et al., "KMS: A Distributed Hypermedia System for Managing Knowledge in Organizations," Communications of the ACM, 1988.
L. DeYoung, "Hypertext Challenges in the Auditing Domain," Proceedings of the Second Annual ACM Conference on Hypertext, 1989.
B. N. Reeves "Supporting Collaborative Design by Embedding Communication and History in Design Artifacts," PhD Dissertation Submitted to the Department of Computer Science at the University of Colorado at Boulder, 1993.
Quint et al., "A Structured Authoring Environment for the World-Wide Web," Computer Networks and ISDN Systems, 1995.
Catlin et al., "InterNote: Extending a Hypermedia Framework to Support Annotative Collaboration," Proceedings of the Second Annual ACM Conference on Hypertext, 1989.

* cited by examiner

*Primary Examiner* — Quang N. Nguyen
(74) *Attorney, Agent, or Firm* — Sterne, Kessler, Goldstein & Fox PLLC

(57) ABSTRACT

A system, method, and computer program product for processing data are described herein. The system maintains first databases of patents, and second databases of non-patent information of interest to a corporate entity. The system also maintains one or more groups. Each of the groups comprises any number of the patents from the first databases. The system, upon receiving appropriate operator commands, automatically processes the patents in one of the groups in conjunction with non-patent information from the second databases. Accordingly, the system performs patent-centric and group-oriented processing of data. A group can also include any number of non-patent documents. The groups may be product based, person based, corporate entity based, or user-defined. Other types of groups are also covered, such as temporary groups. The processing automatically performed by the system relates to (but is not limited to) patent mapping, document mapping, patent citation (both forward and backward), patent aging, patent bracketing/clustering (both forward and backward), inventor patent count, inventor employment information, patent claim tree analysis, and finance. Other functions and capabilities are also covered, including the ability to utilize hyperbolic trees to visualize data generated by the system, method, and computer program product, and to track, analyze, and report on information related to intellectual property (IP) transactions, including license and related agreements.

51 Claims, 345 Drawing Sheets

PATENT
1222X

| DOCUMENT_ID | DOCUMENT_NUMBER |
|---|---|
| D1 | USP1 |
| D2 | USP2 |
| D3 | USP3 |
| D4 | USP4 |
| D5 | USP5 |
| D6 | USP6 |
| D7 | USP7 |
| D8 | USP8 |
| D9 | USP9 |
| D10 | USP10 |
| D11 | USP11 |
| D12 | USP12 |
| D13 | USP13 |
| D14 | USP14 |

FIG.13

DEPOSITIONS
1225X

| DOCUMENT_ID | DEPOSITION_ID |
|---|---|
| D15 | DEP1 |
| D16 | DEP2 |
| D17 | DEP3 |

FIG.14

PLEADINGS
1224X

| DOCUMENT_ID | PLEADING_ID |
|---|---|
| D18 | PL1 |
| D19 | PL2 |
| D20 | PL3 |
| D21 | PL4 |

FIG.15

PRIOR_ART
1226X

| DOCUMENT_ID | PRIORART_ID |
|---|---|
| D22 | PA1 |
| D23 | PA2 |

FIG.16

DOCUMENT 1223K

| DOCUMENT_ID | DOCUMENT_TYPE |
|---|---|
| D1 | PATENT |
| D2 | PATENT |
| D3 | PATENT |
| D4 | PATENT |
| D5 | PATENT |
| D6 | PATENT |
| D7 | PATENT |
| D8 | PATENT |
| D9 | PATENT |
| D10 | PATENT |
| D11 | PATENT |
| D12 | PATENT |
| D13 | PATENT |
| D14 | PATENT |
| D15 | DEPOSITION |
| D16 | DEPOSITION |
| D17 | DEPOSITION |
| D18 | PLEADING |
| D19 | PLEADING |
| D20 | PLEADING |
| D21 | PLEADING |
| D22 | PRIOR ART |
| D23 | PRIOR ART |

FIG.17

GROUP_TABLE
1227X

| GROUP_ID | NAME | OWNER_USER_ID |
| --- | --- | --- |
| GRP1 | COMPANIES TO ACQUIRE | USER1 |
| GRP2 | ABC CORP | USER1 |
| GRP3 | XYZ CORP | USER1 |
| GRP4 | PQR CORP | USER1 |
| GRP5 | PATENTS ABOUT BIKES | USER2 |
| GRP6 | LITIGATION | USER3 |

FIG.19

GROUP_GROUP_XREF
1229X

| PARENT | GROUP_ID | |
| --- | --- | --- |
| GRP1 | GRP2 | 2002 |
| GRP1 | GRP3 | 2004 |
| GRP1 | GRP4 | 2006 |

FIG.20

GROUP_DOCUMENT_XREF
1228X

| GROUP_ID | DOCUMENT_ID |
|---|---|
| GRP2 | D1 |
| GRP2 | D2 |
| GRP2 | D3 |
| GRP3 | D7 |
| GRP3 | D8 |
| GRP4 | D11 |
| GRP4 | D12 |
| GRP5 | D1 |
| GRP5 | D2 |
| GRP5 | D3 |
| GRP5 | D9 |
| GRP6 | D22 |
| GRP6 | D23 |
| GRP6 | D18 |
| GRP6 | D21 |
| GRP6 | D16 |
| GRP6 | D1 |

FIG.21

BOM
1217X

| BOM_ID | NAME |
|---|---|
| 1 | BICYCLE |
| 2 | BICYCLE FRAME |
| 3 | SCREW |
| 4 | WHEEL |
| 5 | RIM |
| 6 | TIRE |
| 7 | BICYCLE HANDLE BAR |
| 8 | METAL ROD |
| 9 | HAND GRIP |
| 10 | LAWN MOWER |
| 11 | LAWN MOWER FRAME |
| 12 | ENGINE |
| 13 | LAWN MOWER HANDLE BAR |

FIG.24

BOM_BOM_XREF
1219X

| PATENT_BOM_ID | BOM_ID | |
|---|---|---|
| 1 | 2 | 2502 |
| 2 | 3 | 2504 |
| 1 | 4 | 2506 |
| 4 | 5 | 2508 |
| 4 | 6 | 2510 |
| 1 | 7 | 2512 |
| 7 | 8 | 2514 |
| 7 | 9 | 2516 |
| 10 | 11 | 2518 |
| 11 | 3 | 2520 |
| 10 | 12 | 2522 |
| 10 | 13 | 2524 |
| 13 | 9 | 2526 |

FIG.25

BOM_PATENT_XREF
1218X

| BOM_ID | DOCUMENT_ID |
|---|---|
| 1 | D1 |
| 1 | D2 |
| 2 | D1 |
| 2 | D3 |
| 3 | D4 |
| 4 | D5 |
| 4 | D6 |
| 5 | D5 |
| 5 | D7 |
| 6 | D8 |
| 7 | D9 |
| 9 | D10 |
| 10 | D11 |
| 10 | D12 |
| 11 | D11 |
| 12 | D13 |
| 12 | D14 |

FIG.26

USER_TABLE
1238X

| USER_ID | USER_NAME |
|---|---|
| USER1 | MIKE |
| USER2 | JEN |
| USER3 | KATHRYN |

FIG.27

GROUP_USER_XREF
1237X

| GROUP_ID | USER_ID | PERMISSION |
|---|---|---|
| GRP1<br>GRP2 | USER2<br>USER2 | CHANGE<br>NONE |

FIG.28

USER_GROUP
1241X

| USER_GROUP_ID | GROUP_NAME |
|---|---|
| UGRP1 | ENGINEERING |
| UGRP2 | PERSONNEL |
| UGRP3 | LEGAL |
| UGRP4 | DAY CARE |

FIG.29

USR_GRP_USR_XREF
1239X

| USER_GROUP_ID | USER_ID |
|---|---|
| UGRP2 | USER2 |
| UGRP3 | USER1 |
| UGRP4 | USER3 |

FIG.30

GRP_USR_GRP_XREF
1240X

| GROUP_ID | USER_GROUP_ID | PERMISSION |
|---|---|---|
| GRP5 | UGRP2 | DELETE |
| GRP5 | UGRP3 | NONE |
| GRP6 | UGRP3 | DELETE |
| | WORLD | READ |

FIG.31

CORPORATE_ENTITY
1230X

| | CORP_ENTITY_ID | CORP_LEVEL_ID | PARENT_CORP_ENTITY_ID |
|---|---|---|---|
| 3302 | CORP1 | PARENT | |
| 3304 | CORP2 | SUB | CORP1 |
| 3306 | CORP3 | SUB | CORP1 |
| 3308 | CORP4 | SUB | CORP3 |
| 3310 | CORP5 | PARENT | |

FIG.33

RELEVANCE
1235X

| RELEVANCE_ID | DESCRIPTION |
|---|---|
| R1 | CORE |
| R2 | NON-CORE |

FIG.34

PATENT_OWNERSHIP
1234X

| OWNERSHIP_ID | DESCRIPTION |
|---|---|
| P01 | OWN |
| P02 | LICENSE |

FIG.35

CORP_PATENT_XREF
1233X

| CORP_ENTITY_ID | DOCUMENT_ID | OWNERSHIP_ID | RELEVANCE_ID |
|---|---|---|---|
| CORP1 | D1 | P01 | CORE |
| CORP1 | D2 | P01 | CORE |
| CORP1 | D3 | P01 | CORE |
| CORP3 | D6 | P01 | NON-CORE |
| CORP2 | D8 | P02 | CORE |
| CORP4 | D10 | P02 | CORE |
| CORP4 | D11 | P02 | NON-CORE |

FIG.36

PERSON
1242X

| PERSON_ID |
|---|
| PERSON1 |
| PERSON2 |
| PERSON3 |
| PERSON4 |
| PERSON5 |

FIG.37

VALIDATED_INVENTOR
1236X

| PERSON_ID | DOCUMENT_ID |
|---|---|
| PERSON1 | D1 |
| PERSON1 | D2 |
| PERSON1 | D3 |
| PERSON3 | D1 |
| PERSON3 | D4 |
| PERSON3 | D5 |
| PERSON5 | D6 |

FIG.39

EMPLOYEE
1243X

| PERSON_ID | CORP_ENTITY_ID | EMPLOYEE_STATUS_ID |
|---|---|---|
| PERSON1 | CORP1 | A |
| PERSON2 | CORP2 | A |
| PERSON4 | CORP1 | I |
| PERSON5 | CORP3 | I |

United States Patent [19]
Agrafiotis et al.

US005574656A
[11] Patent Number: 5,574,656 4004
[45] Date of Patent: Nov.12,1996 4006

[54] SYSTEM AND METHOD OF AUTOMATICALLY GENERATING CHEMICAL COMPOUNDS WITH DESIRED PROPERTIES 4010

4012

[75] Inventors: Dimitris K. Agrafiotis, Exton, Pa.; Roger F. Bone, Bridgewater, N.J.; Francis R. Salemme, Kennett Square, Pa.; Richard M. Soll, Lawrenceville, N.J.

[73] Assignee: 3-Dimensional Pharmaceuticals, Inc., Philadelphia, Pa.

[21] Appl. No.: 535,822 4014

[22] Filed: Sep. 28, 1995 4016

4018 Related U.S. Application Data

[63] Continuation of Ser. No. 306,915 Sep. 16, 1994, Pat. No. 5,463,564. 4024

[51] Int. Cl.[6] 4020 4022 ........G06F 17/50

[52] U.S. Cl. ..........364/500; 364/496; 463/43

[58] Field of Search ......364/496, 497, 364/500, 499; 436/43, 50, 55; 423/659; 424/2; 935/85-88

4026

[56] References Cited

4028 U.S. PATENT DOCUMENTS 4,939,666 7/1990 Hardman..................436/89
5,240,680 8/1993 Zuckerman et al. ...422/67
5,270,170 12/1993 Schatz et al. .....435/7.37
5,288,514 2/1994 Ellman .....................427/2
5,331,573 7/1994 Balaji et al. .........364/500

FOREIGN PATENT DOCUMENTS 4040
0355628 10/1989 European Pat. Off. .
0355266 2/1990 European Pat. Off. .
WO91/19735 12/1991 WIPO.
92/00091 1/1992 WIPO.
93/20242 10/1993 WIPO.

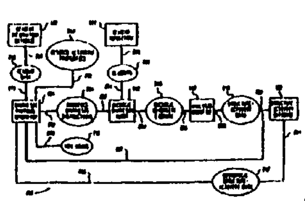

OTHER PUBLICATIONS

Pabo et al., "Computer-Aided Model Building Strategies for Protein Design", *Biochemistry* ,vol 25. No. 20, pp. 5987-5991 5987-5991, 1986. Saudek et al., "Solution Conformation of Endothelin-I by HNMR, CD, and Molecular Modeling". *International Journal of Peptide Protein Res.*, No.37, pp-174-179 1991. "The Use of Synthetic Peptide Combinational Libraries for the Identification of Bioactive Peptides". *Peptide Research*, vol.5, No.6, pp. 351-358, 1992."Strategies for Indirect Computer-Aided Drug Design", *Pharmaceutical Research*, vol. 10, No 4, pp. 475-486. 1993. "Screening Chemically Synthesized Peptide Libraries for Biologically -Relevant Molecules", *Organic & Medicinal Chemistry Letters*, vol. 3, No. 3, pp. 397-404, 1993. "Combinatorial Approaches Provide Fresh Leads for Medicinal Chemistry", *C&EN* Feb.1994."Current Trends in Synthetic Peptide and Chemical Diversity Library Design", *Genetic Engineering News*, pp. 31-32, May 1, 1994. 4008

(List continued on next page.) 4030

*Primary Examiner* -James P. Trammell
*Assistant Examiner*-Kyle J. Choi 4032
*Attorney, Agent, or Firm*-Sterne, Kessler. Goldstein & Fox, P.L.LC. 4034

[57] ABSTRACT

A computer based, iterative process for generating chemical entities with defined physical, chemical and/or bioactive properties. During each iteration of the process, (1) a directed diversity chemical library is robotically generated in accordance with robotic synthesis instructions; (2) the compounds in the directed diversity chemical library are analyzed to identify compounds with the desired properties; (3) structure-property data are used to select compounds to be synthesized in the next iteration; and (4) new robotic synthesis instructions are automatically generated to control the synthesis of the directed diversity chemical library for the next iteration.

4036 2 Claims, 12 Drawing Sheets 4038

United States Patent [19]
Hoge et al.

[11] Patent Number: 5,371,644
[45] Date of Patent: *Dec.6,1994

[54] SELF IDENTIFYING UNIVERSAL DATA STORAGE ELEMENT WITH HUMAN INTELLIGIBLE WRITE PROTECT MECHANISM

[75] Inventors: David T. Hoge, Westminster; John C. Owens, Arvada, both of Colo.; Michael W. Johnson, Cottage Grove, Minn.

4104

[73] Assignees: Storage Technology Corporation, Louisville, Colo.; Minnesota Mining and Manufacturing Company, St. Paul, Minn.

4106

[ * ] Notice: The portion of the term of this patent subsequent to Aug. 24, 2010 has been disclaimed.

[21] Appl. No.: 115,135

[22] Filed: Sep. 1, 1993

Related U.S. Application Data

[63] Continuation-in-part of Ser. No. 870,578 Apr. 17, 1992, Pat. No. 5,239,437, which is a continuation-in-part of Ser. No. 744,456 Aug. 12, 1991, abandoned.

[51] Int. Cl.$^5$ ................................G11B 15/04
[52] U.S. Cl. .......................360/132;360/133
[58] Field of Search ......360/132,95,134,131, 360/133;D14/121-123

[56] References Cited

U.S. PATENT DOCUMENTS

D.331,053 11/1992 Zucker et al. .....D14/115
5,210,671 5/1993 Blackston .............360/133
5,239,437 8/1993 Hoge et al. .........360/132

*Primary Examiner*– Paul M. Dzierzynski
*Assistant Examiner*– Don Wong
*Attorney, Agent, or Firm*–*Sterne, Kessler, Goldstein & Fox*

[57] ABSTRACT

A mechanism for defining a write protect state of a data storage media enclosed in a housing of a data storage element is disclosed. The mechanism includes an operature formed in an exterior surface of the housing, wherein the aperture has a first region and a second region. A member is movably secured within the aperture and is manually movable between a first position wherein the member is positioned proximate the aperture first region, and a second position wherein the member is positioned proximate the aperture second region. A first human intelligible mark is placed on the housing proximate the aperture first region. The first human intelligible mark depicts a portion of a predetermined symbol corresponding to one of a write enabled state and a write protect state of the data storage media. A second human intelligible mark is placed on the member. The second human intelligible mark depicts a remaining portion of the symbol. The second human intelligible mark is alignable with the first human intelligible mark by moving the member into the first position. When the first and second human intelligible marks are aligned, the first and second human intelligible marks depict an unbroken image of the symbol, thereby indicating that the data storage media is in the one of the write enabled state and the write protect state. When the first and second human intelligible marks are not aligned, the first and second human intelligible marks depict a broken image of the symbol, thereby indicating that the data storage media is in another of the write enabled state and the write protect state of the data storage media.

7 Claims, 4 Drawing Sheets

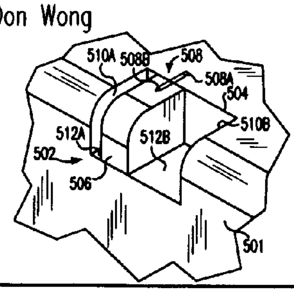

United States Patent [19]
Morel et al.

4202

[11] Patent Number: 5,302,779
[45] Date of Patent: Apr.12,1994

[54] PLUG FOR FIXING IN AN IMPERMEABLE MANNER AN ELECTRIC CABLE TO AN OPENING AND CABLE PROTECTION SLEEVE COMPRISING SUCH PLUGS

[75] Inventors: Jacques Morel; Didier Morel, both of Chateauneuf-en-Thymerais, France

[73] Assignee: Establissements Morel-Ateliers Electromechaniques de Favieres, Chateauneuf-en-Thymerais, France

[21] Appl. No.: 938,138

[22] PCT Filed: Feb. 20, 1991

[86] PCT No.: PCT/FR91/00135
4204 § 371 Date: Dec. 10, 1992
4206 § 102(e) Date: Dec. 10, 1992

[87] PCT Pub. No.: WO92/15138
PCT Pub. Date: Sep. 3,1992

[51] Int. Cl.[5] ......H02G 15/08

[52] U.S. Cl. ......174/92;174/76 174/77 R; 174/93

[58] Field of Search ......174/92,93,76,77 R, 174/82,65 G, 41

[56] References Cited

U.S. PATENT DOCUMENTS 3,769,443 10/1973 Pierzchala et al. ...174/76 X
3,935,373 1/1976 Smith et al. ......174/77 R
4,262,167 4/1981 Bossard et al. ......174/92
4,666,240 5/1987 Caron et al. ......174/93
4,704,499 11/1987 Faust ......174/92
4/752,653 6/1988 Bachel et al. ......174/93
4,861,946 8/1989 Pichler et al. ......174/92
4,933,512 6/1990 Nimiya et al. ......174/92

FOREIGN PATENT DOCUMENTS 0023099 1/1981 European Pat. Off. .
0073748 3/1983 European Pat. Off. .
0098765 1/1984 European Pat. Off. .
0206854 12/1986 European Pat. Off. .
0246113 11/1987 European Pat. Off. .
419820 10/1925 Fed. Rep. of Germany.
2826584 10/1979 Fed. Rep. of Germany.
2466887 4/1981 France .
2596215 9/1987 France .
2193605 2/1988 United Kingdom .

*Primary Examiner*– Morris H. Nimmo
*Attorney, Agent, or Firm*–Young & Thompson

[57] ABSTRACT

A plug that makes it possible to fix in an impermeable manner an electric or telephone cable (2) to a circular opening (4) for passage of the cable. It comprises a hollow body (5) constituted by two shells intended to be fixed around the cable (2) and comprising at least two jaws (6, 7) which are retained radially in the body (5). Each jaw comprises a central opening (10, 11) for passage of the cable (2) and is supported radially on this cable at the time of fixing by clamping of the two shells to one another, the two jaws defining between them a chamber (12) intended to be filled with a sealing material. The hollow body (5) has structure for fixing it in a removable and impermeable manner to the circular opening (4) for passage of the cable.

24 Claims, 6 Drawing Sheets

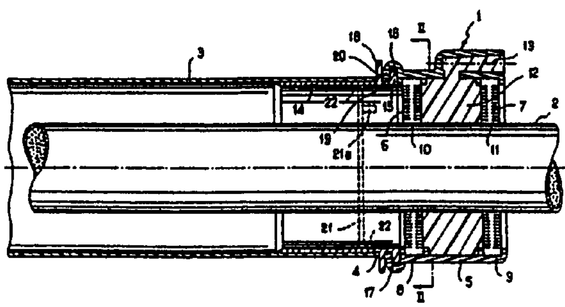

United States Patent [19] 4302
Grief et al.

[11] E Patent Number: Re. 34,583
[45] Reissued Date of Patent: Apr. 12, 1994

[54] METHOD OF FORMING A CONFIGURATION OF INTERCONNECTIONS ON A SEMICONDUCTOR DEVICE HAVING A HIGH INTEGRATION DENSITY

[75] Inventors: Malcom K. Grief; Trung T. Doan, both of Boise, Id.; Hendrikus J.W. Van Houtum; Josephus M.H.L. Van Laarhoven, both of Eindhoven, Netherlands

[73] Assignee: U.S. Philips Corporation, New York, N.Y.

[21] Appl. No.: 880,860

[22] Filed: May 11, 1992

Related U.S. Patent Documents

Reissue of:

[64] Patent No.: 4,936,950
4308 Issued: Jun. 26, 1990
Appl. No.: 339,029
Filed: Apr. 14, 1989

4310

[30] Foreign Application Priority Data

Apr. 22, 1988 [FR] France....................88 05391

[51] Int. Cl.5..................H01L 21/306; B44C 1/22; C23F 1/00; C03C 15/00

[52] U.S. Cl. ..............................156/643;156/644; 156/646;156/653;156/657;156/659.1; 156/662;257/750;437/192;437/203

[58] Field of Search .................156/643,644,646, 653,156/656,657,659.1,662;437/203,246, 194;357/71

[56] References Cited

U.S. PATENT DOCUMENTS

| | | | |
|---|---|---|---|
| 4,184,909 | 1/1980 | Chang et al. | .......437/192 X |
| 4,361,599 | 11/1982 | Wourms | ..................437/192 X |
| 4,484,978 | 11/1984 | Keyser | .....................156/653 X |
| 4,536,249 | 8/1985 | Rhodes | ......................156/653 X |
| 4,624,864 | 11/1986 | Hartmann | ...............437/193 X |
| 4,640,738 | 2/1987 | Fredericks et al. | .......156/656 |
| 4,981,550 | 1/1991 | Huttemann et al. | ...437/194 X |

FOREIGN PATENT DOCUMENTS 4306

0165085 12/1985 European Pat. Off. .

*Primary Examiner*– William A. Powell
*Attorney, Agent, or Firm*–Norman N. Spain

[57] ABSTRACT

A method of the kind consisting in that a contact is obtained with an active zone (11) carried by a semiconductor substrate (10) by means of conductive contact studs (18a) located in the contact openings (16c) of an isolating layer (12) and in that then a metallic configuration of interconnections (22) is formed establishing the conductive connection with the conductive contact studs (18a). A separation layer (13) is provided between the isolating layer (12) and the conductive layer (18), which can be eliminated selectively with respect to the isolating layer (12). Thus, the isolating layer (12) retains its original flatness and the conductive contact studs (18a) have an upper level (20) exceeding slightly the level (21) of the isolating layer (12), thus favoring the contact between these contact studs (18a) and the metallic configuration of interconnections (22). Application in microcircuits having a high integration density.

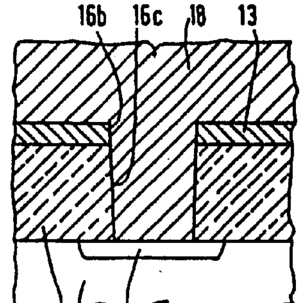

United States Patent [19]
Rivette et al.

[11] Patent Number: 5,623,681
[45] Date of Patent: Apr. 22, 1997

[54] METHOD AND APPARATUS FOR SYNCHRONIZING DISPLAYING AND MANIPULATING TEXT AND IMAGE DOCUMENTS

[75] Inventors: Kevin G. Rivette, Palo Alto; Michael P. Florio, Atherton; Adam Jackson, Sunnyvale; Don Ahn, Daly City; Irving S. Rappaport, Palo Alto; Deborah Kurata, Pleasanton, all of Calif.

4450

4404

[73] Assignee: Waverly Holdings, Inc., Palo Alto, Calif.

[21] Appl. No.: 155,752

[22] Filed: Nov. 19, 1993

[51] Int. Cl.6 .................................G06F 17/00

[52] U.S. Cl. .........395/788;395/784;395/787; 395/341

[58] Field of Search ..................395/144-149, 395/155,157,158,160,161,788,784, 783,787,341;364/401-408,419;382/135, 137,140

[56] References Cited

U.S. PATENT DOCUMENTS

| | | | |
|---|---|---|---|
| Re.32,632 | 3/1988 | Atkinson | 345/165 |
| 4,205,780 | 6/1980 | Burns et al. | 235/54 |
| 4,270,182 | 5/1981 | Asija | 382/192 |
| 4,486,857 | 12/1984 | Heckel | 395/100 |
| 4,533,910 | 8/1985 | Sukonick et al. | 345/118 |
| 4,555,775 | 11/1985 | Pike | 345/158 |
| 4,622,545 | 11/1986 | Atkinson | 345/191 |
| 4,736,308 | 4/1988 | Heckel | 395/144 |
| 4,748,618 | 5/1988 | Brown et al. | 370/191 |
| 4,772,882 | 9/1988 | Micol | 345/146 |
| 4,785,408 | 11/1988 | Britton et al. | 395/2.79 |
| 4,788,538 | 11/1988 | Klien et al. | 395/118 |
| 4,812,834 | 3/1989 | Wells | 364/500 |

(List continued on next page.)

FOREIGN PATENT DOCUMENTS 0239884 10/1987 European Pat. Off. .

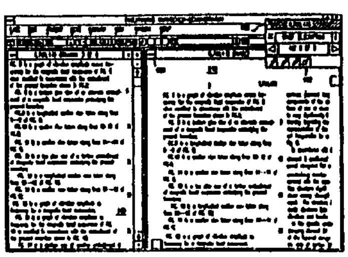

OTHER PUBLICATIONS

Alexander, Visualizing cleared-off desktops, *Computerworld* May 6, 1991, p.20

Hiroshi Ishii, Kauho Arita, *Clearface:Translucent Multiuser Interface for Team Workstation, ECSCW*, Sep.1991, pp. 6-10.

(List continued on next page)

*Primary Examiner* –Almis R. Jankus
*Assistant Examiner* –Joseph R. Burwell
*Attorney, Agent or Firm* –Sterne, Kessler. Goldstein & Fox, P.L.LC.

[57] ABSTRACT

The present invention provides a method and apparatus for extracting, synchronizing, displaying, and manipulating text and image documents in electronic form for display. In the Preferred embodiment of the present invention, text and image files for documents, such as for example patent documents, are initially stored on separate magnetic tape media. These data files are extracted from the respective tapes and placed onto a faster medium, such as a hard disk drive. The text and image files are synchronized to produce Equivalent Files using heuristic algorithms to create an approximate equivalence relationship between the text and the image files. The Equivalent Files and image files residing on for example, a hard disk drive or compact disk (CD), are coupled as a resource to a computer display system. The graphic user interface of the present invention permits the user to display, manipulate, and edit the Equivalent File created using the process of the present invention, and to simultaneously view the image file on the display. Using the graphic user interface of the present invention, a user may create libraries of patent Equivalent Files and image files or documents of another type, as well as open cases to include a plurality of different patents or other documents. The Equivalent File may be selectively viewed on the display in an in an equivalent window. Simultaneous with the viewing of the Equivalent File within the equivalent window, the user may view any portion of an image file within one or more image windows on the display. A variety of other features and functions are provided by the present invention for the manipulation and display of patent documents and other documents on the user interface.

51 Claims, 71 Drawing Sheets

FIG.44A

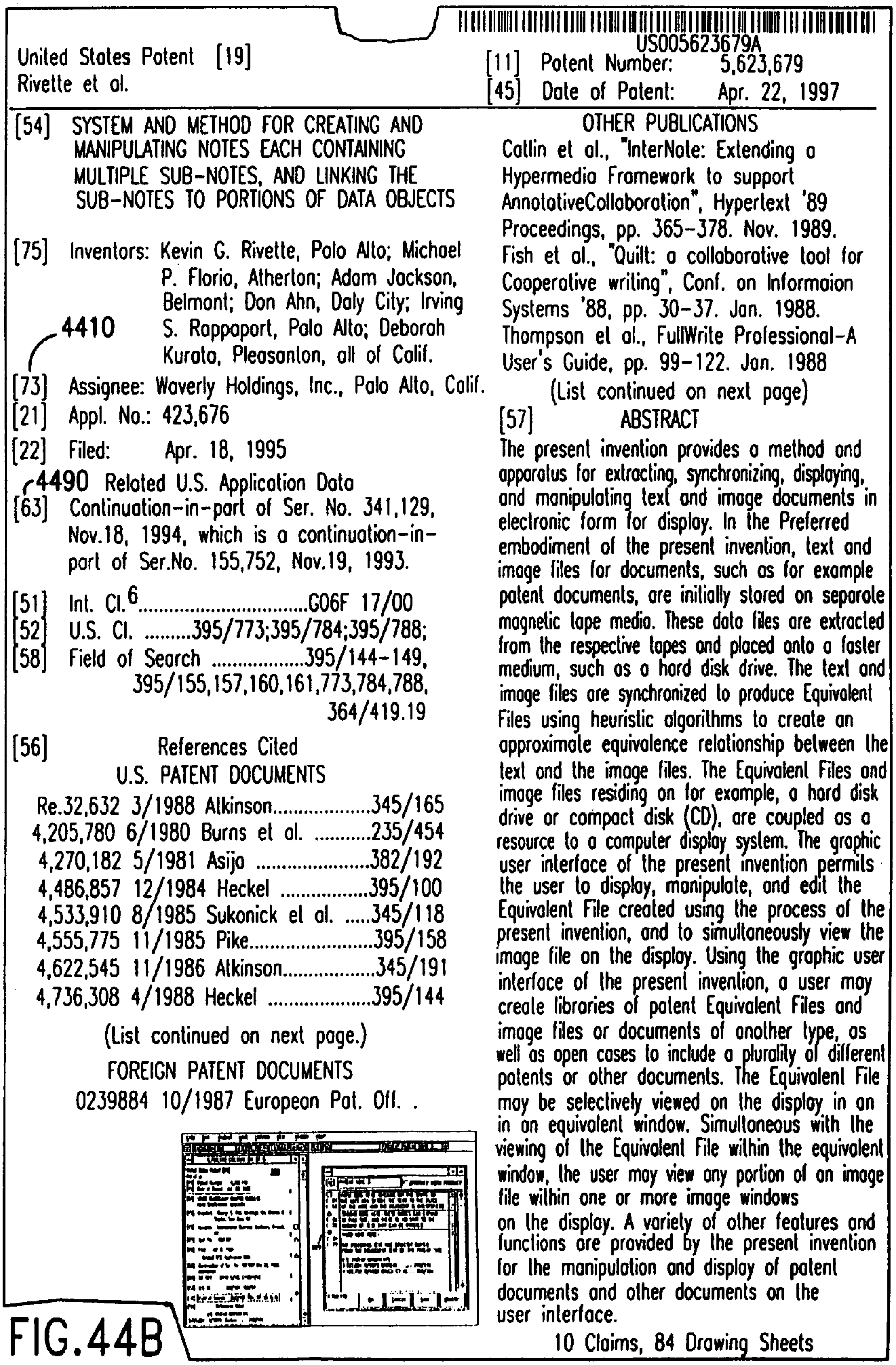

United States Patent [19]
Rivette et al.

US005623679A
[11] Patent Number: 5,623,679
[45] Date of Patent: Apr. 22, 1997

[54] SYSTEM AND METHOD FOR CREATING AND MANIPULATING NOTES EACH CONTAINING MULTIPLE SUB-NOTES, AND LINKING THE SUB-NOTES TO PORTIONS OF DATA OBJECTS

[75] Inventors: Kevin G. Rivette, Palo Alto; Michael P. Florio, Atherton; Adam Jackson, Belmont; Don Ahn, Daly City; Irving S. Rappaport, Palo Alto; Deborah Kurata, Pleasanton, all of Calif.

4410

[73] Assignee: Waverly Holdings, Inc., Palo Alto, Calif.

[21] Appl. No.: 423,676

[22] Filed: Apr. 18, 1995

4490 Related U.S. Application Data

[63] Continuation-in-part of Ser. No. 341,129, Nov.18, 1994, which is a continuation-in-part of Ser.No. 155,752, Nov.19, 1993.

[51] Int. Cl.[6] ................................G06F 17/00
[52] U.S. Cl. .........395/773;395/784;395/788;
[58] Field of Search ..................395/144-149, 395/155,157,160,161,773,784,788, 364/419.19

[56] References Cited

U.S. PATENT DOCUMENTS

| | | | |
|---|---|---|---|
| Re.32,632 | 3/1988 | Atkinson | 345/165 |
| 4,205,780 | 6/1980 | Burns et al. | 235/454 |
| 4,270,182 | 5/1981 | Asija | 382/192 |
| 4,486,857 | 12/1984 | Heckel | 395/100 |
| 4,533,910 | 8/1985 | Sukonick et al. | 345/118 |
| 4,555,775 | 11/1985 | Pike | 395/158 |
| 4,622,545 | 11/1986 | Atkinson | 345/191 |
| 4,736,308 | 4/1988 | Heckel | 395/144 |

(List continued on next page.)

FOREIGN PATENT DOCUMENTS 0239884 10/1987 European Pat. Off. .

OTHER PUBLICATIONS

Catlin et al., "InterNote: Extending a Hypermedia Framework to support AnnotativeCollaboration", Hypertext '89 Proceedings, pp. 365-378. Nov. 1989.

Fish et al., "Quilt: a collaborative tool for Cooperative writing", Conf. on Informaion Systems '88, pp. 30-37. Jan. 1988.

Thompson et al., FullWrite Professional-A User's Guide, pp. 99-122. Jan. 1988

(List continued on next page)

[57] ABSTRACT

The present invention provides a method and apparatus for extracting, synchronizing, displaying, and manipulating text and image documents in electronic form for display. In the Preferred embodiment of the present invention, text and image files for documents, such as for example patent documents, are initially stored on separate magnetic tape media. These data files are extracted from the respective tapes and placed onto a faster medium, such as a hard disk drive. The text and image files are synchronized to produce Equivalent Files using heuristic algorithms to create an approximate equivalence relationship between the text and the image files. The Equivalent Files and image files residing on for example, a hard disk drive or compact disk (CD), are coupled as a resource to a computer display system. The graphic user interface of the present invention permits the user to display, manipulate, and edit the Equivalent File created using the process of the present invention, and to simultaneously view the image file on the display. Using the graphic user interface of the present invention, a user may create libraries of patent Equivalent Files and image files or documents of another type, as well as open cases to include a plurality of different patents or other documents. The Equivalent File may be selectively viewed on the display in an in an equivalent window. Simultaneous with the viewing of the Equivalent File within the equivalent window, the user may view any portion of an image file within one or more image windows on the display. A variety of other features and functions are provided by the present invention for the manipulation and display of patent documents and other documents on the user interface.

10 Claims, 84 Drawing Sheets

United States Patent [19] [11] 3
Gee [45] Sept

[54] UNDERWATER TRACTOR AND IMPLEMENT THEREOF

[75] Inventor: James E. Gee, Washington,Ill.

[73] Assignee: Caterpillar Tractor Company, Peoria, Ill.

[22] Filed: Feb. 21, 1974

[21] Appl. No.: 444,317

[52] U.S. Cl. .........37/56; 37/66; 37/71; 61/69 R; 180/1 H

[51] Int. Cl.$^2$.................................E02F 3/68

[58] Field of Search ..................37/56,71,66,54; 180/1 H; 61/69 R 69 A; 115/1 R

[56] References Cited

UNITED STATES PATENTS

| | | |
|---|---|---|
| 658,922 | 10/1900 | Overston............37/56 |
| 813,935 | 2/1906 | Avery, Jr. ....... 37/56 |
| 3,314,174 | 4/1967 | Haggard ...........37/54 |
| 3,680,521 | 8/1972 | Minski et al. ..15/1 R |
| 3,683,521 | 8/1972 | Sloan et al. ... 27/56 |
| 3,706,142 | 12/1972 | Brunner ............37/56 |
| 3,738,029 | 6/1973 | Harper................37/66 |
| 3,757,436 | 9/1973 | Watusi...........37/56 UX |
| 3,724,323 | 11/1973 | Vaughn......... 37/71 X |

FOREIGN PATENTS OR APPLICATIONS

| | | |
|---|---|---|
| 216,537 | 7/1968 | U.S.S.R. ......37/66 |
| 841,472 | 5/1970 | Canada ............... |

*Primary Examiner* Clifford D. Crowde
*Attorney, Agent or Firm* Phillips, Moo Weissenberger Lempio & Strubala

[57] ABSTRACT

A tractor includes an internal combustion is adapted for underwater operation , A outlet means extending to above the s water for supplying air to the engine a combustion gas therefrom. A dredging the form of a blade and auger, directs the floor to adjacent one end of a con the vehicle is transported over the floor associated with the conduit means trans terial therethrough and from the other e duit means, which is positioned above t the water. The dredging implement may take the form of a pair of wing member upwardly and inwardly in the rearward d nect material to adjacent the one end e means . Means remote from the vehicle able on shore, are included for opera merged tractor.

4 Claims, 3 Drawing Figure

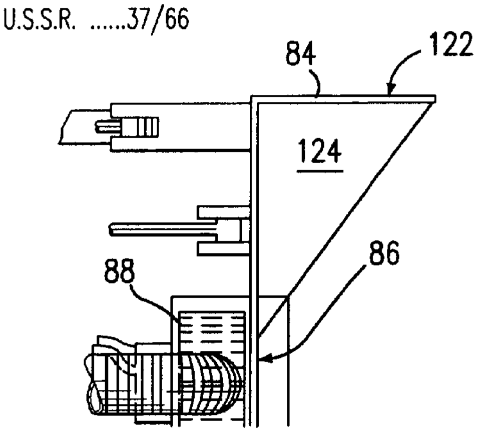

Figure 59:
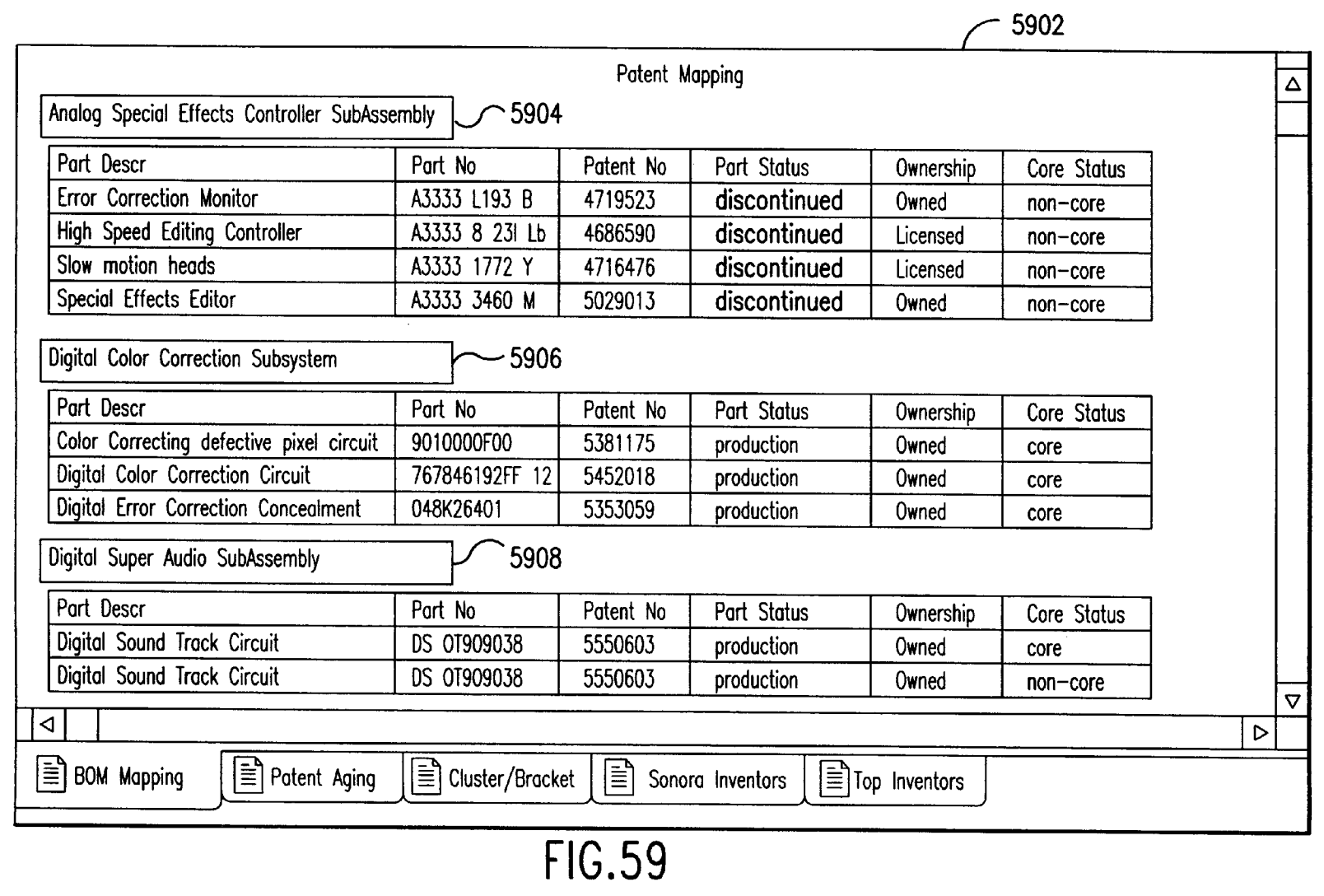

Patent Mapping

Analog Special Effects Controller SubAssembly 5904

| Part Descr | Part No | Patent No | Part Status | Ownership | Core Status |
|---|---|---|---|---|---|
| Error Correction Monitor | A3333 L193 B | 4719523 | discontinued | Owned | non-core |
| High Speed Editing Controller | A3333 8 231 Lb | 4686590 | discontinued | Licensed | non-core |
| Slow motion heads | A3333 1772 Y | 4716476 | discontinued | Licensed | non-core |
| Special Effects Editor | A3333 3460 M | 5029013 | discontinued | Owned | non-core |

Digital Color Correction Subsystem 5906

| Part Descr | Part No | Patent No | Part Status | Ownership | Core Status |
|---|---|---|---|---|---|
| Color Correcting defective pixel circuit | 9010000F00 | 5381175 | production | Owned | core |
| Digital Color Correction Circuit | 767846192FF 12 | 5452018 | production | Owned | core |
| Digital Error Correction Concealment | 048K26401 | 5353059 | production | Owned | core |

Digital Super Audio SubAssembly 5908

| Part Descr | Part No | Patent No | Part Status | Ownership | Core Status |
|---|---|---|---|---|---|
| Digital Sound Track Circuit | DS 0T909038 | 5550603 | production | Owned | core |
| Digital Sound Track Circuit | DS 0T909038 | 5550603 | production | Owned | non-core |

BOM Mapping | Patent Aging | Cluster/Bracket | Sonora Inventors | Top Inventors

Phone Handset <BOM level>

| Part Descr | Part No | Part Status | Patent No | Ownership | Core Status | Ranking |
|---|---|---|---|---|---|---|
| cord | N 33a | production | 5003922 | owned | Core | 10 |
| top casing | 300be #3 | production | 5103944 | licensed | Core | 10 |
| bottom casing | 300sal | production | 4739181 | owned | non-core | 3 |

Phone Innards <BOM level> 6006

| Part Descr | Part No | Part Status | Patent No | Ownership | Core Status | Ranking |
|---|---|---|---|---|---|---|
| doohickey1 | A3383 F | production | 5003922 | owned | Core | 10 |
| doohick | B 0983893 | production | 5103944 | licensed | Core | 10 |
| dongle | C 383a | production | 4739181 | owned | non-core | 3 |

| | | | | | |
|---|---|---|---|---|---|
| Source Pat No | Source Pat Title | | | | |
| | Citing Pat | Assignee | Title | IssueDate | Ownership |
| | Patent No. | Assignee | Title | Date | Ownership |
| | Patent No. | Assignee | Title | Date | Ownership |
| Source Pat No | Source Pat Title | | | | |
| | Citing Pat | Assignee | Title | IssueDate | Ownership |
| | Patent No. | Assignee | Title | Date | Ownership |
| | Patent No. | Assignee | Title | Date | Ownership |

<BOM-level> Handset SubAssembly

| Source Patent | Src Pat Title | Citing Pat | Assignee | Title | IssueDate |
|---|---|---|---|---|---|
| 4701102 | Title | 5301102 | Sonora | Title | 110587 |
| | Title | 5001102 | Sony | Title | 110588 |
| 4601102 | Title | 4801102 | Sonora | Title | 100581 |

<BOM-level> Phone Innards SubAssembly

| Source Patent | Src Pat Title | Citing Pat | Assignee | Title | IssueDate |
|---|---|---|---|---|---|
| 5003933 | Title | Patent No. | Assignee | Title | 110587 |
| | Title | Patent No. | Assignee | Title | 110582 |

Ownership Status: < >

| Source Patent | Src Pat Title | Citing Pat | Assignee | Title | IssueDate |
|---|---|---|---|---|---|
| Patent Number | Title | Patent No. | Assignee | Title | DATE |
| | Title | Patent No. | Assignee | Title | DATE |
| Source Patent | Src Pat Title | Citing Pat | Assignee | Title | IssueDate |
| Patent Number | Title | Patent No. | Assignee | Title | DATE |
| | Title | Patent No. | Assignee | Title | DATE |

| <Group titles> | Patent# | Yrs to Exp |
|---|---|---|
| XZY SubAssembly | 5,000,123<br>5,000,321 | 1<br>2 |
| <Group titles> | Patent# | Yrs to Exp |
| ABC SubAssembly | 5,034,123<br>5,043,321<br>5,073,921 | 6<br>9<br>9 |

| <Ownership Status> | Patent# | Yrs to Exp |
|---|---|---|
| Owned | 5,000,123<br>5,000,321 | 1<br>2 |
| <Ownership Status> | Patent# | Yrs to Exp |
| Licensed | 5,034,123<br>5,043,321<br>5,073,921 | 6<br>9<br>9 |

| <Org_Level Descr><br>Patent# | <br>Yrs to Exp | <br>Ownership |
|---|---|---|
| 5,000,123<br>5,000,321 | 1<br>2 | licensed<br>owned |
| <Org_Level Descr><br>Patent# | <br>Yrs to Exp | <br>Ownership |
| 5,034,123<br>5,043,321<br>5,073,921 | 6<br>9<br>9 | owned<br>owned<br>licensed |

<Group Title>

7602

| Inventor Name | # patents | emp_status | # core patents | # non-core patents |
|---|---|---|---|---|
| C Rabb | | 5 active | | |
| A Jackson | | 4 active | | |
| L Hohmann | | 2 inactive | | |

FIG.76

<Group Title>

7702

| <Org Level> | Name | # patents | emp_status |
|---|---|---|---|
| Engineering | C Rabb | | 5 active |
| | A Jackson | | 4 active |
| | J Smith | | active |
| <Org Level> | Name | # patents | emp_status |
| Marketing | D Puglia | | 2 active |
| | L Hohmann | | 2 inactive |

Figure 78:
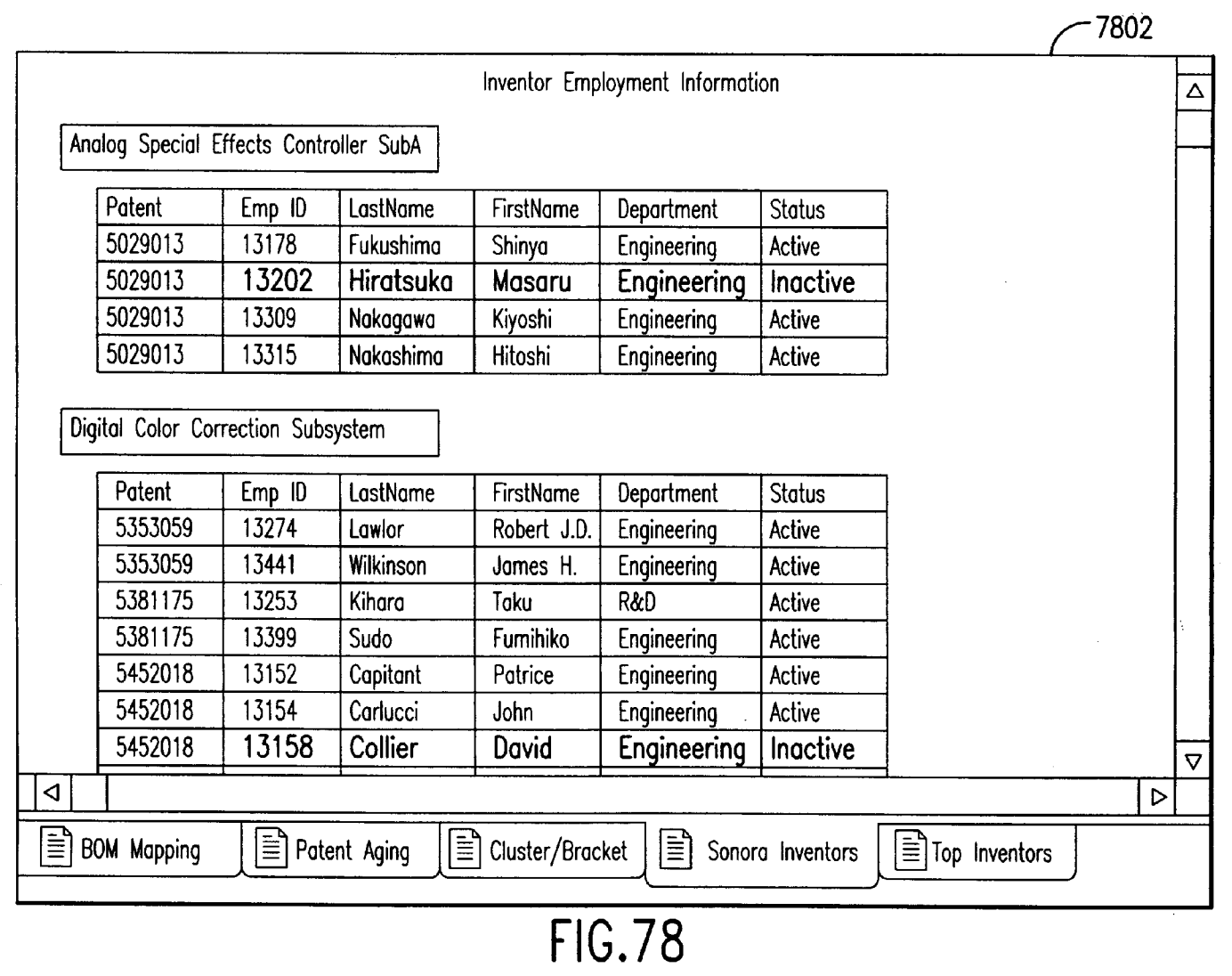

Inventor Employment Information

Analog Special Effects Controller SubA

| Patent | Emp ID | LastName | FirstName | Department | Status |
|---|---|---|---|---|---|
| 5029013 | 13178 | Fukushima | Shinya | Engineering | Active |
| 5029013 | **13202** | **Hiratsuka** | **Masaru** | **Engineering** | **Inactive** |
| 5029013 | 13309 | Nakagawa | Kiyoshi | Engineering | Active |
| 5029013 | 13315 | Nakashima | Hitoshi | Engineering | Active |

Digital Color Correction Subsystem

| Patent | Emp ID | LastName | FirstName | Department | Status |
|---|---|---|---|---|---|
| 5353059 | 13274 | Lawlor | Robert J.D. | Engineering | Active |
| 5353059 | 13441 | Wilkinson | James H. | Engineering | Active |
| 5381175 | 13253 | Kihara | Taku | R&D | Active |
| 5381175 | 13399 | Sudo | Fumihiko | Engineering | Active |
| 5452018 | 13152 | Capitant | Patrice | Engineering | Active |
| 5452018 | 13154 | Carlucci | John | Engineering | Active |
| 5452018 | **13158** | **Collier** | **David** | **Engineering** | **Inactive** |

BOM Mapping | Patent Aging | Cluster/Bracket | Sonora Inventors | Top Inventors

| <BOM_Level> | | | | | |
|---|---|---|---|---|---|
| <BOM_Level De | Patent | EmpId | Name | Org_Level | Status |
| Imaging Device | 5003922 | 3892 | A Jackson | Engineering | Active |
| | 5003922 | 1224 | J Smith | Engineering | Active |
| | 5003922 | 1266 | D Puglia | Engineering | Active |
| | 5103944 | 3892 | A Jackson | Engineering | Active |
| | 5100014 | 3892 | A Jackson | Engineering | Active |
| BOM_Level | | | | | |
| <BOM_Level De | Patent | EmpId | Name | Org_Level | Status |
| Cup holder | 4283039 | 3833 | C Rabb | Engineering | Active |
| | 4739181 | | A Einstein | | |
| | 4983039 | 7132 | L Hohmann | Engineering | Inactive |

| Sony Electronics | | | | | |
|---|---|---|---|---|---|
| | Org_Level2 | Patent | EmpId | Name | Status |
| | Engineering | 5003922 | 3892 | A Jackson | Active |
| | Engineering | 5103944 | 3892 | A Jackson | Active |
| Sony Music | | | | | |
| | Org_Level2 | Patent | EmpId | Name | Status |
| | | 4739181 | | A Einstein | |
| | R&D | 4283039 | 3833 | C Rabb | Active |

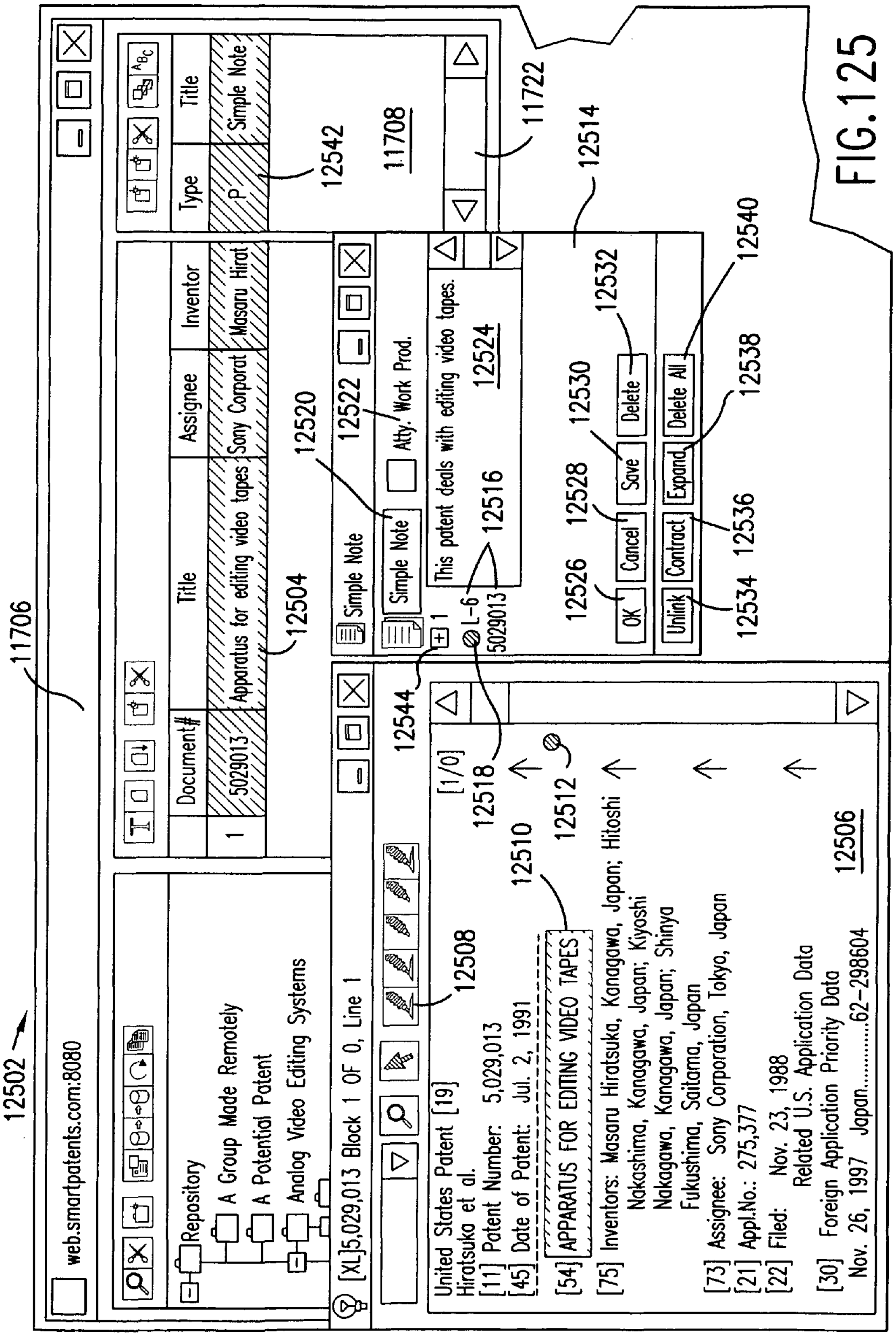
12502
11706
web.smartpatents.com:8080
Repository
A Group Made Remotely
A Potential Patent
Analog Video Editing Systems
Document#
Title
Assignee
Inventor
1
5029013
Apparatus for editing video tapes
Sony Corporat
Masaru Hirat
12504
Type
Title
P
Simple Note
12542
11708
11722
12514
[XL]5,029,013 Block 1 OF 0, Line 1
12508
12510
12512
12518
12544
[1/0]
United States Patent [19]
Hiratsuka et al.
[11] Patent Number: 5,029,013
[45] Date of Patent: Jul. 2, 1991
[54] APPARATUS FOR EDITING VIDEO TAPES
[75] Inventors: Masaru Hiratsuka, Kanagawa, Japan; Hitoshi Nakashima, Kanagawa, Japan; Kiyoshi Nakagawa, Kanagawa, Japan; Shinya Fukushima, Saitama, Japan
[73] Assignee: Sony Corporation, Tokyo, Japan
[21] Appl.No.: 275,377
[22] Filed: Nov. 23, 1988
Related U.S. Application Data
[30] Foreign Application Priority Data
Nov. 26, 1997 Japan..........62-298604
12506
Simple Note
Simple Note
Atty. Work Prod.
12520
12522
1
L-6
5029013
12516
This patent deals with editing video tapes.
12524
OK
Cancel
Save
Delete
Unlink
Contract
Expand
Delete All
12526
12528
12530
12532
12534
12536
12538
12540
FIG.125

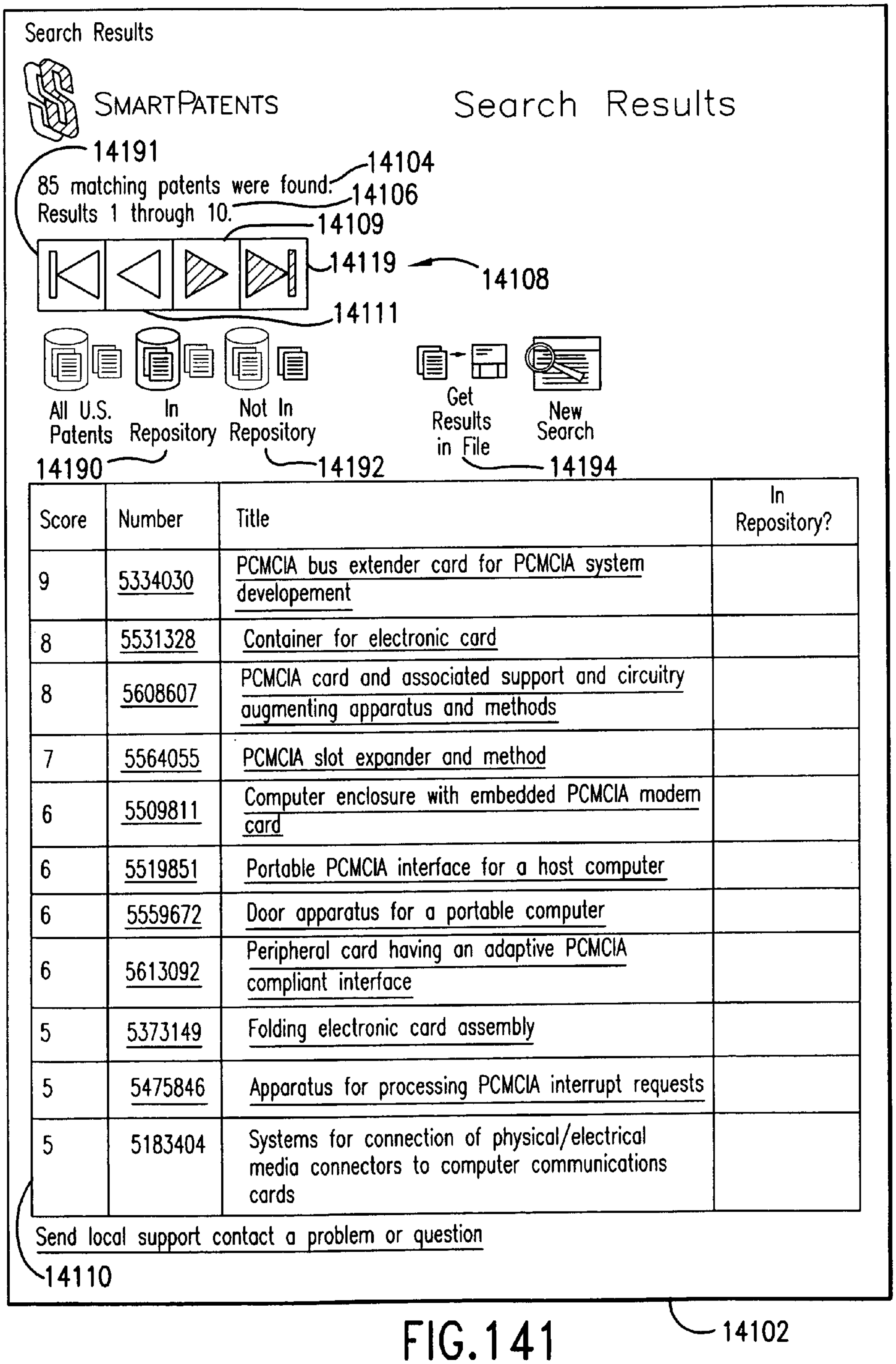

| Score | Number | Title | In Repository? |
|---|---|---|---|
| 9 | 5334030 | PCMCIA bus extender card for PCMCIA system developement | |
| 8 | 5531328 | Container for electronic card | |
| 8 | 5608607 | PCMCIA card and associated support and circuitry augmenting apparatus and methods | |
| 7 | 5564055 | PCMCIA slot expander and method | |
| 6 | 5509811 | Computer enclosure with embedded PCMCIA modem card | |
| 6 | 5519851 | Portable PCMCIA interface for a host computer | |
| 6 | 5559672 | Door apparatus for a portable computer | |
| 6 | 5613092 | Peripheral card having an adaptive PCMCIA compliant interface | |
| 5 | 5373149 | Folding electronic card assembly | |
| 5 | 5475846 | Apparatus for processing PCMCIA interrupt requests | |
| 5 | 5183404 | Systems for connection of physical/electrical media connectors to computer communications cards | |

FIG. 141

Figure 142:
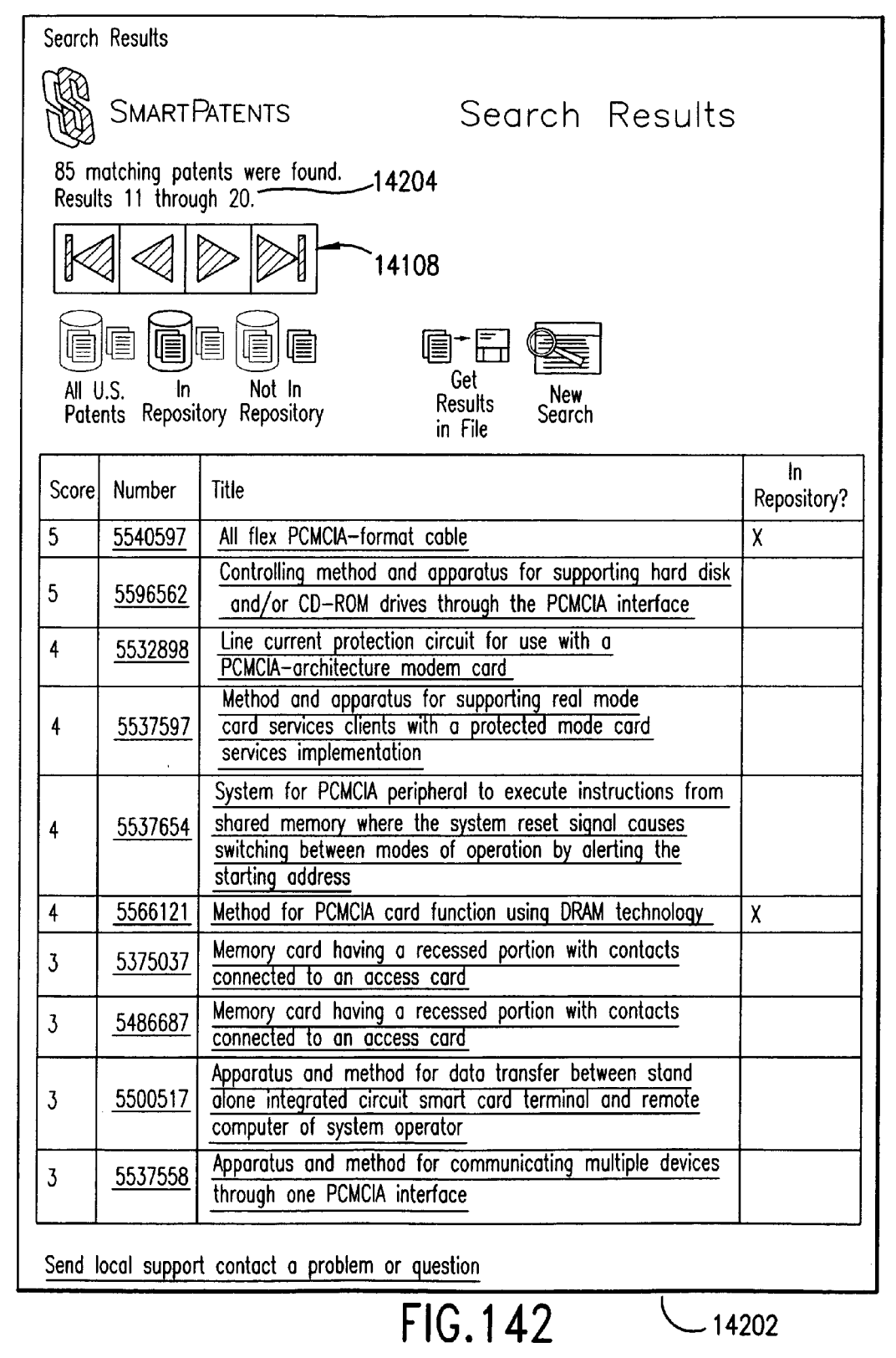

Search Results

SMARTPATENTS

Search Results 85 matching patents were found.
Results 11 through 20. 14204

14108

All U.S. Patents | In Repository | Not In Repository

Get Results in File | New Search

| Score | Number | Title | In Repository? |
|---|---|---|---|
| 5 | 5540597 | All flex PCMCIA-format cable | X |
| 5 | 5596562 | Controlling method and apparatus for supporting hard disk and/or CD-ROM drives through the PCMCIA interface | |
| 4 | 5532898 | Line current protection circuit for use with a PCMCIA-architecture modem card | |
| 4 | 5537597 | Method and apparatus for supporting real mode card services clients with a protected mode card services implementation | |
| 4 | 5537654 | System for PCMCIA peripheral to execute instructions from shared memory where the system reset signal causes switching between modes of operation by alerting the starting address | |
| 4 | 5566121 | Method for PCMCIA card function using DRAM technology | X |
| 3 | 5375037 | Memory card having a recessed portion with contacts connected to an access card | |
| 3 | 5486687 | Memory card having a recessed portion with contacts connected to an access card | |
| 3 | 5500517 | Apparatus and method for data transfer between stand alone integrated circuit smart card terminal and remote computer of system operator | |
| 3 | 5537558 | Apparatus and method for communicating multiple devices through one PCMCIA interface | |

Send local support contact a problem or question

FIG.142 14202

Figure 144:
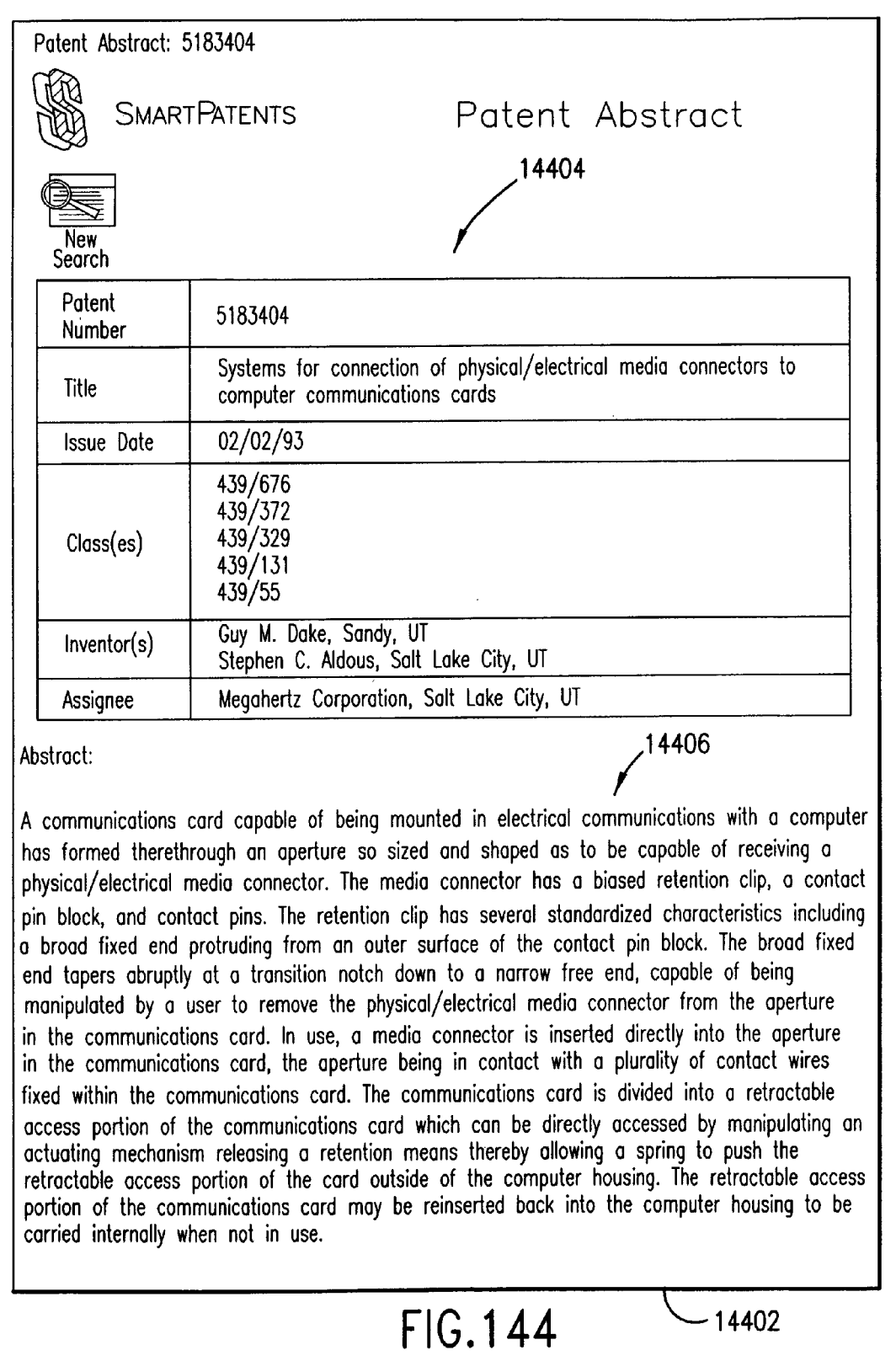

Patent Abstract: 5183404

SMARTPATENTS

Patent Abstract

14404

New Search

| Patent Number | 5183404 |
|---|---|
| Title | Systems for connection of physical/electrical media connectors to computer communications cards |
| Issue Date | 02/02/93 |
| Class(es) | 439/676<br>439/372<br>439/329<br>439/131<br>439/55 |
| Inventor(s) | Guy M. Dake, Sandy, UT<br>Stephen C. Aldous, Salt Lake City, UT |
| Assignee | Megahertz Corporation, Salt Lake City, UT |

Abstract:

14406

A communications card capable of being mounted in electrical communications with a computer has formed therethrough an aperture so sized and shaped as to be capable of receiving a physical/electrical media connector. The media connector has a biased retention clip, a contact pin block, and contact pins. The retention clip has several standardized characteristics including a broad fixed end protruding from an outer surface of the contact pin block. The broad fixed end tapers abruptly at a transition notch down to a narrow free end, capable of being manipulated by a user to remove the physical/electrical media connector from the aperture in the communications card. In use, a media connector is inserted directly into the aperture in the communications card, the aperture being in contact with a plurality of contact wires fixed within the communications card. The communications card is divided into a retractable access portion of the communications card which can be directly accessed by manipulating an actuating mechanism releasing a retention means thereby allowing a spring to push the retractable access portion of the card outside of the computer housing. The retractable access portion of the communications card may be reinserted back into the computer housing to be carried internally when not in use.

| | | | |
|---|---|---|---|
| 4,451,742 | 5/1984 | Aswell | 395/182.2 X |
| 4,710,903 | 12/1987 | Hereth et al. | 365/194 |
| 4,766,567 | 8/1988 | Kato | 395/182.2 X |
| 4,958,322 | 9/1990 | Kosugi et al. | 365/189.01 |
| 5,206,830 | 4/1993 | Isobe | 365/194 |
| 5,208,779 | 5/1993 | Walther | 365/222 |
| 5,229,970 | 7/1993 | Lee | 365/222 |
| 5,276,843 | 1/1994 | Tillinghast et al. | 395/425 |
| 5,283,905 | 2/1994 | Saadeh | 395/182.2 X |
| 5,289,424 | 2/1994 | Ito et al. | 365/222 |
| 5,333,128 | 7/1994 | Yoon | 365/222 |
| 5,335,201 | 8/1994 | Walther | 365/222 |
| 5,414,861 | 5/1995 | Horning | 395/182.2 X |
| 5,430,681 | 7/1995 | Sugawara | 365/222 |

14536 14528 14538 14530

OTHER PUBLICATIONS

Brown, New IC Stacking Process Idèal For High-Density Memory Module and Hybrid Applications, Electro/95 Int'l Professional Program Proceedings, Apr. 1995, pp. 3-16.

Primary Examiner--Robert W. Beausoliel, Jr.
Assistant Examiner--Glenn Snyder
Attorney, Agent, or Firm--Marc A. Eherlich

[57] ABSTRACT

An apparatus may be used with a computer system having a PCMCIA interface. The apparatus employs a DRAM device and logic for converting the PCMCIA SRAM control signals into DRAM control signals, so as to permit the communication of data and control signals between the computer system and the DRAM device. The apparatus further provides controls for refreshing the DRAM device, and for arbitrating between the functions of refreshing the DRAM and providing for communication between the DRAM and the computer system. The apparatus further provides the power management functions required for operating a DRAM device in a PCMCIA environment.

11 Claims, 6 Drawing Sheets

PCMCIA SRAM CARD FUNCTION USING DRAM TECHNOLOGY

CROSS REFERENCE TO RELATED APPLICATIONS

The present application related to the following co-pending patent applications:

PCMCIA voltage loss detection, U.S. patent application Ser. No. 08/521,498, by Scott j. Hadderman

14532

A Method for PCMCIA SRAM Card Function Using

FIG.145B

DRAM Technology, U.S. patent application Ser. No. 08/ 521,508, by Scott J. Hadderman and Kraig R. White

14534

These co-pending applications and the present application are owned by one and the same assignee, International Business Machines Corporation of Armonk, N.Y.

The descriptions set forth in these co-pending applications are hereby incorporated into the present application by this reference.

FIELD OF THE INVENTION

This invention is generally related to computer systems and particularly to computer systems utilizing a PCMCIA SRAM interface for PCMCIA memory cards.

GLOSSARY OF TERMS

While dictionary meanings are also implied by certain terms used here, the following glossary of some terms may be useful. DRAM Dynamic Random Access Memory.
SRAM Static Random Access Memory.
PCMCIA Personal Computer Memory Card International Association.
ASIC Application Specific Integrated Circuit.
Host Computer System Computer to which the PCMCIA memory card is currently attached.

REFERENCES USED IN THE DISCUSSION OF THE INVENTION

During the detailed description which follows the following work will be referenced as an aid for the reader. The additional reference is:

PCMCIA PC CARD STANDARD Release 2.1 Personal Computer Memory Card International Association 1030 East Duane Avenue Suite G Sunnyvale, Calif. 94086

This additional reference is incorporated by reference.

BACKGROUND OF THE INVENTION

The PCMCIA specification was created to standardize a removable peripheral device for personal computers. The PCMCIA specification describes the features required for PCMCIA devices. These features include physical dimensions and electrical specifications. The PCMCIA electrical specification can further be divided into two card categories, input/output cards and memory cards. This invention is described by the memory card category of the PCMCIA specification.

Although the memory specification is intended to describe PCMCIA devices using general memory technology, the specification tends to limit memory selection to either SRAM or FLASH technology. The specification

FIG.145C

Figure 146:
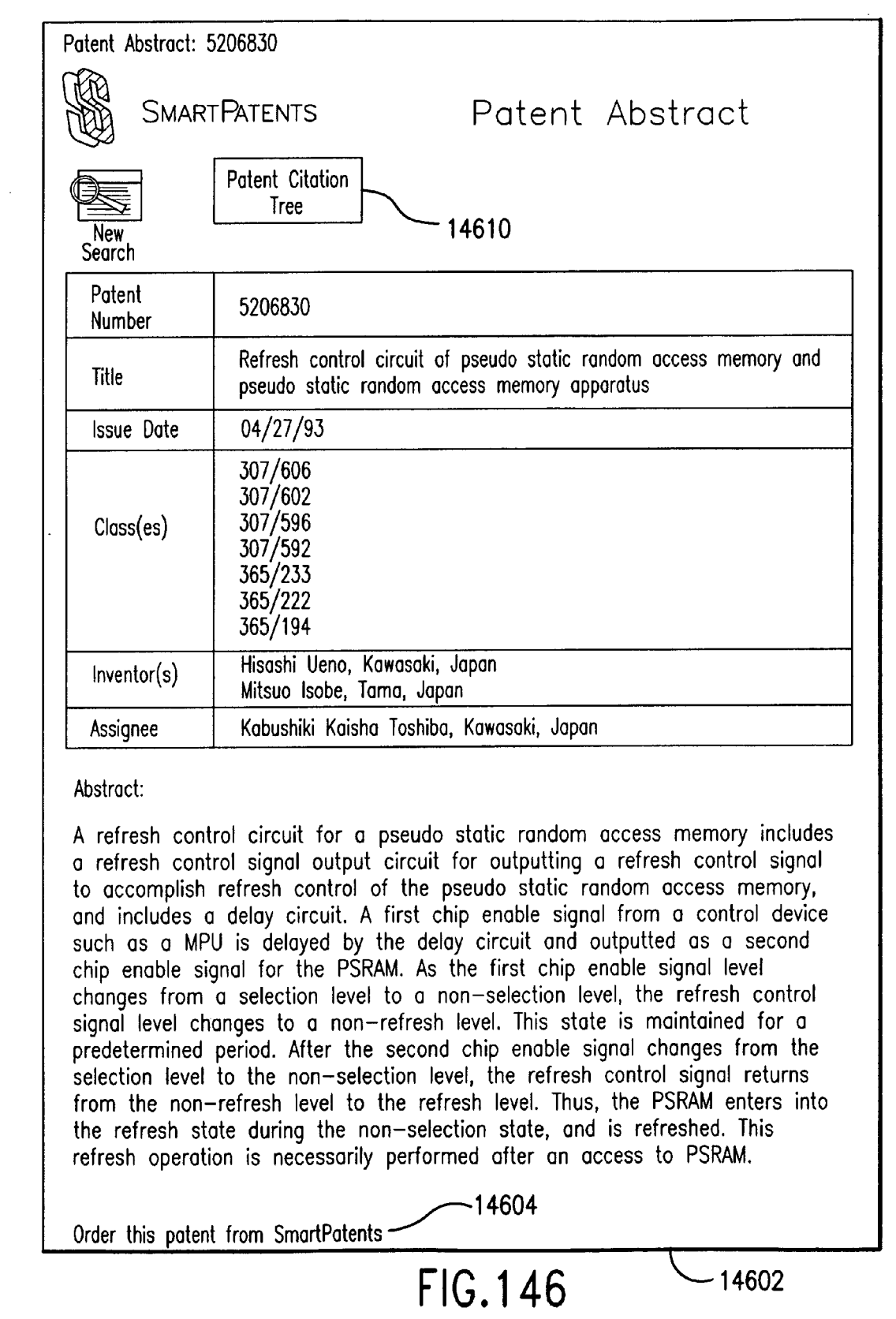

Patent Abstract: 5206830

SMARTPATENTS

Patent Abstract

New Search

Patent Citation Tree

14610

| | |
|---|---|
| Patent Number | 5206830 |
| Title | Refresh control circuit of pseudo static random access memory and pseudo static random access memory apparatus |
| Issue Date | 04/27/93 |
| Class(es) | 307/606<br>307/602<br>307/596<br>307/592<br>365/233<br>365/222<br>365/194 |
| Inventor(s) | Hisashi Ueno, Kawasaki, Japan<br>Mitsuo Isobe, Tama, Japan |
| Assignee | Kabushiki Kaisha Toshiba, Kawasaki, Japan |

Abstract:

A refresh control circuit for a pseudo static random access memory includes a refresh control signal output circuit for outputting a refresh control signal to accomplish refresh control of the pseudo static random access memory, and includes a delay circuit. A first chip enable signal from a control device such as a MPU is delayed by the delay circuit and outputted as a second chip enable signal for the PSRAM. As the first chip enable signal level changes from a selection level to a non-selection level, the refresh control signal level changes to a non-refresh level. This state is maintained for a predetermined period. After the second chip enable signal changes from the selection level to the non-selection level, the refresh control signal returns from the non-refresh level to the refresh level. Thus, the PSRAM enters into the refresh state during the non-selection state, and is refreshed. This refresh operation is necessarily performed after an access to PSRAM.

14604

Order this patent from SmartPatents

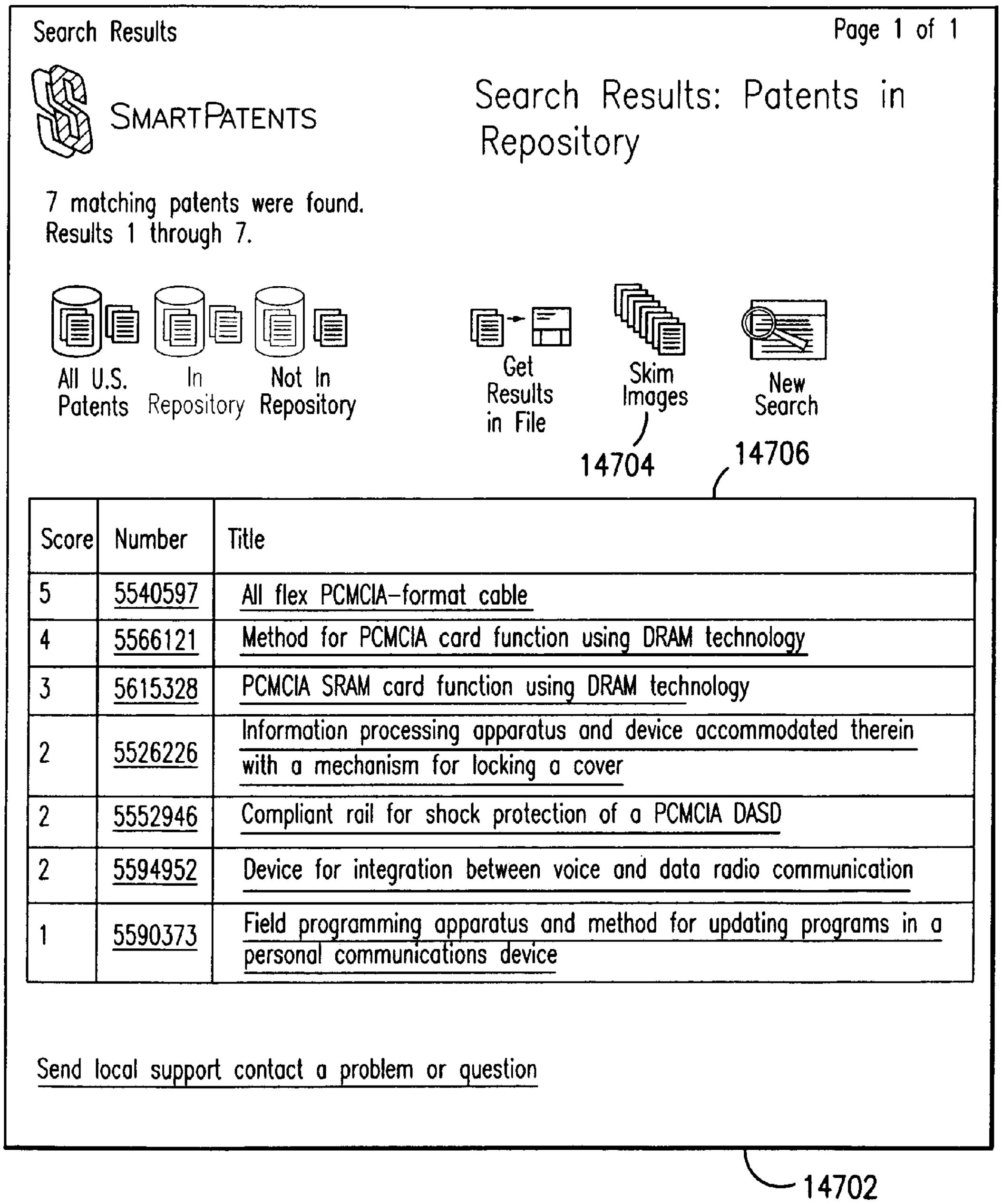

| Score | Number | Title |
|---|---|---|
| 5 | 5540597 | All flex PCMCIA-format cable |
| 4 | 5566121 | Method for PCMCIA card function using DRAM technology |
| 3 | 5615328 | PCMCIA SRAM card function using DRAM technology |
| 2 | 5526226 | Information processing apparatus and device accommodated therein with a mechanism for locking a cover |
| 2 | 5552946 | Compliant rail for shock protection of a PCMCIA DASD |
| 2 | 5594952 | Device for integration between voice and data radio communication |
| 1 | 5590373 | Field programming apparatus and method for updating programs in a personal communications device |

PARENT/CHILD TABLE
18002

| PARENT | CHILD |
|---|---|
| 1 | 2 |
| 1 | 3 |
| 2 | 4 |
| 4 | 5 |
| 4 | 6 |
| 5 | 7 |
| 6 | 7 |

PATENT BIBLIOGRAPHIC INFORMATION TABLE 18202

| PATENT | BIBLIOGRAPHIC INFORMATION |
|---|---|
| 1 | BIB INFO FOR PATENT 1 |
| 2 | BIB INFO FOR PATENT 2 |
| 3 | BIB INFO FOR PATENT 3 |
| 4 | BIB INFO FOR PATENT 4 |
| 5 | BIB INFO FOR PATENT 5 |
| 6 | BIB INFO FOR PATENT 6 |
| 7 | BIB INFO FOR PATENT 7 |

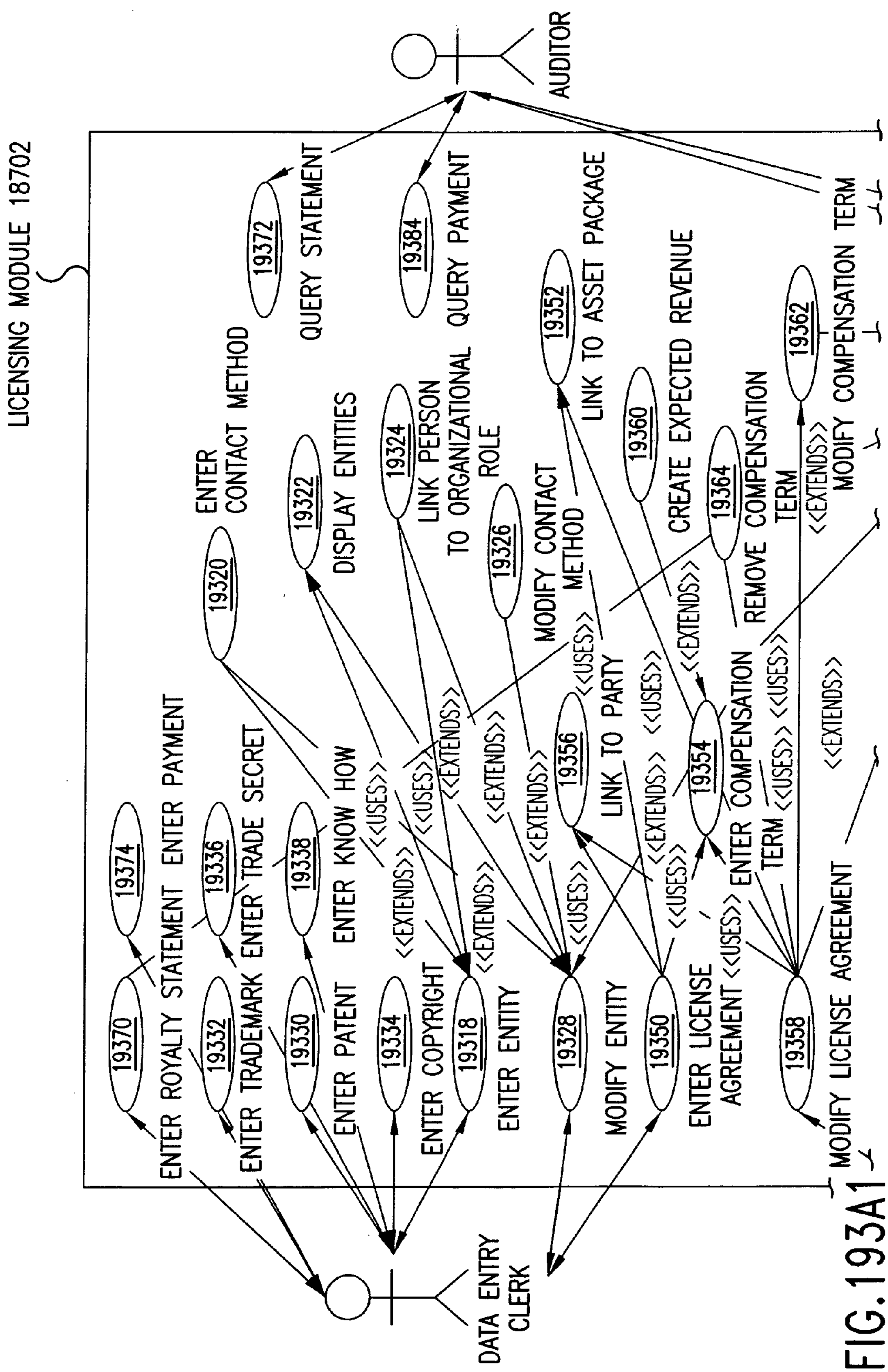
FIG.193A1

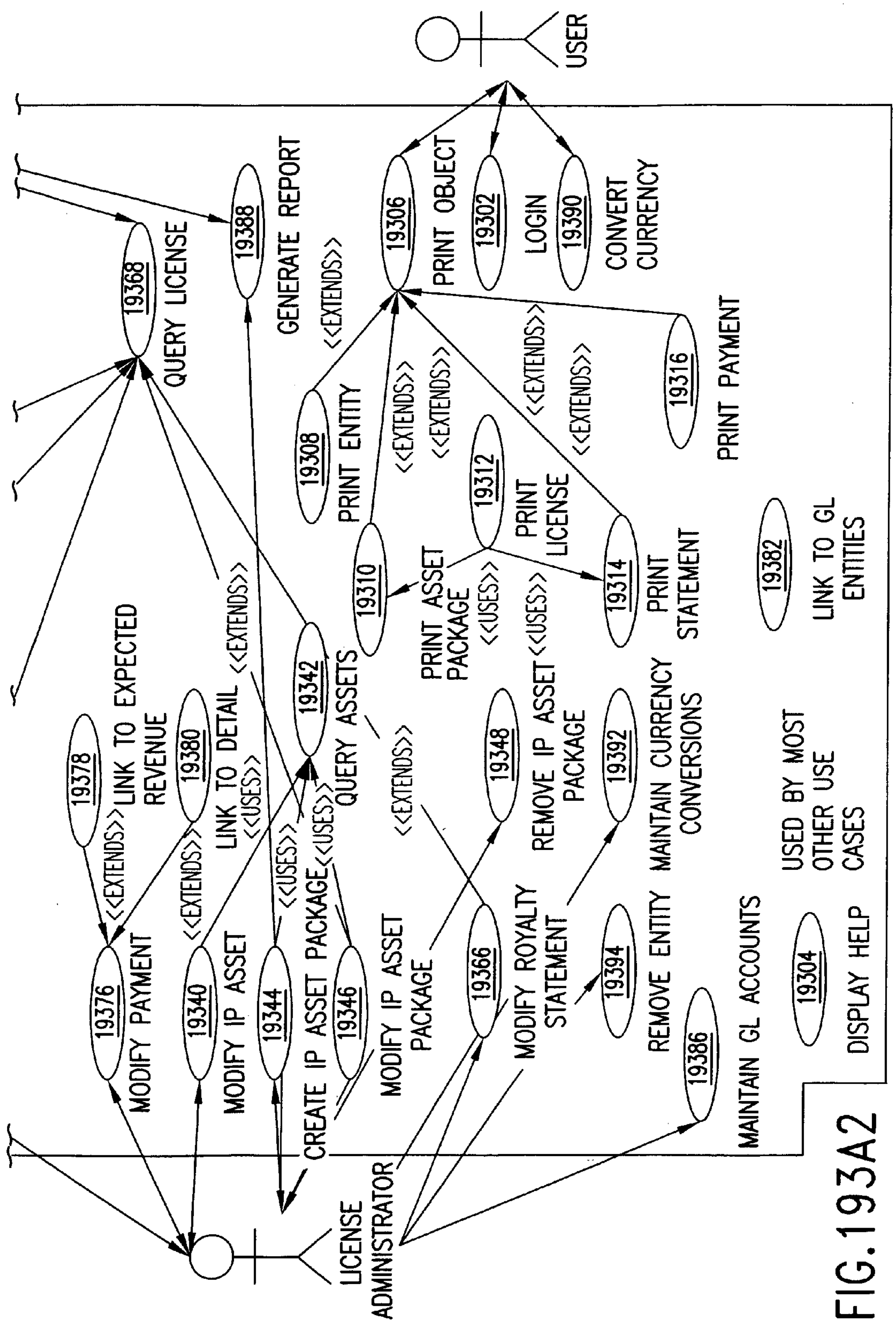
FIG.193A2

Payment Exception Report

06/10/1998

| Agreement ID Name | Effective Date | Expiration Date | Agreement Type |
|---|---|---|---|
| LA145433556 Company A USPTO 5597619 | 04/15/1996 | 04/15/2010 | License |

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 01/01/1998 | $20,000.00 | | $20,000.00 | 01/01/1998 | $20,000.00 | | $0.00 |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | $23,000.00 | | $23,000.00 | | $0.00 |

| Agreement ID Name | Effective Date | Expiration Date | Agreement Type |
|---|---|---|---|
| LA145433557 Company A EP B 560556 | 04/15/1996 | 04/15/2010 | License |

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 06/01/1998 | $15,000.00 | | $15,000.00 | 06/05/1998 | $15,000.00 | | $0.00 |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | $18,000.00 | | $18,000.00 | | $0.00 |

FIG.286A1

LA145433558 Company A Flu Mask Know How 04/15/1996 04/15/2010 License

| Payment Information | | | | Expected License Revenue | | | |
|---|---|---|---|---|---|---|---|
| Receipt Date | Payment Amt | Withheld Amt | Allocation Amt | Due Date | Expected Amt | Late Fee | Balance Amt |
| 03/20/1998 | $28,000.00 | | $28,000.00 | 03/15/1998 | $30,000.00 | | ($2,000.00) |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | **$31,000.00** | | **$33,000.00** | | **($2,000.00)** |

LA145433559 Company A Ebolus Program 04/15/1996 04/15/2010 License

| Payment Information | | | | Expected License Revenue | | | |
|---|---|---|---|---|---|---|---|
| Receipt Date | Payment Amt | Withheld Amt | Allocation Amt | Due Date | Expected Amt | Late Fee | Balance Amt |
| 06/15/1998 | $20,000.00 | | $20,000.00 | 06/15/1998 | $20,000.00 | | $0.00 |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | **$23,000.00** | | **$23,000.00** | | **$0.00** |

Payment Exception Report

06/10/1998

| Agreement ID Name | Effective Date | Expiration Date | Agreement Type |
|---|---|---|---|
| LA145433560 Company A Roche Molecular Logo | 04/15/1996 | 04/15/2010 | License |

Payment Information — Expected License Revenue

| Receipt Date | Payment Amt | Withheld Amt | Allocation Amt | Due Date | Expected Amt | Late Fee | Balance Amt |
|---|---|---|---|---|---|---|---|
| 02/01/1998 | $9,000.00 | | $9,000.00 | 01/20/1998 | $10,000.00 | | ($1,000.00) |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | **$12,000.00** | | **$13,000.00** | | **($1,000.00)** |

| Agreement ID Name | Effective Date | Expiration Date | Agreement Type |
|---|---|---|---|
| LA145433561 Company B All Patents | 04/15/1996 | 04/15/2010 | License |

Payment Information — Expected License Revenue

| Receipt Date | Payment Amt | Withheld Amt | Allocation Amt | Due Date | Expected Amt | Late Fee | Balance Amt |
|---|---|---|---|---|---|---|---|
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | **$3,000.00** | | **$3,000.00** | | **$0.00** |

FIG.286B1

LA145433562 Company C Flu Mask Know How 04/15/1996 04/15/2010 License

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 11/01/1998 | $45,000.00 | | $45,000.00 | 11/01/1998 | $45,000.00 | | $0.00 |
| 02/01/1998 | $1,000.00 | | $1,000.00 | 01/01/1998 | $1,000.00 | | $0.00 |
| 02/01/1998 | $2,000.00 | | $2,000.00 | 01/01/1998 | $1,000.00 | | $1,000.00 |
| | | | **$48,000.00** | | **$47,000.00** | | **$1,000.00** |

LA145433563 Company D Chemotherapy Tech Data 04/15/1996 04/15/2010 License

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 07/01/1998 | $50,000.00 | | $50,000.00 | 06/06/1998 | $60,000.00 | | ($10,000.00) |
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | **$53,000.00** | | **$63,000.00** | | **($10,000.00)** |

Payment Exception Report

06/10/1998

| Agreement ID Name | Effective Date | Expiration Date | Agreement Type |
|---|---|---|---|
| LA145433564 Company E USPTO 5597619 | 04/15/1996 | 04/15/2010 | License |

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 05/15/1998 | $5,000.00 | | $5,000.00 | 05/13/1998 | $5,000.00 | | $0.00 |
| 02/01/1998 | $500.00 | | $500.00 | 01/01/1998 | $1,000.00 | | ($500.00) |
| 05/01/1998 | $2,000.00 | | $2,000.00 | 04/01/1998 | $2,000.00 | | $0.00 |
| | | | $7,500.00 | | $8,000.00 | | ($500.00) |

| Agreement ID Name | Effective Date | Expiration Date | Agreement Type |
|---|---|---|---|
| LA145433565 Company F USPTO 5597619 | 04/15/1996 | 04/15/2010 | License |

Payment Information / Expected License Revenue

| Receipt Date | Payment Amt | Withheld Amt | Allocation Amt | Due Date | Expected Amt | Late Fee | Balance Amt |
|---|---|---|---|---|---|---|---|
| 02/01/1998 | $1,000.00 | | $1,000.00 | 01/01/1998 | $1,000.00 | | $0.00 |
| 05/01/1998 | $2,000.00 | | $2,000.00 | 04/01/1998 | $2,000.00 | | $0.00 |
| | | | $3,000.00 | | $3,000.00 | | $0.00 |
| Grand Total: | | | $221,500.00 | | $234,000.00 | | ($12,500.00) |

IP Asset·Agreement Financial Detail

06/10/1998

| Package ID | Package Name | Description |
|---|---|---|
| 2 | US 5597619 | |

| Agreement ID | Name | Effective Date | Expiration Date | Agreement Type |
|---|---|---|---|---|
| LA145433556 | Company A USPTO 5597619 | 04/15/1996 | 04/15/2010 | License |

| Receipt Date | Amount Allocated | Due Date | Expected Revenue |
|---|---|---|---|
| 01/01/1998 | $20,000.00 | 01/01/1998 | $20,000.00 |
| 02/01/1998 | $1,000.00 | 01/01/1998 | $1,000.00 |
| 05/01/1998 | $2,000.00 | 04/01/1998 | $2,000.00 |
| | $23,000.00 | | $23,000.00 |

| Agreement ID | Name | Effective Date | Expiration Date | Agreement Type |
|---|---|---|---|---|
| LA145433564 | Company B USPTO 5597619 | 04/15/1996 | 04/15/2010 | License |

| Receipt Date | Amount Allocated | Due Date | Expected Revenue |
|---|---|---|---|
| 05/15/1998 | $5,000.00 | 05/13/1998 | $5,000.00 |
| 02/01/1998 | $500.00 | 01/01/1998 | $1,000.00 |
| 05/01/1998 | $2,000.00 | 04/01/1998 | $2,000.00 |
| | $7,500.00 | | $8,000.00 |

FIG.287A1

| | | | | | |
|---|---|---|---|---|---|
| LA145433565 | Company C USPTO 5597619 | | 04/15/1996 | 04/15/2010 | License |
| | | Receipt Date | Amount Allocated | Due Date | Expected Revenue |
| | | 02/01/1998 | $1,000.00 | 01/01/1998 | $1,000.00 |
| | | 05/01/1998 | $2,000.00 | 04/01/1998 | $2,000.00 |
| | | | $3,000.00 | | $3,000.00 |
| | | | $33,500.00 | | $34,000.00 |
| 3 | EP B 560556 | | | | |
| Agreement ID | Name | | Effective Date | Expiration Date | Agreement Type |
| LA145433557 | Company A EP B 560556 | | 04/15/1996 | 04/15/2010 | License |
| | | Receipt Date | Amount Allocated | Due Date | Expected Revenue |
| | | 06/10/1998 | $15,000.00 | 06/05/1998 | $15,000.00 |
| | | 02/01/1998 | $1,000.00 | 01/01/1998 | $1,000.00 |
| | | 05/01/1998 | $2,000.00 | 04/01/1998 | $2,000.00 |
| | | | $18,000.00 | | $18,000.00 |
| | | | $18,000.00 | | $18,000.00 |

FIG.287A2

IP Asset-Agreement Financial Detail

06/10/1998

| Package ID | Package Name | Description |
|---|---|---|
| 4 | Influenza Sanitary Mask Know How | |

| Agreement ID | Name | Effective Date | Expiration Date | Agreement Type |
|---|---|---|---|---|
| LA145433558 | Company A Flu Mask Know How | 04/15/1996 | 04/15/2010 | License |

| Receipt Date | Amount Allocated | Due Date | Expected Revenue |
|---|---|---|---|
| 03/20/1998 | $28,000.00 | 03/15/1998 | $30,000.00 |
| 02/01/1998 | $1,000.00 | 01/01/1998 | $1,000.00 |
| 05/01/1998 | $2,000.00 | 04/01/1998 | $2,000.00 |
| | $31,000.00 | | $33,000.00 |

| Agreement ID | Name | Effective Date | Expiration Date | Agreement Type |
|---|---|---|---|---|
| LA145433562 | Company D Flu Mask Know How | 04/15/1996 | 04/15/2010 | License |

| Receipt Date | Amount Allocated | Due Date | Expected Revenue |
|---|---|---|---|
| 11/01/1998 | $45,000.00 | 11/01/1998 | $45,000.00 |
| 02/01/1998 | $1,000.00 | 01/01/1998 | $1,000.00 |
| 02/01/1998 | $2,000.00 | 01/01/1998 | $1,000.00 |
| | $48,000.00 | | $47,000.00 |
| | $79,000.00 | | $80,000.00 |

FIG.287B1

5 Anti-Ebolus Vaccine and Diagnost Test Know How

| Agreement ID | Name | Effective Date | Expiration Date | Agreement Type |
|---|---|---|---|---|
| LA145433559 | Company A Ebolus Program | 04/15/1996 | 04/15/2010 | License |

| Receipt Date | Amount Allocated | Due Date | Expected Revenue |
|---|---|---|---|
| 06/15/1998 | $20,000.00 | 06/15/1998 | $20,000.00 |
| 02/01/1998 | $1,000.00 | 01/01/1998 | $1,000.00 |
| 05/01/1998 | $2,000.00 | 04/01/1998 | $2,000.00 |
| | $23,000.00 | | $23,000.00 |
| | $23,000.00 | | $23,000.00 |

FIG.287B2

IP Asset-Agreement Financial Detail

06/10/1998

| Package ID | Package Name | Description |
|---|---|---|
| 6 | Roche Molecular Logo | |

| Agreement ID | Name | Effective Date | Expiration Date | Agreement Type |
|---|---|---|---|---|
| LA145433560 | Company A Roche Molecular Logo | 04/15/1996 | 04/15/2010 | License |

| Receipt Date | Amount Allocated | Due Date | Expected Revenue |
|---|---|---|---|
| 02/01/1998 | $9,000.00 | 01/20/1998 | $10,000.00 |
| 02/01/1998 | $1,000.00 | 01/01/1998 | $1,000.00 |
| 05/01/1998 | $2,000.00 | 04/01/1998 | $2,000.00 |
| | $12,000.00 | | $13,000.00 |
| | $12,000.00 | | $13,000.00 |

FIG.287C1

7 All Patents

| Agreement ID | Name | Effective Date | Expiration Date | Agreement Type |
|---|---|---|---|---|
| LA145433560 | Company A Roche Molecular Logo | 04/15/1996 | 04/15/2010 | License |

| Receipt Date | Amount Allocated | Due Date | Expected Revenue |
|---|---|---|---|
| 02/01/1998 | $9,000.00 | 01/20/1998 | $10,000.00 |
| 02/01/1998 | $1,000.00 | 01/01/1998 | $1,000.00 |
| 05/01/1998 | $2,000.00 | 04/01/1998 | $2,000.00 |
| | **$12,000.00** | | **$13,000.00** |

| Agreement ID | Name | Effective Date | Expiration Date | Agreement Type |
|---|---|---|---|---|
| LA145433561 | Company D All Patents | 04/15/1996 | 04/15/2010 | License |

| Receipt Date | Amount Allocated | Due Date | Expected Revenue |
|---|---|---|---|
| 02/01/1998 | $1,000.00 | 01/01/1998 | $1,000.00 |
| 05/01/1998 | $2,000.00 | 04/01/1998 | $2,000.00 |
| | $3,000.00 | | $3,000.00 |
| | $15,000.00 | | $16,000.00 |

FIG.287C2

IP Asset-Agreement Financial Detail

06/10/1998

| Package ID | Package Name | Description |
|---|---|---|
| 8 | Chemotherapy Application Know How | |

| Agreement ID | Name | Effective Date | Expiration Date | Agreement Type |
|---|---|---|---|---|
| LA145433563 | Company E Chemotherapy Tech Data | 04/15/1996 | 04/15/2010 | License |

| | Receipt Date | Amount Allocated | Due Date | Expected Revenue |
|---|---|---|---|---|
| | 07/01/1998 | $50,000.00 | 06/06/1998 | $60,000.00 |
| | 02/01/1998 | $1,000.00 | 01/01/1998 | $1,000.00 |
| | 05/01/1998 | $2,000.00 | 04/01/1998 | $2,000.00 |
| | | $53,000.00 | | $63,000.00 |
| | | $53,000.00 | | $63,000.00 |
| Grand Total: | | $233,500.00 | | $247,000.00 |

FIG.287D

06/10/1998 LICENSEE PROFILE

COMPANY E

| AGREEMENT ID | NAME | EFFECTIVE DATE | EXPIRATION DATE | AGREEMENT TYPE |
|---|---|---|---|---|
| LA145433556 | COMPANY E USPTO 5597619 | 04/15/1996 | 04/15/2010 | LICENSE |
| LA145433557 | COMPANY E EP B 560556 | 04/15/1996 | 04/15/2010 | LICENSE |
| LA145433558 | COMPANY E FLU MASK KNOW HOW | 04/15/1996 | 04/15/2010 | LICENSE |
| LA145433559 | COMPANY E EBOLUS PROGRAM | 04/15/1996 | 04/15/2010 | LICENSE |
| LA145433560 | COMPANY E ROCHE MOLECULAR LOGO | 04/15/1996 | 04/15/2010 | LICENSE |

06/10/1998 LICENSEE PROFILE

COMPANY F

| AGREEMENT ID | NAME | EFFECTIVE DATE | EXPIRATION DATE | AGREEMENT TYPE |
|---|---|---|---|---|
| LA145433561 | COMPANY F ALL PATENTS | 04/15/1996 | 04/15/2010 | LICENSE |

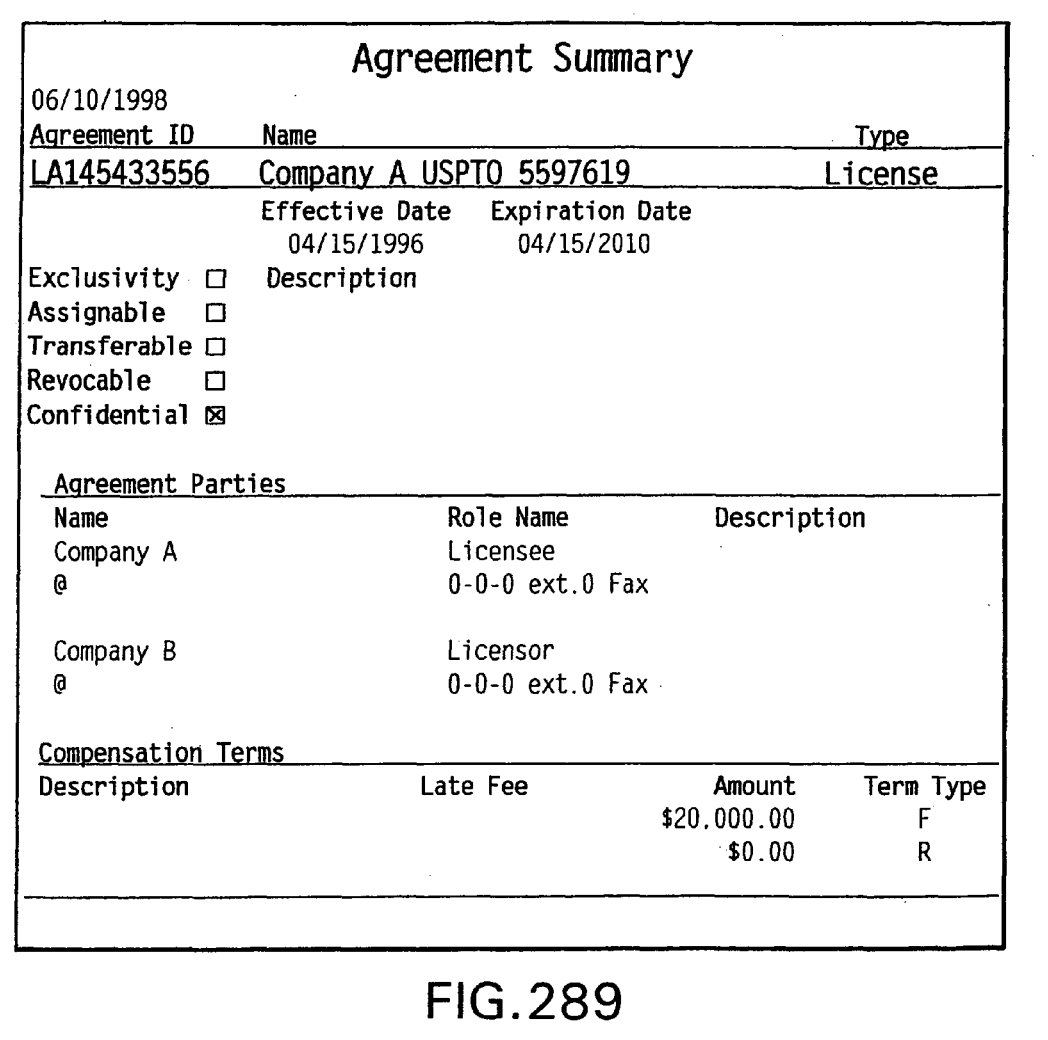

Agreement Summary

06/10/1998

| Agreement ID | Name | Type |
|---|---|---|
| LA145433556 | Company A USPTO 5597619 | License |

| Effective Date | Expiration Date |
|---|---|
| 04/15/1996 | 04/15/2010 |

- Exclusivity ☐
- Assignable ☐
- Transferable ☐
- Revocable ☐
- Confidential ☒

Description

Agreement Parties

| Name | Role Name | Description |
|---|---|---|
| Company A | Licensee | |
| @ | 0-0-0 ext.0 Fax | |
| Company B | Licensor | |
| @ | 0-0-0 ext.0 Fax | |

Compensation Terms

| Description | Late Fee | Amount | Term Type |
|---|---|---|---|
| | | $20,000.00 | F |
| | | $0.00 | R |

FIG.289

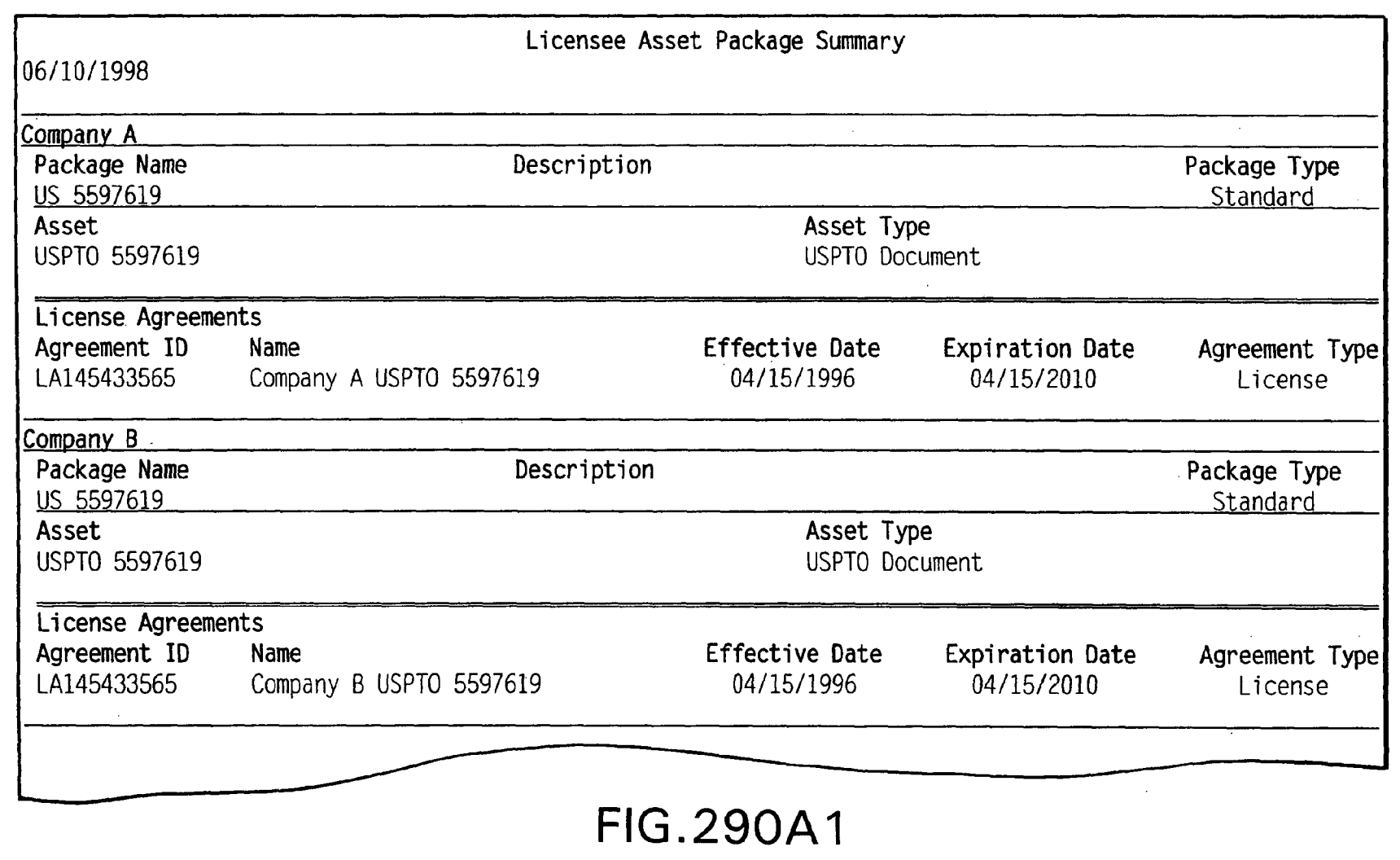

Licensee Asset Package Summary

06/10/1998

Company A

| Package Name | Description | Package Type |
|---|---|---|
| US 5597619 | | Standard |

| Asset | Asset Type |
|---|---|
| USPTO 5597619 | USPTO Document |

License Agreements

| Agreement ID | Name | Effective Date | Expiration Date | Agreement Type |
|---|---|---|---|---|
| LA145433565 | Company A USPTO 5597619 | 04/15/1996 | 04/15/2010 | License |

Company B

| Package Name | Description | Package Type |
|---|---|---|
| US 5597619 | | Standard |

| Asset | Asset Type |
|---|---|
| USPTO 5597619 | USPTO Document |

License Agreements

| Agreement ID | Name | Effective Date | Expiration Date | Agreement Type |
|---|---|---|---|---|
| LA145433565 | Company B USPTO 5597619 | 04/15/1996 | 04/15/2010 | License |

FIG.290A1

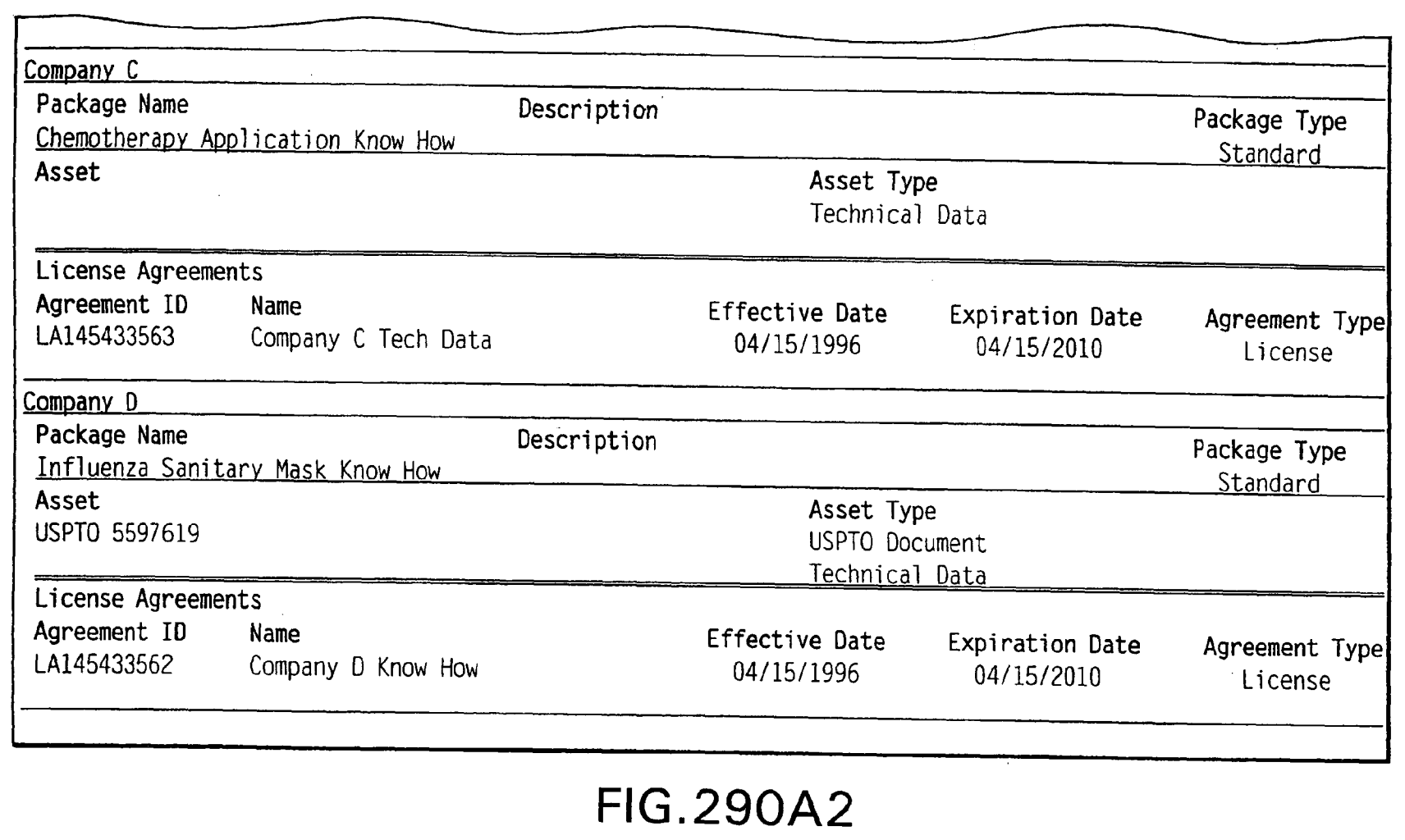

Company C

| Package Name | Description | Package Type |
|---|---|---|
| Chemotherapy Application Know How | | Standard |

| Asset | Asset Type |
|---|---|
| | Technical Data |

License Agreements

| Agreement ID | Name | Effective Date | Expiration Date | Agreement Type |
|---|---|---|---|---|
| LA145433563 | Company C Tech Data | 04/15/1996 | 04/15/2010 | License |

Company D

| Package Name | Description | Package Type |
|---|---|---|
| Influenza Sanitary Mask Know How | | Standard |

| Asset | Asset Type |
|---|---|
| USPTO 5597619 | USPTO Document<br>Technical Data |

License Agreements

| Agreement ID | Name | Effective Date | Expiration Date | Agreement Type |
|---|---|---|---|---|
| LA145433562 | Company D Know How | 04/15/1996 | 04/15/2010 | License |

FIG.290A2

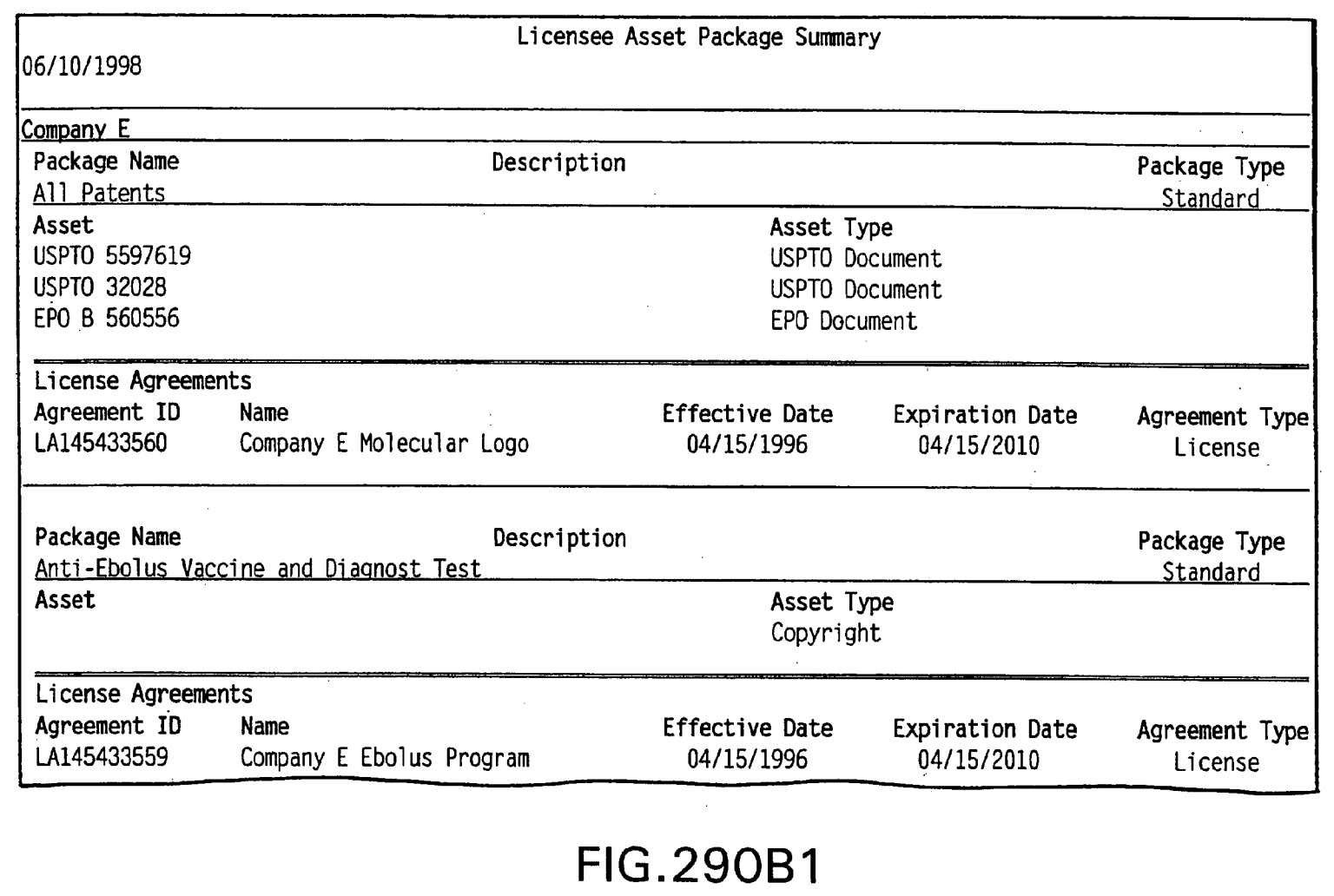

Licensee Asset Package Summary

06/10/1998

Company E

| Package Name | Description | Package Type |
|---|---|---|
| All Patents | | Standard |

| Asset | Asset Type |
|---|---|
| USPTO 5597619 | USPTO Document |
| USPTO 32028 | USPTO Document |
| EPO B 560556 | EPO Document |

License Agreements

| Agreement ID | Name | Effective Date | Expiration Date | Agreement Type |
|---|---|---|---|---|
| LA145433560 | Company E Molecular Logo | 04/15/1996 | 04/15/2010 | License |

| Package Name | Description | Package Type |
|---|---|---|
| Anti-Ebolus Vaccine and Diagnost Test | | Standard |

| Asset | Asset Type |
|---|---|
| | Copyright |

License Agreements

| Agreement ID | Name | Effective Date | Expiration Date | Agreement Type |
|---|---|---|---|---|
| LA145433559 | Company E Ebolus Program | 04/15/1996 | 04/15/2010 | License |

FIG.290B1

| Package Name | Description | Package Type |
|---|---|---|
| EP B 560556 | | Standard |

| Asset | Asset Type |
|---|---|
| EPO B 560556 | EPO Document |

License Agreements

| Agreement ID | Name | Effective Date | Expiration Date | Agreement Type |
|---|---|---|---|---|
| LA145433557 | Company E EP B 560556 | 04/15/1996 | 04/15/2010 | License |

| Package Name | Description | Package Type |
|---|---|---|
| Influenza Sanitary Mask Know How | | Standard |

| Asset | Asset Type |
|---|---|
| USPTO 5597619 | USPTO Document<br>Technical Data |

License Agreements

| Agreement ID | Name | Effective Date | Expiration Date | Agreement Type |
|---|---|---|---|---|
| LA145433558 | Company E Flu Mask Know How | 04/15/1996 | 04/15/2010 | License |

FIG.290B2

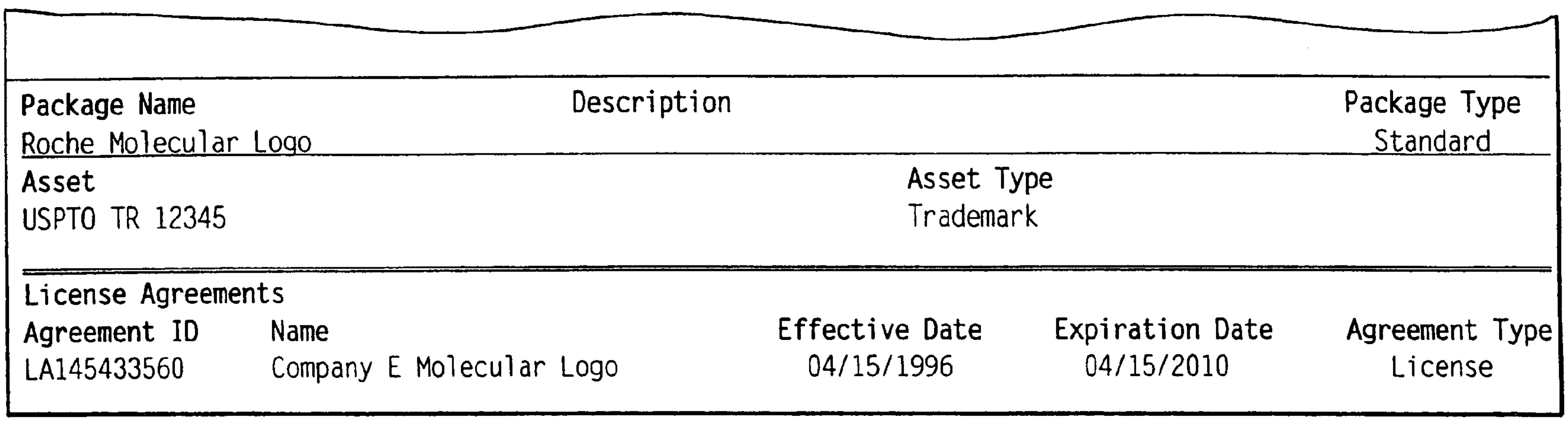
FIG.290B3

Payment Allocation Report

06/10/1998

| Agreement ID | Name | Effective Date | Expiration Date | Agreement Type |
|---|---|---|---|---|
| LA145433556 | Company A USPTO 5597619 | 04/15/1996 | 04/15/2010 | License |

| Payment ID | Invoice Number | Receipt Date | Payment Amount | License Allocation Amt |
|---|---|---|---|---|
| 1 | | 01/01/1998 | $20,000.00 | $20,000.00 |

| Package Name | Description |
|---|---|
| US 5597619 | |

| Asset | Allocation Percent | Asset Allocation Amount |
|---|---|---|
| USPTO 5597619 | 100% | $20,000.00 |

| Payment ID | Invoice Number | Receipt Date | Payment Amount | License Allocation Amt |
|---|---|---|---|---|
| 9 | | 02/01/1998 | $1,000.00 | $1,000.00 |

| Package Name | Description |
|---|---|
| US 5597619 | |

| Asset | Allocation Percent | Asset Allocation Amount |
|---|---|---|
| USPTO 5597619 | 100% | $1,000.00 |

| Payment ID | Invoice Number | Receipt Date | Payment Amount | License Allocation Amt |
|---|---|---|---|---|
| 10 | | 05/01/1998 | $2,000.00 | $2,000.00 |

| Package Name | Description |
|---|---|
| US 5597619 | |

| Asset | Allocation Percent | Asset Allocation Amount |
|---|---|---|
| USPTO 5597619 | 100% | $2,000.00 |

Agreement Total $23,000.00

FIG.291A

Payment Allocation Report

06/10/1998

| Agreement ID | Name | Effective Date | Expiration Date | Agreement Type |
|---|---|---|---|---|
| LA145433557 | Company A EP B 560556 | 04/15/1996 | 04/15/2010 | License |

| Payment ID | Invoice Number | Receipt Date | Payment Amount | License Allocation Amt |
|---|---|---|---|---|
| 2 | | 06/10/1998 | $15,000.00 | $15,000.00 |

| Package Name | Description |
|---|---|
| EP B 560556 | |

| Asset | Allocation Percent | Asset Allocation Amount |
|---|---|---|
| EPO B 560556 | 100% | $15,000.00 |

| Payment ID | Invoice Number | Receipt Date | Payment Amount | License Allocation Amt |
|---|---|---|---|---|
| 11 | | 02/01/1998 | $1,000.00 | $1,000.00 |

| Package Name | Description |
|---|---|
| EP B 560556 | |

| Asset | Allocation Percent | Asset Allocation Amount |
|---|---|---|
| EPO B 560556 | 100% | $1,000.00 |

| Payment ID | Invoice Number | Receipt Date | Payment Amount | License Allocation Amt |
|---|---|---|---|---|
| 12 | | 05/01/1998 | $2,000.00 | $2,000.00 |

| Package Name | Description |
|---|---|
| EP B 560556 | |

| Asset | Allocation Percent | Asset Allocation Amount |
|---|---|---|
| EPO B 560556 | 100% | $2,000.00 |

Agreement Total $18,000.00

FIG.291B

Payment Allocation Report

06/10/1998

| Agreement ID | Name | Effective Date | Expiration Date | Agreement Type |
|---|---|---|---|---|
| LA145433558 | Company A Flu Mask Know How | 04/15/1996 | 04/15/2010 | License |

| Payment ID | Invoice Number | Receipt Date | Payment Amount | License Allocation Amt |
|---|---|---|---|---|
| 3 | | 03/20/1998 | $28,000.00 | $28,000.00 |

| Package Name | Description |
|---|---|
| Influenza Sanitary Mask Know How | |

| Asset | Allocation Percent | Asset Allocation Amount |
|---|---|---|
| USPTO 5597619 | 75% | $21,000.00 |
| | 25% | $7,000.00 |

| Payment ID | Invoice Number | Receipt Date | Payment Amount | License Allocation Amt |
|---|---|---|---|---|
| 13 | | 02/01/1998 | $1,000.00 | $1,000.00 |

| Package Name | Description |
|---|---|
| Influenza Sanitary Mask Know How | |

| Asset | Allocation Percent | Asset Allocation Amount |
|---|---|---|
| USPTO 5597619 | 75% | $750.00 |
| | 25% | $250.00 |

| Payment ID | Invoice Number | Receipt Date | Payment Amount | License Allocation Amt |
|---|---|---|---|---|
| 14 | | 05/01/1998 | $2,000.00 | $2,000.00 |

| Package Name | Description |
|---|---|
| Influenza Sanitary Mask Know How | |

| Asset | Allocation Percent | Asset Allocation Amount |
|---|---|---|
| USPTO 5597619 | 75% | $1,500.00 |
| | 25% | $500.00 |

Agreement Total $31,000.00

FIG.291C

Royalty Statement Summary

06/10/1998

| Agreement ID | Name | Effective Date | Expiration Date | Agreement Type |
|---|---|---|---|---|
| LA145433556 | Company A USPTO 5597619 | 04/15/1996 | 04/15/2010 | License |

| Reporting Period | Invoice Number | Due Date | Receipt Date | Investigation Window |
|---|---|---|---|---|
| 2 | | 01/01/1998 | 02/01/1998 | |

| Line Number | Name | Units Sold | Revenue | Royalty Due |
|---|---|---|---|---|
| 1 | Sanitary Mask | 10 | $8,000.00 | $400.00 |
| 2 | Mask Filer | 15 | $12,000.00 | $600.00 |
| | | | $20,000.00 | $1,000.00 |

| Reporting Period | Invoice Number | Due Date | Receipt Date | Investigation Window |
|---|---|---|---|---|
| 3 | | 04/01/1998 | 05/01/1998 | |

| Line Number | Name | Units Sold | Revenue | Royalty Due |
|---|---|---|---|---|
| 1 | Sanitary Mask | 10 | $16,000.00 | $800.00 |
| 2 | Mask Filer | 15 | $24,000.00 | $1,200.00 |
| | | | $40,000.00 | $2,000.00 |
| Agreement Total | | | $60,000.00 | $3,000.00 |

FIG.292A

| Agreement ID | Name | Effective Date | Expiration Date | Agreement Type |
|---|---|---|---|---|
| LA145433557 | Company A EP B 560556 | 04/15/1996 | 04/15/2010 | License |

| Reporting Period | Invoice Number | Due Date | Receipt Date | Investigation Window |
|---|---|---|---|---|
| 4 | | 01/01/1998 | 01/03/1998 | |

| Line Number | Name | Units Sold | Revenue | Royalty Due |
|---|---|---|---|---|
| 1 | Sanitary Mask | 10 | $10,000.00 | $500.00 |
| 2 | Mask Filer | 15 | $10,000.00 | $500.00 |
| | | | $20,000.00 | $1,000.00 |

| Reporting Period | Invoice Number | Due Date | Receipt Date | Investigation Window |
|---|---|---|---|---|
| 5 | | 04/01/1998 | 04/05/1998 | |

| Line Number | Name | Units Sold | Revenue | Royalty Due |
|---|---|---|---|---|
| 1 | Sanitary Mask | 10 | $16,000.00 | $800.00 |
| 2 | Mask Filer | 15 | $24,000.00 | $1,200.00 |
| | | | $40,000.00 | $2,000.00 |
| Agreement Total | | | $60,000.00 | $3,000.00 |

FIG.292B

IP Asset-Historical Royalties

06/10/1998

| Package ID | Package Name | Description |
|---|---|---|
| 2 | US 5597619 | |

Asset Name

USPTO 5597619

| Agreement ID | Name | Effective Date | Expiration Date | Agreement Type |
|---|---|---|---|---|
| LA145433556 | Company A USPTO 5597619 | 04/15/1996 | 04/15/2010 | License |

| Receipt Date | License Allocation | Asset Allocation | Running Total |
|---|---|---|---|
| 01/01/1998 | $20,000.00 | $20,000.00 | $20,000.00 |
| 02/01/1998 | $1,000.00 | $1,000.00 | $21,000.00 |
| 05/01/1998 | $2,000.00 | $2,000.00 | $23,000.00 |
| | $23,000.00 | $23,000.00 | |

| Agreement ID | Name | Effective Date | Expiration Date | Agreement Type |
|---|---|---|---|---|
| LA145433564 | Company B USPTO 5597619 | 04/15/1996 | 04/15/2010 | License |

| Receipt Date | License Allocation | Asset Allocation | Running Total |
|---|---|---|---|
| 05/15/1998 | $5,000.00 | $5,000.00 | $5,000.00 |
| 02/01/1998 | $500.00 | $500.00 | $5,500.00 |
| 05/01/1998 | $2,000.00 | $2,000.00 | $7,500.00 |
| | $7,500.00 | $7,500.00 | |

FIG.293A

LA145433565 Company C USPTO 5597619 04/15/1996 04/15/2010 License

| Receipt Date | License Allocation | Asset Allocation | Running Total |
|---|---|---|---|
| 02/01/1998 | $1,000.00 | $1,000.00 | $1,000.00 |
| 05/01/1998 | $2,000.00 | $2,000.00 | $3,000.00 |
| | $3,000.00 | $3,000.00 | |
| | $33,500.00 | $33,500.00 | |

FIG.293B

SYSTEM, METHOD, AND COMPUTER PROGRAM PRODUCT FOR MANAGING AND ANALYZING INTELLECTUAL PROPERTY (IP) RELATED TRANSACTIONS

CROSS REFERENCE TO RELATED APPLICATIONS

U.S. application Ser. No. 09/545,608, filed Apr. 7, 2000 is a continuation-in-part of U.S. application Ser. No. 08/921,369, filed Aug. 29, 1997, now U.S. Pat. No. 6,339,767, issued Jan. 15, 2002, which is a continuation-in-part of U.S. application Ser. No. 08/867,392, filed Jun. 2, 1997, now U.S. Pat. No. 5,991,751, issued Nov. 23, 1999, each of which is incorporated herein by reference in its entirety.

U.S. application Ser. No. 09/545,608, filed Apr. 7, 2000, is a continuation-in-part of U.S. application Ser. No. 09/138,368, filed Aug. 21, 1998, now abandoned, which is a continuation-in-part of U.S. application Ser. No. 08/921,369, filed Aug. 29, 1997, now U.S. Pat. No. 6,339,767, issued Jan. 15, 2002, each of which is incorporated herein by reference in its entirety.

U.S. application Ser. No. 09/545,608, filed Apr. 7, 2000, is a continuation-in-part of U.S. application Ser. No. 09/260,079, filed Mar. 2, 1999, now abandoned, which is a continuation-in-part of U.S. application Ser. No. 09/138,368, filed Aug. 21, 1998, now abandoned, which is a continuation-in-part of U.S. application Ser. No. 08/921,369, filed Aug. 29, 1997, now U.S. Pat. No. 6,339,767, issued Jan. 15, 2002, each of which is incorporated herein by reference in its entirety.

U.S. application Ser. No. 09/545,608, filed Apr. 7, 2000, is a continuation-in-part of U.S. application Ser. No. 09/057,557, filed Apr. 9, 1998, now U.S. Pat. No. 6,389,434, issued May 14, 2002, which is a continuation of U.S. application Ser. No. 08/632,801, filed Apr. 17, 1996, now U.S. Pat. No. 5,806,079, issued Sep. 8, 1998, which is a continuation-in-part of U.S. application Ser. No. 08/423,676, filed Apr. 18, 1995, now U.S. Pat. No. 5,623,679, issued Apr. 22, 1997, which is continuation-in-part of U.S. application Ser. No. 08/341,129, filed Nov. 18, 1994, now abandoned, which is a continuation-in-part of U.S. application Ser. No. 08/155,752, filed Nov. 19, 1993, now U.S. Pat. No. 5,623,681, issued Apr. 22, 1997, each of which is incorporated by reference herein in its entirety.

The present application is related to the following applications and patents, each of which is incorporated herein by reference in its entirety: U.S. application Ser. No. 08/832,971, filed Apr. 4, 1997, now U.S. Pat. No. 5,809,318, issued Sep. 15, 1998; U.S. application Ser. No. 09/058,275, filed Apr. 10, 1998, now U.S. Pat. No. 5,950,214, issued Sep. 7, 1999; U.S. application Ser. No. 08/590,082, filed Jan. 23, 1996, now U.S. Pat. No. 5,754,840, issued May 19, 1998; and U.S. application Ser. No. 08/662,377, filed Jun. 12, 1996, now U.S. Pat. No. 5,799,325, issued Aug. 25, 1998.

This application is a continuation of U.S. application Ser. No. 11/178,367, filed Jul. 12, 2005, now U.S. Pat. No. 7,437,471, issued Oct. 14, 2008, which is a continuation of U.S. application Ser. No. 09/545,608, filed Apr. 7, 2000, now U.S. Pat. No. 6,963,920, issued Nov. 8, 2005, which is a non-provisional of Provisional Application No. 60/128,405, filed Apr. 8, 1999, each of which is incorporated herein by reference in its entirety.

BACKGROUND OF THE INVENTION

1. Field of the Invention

The present invention is generally related to tools for data processing, and more particularly related to tools for patent-centric and group-oriented data processing. These tools comprise diverse capabilities for data presentation and processing, including data presentation and processing using hyperbolic trees. The tools include modules to track and process IP related transactions, such as license agreements.

2. Related Art

Patents are becoming more and more important to a business's success, especially in today's global economy. Patents can be viewed as a new type of currency in this global economy because they grant the holder with a right to exclude others from making, using, or selling the patented technology. In some industries, product turnover is fairly rapid. However, core technology, product features, and markets change at a much slower rate. Accordingly, even in fast-moving industries, patents which cover core technology are very valuable at protecting a company's research and development investment for an extended period of time.

Patents are also valuable as revenue generators. In 1993, for example, the revenue generated from patents by U.S. companies was over $60 billion. Fred Warshofsky, *The Patent Wars*, John Wiley & Sons, Inc., New York, 1994. These patent revenue dollars are rising each year.

Patents are further valuable because they collectively represent a vast technological database. Much of this database is only available as issued patents (i.e., it is not released in any other form). According to Larry Kahaner's book, *Competitive Intelligence*, Simon & Schuster, 1996, "More than 75 percent of the information contained in U.S. patents is never released anywhere else."

If corporations searched this database before developing and releasing new products they might be able to avoid costly patent infringement litigation. Often, however, corporations do not conduct such patent searches. One significant reason for this is the difficulty in identifying relevant patents, and the difficulty in analyzing patents. Computerized search tools are becoming available to the public, such as web sites on the Internet, that can be used to conduct patent searches. Many companies and practitioners are reluctant to use such tools, however, due to the concern that their highly sensitive patent searches will not be maintained in confidence when using such tools.

More and more corporations are recognizing the value of patents. The number of patents applied for and issued to U.S. companies is increasing every year, especially in fast moving industries such as computer software and biotechnology. Many international companies have also recognized the value of patents. In fact, foreign companies regularly rank among the leaders in issued U.S. patents.

Of course, not all patents are as valuable to the patent owner or patent licensees as others. Some owned or licensed patents provide little or no value to the corporate entity. These patents become a drain on corporate resources, both in obtaining the patents, paying maintenance fees, and paying license fees. It is difficult for corporations to assess the value of their patents because automated tools for patent analysis do not exist.

Yet, for all the heightened awareness being paid to patents in some quarters, patents remain one of the most underutilized assets in a company's portfolio. This is due, at least in significant part, to the fact that patent analysis, whether for purposes of licensing, infringement, enforcement, freedom to operate, technical research, product development, etc., is a very difficult, tedious, time consuming, and expensive task, particularly when performed with paper copies of patents.

Software providers have been slow in developing software tools for aiding in the patent analysis process. As a result, there are few automated tools for patent analysis currently available. There are software tools available for managing corporate patent prosecution and payment of maintenance fees, such as products from Master Data Corporation. The patent analysis capabilities of these tools are limited. These tools, for example, cannot be used to facilitate the analysis and development of business strategies to increase corporate shareholder value through the strategic and tactical use of patents.

A number of patent searching tools are available, such as the United States Patent and Trademark Office (USPTO) Automated Patent System (APS), and the on-line search services offered by Lexis and Westlaw. Other providers of patent information and patent search tools include Derwent, MicroPatent, Questel, Corporate Intelligence, STN, IFI/Plenum, The Shadow Patent Office (EDS), IBM, and CAS. These tools are not analysis tools. Instead, they are search tools. These tools enable a user to identify patents that satisfy a specified key word search criteria. In essence, these tools provide the user with the ability to possibly find "the needle-in-the-haystack." However, these tools have limited, if any, automated functions to aid a user in analyzing the patents, whether the company's own patents or those of competitors, for the purpose of making tactical and strategic business decisions based on the patents.

SmartPatents Inc. (SPI) of Mountain View, Calif., provides electronic tools for analyzing patents. These tools, collectively called the SmartPatent Workbench, are very useful for analyzing patents. With the SmartPatent Workbench, a user can view the text and image of a patent, conduct text searches in the patent, copy and paste portions of the patent to other documents, build a case of patents, annotate the case and the patents in the case, import and export patents and cases, etc. The SmartPatent Workbench is commercially available from SPI, and is described in a number of publicly available documents, such as U.S. Pat. No. 5,623,679 and U.S. Pat. No. 5,623,681, incorporated by reference herein.

The SmartPatent Workbench is a patent analysis tool. The SmartPatent Workbench is primarily designed to assist a user in working with a single patent or a small collection of patents at a time. However, there are many instances when it would be very beneficial to be able to automatically and simultaneously analyze, correlate, or otherwise process multiple patents.

For example, in some instances it would be beneficial to automatically analyze the inventorship of a collection of patents. More particularly, it would be beneficial to identify the persons who are named most frequently on a collection of patents. It would be very useful if this task could be performed automatically. However, no existing software tools can perform this task automatically.

For the most part, existing patent-related tools can process only the information contained in patents. (It is noted, however, that the SmartPatent Workbench has functions to annotate patents with any information, whether or not patent related, and has additional functions to search within annotations.) These tools do not have functions for correlating, analyzing, and otherwise processing patent-related information with non-patent related information, including but not limited to corporate operational data, financial information, production information, human resources information, and other types of corporate information. Such non-patent information is critically important when evaluating the full strategic and tactical value and applicability of any given patent, or developing a corporate patent business strategy for gaining competitive advantage and increasing shareholder value based on patents.

Consider, for example, FIG. 1. A typical corporation 102 includes a research and development (R&D) department 104, a finance department 112, a manufacturing department 108, and a legal department 116 (that includes a licensing department 122 and a patent department 124). In the course of performing their respective duties, these departments generate, collect, and maintain information, such as R&D information 106, financial information 114, manufacturing information 110 (such as bill of material information), licensing information 118, and patent information 120 (that includes the patents obtained by the company, and perhaps patents obtained by competitors).

A business analyst 126 may be assigned the job of evaluating the value of the corporation's patent portfolio (represented as part of the patent information 120). In order to fully and accurately analyze the value and applicability of the corporation's patent portfolio, the analyst 126 should ideally take into account non-patent information, such as R&D information 106, financial information 114, manufacturing information 110, and licensing information 118.

For example, a patent's value may be linked to whether it covers technology that the corporation is currently using, or that the corporation may use in the future. Thus, an analysis of the patent should include an analysis of and correlation with manufacturing information 110 and R&D information 106. Also, a patent's value may be linked to whether it has generated licensing revenue. Thus, an analysis of the patent should include an analysis of and correlation with licensing information 118. Further, a patent's value may be linked to the degree of success of the corporation's commercial products that correspond to the patent (i.e., the commercial embodiments of the patented technology). Thus, an analysis of the patent should include an analysis of and correlation with financial information 114.

The processing described above, however, is usually not done (or it is done in an ad hoc, unorganized, incomplete, inefficient, and/or ineffective manner) because it is difficult or, in many cases, impossible to manually collect, organize, correlate, and process all of the information pertinent to the patents under study. Often times, it is a difficult or even impossible task to simply identify the relevant patents. Accordingly, it would be very beneficial to have automated tools that automatically process patent-related information and non-patent related information for making corporate business decisions. Existing patent-related tools do not have this capability.

SUMMARY OF THE INVENTION

Briefly stated, the present invention is directed to a system, method, and computer program product for processing data. The present invention maintains first databases of patents, and second databases of non-patent information of interest to a corporate entity.

The present invention also maintains one or more groups. Each of the groups comprises any number of patents from the first databases. The present invention, upon receiving appropriate operator commands, automatically processes the patents in one or more of the groups in conjunction with non-patent information from the second databases. Accordingly, the present invention performs patent-centric and group-oriented processing of data.

A group can also include any number of non-patent documents.

The groups may be defined by the business practices of the corporation and could include groupings that are product based, person based, corporate entity based, or user-defined. Other types of groups also fall within the scope of the invention. For example, the invention supports temporary groups that are automatically generated in the course of the automatic processing performed by the invention.

The processing automatically performed by the invention relates to (but is a not limited to) patent mapping, document mapping, document/patent citation (both forward and backward), document/patent aging, patent bracketing/clustering (both forward and backward), inventor patent count, inventor employment information, and finance. Other functions also fall within the scope of the invention.

The present invention includes the ability to display data in a wide range of formats, including the ability to display and process data using hyperbolic trees.

The present invention includes the ability to track, analyze, and report on information related to intellectual property (IP) transactions, including license and related agreements.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 13-17 illustrate example document databases;

FIGS. 19-21 illustrates example group tables;

FIGS. 24-26 illustrate example BOM groups;

FIGS. 27-31 illustrate example security tables;

FIGS. 33-36 illustrate example corporate entity databases;

FIG. 37 illustrates an example person table;

FIG. 38 illustrates an example employee table;

FIG. 39 illustrates an example validated inventor table;

FIGS. 40-43, 44A and 44B illustrate example patents used to describe the patent bibliographic databases;

FIGS. 53-57 illustrate example user interface display formats pertinent to the searching features of the present invention;

FIGS. 59-60 are examples of patent mapping display formats;

FIGS. 61-65 are examples of patent citation report display formats;

FIGS. 66-70 are examples of patent aging display formats;

FIGS. 74-77 are examples of inventor patent count display formats;

FIGS. 78-80 are examples of employment information display formats;

FIG. 125 is an example screen shot for creating a document note;

FIGS. 141-143 illustrate example Search Result screens according to an embodiment of the invention;

FIG. 144 illustrates an example display screen that shows bibliographic and abstract information on a document that is not stored in the repository;

FIGS. 145A, 145B, and 145C illustrate an example display screen that shows information on a document that is stored in the repository;

FIG. 146 illustrates an example display screen used to illustrate the hyperlinking capabilities of the present invention;

FIG. 147 illustrates an example “Patents In Repository” screen;

FIGS. 174 and 175 are additional patent citation visualizations according to embodiments of the invention;

FIG. 176 is a flowchart representing additional operation related to the patent citation tree function;

FIGS. 177 and 178 illustrate example hyperbolic trees;

FIG. 179 represents the mapping from a graph to a tree;

FIG. 180 represents an example parent/child table;

FIG. 181 illustrates a citation analysis graph corresponding to the patent/child table of FIG. 180;

FIG. 182 illustrates an example patent bibliographic information table;

FIG. 183 illustrates an example tree corresponding to the citation analysis graph of FIG. 181;

FIG. 184 illustrates an example claims dependency graph;

FIG. 185 illustrates an example claims dependency tree corresponding to the claims dependency graph of FIG. 184;

FIG. 186 illustrates a web client in greater detail;

FIG. 187A illustrates a block diagram of a licensing module;

Figure 187A:
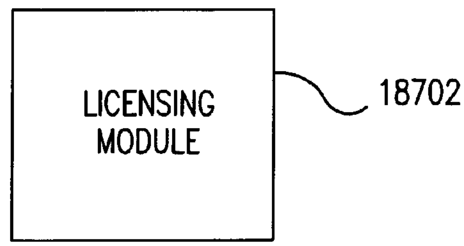
Figure 188:
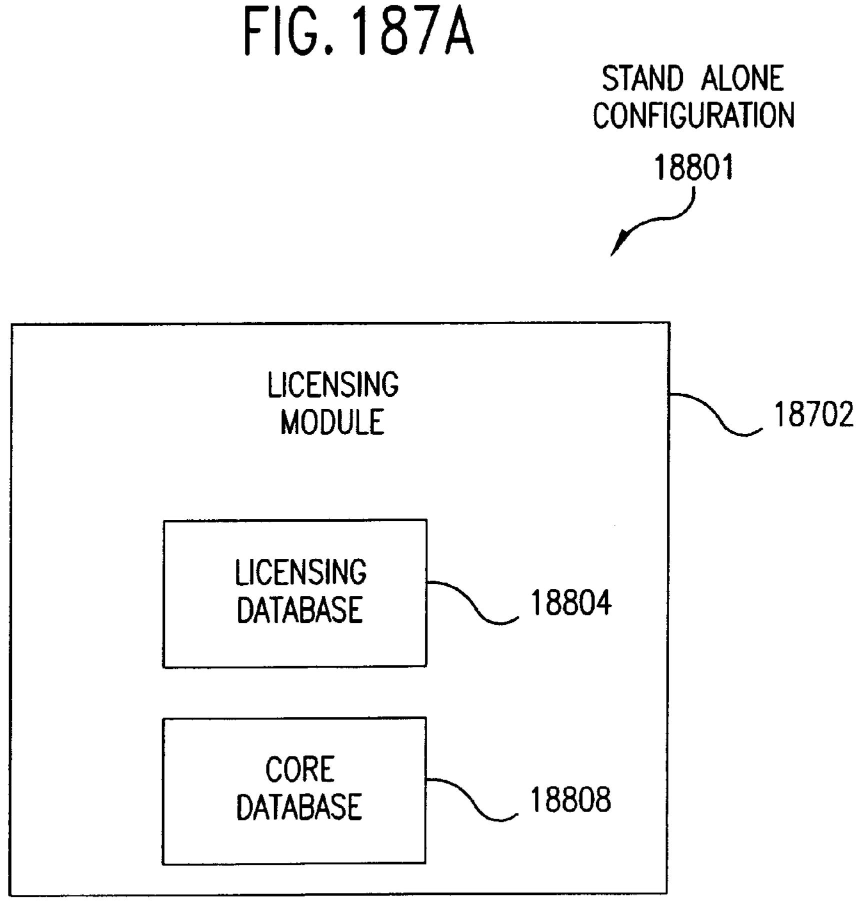
Figure 187B:
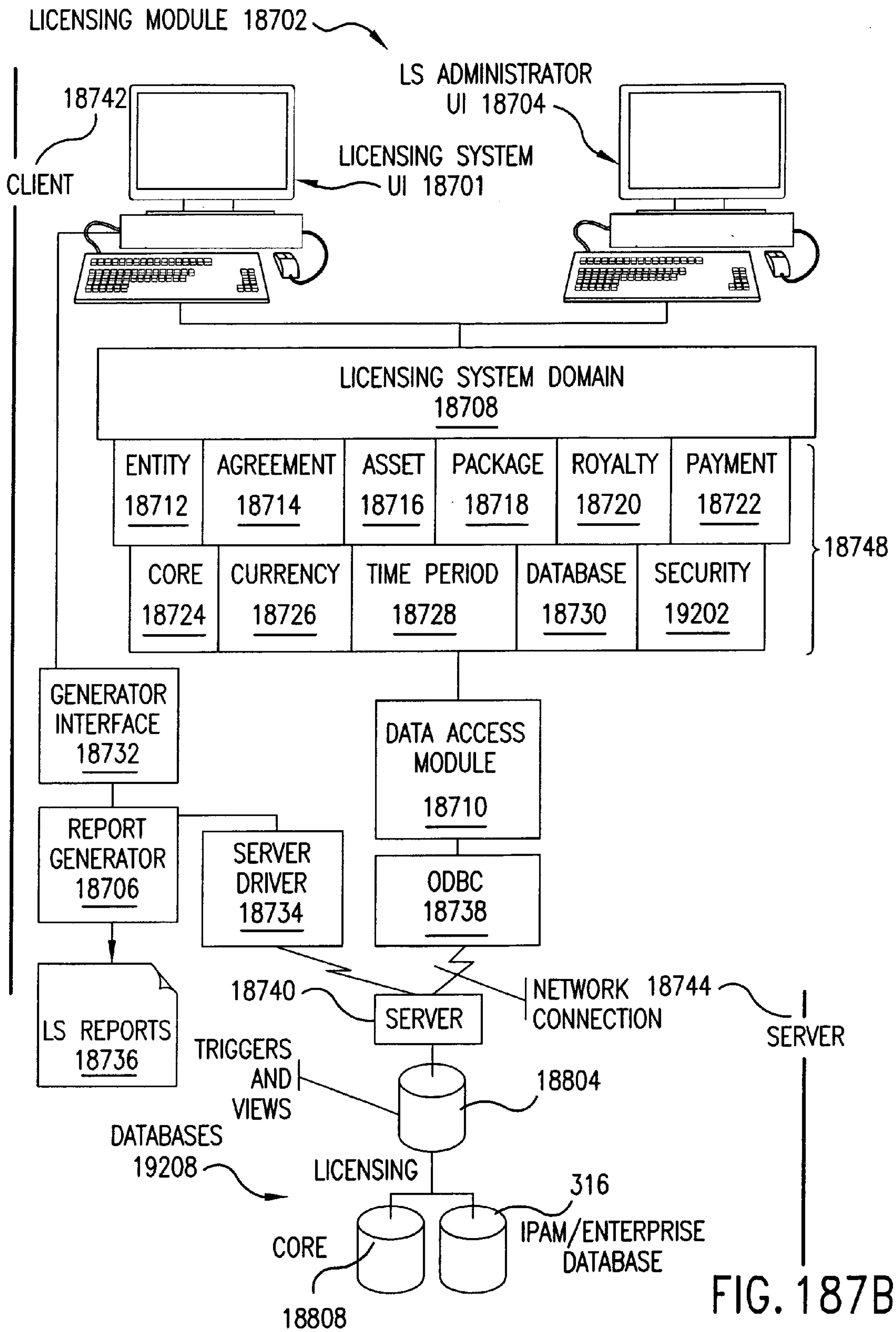
Figure 189:
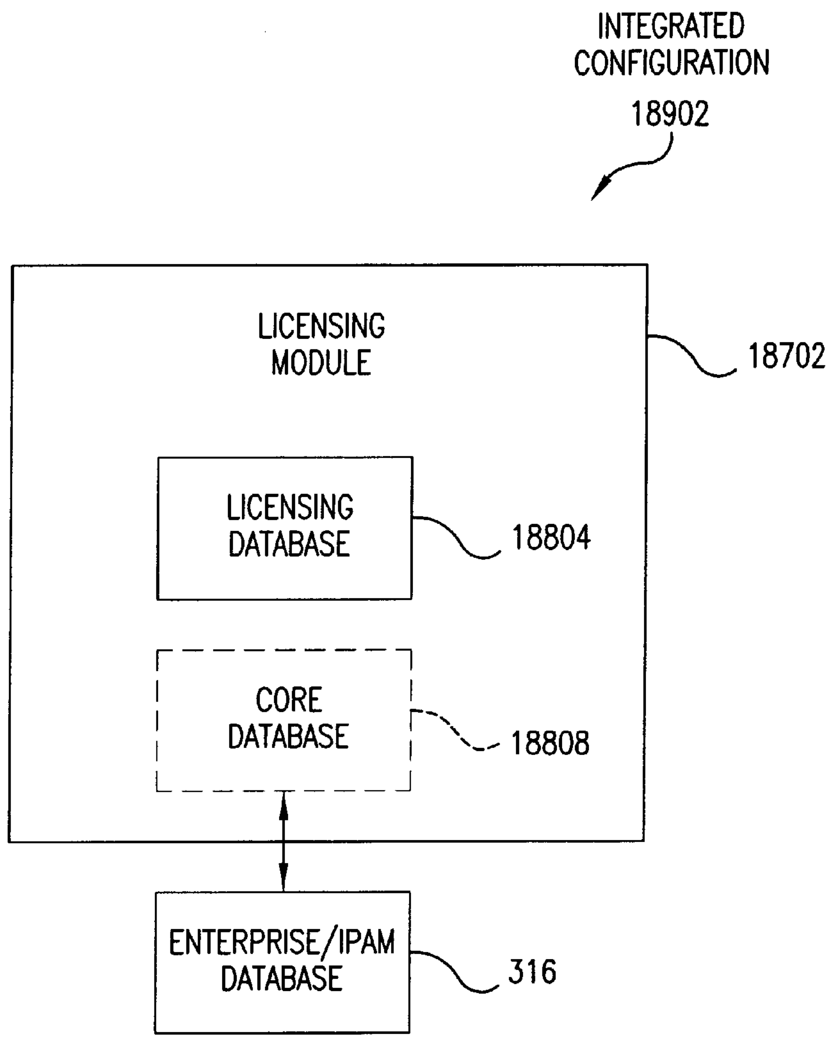
Figure 190:
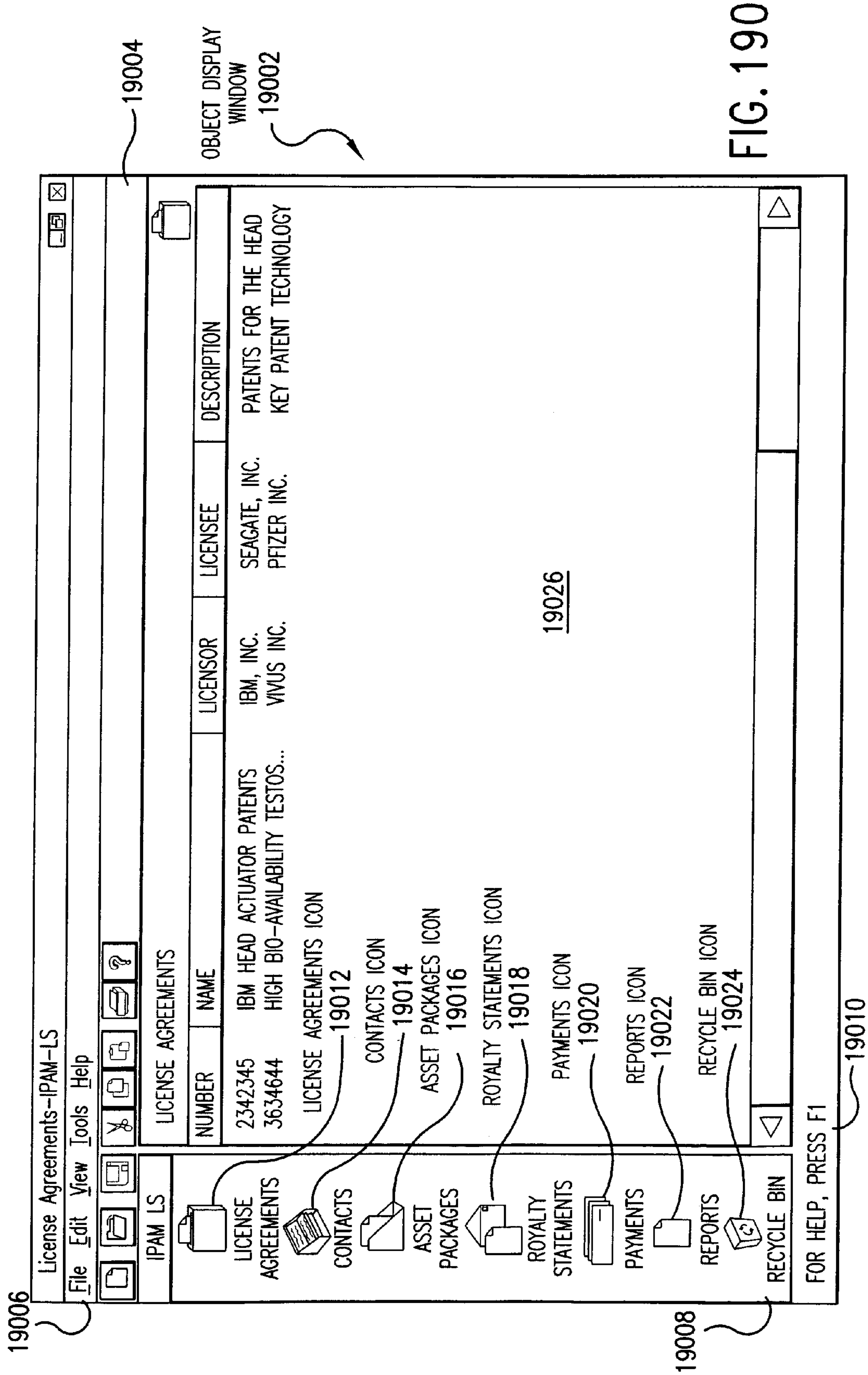
Figure 191:
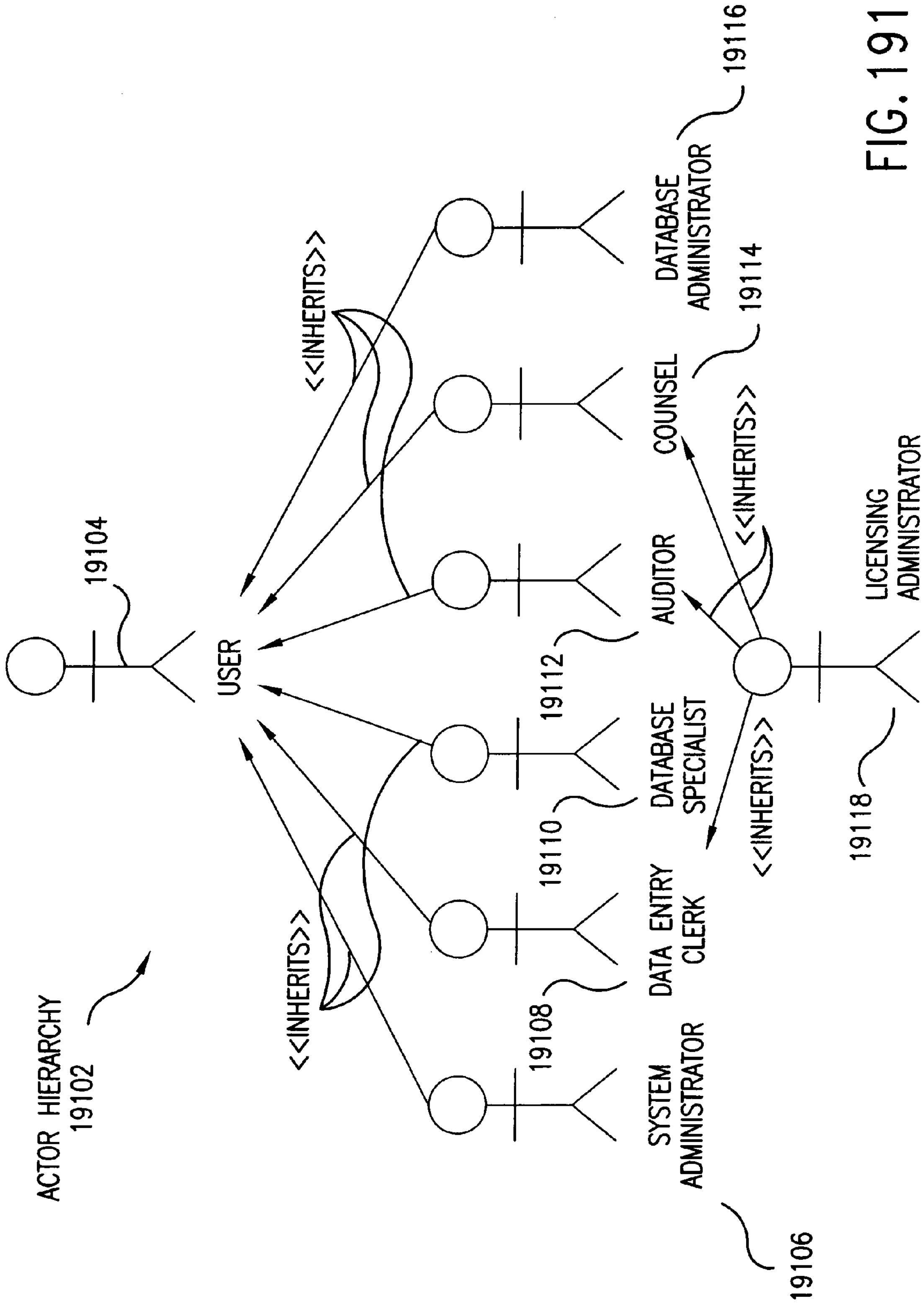
Figure 192:
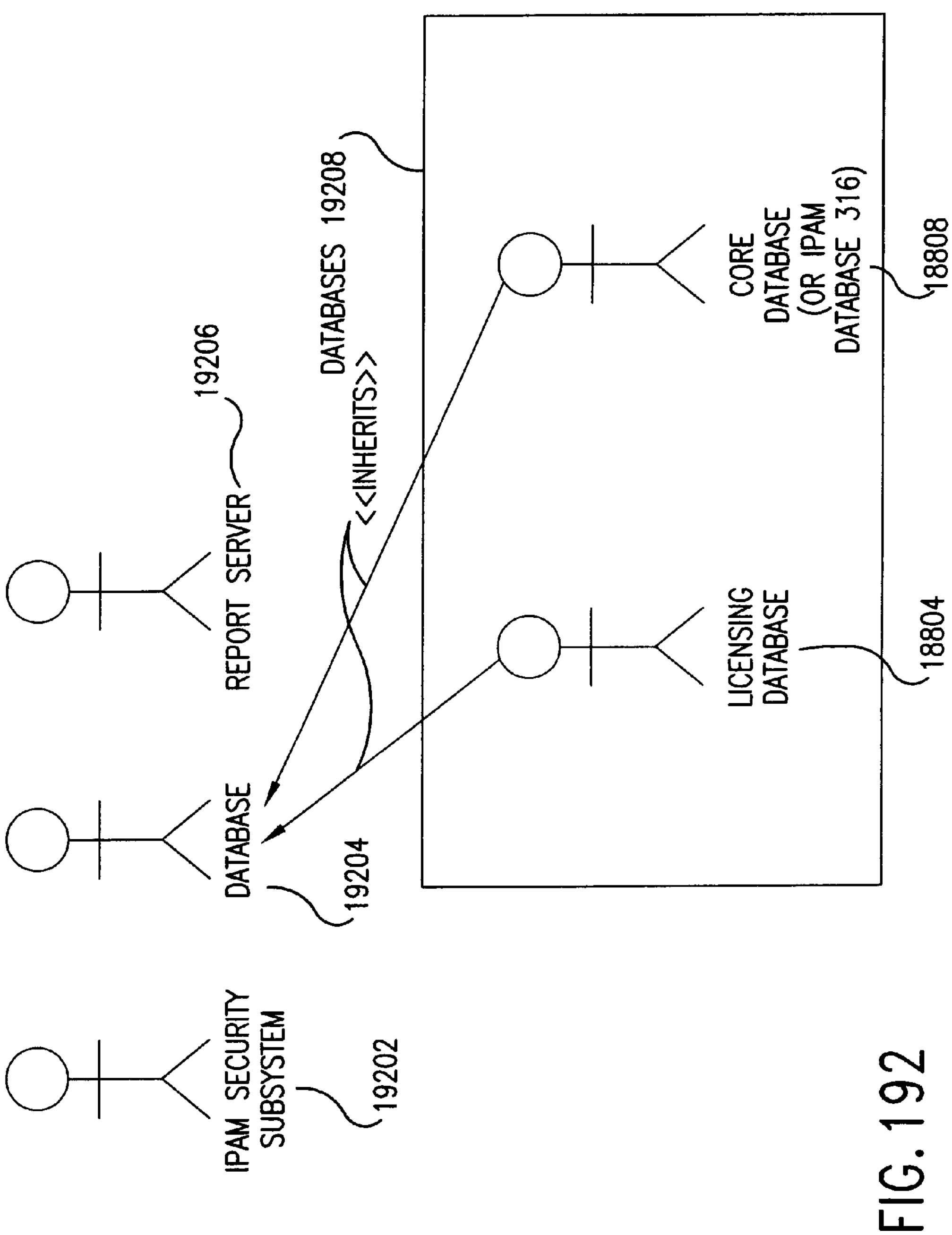
Figure 193B:
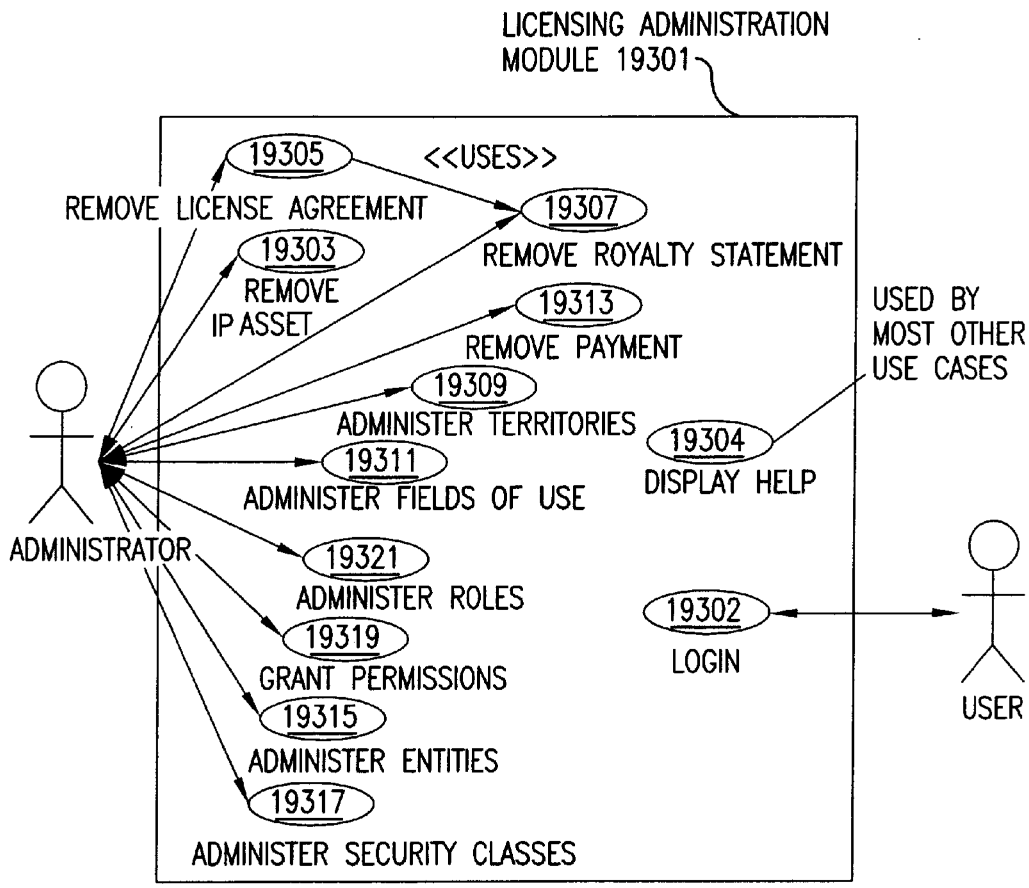
Figure 195:
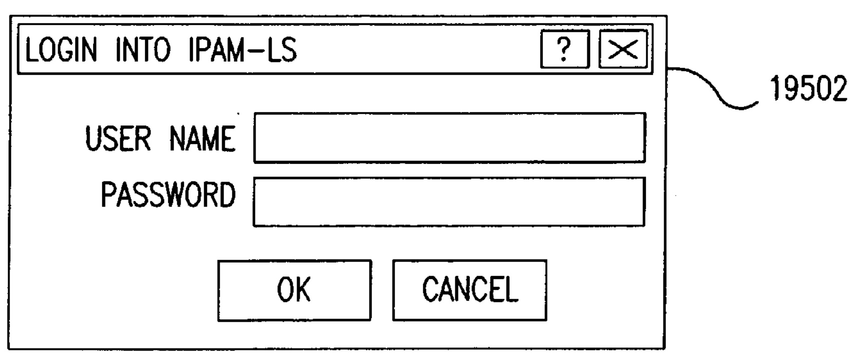
Figure 198:
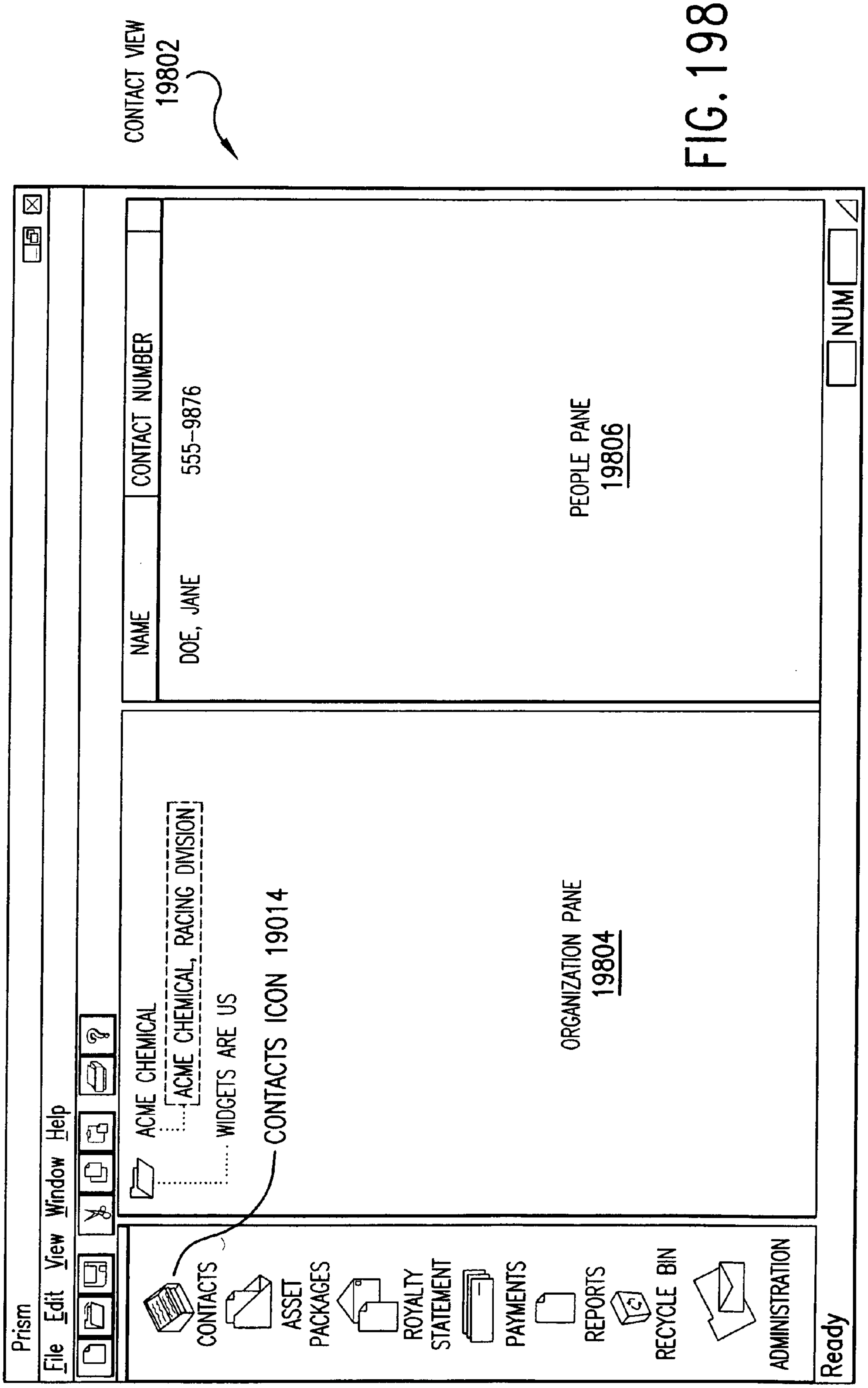
Figure 206:
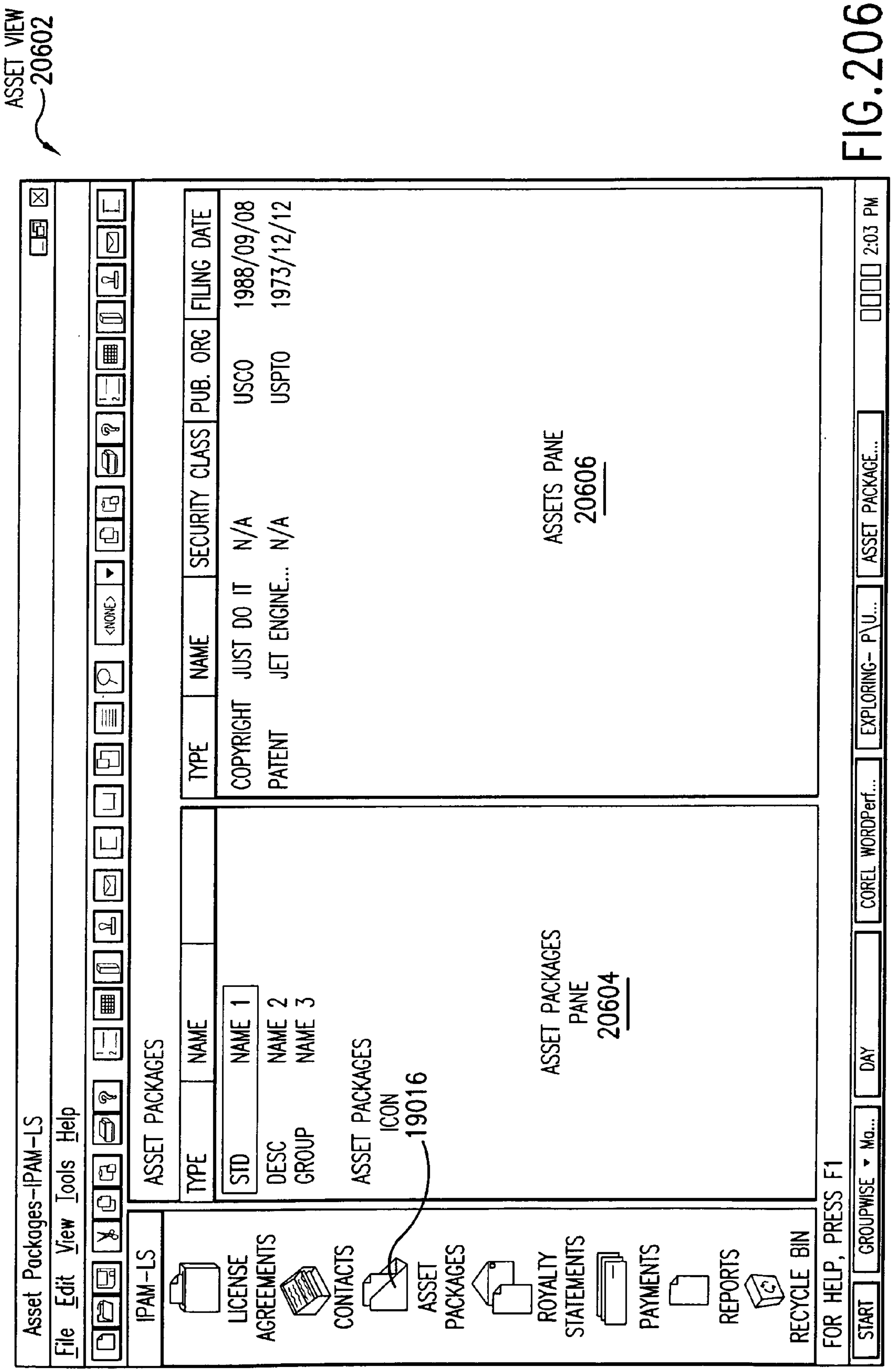
Figure 208:
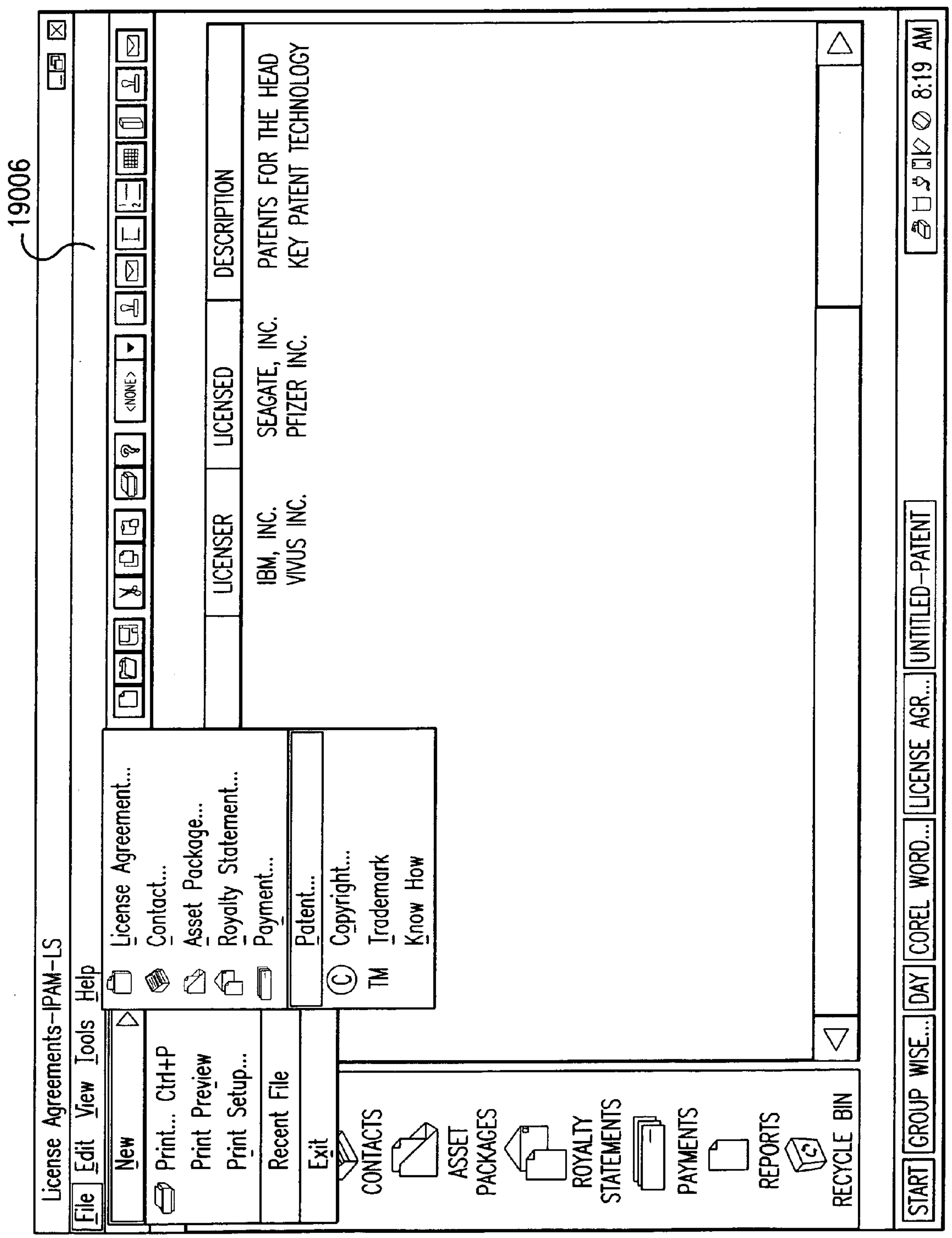
Figure 209:
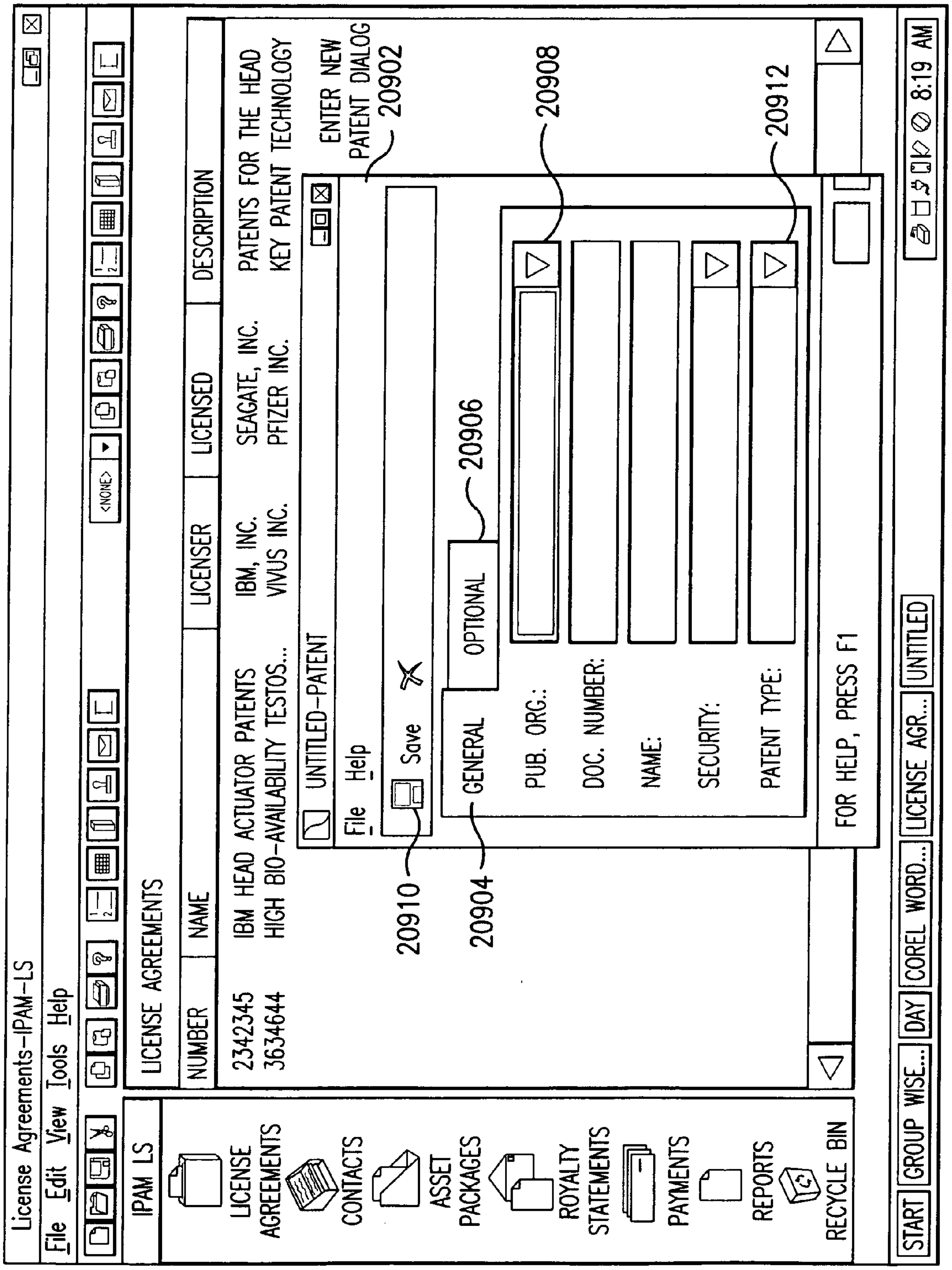
Figure 210:
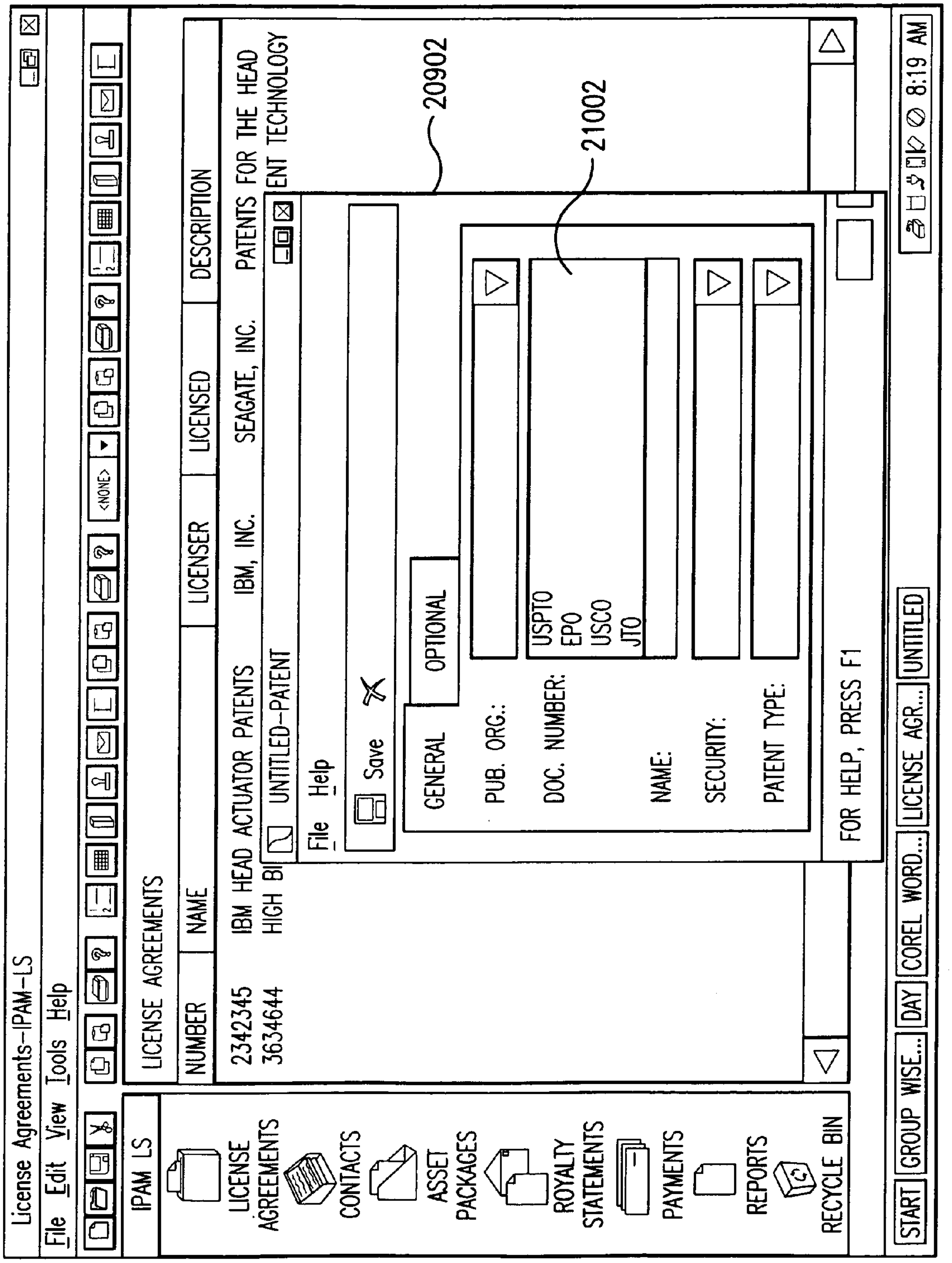
Figure 211:
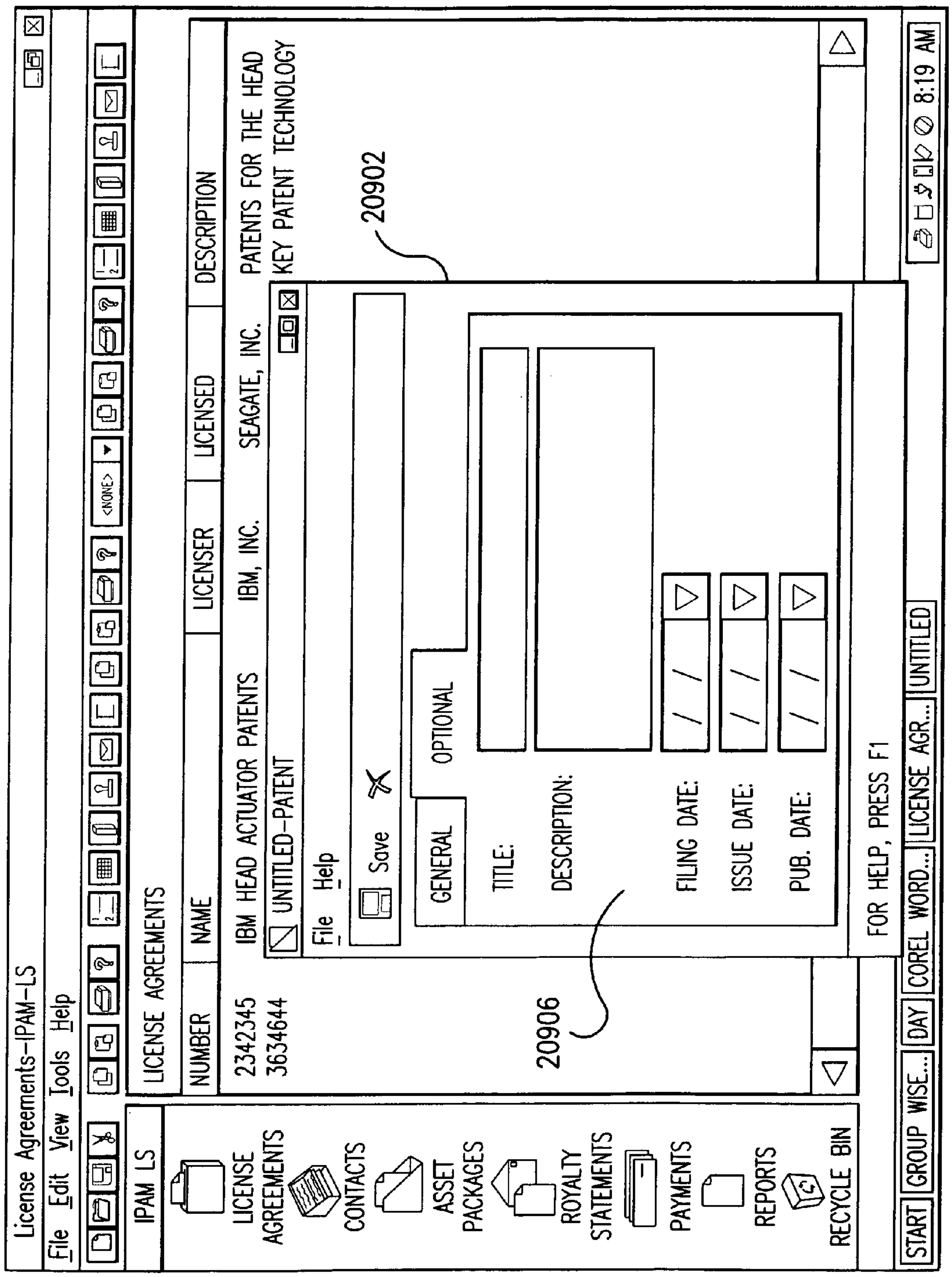
Figure 218:
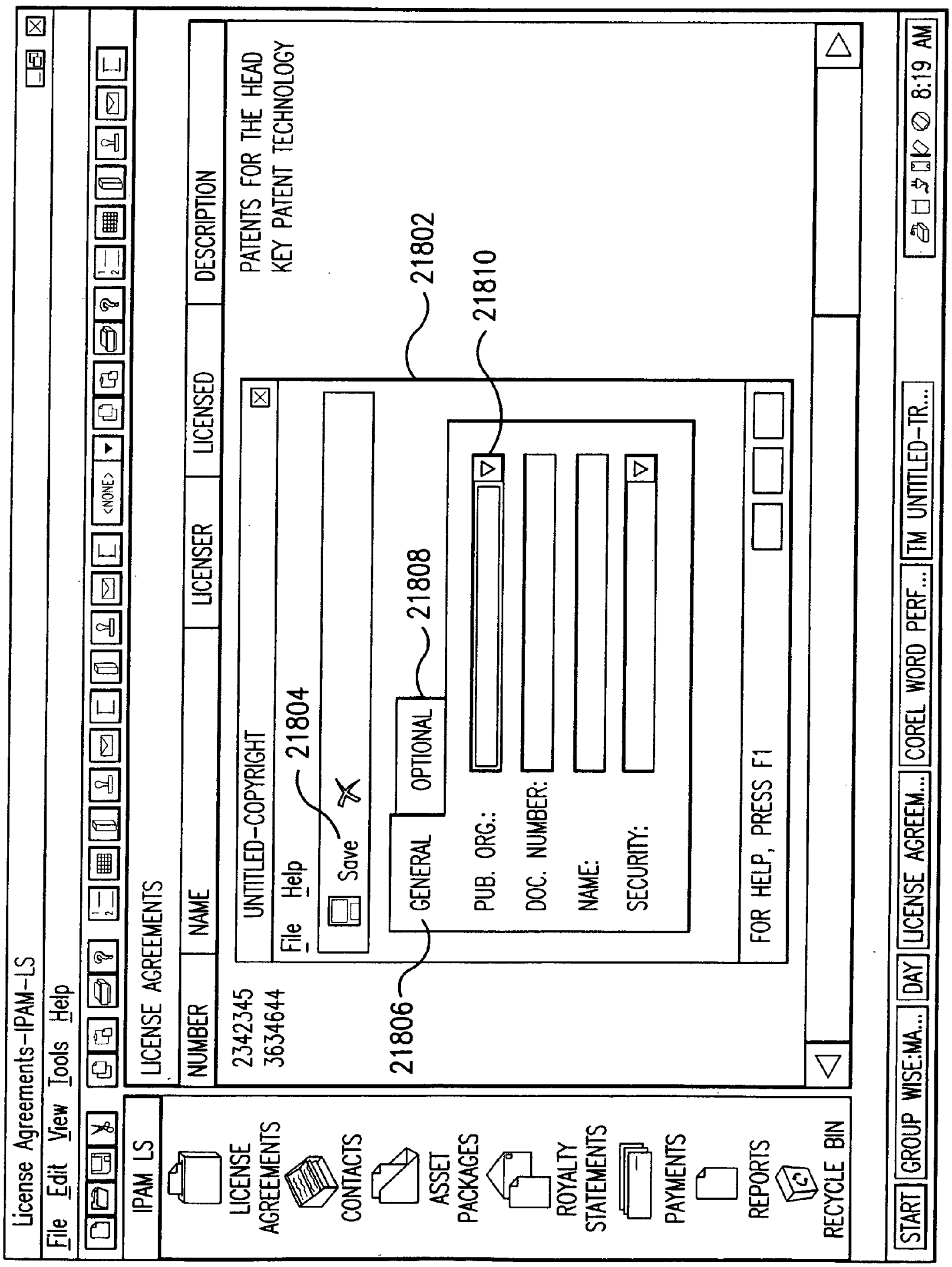
Figure 219:
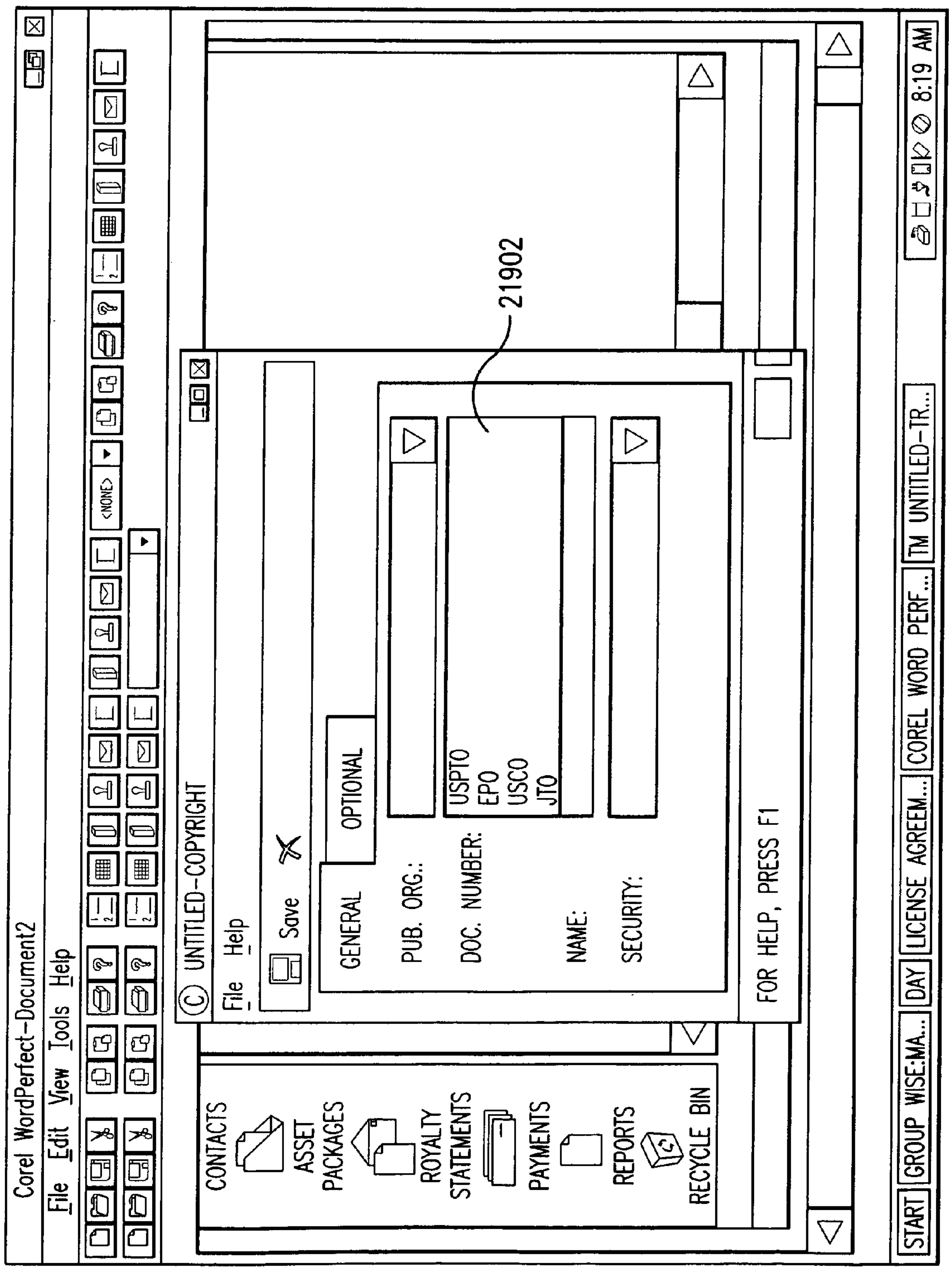
Figure 220:
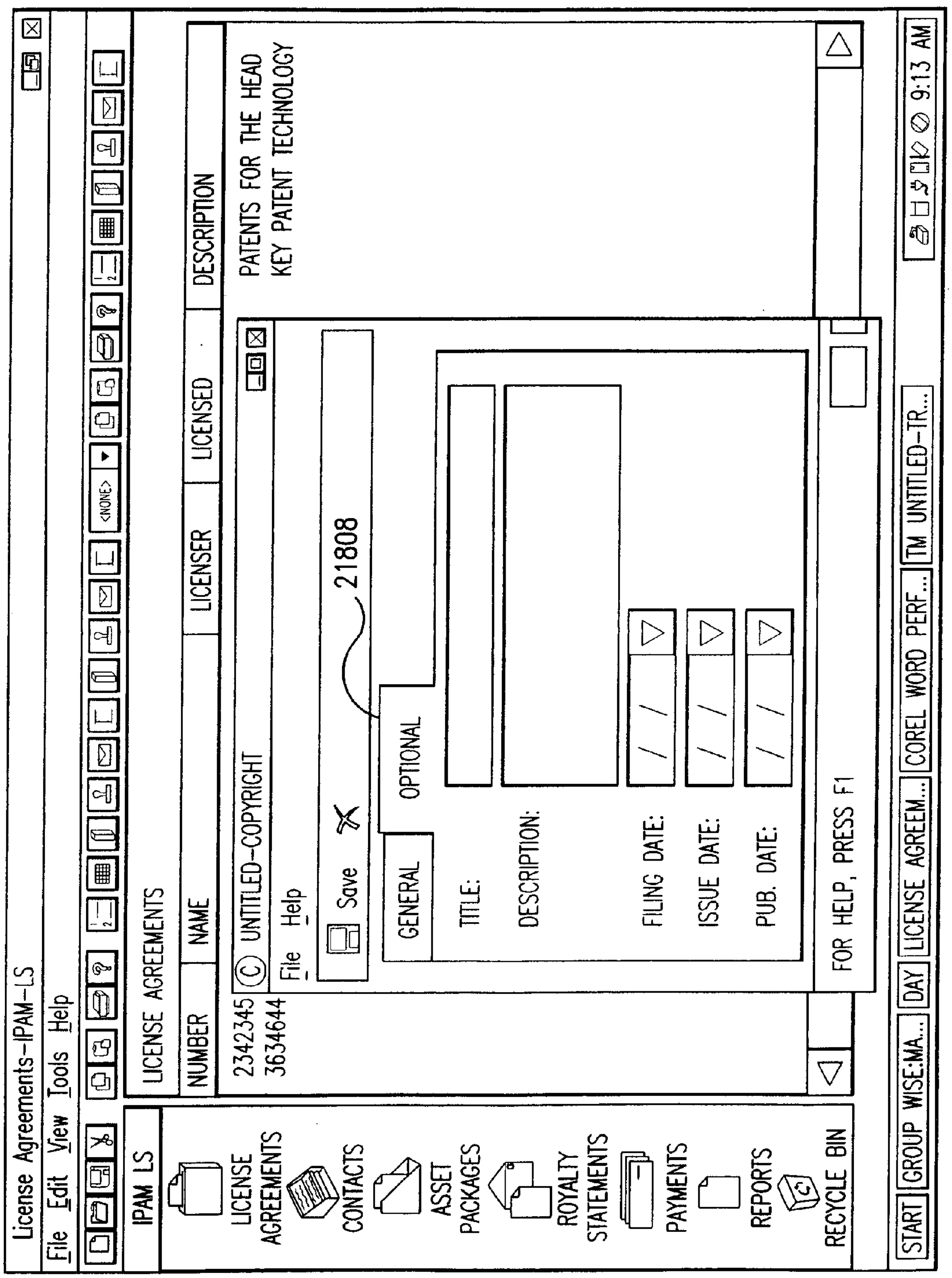
Figure 223:
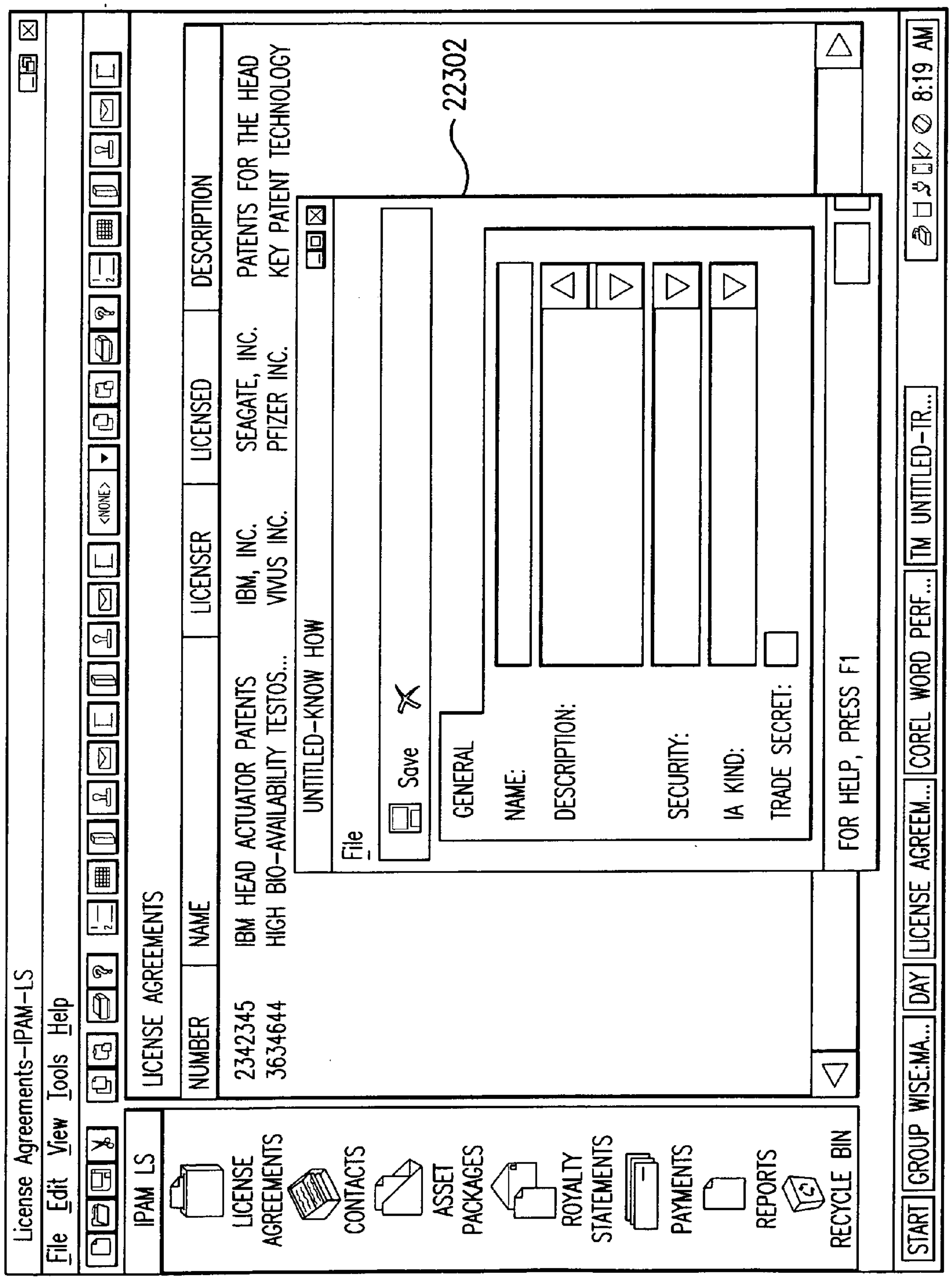
Figure 243:
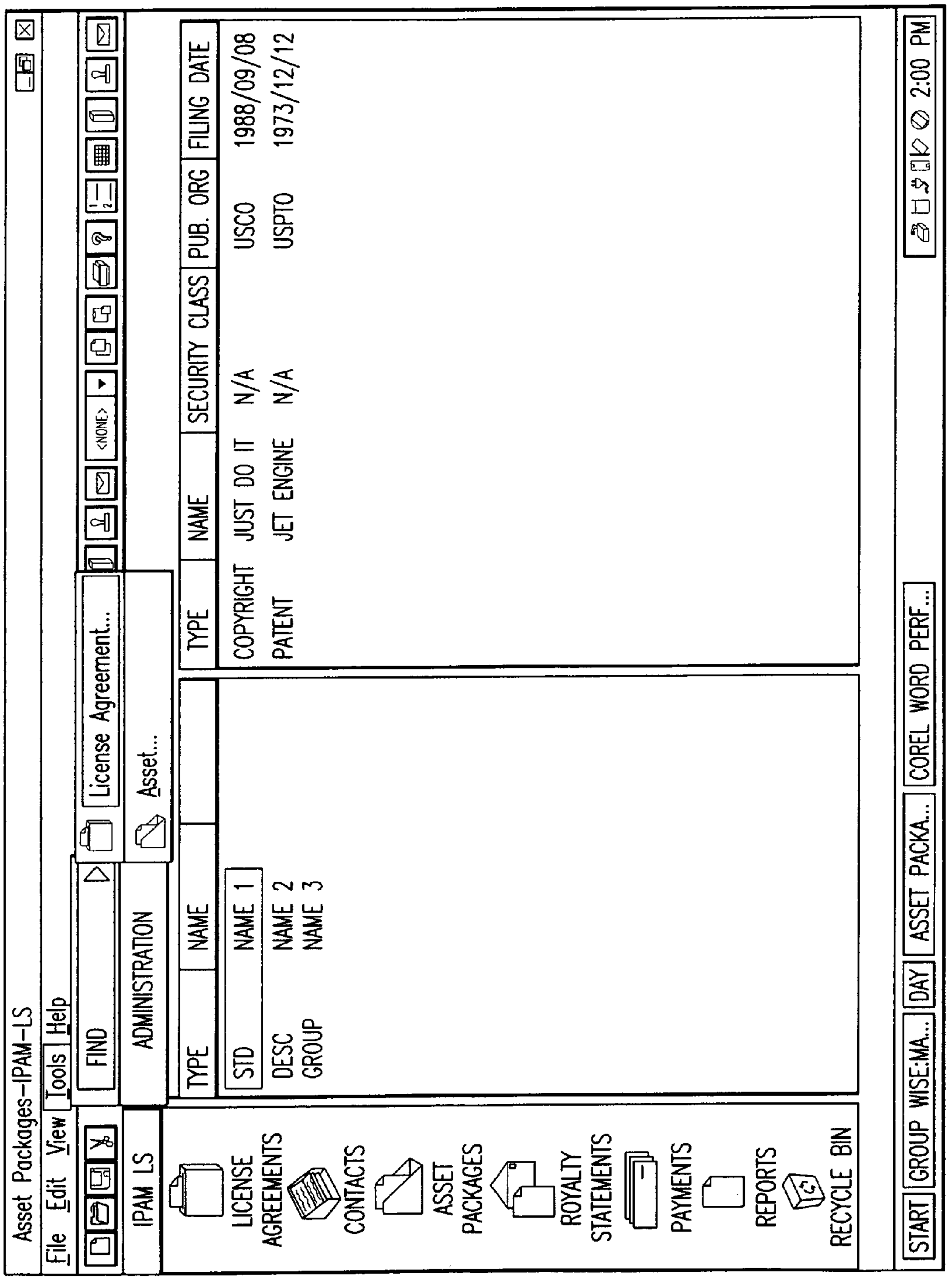
Figure 244:
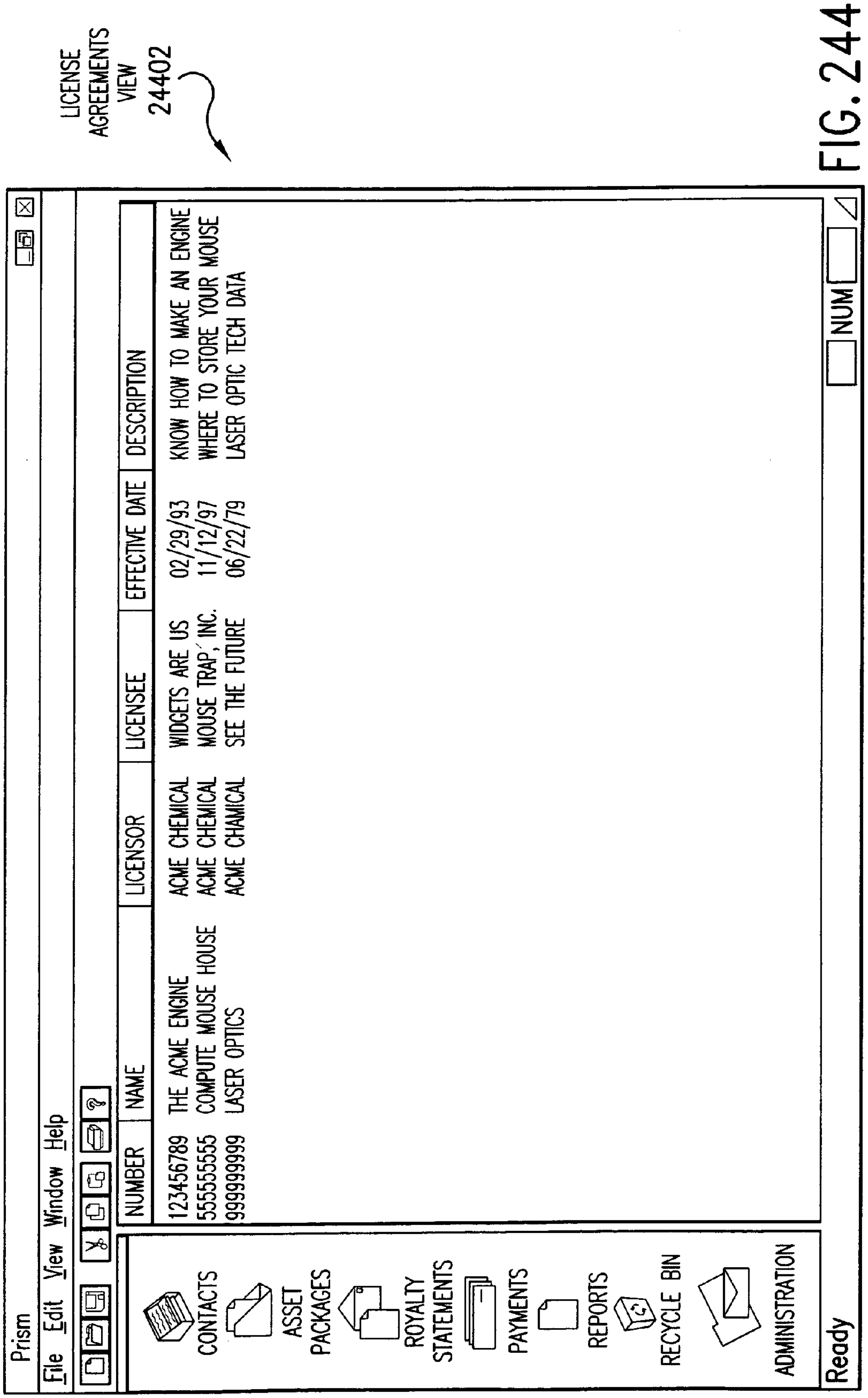
Figure 284:
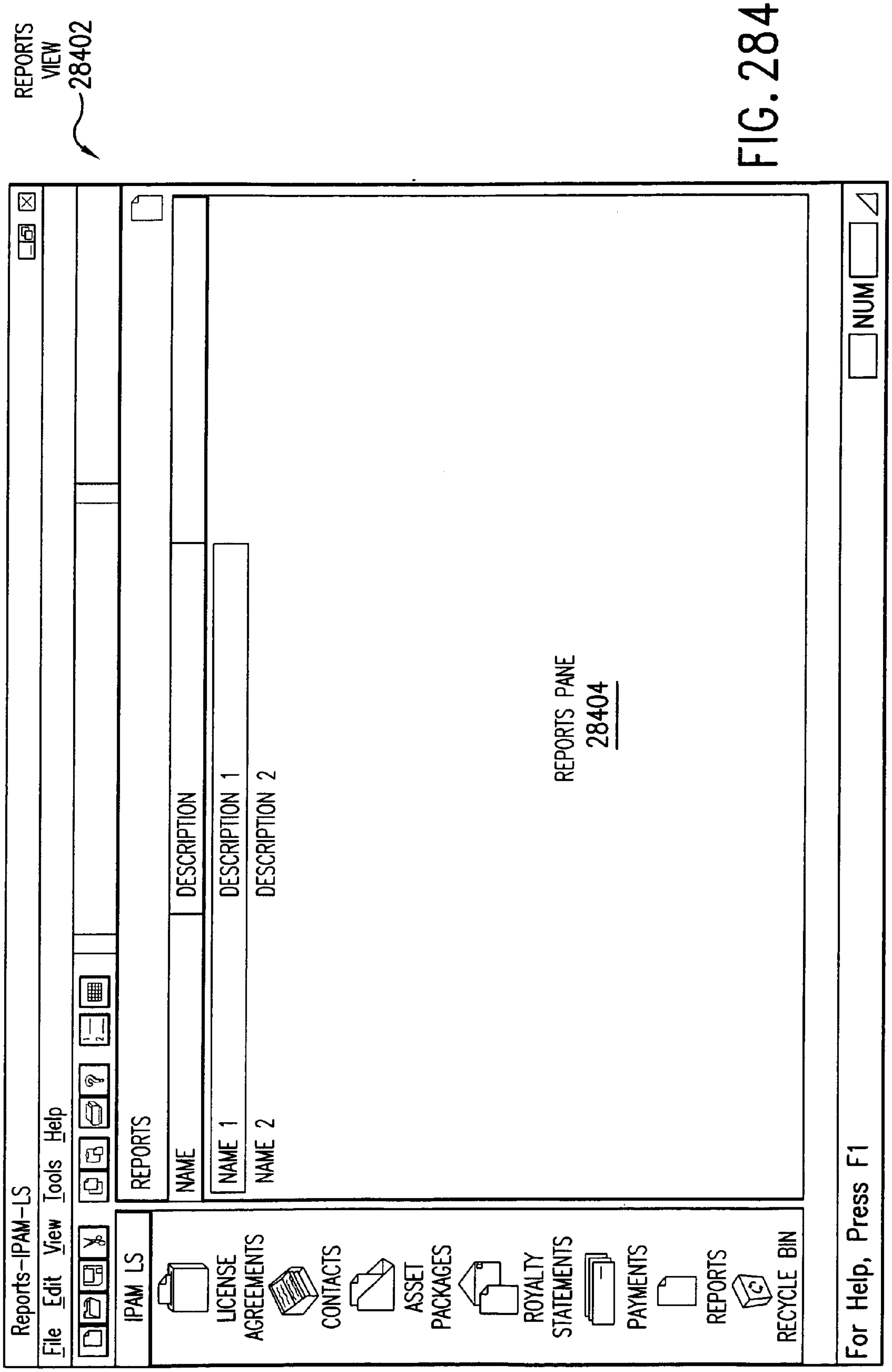
Figure 301A:
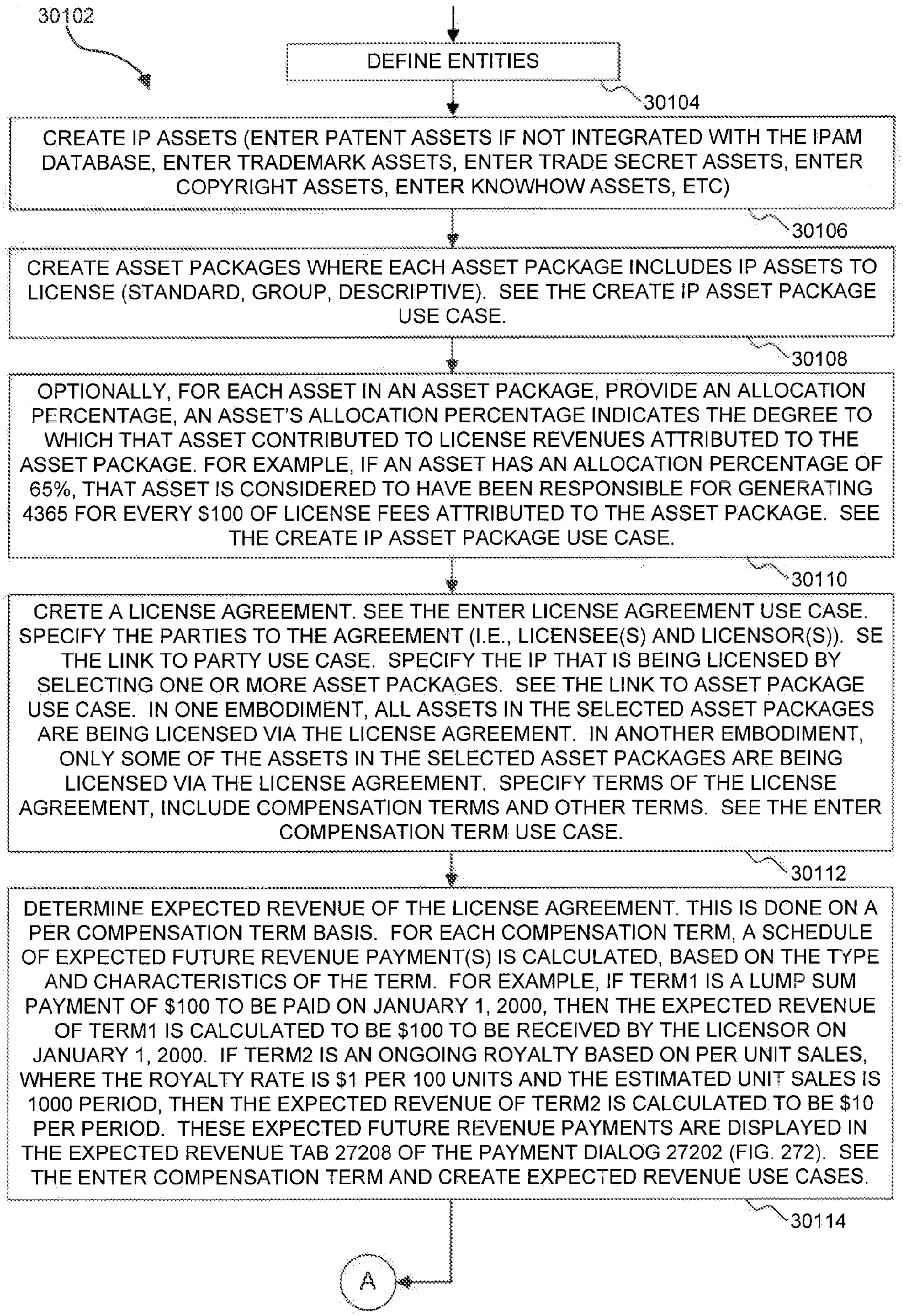
Figure 301B:
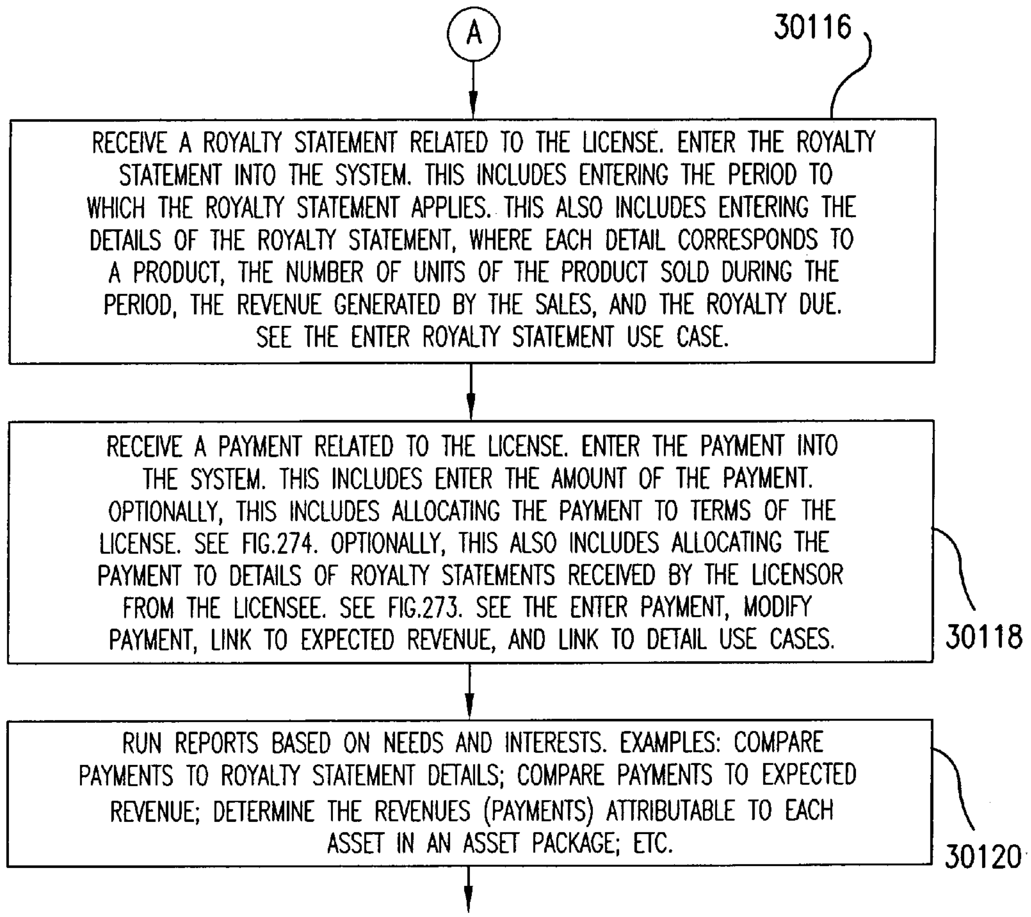
Figure 302A:
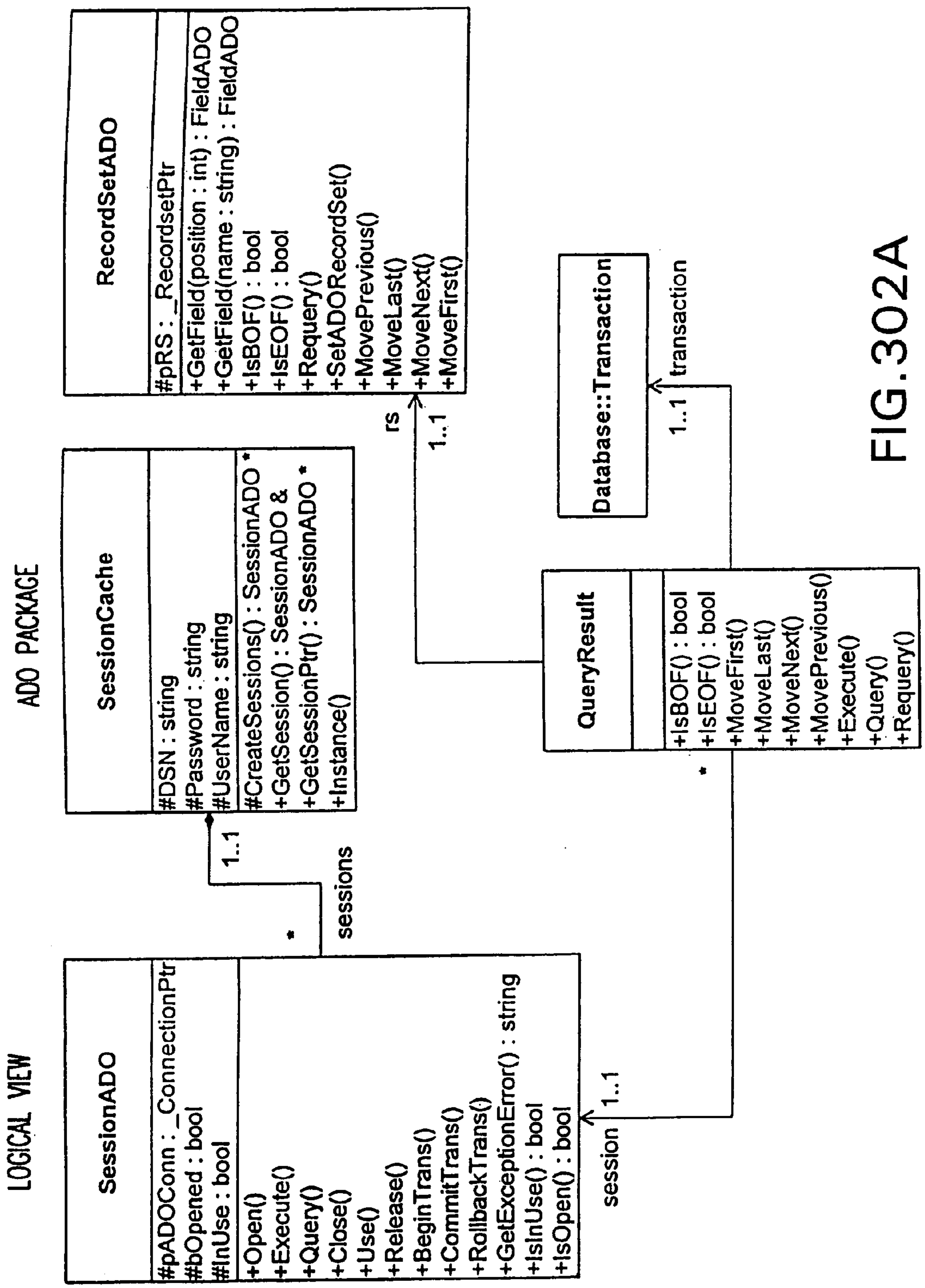
Figure 302B:
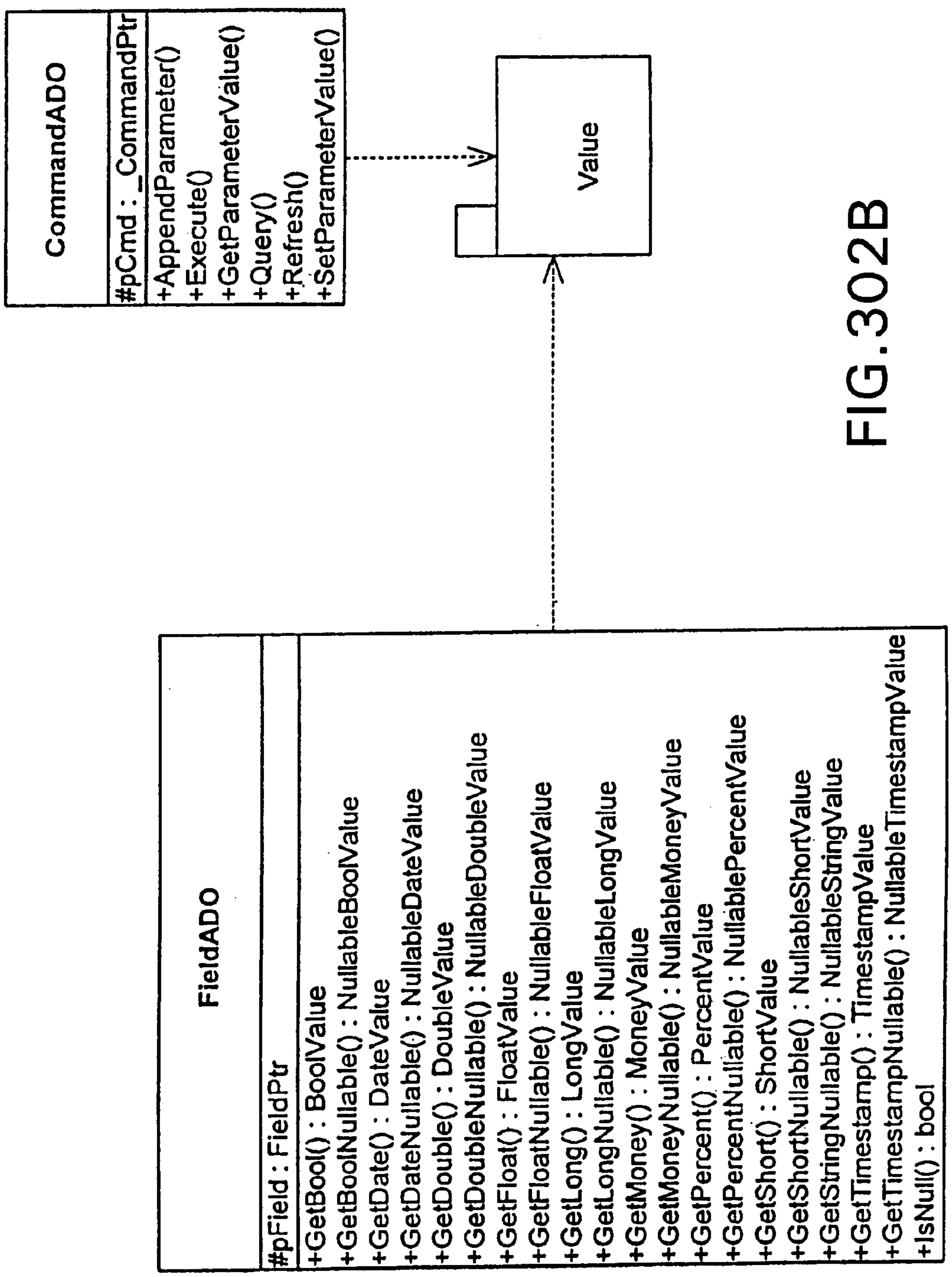
Figure 303A:
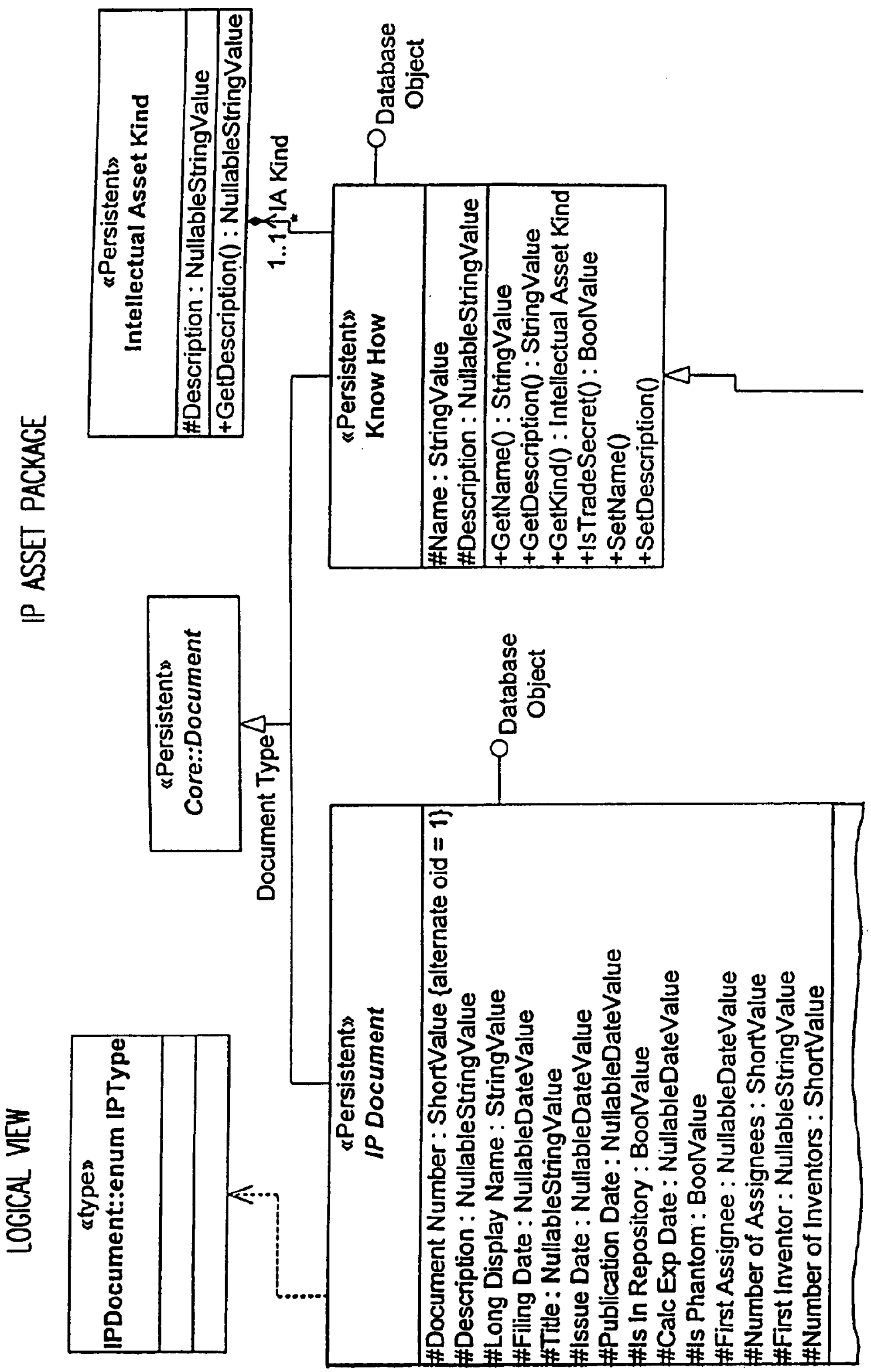
Figure 303B:
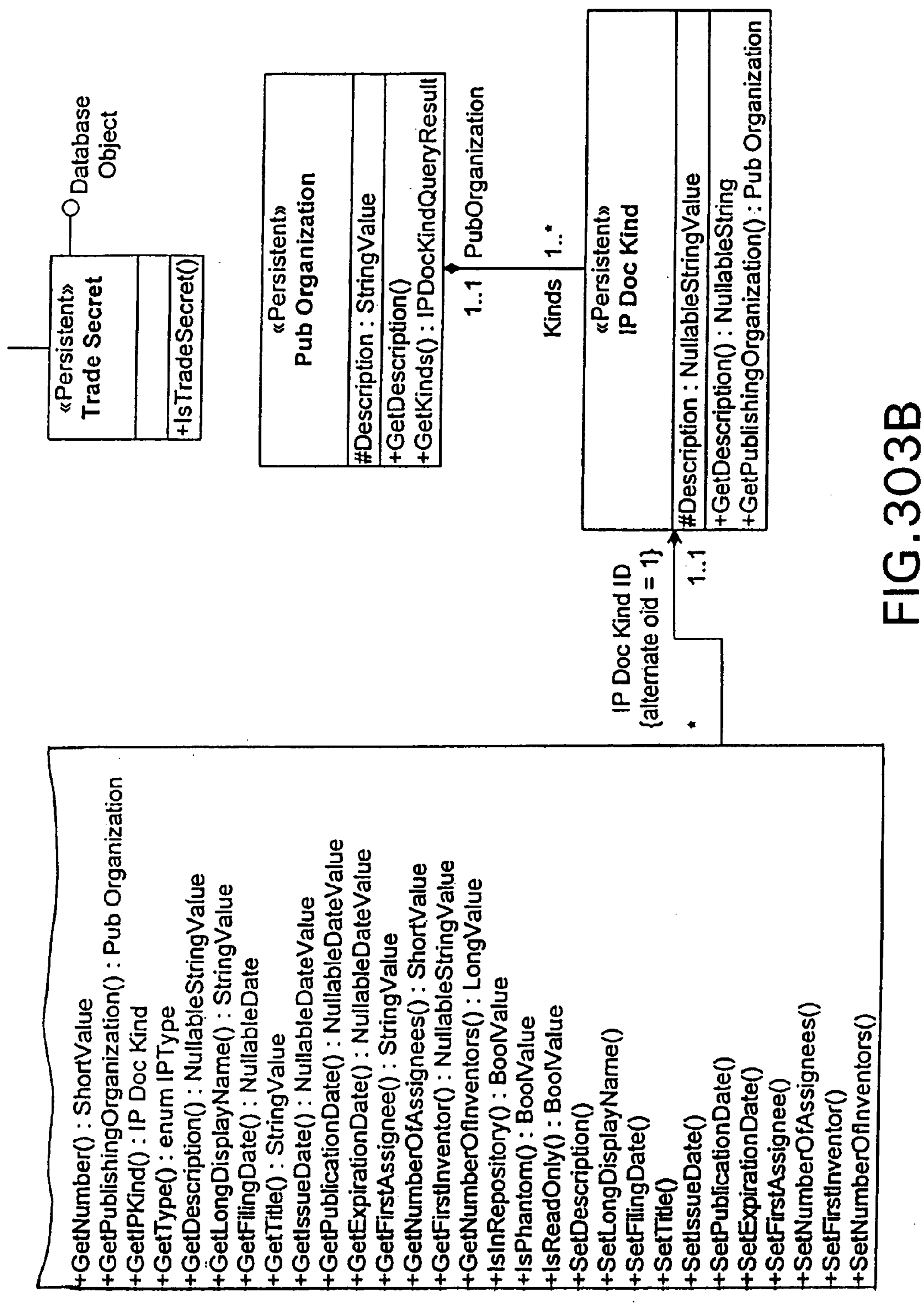
Figure 304A:
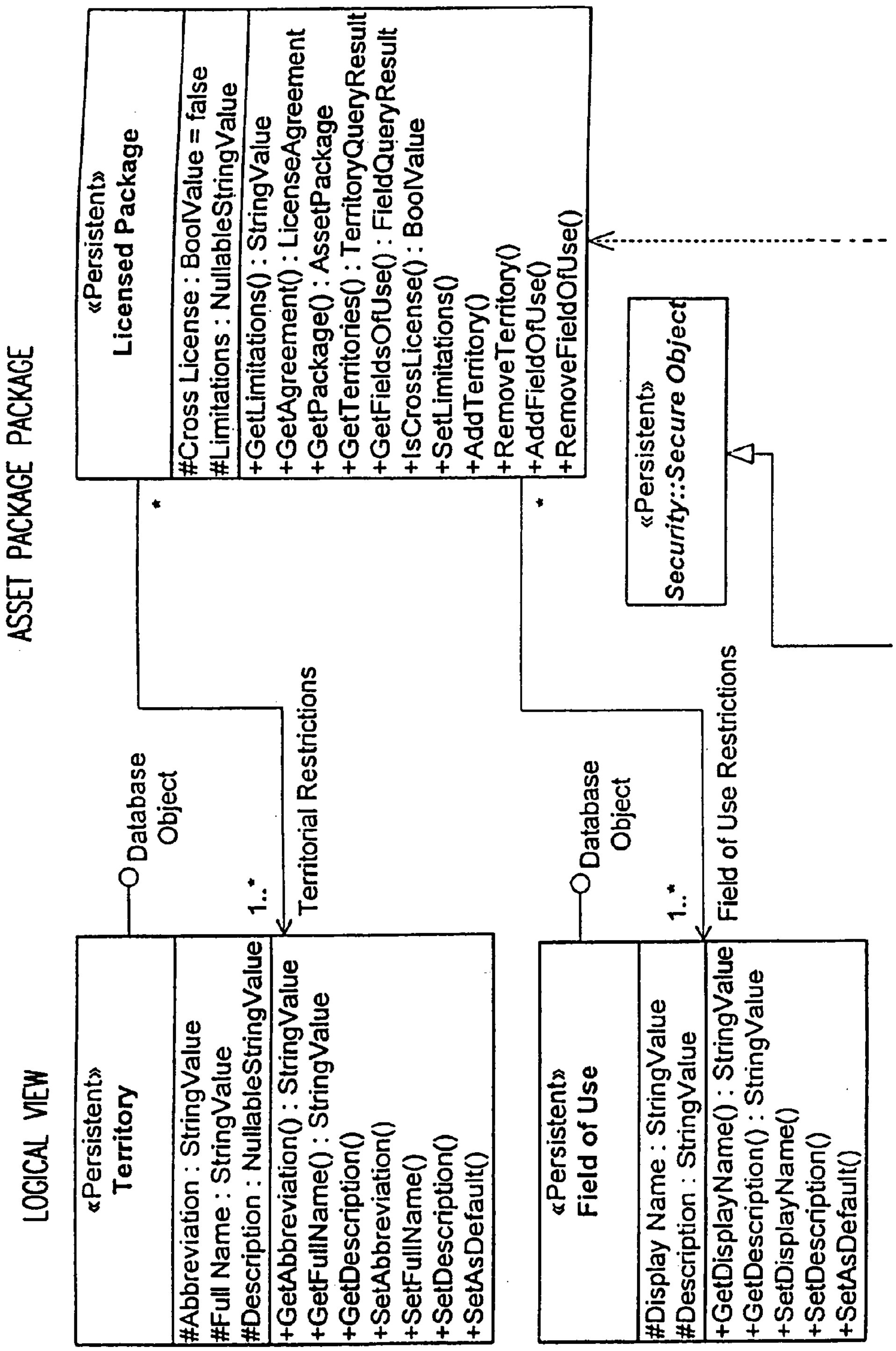
Figure 304B:
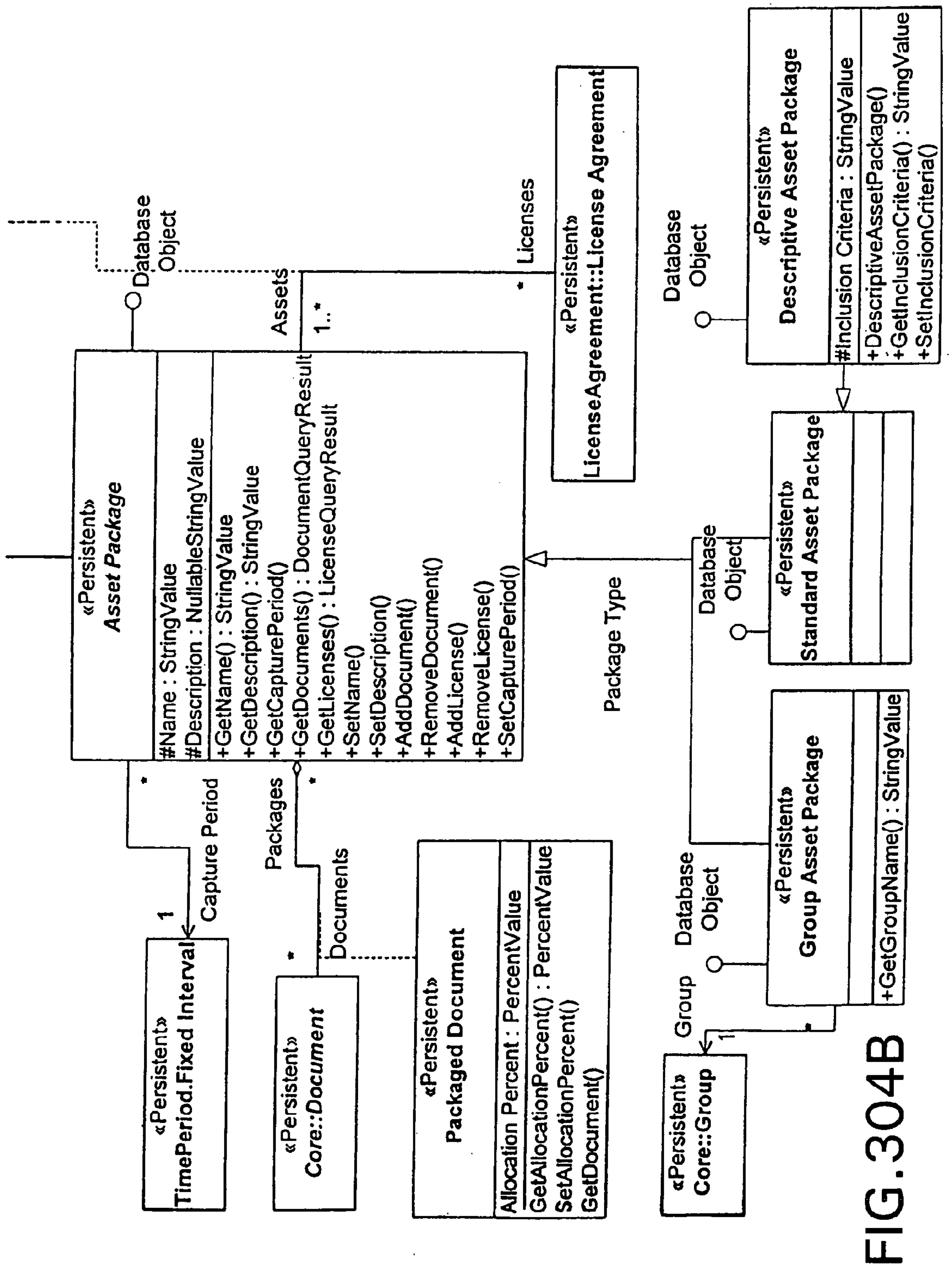
Figure 305:
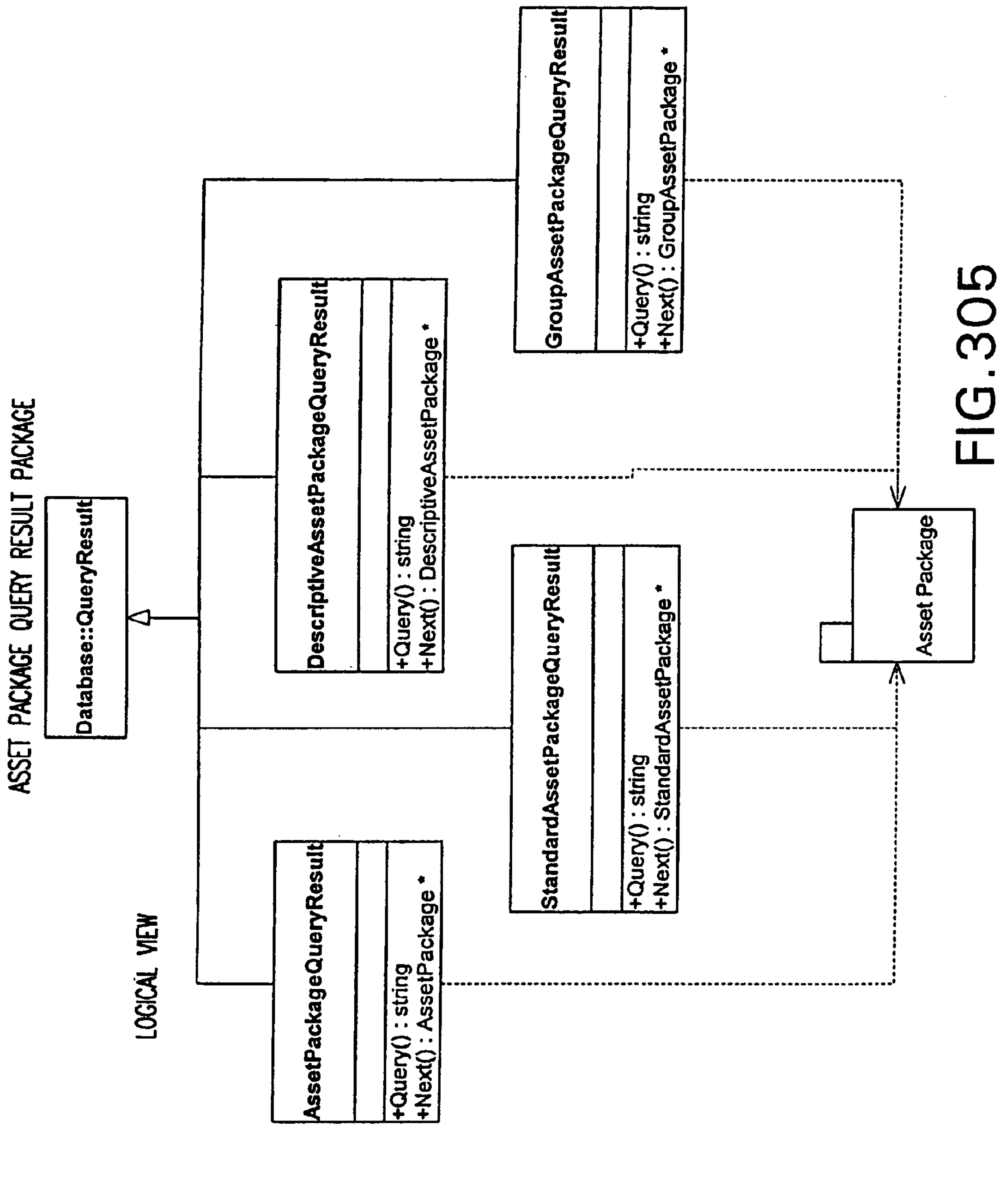
Figure 306:
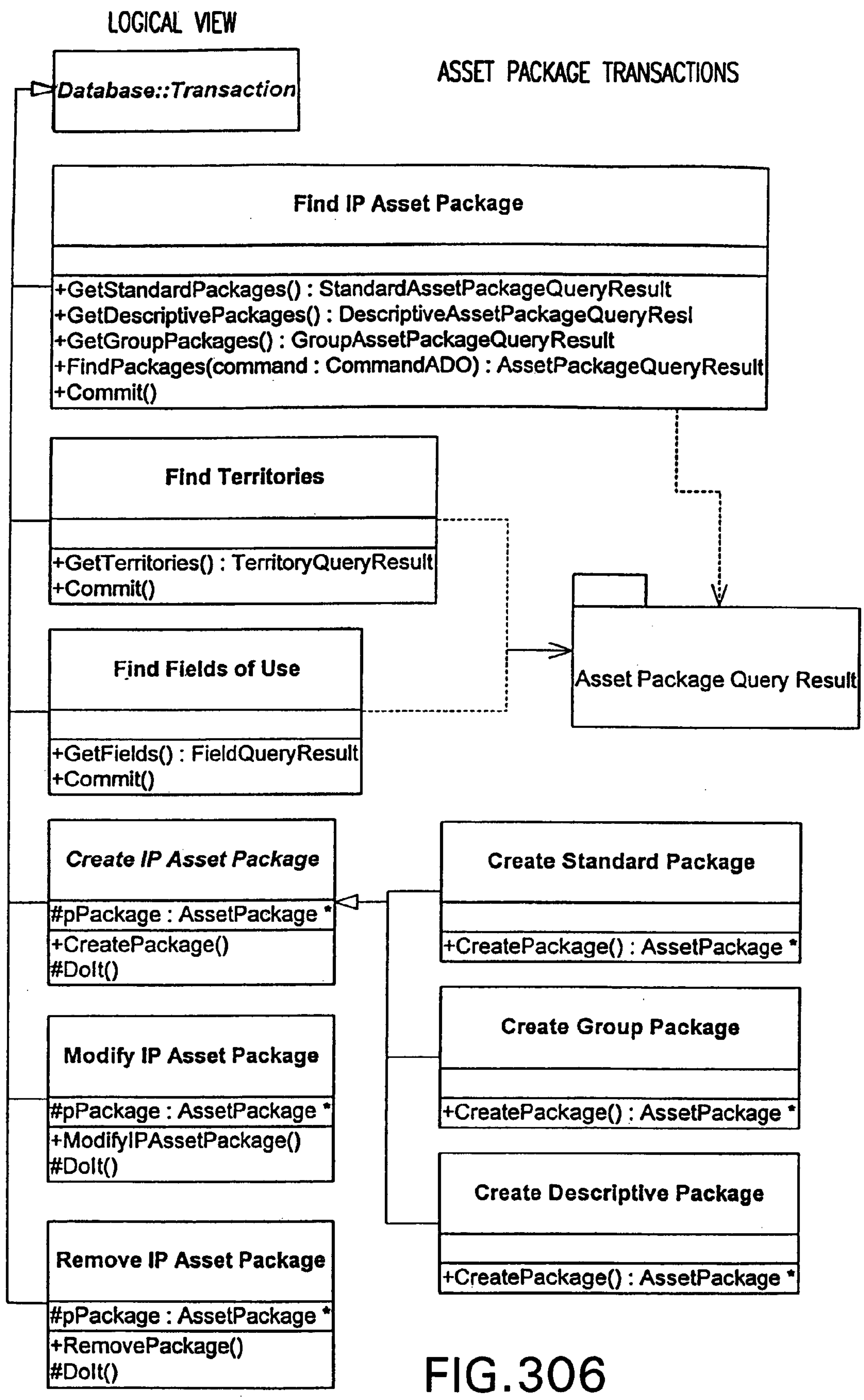
Figure 307:
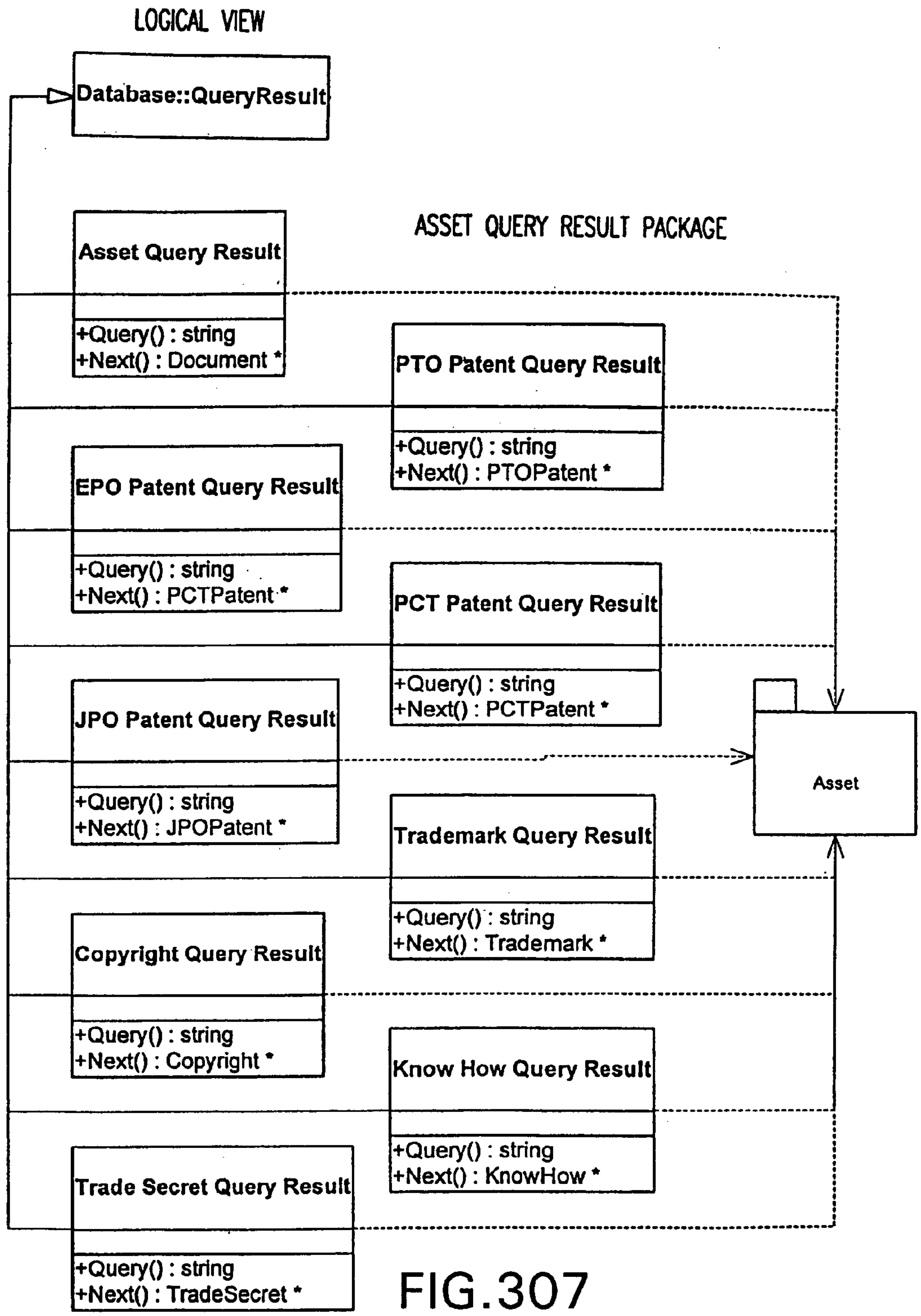
Figure 308:
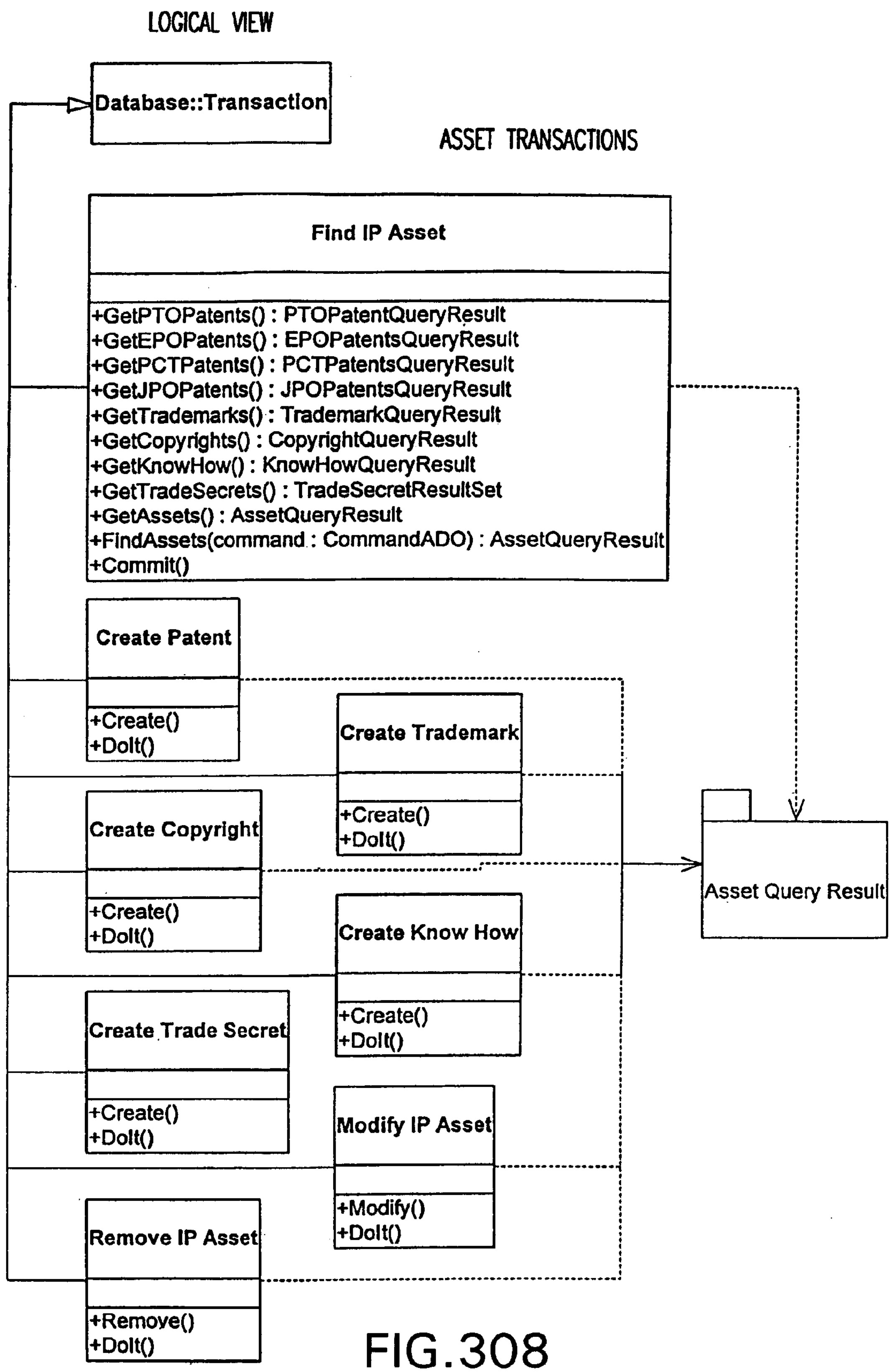
Figure 309:
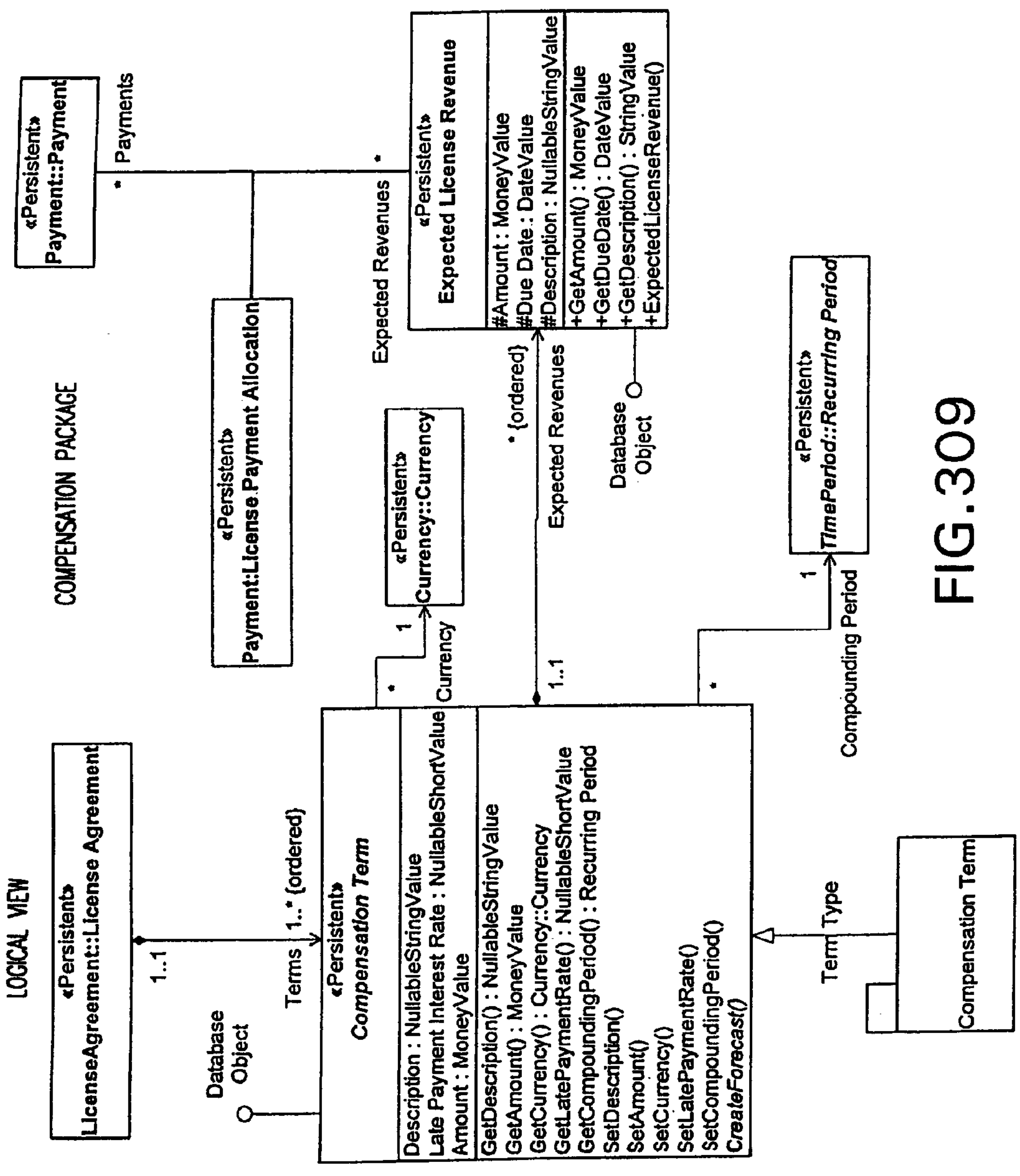
Figure 310A:
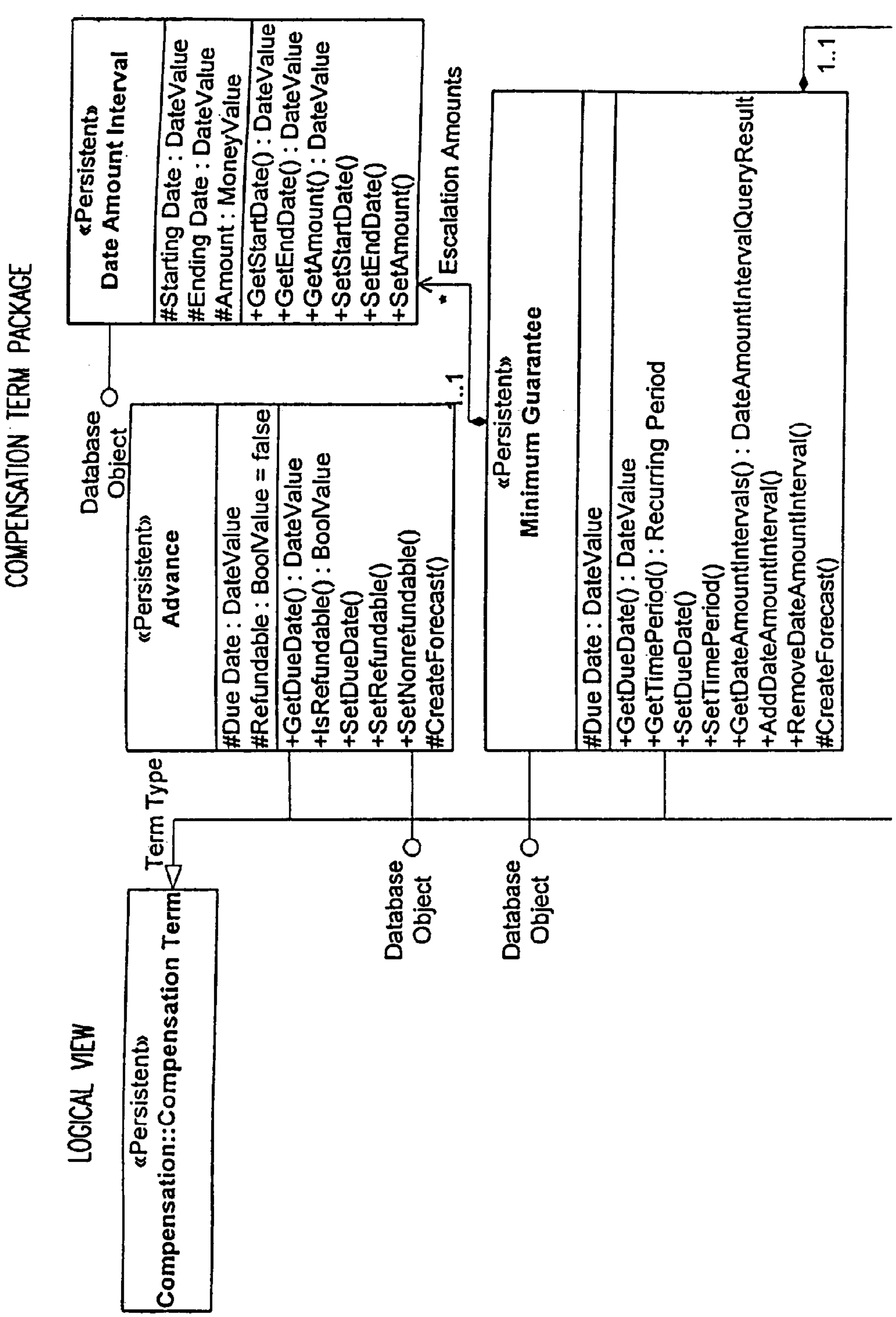
Figure 310B:
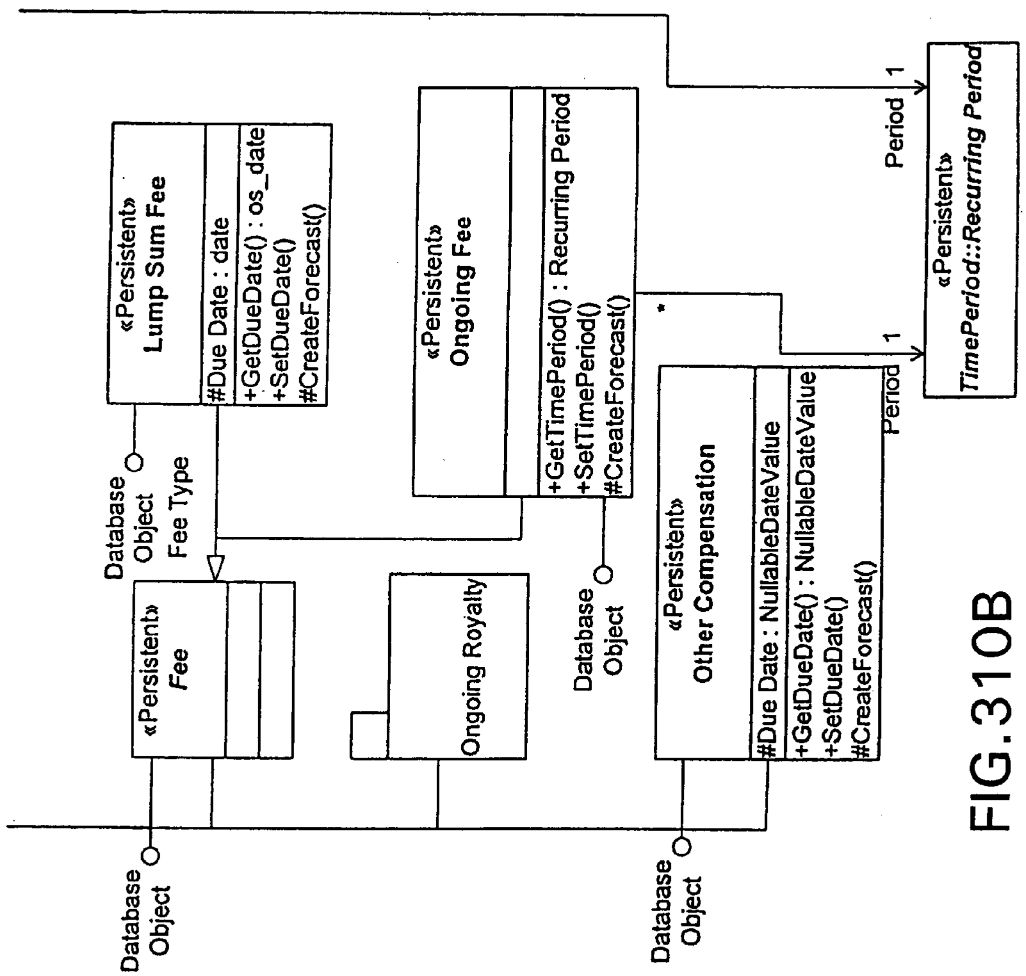
Figure 311:
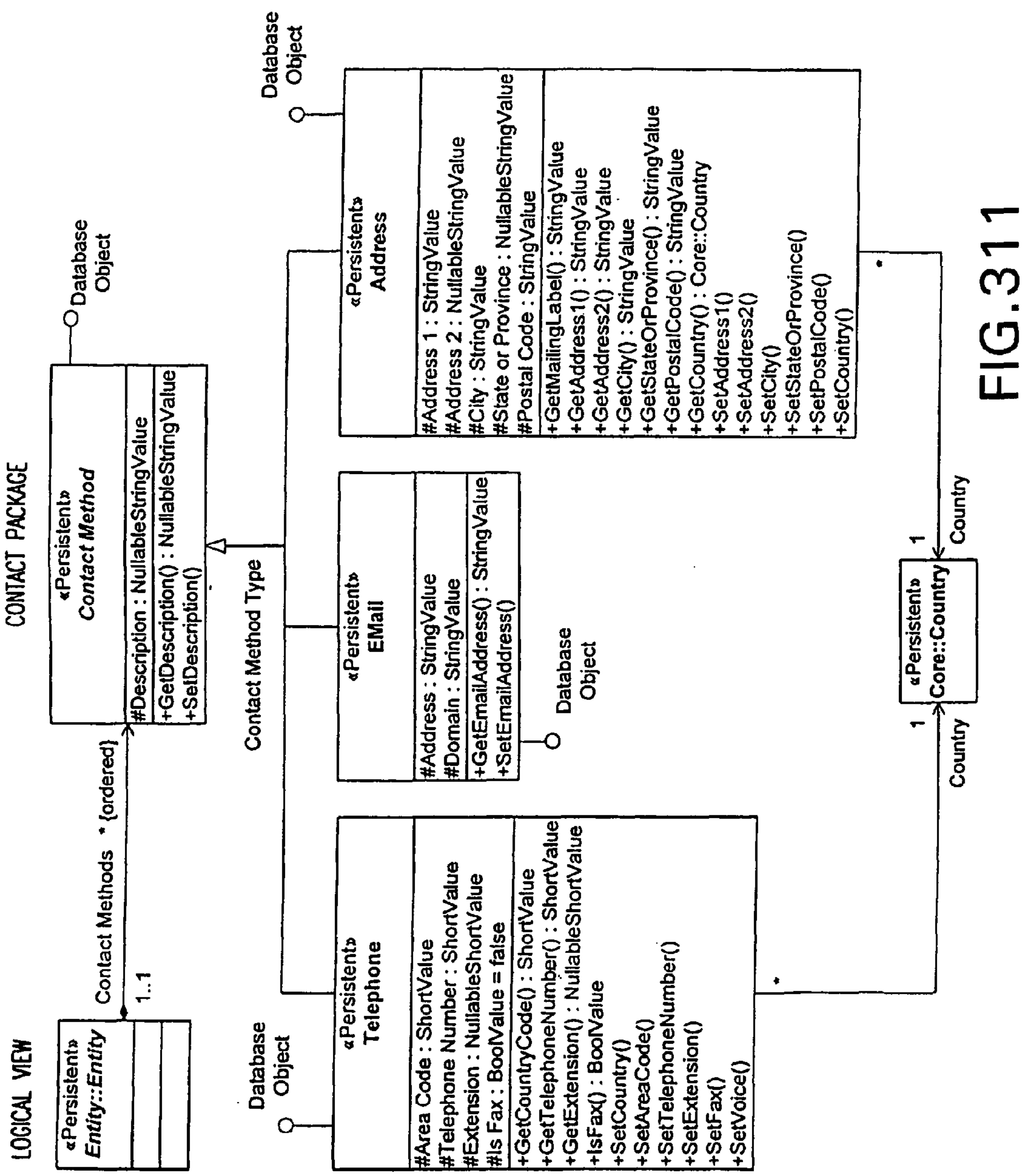
Figure 312:
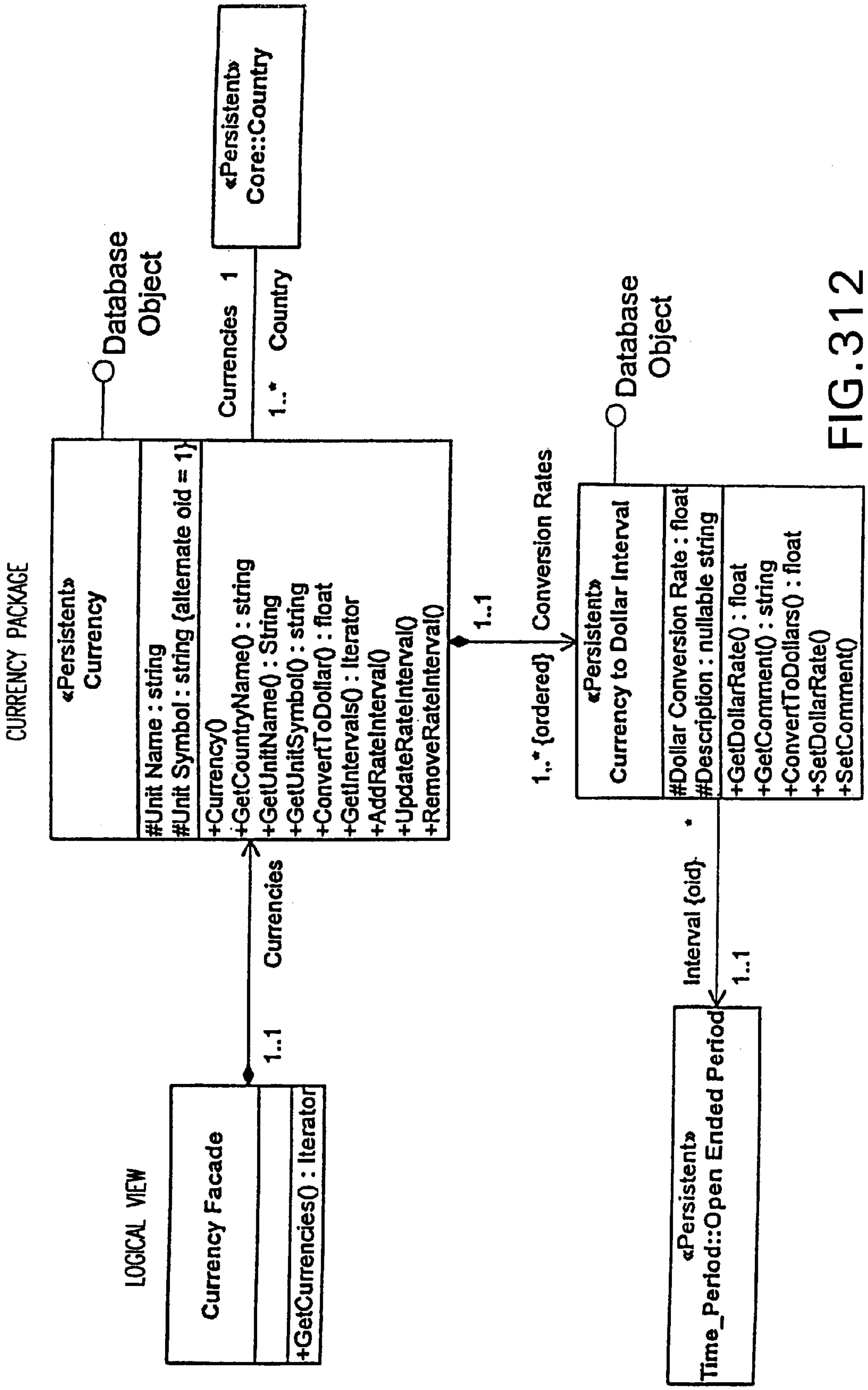
Figure 313:
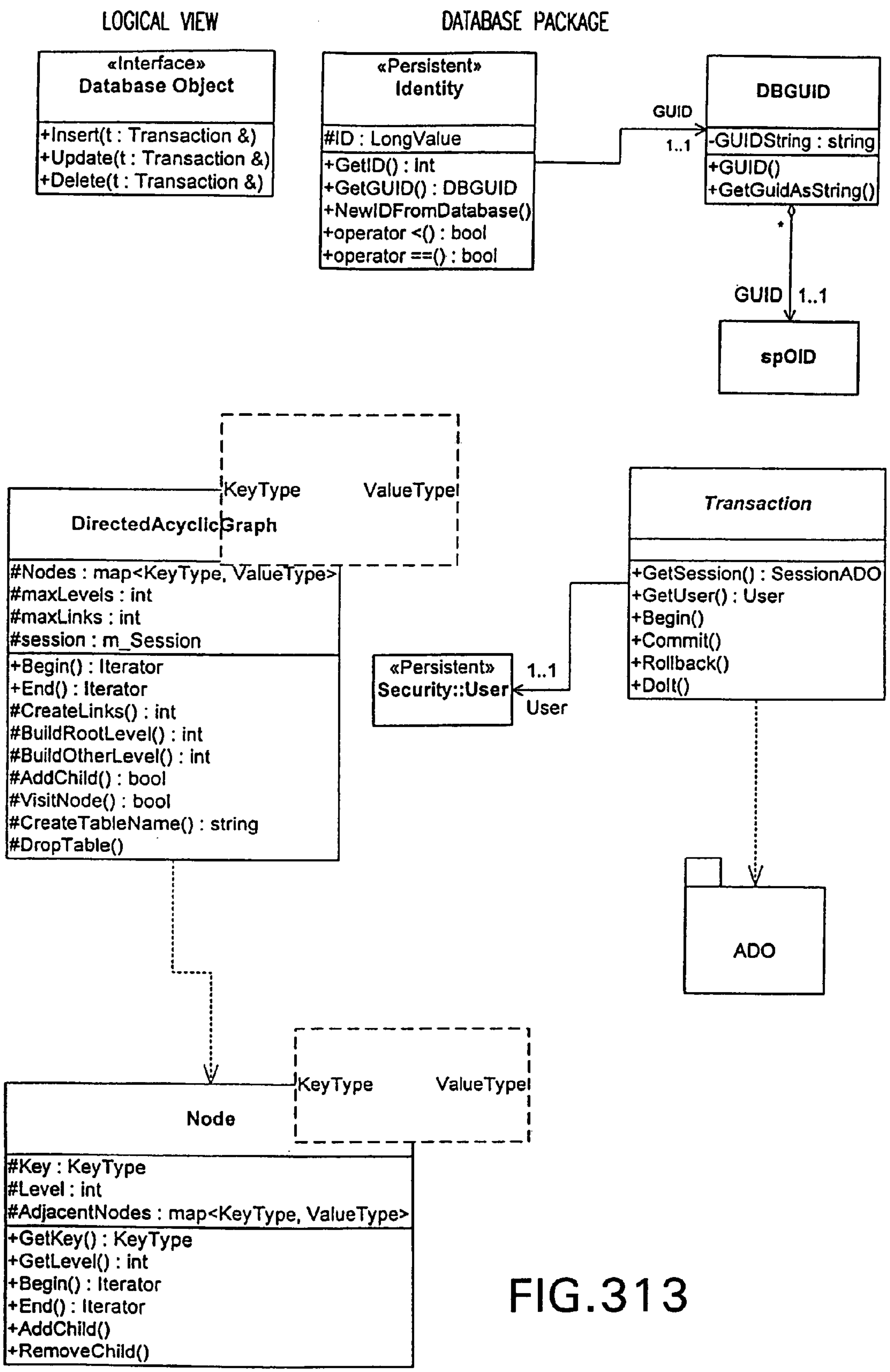
Figure 314:
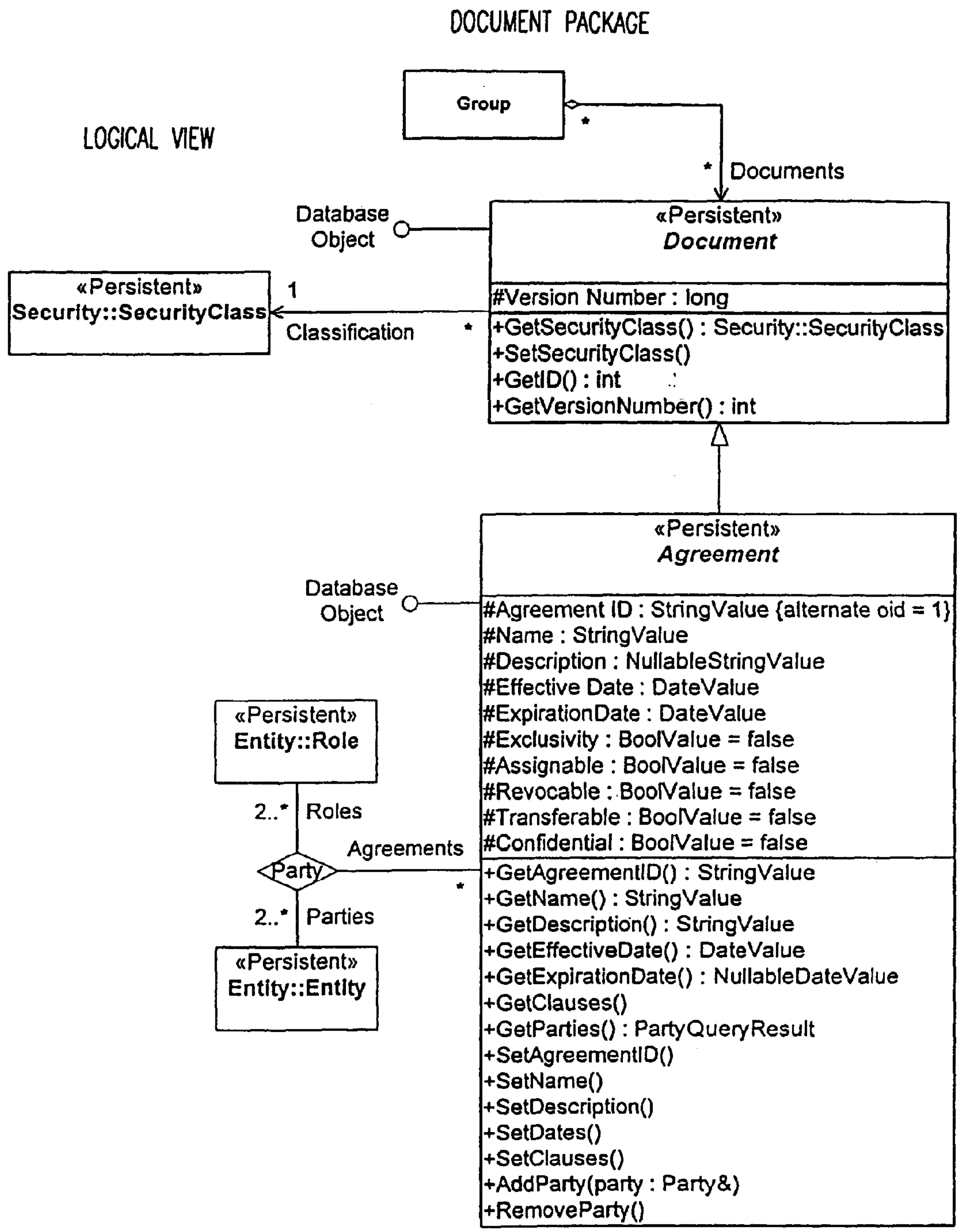
Figure 315A:
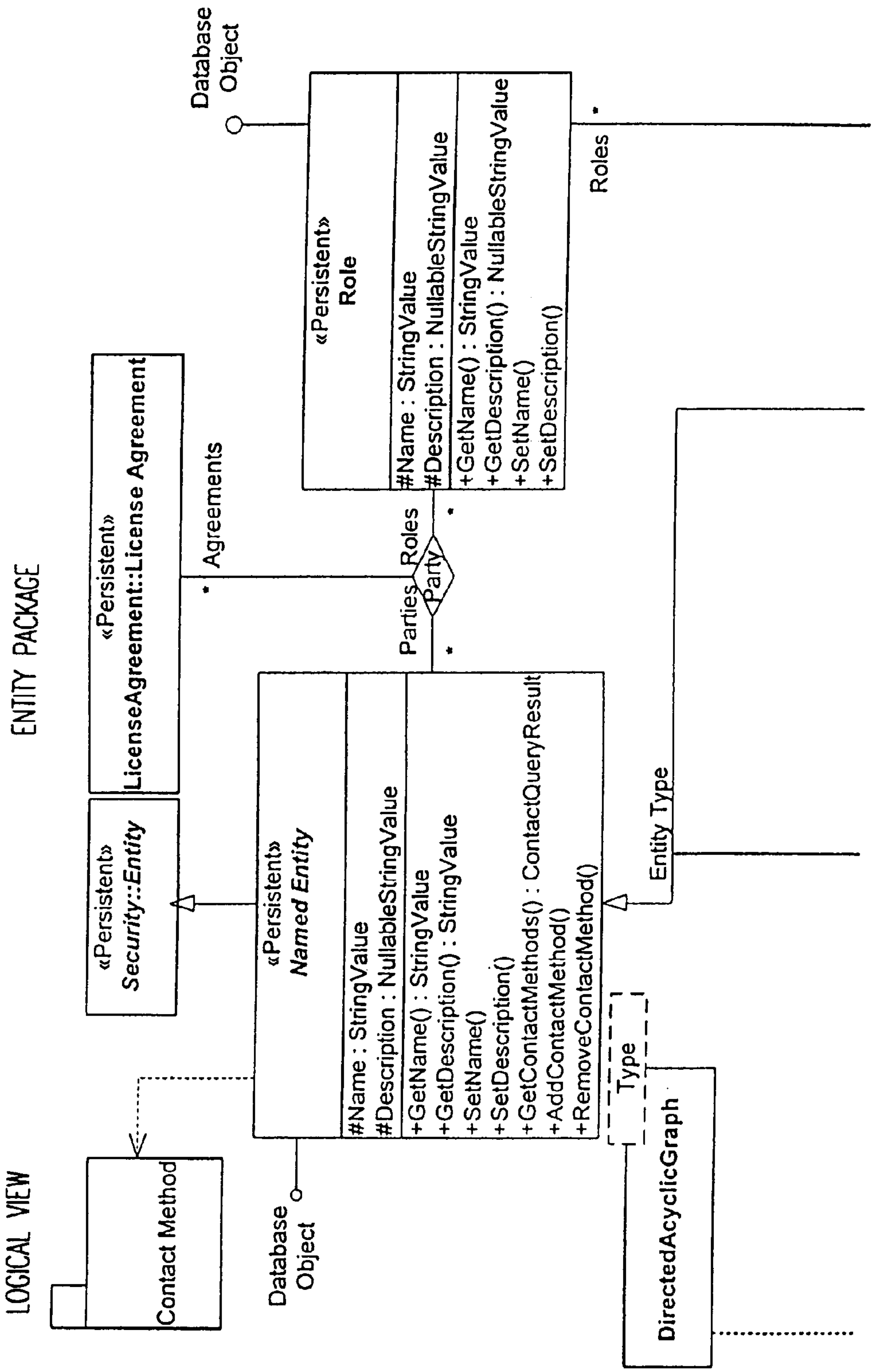
Figure 315B:
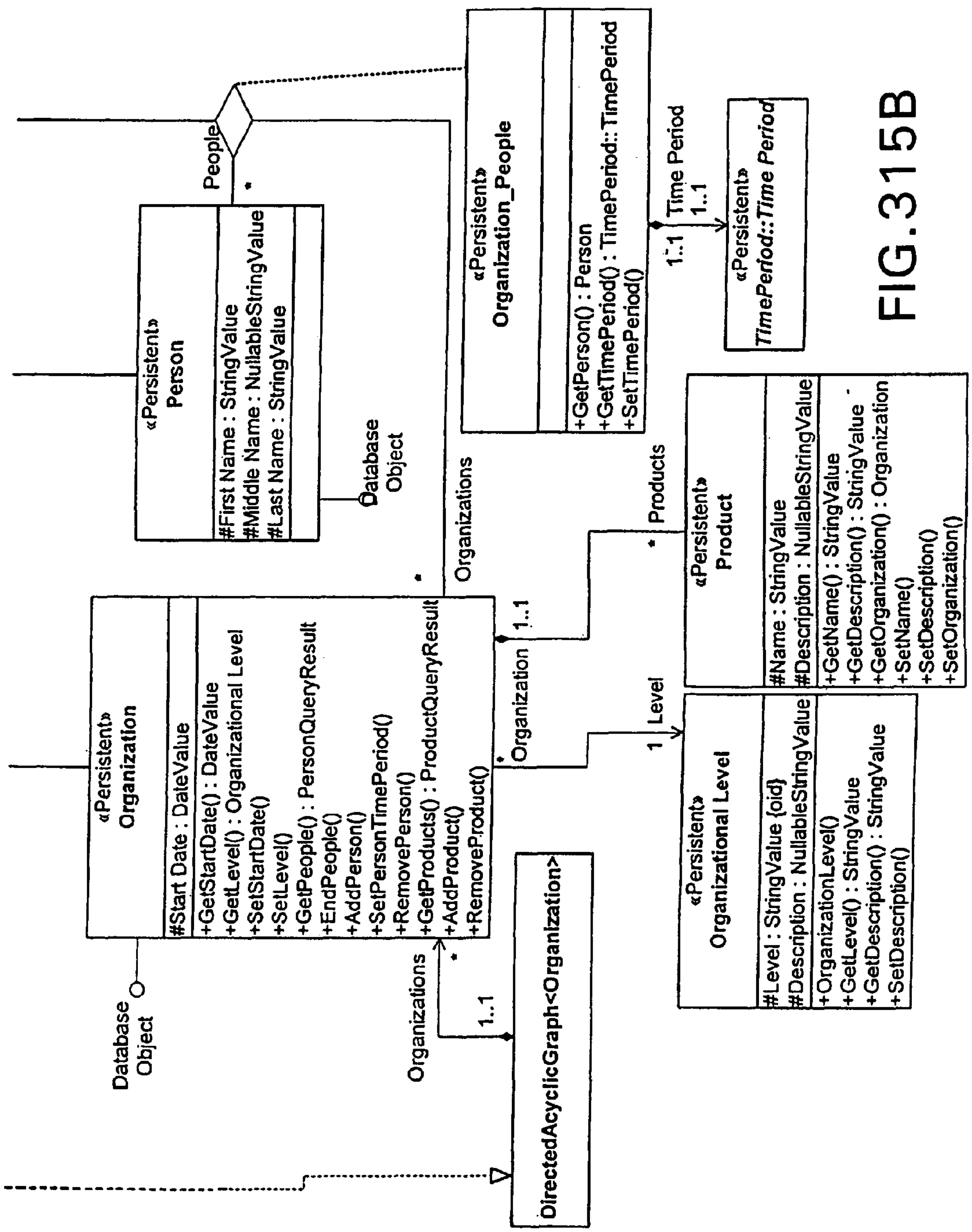
Figure 316:
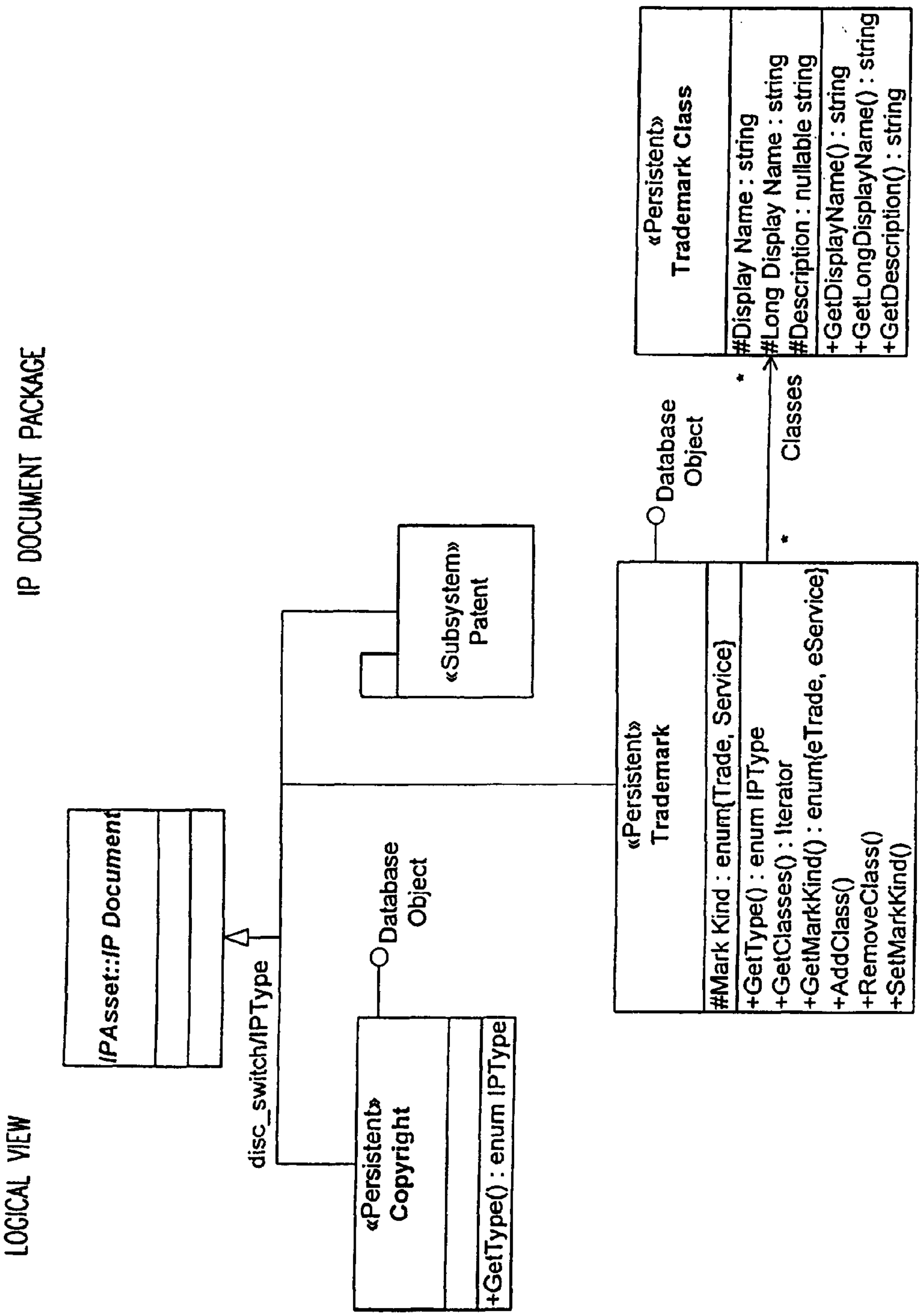
Figure 317:
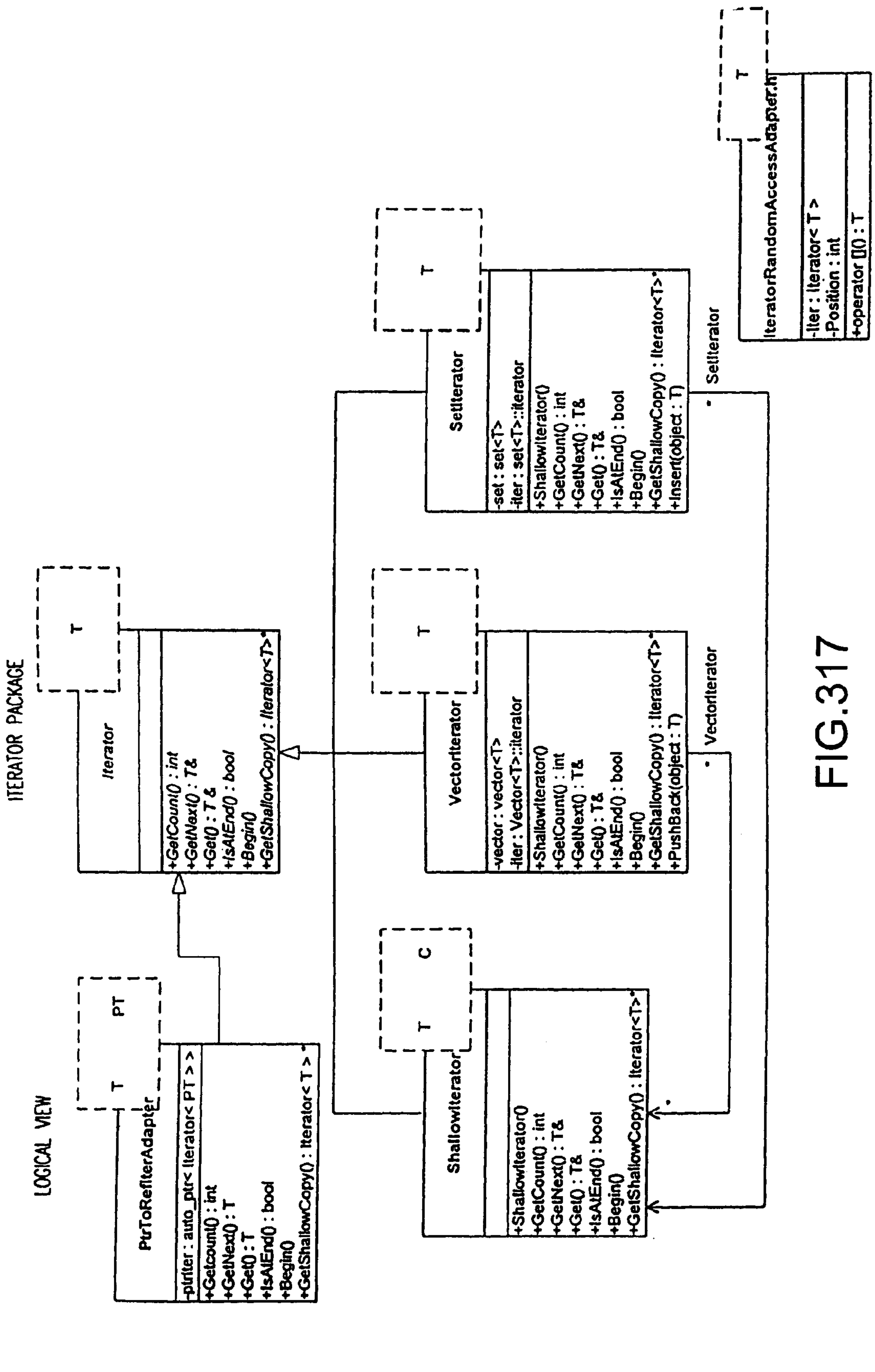
Figure 318A:
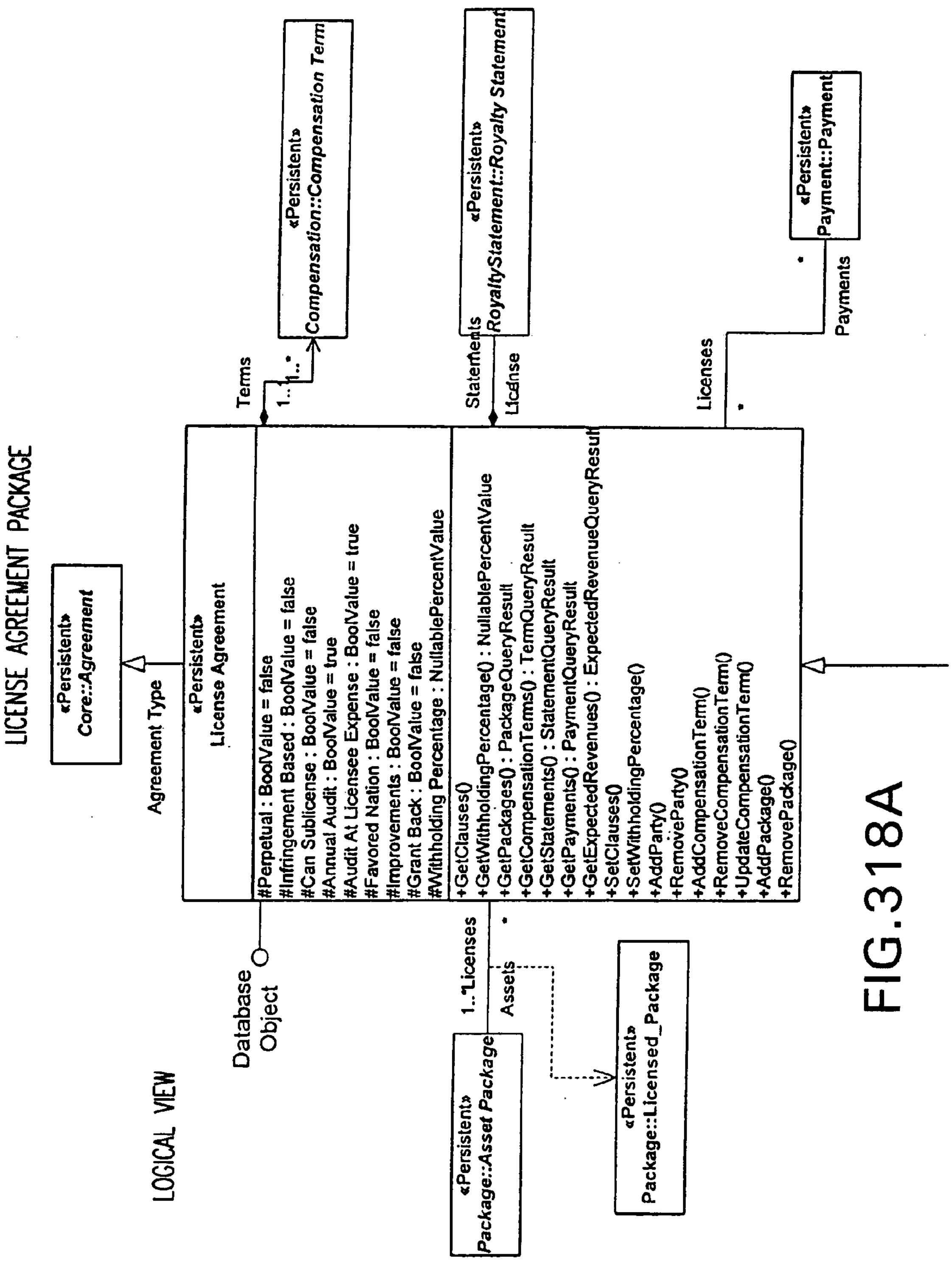
Figure 318B:
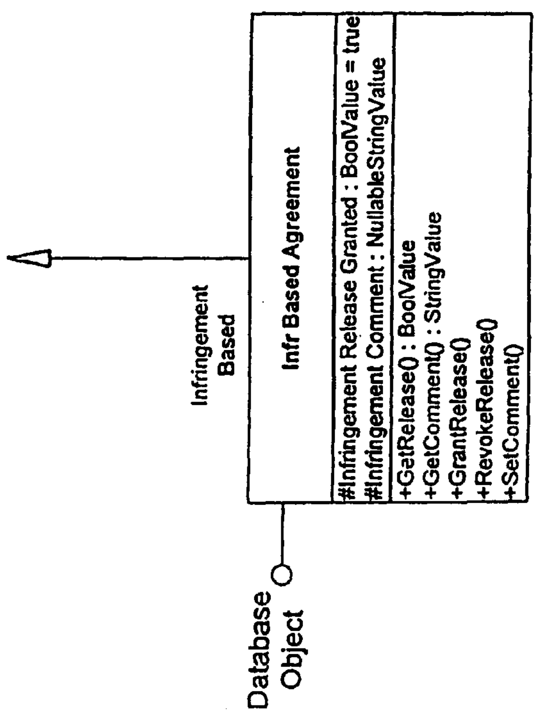
Figure 319:
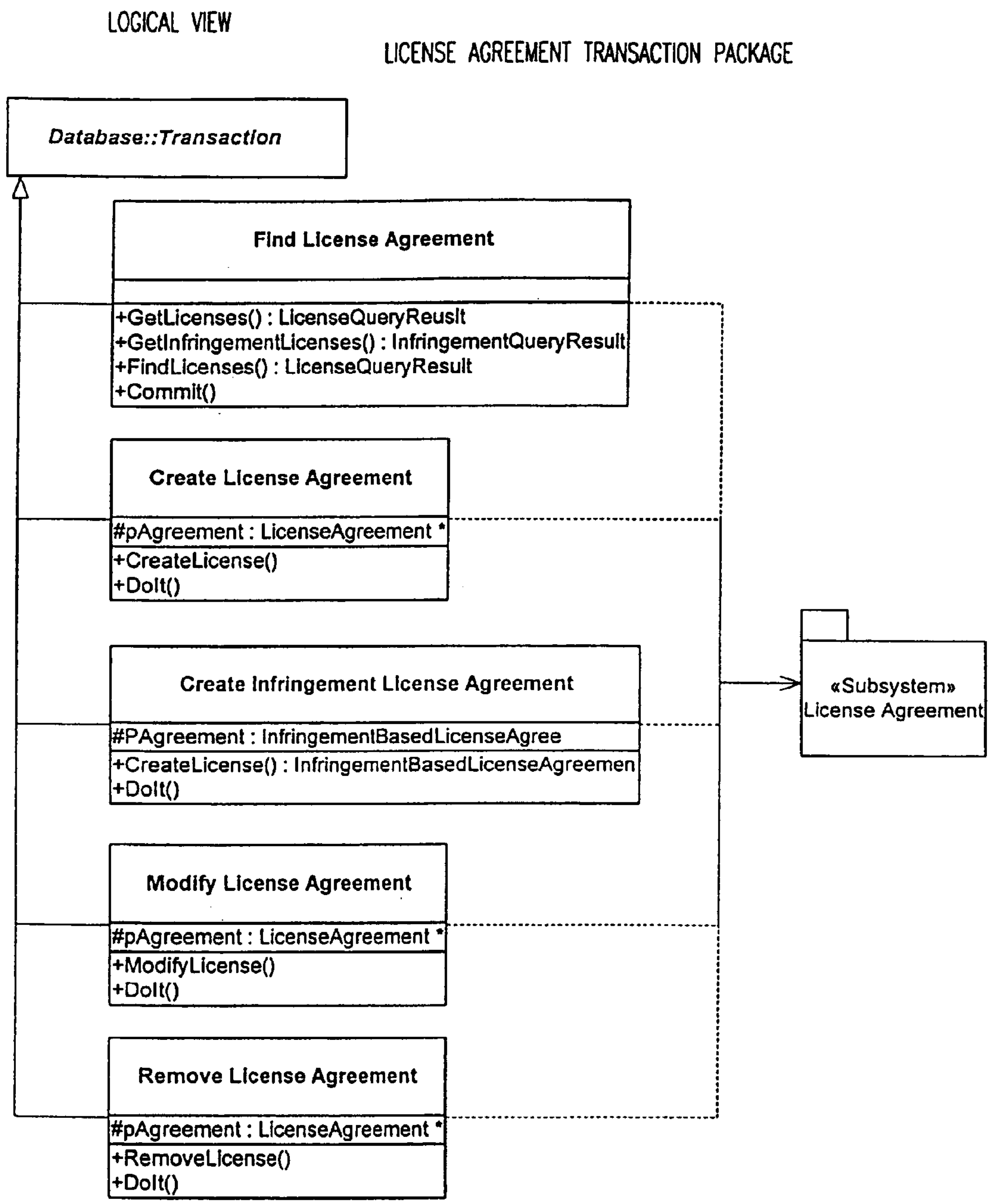
Figure 320A:
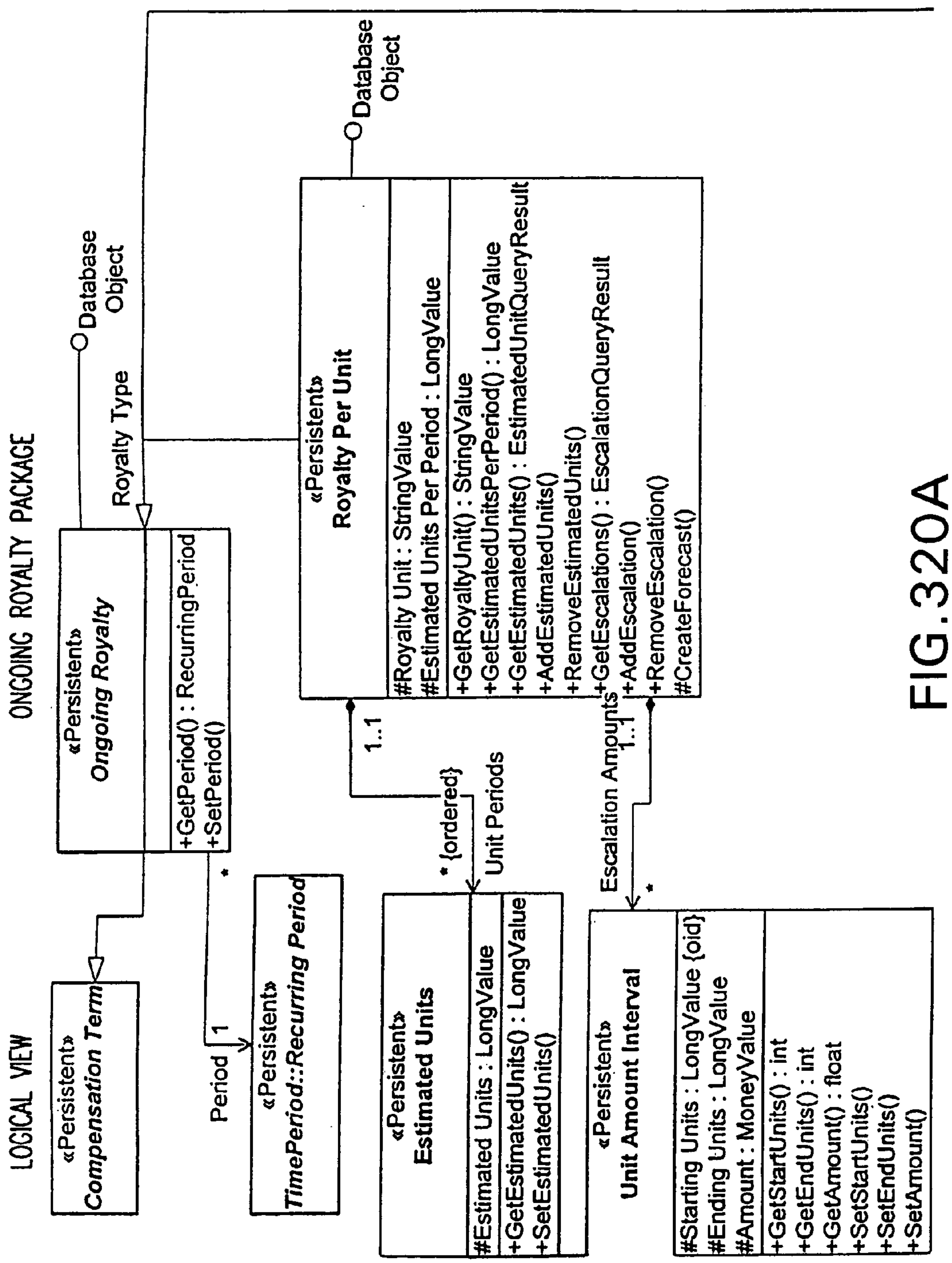
Figure 320B:
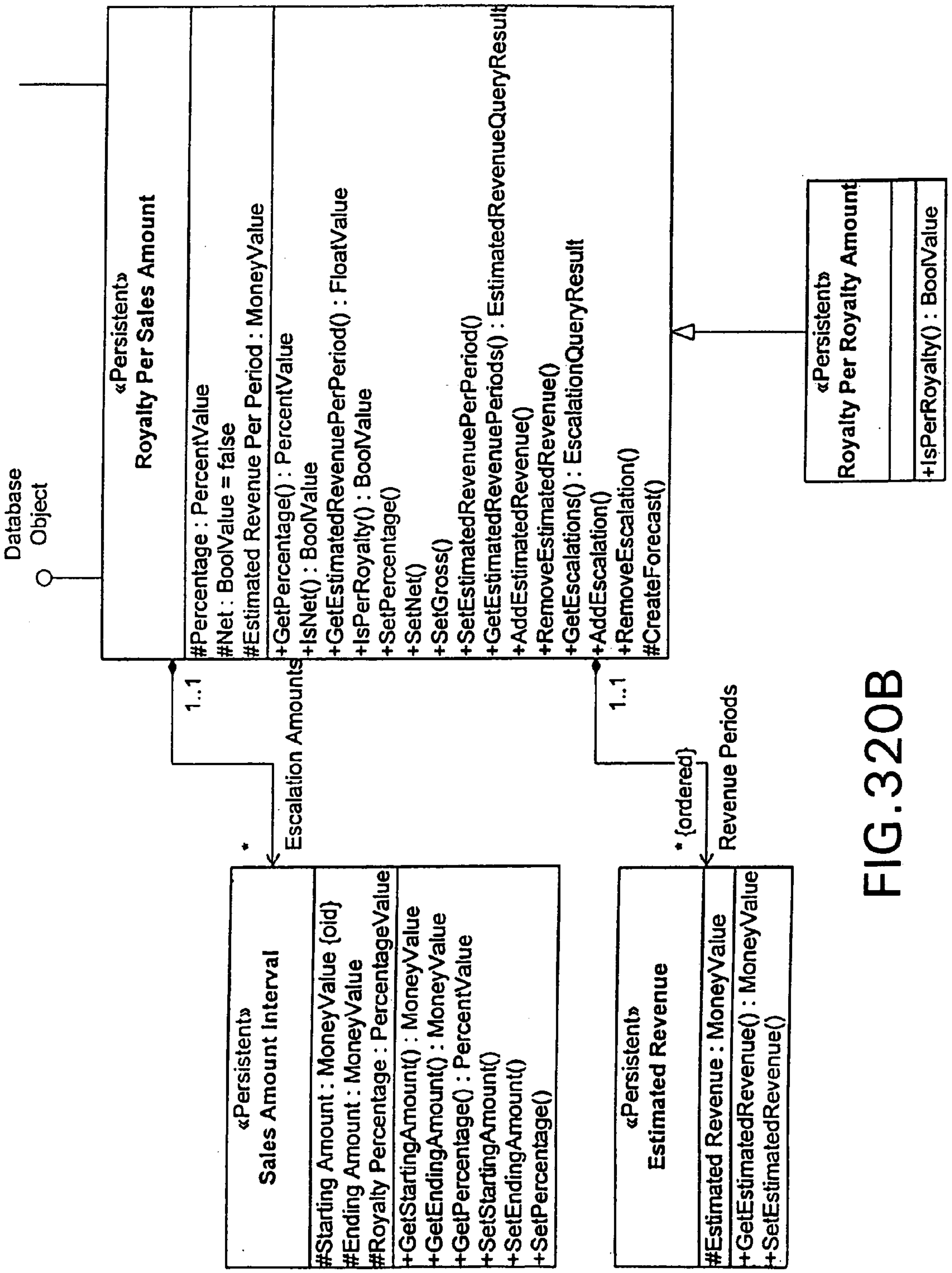
Figure 321A:
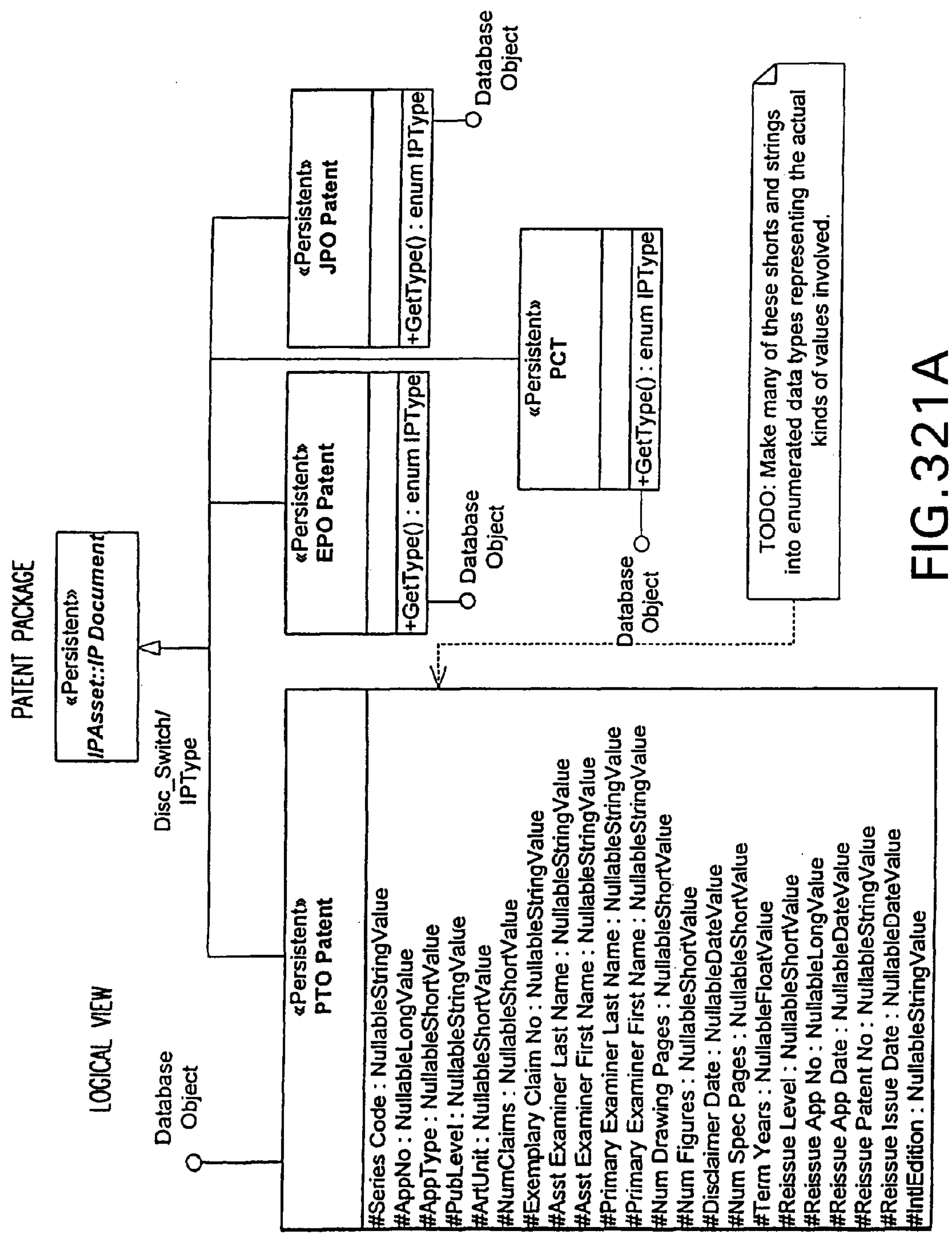
Figure 321B:
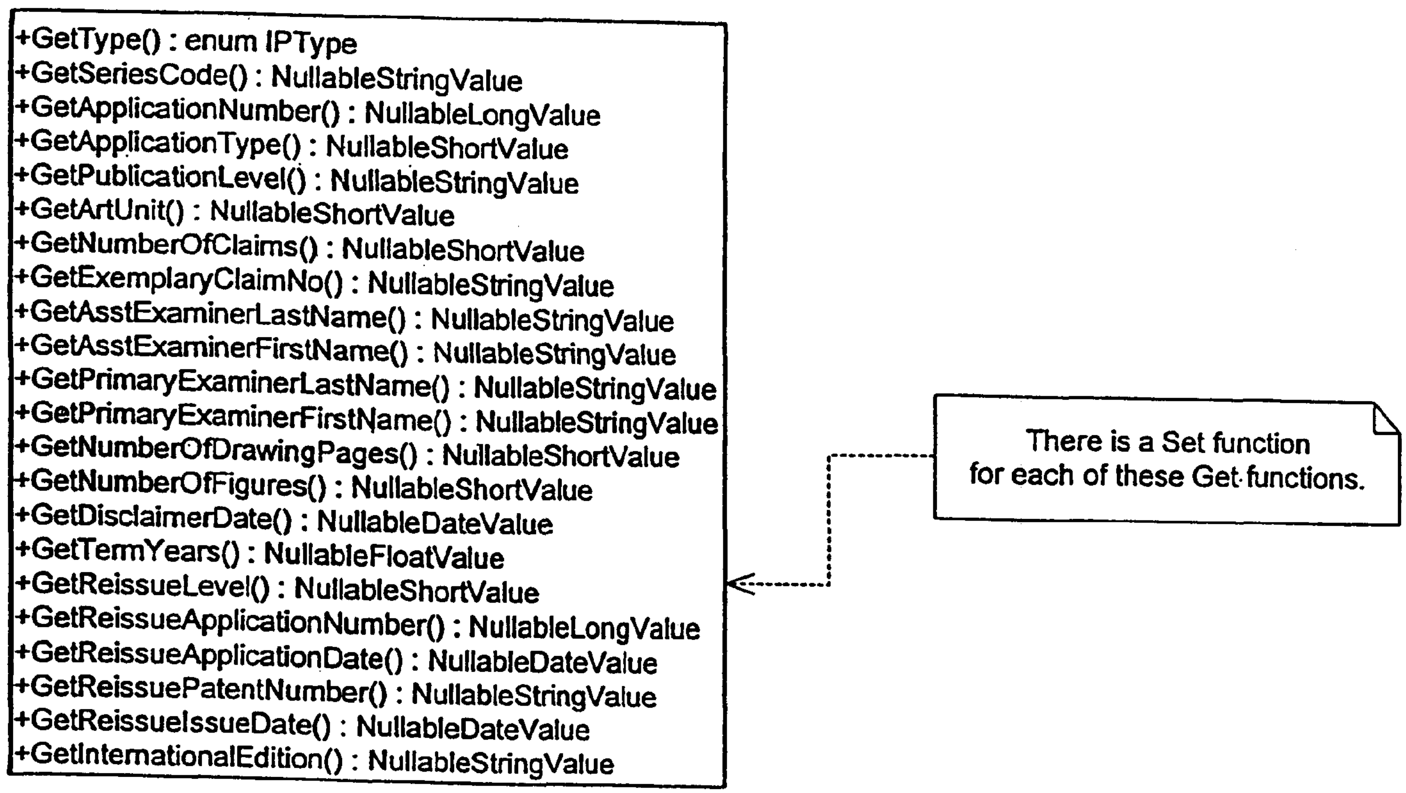
Figure 322A:
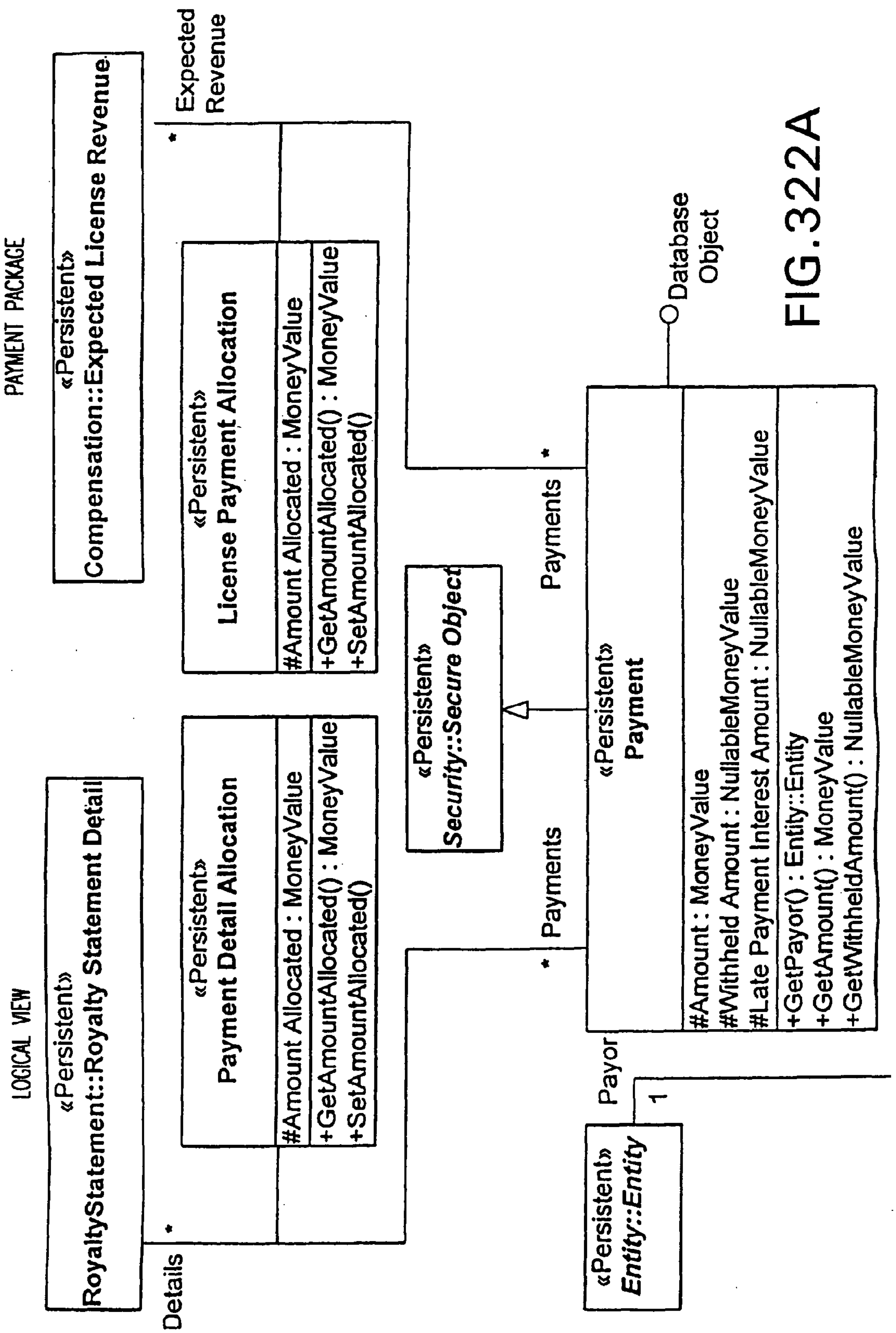
Figure 322B:
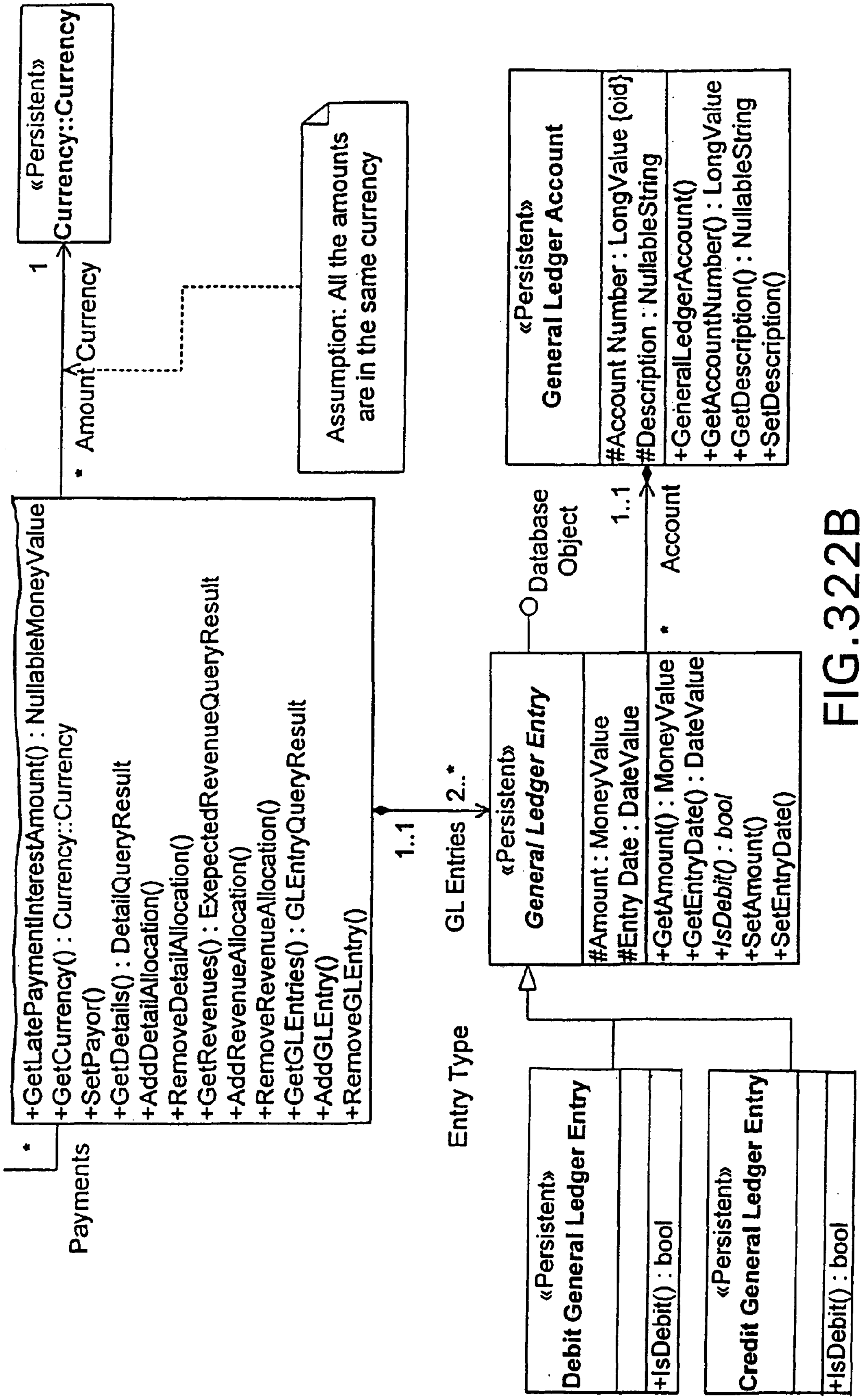
Figure 323A:
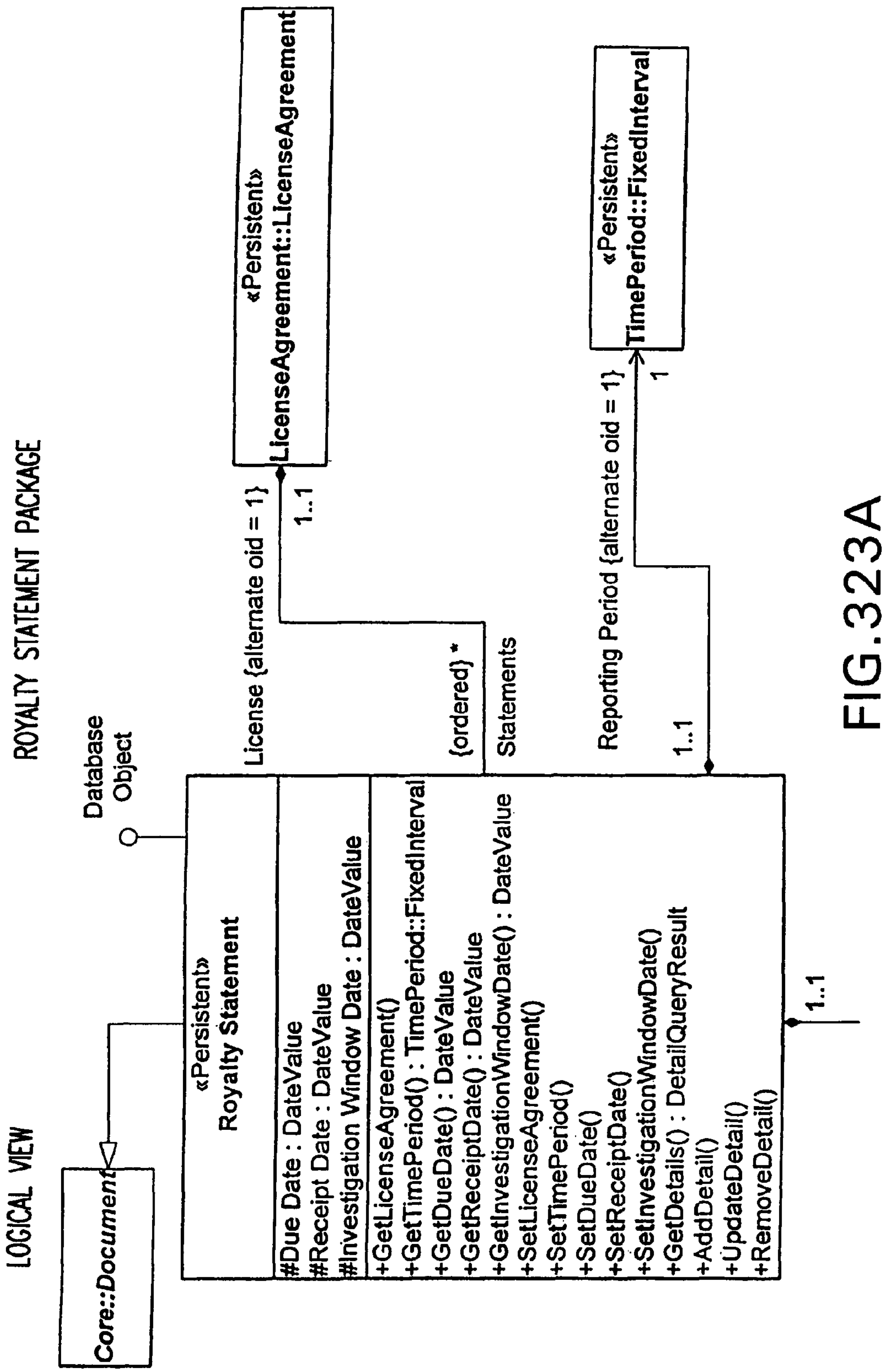
Figure 323B:
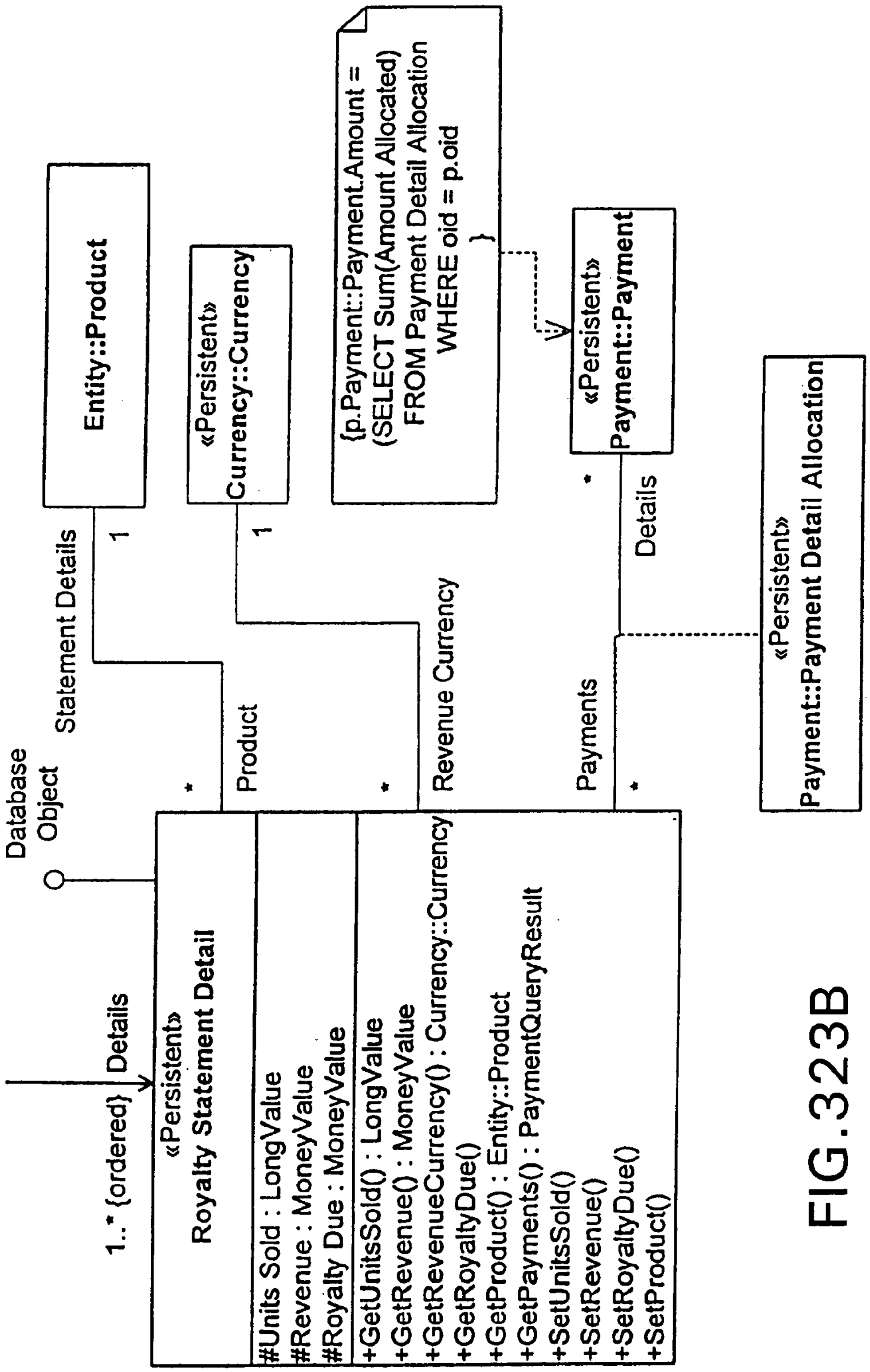
Figure 324A:
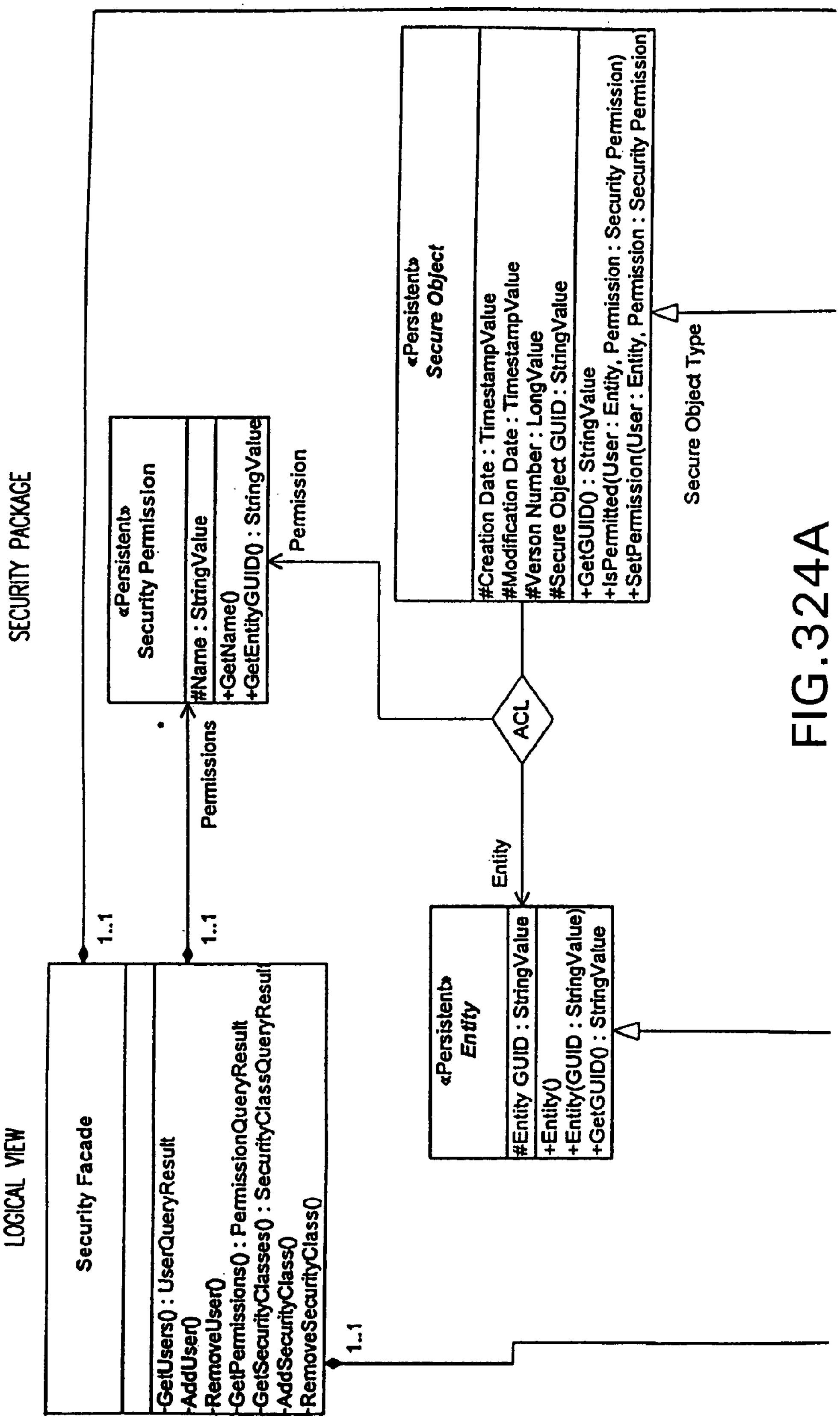
Figure 324B:
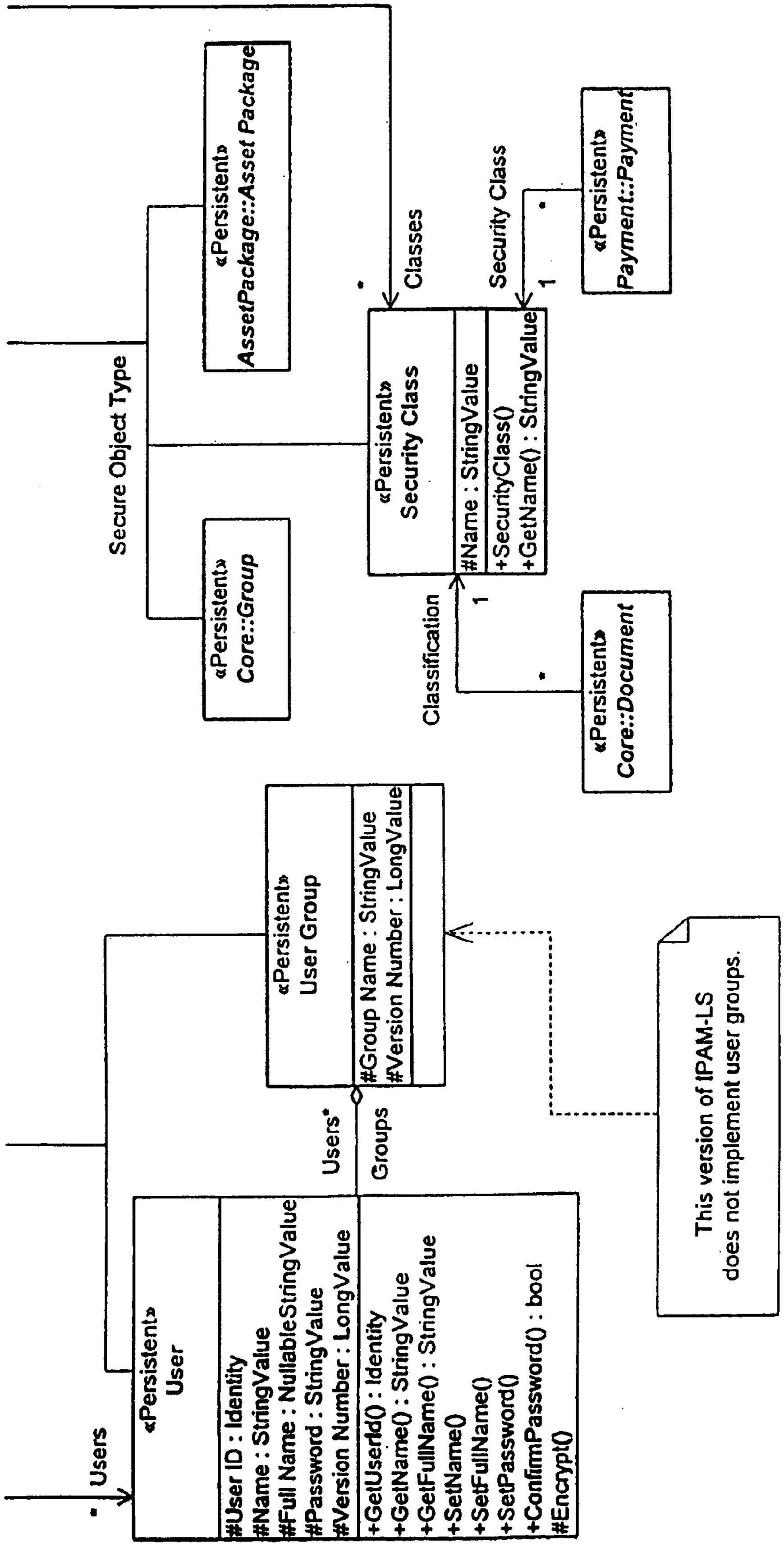
Figure 325A:
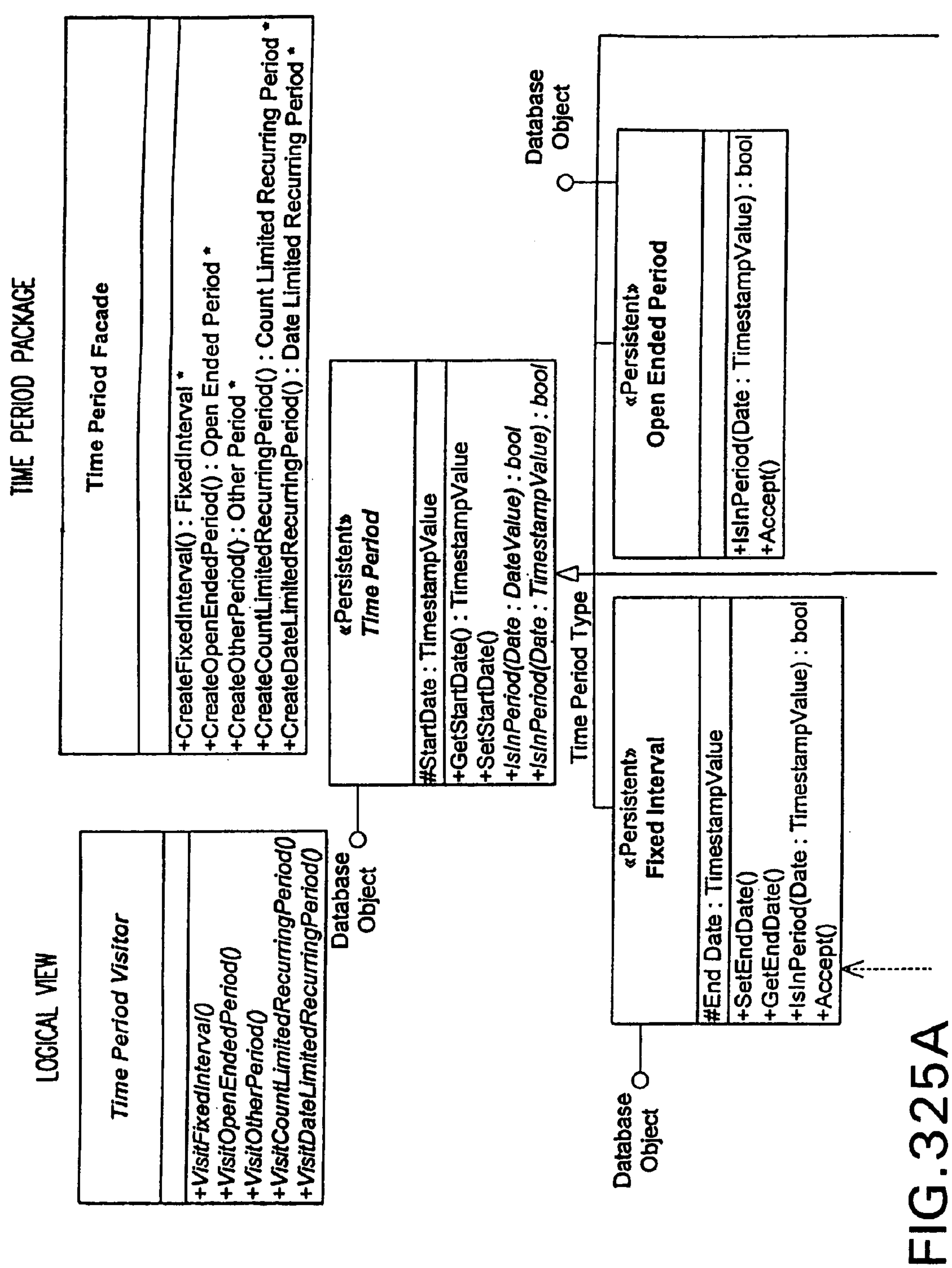
Figure 325B:
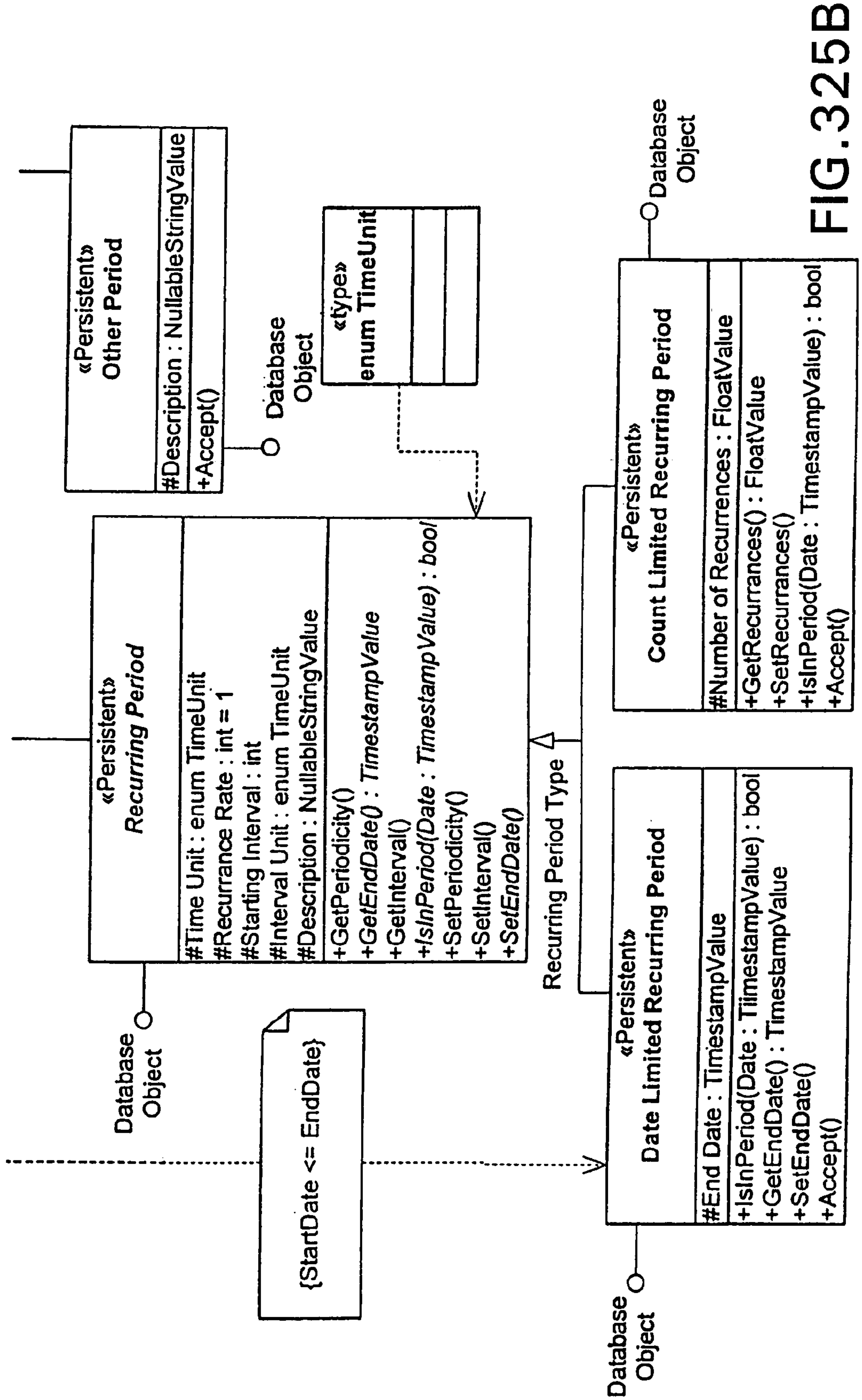
Figure 326A:
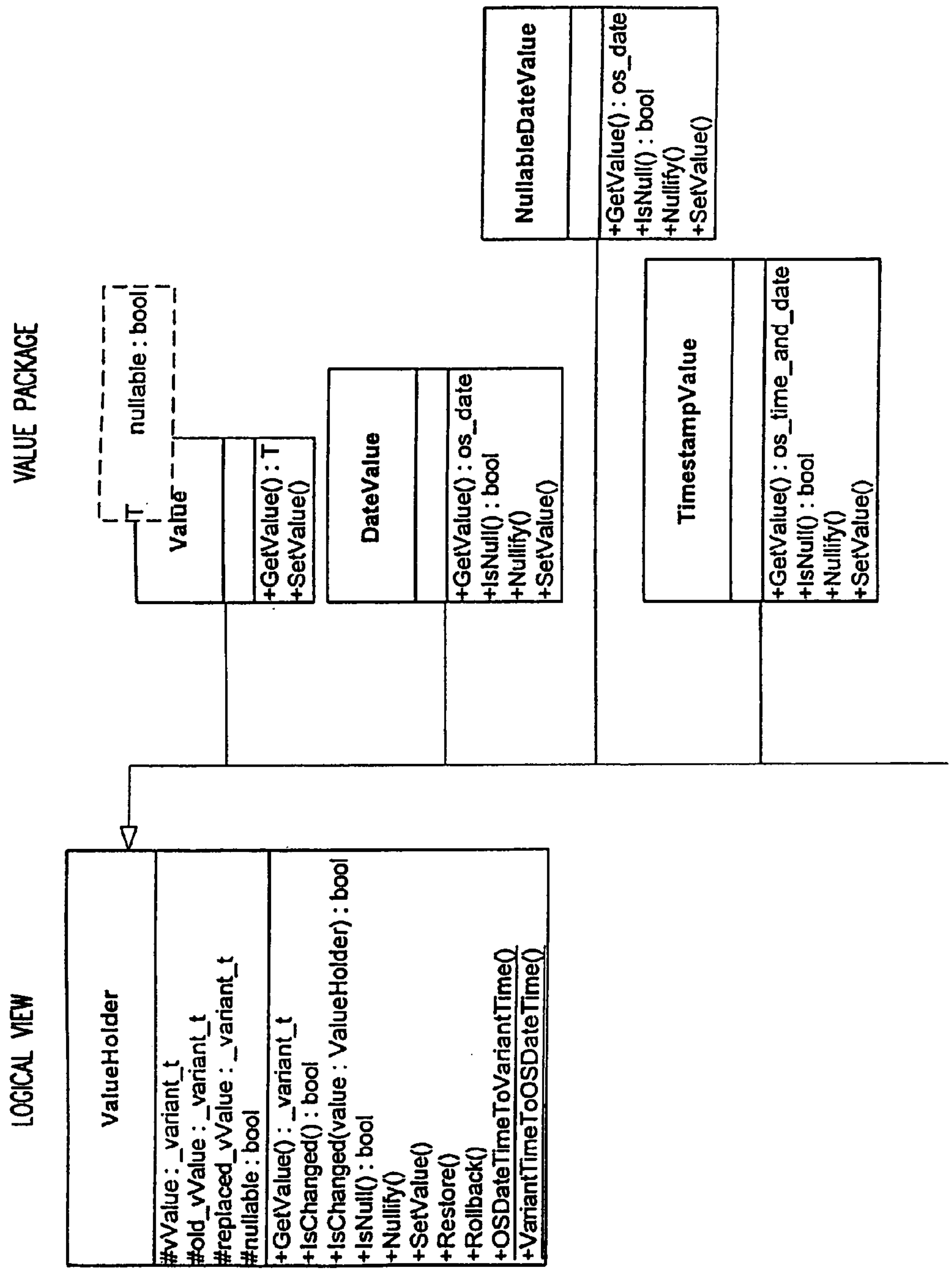
Figure 326B:
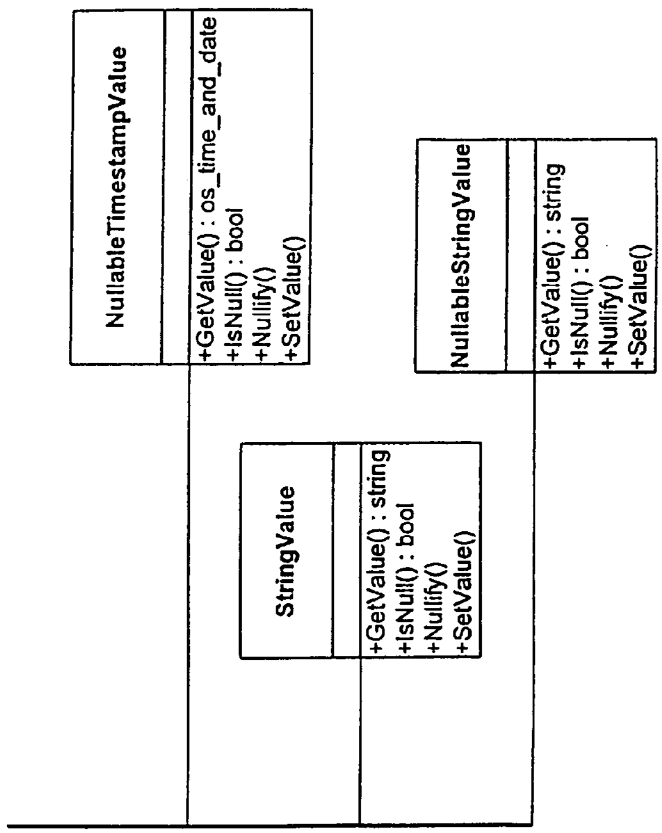

FIG. 187B illustrates a more detailed block diagram of the licensing module according to an embodiment of the invention;

FIG. 188 illustrates a standalone configuration of the licensing module;

FIG. 189 illustrates an integrated configuration of the licensing module;

FIG. 190 illustrates an example screen shot of an object display window generated by a licensing module according to an embodiment of the present invention;

FIG. 191 illustrates an actor hierarchy according to an embodiment of the licensing module;

FIG. 192 is a conceptional diagram of databases used by the licensing module according to an embodiment of the present invention;

FIG. 193A is a block diagram of the functional modules in the licensing module according to an embodiment of the invention;

FIG. 193B is a block diagram of a licensing administration module according to an embodiment of the invention;

FIGS. 194, 196, 197, 199-205, 207, 212, 217, 221, 222, 224, 225, 234, 236-239, 249-256, 258-262, 263B, 267-270, 276-283, 285, and 294-300 are diagrams of use cases representing operational functions of the licensing module according to an embodiment of the invention;

FIG. 195 is an example screen shot of a log-in window according to an embodiment of the invention;

FIG. 198 illustrates an example screen shot of a contact view according to an embodiment of the invention;

FIG. 206 illustrates an example screen shot of an asset view according to an embodiment of the invention;

FIG. 208 illustrates the use of pull down menus to create new objects according to an embodiment of the invention;

FIGS. 209-211 illustrate example screen shots of dialogs for entering new patent assets according to an embodiment of the invention;

FIGS. 213-216 illustrate example screen shots of dialogs for entering new trademark assets according to an embodiment of the invention;

FIGS. 218-220 illustrate example screen shots of dialogs related to entering new copyright assets;

FIG. 223 illustrates an example screen shot for entering a new know how asset according to an embodiment of the invention;

FIGS. 226-233 and 235 illustrate example screen shots of dialogs and windows associated with asset packages;

FIGS. 240A, 240B, 241, and 242 illustrate example screen shots of dialogs related to a find asset tool;

FIG. 243 illustrates the manner in which a pull down menu can be used to invoke a find tool;

FIGS. 244-248 and 257 illustrate example screen shots related to license agreements according to an embodiment of the invention;

FIGS. 263A and 264-266 illustrate example screen shots related to royalty statements according to an embodiment of the invention;

FIGS. 271-275 illustrate example screen shots related to payments according to an embodiment of the invention;

FIG. 284 illustrates an example screen shot of a reports view according to an embodiment of the invention;

FIGS. 286A-286C, 287A-287D, 288A-288F, 289, 290A-290B, 291A-291C, 292, and 293 illustrate example reports generated by the licensing module according to an embodiment of the invention;

FIGS. 301A and 301B illustrate a flowchart representing an example operational thread of an embodiment of the invention;

FIGS. 302-326 illustrate block diagrams of subsystems of the licensing module according to embodiments of the invention; and FIGS. 327-339 illustrate additional use case diagrams representing additional functions supported by the present invention.

In the following text, reference is sometimes made to existing U.S. patents. Also, some of the figures reference or illustrate existing U.S. patents. For illustrative purposes, information from and/or about these patents has sometimes been modified or created in order to support the particular examples being discussed. Accordingly, the information provided herein about these existing U.S. patents should be considered to be fictional unless verified through comparison with copies of the actual U.S. patents that are available from the U.S. Patent and Trademark Office.

DETAILED DESCRIPTION OF THE PREFERRED EMBODIMENTS

Table of Contents

Overview of the Invention
Components of the Invention
  Customer Corporate Entity
  Databases
    Document Databases
    Document Bibliographic Databases
      Patent Bibliographic Databases
      Other Document Bibliographic Databases Notes Database
Groups Databases
Predefined Groups Databases
Bill of Materials (BOM) Databases
Corporate Entity Databases
Inventor Databases (and Employees and Person Databases)
User-Defined Group Databases
Financial Databases
Security Database
Enterprise Server
Document Storage and Retrieval Module
Notes Module
Searching Module
Automatic Searches Related to Groups
Searching Algorithm
Grouping Module
Analysis Modules
Server Administration Module
Server Configuration Module
Command Dispatch Module
Clients
Network Clients
Web Clients
Enterprise Server API (Application Programming Interface)
Commands Processed by the Server Administration Module 418
Commands Processed by the Document Storage and Retrieval Module 408
Commands Processed by the Grouping Module 412
Commands Processed by the Notes Module 414
Commands Processed by the Analysis Modules 416
Client/Server Interaction
Patent-Centric URL Commands
Translation
Client Architecture
Databases
Document Bibliographic Databases
Group Databases
User Defined Groups
Predefined Group Databases
Bill of Materials (BOM) Databases
Corporate Entity Databases
Inventor, Employee, and Person Databases
Financial Databases
Security Databases
Enterprise Server and Client Functional Modules
Patent Mapping Module
Patent Citation Module
Patent Aging Module
Patent Clustering and Bracketing Module
Financial Module
Inventor Patent Count Module
Inventor Employment Information Module
Exporting Patent Data Module
Importing Patent Data Module
Methodology Embodiments
Patent Mapping and Mining
Situation Assessment
Competitive Analysis
Clustering and/or Bracketing
Inventor Analysis
Financial Analysis
Strategic Planning
Integrated Methodology Embodiment
User Interface
User Login
Console
Console Tool Bars
Creating a New Group
Editing Group Properties
Shared Groups
Invoking Patent-Centric and Group-Oriented Analysis Functions
Adding Documents to a Group
Adding a Document Note
Adding a Group Note
Searching
Web Searching
Importing Data
Exporting Data
Data Presenting and Processing Hyperbolic Trees
General Description of Hyperbolic Trees
Patent Citation Tree
Patent Citation Tree (Network Client)
Patent Citation Tree (Web Client)
Additional Patent Citation Visualizations
Patent Claims Tree
Licensing Module
User Roles
Architecture
User Interface
Licensing System User Interface Module
Licensing System Administrator User Interface Module
Data Entry
Licensing Reports
Data Module
Object Model
Data Access Module
Database Architecture
Licensing Module As a Standalone Module or Integrated with IPAM (IPAM Integrated)
Object Display Window of the User Interface of the Licensing module
Operational Features of the Licensing Module
General Purpose Use Cases
Login
Display Help
Print Object
Contacts
Enter Entity
Enter Contact Method
Display Entities
Modify Entity
Modify Contact Method
Link Person to Organizational Role
Print Entity
Remove Entity
Query Entities
Asset Use Cases
Enter Patent
Enter Trademark
Enter Copyright
Enter Trade Secret
Enter Know How
Modify IP Asset
Asset Package Use Cases
Create IP Asset Package
Modify IP Asset Package Print Asset Package
Remove IP Asset
Remove IP Asset Package
Query Assets
Query Asset Packages
License Agreements Use Cases
Enter License Agreement
Link to Party
Link to Asset Package
Enter Compensation Term
Create Expected Revenue
Modify Compensation Term
Remove Compensation Term
Query License
Modify License Agreement
Remove License Agreement
Print License
Administer Territories
Administer Fields of Use
Display License Agreements
Enter Adjustment
Modify Adjustment
Link to Adjustment
Remove Compensation Adjustment
Royalty Statements Use Cases
Enter Royalty Statement
Modify Royalty Statement
Query Statement
Remove Royalty Statement
Print Statement
Display Royalty Statements
Query Statement
Payment Use Cases
Enter Payment
Modify Payment
Link to Expected Revenue
Link to Detail
Print Payment
Remove Payment
Query Payment
Maintain GL Accounts
Link Payment to Entity
Display Payments
Time Period Use Cases
Enter Recurring Time Period
Modify Recurring Time Period
Reports Use Cases
Generate Report
Security Use Cases
Administer Entities (Users)
Administer Security Classes
Grant Permissions
Administer Roles
Currency Use Cases
Convert Currency
Maintain Currency Conversions
Top Level Operational Examples Of the Licensing System
Conclusion Overview of the Invention The present invention is directed to a system, components of the system, a method, components of the method, and a computer program product for patent-centric and group-oriented data processing. Such processing includes, but is not limited to, reporting, analyzing, and planning.

The present invention is intended to aid a corporate entity in developing business-related strategies, plans, and actions. Accordingly, the present invention is also referred to herein as a business decision system and method.

Figure 1:
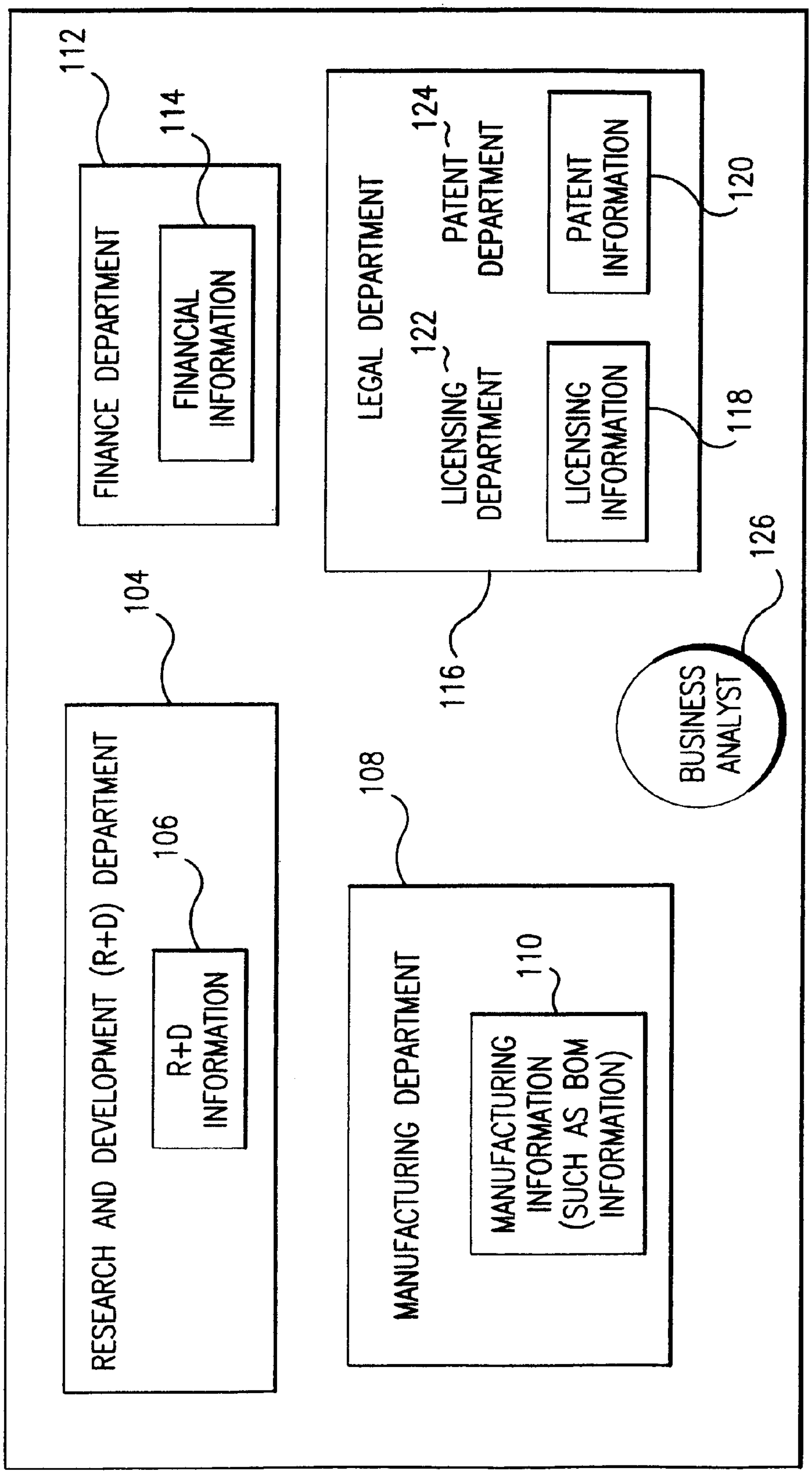
FIG. 1 represents the generation and maintenance of documents in a conventional corporate entity.
Figure 2:
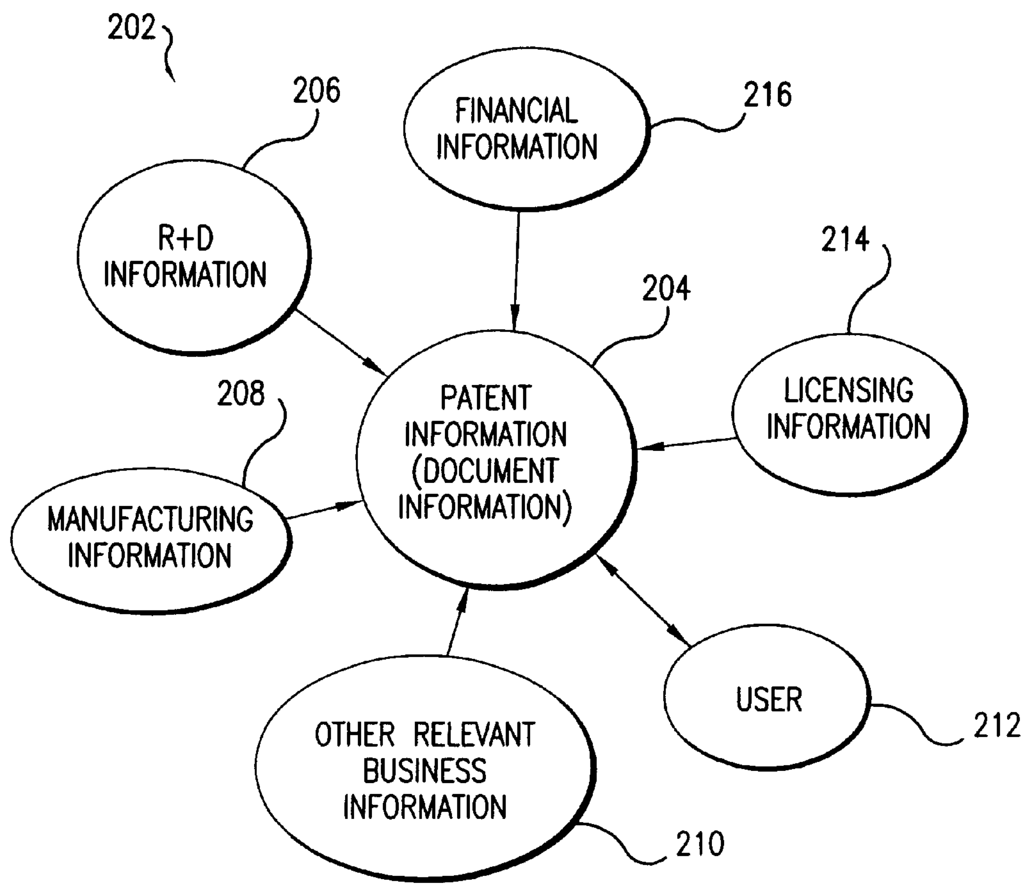
FIG. 2 illustrates the document-centric and patent-centric operation of the present invention.

FIG. 2 is a conceptual representation of the invention. The present invention processes patent information 204, which is herein defined to include (but not limited to) U.S. and non-U.S. patents (text and/or images) and post issuance documents (such as Certificates of Correction), and patent-related information, which includes information about patents (herein called patent bibliographic information). Accordingly, the processing performed by the invention is said to be "patent-centric" or "patent-specific."

More generally, the present invention processes any documents, some of which are related to patents, and others which are unrelated to patents. These documents are preferably of interest to a business entity, and include contracts, licenses, leases, notes, commercial papers, other legal and/or financial papers, etc., as well as patents.

For illustrative purposes, the invention is often described herein with respect to patents. However, it should be understood that the invention is also applicable to all types of documents, and the structures, functions, and operations described herein are applicable to all types of documents, whether patent or non-patent.

The present invention also processes other information, preferably business-related information, including (but not limited to) research and development (R&D) information 206, financial information 216, patent licensing information 214, manufacturing information 208, and other relevant business information 210 (which may, for example, include human resources information). This other information is generally called non-patent information (since it includes documents other than patents and may further include information from operational and non-operational corporate databases).

The present invention is adapted to maintain and process massive amounts of documents (several hundred thousand or more). It is often necessary to maintain and process this large number of documents in order to develop strategic, patent-related business plans for the customer.

According to the present invention, processing of the patent information 204 can be conducted either with or without consideration of any of the other information 206, 216, 214, 210, 208.

For example, a user 212 (who may be a business analyst) may be assigned the job of evaluating the value of the corporation's patent portfolio (represented as part of the patent information 204). In order to fully analyze the value and applicability of the corporation's patent portfolio, the user 212 must take into account other information, such as R&D information 206, financial information 216, manufacturing information 208, and licensing information 214, for both the corporation and its competitors.

For example, a patent's value may be linked to whether it covers technology that the corporation is currently using, or that the corporation may use in the future. For this and other purposes, the present invention includes functions for automatically analyzing the patent information 204 in conjunction with manufacturing information 208 and/or R&D information 206. Also, a patent's value may be linked to whether it has generated licensing revenue. For this and other purposes, the present invention includes functions for automatically analyzing the patent information 204 in conjunction with the licensing information 214. Further, a patent's value may be linked to the degree of success of the corporation's commercial products related to the patent (i.e., the commercial embodiments of the patented technology). For this and other purposes, the present invention includes functions for automatically analyzing the patent information 204 in conjunction with the financial information 216.

The invention could also be used to determine the value of a corporate entity's patent portfolio for purposes of a merger or acquisition. The invention could also be used in a merger or acquisition context to determine a corporate entity's business direction. For example, if Company A is interested in acquiring Company B, Company A could use the invention to categorize all of Company B's patents into groups. The nature of these groups would be an indication of the types of work that Company B is involved in. Other uses of the invention are described below. Further uses of the invention will be apparent to persons skilled in the relevant art(s) based on the discussion contained herein.

The present invention is group enabled. According to the present invention, a group is a data structure that includes a collection of patents. The patents in a group typically follow a common theme or characteristic (although this is not a mandatory requirement of groups). For example, a first group may include patents that map to a product being manufactured and sold by a company. A second group may include patents that map to a product or product feature being considered for future manufacture and sale by a company. A third group may include patents owned by a corporate entity. A fourth group may include patents each having a particular person named as an inventor. A fifth group may include patents owned by a competitor. A sixth group may include patents related to a research project. A seventh group may include licensed patents. An eighth group may include patents and/or non-patent documents related to a litigation in which the customer is involved or has an interest (such a group is also herein called a case). A ninth group may include patents and other documents arbitrarily selected by a customer.

The present invention is capable of automatically processing the patents in a group, or the patents in multiple groups (alternatively, the invention can automatically process a single patent). Accordingly, the present invention is said to support "group-oriented" data processing.

Being able to automatically process information on a group basis is a very important feature of the invention, and proves to be very valuable and useful. Consider the above example of FIG. 2, where the user 212 has the task of evaluating the value of the corporation's patent portfolio. Suppose that the corporation has two products on the market, Product A and Product B. Product A generated $10 million in revenue, and Product B generated $30 million in revenue. The corporation has 5 patents that map to Product A, and 3 patents that map to Product B. If the user 212 analyzes this data without regard to groups, then the user 212 will find that the corporation's revenue per patent is $5 million. That is, for every $5 million in revenue, the corporation obtains a patent. Suppose that a relevant industry benchmark indicates that a company should obtain a patent for every $6 million of revenue. According to this scenario, the user 212 will conclude that the corporation is potentially seeking greater patent protection than the industry benchmark with respect to its technology.

Consider, now, the scenario where the user 212 analyzes the data with regard to groups, in this case a first group composed of patents that map to Product A, and a second group composed of patents that map to Product B. The user 212 will find that corporation's revenue per patent is $2 million for the first group (i.e., patents that map to Product A), and $10 million for the second group (i.e., patents that map to Product B). According to this scenario, the user 212 will conclude that the corporation is potentially devoting too much of its patent-related resources with respect to its technology related to Product A (it is "overpatenting" technology related to Product A), and potentially devoting too little of its patent-related resources with respect to its technology related to Product B (it is "underpatenting" technology related to Product B).

In addition, an analysis of the patents relative to a product may indicate that the core features or technology of the product are not patented and, thus, could be freely and legally copied by a competitor. This could adversely affect the product's price floor and revenue stream. With this information in hand, the company could then take steps to more comprehensively patent its technology (or make a conscious and knowledgeable decision to not seek further patent protection). Without group-oriented processing of the patents related to the product, this information is unavailable. Without this information, the company is more likely to make unwise and costly business decisions.

As indicated by the above example, group-oriented processing yields information on a scale whose granularity is defined by the definition of the group. The information produced by group-oriented processing is specific to the patents in the group. Accordingly, as with the above example, group-oriented processing is often more useful and more illuminating than non-group-processing.

Also, the invention supports hierarchically structured groups. The invention, in performing a function requested by the operator, may identify a particular group. Such identification of this group may yield very useful information, as apparent from the above example. This group, however, may have a number of parent and/or child groups. The operator may be able to uncover additional useful data by viewing, analyzing, and/or processing these parent and child groups, either with or without the original group.

Accordingly, the invention supports and facilitates "data drilling" and/or "data mining."

As noted above, according to the present invention, processing of the patent information 204 is conducted with consideration of other information 206, 216, 214, 210, 208, called non-patent information. The process of assigning patents to groups is an example of processing patent information with non-patent information. This is the case, because groups are often created according to non-patent considerations. Accordingly, any subsequent processing of the patents in a group involve, by definition, non-patent considerations.

For example, the customer may create groups to represent its products. In this case, the groups are created according to the customer's production information. In another example, the customer may create groups to represent persons of interest. In this case, the groups are created according to HR (human resources) information. In another example, the customer may create groups to represent its competitors. In this case, the groups are created according to business information or practices. In another example, the customer may create groups based on its future products or feature requirement. In this case, the groups are created according to its R&D information.

All of these groups are created based on or in consideration of non-patent information, not patent information. Accordingly, any subsequent group processing of the patents contained in any of these groups represents, by definition, processing of the patent information 204 with consideration of, or in conjunction with, or based on non-patent information 206, 216, 214, 210, 208. This is the case, even if such subsequent group processing involves only, for example, patent bibliographic information (i.e., patent information), such as group processing based on patent issue dates or group processing based on patent references, since the groups being processed were created based on or in consideration of non-patent information, including non-patent information 206, 216, 214, 210, 208.

A group may also contain non-patent documents. In fact, a group may contain only non-patent documents. Accordingly, a group is more generally defined as a collection of documents (such as patent documents only, non-patent documents only, or a combination of patent and non-patent documents). The documents in a group typically follow a common theme or characteristic (although this is not a mandatory requirement of groups). Referring to FIG. 2, the invention processes document information 204 alone, or in conjunction with other information 206, 216, 214, 210, 208 (which may or may not be related to the documents). Accordingly, the processing performed by the present invention is more generally described as being document-centric and group-oriented.

Components of the Invention

Figure 3:
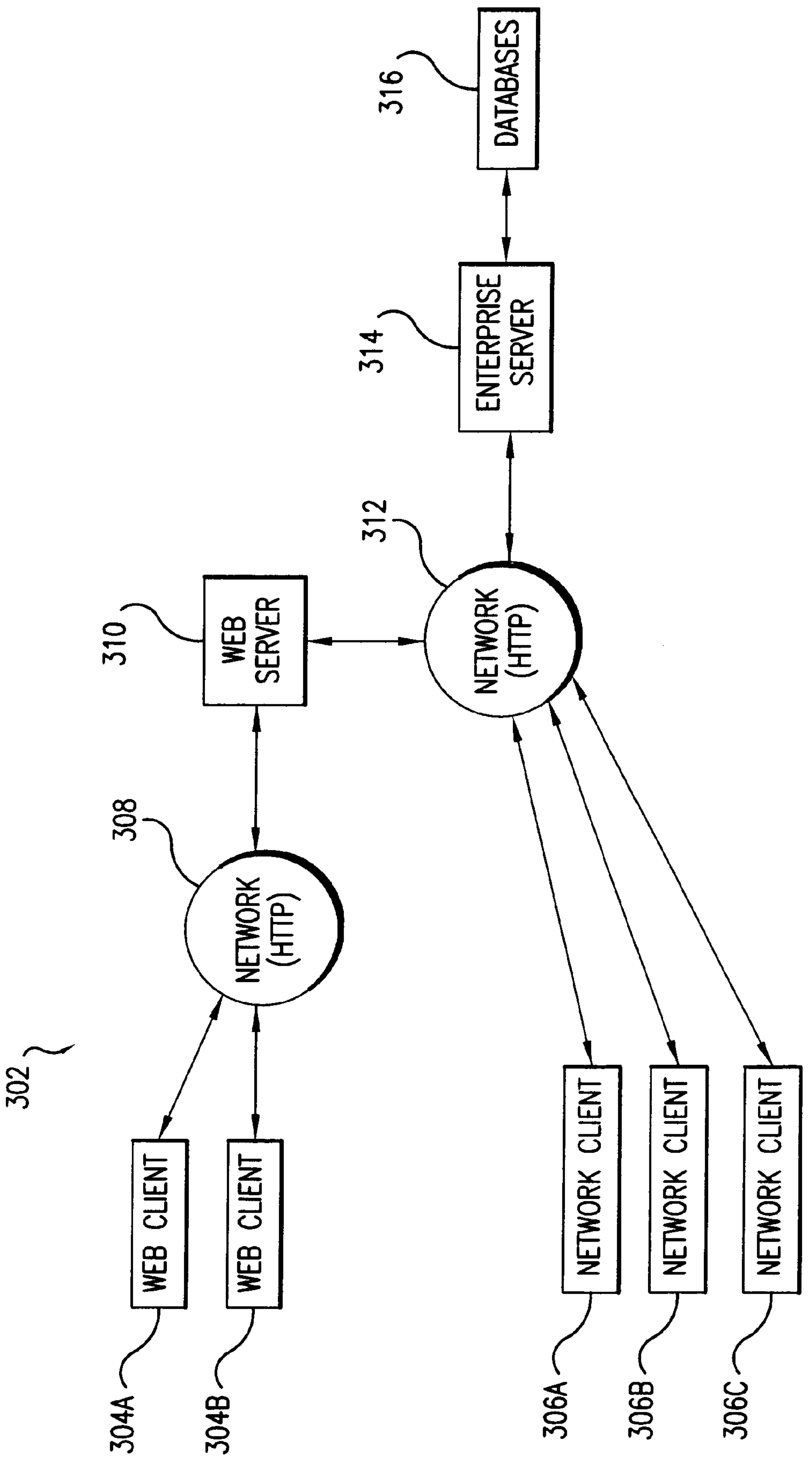
FIG. 3 is a block diagram of a system according to a preferred embodiment of the present invention.

FIG. 3 is a block diagram of a system 302 according to an embodiment of the invention. The system 302 includes a plurality of databases 316 that store patent information and other information, such as R&D (research and development) information, financial information, licensing information, manufacturing information, HR (human resources) information, and any other information that may be pertinent to the analysis of the patent information. The terms "database" and "table" are used synonymously herein.

An enterprise server 314 accesses and processes the information in the databases 316. In particular, the enterprise server 314 includes modules that are capable of automatically accessing and processing the information in the databases 316 in a patent-centric (or document-centric) and group-oriented manner. These modules are also capable of automatically accessing and processing the information in the databases on a patent by patent basis ("one patent at a time"). Such processing includes, but is not limited to, reporting, analyzing, and planning.

Figure 5:
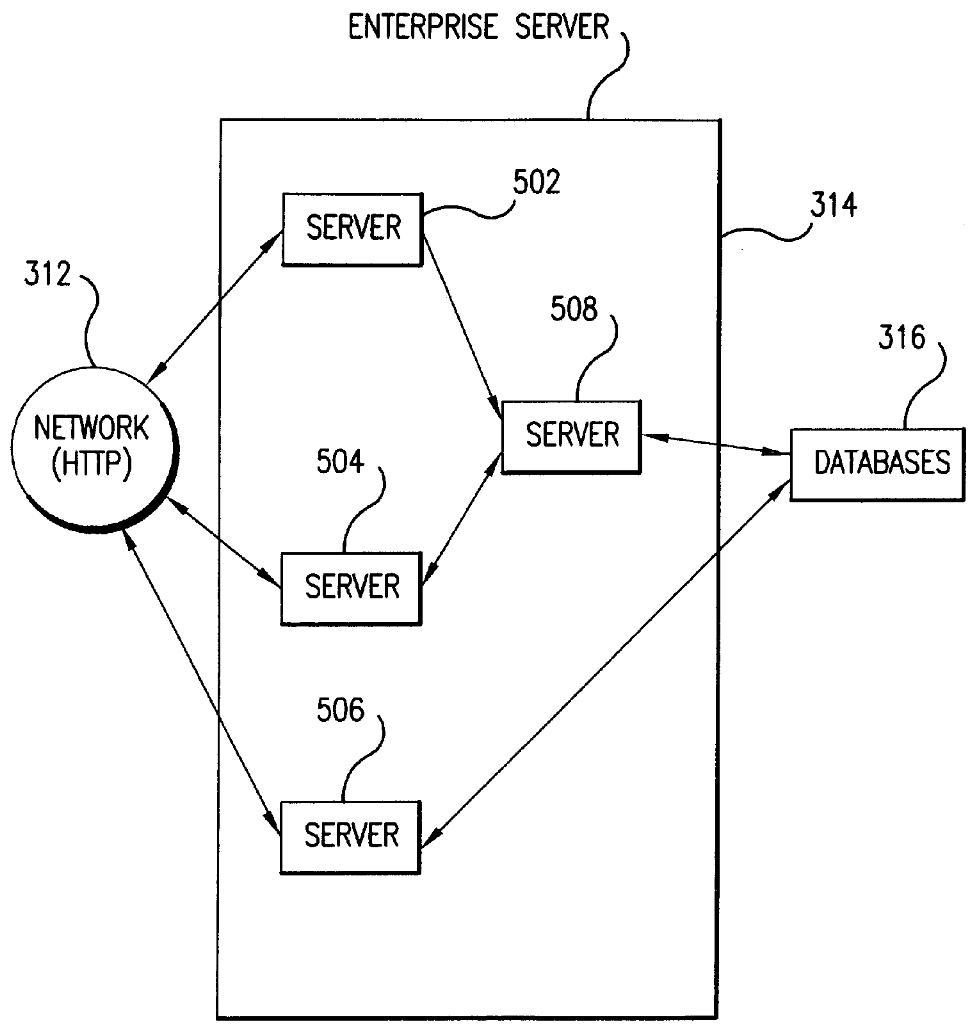
FIG. 5 illustrates a potential deployment of the enterprise server of FIG. 4.

The enterprise server 314 may be a single physical server, or may be a hierarchy of multiple servers 502, 504, 506, 508. An example of this multiple server embodiment is illustrated in FIG. 5. A given client 304, 306 may also connect to one or multiple servers. As is well known, in a client/server environment, some work is done by the client, some work is done by the server, and data flows between the client and the server.

The system 302 preferably includes two types of clients, network clients 306 and web clients 304. These clients 304, 306, pursuant to instructions from human operators or users (not shown), interact with the enterprise server 314 to access and process the information in the databases 316. For example, the clients 304, 306 may request that the enterprise server 314 retrieve certain information, or automatically analyze certain information. The enterprise server 314 performs the requested tasks, and sends the results to the requesting clients 304, 306. The clients 304, 306 present these results to their respective operators, and enable the operators to process the results.

Clients 304, 306 may also perform additional processing of data, such as creating a visualization of the data obtained from the enterprise server 314.

Generally speaking, the network clients 306 preferably communicate with the enterprise server 314 using the enterprise server 314's natural language, which is called the enterprise server API (described in detail below). Accordingly, the network clients 306 communicate directly with the enterprise server 314 via a communication network 312, which is preferably a network that uses the well known HTTP (hypertext transport) protocol. Other protocols could alternatively be used. This network 312 may be of any size, such as (but not limited to) a local area network or a wide area network (it can even be a global network).

The web clients 304 do not preferably utilize the enterprise server 314's natural language. Accordingly, the web clients 304 communicate with the enterprise server 314 via a web server 310, which translates between the language of the web clients 304 and the language of the enterprise server 314. This translation is described below.

Figure 11:
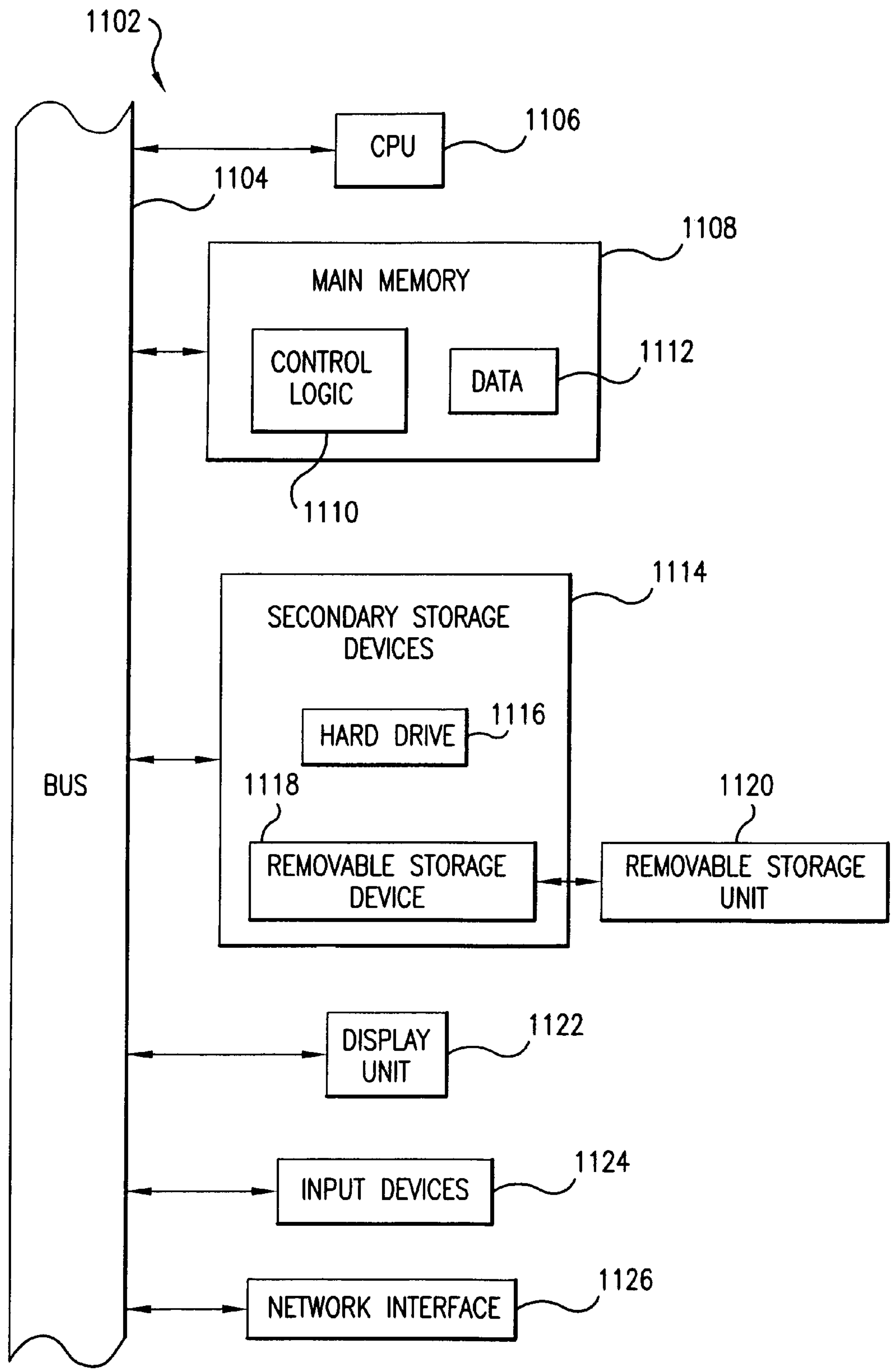
FIG. 11 is a block diagram of a computer useful for implementing components of the invention.

In an embodiment of the present invention, the components of the present invention shown in FIG. 3 are implemented using well known computers, such as a computer 1102 shown in FIG. 11. The computer 1102 can be any commercially available and well known computer capable of performing the functions described herein, such as computers available from International Business Machines, Apple, Silicon Graphics Inc., Sun, HP, Dell, Compaq, Digital, Cray, etc.

The computer 1102 includes one or more processors (also called central processing units, or CPUs), such as a processor 1106. The processor 1106 is connected to a communication bus 1104. The computer 1102 also includes a main or primary memory 1108, preferably random access memory (RAM). The primary memory 1108 has stored therein control logic 1110 (computer software), and data 1112.

The computer 1102 also includes one or more secondary storage devices 1114. The secondary storage devices 1114 include, for example, a hard disk drive 1116 and/or a removable storage device or drive 1118. The removable storage drive 1118 represents a floppy disk drive, a magnetic tape drive, a compact disk drive, an optical storage device, tape backup, ZIP drive, JAZZ drive, etc.

The removable storage drive 1118 interacts with a removable storage unit 1120. As will be appreciated, the removable storage unit 1120 includes a computer usable or readable storage medium having stored therein computer software (control logic) and/or data. The removable storage drive 1118 reads from and/or writes to the removable storage unit 1120 in a well known manner.

Removable storage unit 1120, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives.

In an embodiment, the present invention is directed to computer program products or program storage devices having software that enables the computer 1102 to perform any combination of the functions described herein.

Computer programs (also called computer control logic) are stored in main memory 1108 and/or the secondary storage devices 1114. Such computer programs, when executed, enable the computer 1102 to perform the functions of the present invention as discussed herein. In particular, the computer programs, when executed, enable the processor 1106 to perform the functions of the present invention. Accordingly, such computer programs represent controllers of the computer 1102.

The modules of the invention discussed herein, such as the grouping module 412, the analysis modules 416, etc., preferably represent software executing in the computer 1102.

The computer 1102 also includes a display unit 1122, such as a computer monitor, and one or more input devices 1124, such as a keyboard, a mouse, other pointing devices (such as a light pen and trackball), etc.

The computer 1102 further includes a communication or network interface 1126. The network interface 1126 enables the computer 1102 to communicate over communication networks, such as networks 308 and 312, which preferably use the well known HTTP communication protocol.

The components of the invention (shown in FIG. 3) are described in greater detail below. It should be understood that any specific software, hardware, or operating system implementations described herein are provided for purposes of illustration, and not limitation. The invention can work with software, hardware, and operating system implementations other than those described herein. Any software, hardware, and operating system implementations suitable for performing the functions described herein can be used.

Customer Corporate Entity

Preferably, the system 302 is adapted for use by a particular customer. Typically, the customer is a corporate entity. Accordingly, the customer is also called herein the customer corporate entity.

It should be understood, however, that the customer can be any organization or individual, such as an academic institution, a research organization, a non-profit or for-profit organization, or any person. Generally, the customer is any entity having an interest in patents.

The customer is an entity (such as a company) that has arranged to have use of the system 302 (by purchasing, leasing, or renting the system 302, for example).

The databases 316 and data contained therein are specific to the customer. For example, the databases 316 may contain information on the patents that the customer owns and/or licensees, and information on the patents that the customer's competitors owns and/or licenses. Also, the databases 316 may contain the customer's and the customer's competitors' R&D information, financial information, licensing information, manufacturing information, and HR information.

Also, the methodology functions supported by the enterprise server 314 may be specialized or augmented to meet the needs of the customer.

Implementation and use of the present invention may involve a number of persons associated with the customer corporate entity, such as employees, consultants, associates, and persons retained by the customer, such as attorneys. When interacting with the invention, these people are called operators or users. Table 1 lists some of such persons and their respective responsibilities according to an embodiment of the invention. These persons may be involved in all aspects of the invention for the customer, or may be involved in only some phases of the invention for the customer, such as the extract and load of the databases 316. It should be noted that the set up and use of the invention may also involve other people with different knowledge, skills, and/or abilities.

In the discussion contained herein, reference is often made to a user or an operator associated with the customer. It should be understood that the terms "user" and "operator" are synonymous, and refer to one or more persons from Table 1.

TABLE 1

| Role/Function | Responsibilities |
|---|---|
| Executive, PL, or Division Managers | Ensure strategy meets short and long term business goals and plans |
| Intellectual Property (IP) Attorneys | Analysis of patents as related to mapping, licensing, infringement, non-renewal, cross-licensing etc. |
| Technical Personnel | Analysis of patents and how they relate to given product functions and features. Also domain R&D experts as needed for specific competitive technology assessment |

TABLE 1-continued

| Role/Function | Responsibilities |
|---|---|
| MIS personnel | Help in data extraction from operational systems |
| Marketing personnel | Product Strategy, Features, Target Markets, Competitive Analysis |
| Business and Financial Analysts | Economic implications, profit, loss, tax, market share, etc. |

Databases

Figure 6:
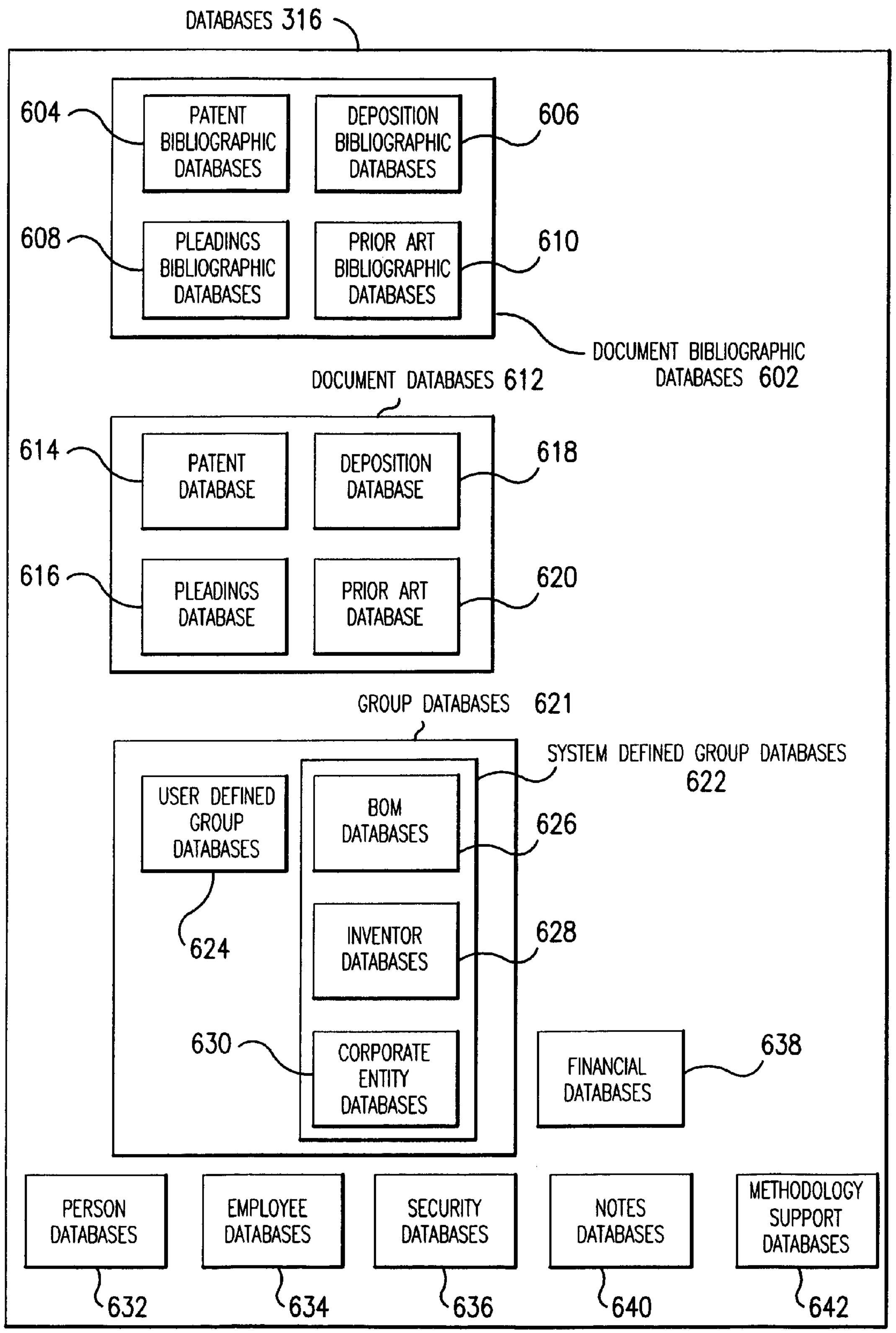
FIG. 6 is a block diagram of the databases of the present invention.

FIG. 6 illustrates the databases 316. According to the present invention, the databases 316 store document information (that includes patent information) and information pertinent to the analysis of the document information.

FIG. 6 illustrates a particular embodiment of the databases 316, and also illustrates a particular embodiment of the types of tables that the databases 316 contain, and the attributes in the tables. It should be understood, however, that the invention is not limited to the particular database embodiment of FIG. 6. Instead, the invention is adapted and intended to cover other database structures and organizations that are capable of storing document information and information pertinent to the analysis of the document information. The particular information that is stored in the databases is implementation dependent and varies based on a number of factors, including the type of analysis that is desired, the specific needs of the customer, the type and content of the information that the customer maintains, etc.

The databases 316 of FIG. 6 are collectively called methodology databases, and the data within them are called methodology data, because they support the functions and features, or the methodology, of the present invention. These functions and features (generically called methodology functions and features) are described in sections below.

Many of the databases 316, such as the BOM databases 626, the inventor databases 628, and corporate entity databases 630, the financial databases 638, the person databases 632, and the employee databases 634, are initially loaded using information provided by the customer. Such information includes R&D (research and development) information, financial information, licensing information, manufacturing information, HR (human resources) information, and any other information that may be pertinent to the analysis of the customer's patents and other relevant documents. After initial loading, these databases 316 are updated as necessary to reflect changes in the customer's information.

Other information, such as information for the patent bibliographic databases 604 and the patent database 614, may be loaded using information provided by a third party provider, such as a third party provider that specializes in the provision of patent information in electronic form. One such third party provider is SmartPatents Inc. (SPI) of Mountain View, Calif. The patent bibliographic databases 604 may be periodically updated through a subscription service from such third party providers. Similarly, the patent database 614 may be augmented through as-needed orders to the third party providers. It should be understood that the present invention works equally well with data provided by any party as long as the data's format matches the formats of the patent bibliographic databases 604 and the patent database 614.

The databases 316 are described in greater detail below.

Document Databases

The document databases 612 preferably include electronic representations of documents of interest to the customer. The document databases 612 represent the customer's repository of documents, and are thus also called the customer's document repository. (The "repository" could alternatively represent all documents represented in the databases 316, whether represented in the document databases 612 or the bibliographic databases 602.)

For example, the patent database 614 includes electronic representations of U.S. and foreign patents of interest to the customer. These patents may be patents owned and/or licensed by the customer, patents owned and/or licensed by competitors of the customer, patents that the customer is considering acquiring, patents that, for whatever reason, the customer is studying, etc. The patent database 614 represents the customer's repository of patents, and is thus also called (in some embodiments) the customer's patent repository.

The patent database 614 preferably has stored therein an image file and a text file for each patent represented in the patent database 614, where the image file and the text file are representations of the patent. Details of an embodiment of the image file and the text file are described in U.S. Pat. No. 5,623,681 and U.S. Pat. No. 5,623,679, which are both incorporated herein by reference in their entireties.

The document databases 612 also include electronic representations of other documents of interest to the customer, such as depositions, pleadings, and prior art references. These documents are respectively stored in a deposition database 618, a pleadings database 616 (generally, pleadings are papers filed with a court), and a prior art database 620. Text and/or image representations of these documents may be stored. These documents may be pertinent to a patent litigation that the customer is involved in.

The documents in the document databases 612 may be text, images, graphics, audio, video, multimedia, and/or any other information representation that can be stored in electronic form.

It should be understood that the document databases 612 of FIG. 6 are shown for purposes of illustration, and not limitation. As mentioned above, the document databases 612 store electronic representations of documents that are of interest to the customer. Accordingly, the types of document databases 612 and the contents of the document databases 612 are, by definition, customer and implementation specific.

Document Bibliographic Databases

The document bibliographic databases 602 store information about documents (as opposed to the documents themselves). More particularly, the document bibliographic databases 602 store bibliographic information about documents.

Patent Bibliographic Databases

The patent bibliographic databases 604 store bibliographic data about U.S. and non-U.S. patents. Such patent bibliographic data includes, but is not limited to, the information on the front page of patents, such as: the patent number, the issue date, the inventors, the title, the assignee, the serial number, the filing date, the U.S. and international classifications, the fields of search, the references cited, the primary examiner, the assistant examiner, the attorney, the agent, the law firm, priority information, related application information, the number of claims, the number of drawing pages, the patent term, the expiration date, etc. The patent bibliographic databases 604 can also include one or more user defined fields that can store large amounts of data, such as 32 Kbytes or more of data.

Operators can extend the bibliographic databases 602 in patent-centric ways. For example, a "current licensee" field can be added to the patent bibliographic databases 604. This could be accomplished, for example, by defining one of the user defined fields to be a current licensee field.

In an embodiment of the invention, the patent bibliographic databases 604 store bibliographic information on all U.S. patents. In other embodiments of the invention, the patent bibliographic databases 604 store patent bibliographic information on a subset of all U.S. patents, such as all U.S. patents that are available in electronic form from the U.S. Patent Office, or all U.S. patents that issued after a certain date.

Generally, there is not a one-to-one relationship between the patents in the patent database 614, and the patents represented in the patent bibliographic databases 604. That is, the patent database 614 does not generally include a copy of each patent represented in the patent bibliographic databases 604. Instead, the patent database 614 includes only those patents that are of interest to the customer. In contrast, the patent bibliographic databases 604 store bibliographic information on all U.S. patents and/or foreign patents (or, alternatively, all U.S. patents that issued after a certain date, and/or a subset of foreign patents). Of course, if the customer has an interest in all U.S. patents, such that electronic copies of all U.S. patents are stored in the patent database 614, then there would be a one-to-one relationship between the patents in the patent database 614, and the patents represented in the patent bibliographic databases 604.

Other Document Bibliographic Databases

The document bibliographic databases 602 include store bibliographic information on other types of documents that are of interest to the customer. For example, if the customer is interested in depositions, pleadings, or prior art references, then the document bibliographic databases 602 would store bibliographic information on depositions, pleadings, or prior art references in deposition bibliographic databases 606, pleadings bibliographic databases 608, and prior art bibliographic databases 610, respectively.

The bibliographic information may include the parties or persons involved, the date of creation, the date of modification, the subject, the number of pages, the number of figures, etc. Such bibliographic information may be generated manually, and/or may be generated automatically during the generation of the source document. For example, word processing tools often automatically generate bibliographic information about a document as the document is being created. Such information may include the creator, the typist, the date of creation, the date of modification, the subject, the title, the type of document, the storage format, etc. This automatically-created bibliographic information could be loaded into the document bibliographic databases 602.

Notes Database

The present invention supports annotation of the documents in the document databases 612. More particularly, the present invention allows users to create and link annotations (also called notes) to any portions of the documents in the document databases 612. Such annotations can include text, graphics, images, video, audio, and/or any other information representation that can be stored in electronic form.

The present invention also allows various information to be stored with annotations, such as the date of creation, the creator, the date of modification, a note title and/or subject, access rights, etc.

The annotations, linkage information (i.e., information that specifies the link between a note and a portion of a document), and information related to the annotations and/or the linkage information (such as the position of the linked portion in the document, the date of creation, the creator, the date of modification, a note title and/or subject, access rights, etc.) are stored in the notes databases 640. Embodiments of the notes databases 640 are described in U.S. Pat. No. 5,623,679 and U.S. Pat. No. 5,623,681, incorporated by reference herein, and in pending U.S. application Ser. No. 08/590,082, which is herein incorporated by reference in its entirety.

Groups Databases

Information on groups is stored in the group databases 621. Generally, a group is a data structure that includes any number of documents that typically follow a common theme or characteristic (although this is not a mandatory requirement of groups). More particularly, a group is a data structure that includes any number of patents that typically follow a common theme or characteristic (although, again, this is not a mandatory requirement of groups). Groups are document-centric, or in many cases, patent-centric.

There are two classes of groups: predefined groups (also called system defined groups) and user-defined groups (also called arbitrary groups).

However, the invention also supports other types of groups. For example, the invention supports temporary groups. A temporary group is automatically created by the invention in the course of processing a command. One application of temporary groups involves search operations. Specifically, when conducting a search for documents, a new temporary group is created, and the search results are stored in the temporary group. The invention permits operators to convert temporary groups to predefined groups or user-defined groups.

Patents (and/or documents) in predefined groups follow a predefined theme or characteristic. Database tables, fields, and attributes of a predefined group are specific to the predefined theme/characteristic of the predefined group. Accordingly, different predefined groups have different database tables, different database fields, and different database attributes. Information on predefined groups is stored in the predefined or system defined group databases 622.

Patents (and/or documents) in user-defined groups may or may not follow a common theme or characteristic. Any theme or characteristic that they do follow is defined by the user. Accordingly, user-defined groups are also called arbitrary groups.

All user-defined groups have the same, generic database tables, fields, and attributes. However, users may elect to use these database tables, fields and attributes differently for different user-defined groups. Information on user-defined groups is stored in the user-defined group databases 624.

Predefined groups can be more powerful than user-defined groups for at least two reasons. First, the databases associated with a predefined group store information that is specific to the predefined characteristics of the predefined group. As a result, more useful and specific information can be stored in predefined groups. Second, since the data attributes and characteristics of predefined groups are known in advance, specific functions can be generated in advance to automatically process the information associated with predefined groups. As a result, the information associated with predefined groups can be automatically processed in powerful and diverse ways that are useful given the attributes and characteristics of the predefined groups.

The tables and attributes of predefined groups are typically not applicable to other types of groups. In contrast, the tables and attributes of user-defined groups are generic, and are applicable to all groups. Thus, user-defined groups are more flexible than predefined groups.

Accordingly, in practice, a user-defined group is used by a customer until its attributes, characteristics, and functions are well defined. Once they are well defined, a new predefined group is created to replace the user-defined group. This new predefined group is designed to encompass and take advantage of the specific attributes, characteristics, and functions of the group. In other words, this new predefined group is designed to encompass and take advantage of the well defined structure of the group. Then, analysis and reporting modules are created which automatically analyze and report on the data in the new predefined group. It is possible to create such analysis and reporting modules specific to the new predefined group because of the well defined structure of the new predefined group. The new predefined groups and their reporting and analysis modules can then be distributed (i.e., its databases and functional modules can then be distributed) to interested customers of the invention.

The scope of the present invention includes the creation of new predefined groups and their reporting and analysis functions in the manner described above. The scope of the present invention also includes such new predefined groups and their reporting and analysis functions. The structure and operation of such new predefined groups and their reporting and analysis functions are implementation dependent, but would be apparent to persons skilled in the relevant art(s) based on the discussion contained herein.

In the present invention, groups are structured. Specifically, groups are organized into a directed, acyclic graph, where a group can have multiple children groups and multiple parent groups.

The system of the invention discourages or prevents non-sensical organizations of groups. Such non-sensical organizations of groups is at least partially discouraged or prevented by the automatic functions performed by the invention. For example, the system discourages or prevents making a corporate entity group a child of a BOM group, since running an analysis report on all of the subassemblies of the BOM group would yield questionable or undefined results since a corporate entity does not have subassemblies. In an embodiment of the invention, such non-sensical organization of groups is prevented by computer programming.

Also, when a specialized (predefined) group is created to perform specialized analysis functions, new restrictions regarding the rules that govern the inter-relationships between groups are also created. The rules manifest themselves in the database schema. The database schema of the invention prevents the creation of non-sensical group relationships.

Predefined Groups Databases

Various predefined groups are described below. It should be understood that the following represents examples of predefined groups supported by the invention. The invention is adapted and intended to include other predefined groups. As described above, predefined groups are often created from user-defined groups once the attributes, characteristics, and functions of the user-defined groups are well defined. The invention is adapted and intended to include these types of predefined groups. Accordingly, the following is provided for purposes of illustration, and not limitation.

Bill of Materials (BOM) Databases

A BOM (bill of materials) group is a group that contains patents (and perhaps other documents) that map to a product, or that map to parts of a product. More particularly, a BOM group is a group that contains patents that map to an assembly, a subassembly, or a part, where an assembly is composed of one or more subassemblies, and a subassembly is composed of other subassemblies and/or parts.

The phrase “a patent maps to a product” means that the patent includes claims that appear to read on the product or process of making and/or using the product, and/or includes claims that are related to or relevant to the product or process of making and/or using the product, and/or that the patent discloses subject matter than encompasses the product or process of making and/or using the product, and/or that the patent discloses subject matter than is related to or relevant to the product or process of making and/or using the product.

Information on BOM groups is stored in the BOM databases 626. BOM groups and the BOM databases 626 are discussed in greater detail in sections below.

Corporate Entity Databases

A corporate entity group is a group that contains patents (or other documents) that are owned, licensed, or otherwise of interest to a corporate entity. Information on corporate entity groups is stored in corporate entity databases 630. The corporate entity databases 630 can include information on any number of corporate entity groups. Such corporate entity groups can correspond to any corporate entities that are of interest to the customer, such as the customer itself, affiliates of the customer, competitors of the customer, etc. Corporate entity groups and the corporate entity databases 630 are discussed in greater detail in sections below.

Inventor Databases (and Employees and Person Databases)

An inventor group is a group that contains patents each of which name as inventor a particular person. Information on inventor groups is stored in inventor databases 628. The inventor databases 628 are supported by person databases 632, which include information on people of interest to the customer (people who play a role in the processing of the invention, such as an inventor or employee), and employee databases 634, which include information on employees of interest to the customer. Inventor groups, the inventor databases 628, the employee databases 634, and the person databases 632 are discussed in greater detail in sections below.

User-Defined Group Databases

A user-defined group is a data structure that contains documents that follow some user-defined theme or characteristic. Information on user-defined groups is stored in the user-defined group databases 624.

These user-defined group databases 624 are common to all user-defined groups. In particular, the attributes in these user-defined group databases 624 are the same for all user-defined groups. However, the customer can choose to utilize these attributes differently for each user-defined group. For example, the customer may choose to store different types of data in these attributes for different user-defined groups. User-defined groups and the user-defined group databases 624 are discussed in greater detail in sections below.

Financial Databases

The financial databases 638 store financial information pertaining to the customer's business. The financial databases 638 may also include financial information on competitors' businesses (to the extent that such information is publicly known, or can be determined or estimated based on publicly known information or business practices). Such financial information may include money spent on R&D on a product line basis, gross and net revenue on a product line basis, patent licensing revenue, patent acquisition costs, etc. The invention correlates and analyzes the information in the financial databases 638 with patent information to determine, among other things, the financial impact of patents on the customer's and competitors' respective businesses. The financial databases 638 are discussed in greater detail in sections below.

Security Database

The present invention includes multileveled security features for limiting access to data stored in the databases 316. Security is defined herein as privilege levels associated with operators and data objects, and a security methodology for applying the privilege levels so as to restrict access to the data objects to operators having the appropriate privilege levels.

The invention is capable of supporting security for all data items, including security for notes (stored in the notes databases 640), groups (stored in the group databases 621), financial information (stored in the financial databases 638), personal information (stored in the person databases 632 and the employee databases 634), and documents (stored in the document databases 612 and the document bibliographic databases 602). Information for implementing these security features is stored in the security databases 636, which are discussed in greater detail in sections below.

Enterprise Server

The enterprise server 314 is preferably implemented as one or more computers (such as the computer 1102 shown in FIG. 11) each having at least 128 MBytes of main memory 1108 and running Microsoft Windows NT. The enterprise server 314 could, alternatively, be implemented using other memory configurations, and other operating systems, such as (but not limited to) UNIX, Windows 95, MS-DOS, the Apple Operating System, etc. Accordingly, the specific hardware and software implementations discussed herein are provided for purposes of illustration, not limitation (this applies to all specific hardware and software implementations discussed herein, both for the enterprise server 314 and for other components of the invention). The invention can utilize any hardware, software, and operating system capable of performing the functions described herein.

The enterprise server 314 can be a single computer, or a hierarchy of multiple computers (FIG. 5). Logically, however, the enterprise server 314 is preferably a single computer.

Figure 4:
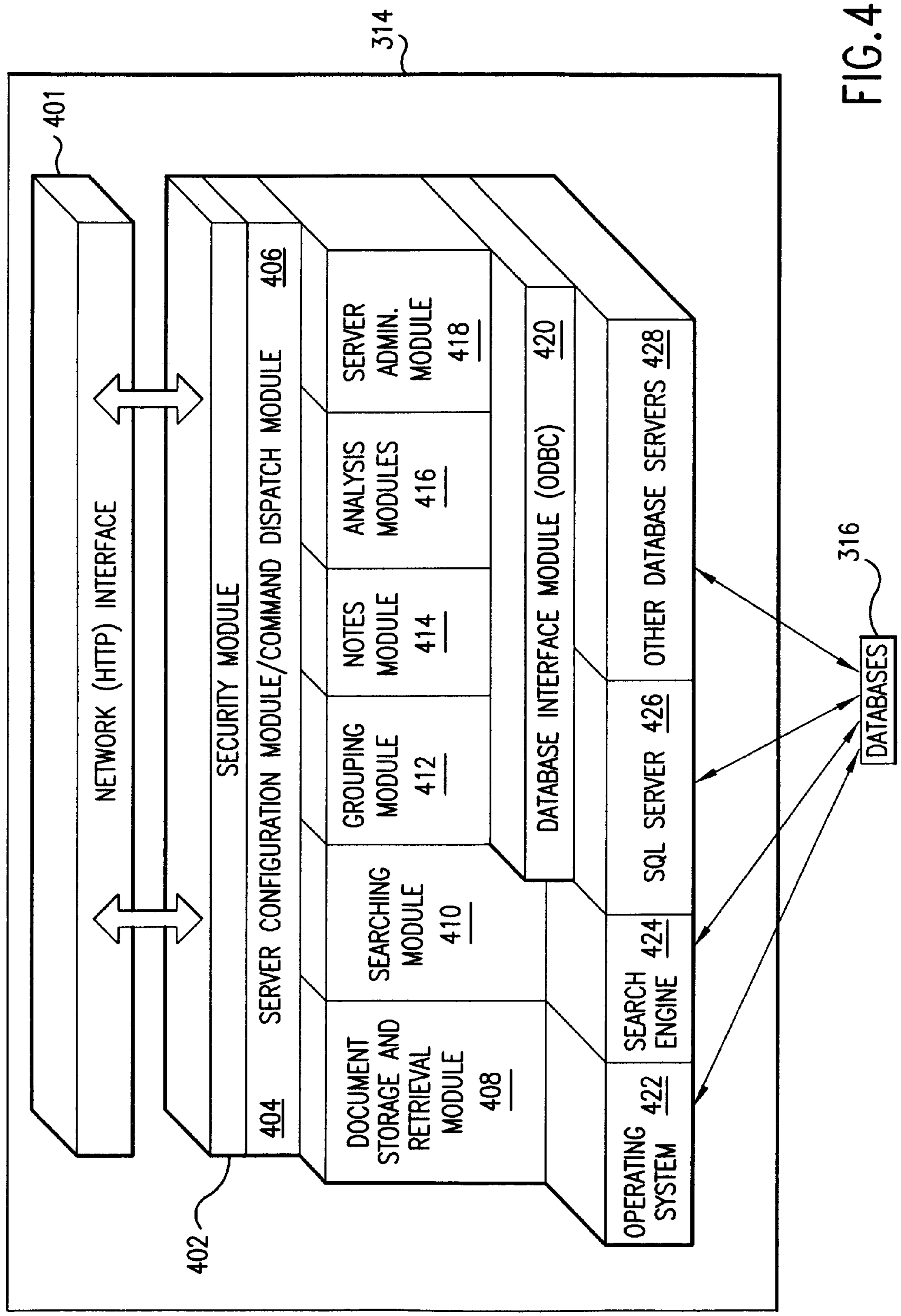
FIG. 4 is a block diagram of an enterprise server according to a preferred embodiment of the present invention.

FIG. 4 is a logical block diagram of the enterprise server 314. The enterprise server 314 has a number of modules (collectively called the enterprise server modules). Note that a number of the modules interact with the databases 316. A SQL server 426 (such as the Microsoft SQL Server) and/or other well known database servers 428 interact directly with the databases 316. The enterprise server modules interact with these servers 426 and 428 and the databases 316 via a database interface module 420, which preferably represents an ODBC (object database connectivity) layer.

The Network transport layer or interface 401 is used to receive command request objects from the client 304, 306 based on a specific network protocol, preferably HTTP. On the enterprise server 314 these network command objects are reconstructed from a stream of bits received from the client 304, 306. Once the command objects have been reconstructed the specific operations (described herein) defined in this object are performed by the appropriate enterprise server modules. The command objects represent enterprise server API commands, discussed below.

According to an embodiment of the invention, command objects include autonomous intelligent agents that perform appropriate operations at the enterprise server 314 on behalf of the operator (i.e., the client 304, 306). In this embodiment, the command objects sent to the enterprise server 314 represent computer programs that are executed in the enterprise server 314. These executing computer programs preferably represent threads each having an address space. These computer programs, when executing in the enterprise server 314, perform the functions discussed herein, such as patent mapping, patent aging, inventor count, inventor information, financial functions, etc.

The enterprise server 314 is a highly secure business decision system. The specific operations in each command object are checked against the security information maintained about each user in the system. This is logically done through a comprehensive security layer or module 402. (The specific implementation of security requires the interaction with ODBC 420, as all security information is stored in the databases 316). Alternatively, the security module 402 could logically be shown as being under the server configuration module 404 and the command dispatch module 406.

As described elsewhere herein, the document storage and retrieval module 408 is part of a Virtual Patent System 11304 (FIG. 113) that presents a consistent, unified view of an arbitrary number of patent and patent-related documents.

The Searching subsystem or module 410 provides for patent searching using a search language (syntax) described below, an extensible language for searching patent and other patent-related documents. The search layer 410 also encapsulates the specific search engine 424 used in the implementation of the system, which can and will vary based on available search technologies.

The other layers shown in FIG. 4 work together to form the heart of the business decision system of the present invention. The Groups layer or grouping module 412 is responsible for managing all groups created by a user in support of patent analysis. The Notes layer or module 414 is responsible for managing all forms of annotations made by the user. The Analysis Queries layer or analysis modules 416 perform analysis queries in support of specific requests made by various modules in the decision support system. Finally, the server administration layer or module 418 provides services to manage the configuration of the enterprise server 314, such as adding or changing the security permissions associated with a specific user.

Each of these layers provides a mechanism to further decouple the operation of the enterprise server 314 from the specific implementation of the databases 316. Each of these layers also interact with ODBC (Open Database Connectivity) 420, a Microsoft defined industry standard mechanism for manipulating relational databases (other software for interacting with and manipulating databases could alternatively be used). ODBC 420 provides a final layer of decoupling and enables the enterprise server 314 to transparently connect to different relational databases 316.

The enterprise server modules are further described below.

Document Storage and Retrieval Module

The document storage and retrieval module 408 in the enterprise server 314 stores and retrieves documents from the document databases 612. Preferably, especially with respect to patent documents, the document storage and retrieval module 408 stores and retrieves text files and image files representative of documents in the document databases 612. The document storage and retrieval module 408 performs such data storage and retrieval operations pursuant to commands that conform to the enterprise server API, described below.

The document storage and retrieval module 408 preferably interacts directly with the operating system 422 of the enterprise server 314, where such direct interaction primarily pertains to data retrieval and storage.

Figure 113:
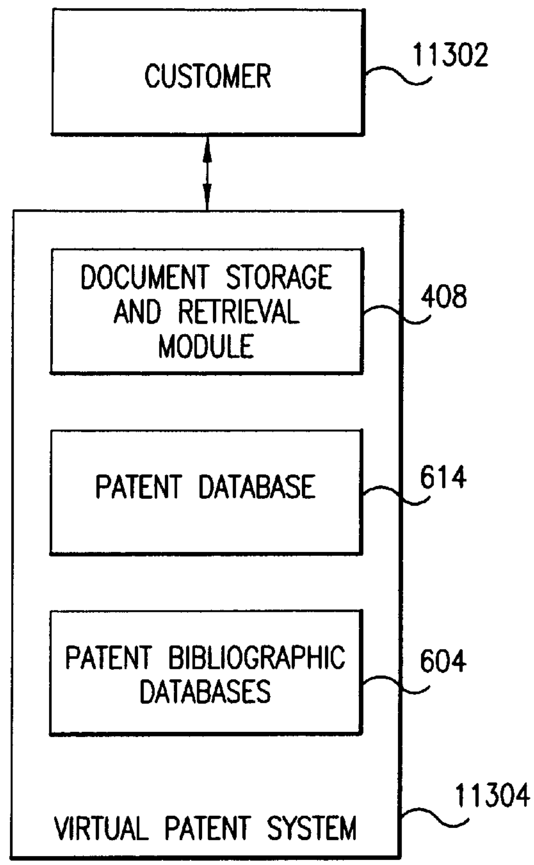
FIG. 113 illustrates a block diagram of the virtual patent system of the present invention.

As just noted, the document storage and retrieval module 408 operates to access data in the document databases 612, such as the customer's repository of patents represented by the patent database 614. Preferably, the patent database 614 stores electronic representations of all patents which are of interest to the customer. Additional electronic patents can be added to the patent database 614 at any time as the customer's interests change. The patent database 614 is capable of storing electronic representations of all U.S. patents, or any subset of all U.S. patents, and of any number of foreign patents as required by the customer's needs and interests. Accordingly, the document storage and retrieval module 408, in combination with the patent database 614 and the patent bibliographic databases 604, provide the customer with the ability to quickly, efficiently, and effectively access, display, and process any patent of interest. Accordingly, from the perspective of the client, the document storage and retrieval module 408, in combination with the patent database 614 and the patent bibliographic databases 604, represent a virtual patent system. FIG. 113 graphically depicts this virtual patent system 11304.

Figure 112:
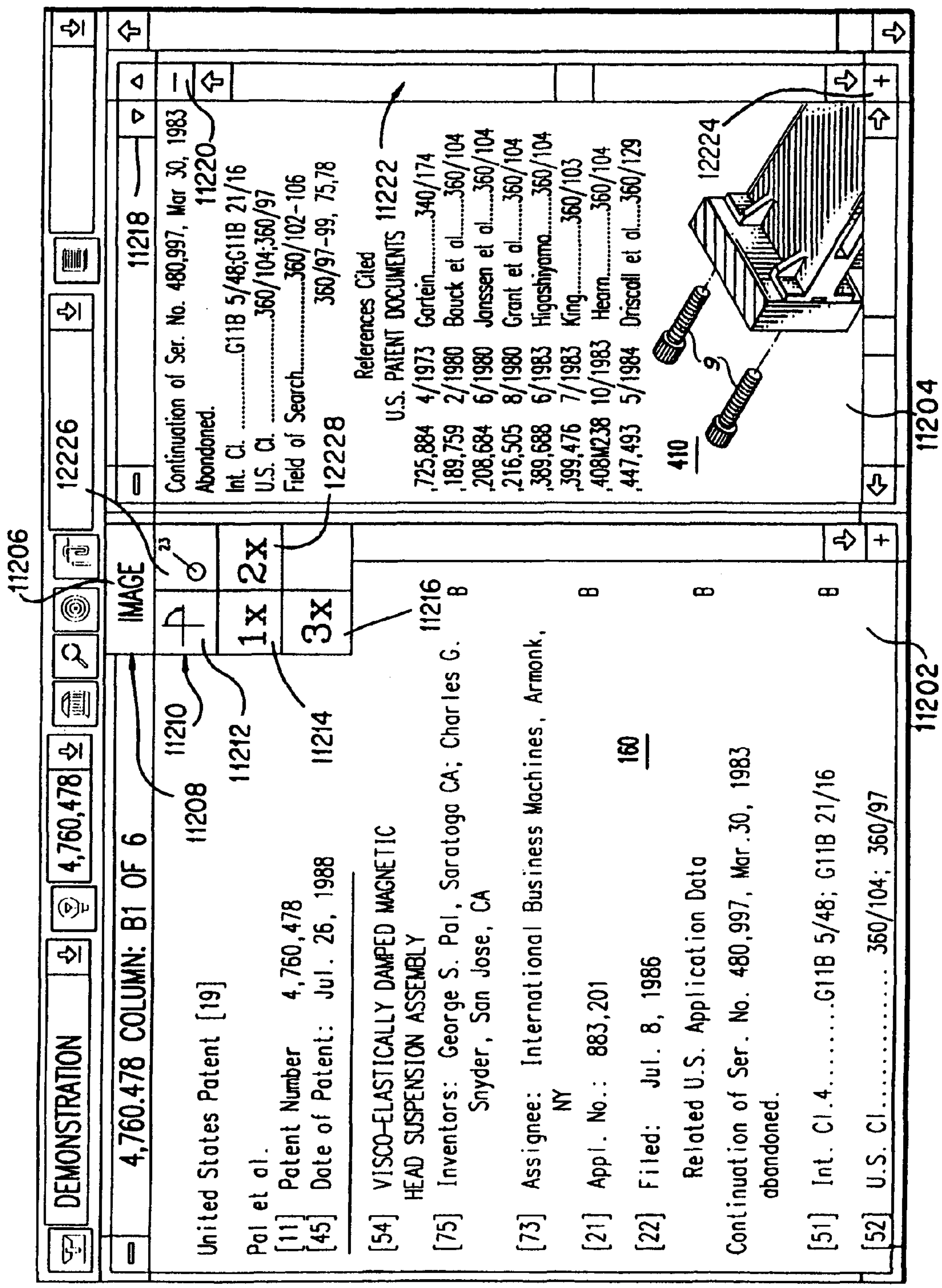
FIG. 112 is an example display format showing the display of patent text in a first window and patent image in a second window.

The client document storage and retrieval module 708 in the clients 304, 306 (FIG. 7) displays the text and images received from the document storage and retrieval module 408 in the enterprise server 314. As shown in FIG. 112, the client document storage and retrieval module 708 is capable of simultaneously displaying the text of a document in a first window 11202, and the image of a document in a second window 11204.

The client document storage and retrieval module 708 has features and functions for enabling a user to manipulate and otherwise process the displayed data. For example, the client document storage and retrieval module 708 includes text searching features, powerful text and image navigation features, text processing features, image processing features (as represented by image toolbox 11206 shown in FIG. 112), document organization features, word list features, sophisticated text and image display features, text and image highlighting features, document importation and exportation features, case or group copying features, and print features.

The document storage and retrieval module 408 in the enterprise server 314 and the client document storage and retrieval module 708 in the clients 304, 306 are collectively further described in U.S. Pat. No. 5,623,679 and U.S. Pat. No. 5,623,681, incorporated by reference herein, and in pending U.S. application Ser. No. 08/341,129, which is herein incorporated by reference in its entirety.

Notes Module

The notes module 414 manages and interacts with the notes databases 640. The notes module 414 processes enterprise server API commands (described below) to: create new notes, update existing notes, add notes to a document, remove notes from a document, and retrieve all notes associated with a document.

Figure 111:
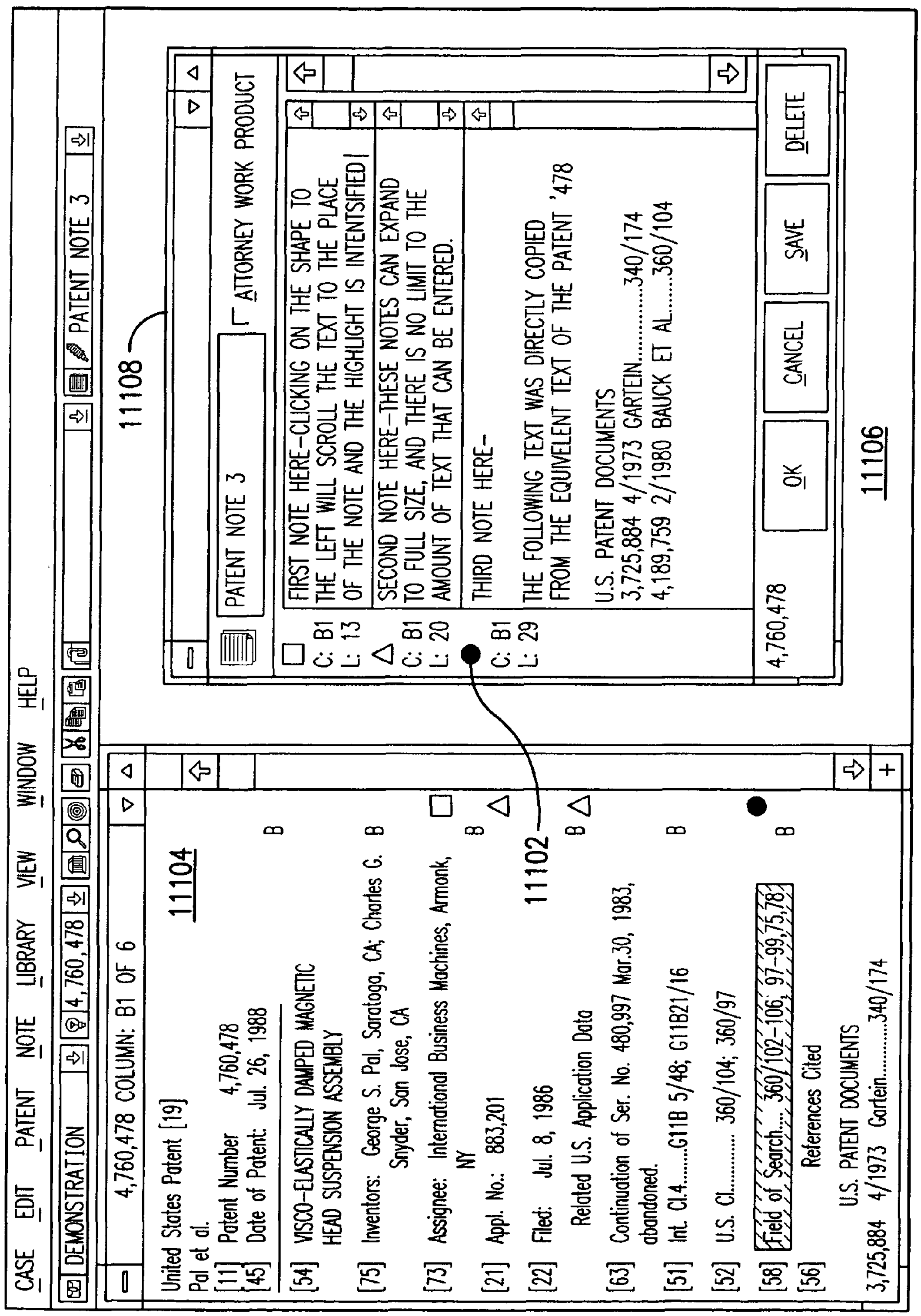
FIG. 111 is an example display format showing the display of patent text in a first window and notes in a second window.

The client notes module 714 enables a user to view and manipulate notes. FIG. 111 is a screen shot displayed by the client 304, 306 on the client monitor 1122. Text of a patent is displayed in a first window 11104. The client notes module 714 displays upon command the notes that are linked to portions of this patent in a notes window 11108.

The client notes module 714 receives from the user commands to, for example, edit note contents, create new notes, link new or existing notes to portions of documents, modify notes, and delete notes. The client notes module 714 modifies the display of the notes window 11108 as necessary to reflect these user commands. The client notes module 714 also generates enterprise server API commands corresponding to these user commands, and forwards these enterprise server API commands to the enterprise server 314 for processing by the notes module 414 in the enterprise server 314.

Notes may have attributes, such as (but not limited to) the person who created the notes (relevant for security purposes), the date the note was created, the data format(s) of data stored in the note (text, image, graphics, video, audio, spreadsheet, database, etc.), the note title, the note subject, whether the note contains information that would be considered to be Attorney/Client privileged or confidential, and the date the note was last modified.

According to an embodiment of the invention, notes are hierarchically organized. That is, a given note may be a child note of any number of parent notes, and may have any number of child notes. This, of course, is in addition to the linkage of notes to portions of documents. This hierarchical organization may be implemented by having in the note databases 640 a note_note_xref table, that would be similar to the group_group_xref table 1229. The note_note_xref table would have a parent note attribute storing the note ID of the parent note, and a child note attribute storing the note ID of the child note. There would be a record in the note_note_xref table for each parent note/child note relationship in the note hierarchies. It is noted that this note hierarchy provides a structure, organization, and hierarchy to the documents linked to the notes.

The notes module 414 in the enterprise server 314 and the client notes module 714 in the client 304, 306 are collectively further described in U.S. Pat. No. 5,623,679 and U.S. Pat. No. 5,623,681, incorporated by reference herein, and in pending U.S. application Ser. No. 08/590,082, incorporated by reference herein.

Searching Module

The searching module 410 in the enterprise server 314 interacts with a search engine 424 to conduct searches through the data in the databases 316 pursuant to search requests from the clients 304, 306. The search engine 424 is any commercial and well known search engine. Preferably, the search engine 424 is implemented as the Fulcrum search engine available from Fulcrum Technologies, Inc., Ottawa, Canada. Other commercial search engines could also be used, including (but not limited to) those from Verity Incorporated, Sunnyvale, Calif., Open Text of Canada, and others.

Preferably, the data in the databases 316 is indexed to facilitate and enhance searching by the search engine 424. For example, each field in each table of the patent bibliographic databases 604 is preferably indexed and searchable. Also, the documents (including the text files and possibly the image files) in the document databases 612 are preferably indexed and searchable. Any well known indexing procedure can be used to index the data in the databases 604. According to an embodiment of the invention, indexing and searching are performed as described in pending U.S. patent application Ser. No. 08/422,528, which is incorporated herein by reference in its entirety. Searching for documents is performed by searching through these indexes. The index tables are preferably stored in the searching module 410, in the searching engine 424, and/or in the databases 316.

An embodiment of the invention permits operator-defined indexing of data. In this embodiment, an operator can define what data in the databases 316 is to be indexed. For example, an operator can specify that only patents having as assignee "IBM" should be indexed. Or, the operator can specify that only the documents in a given group should be indexed. Such operator-defined indexing enhances searching performance, because the index that is searched is smaller and more targeted.

The searching module 410 receives enterprise server API commands from the clients 304, 306. The searching module 410 processes these enterprise server API commands and, as a result, causes the search engine 424 to perform at least the following functions: conduct a search to identify documents that satisfy a client-supplied search parameter (for example, to identify documents that contain instances of key words), retrieve and return the search results of a previously executed search, and retrieve and return search hit information for a particular document so that search term highlighting can be performed on the document.

According to the present invention, the documents identified by a search can be easily added to a new group or an existing group by invoking appropriate enterprise server commands, such as the ReqAddDocListToGroup command or the ReqAddPatents command. In the user interface at the client 304, 306, the operator implements this function using drag-and-drop techniques.

Preferably, the invention creates a new, temporary group to hold the results of a search. A subsequent search could then be scoped or restricted to the documents in this temporary group. Accordingly, the invention supports iterative searching using groups.

The invention supports many search strategies, including but not limited to keyword, keyword phrase, keyword phrases with boolean, thesaurus, concept searching, object searching, and graphical searching based on likeness of words/images.

The client searching module 710 in the clients 304, 306 receives search commands from the user. The client search module 710 converts these search commands to corresponding enterprise server API commands, if necessary, and transfers these enterprise server API commands to the enterprise server 314. The client searching module 710 receives from the enterprise server 314 search results. The client searching module 710 displays these search results and enables the user to manipulate and process the search results (such as by enabling the user to add the documents identified by a search to a new or existing group—note that this functionality may also involve the client grouping module 712).

The invention also supports restricting or defining a search according to aspects of the system, such as historical information. Such historical information can include, for example, the results of a prior search. Thus, the scope of a new search can be restricted to the results of a prior search, or the search criteria in a new search can be added to the search criteria in a prior search. Preferably, the system maintains a search log so that the operator can view and select prior search results and prior search criterions.

In some embodiments, a user's characteristics (i.e., security level) define the groups that the user can search in. In other words, searches are restricted to groups for which the user has access rights.

Figure 9:
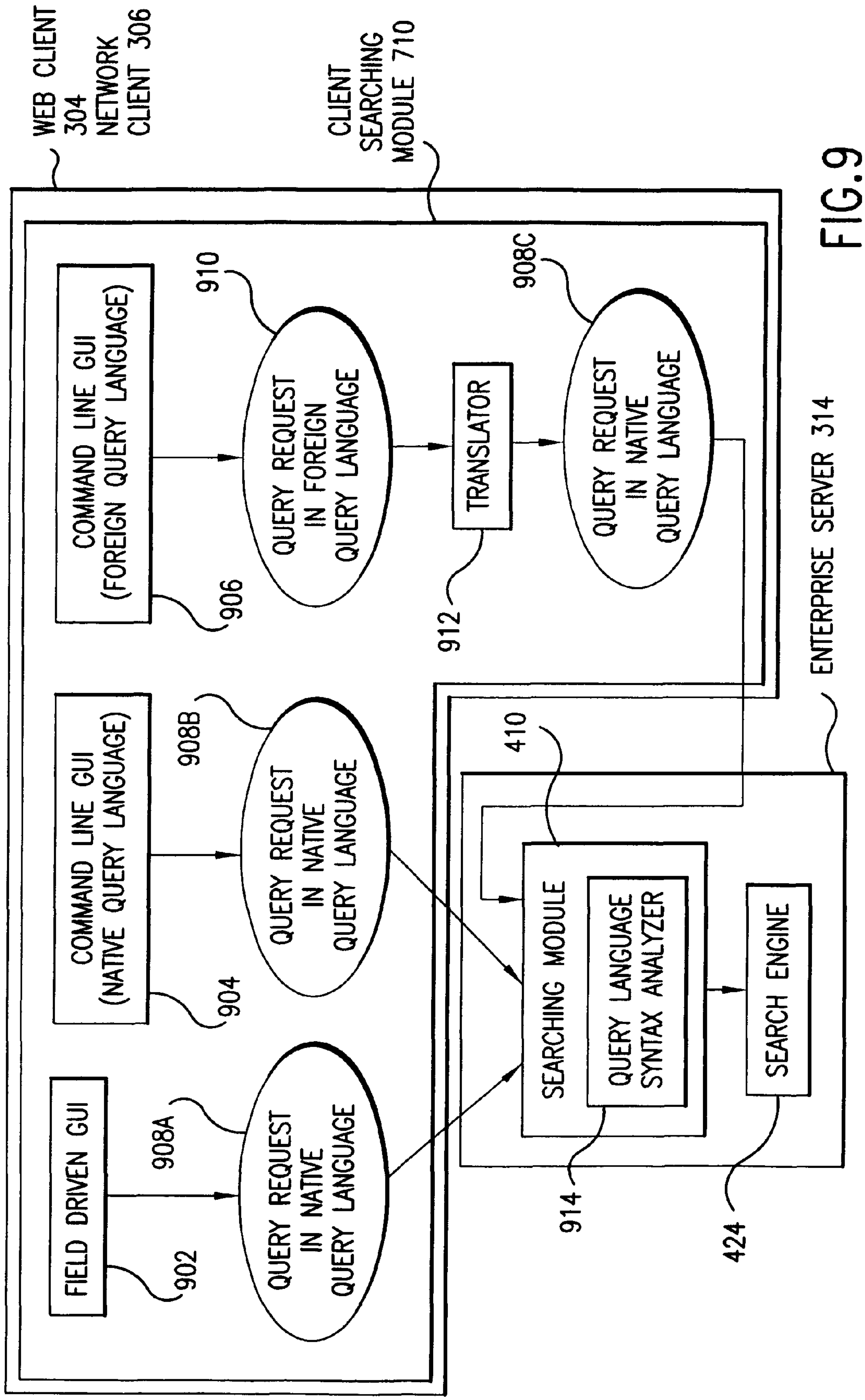
FIG. 9 is a block diagram and a data transfer diagram illustrating the searching features of the present invention.
Figure 57:
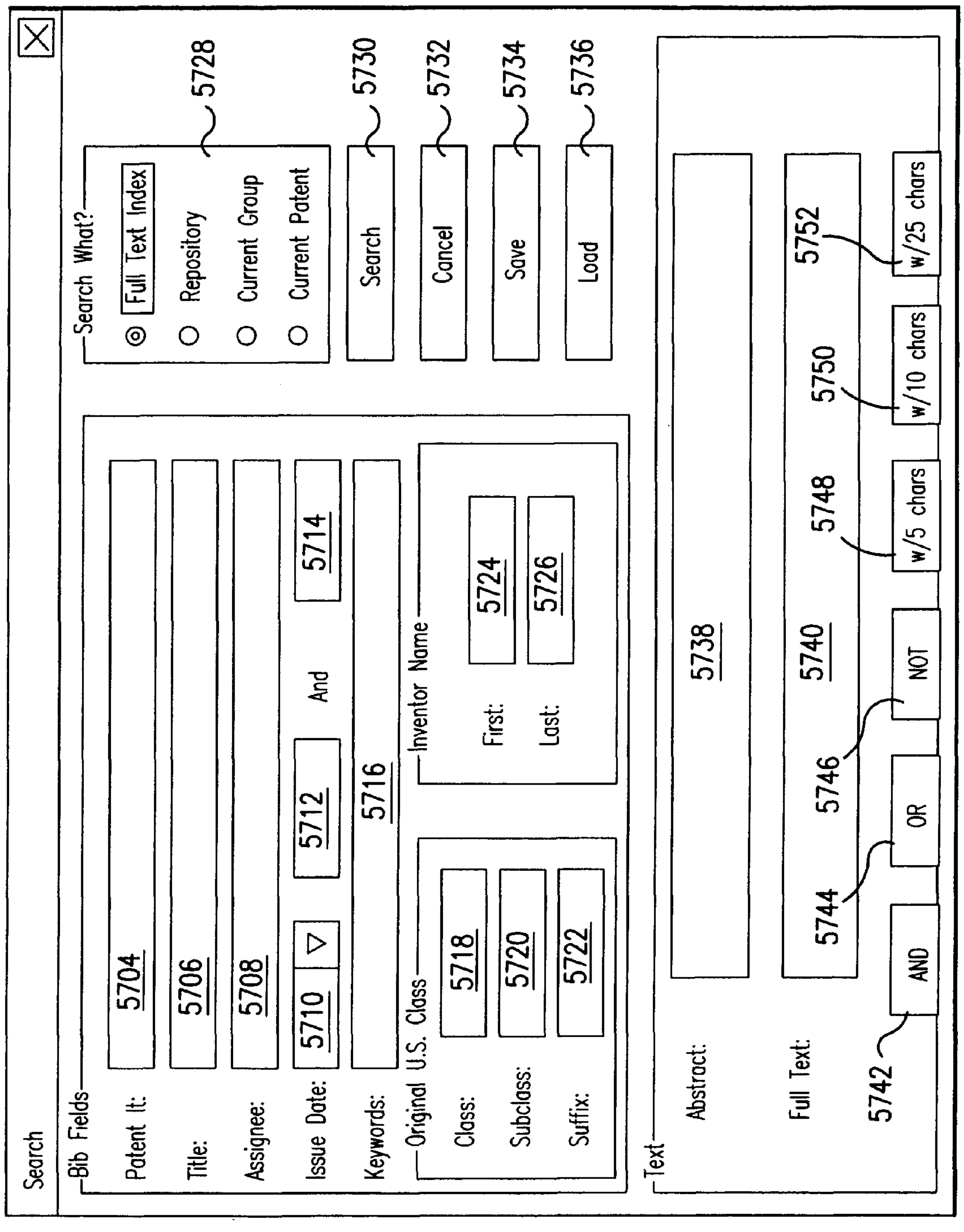

The operation of the client searching module 710 in a client 304, 306 and the searching module 410 in the enterprise server 314 shall now be described in greater detail with reference to FIG. 9. The client searching module 710 supports a number of user interfaces for enabling the user to enter a search command. One user interface is a field driven graphical user interface (GUI) 902. Examples of field driven GUIs 902 are shown in FIGS. 53 and 57.

Figure 53:
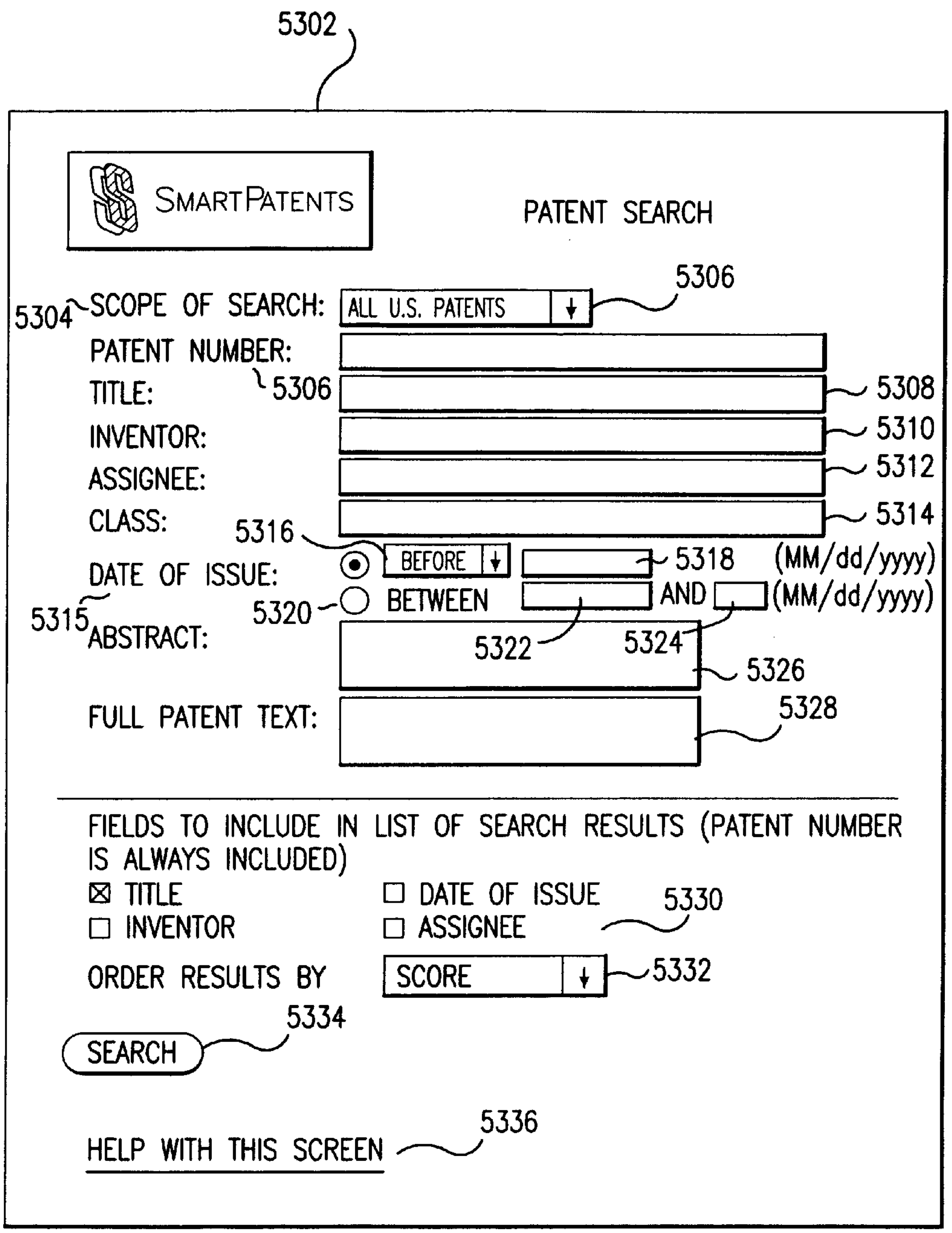

Considering first FIG. 53, the client searching module 710 displays the searching window 5302 on the client display monitor 1122. The searching window 5302 includes a Scope of Search field 5304 through which the user can select a scope of search. The user presses a down-arrow button 5306 to obtain a list of possible search scopes. This list may include, for example, all U.S. patents, all foreign patents, both U.S. and foreign patents, all patents in one or more selected groups, the patents in the customer's repository, etc. Searches can also be restricted to portions of documents, such as the claim section in patents. In the example of FIG. 53, the user has defined the search scope as being all U.S. patents.

The fields in the searching window 5302 allow the user to specify a search of patent bibliographic information, and/or a search of the text of patents. The user can search through patent bibliographic information by entering key terms in the patent number field 5306, the title field 5308, the inventor field 5310, the assignee field 5312, the class field 5314, and/or the date of issue field 5315. The date of issue field 5315 allows the user to specify patents that issued before or after a given date (by filling in fields 5316 and 5318), or that issued between two dates (by filling in fields 5320, 5322, and 5324). It is noted that only some of the attributes of the patent bibliographic databases 604 are shown as being searchable in FIG. 53. In some embodiments, other field driven GUIs (not shown) supported by the invention have search fields corresponding to other attributes of the patent bibliographic databases 604. In these other embodiments, it is possible for the user to search through any of the attributes of the patent bibliographic databases 604.

The user can search through the text of patents by entering search parameters in an abstract field 5326 and/or the full patent text field 5328.

It is noted that not all users may have access to all of the search options described above. For example, some users may be only able to search through the patent bibliographic information. Other users may be only able to search through certain attributes of the patent bibliographic information. Other users may be only able to search through the text of patents. The server configuration module 404, described below, controls the search options and capabilities of each user.

The user can specify the fields to include in the list of search results by appropriately selecting fields 5330. The user can specify a sorting order to display the search results via field 5332. Sorting options include: descending patent numbers, ascending patent numbers, issue date, filing date, serial number, score (the number of search hits), etc.

Figure 54:
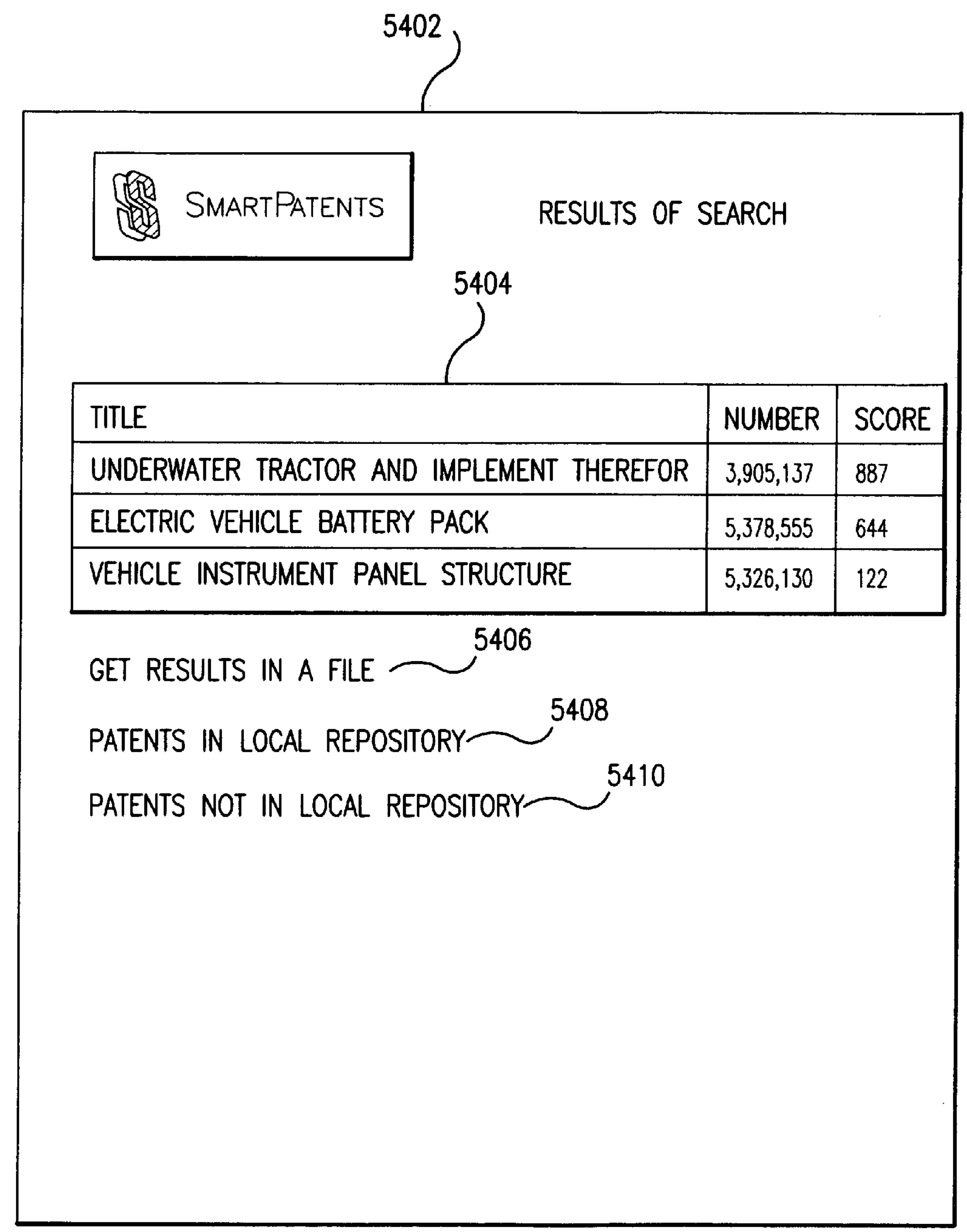

FIG. 54 illustrates an example screen shot of search results displayed by the client searching module 710 on the client display monitor 1122. By selecting a "get results in a file command" 5406, the user can write the search results to a user-specified file. By selecting a "patents in local repository command" 5408, the user can display a list of the patents from the search results that are stored in the patent database 614 (i.e., whose text and image files are stored in the patent database 614).

By selecting a "patents not in local repository" command 5410, the user can display a list of the patents from the search results that are not represented in the patent database 614 (i.e., patents for which the user does not own electronic copies of). The report resulting from selecting the patents not in local repository command 5410 can be used by the user to generate a purchase order to obtain electronic copies of the patents of interest from the search results. In some embodiments, electing this option will cause an electronic message to be sent to a third party service provider. The third party service provider would then electronically send electronic copies of the patents to the customer.

Figure 55:
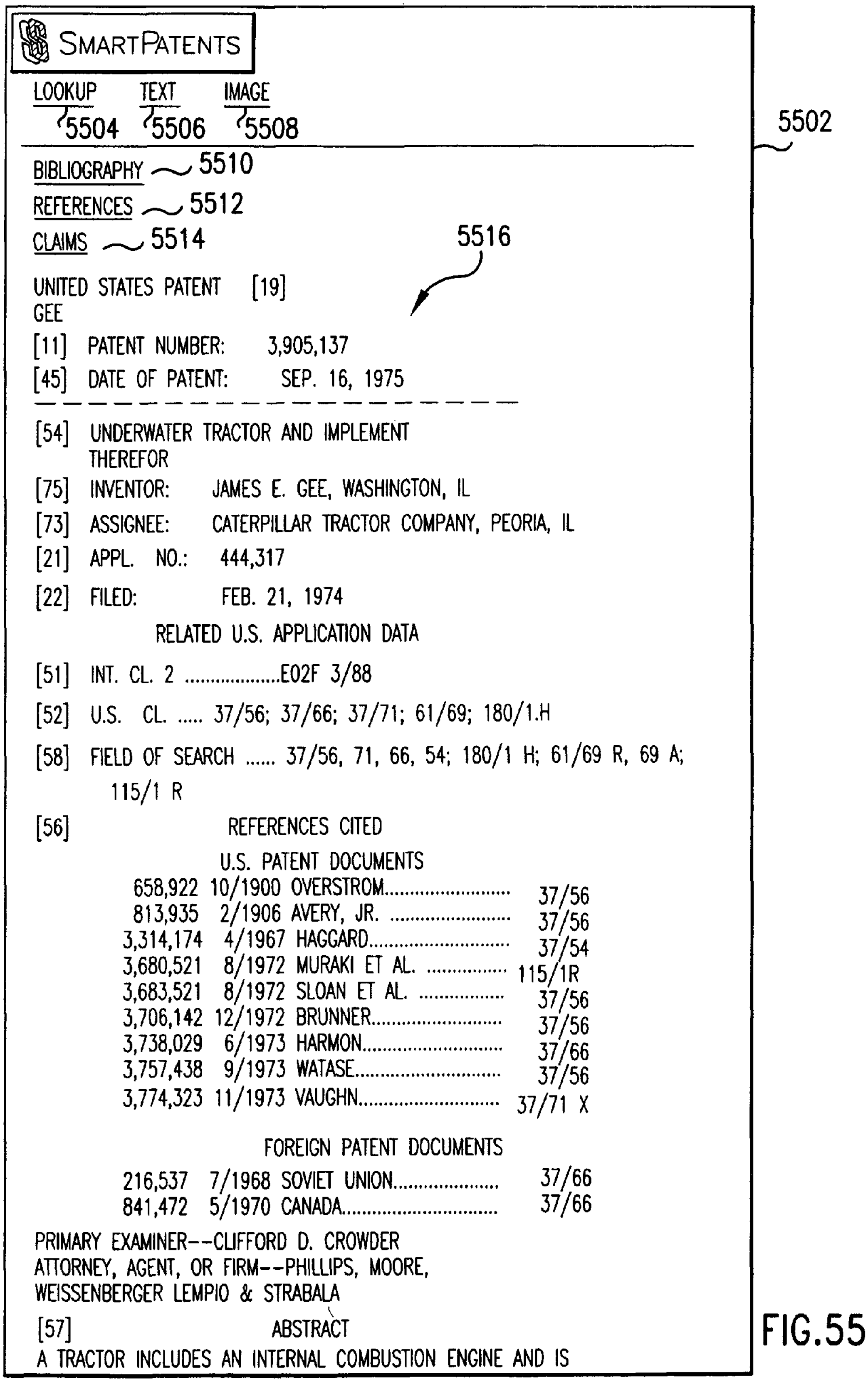

If the user selects (by double clicking or other well known GUI operation such as selecting a patent and pressing a return button) a patent from the list shown in FIG. 54, then the text and/or image of the selected patent is displayed on the client display monitor 1122. FIG. 55 depicts the display of text, and FIG. 56 depicts the display of an image. Alternatively, both the text and image can be simultaneously displayed on at least some clients 304, 306 using a display format such as that shown in FIG. 112.

The field driven GUI 5702 of FIG. 57 is similar to that of FIG. 53. Note that the GUI 5702 of FIG. 57 includes a keywords field 5716, which allows the user to search through user-definable fields in the patent bibliographic databases 604. The field driven GUI 5702 of FIG. 57 also allows the user to define the scope of the search via fields 5728. In the example of FIG. 57, the scope of the search can be the full text index (i.e., a search of the patent bibliographic information), only the patents stored in the patent database 614 (i.e., only the patents in the customer's patent repository), only the patents in the current group, or only the current patent. Other embodiments may a restrict searching to specific types of documents or specific predefined groups, such as all European patents, all PCT applications, all non-patent documents, documents in BOM groups, etc.

Referring again to FIG. 9, the client searching module 710 generates a query request 908A based on the search criteria that the user entered into the field driven GUI 902. Preferably, this query request 908A is in the native query language of the enterprise server 314. In other words, the query request 908A conforms to the enterprise server API.

The enterprise server API commands related to querying include the ReqSearch command. As described further below, this command takes searchParameters as a passed parameter. This passed parameter stores the search parameters for the search. A preferred syntax of the search parameters according to the enterprise server API is described below in Tables 2 and 3.

TABLE 2

| Search string operator | Meaning and Search Behavior | Implementation in Search Engine 424 (when using Fulcrum as the Search Engine 424) |
|---|---|---|
| W/n | Search for term expression on left within n characters distance in either direction from term expression on right. | Translate directly to "WITHIN n CHARACTERS OF" |
| AND | Match only documents that satisfy the term expression on the left and the term expression on the right. | Translate directly to "&" |
| OR | Match documents that satisfy the term expression on the left or the term expression on the right. | Translate directly to "\|" |
| NOT | Match only documents that do not satisfy the term expression on the right. | Translate directly to "!" |
| ( ) | Parentheses. Used to group search expressions parts to control their order of evaluation. | Leave as is. |

Each of the Operators in Table 2 (including any spaces to its immediate left or right) is considered to be a search syntax delimiter. Each sequence of characters before, after, or between one of these delimiters will be called a search string "element". Each search string element will be enclosed between a pair of apostrophes to translate it for transmission to Fulcrum. The meaning of and translations for the specific characters that can appear in an element are listed below in Table 3.

TABLE 3

| Search string Element | Meaning and search behavior | Implementation in Fulcrum |
|---|---|---|
| A-Z a-z | Alphabetic characters. A contiguous sequence of these (including any optional apostrophes) is considered a word for searching. All searching is case insensitive. | Leave as is. |
| 0-9 | Numeric characters. A contiguous sequence of these (including any optional commas or periods) is considered a word for searching. | Leave as is. |
| ' | Apostrophe. This character only appears in the index when there is an alphabetic character on either side of it. In this case, you must search for it explicitly. For example, searching for "Adams" will not find | Translate directly to "''" |

TABLE 3-continued

| Search string Element | Meaning and search behavior | Implementation in Fulcrum |
|---|---|---|
| | "Adam's". | |
| , . | Comma and period. Each of these characters only appears in the index when there is a numeric character on either side of it. In this case, you must search for it explicitly. For example, searching for "4,234.03" will not find "423403". | Leave as is. |
| * | Wildcard matching zero or more characters in a single word. | Translate directly to "%" |
| ? | Wildcard matching exactly one character in a single word. | Translate directly to "_" |
| % | Fulcrum's wildcard matching zero or more characters in a single word. | Translate directly to "\%" |
| _ | Fulcrum's wildcard matching exactly one character in a single word. | Translate directly to "_" |
| \ | Escape character in Fulcrum. | Translate directly to "\\" |
| Space | Space character. | Leave as is. |
| - | Behaves like the "other punctuation" below with the exception that when one or more dashes appear in the middle of a word in a search string, the search engine will search for both the version with all the dashes and the version with none of the dashes. | Leave as is. |
| !@#$ %^&_- =+[ ] { };: <>"/\|'~ | All other punctuation. These are treated as invisible word breaks. They are not indexed, but will break words. | Leave as is. |

The searching module 410 in the enterprise server 314 receives the query request 908A. A query language syntax analyzer 914 in the searching module 410 checks the query request 908A for any format or syntax errors, such as unbalanced parentheses. The searching module 410 then translates the query request 908A to a new query request in the language of the search engine 424. The new query request is then transferred to the search engine 424 for processing.

The present invention also supports a native language command line GUI 904 for enabling a user to enter a search request. The command line GUI 904 is typically only used by users who are familiar with the enterprise server API. When using the command line GUI 904, the user enters at the command line a query request 908B. This query request 908B must conform to the enterprise server API. This query request 908B is then transferred to the searching module 410 in the enterprise server 314 where it is processed in the manner described above.

The present invention further supports any number of foreign language command line GUIs 906 for enabling the user to enter query requests. The invention provides foreign language command line GUIs 906 to support those users who are familiar with database query languages other than the enterprise server API. Such database query languages are herein called foreign query languages for reference purposes. There are many well known foreign query languages, such as the patent specific query language used by the U.S. Patent Office Web Site which is located at http://patents.cnidr.org/access/access.html. The client searching module 710 has a foreign language command line GUI 906 for each foreign query language of interest.

When using a foreign language command line GUI 906, the user enters at the command line a query request 910. The query request 910 is in the foreign query language associated with the foreign language command line GUI 906. The query request 910 is translated to a query request 908C in the enterprise server API by a translator 912 (there is a translator for each foreign query language supported by the invention). This query request 908C is then transferred to the searching module 410 in the enterprise server 314 where it is processed in the manner described above.

The present invention also supports searching of other data objects, such as groups (in the group databases 621) and notes (in the notes databases 640). In fact, the present invention supports searching of all the tables in the databases 316. Preferably, all fields in all tables of the databases 316 are indexed and searchable. In some embodiments, only some of the tables are indexed and searchable, such as the group databases 621 and the notes 640. GUIs, such as those discussed above, are used to enable operators to define searches of any attributes of these tables.

The present invention also supports context and linguistic type searching, and also supports image and object searching. The invention can be used, for example, with data blade search tools, such as those available from Informix.

Automatic Searches Related to Groups

The present invention also supports an automated search function related to groups. According to this aspect of the invention, a search is performed of all or part of the document databases 612 and/or the document bibliographic databases 602 to identify documents that satisfy a specified search criteria. The documents identified via this search are added to a specified group.

For example, suppose that the customer has a group called XYZ group. This group contains the patents that name XYZ corporation as assignee. Periodically, the invention automatically searches the patent bibliographic databases 604 for any patents that name the XYZ corporation as assignee. Any patents found from this search are automatically added to the XYZ group.

The invention supports performing such automatic searches at user defined intervals (such as every month), or at the occurrence of user-specified events, such as whenever the patent bibliographic databases 604 are updated.

The invention allows the customer to define such automatic searches. In defining an automatic search, the customer specifies the target databases (what databases to search), the target groups (which groups receive the identified documents), the search criteria, and the frequency or circumstances that the automatic searches take place.

Preferably, the searching module 410 performs the automatic searches.

Searching Algorithm

The searching module 410 processes a search string according to a preferred searching algorithm that is designed to take advantage of the searching and data accessing capabilities of the objects that directly interact with the databases 316. Such objects are herein called database accessing objects because they directly access and interact with the databases 316, and include the search engine(s) 424, the SQL server 426, and other database servers 428.

Figure 139:
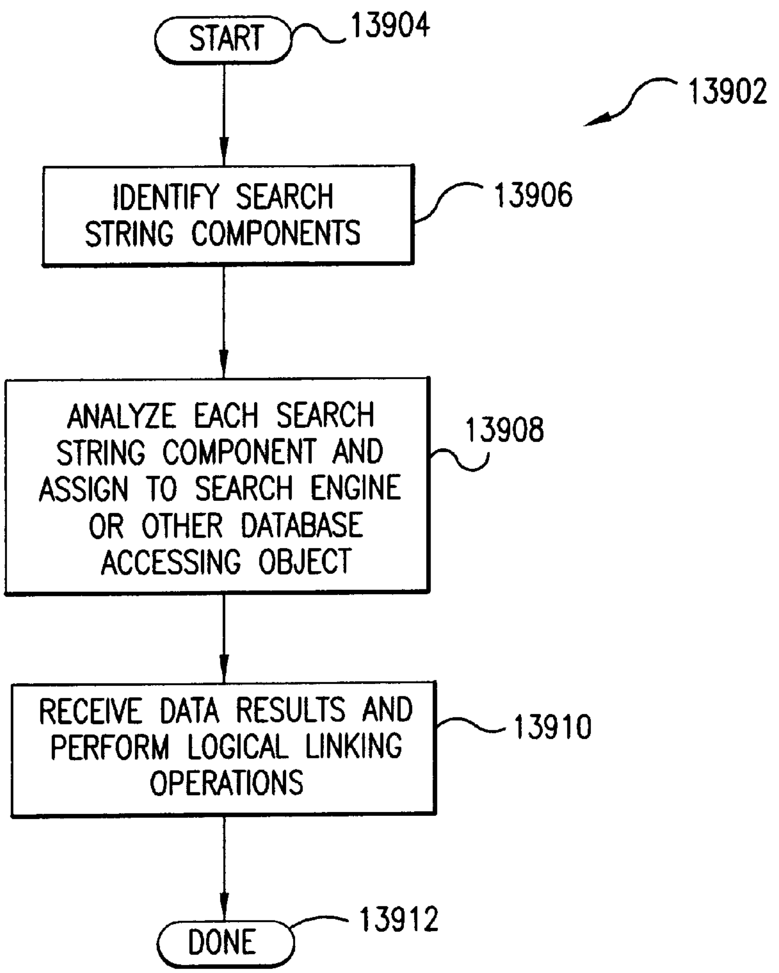
FIG. 139 is a flowchart depicting the operation of the present invention when performing searches according to an embodiment of the invention.

A flowchart 13902 shown in FIG. 139 represents a searching algorithm performed by the searching module 410 according to a preferred embodiment of the present invention. The searching module 410 performs the steps of flowchart 13902 with respect to a search string that it has received from a requester, such as a client 304, 306, or any other entity that wishes to conduct a search of the databases 316.

The search string includes one or more search string components, also called search string elements, which are preferably in the format shown in Table 3. The search string components/elements are separated by search syntax delimiters (Table 2).

In step 13906, the searching module 410 identifies the search string components in the search string. The searching module 410 preferably performs step 13906 by parsing through the search string. In the course of such parsing, the searching module 410 identifies search string components based on the location of search string delimiters (that is, search string components represent groups of characters that are separated by search string delimiters). For example, consider the following example search string:

(Phrase1 AND Phrase2) OR (Phrase6 AND (Phrase3 OR (Phrase4 AND Phrase5))).

In step 13906, the searching module 410 identifies the following as search string components (parsing the example search string from left to right):

Phrase1, Phrase2, Phrase6, Phrase3, Phrase4, and Phrase5.

In step 13908, the searching module 410 analyzes each search string component (identified in step 13906) and assigns each search string component to a database accessing object. The searching module 410 in step 13908 assigns a search string component to a database accessing object based on the characteristics of the search string component and the capabilities of the database accessing object. Specifically, the searching module 410 analyzes and identifies the characteristics of the search string component. The searching module 410 then assigns the search string component to a data accessing object whose capabilities are matched to these characteristics (that is, whose capabilities are well suited for processing search string components having those characteristics).

For example, suppose that the search string component being considered represents a text search in a collection of documents. This type of search is best suited to be performed by a search engine, such as search engine 424. Search engine 424 is well suited for performing text searches because the text in the databases 316 is indexed.

As another example, suppose that the search string component represents a search for all patents that are referenced by U.S. Pat. No. 1,234,567. This search string component is best represented as a relational database query. Accordingly, it would be best processed by a relational database engine, such as the SQL server 426 or other relational database servers 428.

After the search string components have been assigned to data accessing objects, the data accessing objects in step 13908 process their assigned search string components. Such processing preferably occurs in parallel. By processing the search string components in parallel, the length of time that it takes to conduct the search is reduced.

In step 13910, the data accessing objects transfer their respective result sets or search results to the searching module 410. These search results represent multiple data streams. The searching module 410 in step 13910 combines these data streams according to the logical linking operations represented by the search syntax delimiters in the original search string.

Figure 138:
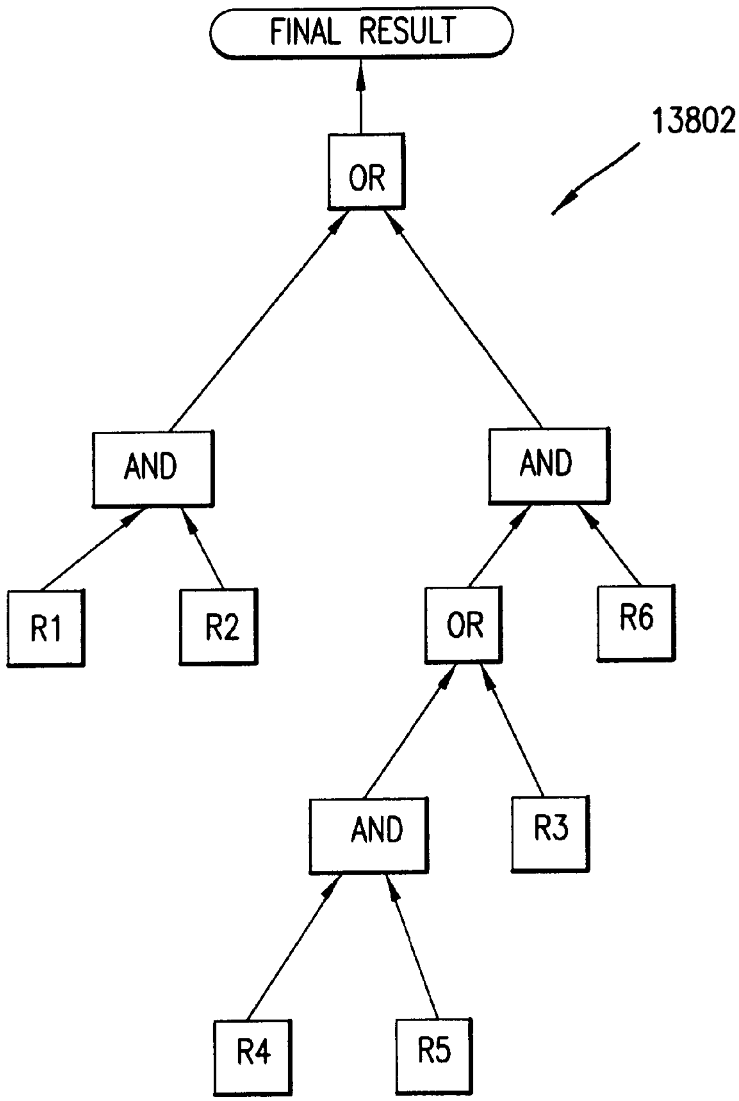
FIG. 138 illustrates a search hierarchy used to describe the searching algorithm according to a preferred embodiment of the present invention.

For example, FIG. 138 illustrates the manner in which the searching module 410 combines the search results resulting from the example search string presented above. R1 represents the search results generated by processing Phrase1. Similarly, R2, R3, R4, R5, and R6 represent the search results generated by processing Phrase 2, Phrase3, Phrase4, Phrase5, and Phrase6.

The searching module 410 combines R4 and R5 by logically AND'ing R4 and R5. That result is OR'd with R3. The result of that OR operation is AND'd with R6. The result of that AND operation is OR'd with the result of the logical AND'ing operation of R1 and R2. The result of this OR operation represents the final result of processing the original search string.

Preferably, for efficiency purposes, the result sets received from the database accessing objects are ordered according to a common criteria. Preferably, the result sets are ordered according to patent number.

The searching module 410 in step 13910 then returns this final result to the requester. Operation of flowchart 13902 is then complete, as indicated by step 13912.

In the present invention, it is not necessary to store the intermediate search results. For example, it is not necessary to store R1, R2, R3, R4, R5, and R6. Instead, the searching module 410 processes the intermediate search results as they are received. Referring to FIG. 138, the searching module 410 processes R4 and R5 (as they are received) by AND'ing them together. The result of that AND operation is immediately processed with R3 (as it is received) by OR'ing them together. The other search results are processed as they are received in a similar manner. As a result, the searching module 410 does not need to store the intermediate search results R1-R6 for any length of time.

The searching algorithm of the present invention shall now be further described with reference to the processing of the "patents in local repository" command 5408 and the "patents not in local repository" command 5410 (FIG. 54). These commands were discussed above.

The searching module 410 executes the "patents in local repository" command 5408 by first processing a search string in the manner shown in the flowchart 13902 (FIG. 139). The results of processing this search string are then logically AND'ed with a listing of the patents in the patent repository (that is, in the patent database 614). This logical AND operation yields a list of patents which satisfied the search string, and which are also in the patent database 614.

The searching module 410 performs the "patents not in local repository" command 5410 by first processing a search string in a manner discussed above with reference to flowchart 13902 in FIG. 139. The results of processing the search string are then logically NAND'ed with the list of patents in the patent database 614. This NAND operation yields a list of patents which satisfy the search string, but which are not in the patent database 614.

Grouping Module

The grouping module 412 in the enterprise server 314 manages and interacts with the group databases 621. The grouping module 412 receives and processes enterprise server API commands (sent from clients 304, 306) to perform at least the following functions: obtain information on the hierarchy of the groups stored in the group databases 621, make an existing group a child of another group, unlink a child group from one of its parent groups, update group properties, create a new group as a child of an existing group, obtain a list of documents in a group, add documents to a group, and remove documents from a group.

The grouping module 412 also supports group import and export functions. Some of these group import functions relating to BOM groups, corporate entity groups, and inventorship groups are described below. The grouping module 412 also supports a user-defined group (or generic) group import function. When performing this function, the grouping module 412 receives a properly structured file comprising a plurality of records (or lines of information), where each record specifies a name of a group and a physical level of the group in the group hierarchy. From this file, the grouping module 412 creates a user-defined group hierarchy in the user-defined group databases 624.

An example file for group importation is shown below (other file structures could alternatively be used):

| | |
|---|---|
| 1 | A |
| 2 | B |
| 3 | C |
| 2 | D |
| 3 | E |
| 4 | F |
| 3 | G |

Figure 115:
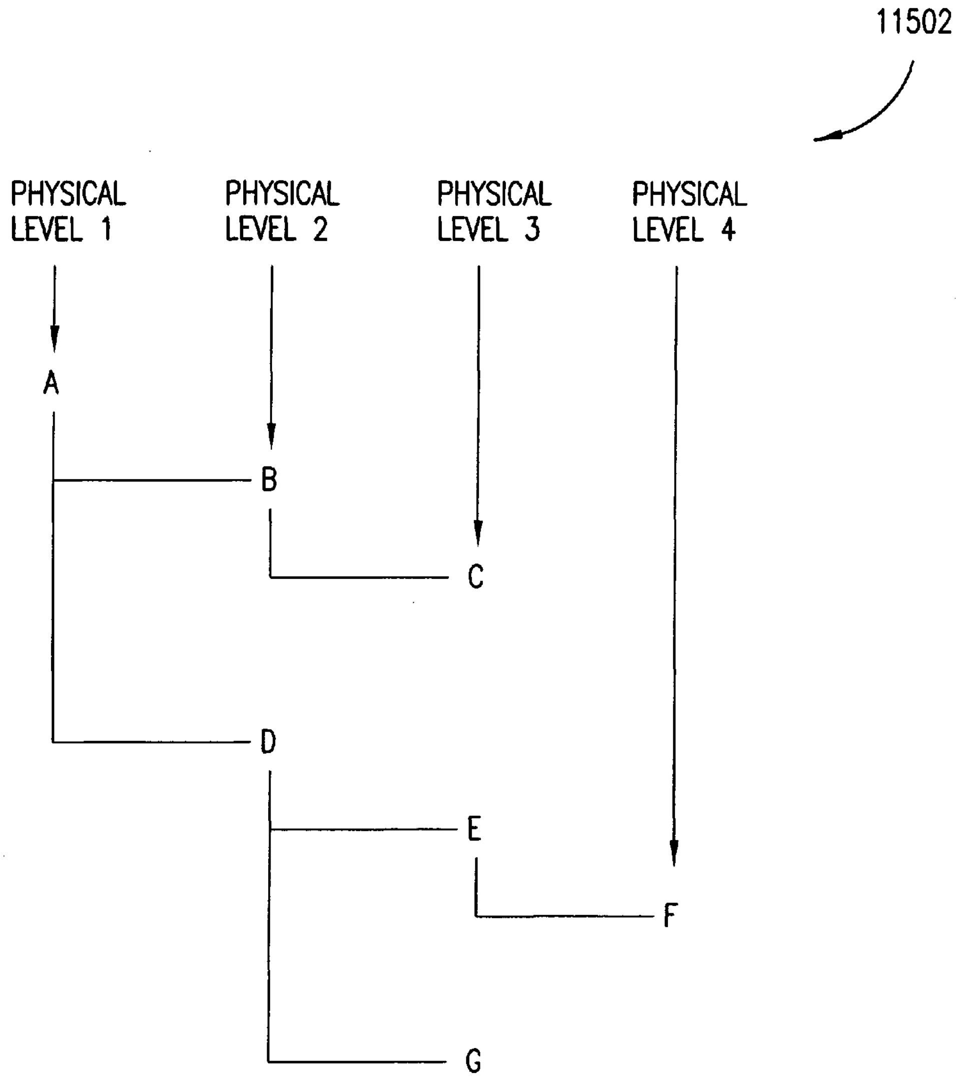
FIG. 115 is used to describe a generic group import function of the present invention.

The first column corresponds to the physical level in the group hierarchy, and the second column corresponds to the group name. The information contained in this example file corresponds to a group hierarchy shown in FIG. 115.

The grouping module 412, upon receipt of this file, creates a record in the group_table 1227 for each of the groups represented in the file (i.e., for groups A, B, C, D, E, F, and G). The physical level information from the file is stored in the group_group_xref table 1229. For example, the group_group_xref table 1229 would have a record that indicates that Group A is the parent of Group B. The group_group_xref table 1229 would also have a record that would indicate that Group G is a child of Group D. (It is noted that similar physical level information is also preferably in the customer BOM data 4704 (FIG. 47) with respect to load of the BOM databases 626.)

Figure 58:
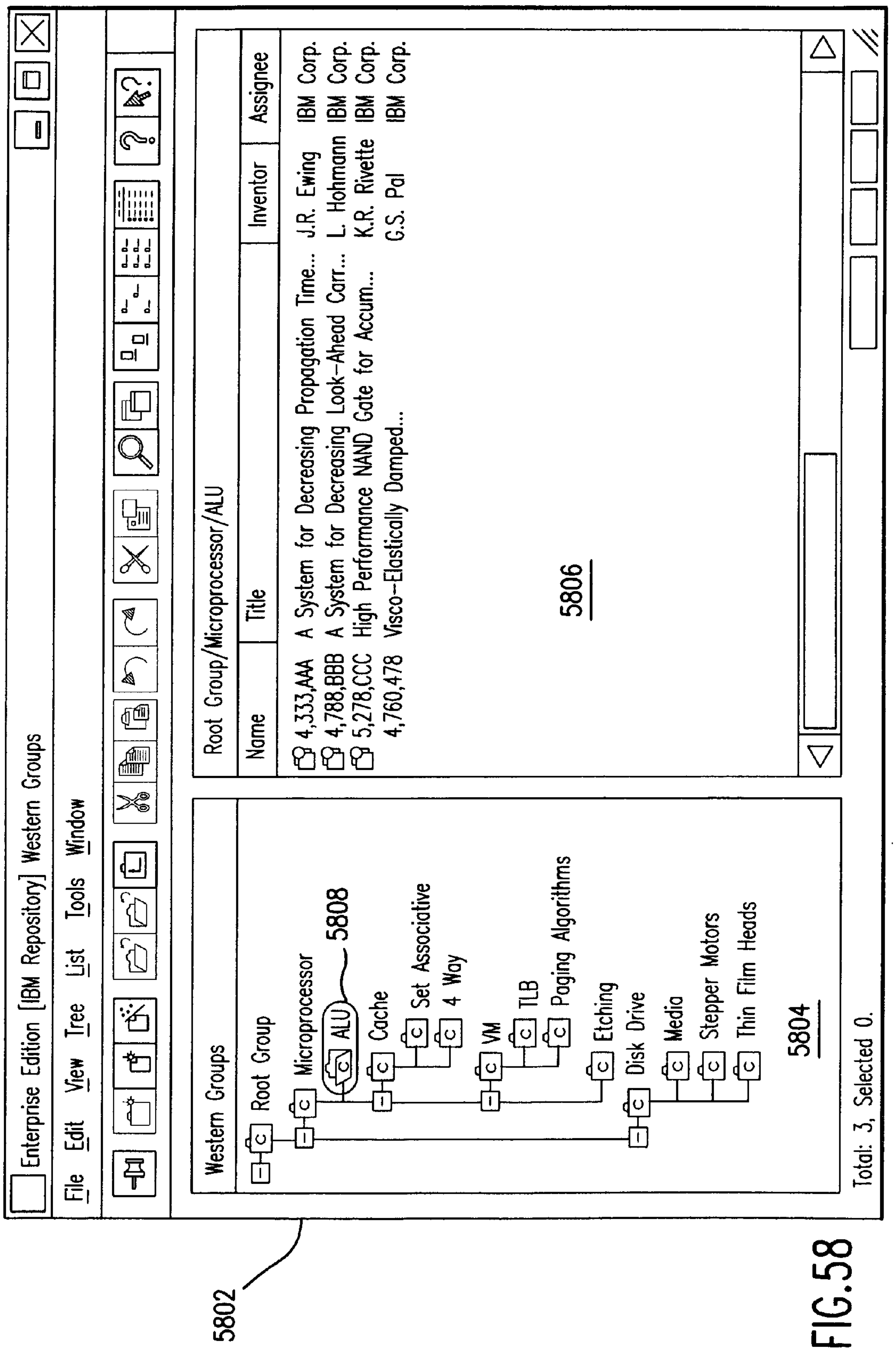
FIG. 58 is an example user interface display format pertinent to display of group information.

The client grouping module 712 displays the group hierarchy and the documents in a group, and enables a user to manipulate and process groups. FIG. 58 depicts an example screen shot displayed by the client grouping module 712 on the client monitor 1122. In a first window 5804, the client grouping module 712 displays a graphical representation of the hierarchy of groups stored in the group databases 621. Suppose that the user has selected an ALU group 5808 in this first window 5804. Selection of a group in the first window 5804 causes a list of the documents in the selected group to be displayed in a second window 5806. Accordingly, the client grouping module 712 displays the following list of documents: U.S. Pat. Nos. 4,333,AAA; 4,788,BBB; 5,278,CCC; 4,760,478 (as should be apparent from this example, many of the patents referred to herein for illustrative purposes are fictional). These documents are in the selected ALU group. Note that the second window 5806 also displays bibliographic information on the listed documents. Preferably, the information listed in the second window 5806 is in a spread sheet format. However, other formats could alternatively be used.

Selecting (by double clicking) a document from the list in the second window 5806 causes the selected document to be displayed. For example, suppose that the user selected U.S. Pat. No. 4,760,478 from the list displayed in the second window. This would cause the client 304, 306 to obtain the text and image of this patent from the databases 316 via the enterprise server 314. The client document storage retrieval module 708 would then display the retrieved text and image of the '478 patent at the client monitor 1122 using the format shown in FIG. 112, where the text is displayed in a text window 11202, and the image is displayed in an image window 11204.

The client grouping module 712 receives from the user commands to navigate through the group hierarchy, to edit the group hierarchy, to edit groups, to add documents to groups, to delete documents from groups, to delete groups, etc. The client grouping module 712 modifies the display of the window 5802 as necessary to reflect these user commands. The client grouping module 712 also generates enterprise server API commands corresponding to these user commands, and forwards these enterprise server API commands to the enterprise server 314 for processing by the grouping module 412 in the enterprise server 314.

Analysis Modules

Figure 10:
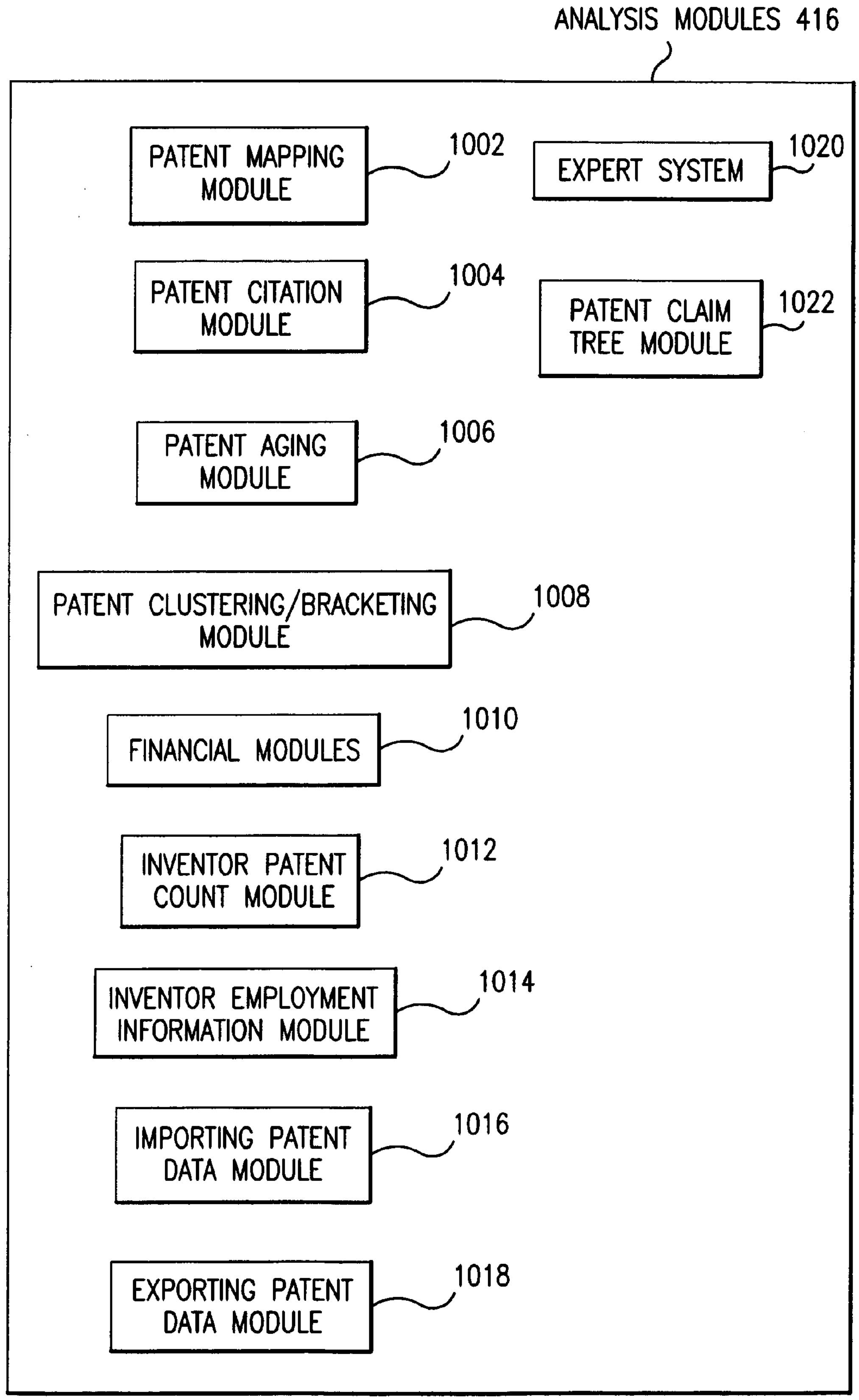
FIG. 10 is a block diagram of the analysis modules which form a part of the enterprise server of FIG. 4.

The analysis modules 416 are shown in FIG. 10. These analysis modules 416, which are also called methodology modules 416, automatically interact and process data contained in the databases 316 pursuant to user commands. The analysis modules 416 are patent-centric (or document-centric) and group-oriented. The analysis modules 416 are patent-centric because they all involve the processing (including reporting, analysis, and planning) of patent data either with or without consideration of other data, such as production data, HR data, financial data, etc. The analysis modules 416 are group-oriented because they have the capability of processing the patents (or other documents) in one or more groups, and potentially the children of these groups.

It should be understood that the invention is adapted and intended to include a wide and varied range of analysis modules 416. The analysis modules 416 shown in FIG. 10 represent only a sampling of the analysis modules 416 that the invention is adapted and intended to support. The invention can support many other analysis modules 416 because the databases 316 are so rich. The analysis modules 416 can include any other module that performs useful processing (from the point of view of the customer) of the data in the databases 316. Accordingly, the particular collection of analysis modules 416 shown in FIG. 10 are described herein for the purpose of illustration, and not limitation.

For illustrative purposes, the analysis modules 416 are sometimes described herein as working with particular types of groups, such as BOM groups. However, it should be understood that the analysis modules 416 can work with any types of groups.

The analysis modules 416 are described in detail in sections below.

Security Module

The security module 402 in the enterprise server 314 manages and interacts with the security databases 636, which stores information required to implement the security features of the invention. The security module 402 utilizes the information in the security databases 636 to implement a multilevel security methodology. The security databases 636 and the multilevel security methodology implemented by the security module 402 are described in detail in sections below.

The client security module 702 in the clients 304, 306 enable a user to access and modify the security information in the security databases 636. Typically, access to the client security module 702 and the security databases 636 is limited to users with high security clearances, such as system administrators.

Server Administration Module

The server administration module 418 performs functions related to the enterprise server 314's resources, such as the databases 316 and the indexes to the databases 316. Some of the server administration module 418 functions include performing reindexing operations of the databases 316, when necessary, importing and exporting large portions of the databases 316, upon request, managing directories, etc. The server administration module 418 is also responsible for establishing user sessions with the enterprise server 314.

The client server administration module 718 at the client 304, 306 and/or the server administration module 418 in the enterprise server 314 preferably maintains one or more server configuration files. Information in the server configuration files identifies, for example, the physical location of the databases, the number of possible concurrent users, memory size allocations, etc. The server configuration files can also include log files. The server configuration files would indicate what events are to be logged to the log files, such as whether to track all user actions, track error conditions, etc.

Server Configuration Module

Not all users have access to all of the enterprise server functions. A normal user, for example, may be only able to search documents and document bibliographical information, view documents, and print documents. Accordingly, a normal user would be able to access only the document storage and retrieval module 408 and the searching module 410 of the enterprise server 314.

Also, different users may have different search capabilities. Some users may be able to search only document bibliographic information, while other users may be able to search both document bibliographic information and the text of documents.

A power user may be allowed access to all enterprise server functions. The power user could search documents and document bibliographical information, view documents, print documents, work with groups, work with notes, and invoke analysis functions. Accordingly, the power user would be able to access the document storage and retrieval module 408, the searching module 410, the grouping module 412, the notes module 414, and the analysis modules 416 of the enterprise server 314.

A system administrator may be able to set user security levels and perform enterprise server administration functions. Accordingly, a system administrator would have access to at least the security module 402 and the server administration module 418.

Figure 7:
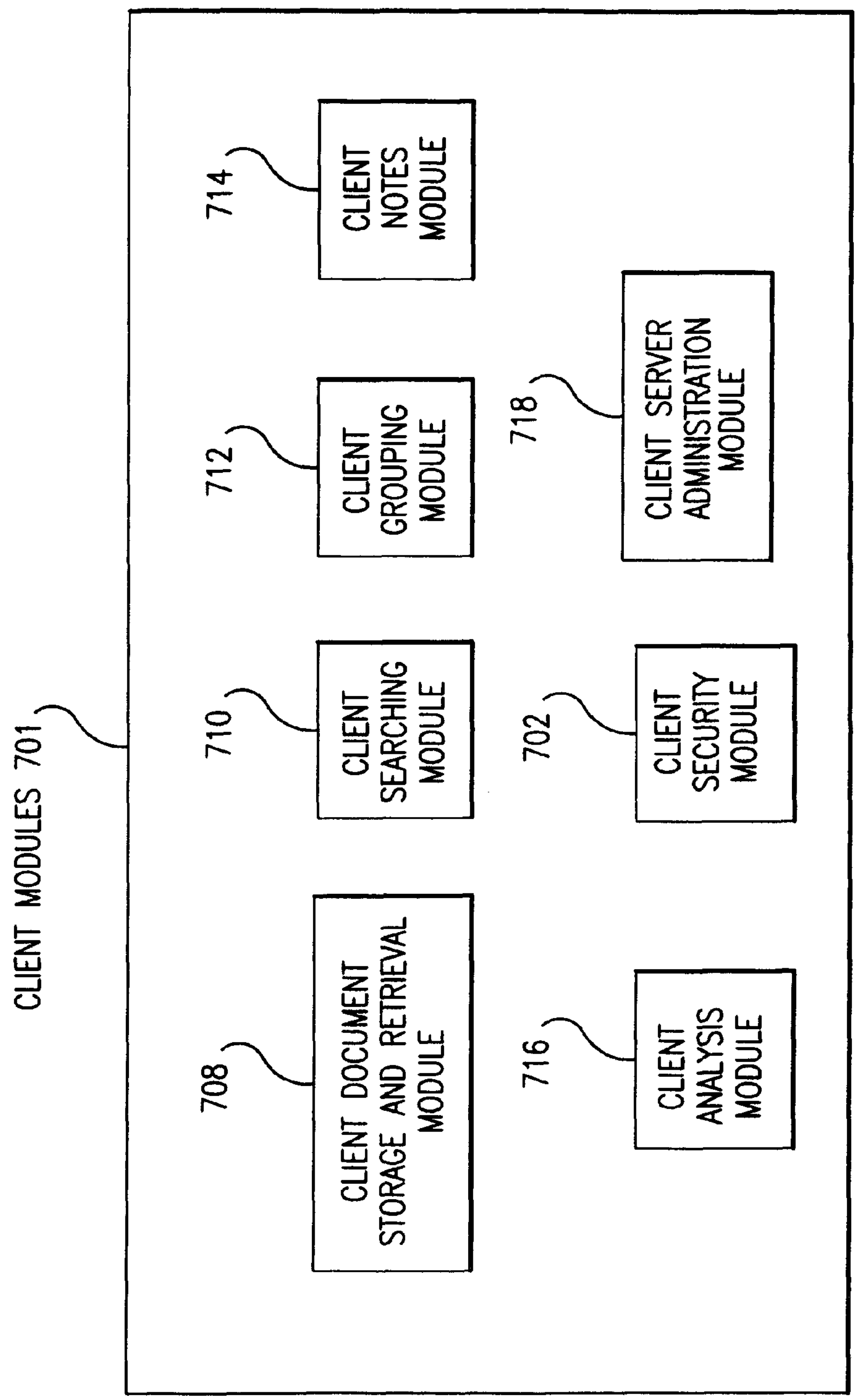
FIG. 7 is a block diagram of a network client (and potentially a web client) according to an embodiment of the invention.

The modules loaded on a user's computer preferably depend on the user's security level, and correspond to the modules in the enterprise server 314 to which the user has access. Referring to FIG. 7, only the client document storage and retrieval module 708 and the client searching module 710 are preferably loaded on the computers (i.e., clients 304, 306) of normal users. The client document storage and retrieval module 708, the client searching module 710, the client grouping module 712, the client notes module 714, and the client analysis module 716 are loaded on the computers of power users. The client security module 702 and the client server administration module 718 re preferably loaded on the computers of system administrators.

Figure 101:
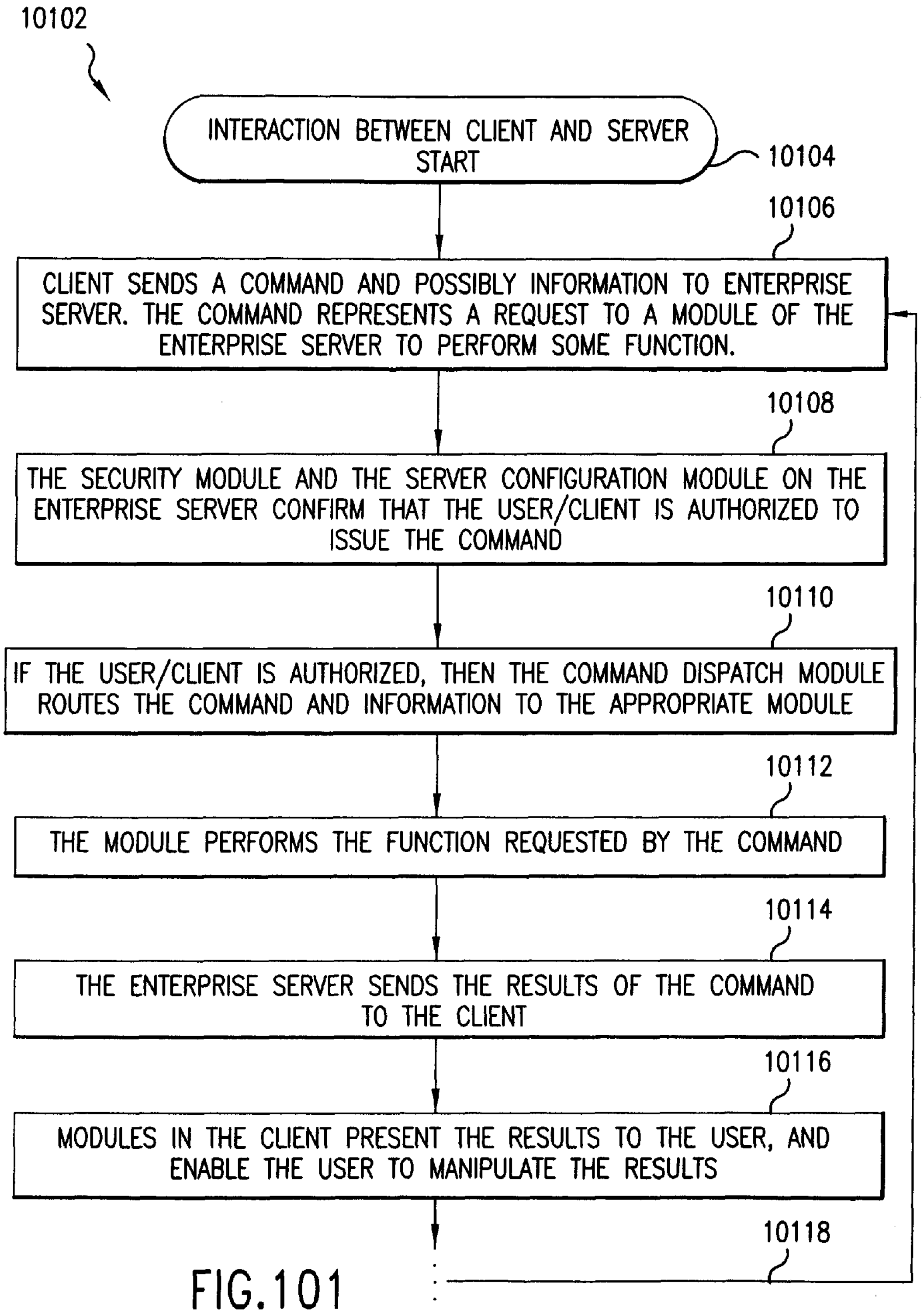
FIG. 101 is a flowchart representative of the interaction between a client and the enterprise server.

The system configuration module 404 in the enterprise server 314 keeps track of the functions and modules that each user is permitted to access. Preferably, the server configuration module 404 maintains a database (not shown) having access privilege information for each user (note that this is different than security access information). As shown in FIG. 101, when the enterprise server 314 receives a command from a user, the server configuration module 404 in step 10108 ensures that the user has access to the target module (i.e., the module in the enterprise server 314 that would have responsibility for processing the command) before allowing the command dispatch module 406 to forward the command to the target module for processing. FIG. 101 is further described below.

The functions and enterprise server modules that a user is allowed to access is dependent on a number of factors, such as the user's level of need, the user's level of expertise, and/or whether or not the user has purchased the modules and/or databases (in some embodiments, it may be necessary for the user to pay a fee to access and obtain the benefits of an enterprise server module, such as the notes module 414, the grouping module 412, and/or the analysis modules 416).

The user's computer platform is also a consideration. In some embodiments, software for some client modules (such as the client grouping module 712, the client notes module 714, and/or the client analysis module 716) may not exist for the user's particular computer platform. This is especially true for the computer platforms used to implement the web clients 304. In these cases, the user will not be able to access any of the enterprise server modules for which the user's platform does not have a corresponding client module. In other embodiments, however, software for all of the client modules are available for all platforms. Accordingly, the user's computer platform is not a consideration with respect to the issue of which enterprise server modules the user is capable of accessing. In these embodiments, the client modules may be implemented using multi-platform enabled software, such as Java or other such software.

In some embodiments, the modules are not loaded on the user's computer. Instead, they are run from a server connected to the user's computer. However, a particular user may not have access to all of the modules on the server, for the reasons discussed above.

Command Dispatch Module

The command dispatch module 406 routes enterprise server API commands received from clients 304, 306 to the enterprise server modules that are responsible for processing the commands. This functionality is represented in step 10110 of FIG. 101, described below. The enterprise server API commands are described below. Also described below is the mapping of enterprise server API commands to enterprise server modules (i.e., which enterprise server modules process which enterprise server API commands).

Clients

As noted above, the system 302 preferably includes two types of clients, network clients 306 and web clients 304. The network clients 306 and the web clients 304 are discussed in greater detail below.

It is noted that the functional capabilities of network clients 306 and web clients 304 may differ in some embodiments, and may be the same in other embodiments (this is described below). However, for simplicity purposes, the present invention is sometimes described as interacting with "clients 304, 306," which may represent one or more network clients 306, one or more web clients 304, or any combination of network clients 306 and web clients 304.

Network Clients

The network clients 306 preferably communicate with the enterprise server 314 using the enterprise server 314's natural language, which is called the enterprise server API (application program interface). The network clients 306 can be considered to represent web browsers that are specific to the language and the functions supported by the enterprise server 314. The enterprise server API is described below.

The network clients 306 preferably communicate directly with the enterprise server 314 via a communication network 312, which is preferably a network that supports the well known HTTP (hypertext transport) protocol.

Each network client 306 is preferably implemented using a computer, such as the computer 1102 shown in FIG. 11. Preferably, the computers used to implement the network clients 306 are personal computers with at least 16 MBytes of main memory 1108, running the Microsoft Windows 95 operating system or the Microsoft Windows NT operating system. The software executing in the network clients 306 is preferably written in the C++ computer programming language.

In fact, preferably all software of the invention is written using the C++ computer programming language. Database manipulation code is written in a combination of SQL and C++. Other computer programming languages could alternatively be used, such as SmallTalk, Java, C, Pascal, ADA, etc.

Web Clients

The web clients 304 are each preferably implemented using a computer such as that shown in FIG. 11. Commercial web browser software preferably executes in the web clients 304. Any commercial and well known web browser software can be used, such as web browser software from Netscape, Microsoft, Sun, etc.

Unlike the network clients 306, the web clients 304 do not typically utilize the enterprise server API. Accordingly, the web clients 304 communicate indirectly with the enterprise server 314 via the web server 310.

Figure 8:
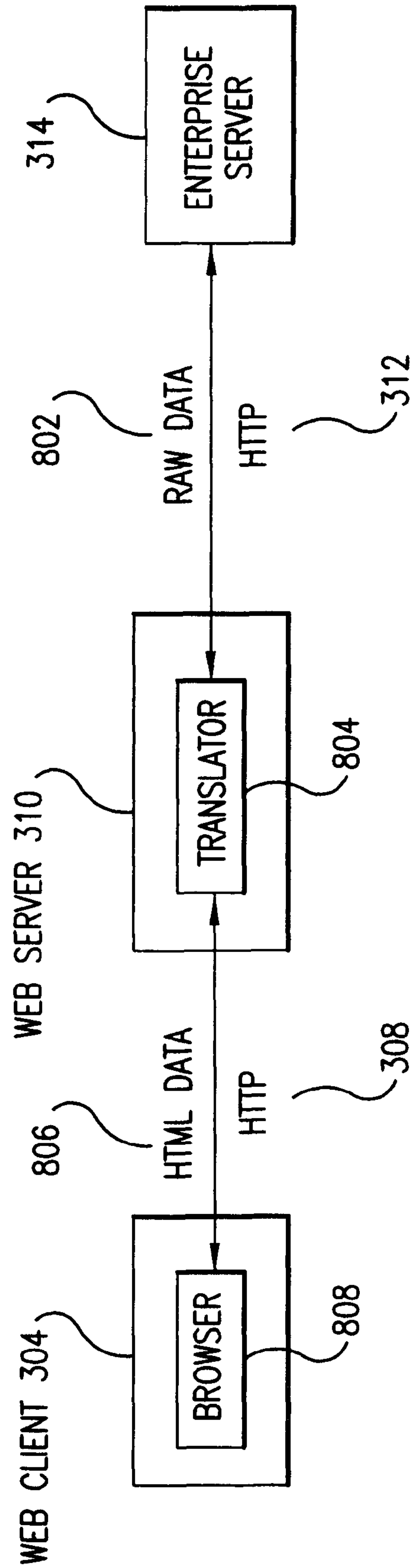
FIG. 8 is a block diagram of a web server according to an embodiment of the invention.

FIG. 8 is a block diagram of the web server 310. This block diagram also illustrates the data flow between the web client 304 and the enterprise server 314 via the web server 310. The web server 310 includes a translator 804 that translates between the respective languages of the web clients 304 (preferably HTML, or hypertext markup language) and the language of the enterprise server 314 (i.e., the enterprise server API).

Specifically, the enterprise server 314 sends raw data 802 to the web server 310 over the network 312. The translator 804 in the web server 310 translates the raw data 802 to data in the well known HTML data format. This HTML data 806 is sent to the web client 304 over network 308. A browser 808 in the web client 304 renders the HTML data 806. The translator 804 translates data going from the web client 304 to the enterprise server 314 in a similar manner. It is noted that data formats other than HTML could alternatively be used. In particular, any data format used by the browser 808 could alternatively be used in the invention.

Since the web server 310 communicates with the enterprise server over the network 312 using the enterprise server API, the web server 310 appears to be a network client 306 from the perspective of the enterprise server 314. The interaction between the web clients 304 and the enterprise server 314, and the network clients 306 and the enterprise server 314, is further described below.

The use of commercial web browser software in the web clients 304 is advantageous because such software executes on different computer platforms (that is, there are versions of the browser software that executes on different computer platforms), such as computer platforms produced by IBM, Apple, Sun, SGI, HP, companies producing computers that are compatible with those produced by these companies, etc. Thus, the present invention via the web clients 304 enables users working on any type of computer platform for which a commercial web browser is available to access the enterprise server 314 and the databases 316. This feature of the invention is particularly important in the data processing world of today, where any given corporate entity may have users on many different computer platforms. The present invention allows all of these users (using commercial web browser software, which the corporation may already own) to access and work with the enterprise server 314 and the databases 316, irrespective of the type of computer that they are using.

Enterprise Server API (Application Programming Interface)

The enterprise server API includes commands for accessing functions and capabilities supported by the enterprise server modules (shown in FIG. 4). Many of the enterprise server commands have an implicit parameter which is the sessionID (identifier) of the current server session. A sessionID is obtained by calling the ReqLogin command. All commands issue an exception on failure.

Interaction between the clients 304, 306 and the enterprise server 314 is conducted via direct or indirect use of the enterprise server API, whether or not stated explicitly herein.

Other applications (not discussed herein) may interact with the enterprise server 314 as long as such applications conform to the enterprise server API.

An embodiment of the invention includes timed, automatic executing commands (such as the automatic searches described above). These commands execute upon the occurrence of an event (the event can be defined in the passed parameters of the commands). Such events include time (for example, execute every 30 days), system update (for example, run this search every time new patents are loaded into the enterprise server), data change (for example, automatically regroup these patents every time a corporate entity changes), etc. These timed automatic executing commands are essentially those listed and described below, with additional logic for detecting the occurrence of the defined condition(s)/event(s), and for automatic execution upon such detection.

The commands that make up the enterprise server API according to an embodiment of the invention are described below. It should be understood that the enterprise server API is extendable to support other enterprise server modules, or to support additional or modified functions in existing enterprise server modules, or to support other functions described herein. Embodiments of the enterprise server API may include only a subset of the following commands. Also, modules other than the ones identified could process the following commands. For example, the Server Administration Module 418 could process the Security Module 402's commands.

Commands Processed by the Server Administration Module 418

ReqLogin(username, password)

Returns: sessionID

Description: Login command for the enterprise server 314 for user authentication and to establish a user session on the enterprise server 314.

ReqLogout( )

Returns: nothing

Description: Terminates user session with enterprise server 314.

ReqAddUsers(userList userSet)

Returns: nothing

Description: Adds the users specified in userSet to the system (as being able to access the system).

ReqGetAllUsers( )

Returns: list of users in system

Description: Returns a list of users registered to work with the system.

ReqGetUsers(userIdList userIDSet)

Description: Returns a list of users (identified by userIDSet) and their user IDs.

ReqRemoveUsers(userIdList userIDSet)

Description: Removes a list of users from system, specified by their user IDs (userIDSet).

Commands Processed by the Security Module 402

ReqGetPermissionList(string docGroupID)

Description: Gets and returns the permission list for a group specified by docGroupID.

ReqRemovePermission(string docGroupID, string entityID)

Description: Removes all access privileges to a group (specified by docGroupID) from an entity (specified by entityID).

ReqSetPermission(string docGroupID, string entityID, string mode)

Description: Sets access permission (specified by mode) for an entity (specified by entityID) to use a group (specified by docGroupID).

Commands Processed by the Document Storage and Retrieval Module 408

ReqCanPage(document, section, page)

Returns: raw image data

Description: Gets the bitmap image (also called the canonical representation) associated with a section and page of a document as specified in the passed parameter.

ReqDocList( )

Description/Returns: Retrieves and returns a list of documents in the repository.

ReqTxt(document)

Returns: raw text data

Description: Gets the ASCII text of a document specified in the passed parameters.

ReqRawCan(document)

Returns: entire image file

Description: Gets the entire collection of images associated with a document specified in the passed parameter.

ReqRawEqv(document)

Returns: entire equivalent or text file

Description: Gets the document equivalent data or text data of a document specified in the passed parameter. This return data is a textual representation of the document.

ReqCanHeader(document)

Returns: Image file header data

Description: Gets header information about the collection of images associated with the document specified in the passed parameter, including the size, width, and height of the images.

ReqAbstract(spStringSet patentlist)

Returns: A list of abstract/patent number pairs

Description: Retrieves abstracts associated with the patent list specified in the patentList parameter.

ReqGetAllPatentData(int sindex, int eindex)

Returns: list of patents with their bibliographic information, search handle

Description: Gets the list of patents plus their bibliographic information, starting from sindex and ending with eindex, where sindex and eindex are based on the ordering of the patents in the patent bibliographic databases 604. Example: ReqGetAllPatentData(0, 5) returns the first 6 patents in the patent bibliographic databases 604 with their bibliographic information. Also returns a handle that identifies the persistent result set on the enterprise server in order to get more patents from the result set.

ReqGetAllPatents(int sindex, int eindex)

Returns: list of patents, search handle

Description: Gets the list of patents, starting from sindex and ending with eindex, where sindex and eindex are based on the ordering of the patents in the patent bibliographic databases 604. Example: ReqGetAllPatents(0, 5) returns the first 6 patents in the patent bibliographic databases 604. Also returns a handle that identifies the persistent result set on the enterprise server in order to get more patents from the result set.

ReqGetPatentDataInGroup(string groupID, int sindex, int eindex)

Returns: list of patents with their bibliographic information, search handle

Description: Gets a list of the patents in a group (specified by groupID) with their bibliographic information, starting from sindex and ending with eindex (relative to the ordering of the patents in the group). Example: ReqGetPatentDataInGroup (groupid, 0, 5) returns the first 6 patents and their bibliographic information from the group. Also returns a handle that identifies the persistent result set on the enterprise server in order to get more patents from the result set.

ReqGetPatents(string groupID, int sindex, int eindex)

Returns: list of patents from sindex to eindex.

Description: This is similar to ReqDocsInGroup (described below), except it returns patents from sindex to eindex from the group specified by groupID. sindex and eindex are relative to the ordering of the patents in the group. Example: ReqGetPatents(groupid, 0, 5) returns the first 6 patents in the group. ReqGetPatents(groupid, 6, 11) returns the second 6 patents in the group. Also returns a search handle on which to get subsequent patents.

ReqDeletePatentHandle(string handle)

Returns: nothing

Description: Deletes a generated result set of patents specified by handle, generated by ReqGetAllPatents or ReqGetPatents.

ReqGetPatentDataFromHandle(string handle, int sindex, int eindex)

Returns: list of patents with their bibliographic information, search handle

Description: Receives a handle. From that handle, gets the patents from sindex to eindex (where sindex and eindex are relative to the handle), and also gets their bibliographic information. The handle is generated by ReqGetPatentDataInGroup or ReqGetAllPatentData.

ReqGetPatentsFromHandle(string handle, int sindex, int eindex)

Returns: list of patents, search handle

Description: Receives a handle. From that handle, gets the patents from sindex to eindex (where sindex and eindex are relative to the handle). The handle is generated by ReqGetPatents or ReqGetAllPatents ReqGetPatentsWithBibInfo(patentList list)

Returns: list of patents with their bibliographic information

Description: Given a list of patents (specified by list), returns a list of patents with their bibliographic information.

Commands Processed by the Grouping Module 412

ReqGetGroupHierarchy( )

Returns: group hierarchy information

Description: Retrieves information about the hierarchical structure of the groups stored in the databases 316.

ReqAddDocGroup(groupParentID, groupID)

Returns: nothing

Description: Adds an existing group (specified by groupID) as a child to another group (specified by groupParentID).

ReqRemoveDocGroup(groupParentID, groupID)

Returns: nothing

Description: Unlinks a group (specified by groupID) from its parent group (specified by groupParentID). If the group has no parent, the group is deleted.

ReqUpdateDocGroupProperties(group)

Returns: updated group

Description: Update group properties (such as description and title) of the group specified by the passed parameter.

ReqNewDocGroup(groupParentID, group)

Returns: new group

Description: Create a new group (corresponding to the group passed parameter) on the enterprise server 314 as a child of another group (specified by groupParentID).

ReqDocsInGroup(groupID)

Returns: list of document names

Description: Get the list of documents in the group specified by the passed parameter.

ReqAddDocListToGroup(groupID, documentList)

Returns: nothing

Description: Add a list of existing documents (specified by documentList) to the group specified by groupID.
ReqAddPatents(string groupID, patentList pList)
Returns: nothing
Description: Add the list of patents (specified by pList) to the group specified by groupID.
ReqRemoveDocListFromGroup(groupID, documentList)
Returns: nothing
Description: Remove a list of documents (specified by documentlist) from the group specified by groupID.
ReqRemovePatents(string groupID, patentlist pList)
Returns: nothing
Description: This is similar to ReqRemoveDocListFromGroup. This removes a list of patents (specified by pList) from the group specified by groupID.
ReqNewGroupWithSearchPatents(parentID, grp, handle)
Returns: group
Description: Creates a new group specified by grp under the parent group specified by parentID with documents/patents from a persistent result set generated by ReqSearchRelevant. The persistent result set is specified by handle.

Commands Processed by the Notes Module 414

ReqCreateNote(noteID, text, reference)
Returns: created note
Description: Create a new note on the enterprise server 314. The identifier of the new note is noteId, the text (or pointer to any type of data in any form) or content of the note is specified by text, and linkage information is specified by reference. The linkage information specifies the document and the portion within the document to which the new note is linked.
ReqUpdateNote(noteID, text, reference)
Returns: updated note
Description: Update a note (specified by noteID) on the enterprise server 314 with new text (specified by text) or reference (i.e., linkage information specified by reference).
ReqAddNoteListToDoc(groupID, documentID, noteList)
Returns: nothing
Description: Add a list of notes (specified to noteList) to a document (specified by documentID) in a group specified by groupID. groupID is used for security purposes (i.e., to ensure that the operator has the proper security level to add the notes to the document).
ReqRemoveNoteListFromDoc(groupID, documentID, noteList)
Returns: nothing
Description: Remove a list of notes (specified by noteList) from a document (specified by documentID) in a group (specified by groupID). groupID is used for security purposes (i.e., to ensure that the operator has the proper security level to remove the notes from the document).
ReqNotesOnDoc(groupID, documentID)
Returns: nothing
Description: Get all notes associated with a document (specified by documentID) in a group (specified by groupID). groupID is used for security purposes (i.e., to ensure that the operator has the proper security level to retrieve the notes associated with the document).
AddGroupNote(groupID, gnote)
Returns: A group note
Description: Adds a new group note represented by gnote to the group identified by groupID. Updates the note if it already exists.
AddPatent Note(groupID, note)
Returns: note
Description: Adds a new patent note represented by the parameter note to the group identified by groupID. Updates the note if it already exists.
GetGroupNotes(groupID)
Returns: returns group notes
Description: Retrieves all group notes associated with the group identified by groupID.
GetPatent Notes(groupID)
Returns: returns patent notes
Description: Retrieves all patent notes associated with the group identified by groupID.
RemoveGroupNote(groupID, groupNoteID)
Returns: nothing
Description: Removes the group note with groupNoteID from the group specified by groupID.
RemovePatent Note(groupID, noteID)
Returns: nothing
Description: Removes the patent note with NoteID from the group specified by groupID.
UpdateGroupNote(gnote)
Returns: a group note
Description: Updates an existing group note.
UpdatePatent Note(note)
Returns: a patent note
Description: Updates the properties of an existing note.
AddNoteSegment(noteID, noteseg)
Returns: a note segment
Description: Add given note segment represented by noteseg to a patent note identified by noteID.
GetGroupNotesMatchingString(groupID, search)
Returns: List of notes
Description: Return group note identifiers of notes in a group (specified by groupID) that contain the search string (represented by the search parameter).
GetNoteSegments(noteID)
Return/Description: Get and return all note segments associated with the given patent note specified by noteID. Also return their location information.
GetNoteSegmentsMatchingString(groupID, search)
Returns: List of note segments
Description: Return note segment identifiers of notes in a group (specified by groupID) that contain the search string (represented by the search parameter).
GetPatentLocations(groupID, patentName)
Returns: patent location list
Description: Returns all patent locations attached to the patentName.
LinkNoteSegment(noteSegmentID, location)
Returns: nothing
Description: Links note segment to location in a patent.
UnlinkNoteSegment(noteSegmentID)
Returns: nothing
Description: Unlinks note segment from location in patent.
UpdateNoteSegment(noteseg)
Returns: note segment
Description: Updates an existing note segment.
RemoveNoteSegment(noteID, noteSegmentID)
Returns: nothing
Description: Removes note segment specified by noteSegmentID from a patent note specified by noteID.

Commands Processed by the Searching Module 410

ReqSearch(searchParameters, startIndex, endIndex)
Returns: list of search results, search handle
Description: Execute a search based on searchParameters, retrieve search results from startIndex to endIndex in result table.
ReqRetrieveSearchResult(searchHandle, startIndex, endIndex)
Returns: list of documents Description: Retrieve search results of previously executed search (identified by searchHandle) from startIndex to endIndex in result table. Also implemented as ReqRetrieveSearchRelevantResult(string handle, int sindex, int eindex).

ReqSearchHighlights(searchHandle, documentID)

Returns: list of text offsets for highlighting

Description: Retrieve search hit information for a particular document (specified by documentID) so that search term highlighting can be performed on the document. The search is specified by searchHandle.

ReqSearchBib(spSearchParameters s, int sindex, int eindex)

Returns: list of search results, search handle

Description: Executes a search based on SearchParameters, retrieves search results from startIndex to endindex in result table, where the search results include the bibliographic information of the documents identified by the search.

ReqSearchRelevant(ReqRetrieveSearchRelevantResult (searchType, searchOrder, query, sindex, eindex, minRelevance)

Return: search results with bibliographic information

Description: Performs a search on either the repository patents, all patents, or patents not in the repository (selected by searchType) using the search parameters. Returns the results sorted by field specified in searchOrder. Only return results that have a relevance number greater than minRelevance. Gets the results from row sindex to row eindex. Also returns a handle that identifies the persistent result set on the enterprise server in order to get more patents from the result set.

ReqRetrieveSearchRelevantResult(handle, sindex, eindex)

Returns: List of patent bibliographic information, and a search handle

Description: Retrieves portions of a persistent search result set generated by ReqSearchRelevant and identified by handle, from row sindex to row eindex.

Commands Processed by the Analysis Modules 416

ReqFunction(function, level, PatExp1, PatExp2, PatTerm1, PatTerm2, GroupID)

Returns: Results generated by performing the function specified by the function passed parameter Description: Performs the function specified by the function passed parameter. The function passed parameter can identify any function performed by the enterprise server 314, such as Patent Mapping, Patent Aging, Patent Citation, Inventor Employment Information, and Patent Count. Level specifies the number of levels in the group hierarchy to drill down. PatExp1 and PatExp2 specify two dates (a time range) that designate a search scope based on patent expiration (see FIG. 128). PatTerm1 and PatTerm2 specify two dates (a time range) that designate a search scope based on patent term remaining (see FIG. 128). GroupID identifies a group for which the function is performed.

ReqAnalysis Citation (documentID, direction, levels)

Returns: patent/child table and patent bibliographic information table

Figure 158:
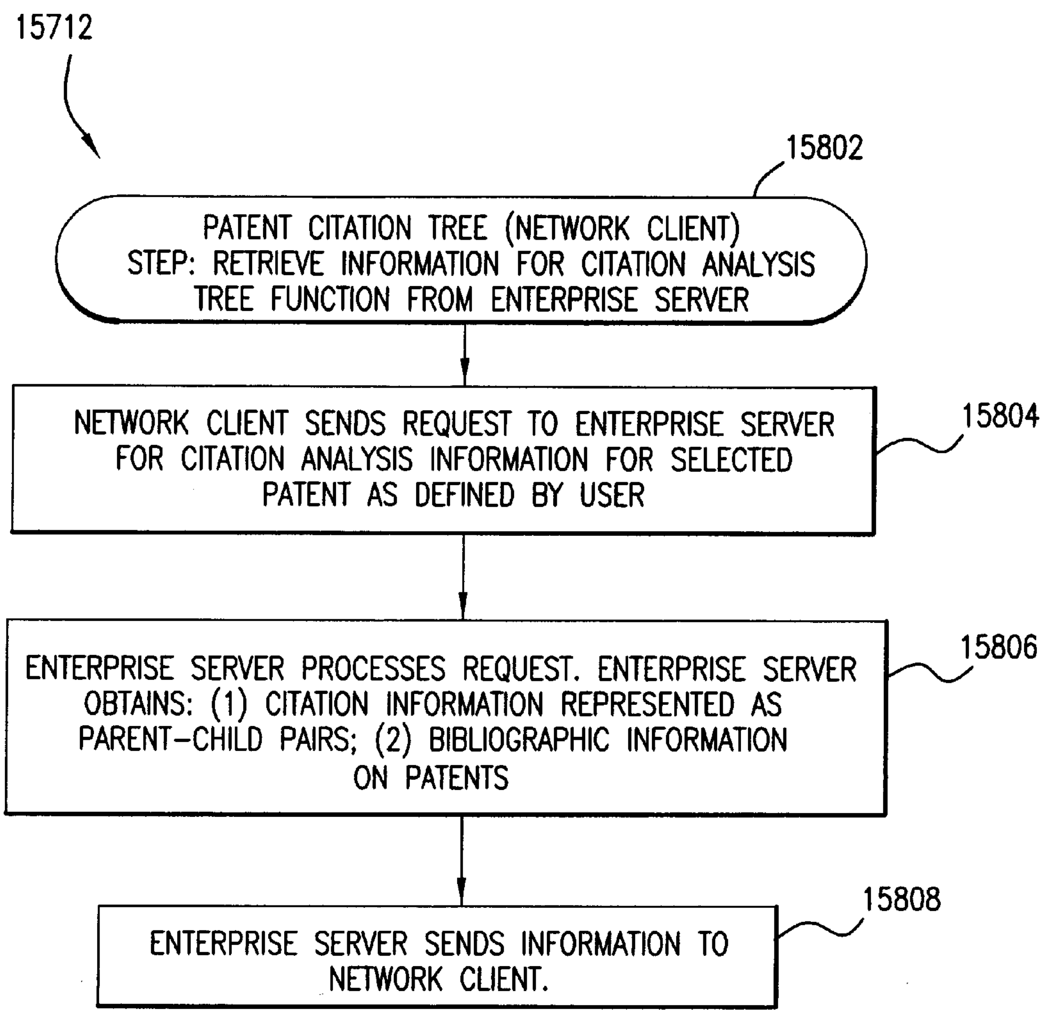

Description: Performs a patent citation function for a patent identified by documentID. Either a forward or a backward citation function is performed, as identified by the direction parameter. A multilevel citation function can be performed. The number of levels is specified by the levels parameter. For a detailed description of the operation of the enterprise server 314 when processing the ReqAnalysis Citation command, see step 15806 (FIG. 158), discussed below.

Client/Server Interaction

FIG. 101 is a flowchart depicting the generic interaction between the network clients 306 and the web clients 304 with the enterprise server 314. In step 10106, a client 304, 306 (either a network client 306 or a web client 304) sends a command and possibly information to the Enterprise server 314. The command represents a request to a module of the Enterprise server 314 to perform some function (which is called the requested function for reference purposes). In the case of the web client 304, the web server 310 translates the command to a message that conforms with the enterprise server API. In the case of the network client 306, the command already conforms to the enterprise server API.

In step 10108, the security module 402 and the server configuration module 404 (see FIG. 4) in the Enterprise Server 314 determine whether or not the client 304, 306, or the user who is using the client 304, 306, is authorized to issue the command. More particularly, the security module 402 determines whether or not the client 304, 306 or user has the appropriate security privileges with respect to the target information in the databases 316 (that is, the information in the databases 316 that will be accessed if the requested function is performed by the enterprise server 314). The server configuration module 404 determines whether or not the client 304, 306 or user has access to the requested function (i.e., has the client 304, 306 or user been configured to access the requested function?). If the client 304, 306 or user is authorized to issue the command, then step 10110 is performed. Otherwise, the enterprise server 10110 does not honor (does not perform) the command (an appropriate message or exception may be sent back to the client 304, 306).

In step 10110, the command dispatch module 406 in the enterprise server 314 routes the command and the information to the appropriate enterprise server module. These enterprise server modules are described above.

In step 10112, the enterprise server module performs the requested function.

In step 10114, the Enterprise server 314 sends the results of the command to the client 304, 306. In the case of the web client 304, the web server 310 translates the results received from the enterprise server 314 to the language supported by the web client 304 (preferably HTML), and then forwards these translated results to the web client 304 over the network 308. This network may be a local area network or a wide area network (it can even be a global network).

In step 10116, modules in the client 304, 306 operate to display the results to the user, and also operate to enable the user to manipulate, process, and otherwise utilize the results.

FIG. 7 illustrates client modules 701 of a web client 304 and a network client 306 according to an embodiment of the invention. The modules in a web client 304 or a network client 306 correspond to modules in the enterprise server 314. A given module in the enterprise server 314 performs specific tasks pursuant to commands received from the clients 304, 306. The performance of these tasks generates results. For example, the document storage and retrieval module 408 in the enterprise server 314 stores and retrieves information from the databases 316.

The corresponding module in the clients 304, 306 receives these results and presents them to the user, and enables the user to work with and manipulate the results. For example, the client document storage and retrieval module 708 presents to the user the information retrieved by the document storage and retrieval module 408 in the enterprise server 314.

The process just described is an iterative one, as represented by control arrow 10118.

Figure 81:
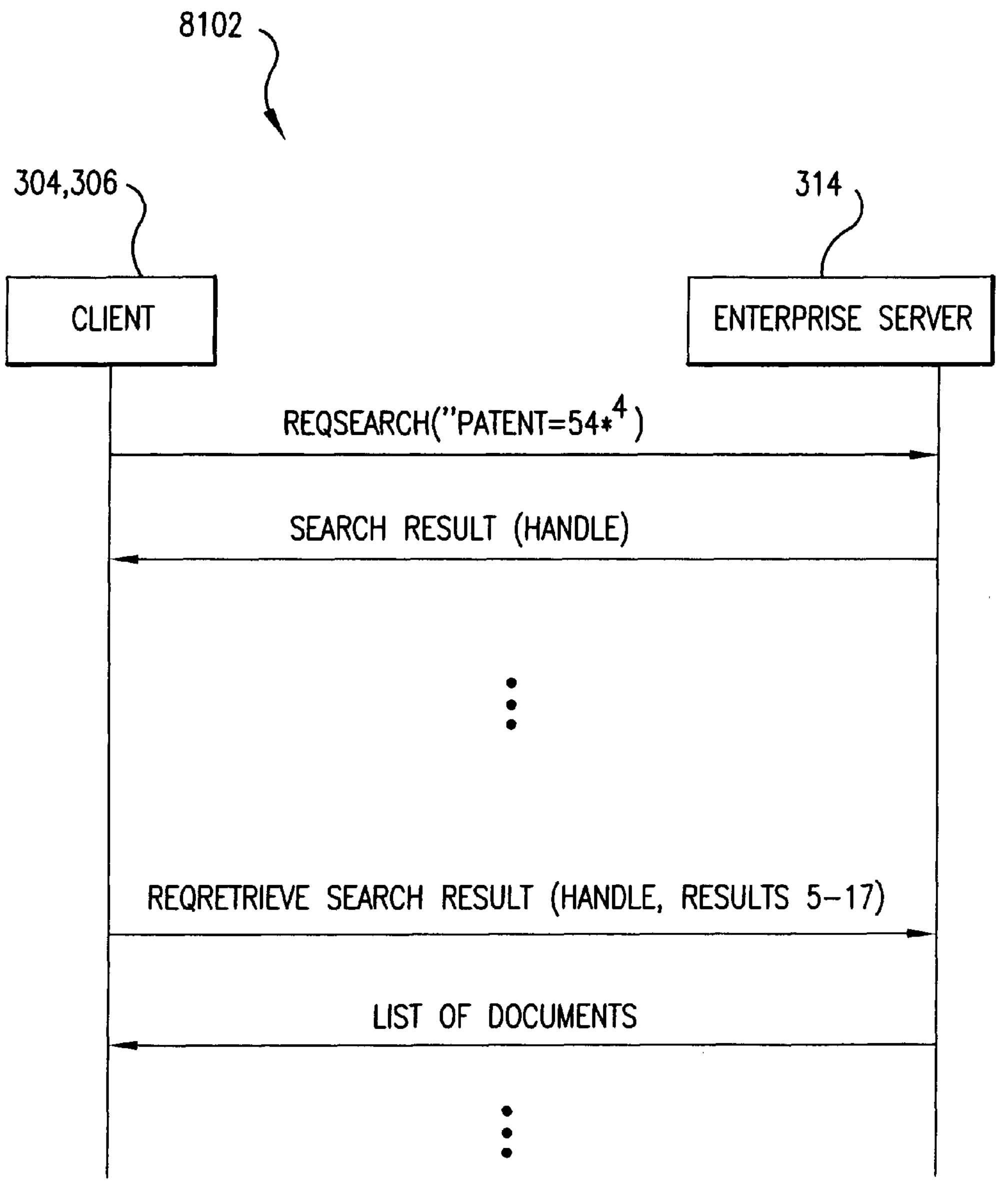
FIG. 81 illustrates the interaction between the enterprise server and a client.

The interaction between the web clients 304 and the enterprise server 314, and the network clients 306 and the enterprise server 314, is further described with reference to FIGS. 81-83. FIG. 81 generically depicts the interaction between the enterprise server 314 and the clients 304, 306. A client 304, 306 (either a web client 304 or a network client 306) sends, for example, a ReqSearch command to the enterprise server 314. The searching module 410 in the enterprise server 314 processes the ReqSearch command, and returns a handle (pointer) to the search results plus a list of documents from startIndex to endIndex. The client 304, 306 then issues a ReqRetrieveSearchResult in order to obtain the search results. The searching module 410 processes the ReqRetrieveSearchResult, and returns a list of documents.

Figure 82:
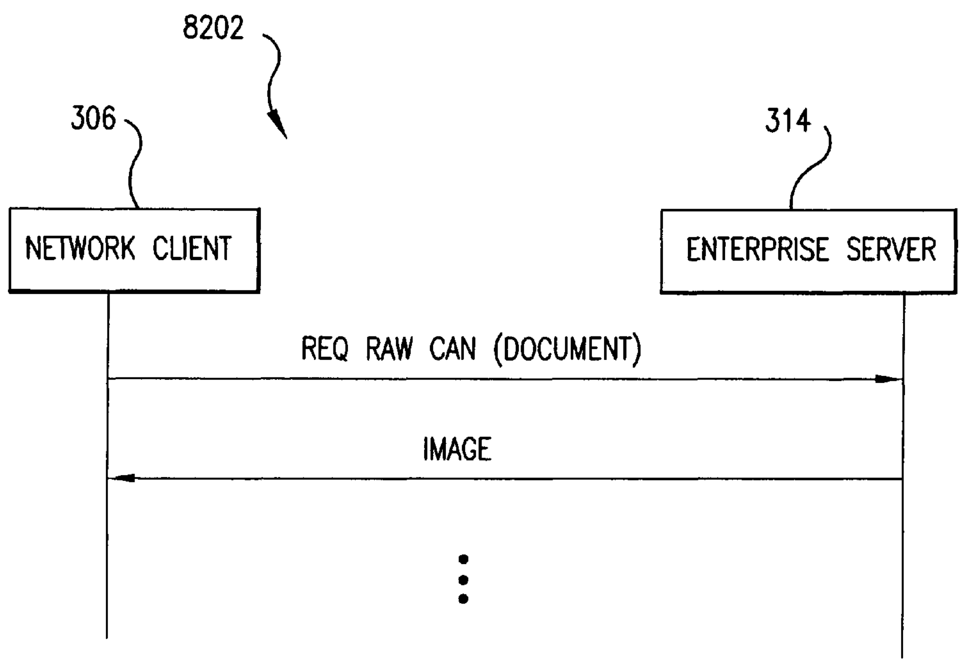
FIG. 82 illustrates the interaction between the enterprise server and a network client.
Figure 83:
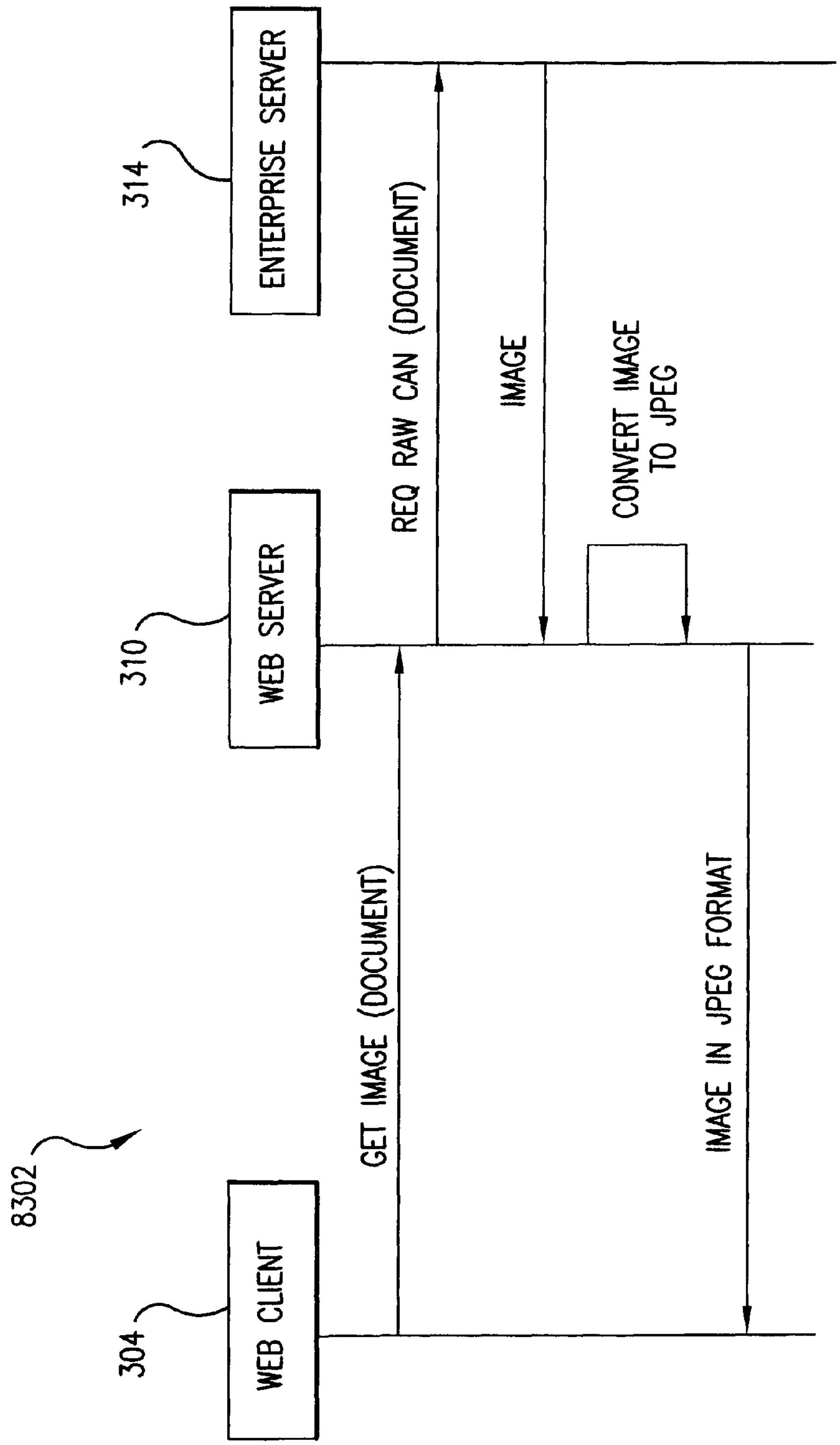
FIG. 83 illustrates the interaction between the enterprise server and a web client.

FIGS. 82 and 83 contrasts, in greater detail, the interaction between the enterprise server 314 and the network clients 306, and the enterprise server 314 and the web clients 304. FIG. 82 represents the interaction between the enterprise server 314 and a network client 306. The network client 306 sends a ReqRawCan command to the enterprise server 314. The document storage and retrieval module 408 processes this command, and returns image data representative of the document. Since the network client 306 supports the enterprise server API, translation of the command or the return result is not necessary.

FIG. 83 represents the interaction between the enterprise server 314 and a web clients 304. The web client 304 issues a command to retrieve a document image. This command may or may not conform to the enterprise server API. If it does not conform, the web server 310 translates the command to one that conforms to the enterprise server API. The enterprise server 314 returns an image. However, the image is not in a format that the web client 304 supports. Thus, the web server 310 converts the image to a format that the web client 304 supports. In the example of FIG. 83, the web server 310 converts the image to the well known JPEG format, then forwards the converted image to the web client 304. Other image formats could also be used, and depends on the formats used by the commercial web browser software being used in the web clients 304.

Patent-Centric URL Commands

The interaction between the enterprise server 314 and the web clients 304 shall now be more particularly described.

Figure 151:
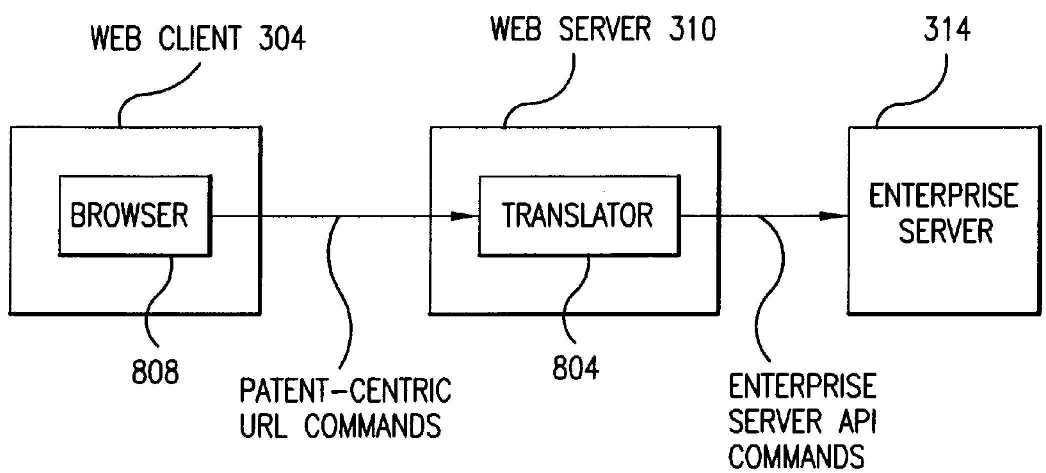
FIG. 151 illustrates the commands that are transferred between a browser in the web client and the Enterprise server.

FIG. 151 illustrates the interaction between the Enterprise server 314 and the web client 304. FIG. 151 is similar to FIG. 8. However, FIG. 151 focuses on the commands that are transferred between the web client 304 and the Enterprise server 314, whereas FIG. 8 focuses on the data which is transferred between the web client 304 and the Enterprise server 314.

As discussed above, the web client 304 preferably includes a browser 808, which can be any commercially available browser, such as (but not limited to) those available from Netscape, Microsoft, IBM, SUN, Novell, etc. In an embodiment of the invention, the browser 808 issues URL (Uniform Resource Locator) commands in order to access and retrieve data from the databases 316 via the enterprise server 314.

Figure 150:
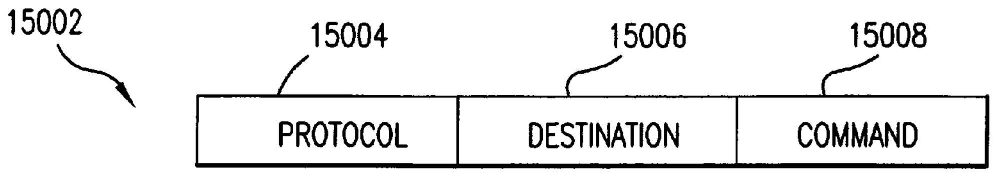
FIG. 150 illustrates a URL message format.

The general format of URL commands is well known, and is presented in FIG. 150 for the convenience of the reader. A URL command 15002 includes a protocol field 15004, a destination field 15006, and a command field 15008.

The protocol field 15004 specifies the protocol that is to be used in transporting the URL command 15002 from its source to its destination. Example protocols include HTTP and FTP (file transfer protocol).

The destination field 15006 specifies the destination of the URL command 15002. For example, the destination field 15006 may include information that identifies the server (such as the enterprise server 314) from whom information is being requested from.

The Command field 15008 stores information representing a command or an action or an identification of requested data. The effect of the URL command 15002 is to request that the entity identified by the destination field 15006 perform the command or action specified in the command field 15008.

According to the invention, the commands inserted into the command field 15008 are patent-centric or patent-specific. Accordingly, the URL commands generated by the present invention are patent-centric, or patent-specific.

Figure 140:
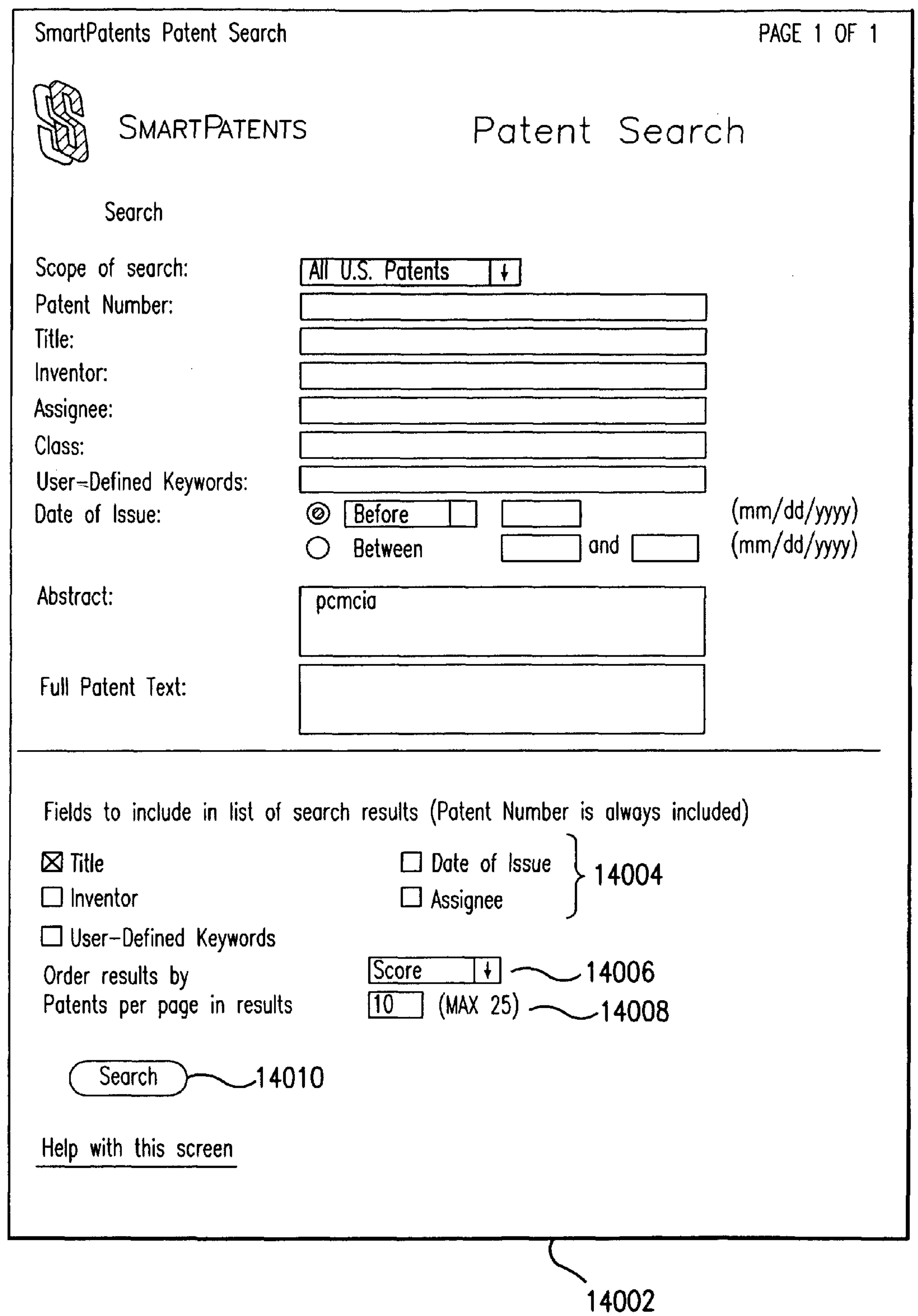
FIG. 140 illustrates an example Patent Search screen according to an embodiment of the invention.

In practice, HTML data representative of a web page is transferred to the browser 808 in the web client 304 upon connection with the Enterprise server 314. The browser 808 processes this received HTML data and, as a result, displays a web page. HTML processing is well known. Examples of web pages are shown in FIGS. 53 and 140. An operator at the web client 304 enters information into the fields of the web page.

For example, with reference to FIG. 53, an operator could enter an inventor name into the inventor field 5310 of web page 5302. The information entered by the operator represents a search string. After receiving an appropriate user command (which the user issues by pressing the Search button 5334, for example), the browser 808 in accordance with the software associated with the displayed web page 5302 generates one or more URL commands. These URL commands include the information entered by the operator into the fields of the displayed web page 5302. In other words, these URL commands include the search string entered by the operator. These URL commands are directed to the enterprise server 314, and request the enterprise server 314 to conduct one or more searches of the databases 316 in accordance with the operator-supplied search string.

Referring again to FIG. 151, a translator 804 in the Web server 310 receives the URL commands from the browser 808 in the web client 304. The translator 804 converts the URL commands to Enterprise server API commands. These Enterprise server API commands are received and processed by the Enterprise server 314. The Enterprise server API commands are discussed above.

According to an embodiment of the present invention, the URL commands sent from the browser 808 in the web client 304 to the translator 804 in the Web server 310 conform to a patent-centric URL command language. Accordingly, the URL commands sent from the browser 808 to the translator 804 represent patent-centric URL commands.

The patent-centric URL command language of the present invention essentially represents an API (Application Programming Interface) of the Web server 310. The patent-centric URL command language of the present invention includes the following patent-specific commands that are inserted in the command field 15008 of URL commands. It should be understood that the following is a representation of the types of commands that can be placed into the command field 15008 of URL commands according to the invention. The invention can support other patent-centric/specific commands. Thus, the following is provided for purposes of illustration, not limitation.

| | | |
|---|---|---|
| Command: | Search | |
| Description: | This command is used to instruct the enterprise server 314 to perform a search or to retrieve more results from a previous search. | |
| Parameters: | scope | Identifies the patents or documents that should be searched, such as all patent/documents in bibliographic databases 602, all patents/documents in the document databases, etc. numberSpecific patent (document) number to search for, if the operator specified such a search |
| | title | Specific patent/document title to search for, if the operator specified such a search |
| | inventor | Specific inventor name to search for, if the operator specified such a search |
| | assignee | Specific assignee name to search for, if the operator specified such a search |
| | class | USPTO class/subclass to search for, if the operator specified such a search |
| | udk | user defined keyword to search for, if the operator specified such a search |
| | datesearchtype | Equals 1 if date search criteria is BEFORE, AFTER, or ON; Equals 2 if date search criteria is BETWEEN (if the operator specified a date search) |
| | datequalifier | set equal to one of: AFTER, BEFORE, or ON (i.e., modifies the datasearchtype when datesearchtype is equal to 1) (if the operator specified a date search) |
| | date1 | date for BEFORE, AFTER, or ON (if the operator specified a date search) |
| | date2 | first date of BETWEEN (if the operator specified a date search) |
| | date3 | second date of BETWEEN (if the operator specified a date search) |
| | abstractquery | search string for abstract, if the operator specified such a search |
| | fulltextquery | search string for full text, if the operator specified such a search |
| | showtitle | flag to show title in search results |
| | showdate | flag to show date in search results |
| | showinventor | flag to show inventor in search results |
| | showassignee | flag to show assignee in search results |
| | showudk | flag to show udk (user defined keyword) in search results |
| | orderby | Specifies ordering preference; one of: RELEVANCE, PATENT NUMBER, etc. |
| | guid | contains the GUID (globally unique identifier) of a search results table (generated by a prior search) that is potentially still on the enterprise server 314 |
| | begin | beginning part of a hitlist range displayed to the user |
| | end | ending part of the hitlist range displayed to the user |
| | rel | a generic "catchall" field. Used to deal with characteristics of HTML. Possible values include: NEXT, PREVIOUS, FIRST, LAST, GET__RESULTS__IN__FILE, and SKIM__IMAGES. |
| | total | total number of hits |
| | numberpage | number of hits to be displayed per page |

Operation:

An operator defines a search using, for example, the patent search screen 14002 of FIG. 140. The web client 304 generates a patent-centric URL command that contains a search command in the command field 15008. The parameters of the search command reflect the search defined by the operator. For example, if the operator defined a search based on patent number and PTO class, then the number and class parameters of the search command would be filled in.

For a new search, the begin parameter is equal to 0, indicating that the enterprise server 314 should return the search results beginning from record 0 (of the search results). The numberpage parameter indicates to the enterprise server 314 the number of items to return search results on. For example, if the numberpage parameter equals 10, then the enterprise server 314 returns information on 10 search results items, starting with the first item (where begin is equal to 0).

In a new search, the total parameter is returned by the enterprise server 314, and represents the number of search hits. This value of the total parameter is then returned to the enterprise server 314 in any subsequent, related search commands (to obtain additional search results, for example). The browser 808 receives the search results provided by the enterprise server 314 and displays the search results in a screen such as that shown in FIG. 141. The operator presses the navigation icons 14108 to obtain additional search results. If the operator presses a Next icon 14109, for example, a new URL command with the search command in the command field 15008 is generated to obtain the next page of search results.

For this and any other subsequent, related search commands, the parameters (such as scope, search key terms, items to display, etc.) that define the search are the same as in the original search command. In this and subsequent related search commands, however, the GUID of the original search results is provided. The enterprise server 314 uses this GUID to access the original search results, if they are still available on the enterprise server 314 (they may have expired). If the original search results are not still available on the enterprise server 314, then the enterprise server 314 reexecutes the search.

In the case where the operator pressed the Next icon 14109, the rel field is set equal to NEXT. If the operator pressed the Previous icon 14111, the rel field is set equal to PREVIOUS. If the operator presses a Last icon 14119, the rel field is set equal to LAST. If the operator pressed a First icon 14191, the rel field is set equal to FIRST.

In the case where the operator pressed the Next icon 14109, the begin field is set to 0. The enterprise server 314, upon receipt of this command, identifies the next page of search results to send to the web client 304. The enterprise server 314 does this by adding the value of the numberpage to the value of begin. The result of this addition operation identifies the first record in the search results to send to the web client 304. Starting from this value, the enterprise server 314 sends numberpage items to the web client 304. Thus, where the begin field is equal to 0, and the numberpage is equal to 10, the enterprise server 314 sends records 10-19 of the search results to the web client 304.

Suppose that the operator again presses the Next icon 14109. In the resulting search command, the begin field is set to 10 (this is done by software associated with the link associated with the Next icon 14109 in the display 14102 in FIG. 141). The enterprise server 314, upon receipt of this command, sends numberpage items to the web client 304 starting from begin plus numberpage. Thus, where the begin field is equal to 10, and the numberpage is equal to 10, the enterprise server 314 sends records 20-29 of the search results to the web client 304.

If rel is equal to GET_RESULTS_IN_FILE, then the enterprise server 314 returns HTML data to the web client 304. The web client 304 prompts the operator for a file name, and then saves this data in the file identified by the file name.

If rel is equal to SKIM_IMAGES, then the enterprise server 314 returns information that identifies two frames (or windows or panes). The enterprise server 314 supplies, for one of the frames, information that identifies a file in the enterprise server 314. This file stores a list of the search results. The web client 304 issues a URL command to retrieve this file from the enterprise server 314. The web client 304 then displays the list of the search results into this first frame. For the second frame, the enterprise server 314 provides information that identifies the location of the image of the first item in the search results. The web client 304 issues a URL command to retrieve this image (or a portion of the image, like the portion of the image corresponding to the first page of the document) from the enterprise server 314. The web client 304 then displays this image in the second frame. This two frame display is shown, for example, in FIG. 148.

In the above description, the enterprise server 314 is described as interpreting the URL commands generated by the web client 304. In practice, according to a preferred embodiment of the invention, the translator 804 in the web server 310 translates the URL commands to commands in the enterprise server API language. The enterprise server 314 then processes these enterprise server API commands as discussed herein. Such translation is described below.

| | | | |
|---|---|---|---|
| Command: | GetText | | |
| Description: | This command instructs the enterprise server 314 to retrieve and return the text of a patent. Preferably, the web server 310 returns the entire text of the patent to the web client 304. However, the following additional parameters are used for text/image synchronization purposes (i.e., when the operator switches between displaying text and displaying images). | | |
| Parameters: | section | Image files can contain multiple sections. The first section is the image of a patent. Subsequent sections contain post-issuance documents, such as a certificate of correction. This parameter describes the specific section desired from the image file and is used to help synchronize text and image display. Specifically, suppose that the operator is viewing an image. Then the operator elects to view text, such that a GetText command is generated. In the section and page parameters of this GetText command, the section and page of the image being viewed (when the GetText command is generated) is stored. Thus, if the operator then elects to switch back to viewing the image, the invention can identify which image to display by reference to the values stored in these section and page parameters. | |
| | page | Sections are decomposed into pages. This parameter keeps track of the page. | |
| | currentview | One of SPLIT__SCREEN or FULL__SCREEN. This parameter identifies the current display mode, and is used by the invention to identify icons that should be active and inactive. For example, if currentview is equal to SPLIT__SCREEN, then any split screen icons are greyed out, to indicate that they are inactive. | |
| | number | Identifies the document to retrieve (such as a patent number) | |
| Command: | GetImage | | |
| Description: | This command instructs the enterprise server 314 to retrieve and return the image of a patent. Parameters are the same as described for GetText: section, page, and currentview. Section and page identify which image to retrieve. | | |

-continued

| | |
|---|---|
| Command: | GetSplitScreen |
| Description: | This command returns two views of a patent, one of the text and one of the image. Number identifies the document whose text is retrieved and displayed. Section and page identify the image which is retrieved and displayed. In an embodiment, the enterprise server 314 returns information on two side-by-side frames (or panes or windows). For one of the windows, the enterprise server 314 provides a GetText command (or equivalent enterprise server API command, which is then translated to the GetText command), to return the text corresponding to the document identified by number. In the other window, the enterprise server 314 provides a GetImage command (or equivalent enterprise server API command, which is then translated to the GetImage command), to return the image corresponding to section and page. The web client 304 then executes these GetText and GetImage command to retrieve this information from the enterprise server 314. |
| Parameters | numberThe number of the patent<br>section same as GetText<br>page same as GetText<br>currentview same as GetText |
| Command: | GetAbstract |
| Description: | This command instructs the enterprise server 314 to return the abstract and predefined bibliographic fields of the patent (or other document) specified by the number parameter. |
| Parameters: | numberPatent (document) number |
| Command: | GetTextOrAbstract |
| Description: | This command instructs the enterprise server 314 to return the text of a patent as specified by the number parameter, if available (if in the document databases 612); otherwise, it returns the abstract of the patent and some other predefined bibliographic fields. |
| Parameters: | numberPatent (document) number |
| Command: | OrderPatents |
| Description: | This command, when executed, generates a message representing an order form to order electronic copies of the patents specified in the parameter list. This message is then sent to a third party provider, or sent to a party within the customer corporate entity who will take the message and then order electronic copies of the patents. |
| Parameters: | item0 first patent in the list<br>item1 second patent in the list<br>item2 third patent in the list<br>. . .<br>itemN Last item in the list. |
| Command: | GetCitationTree |
| Description: | This command instructs the enterprise server 314 to perform a patent citation function for a patent identified by the number parameter. Either a backward or forward function is performed, as indicated by the direction parameter. The number of levels for the citation function is specified by the levels parameter. GetCitationTree maps to ReqAnalysisCitation, described above. For a detailed description of the operation of the enterprise server 314 when processing the ReqAnalysisCitation command, see step 15806 (FIG. 158), discussed below. |
| Parameters: | numberIdentifies a patent<br>direction Identifies either a backward or forward citation function<br>levels Identifies the number of levels for the citation function. |

Translation

As described above, the translator 804 in the web server 310 translates between patent-centric URL commands and enterprise server API commands (see FIG. 151). Such translation according to an embodiment of the invention is shown in the following table. Other translations between patent-centric URL commands and enterprise server API commands are possible.

TABLE 4

| Patent-centric URL command language | Enterprise Server API language |
|---|---|
| search | ReqSearchRelevant or ReqSearch |

TABLE 4-continued

| Patent-centric URL command language | Enterprise Server API language |
|---|---|
| GetText | ReqTxt |
| GetImage | ReqCanPage |
| GetSplitScreen | Returns data that includes representations of a GetText command and a GetImage command (as described above). GetText corresponds to ReqTxt, and GetImage corresponds to ReqCanPage. |
| GetAbstract | ReqSearchBib |
| GetTextOrAbstract | In the web client or the translator, this command is translated to GetText (corresponding to ReqTxt). |

TABLE 4-continued

Figure 152:
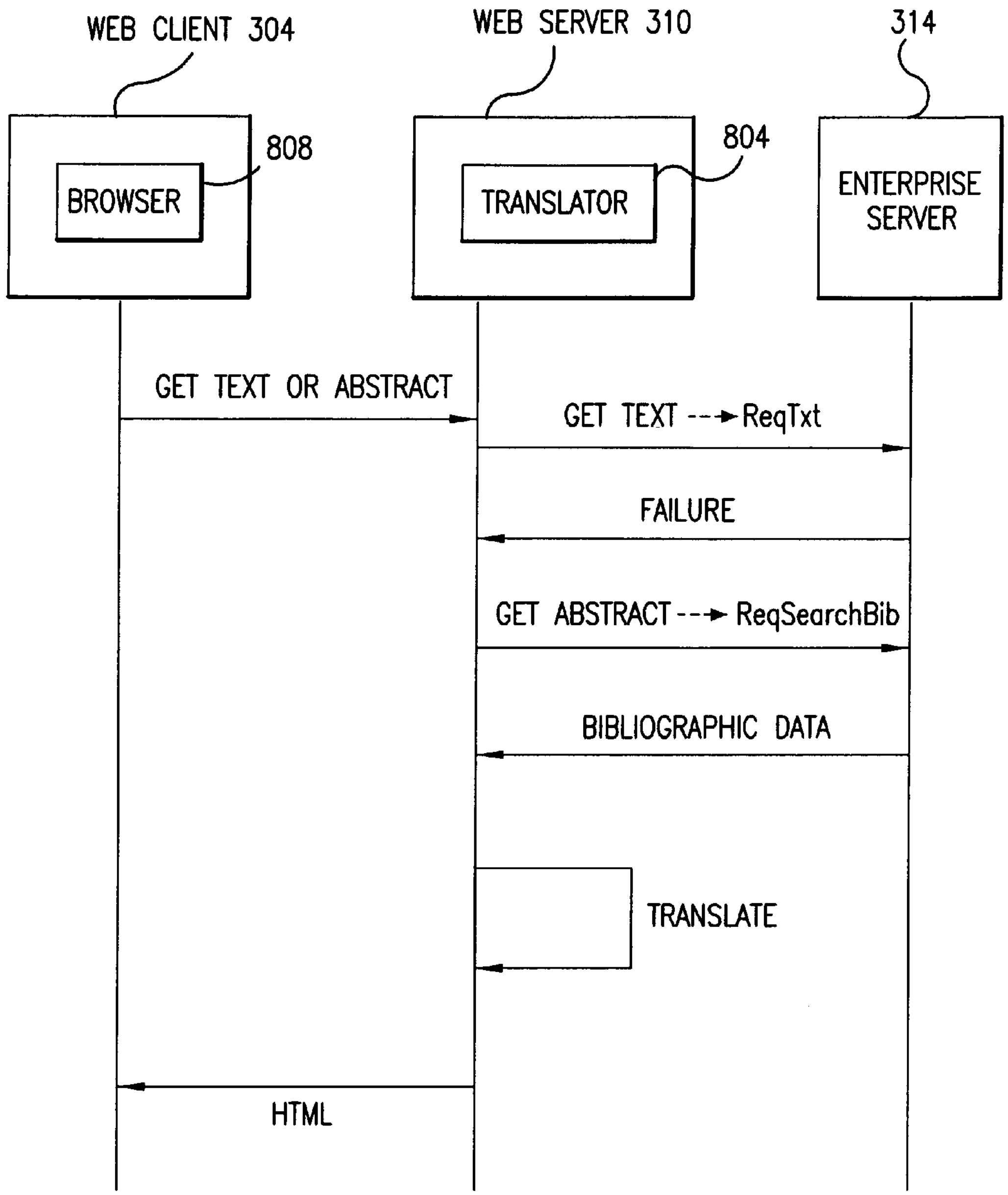
FIG. 152 illustrates the interaction between the browser in a web client and the Enterprise server.

| Patent-centric URL command language | Enterprise Server API language |
|---|---|
| | If GetText is not successful, then GetAbstract is issued (corresponding to ReqSearchBib). See FIG. 152. |
| OrderPatents | None |
| GetCitationTree | ReqAnalysisCitation |

Client Architecture

Figure 114:
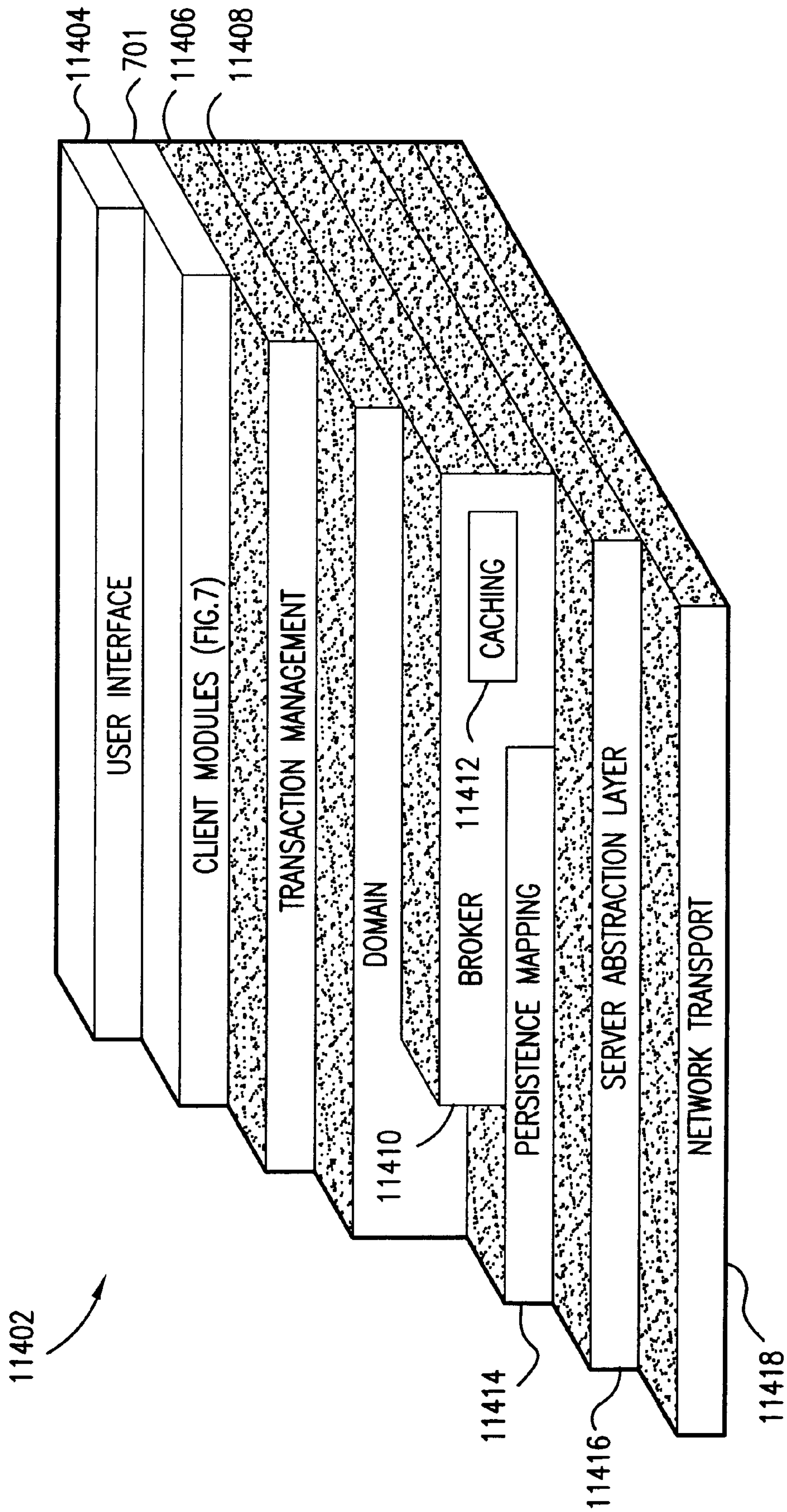
FIG. 114 is a architecture block diagram of the network client (and in some embodiments the web client)

FIG. 114 illustrates a logical representation of the architecture of the network client 306 according to an embodiment of the invention. This architecture also applies to the web client 304 in some embodiments. In other embodiments, the web client 304 is represented by well known browser software executing in a computer, such as that shown in FIG. 10.

The User Interface layer 11404 may be based on various well known user interfaces. The user interface layer in the web client 304 preferably processes HTML data. The user interface layer 11404 in the network client 306 preferably uses MFC, or the Microsoft Foundation Class Library. In some embodiments, the user interface layer 11404 is built using multi-platform enabled languages, such as Java.

The client modules 701 are shown in FIG. 7, and are described elsewhere herein.

The transaction management layer 11406 implements the specific business-related operations of the invention. These operations include creating a group or changing the security permissions of the group (this could alternatively be done by the domain layer 11408). The transaction management layer 11406 interacts with the client modules 701 to perform these functions.

The domain layer 11408 includes all of the objects that are required to properly implement a patent-centric decision support system. These objects in the domain layer 11408 represent the business and other high level intelligence of the client 304, 306, and enables the client 304, 306 to work with business rules, notes, analysis modules, etc.

Supporting the domain layer 11408 is a broker layer 11410 that provides for sophisticated brokering and caching of objects in the client 304, 306. The broker layer 11410 is responsible for managing the communication between the domain layer 11408 and the server layer 11416. This decouples the domain layer 11408 from the enterprise server 314 and provides for maximum flexibility in the implementation of different enterprise servers 314.

The caching subsystem 11412 of the broker layer 11410 provides a means for objects to be cached on the client 304, 306 after they have been retrieved from the enterprise server 314. The caching subsystem 11412 enables the client 304, 306 to manage an infinite number of objects obtained from the enterprise server 314 by only storing those objects that have been most recently used. In an embodiment of the invention, the client 304, 306 utilizes a demand paging algorithm. In an embodiment of the invention, caching only takes place on the network client 306.

Figure 149:
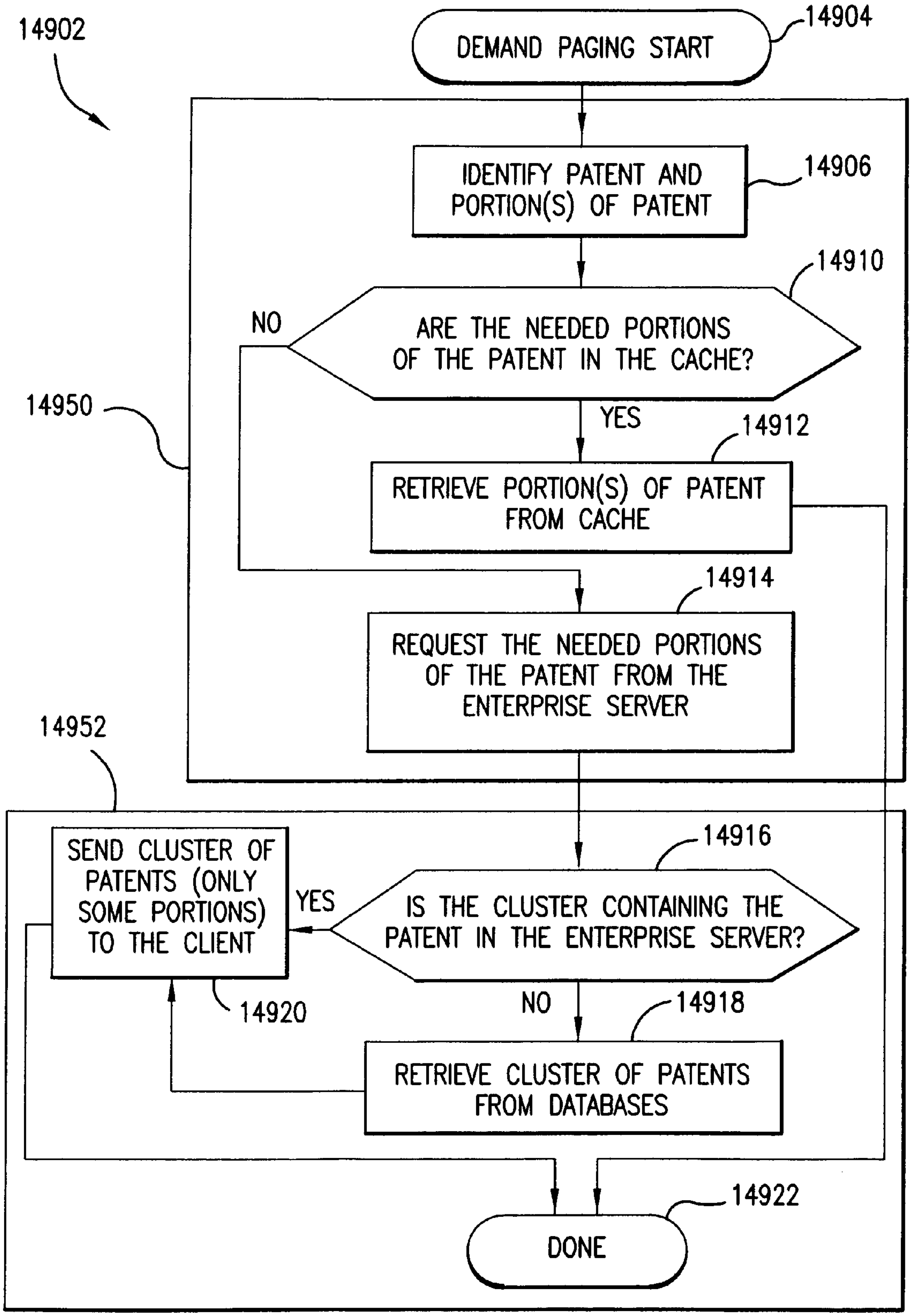
FIG. 149 is a flowchart depicting a demand paging algorithm according to an embodiment of the invention.

A demand paging algorithm according to an embodiment of the invention is represented by a flowchart 14902 shown in FIG. 149. Preferably, the present invention utilizes a two-level demand paging methodology. The first level of the demand paging methodology is performed by the Caching subsystem 11412 in the client 306, 304, and is represented by steps 14950 in flowchart 14902. The second level of the demand paging methodology is performed by the Enterprise server 314, and is represented by steps 14952 in the flowchart 14902.

In step 14906, the Cache subsystem 11412 receives a request for data from a requester (the requester is typically an upper layer in the architecture). This data request is described herein as being a request for patent data. However, the discussion described herein applies to both patent and non-patent data.

Figure 118:
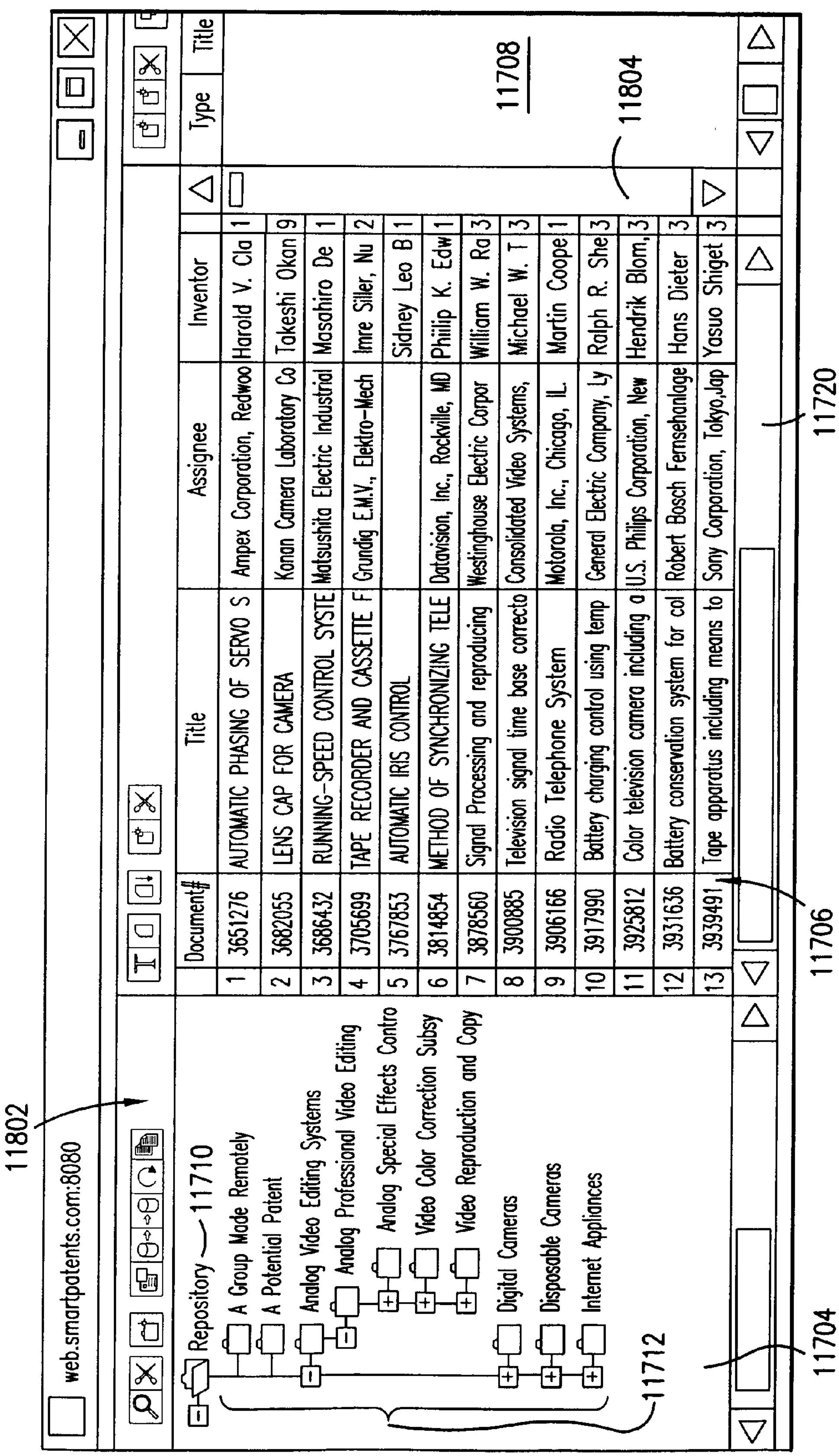

At this point, it would be useful to describe an example of how a data request is generated. Consider an example console user interface 11802 shown in FIG. 118 (FIG. 118 is further described below). A group hierarchy 11712 is shown in a first pane 11704 of the console user interface 11802. Patents contained within a selected group of the group hierarchy 11712 are listed (with their bibliographical information) in a second pane 11706. In the example shown in FIG. 118, a repository group 11710 is selected. Accordingly, the patents in the repository group 11710 are listed (along with their bibliographical information) in the second pane 11706 of the console user interface 11802.

In a preferred embodiment of the invention, at any given time, all of the information pertaining to the patents in the repository 11710 is not stored in the client 304, 306. Instead, only a portion of the information pertaining to the patents in the repository 11710 are stored in the client 304,306. Preferably, the client 304, 306 retrieves data from the databases 316 as it needs it.

For example, 13 patents are currently listed in the second pane 11706. The client 304, 306 need only store information on these 13 listed patents. In practice, however, at any given time the client 304, 306 may store information on more than the patents being displayed in the second pane 11706. More generally, at any given time, the client 304, 306 may store information on more than the patents being processed, analyzed, displayed, etc., at the client 304, 306. However, the client 304, 306 does not store all of the data from the repository 11710 (unless, for some reason, the client 304, 306 is processing all of that data). Also, during a session with the enterprise server 314, the client 304, 306 does not discard information that it has received from the enterprise server 314, even when the information is no longer being used at the client 304, 306. In other embodiments, the client 304, 306 discards unused data received from the enterprise server 314 in order to make room for additional data.

The client 304,306 retrieves information from the enterprise server 314 by sending a data retrieval request to the Caching subsystem 11412. The Caching subsystem 11412 receives this request in step 14906.

Further in step 14906, the Caching subsystem 11412 identifies from the data retrieval request the patent and the portions of the patent that are being requested. Preferably, in the present invention, a patent has multiple parts or portions. These parts include the patent bibliographic information, the patent (equivalent) text file, and the patent image file. A given data retrieval request may be requesting any or all of these portions of the patent. In step 14906, the Caching subsystem 11412 identifies from the data request which patent is being requested, and also which portions of the patent are being requested. For reference purposes, the patent that is being requested is called the identified patent, and the portions of the identified patent that are being requested are called the identified portions.

In step 14910, the Caching subsystem 11412 determines whether the identified portions of the identified patent are already stored in the local cache. For purposes of the present invention, the local cache is represented by the main memory 1108 in the client 304, 306. In alternate embodiments of the invention, the local cache is represented by cache memory in the client 304,306.

If the identified portions of the identified patent are currently in the local cache, then in step 14912 the Caching subsystem 11412 retrieves those identified portions of the identified patent from the local cache and returns them to the requester. Operation of flowchart 14902 is then complete, as indicated by step 14922.

If, in step 14910, the Caching subsystem 11412 determines that the identified portions of the identified patent are not in the local cache, then step 14914 is performed. In step 14914, the caching subsystem 11412 sends a message to the Enterprise server 314 to request retrieval of the identified portions of the identified patent from the databases 316.

As should be clear by the above description of steps 14906, 14910, 14912, and 14914, the caching subsystem 11412 in the client 304,306 operates according to a caching methodology in which some data is stored in the local cache. When retrieving data, the Caching subsystem 11412 first looks in the local cache to determine whether the requested data is located in the local cache. If the data is not found in the local cache, then the Caching subsystem 11412 requests the data from the Enterprise server 314.

This caching methodology performed by the Caching subsystem 11412 in the client 304,306 represents a first level caching methodology according to the present invention. As mentioned above, the Enterprise server 314 performs a second level caching methodology. This second level caching methodology shall now be described.

In step 14916, the Enterprise server 314 receives the message from the client 304,306. The Enterprise server 314 determines whether the identified portions of the identified patent (as indicated in the received message) are currently stored in the local cache of the Enterprise server 314. The local cache of the Enterprise server 314 is represented by the Main memory 1108 of the Enterprise server 314. In an alternative embodiment, the local cache of the Enterprise server 314 is represented by Cache memory in the Enterprise server 314.

If the identified portions of the identified patent are located in the local cache of the Enterprise server 314, then in step 14920 the Enterprise server 314 retrieves the identified portions of the identified patent from its local cache, and sends this retrieved data to the client 304,306.

If, in step 14916, the Enterprise server 314 determines that the identified portions of the identified patent were not located in its local cache, then in step 14918 the Enterprise server 314 retrieves the identified portions of the identified patent from the databases 316. The Enterprise server 314 then in step 14920 returns this retrieved data to the client 304,306. The operation of flowchart 14902 is complete after the performance of step 14920, as indicated by step 14922.

As described above, in an embodiment of the invention, the Enterprise server 314 retrieves and returns only the identified portions of the identified patent. In some cases, the Enterprise server 314 instead returns data representative of a plurality of patents, where such data includes the identified portions of the identified patent. This is called the bulk or cluster retrieval mode of the invention.

Consider again FIG. 118. As described above, as the operator scrolls through the patents listed in the second panel 11706 of the console 11802, the caching subsystem 11412 sends requests to the Enterprise server 314 to retrieve additional patent data for display in the second panel 11706. When responding to such requests involving the console 11802, the Enterprise server 314 preferably returns patent data representative of a plurality of patents. Specifically, the Enterprise server 314 returns data representative of a patent cluster.

A patent cluster represents a given number of patents. In an embodiment of the invention, the number of patents in a patent cluster is equal to 50, but this value is tuneable, and this value may be different for different contexts of the invention. When operating according to the cluster or bulk mode, the Enterprise server 314 in step 14916 determines whether the identified portions of the identified patent are in a cluster that is stored in the local cache of the Enterprise server 314. If the identified portions of the identified patent are in a cluster stored in the Enterprise server 314, then in step 14920 the Enterprise server 314 sends data representative of this cluster of patents to the client 304, 306. If, instead, the Enterprise server 314 determines in step 14916 that the identified portions of the identified patent are not in a cluster currently stored in the Enterprise server 314, then the Enterprise server in step 14918 retrieves data representative of the cluster from the databases 316. The Enterprise server 314 then, in step 14920, sends this retrieved information to the client 304, 306.

Supporting both the domain layer 11408 and the broker layer 11410 is the persistence mapping layer 11414. The persistence layer 11414 is responsible for managing all interactions between the domain layer 11408 and a specific persistent storage device (not shown in FIG. 114). This decouples the domain objects from a particular physical representation, and enables various performance optimizations to be made.

Supporting all aspects of the client 304, 306 is the abstract server interface 11416. This layer 11416 presents a logical server to the other layers of the client 304, 306. It is important to note that all interactions between the client 304, 306 and the enterprise server 314 take place using a high-level, patent-centric set of business decision system command objects. These command objects represent atomic transactions between the client 304, 306 and the enterprise server 314. These commands (or command objects) allow the client 304, 306 to communicate with the enterprise server 314 in a manner that decouples the client 304, 306 from any specific physical implementation of the enterprise server 314. For example, the enterprise server 314 could be running MS-DOS and storing objects in a flat file, or be running Unix and storing objects in Informix. As long as the enterprise server 314 responds to the set of command requests presented by the client 304, 306 through the abstract server interface 11416, the client 304, 306 will work correctly. These commands represent the Enterprise server API commands.

The abstract server interface 11416 communicates to make a physical connection to the enterprise server 314. This is done through the network transport layer 11418, which is responsible for taking command objects and transmitting these command objects over a suitable communications network. The network transport layer 11418 also manages appropriate context information that is needed to manage a network connection. The network transport layer 11418: (a) does not require the physical presence of a network—it is possible to run the client 304, 306 and enterprise server 314 on the same physical machine and still have the system used properly; and (b) does not require the use of any specific network, even though one implementation of the system will be based on HTTP (HyperText Transport Protocol).

Additionally, general features of the architecture of FIG. 114 are described in Luke Hohmann, *Journey of the Software Professional A Sociology of Software Development*, Prentice Hall PTR, New Jersey, 1997, which is incorporated herein by reference in its entirety.

Databases

Referring to FIG. 6, some of the databases 316 are described in detail below. In particular, the document bibliographic databases 602, the group databases 621, the person databases 632, the employee databases 634, the security databases 636, the financial databases 638, and the methodology support databases 642 are described in detail below. Both the database structure and the methodology for extract and load of these databases are described below. The document databases 612, in particular the patent database 614, and the notes databases 640 are not described below since they are thoroughly covered in U.S. Pat. No. 5,623,681, U.S. Pat. No. 5,623,679, pending application Ser. No. 08/341,129, and pending application Ser. No. 08/590,082, all of which are incorporated by reference herein.

Figure 12A:
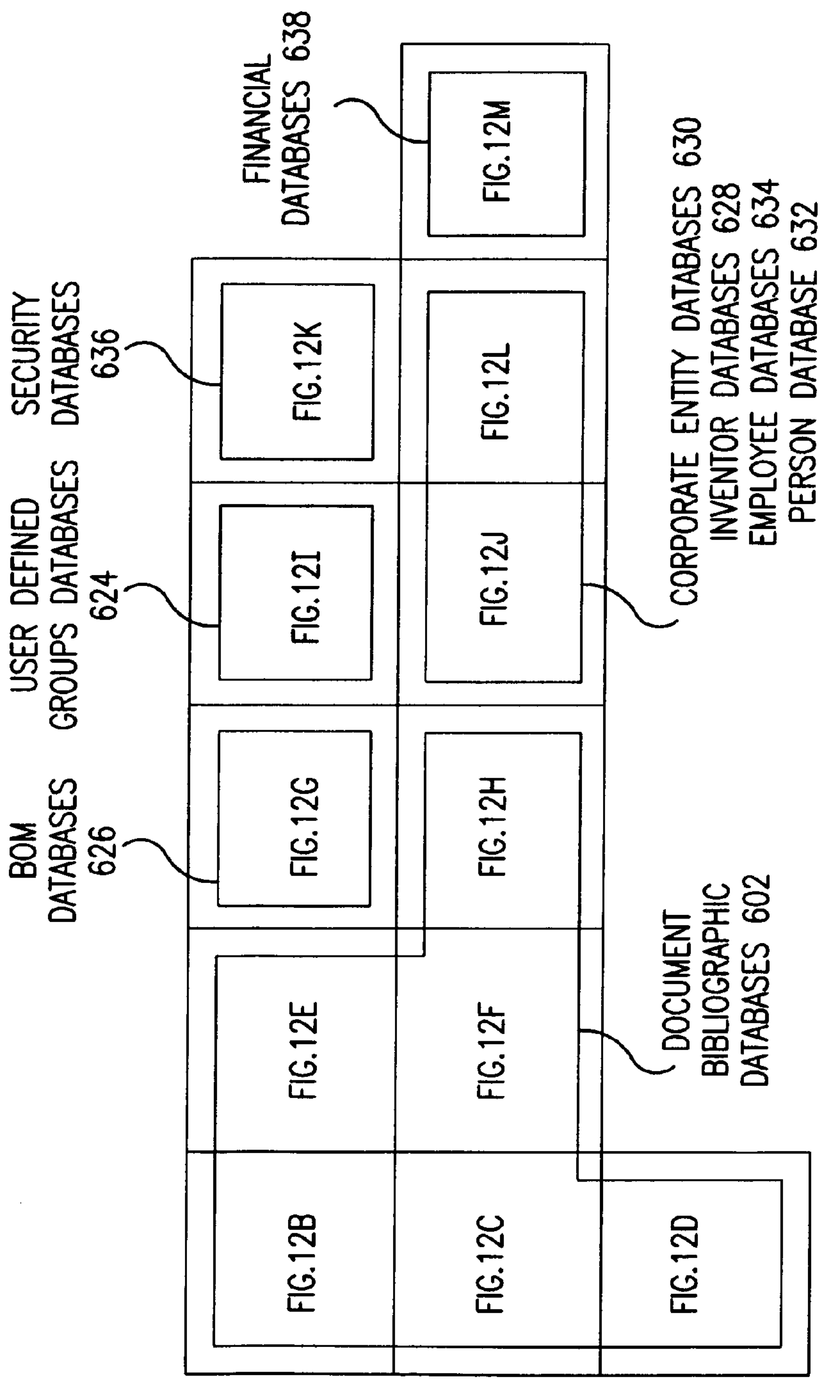
FIG. 12A illustrates the orientation of FIGS. 12B-12M relative to one another.
Figure 12B:
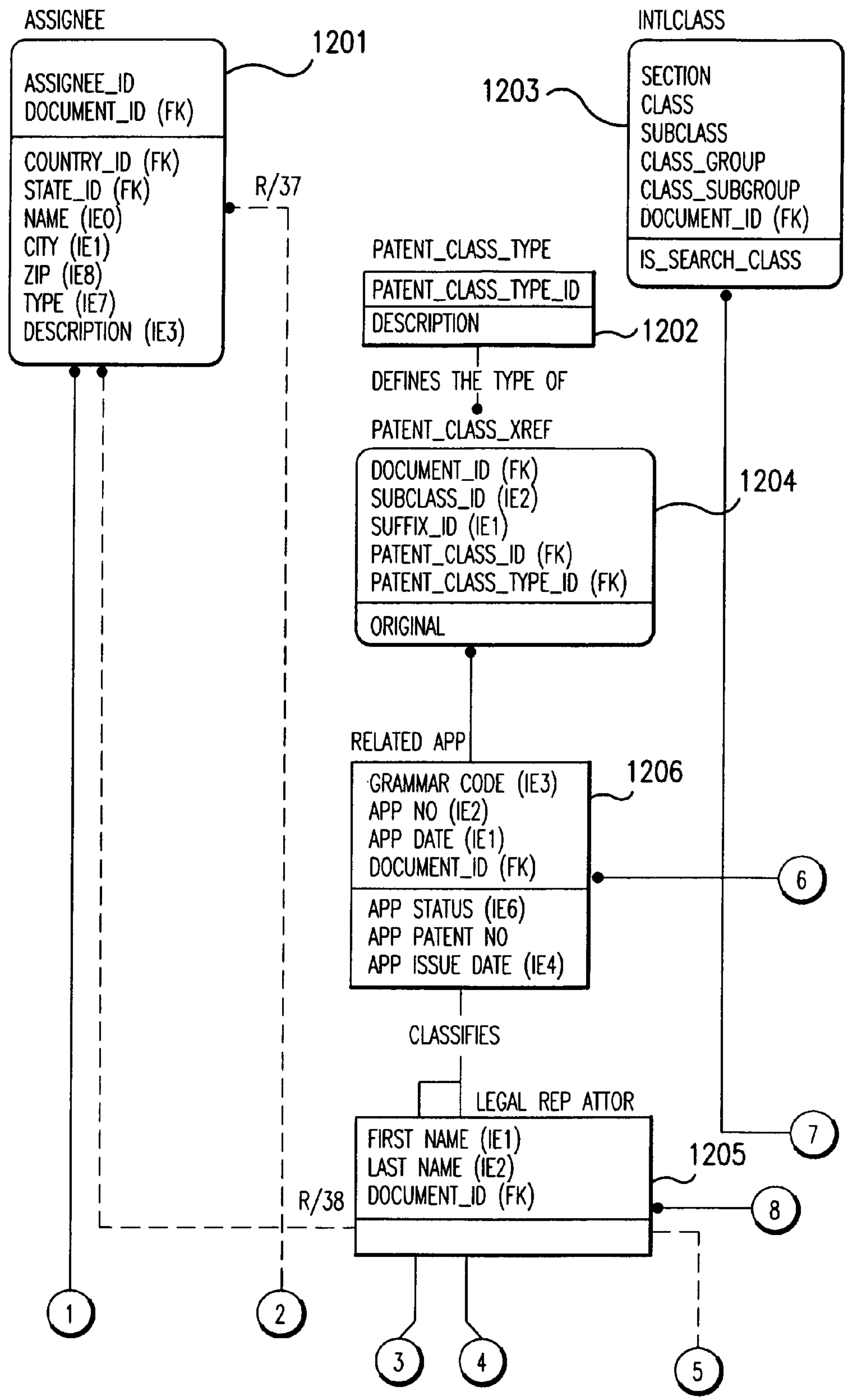
FIGS. 12B-12M illustrates the tables and attributes in the databases of FIG. 6 according to an embodiment of the invention.

The database structures of the document bibliographic databases 602, the group databases 621, the person databases 632, the employee databases 634, the security databases 636, the financial databases 638, and the methodology support databases 642 are shown in FIGS. 12B-12M. These figures also depict the interaction and connection between these databases. FIG. 12A illustrates the preferred orientation of FIGS. 12B-12M with respect to one another.

It should be understood that the tables and attributes shown in FIGS. 12B-12M only represent one embodiment of the present invention. The data in the databases 316 could be stored using other combinations of tables and attributes. Such other combinations of tables and attributes will be apparent to persons skilled in the relevant arts based on the discussion contained herein. Accordingly, the tables and attributes are shown in FIGS. 12B-12M only for purposes of illustration, and not limitation.

Figure 45:
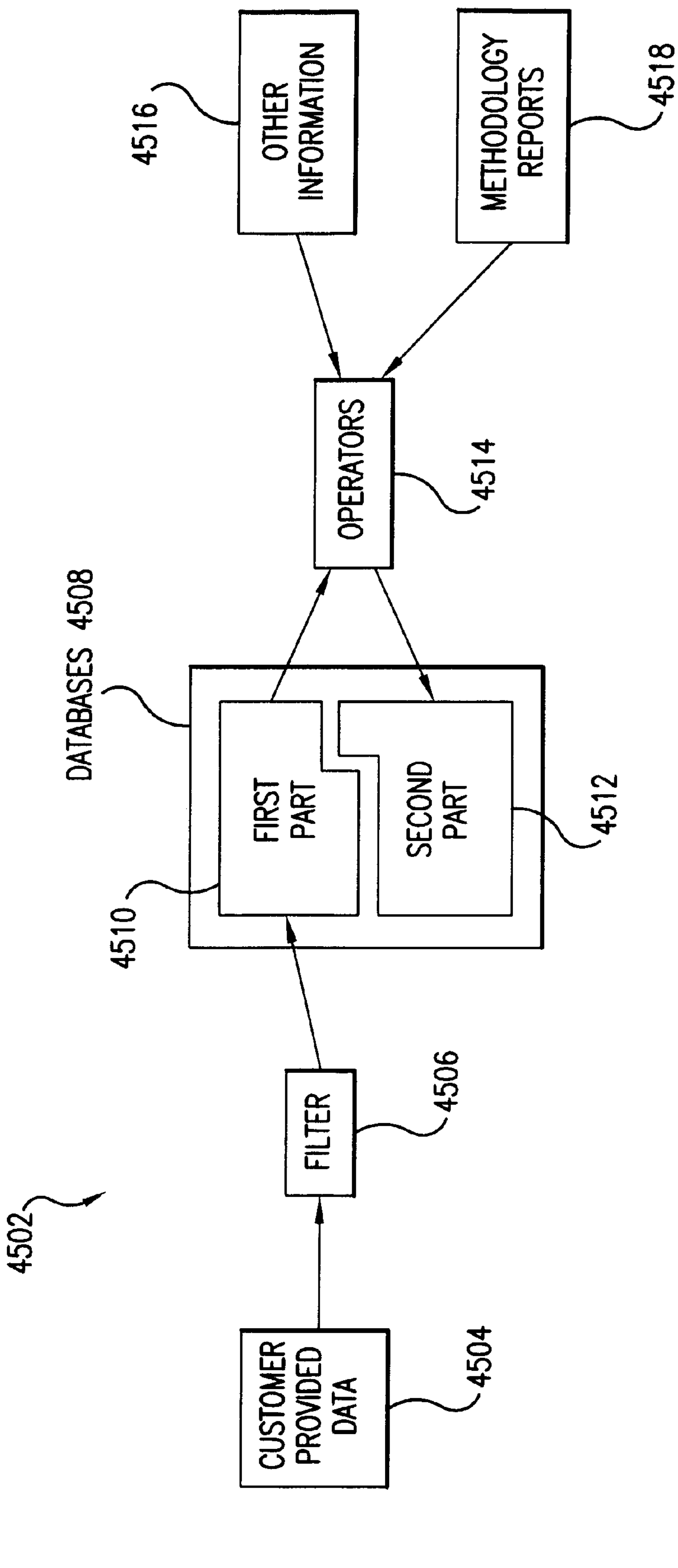
FIG. 45 is a dataflow diagram illustrating a generic extract and load operation.
Figure 95:
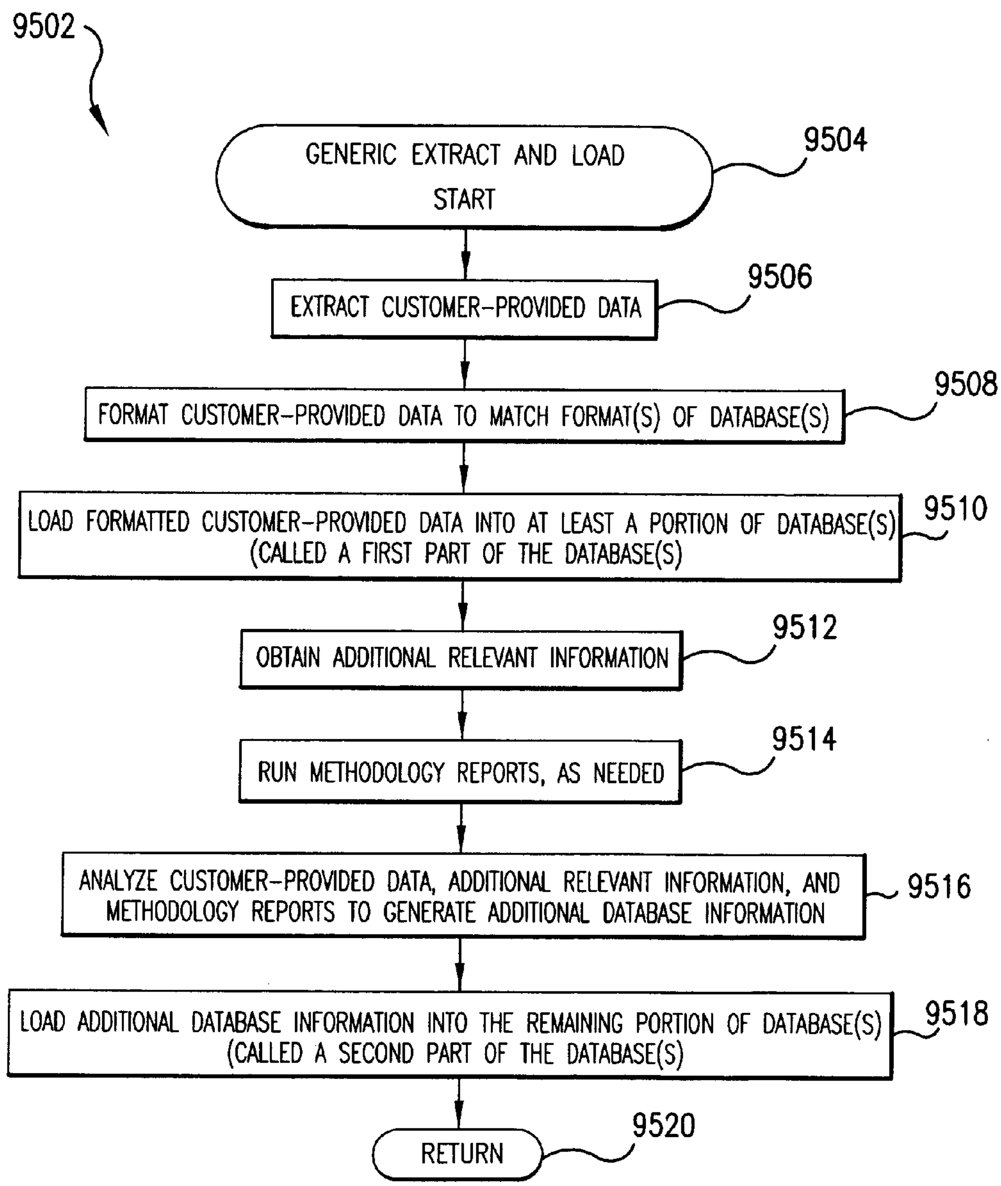
FIG. 95 is a flowchart representative of a generic extract and load process according to an embodiment of the invention.

FIG. 45 is a generic dataflow diagram illustrating the general manner in which the databases 316 are loaded with data in accordance with an embodiment of the invention. FIG. 95 is a flowchart 9502 representing the operation of this general extract and load procedure. In practice, the initial extract and load of the databases 316, and/or the updating of the databases 316, may be performed by employees of the customer and/or consultants retained by the customer.

In step 9506, the customer provides data 4504 for upload into the databases 4508 being processed. The customer provided data 4504 is pertinent to the databases 4508. For example, if the databases 4508 are intended to store financial information, then the customer provided data 4504 would comprise financial information of interest to the customer, including possibly both the customer's financial information and financial information of competitors.

In step 9508, a filter 4506 modifies the format of the customer provided data 4504 to conform to the database format of the databases 4508. The structure and operation of database filters, such as filter 4506, are well known.

In step 9510, the formatted customer provided data is loaded into the databases 4508. More particularly, the formatted customer provided data 4504 is loaded into a portion of the databases 4508, called a first part 4510 of the databases 4508. Remaining portions of the databases 4508, called the second part 4512 of the databases 4508, cannot be loaded using only the formatted customer provided data 4504. Instead, loading of the second part 4512 may require other information 4516 pertinent to the databases 4508. Additionally, loading of the second part 4512 may require analysis of such additional information 4516 in conjunction with the information in the first part 4510 of the databases 4508. Such analysis is performed by operators 4514 with, potentially, the assistance of the system of the invention.

Accordingly, in step 9512, other information 4516 pertinent to the databases 4508 is obtained.

In step 9514, methodology reports 4518 are run, as needed. Such methodology reports 4518 represent the result of automatic processing and analysis of the databases 4508 with other tables in the databases 316. Such automatic processing and methodology reports are performed and generated by the enterprise server 314, and is described in detail below.

In step 9516, operators 4514 analyze the customer provided data 4504 in the first part 4510 of the databases 4508. The operators 4514 may also analyze the other information 4516. In performing this analysis, the operators 4514 may refer to the methodology reports 4518 run in step 9514. Since these methodology reports 4518 were prepared by the enterprise server 314, the system of the invention assists the operators 4514 in performing this analysis. Based on the analysis of the operators 4514, additional database information for the databases 4508 is generated.

In step 9518, this additional database information is loaded into the second part 4512 of the databases 4508. The databases 4508, at that point, are fully loaded. Periodically, the steps of flowchart 9502 must be repeated in order to update the databases 4508 with additional and/or modified customer provided data 4504 and/or additional and/or modified other information 4516.

In an alternate embodiment of the invention, data is not preloaded into the invention's databases. Instead, the invention accesses the customer's corporate databases for data on an as needed basis. This alternate embodiment is described below with respect to the BOM databases 626, but are applicable to the other tables in the databases 316 as well.

Document Bibliographic Databases

FIGS. 12B-12F and 12H illustrate the structure of the document bibliographic databases 602. As indicated in FIG. 6, the document bibliographic databases 602 include bibliographic databases for documents of interest to the customer. The patent bibliographic databases 604 include information about (i.e., bibliographic information) U.S. and/or foreign patents. Preferably, the patent bibliographic databases 604 have bibliographic information on all U.S. Patents and a subset of all foreign patents. As an alternative embodiment, the patent bibliographic databases 604 include (in addition to information on foreign patents) patent bibliographic information on only a subset of all U.S. patents, such as all U.S. patents available in electronic form from the U.S. Patent and Trademark Office, or all U.S. patents that issued after a certain date, or all U.S. patents of interest to the customer.

Figure 12C:
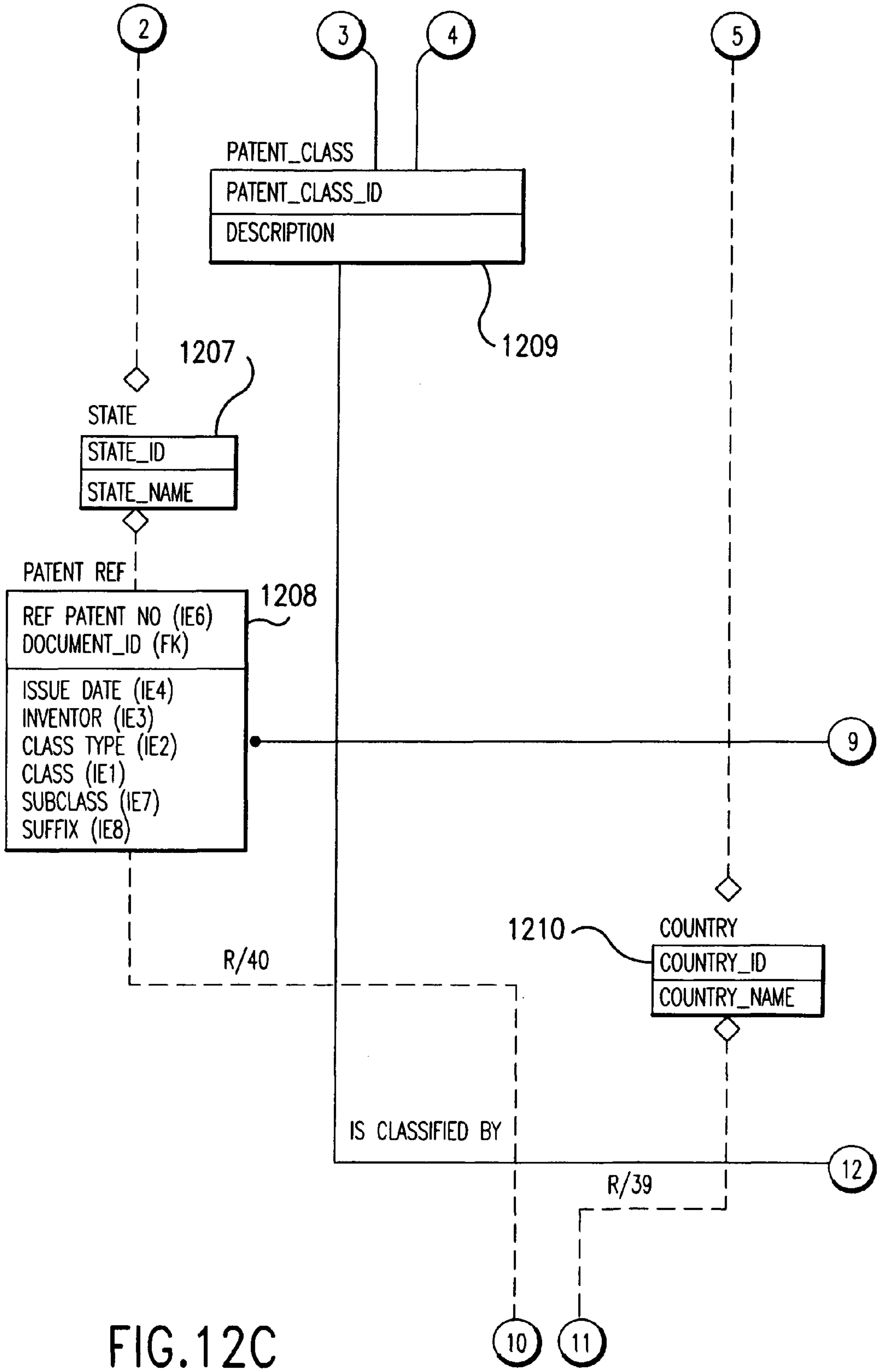
Figure 12D:
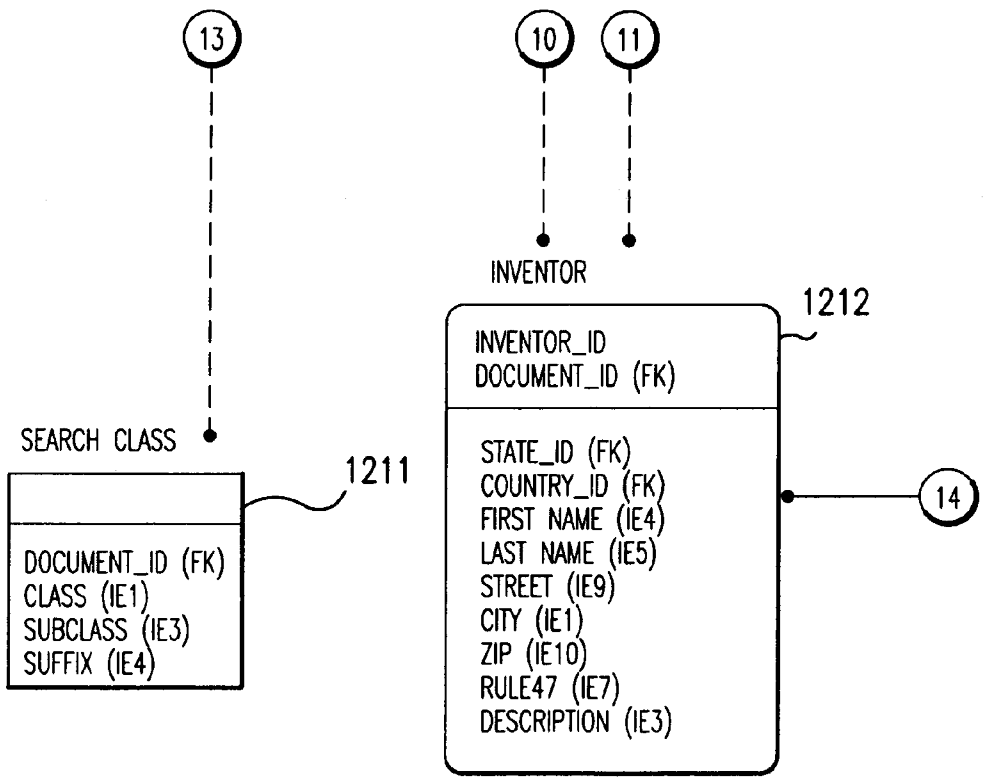
Figure 12E:
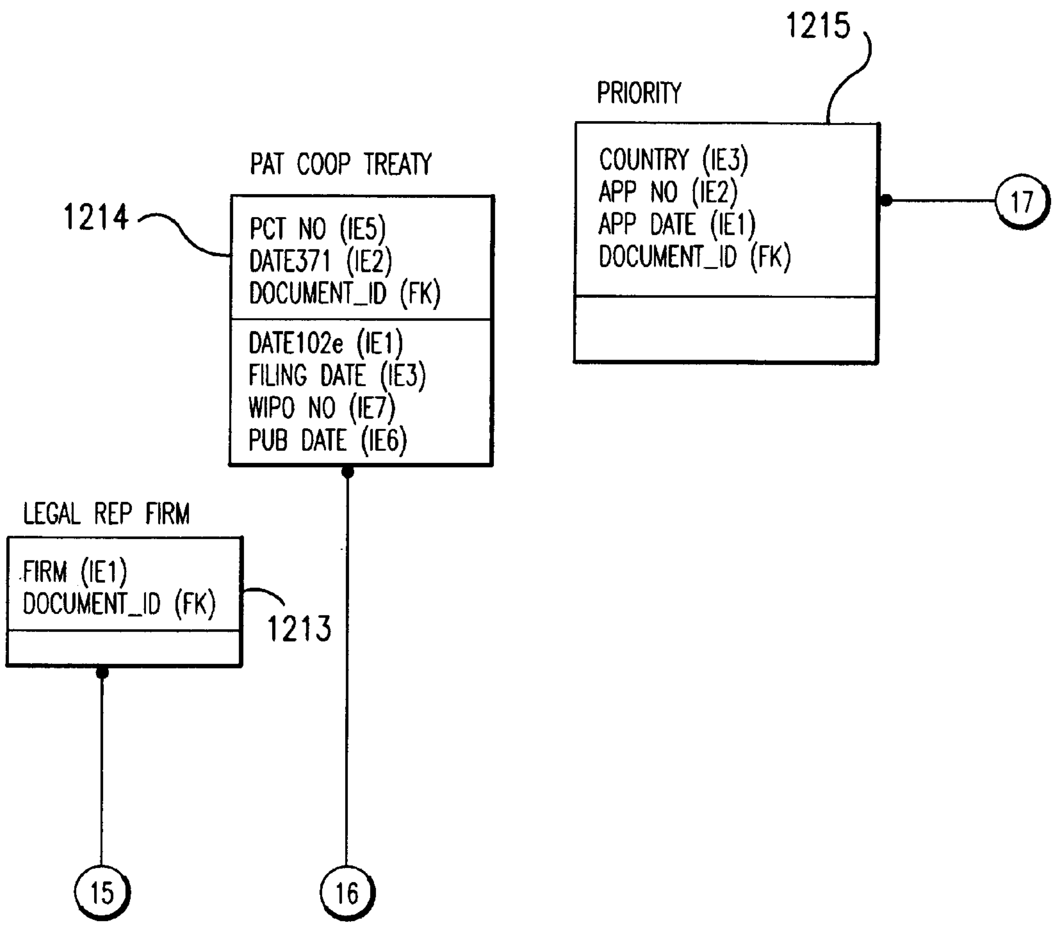
Figure 12F:
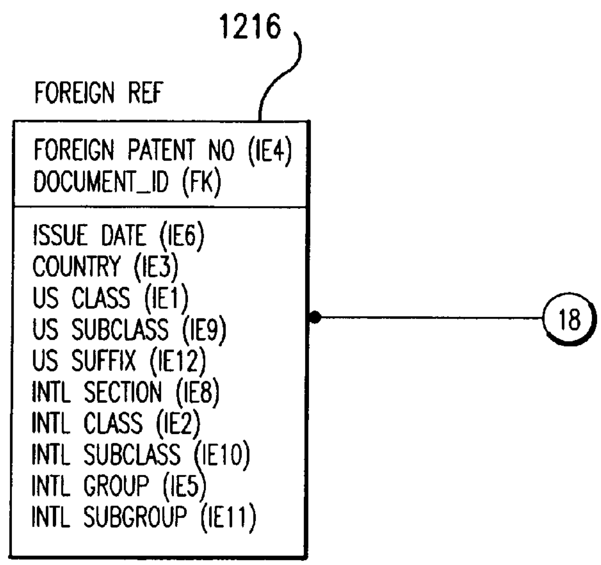
Figure 12G:
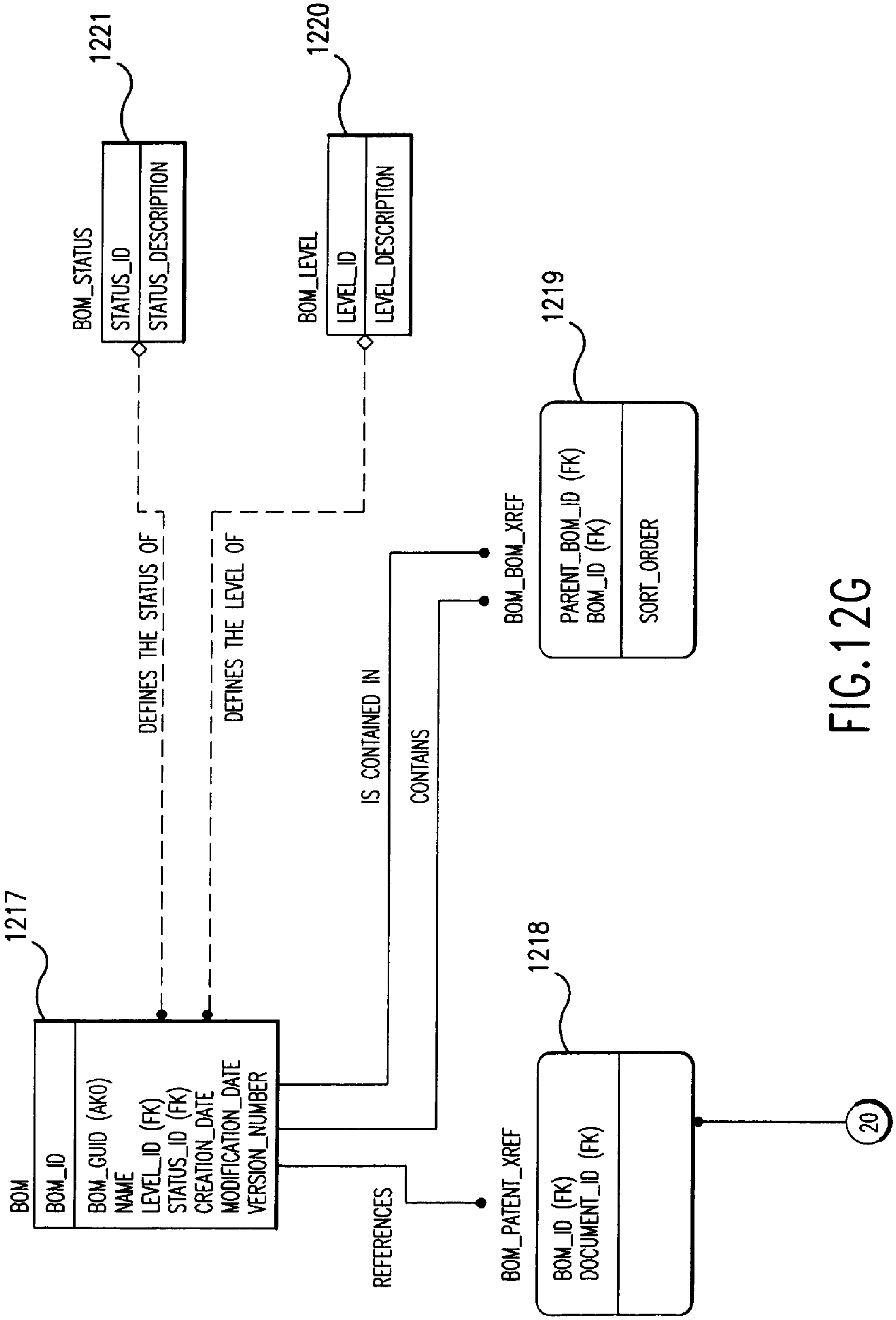
Figure 12H:
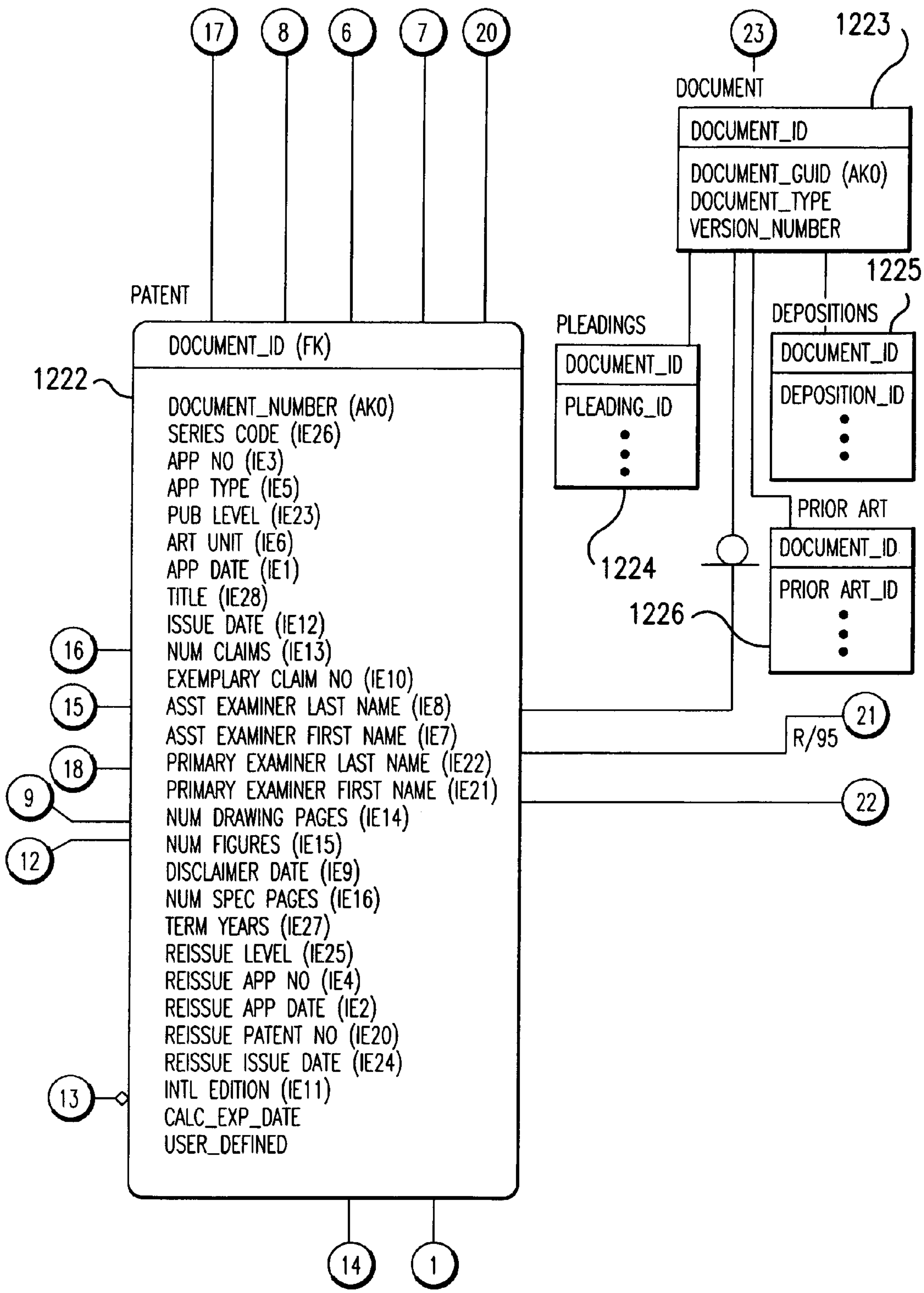

The patent bibliographic databases 604 include a patent table 1222 (FIG. 12H). The patent table 1222 includes a record for each U.S. and foreign patent represented in the patent bibliographic databases 604. Each record in the patent database 1222 includes a document_id attribute that stores a unique identifier (or key) for the associated patent. It is noted that, in the tables of the databases 316, the symbol FK stands for foreign key, AK stands for alternate key, and IE stands for inversion entry (which is a non-unique index).

Each record of the patent database 1222 also includes attributes that, for the most part, correspond to the bibliographic information on the first page of U.S. patents. In an embodiment of the invention, each record of the patent database 1222 includes attributes that, for the most part, correspond to the bibliographic information contained in the electronic representations of U.S. patents publicly available from the U.S. Patent and Trademark Office.

For example, a record in the patent database 1222 includes a document_number attribute that stores a patent number 4004 (see the example patent in FIG. 40). In an entry of the patent database 1222, the AppNo attribute corresponds to the application number 4014, the AppDate corresponds to the filing data 4016, the title corresponds to the title of the patent 4010, the issue date corresponds to the date that the patent issued 4006, the NumClaims corresponds to the number of claims in the patent 4036, the AsstExaminerLastName corresponds the last name of the assistant examiner 4032, the AsstExaminerFirstName corresponds to the first name of the assistant examiner 4032, the PrimaryExaminerLastName corresponds to the last name of the primary examiner 4030, and the PrimaryExaminerFirstName corresponds to the first name of the primary examiner 4030.

Also in each record of the patent database 1222, the NumDrawingPages corresponds to the number of drawing sheets 4038, the disclaimer date corresponds to any terminal disclaimer 4106 (FIG. 41), the ReissueLevel, ReissueAppNo, ReissueAppDate, ReissuePatentNo, and ReissueIssueDate corresponds to any reissue information 4308, 4304, and 4306 (FIG. 43).

Each record of the patent database 1222 also includes attributes that correspond to patent bibliographic information not shown on the front page of U.S. patents. For example, a record of the patent database 1222 also includes a SeriesCode that corresponds to the series code of the patent. Other information contained in each record of the patent database 1222 and not shown on the front page of the U.S. patent is the AppType, PubLevel, ArtUnit, ExemplaryClaimNo, NumFigures, NumSpecPages, TermYears, and IntlEdition. Each record of the patent database 1222 may also include fields whose values are calculated during the loading phase. For example, each record of the patent database 1222 may include a calc_exp_date that corresponds to the expiration date of the patent. This date is calculated and loaded into the patent database 1222 during the load phase of the patent database 1222 (described below). calc_exp_date and issue date are collectively referred to as patent term expiration related information.

Each record of the patent database 1222 also includes one or more user_defined fields. Users may enter any information into this field. The amount of information that can be entered into this field is relatively large, such as 32 kbytes or greater. This field is preferably indexed searchable. The user can enter into this field information that is specific and/or of interest to his company. For example, a user may enter into this field its own matter or reference/tracking number.

Additionally, the invention allows operators to add any number of additional user defined fields, both into the patent database 1222 and into any other table of the databases 316. The fields must be of certain predefined types, such as date fields, string fields, numeric fields, etc. The user can define the name of these fields and the types of these fields (from a number of available field types). Preferably, these fields are indexed and searchable.

The record in the patent table 1222 corresponding to a particular patent is herein called the base record for the patent (because this record in the patent table 1222 includes most of the bibliographical information about the patent). The patent bibliographic databases 604 include other tables that store additional patent bibliographic information about each patent represented in the patent bibliographic databases 604. Records in these other tables are linked to their respective base records in the patent database 1222 via the document_id attribute.

An assignee table 1201 (FIG. 12B) includes information on the assignees of a patent, if any. A given patent may have multiple assignees. For each assignee of a patent, there is a record in the assignee table 1201. These assignee records in the assignee table 1201 are linked to the corresponding base record in the patent table 1222 via the document_id attribute. Each record of the assignee table 1201 includes an assignee_id attribute which is an identifier that uniquely identifies the assignee. Each record of the assignee table 1201 also includes information pertaining to the assignee, such as country information, state information, the name of the assignee, and the city and zip code of the assignee. This information is found on the front page of U.S. patents (see field 4104 in FIG. 41). In each entry of the assignee table 1201, the country and state of the assignee as preferably specified using codes. These codes are defined in a state table 1207 and a country table 1210 (FIG. 12C).

An intlclass table 1203 (FIG. 12B) stores information pertaining to the international class of a patent and the international search classes of the patent. For a given patent, the intlclass table 1203 includes a record for each international class to which the patent is assigned. Additionally, the intlclass table 1203 includes a record for each international search class which was searched during the prosecution of the patent. Whether a record in the intlclass table 1203 corresponds to an international class or an international search class is denoted by the attribute is_search_class. This attribute is set to true if the record corresponds to an international search class. Referring to FIG. 40, the international class is identified by reference number 4024. Not all patents have international search classes, and this is the case with the patent shown in FIG. 40. The records in the intlclass table 1203 are linked to the associated base record in the patent table 1222 via the document_id attribute.

The patent_class_xref table 1204 (FIG. 12B) includes information on the U.S. classification of a patent. For a given patent, the patent_class_xref table 1204 includes an entry for the original classification of a patent. The patent_class_xref table 1204 also includes an entry for each unofficial classification of the patent, and each digest classification of the patent. Whether or not a record in the patent_class_xref table 1204 corresponds to the original classification is denoted by an original attribute. Whether or not an entry in the patent_class_xref table 1204 corresponds to an unofficial classification or a digest classification is designated by a patent_class_type_id code, whose values are defined by a patent_class_type table 1202. Records in the patent_class_xref table 1204 are linked to the corresponding base record in the patent table 1222 via the document_id attribute.

A patent class/subclass is stored in a record of the patent_class_xref table 1204 using the patent_class_id attribute, the subclass_id attribute, and the suffix_id attribute. Consider the following class/subclass: 364/419.19. For this example, the patent_class_id is equal to 364. The subclass_id is equal to 419. The suffix_id attribute is equal to 19. By breaking the class/subclass into these three fields, it is possible to fine tune searches and direct searches to any combination of the class, subclass, or subclass suffix.

The patent_class_id attribute is actually a code. The same is true of the subclass_id and the suffix_id attributes. These patent class codes are defined in a patent_class table 1209 (FIG. 12C).

A RelatedApp table 1206 (FIG. 12B) stores information on applications which are related to a patent. For a given patent, the RelatedApp table 1206 includes a record for each application that is related to the patent. Related application data is shown, for example, in FIG. 44B at reference number 4490. Records in the RelatedApp table 1206 are linked to the associated base record in the patent table 1222 via the document_id attribute. An entry in the RelatedApp table 1206 includes attributes to store the serial number of the related application, the filing date of the related application, the status of the related application, and the patent number and issue date of the related application, if the related application issued as a patent. Each entry of the RelatedApp table 1206 also includes a grammarcode attribute that stores a code corresponding to such text as "continuation of", "continuation-in-part," "which is a continuation-in-part of". These grammar codes are found in the electronic representations of U.S. patents publicly available from the U.S. Patent and Trademark Office.

A LegalRepAttor table 1205 includes information on the attorney or agent who prosecuted the patent. Such information is shown in FIG. 40 at reference number 4034. There is a record in the LegalRepAttor table 1205 for each attorney or agent who prosecuted and is listed on the front page of the patent. Records in the LegalRepAttor table 1205 are linked to the corresponding base record in the patent table 1222 via the document_id attribute.

Referring to FIG. 12C, a PatentRef table 1208 stores information on U.S. patents that were cited during the prosecution of a given patent. The PatentRef table 1208 includes a record for each U.S. patent that was cited during the prosecution of a given patent. Such reference to U.S. patents are shown, for example, in FIG. 40 at reference number 4028. Each record of the PatentRef table 1208 includes a RefPatent No attribute that represents the patent number of the reference patent. Each record of the PatentRef table 1208 also includes attributes that store the issue date of the reference patent, the first named inventor of the reference patent, and the class/subclass of the reference patent. Records in the PatentRef table 1208 are linked to the corresponding base record in the patent table 1222 using the document_id attribute.

Referring now to FIG. 12D, a SearchClass table 1211 stores information on U.S. classes and subclasses which were searched during the prosecution of a patent. For any given patent, the SearchClass table 1211 includes a record for each class/subclass that was searched during the prosecution of the patent. U.S. search class information is shown, for example, in FIG. 40 at reference number 4026. Records in the SearchClass table 1211 are linked to the corresponding base record in the patent table 1222 via the document_id attribute.

The inventor table 1212 includes information on the inventors of a patent. The inventor table 1212 includes a record for each inventor of a given patent. Records in the inventor table 1212 are linked to the corresponding base record in the patent table 1222 via the document_id attribute. Inventorship information is shown, for example, in FIG. 44A by reference number 4450. Each record in the inventorship table 1212 includes an inventor id attribute that stores a key that uniquely identifies the inventor. Each record of the inventorship table 1212 also includes attributes to identify the first and last name of the inventor, the address of the inventor, and the state and country of the inventor. The state and country values are specified by the state_id and the country_id attributes, which are codes. The state and country codes are defined in the state table 1207 and the country table 1210, respectively (FIG. 12C).

Referring now to FIG. 12E, the LegalRepFirm table 1213 includes information on the law firm that prosecuted the patent. There is one record in the LegalRepFirm table 1213 for each law firm that prosecuted the patent and that is shown on the front page of the patent. This law firm information is shown, for example, in FIG. 40 by reference number 4034. Records in the LegalRepFirm table 1213 are linked to the corresponding base record in the patent table 1222 via the document_id attribute.

The PatCoopTreaty table 1214 stores information on a PCT application, in those cases where the U.S. patent was first filed as a PCT application. Such PCT information is shown, for example, in FIG. 42 at reference number 4204. Records in the PatCoopTreaty table 1214 are linked to the corresponding base record in the patent table 1222 via the document_id attribute.

The priority table 1215 includes priority information related to the patent. Such priority information is shown, for example, in FIG. 43 at reference number 4310. Records in the priority table 1215 are linked to the corresponding base record in the patent table 1222 by using the document_id attribute.

Referring now to FIG. 12F, the ForeignRef table 1216 includes information on foreign references that were cited during the prosecution of the patent. Such citations of foreign references are shown, for example, in FIG. 40 at reference number 4040. For a given patent, the ForeignRef table 1216 includes a record for each foreign reference that was cited against the patent. Each record of the ForeignRef table 1216 includes a ForeignPatent No attribute that corresponds to the patent number of the foreign reference. Each record of the ForeignRef table 1216 also includes attributes that store information identifying the issue date of the foreign patent, the country of the foreign patent, and U.S. and international classes.

Referring again to FIG. 6, the document bibliographic databases 602 include other bibliographic databases corresponding to documents that are of interest to the customer. In the example of FIG. 6, the document bibliographic databases 602 include deposition bibliographic databases 606, pleadings bibliographic databases 608, and prior art bibliographic databases 610. These databases may be of interest to the customer if, for example, the customer is involved in a patent litigation. Examples of the database structure of the deposition bibliographic databases 606, the pleadings bibliographic databases 608, and the prior art bibliographic databases 610 are shown in FIG. 12H. A depositions table 1225 corresponds to the deposition bibliographic databases 606. The depositions table 1225 includes a record for each deposition-related document that is of interest to the customer. Each record in the depositions table 1225 includes a document_id attribute that is a key that uniquely identifies the document. Each record of the depositions table 1225 also includes other bibliographic information about the deposition-related document, such as a deposition_id attribute that stores an identifier that identifies the deposition document. Each record of the depositions table 1225 may also include other bibliographic information such as the date that the deposition took place, the parties involved in the deposition, the number of pages of the deposition transcript, the place that the deposition took place, a summary of the deposition, etc.

A pleadings table 1224 corresponds to the pleadings bibliographic databases 608. The pleadings table 1224 includes a record for each pleadings-related document that is of interest to the customer. Each record of the pleadings table 1224 includes a document_id attribute that stores a key that uniquely identifies the pleadings-related document. Each record of the pleadings database 1224 may also include other bibliographic information, such as a pleadings_id attribute. The pleadings table 1224 may include other attributes, such as attributes that identify the author of the pleadings, the date that the pleadings were created, the subject matter of the pleadings, the number of pages of the pleadings, the parties involved in the pleadings, the title of the pleadings, the type of the pleadings, etc.

The prior_art table 1226 corresponds to the prior art bibliographic databases 610. There is a record in the prior_art table 1226 for each prior art reference that is of interest to the customer. Each reference of the prior_art table 1226 includes a document_id attribute that uniquely identifies the prior art reference. Each record of the prior_art table 1226 also includes other attributes, such as a prior_art_id attribute, and attributes to store information identifying the author of the prior art reference, the publication date of the prior art reference, the title of the prior art reference, the subject matter of the prior art reference, the number of pages of the prior art reference, etc.

Still referring to FIG. 12H, a document table 1223 represents a table of the methodology support databases 642 (FIG. 6). The document table 1223 represents a master index of all of the documents represented in the document bibliographic databases 602. The document table 1223 has a record for each document represented in the patent bibliographic databases 604, the deposition bibliographic databases 606, the pleadings bibliographic databases 608, the prior art bibliographic databases 610, and any other bibliographic databases in the document bibliographic databases 602. Each record of the document table 1223 includes a document_id attribute that is a key that uniquely identifies a document. The document_id attribute is a common attribute in the document bibliographic databases 602, and serves to link the tables in the document bibliographic databases 602 together. Each record of the document table 1223 also includes a document_type attribute that identifies the type of the document (for example, whether the document is a patent, a deposition-related document, a pleadings-related document, a prior art-related document, etc.). Each record of the document table 1223 also includes a document_guid attribute that serves as a second identifier for the document, and a version_number attribute that identifies the version of the document.

The document bibliographic databases 602 shall now be further described with reference to an example shown in FIGS. 13-17. FIG. 13 illustrates an example patent table 1222X. For simplicity, the example patent table 1222X only shows the document_id attribute and the document_number. The patent table 1222X stores therein bibliographic information on documents D1-D14, each of which corresponds to a patent.

FIG. 14 is an example depositions table 1225X. For simplicity, only the document_id and the deposition_id attributes are shown. The depositions table 1225X stores bibliographic information on documents D15-D17, each of which represents a deposition-related document.

FIG. 15 shows an example pleadings table 1224X. For simplicity, only the document_id and the pleadings_id attributes are shown. The pleadings table 1224X stores information on documents D18-D21, each of which corresponds to a pleadings-related document.

FIG. 16 is an example prior_art table 1226X. For simplicity, only the document_id and the prior_art_id attributes are shown. The prior_art table 1226X stores information on documents D22 and D23, each of which represents a prior art-related document.

FIG. 17 is an example document table 1223X. The document table 1223X includes an entry for each of the documents represented in the example patent table 1222X, the example depositions table 1225X, the example pleadings table 1224X, and the example prior_art table 1226X (shown in FIGS. 13-16, respectively). Accordingly, the document table 1223X has entries for documents D1-D23. For simplicity, only the document_id and the document_type attributes are shown in the example document table 1223X. The document_type attribute indicates the type of the document.

The preferred procedure for loading the document bibliographic databases 602 shall now be described.

Figure 46:
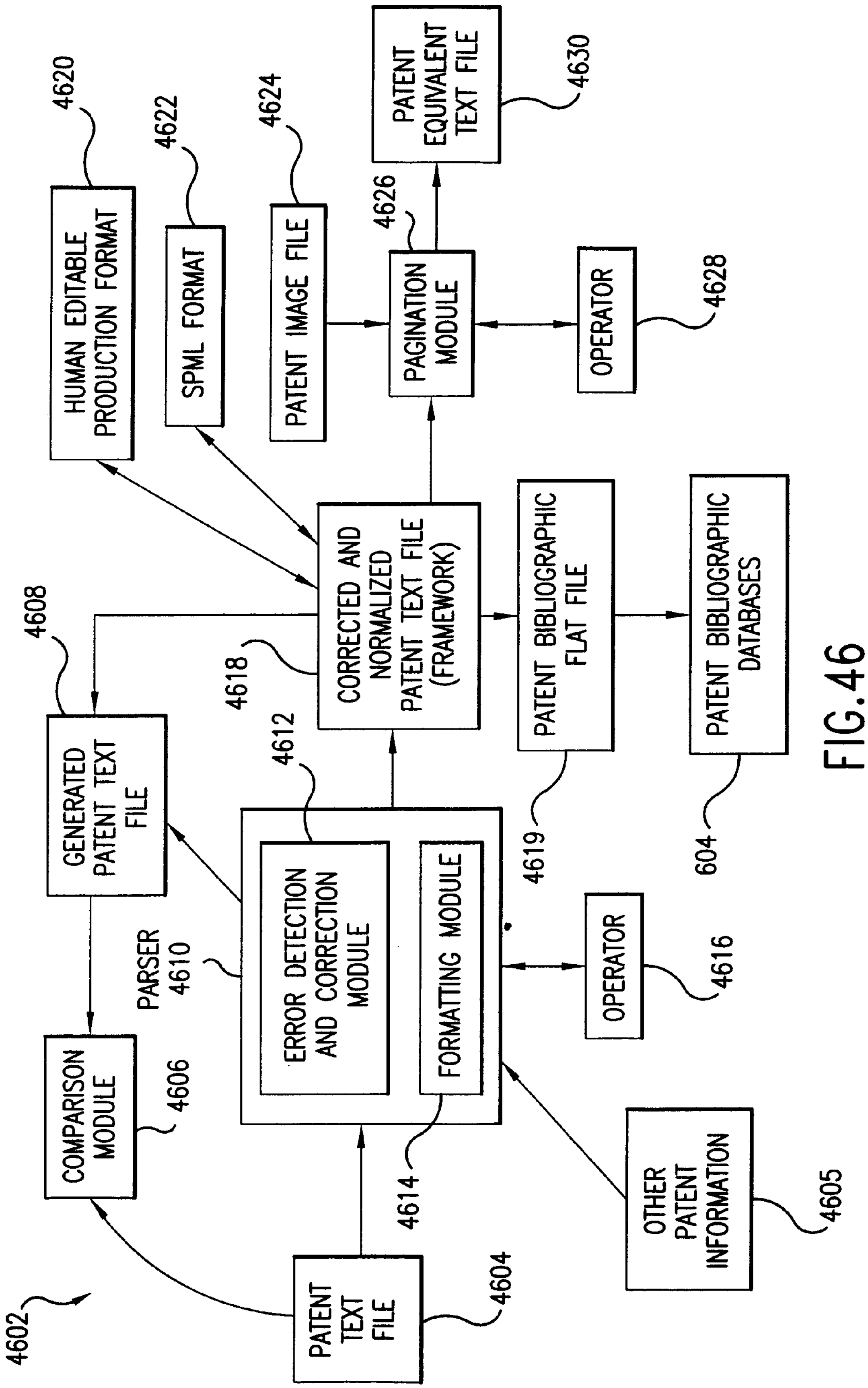
FIG. 46 is a dataflow diagram illustrating an exemplary extract and load process for the patent bibliographic databases.
Figure 96:
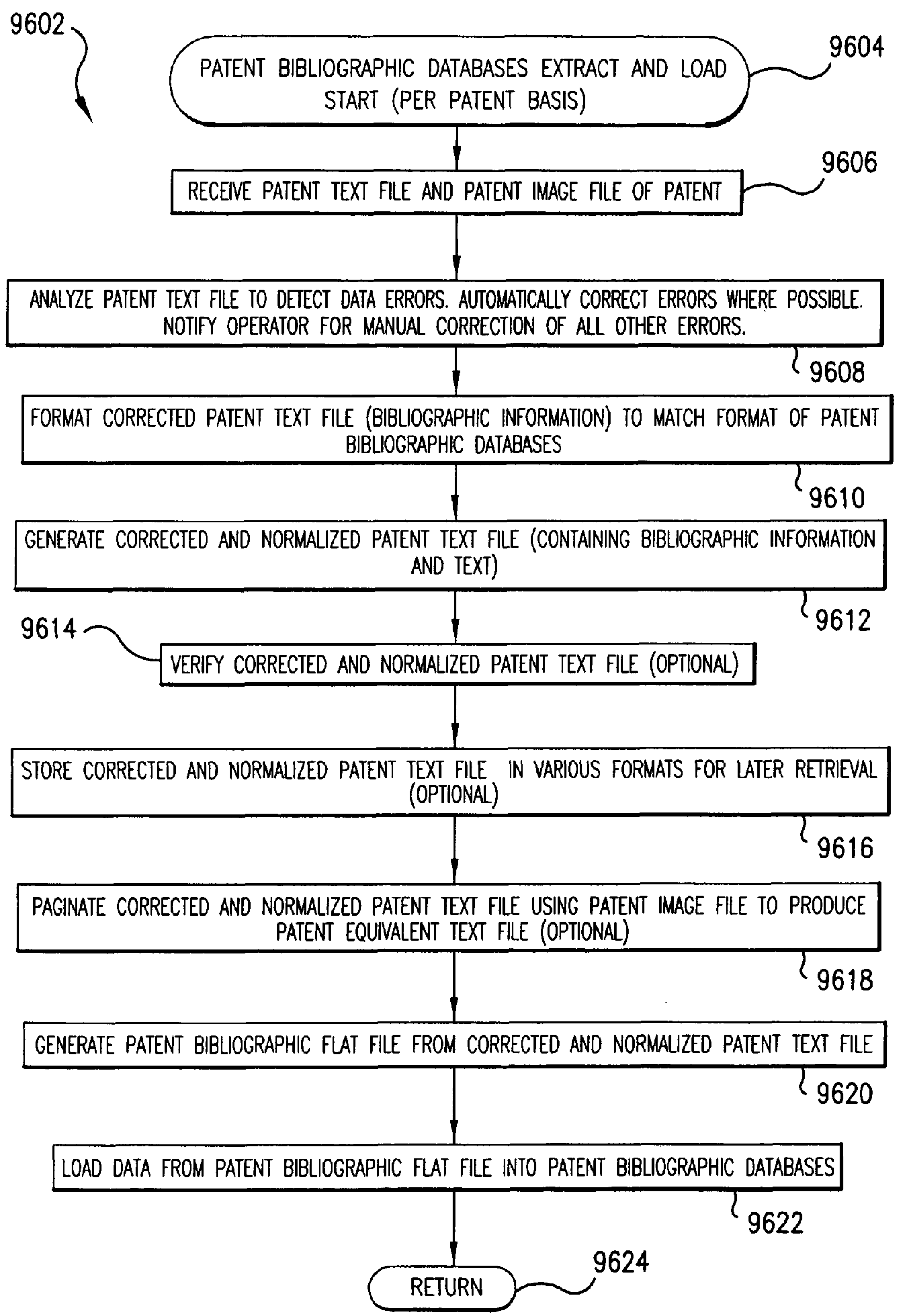
FIG. 96 is a flowchart of a extract and load process for the patent bibliographic databases.

FIG. 46 illustrates a data flow diagram of the loading of the patent bibliographic databases 604. FIG. 96 is a flowchart 9602 that corresponds to the data flow diagram 4602 of FIG. 46, and that represents the operation of the invention when loading bibliographic information of a given patent into the patent bibliographic databases 604.

In step 9606, the patent text file 4604 and the patent image file 4624 of the patent being processed is received. For U.S. patents, electronic text and image files of patents are available from the U.S. Patent and Trademark Office. Similarly, text and image files corresponding to foreign patents are available from foreign patent offices.

In step 9608, an error detection and correction module 4612 in a parser 4610 analyzes the patent text file 4604 and detects any errors in the bibliographic data contained in the patent text file 4604. The error detection and correction module 4612 detects many types of errors. For example, an error which is detected by the error detection and correction module 4612 involves the issue date. With regard to patent text files 4604 received from the U.S. Patent Office, the issue date appears in the following format:

ISD 19790315.

Thus, the issue date information is set off by the ISD token. This token is followed by four digits representing the year, two digits representing the month, and two digits representing the day. The error detection and correction module 4612 detects errors in the date given known date ranges. For example, the error detection and correction module would identify the following as an error:

ISD 99790315

The error detection and correction module 4612 would detect this as an error, since the year value is out of range. The error detection and correction module 4612 operates in this manner to detect all date-related errors.

Another error which the error detection and correction module 4612 detects involves state information and zip code information. The error detection and correction module 4612 correlates the state information and zip code information contained in the patent text file 4604 to determine if the zip code is possibly incorrect given the state, and vice versa. Such processing is possible, since each state is associated with a finite set of zip codes.

Another error which the error detection and correction module 4612 detects involves the patent number. The patent number of a U.S. patent comprises seven digits. The error detection and correction module 4612 confirms that the patent number has seven digits, and detects an error if it does not. The error detection and correction module 4612 performs a similar function for non-U.S. patents, and other types of patent documents, such as reissues, reexams, etc.

The patent number of a reissued patent has the token RE followed by five digits. The error detection and correction module 4612 detects an error if the patent number of a reissued patent does not follow this format.

The detection performed by the error detection and correction module 4612 also involves street addresses. The error detection and correction module 4612 detects a possible error if the street address has no alphabetic characters, or has no space characters, or has no digit characters. Similarly, the error detection and correction module 4612 detects a possible error with the city name if the information in the patent text file 4604 corresponding to a city name has no alphabetic characters.

The error detection and correction module 4612 performs additional error correction with regard to U.S. states by comparing information corresponding to U.S. state names from the patent text file 4604 with a list of the U.S. state abbreviations used by the U.S. Patent Office. If the state information does not match one of the state abbreviations, the error detection and correction module 4612 detects an error.

Similarly, the error detection and correction module 4612 detects errors with information in the patent text file 4604 corresponding to country abbreviations by comparing such country information from the patent text file 4604 with the list of country codes utilized by the U.S. Patent and Trademark Office (and any other appropriate foreign patent office).

The error detection and correction module 4612 also checks to ensure that mandatory data is contained in the patent text file 4604. Some bibliographic fields in the patent text file 4604 are mandatory, while others are optional. For example, the patent text file 4604 must contain document type information that identifies whether the patent is a utility patent, a design patent, a plant patent, a defensive publication, etc. In contrast, the patent text file 4604 may or may not include assignee information, since a patent does not have to have an assignee. The error detection and correction module 4612 checks for mandatory information, and detects an error if mandatory information is not contained in the patent text file 4604.

Many fields in the patent text file 4604 must be in a proper format. Some of these fields were already discussed above, such as the patent number and date. Other fields which must be in a certain format are classes and subclasses, and dates. The error detection and correction module 4612 determines whether this information from the patent text file 4604 is in the proper format, and detects an error if they are not.

Also in step 9608, the error detection and correction module 4612 automatically corrects the errors that it detects, where such automatic correction is possible. For example, given the patent number, the error detection and correction module 4612 can estimate the issue date. If the error detection and correction module 4612 detected an error with the issue date, then the error detection and correction module 4612 can attempt to automatically correct the error in the issue date based on the patent number (assuming that the patent number was found to contain no errors).

If the error detection and correction module 4612 cannot automatically correct the errors that it detected, then the error detection and correction module 4612 notifies an operator 4616. The operator 4616 then manually corrects the error.

The error detection and correction module 4612 also detects for errors in the information in the patent text file 4604 corresponding to assignees. The same company can be listed as assignee in different patents using different names. For example, IBM can be listed as the assignee in patents using various different names, such as IBM; International Business Machines; IBM, Inc.; etc. The error detection and correction module 4612 includes a thesaurus feature that lists the most commonly used names for well-known companies. The error detection and correction module 4612 compares the assignee name from the patent text file 4604 with this thesaurus and replaces the assignee information in the patent text file 4604 with the name retrieved from the thesaurus. Alternatively, the name retrieved from the thesaurus may be written to an appropriate user-defined field of the bibliographic databases 602.

In step 9610, a formatting module 4614 in the parser 4610 formats the error detected and corrected patent text file 4604. This formatting is performed in order to convert the format of the patent text file 4604 to the format of the patent bibliographic databases 604. Such formatting includes formatting performed with respect to patent numbers. The required formats for different types of patents are presented in Table 4, below. It is noted that Table 4 is not a complete list, but just an illustrative one. Other types of patents (applicable in both the U.S. and foreign countries) could also be processed by the formatting module 4614.

TABLE 4

| Type of Patent | Format |
|---|---|
| Utility patent | 7 |
| Design patent | D6 |
| Plant patent | PP5 |
| Utility SIR | H7 |
| Design SIR | HD6 |
| Plant SIR | HP6 |
| Defensive publication | T6 |
| X patent | X7 |
| Additional improvements patent | AI4 |
| Non-patent literature | NP6 |
| Reissued utility patent | RE5 |
| Reissued design patent | RD5 |
| Reissued plant patent | RP5 |
| Reissued X patent | RX5 |

The formatting module 4614 confirms that the information in the patent text file 4604 corresponding to patent numbers corresponds to the formats shown in Table 4. If the format is not as shown in Table 4, the formatting module 4614 modifies the patent text file 4604 so that the patent number conforms with the format of Table 4. For example, consider the format of a plant patent, which is a token PP immediately followed by five digits. Assume that the information in the patent text file 4604 was as follows: PP-11111 (for illustrative purposes, spaces are indicated as dashes). This patent number is not in the proper format because five digits do not immediately follow the PP token. Instead, there is a space between the PP token and the five digits. Accordingly, the formatting module 4614 modifies the patent text file 4604 so that the patent number is in the proper format. In the example above, the formatting module 4614 deletes the space between the PP token and the five digits.

In step 9612, the parser 4610 generates a corrected and normalized patent text file 4618 from the error detected and corrected, and formatted patent text file 4604. The corrected and normalized patent text file includes both the text from the patent text file 4604 and the error detected and corrected, and formatted patent bibliographic information from the patent text file 4604.

When generating the corrected and normalized patent text file 4618, the parser 4610 may take into consideration other patent information 4605. The parser 4610 may modify the information from the patent text file 4604 with this other patent information 4605 when generating the corrected and normalized patent text file 4619. For example, a patent is sometimes reassigned to another company after it issues. The new assignee, however, is not indicated on the front page of the patent (because the patent was published before the reassignment took place). Often, patent reassignment information is in the assignment records of the U.S. Patent and Trademark Office (if such information was recorded with the USPTO). Such assignment records may constitute part of the other patent information 4605. The parser 4610 in generating the corrected and normalized patent text file 4618 may take into account such assignment information when generating the corrected and normalized patent text file. For example, the parser 4610 may include a note in the corresponding record of the corrected and normalized patent text file 4618 that the patent has been reassigned, and indicate the new assignee(s).

This note may be, for example, in a field of the corrected and normalized patent text file 4618 corresponding to the user defined attribute in the record of the patent table 1222 (FIG. 12H).

The patent bibliographic information in the corrected and normalized patent text file 4618 is stored in normalized format. Preferably, this normalized format is a condensed, field delimited format. Essentially, in normalizing the patent bibliographic information from the patent text file 4604, the parser 4610 separates the patent bibliographic information into fields that correspond to the attributes in the patent bibliographic databases 604. These fields are delimited either using commas, tabs, or some other symbol.

For example, the format of a class/subclass in the patent text file 4604 is as follows: XCL---17-34-2 (for illustrative purposes, spaces are indicated as dashes). Therefore, in the patent text file 4604, a class/subclass is denoted by the token XCL, followed by two spaces. Three characters follow this token that correspond to the class. This is followed by three characters that correspond to the subclass. Finally, two characters follow the subclass. These two characters correspond to the suffix. In the corrected and normalized patent text file 4618, this class/subclass information is represented in a field delimited format, as follows: 17, 34, 2. This is a comma delimited format. In other embodiments, the corrected and normalized patent text file 4618 uses a tab delimited format for the patent bibliographic information.

In step 9614, the corrected and normalized patent text file 4618 is used to regenerate the patent text file 4604. The regenerated patent text file is designated by reference number 4608. A comparison module 4606 then compares the patent text file 4604 with the regenerated patent text file 4608. If the regenerated patent text file 4608 differs from the patent text file 4604, then the comparison module 4606 determines that the parser 4610 incorrectly generated the corrected and normalized patent text file 4618 from the patent text file 4604. If such an error is detected, then the comparison module 4606 notifies an operator 4616. It is noted that step 9614 is optional.

Preferably, the corrected and normalized patent text file 4618 represents an object-oriented framework. Generating the corrected and normalized patent text file 4618 as a framework is useful because it can then be easily exported to a number of different formats, for later processing. Accordingly, in step 9616, the corrected and normalized patent text file is stored in various formats for later retrieval. Such formats may include a human editable production format 4620, and/or a SPML format 4622. It is noted that step 9616 is optional.

In step 9618, the corrected and normalized patent text file is paginated by a pagination module 4626 to generate a patent equivalent text file 4630. The patent equivalent text file 4630 includes equivalency information that establishes an equivalency relationship between the text in the patent equivalent text file 4630 and the image in the patent image file 4624. For example, this equivalency information includes pagination information that enables the patent equivalent text file 4630 to be displayed having the same pagination (line breaks, column breaks, page breaks) as the patent image file 4624. The pagination module 4626 generates the patent equivalent text file 4630 by comparing the patent text in the corrected and normalized patent text file 4618 with the patent image file 4624 to detect equivalency information. This equivalency information is then embedded in the patent equivalent text file 4630, along with the patent text. While the pagination module 4626 is capable of performing the pagination operation automatically, in some cases some manual intervention is required. In accordance, an operator 4628 is sometimes involved with the pagination process performed by the pagination module 4626. The pagination process performed by the pagination module 4626 is further described in U.S. Pat. No. 5,623,681, U.S. Pat. No. 5,623,679, and pending U.S. patent application Ser. No. 08/341,129, all of which are incorporated by reference herein. It is noted that step 9618 is optional.

In step 9620, a patent bibliographic flat file 4619 is generated from the corrected and normalized patent text file 4618. The patent bibliographic flat file 4619 includes the normalized patent bibliographic information from the corrected and normalized patent text file 4618. Preferably, the patent bibliographic flat file 4619 does not include the patent text. The patent bibliographic flat file 4619 is generated using standard database utilities.

In step 9622, the patent bibliographic information in the patent bibliographic flat file 4619 is loaded into the tables of the patent bibliographic databases 604. This loading operation is performed by using standard database loading utilities.

After completion of step 9622, the patent bibliographic information from the patent being processed is completely loaded into the patent bibliographic databases 604. The steps of flowchart 9602 are repeated for each patent that is to be represented in the patent bibliographic databases 604.

Referring again to FIG. 6, the loading of the deposition bibliographic databases 606, the pleadings bibliographic databases 608, and the prior art bibliographic databases 610 (and any other bibliographic databases in the document bibliographic databases 602) is conducted generally according to the methodology shown in FIGS. 46 and 96 for U.S. patents. More generally, the extract and load for these bibliographic databases may be performed according to the methodology shown in FIGS. 45 and 95, described above. The actual implementation of the extract and load methodologies for these bibliographic databases will necessarily be case specific and depend on a number of factors, including the bibliographic information contained in the source documents, the format of the source documents (that is, whether or not they are electronically stored, the storage format, how bibliographic data is represented in the storage format, etc.), etc. The extract and load processes for these other bibliographic databases will be apparent to persons skilled in the relevant art(s) based on the discussion contained herein.

Group Databases

The group databases 621 are described below. In particular, the structure of the group databases 621 and the methodologies for loading the group databases 621 with data are described in the following sections.

User Defined Groups

Figure 12I:
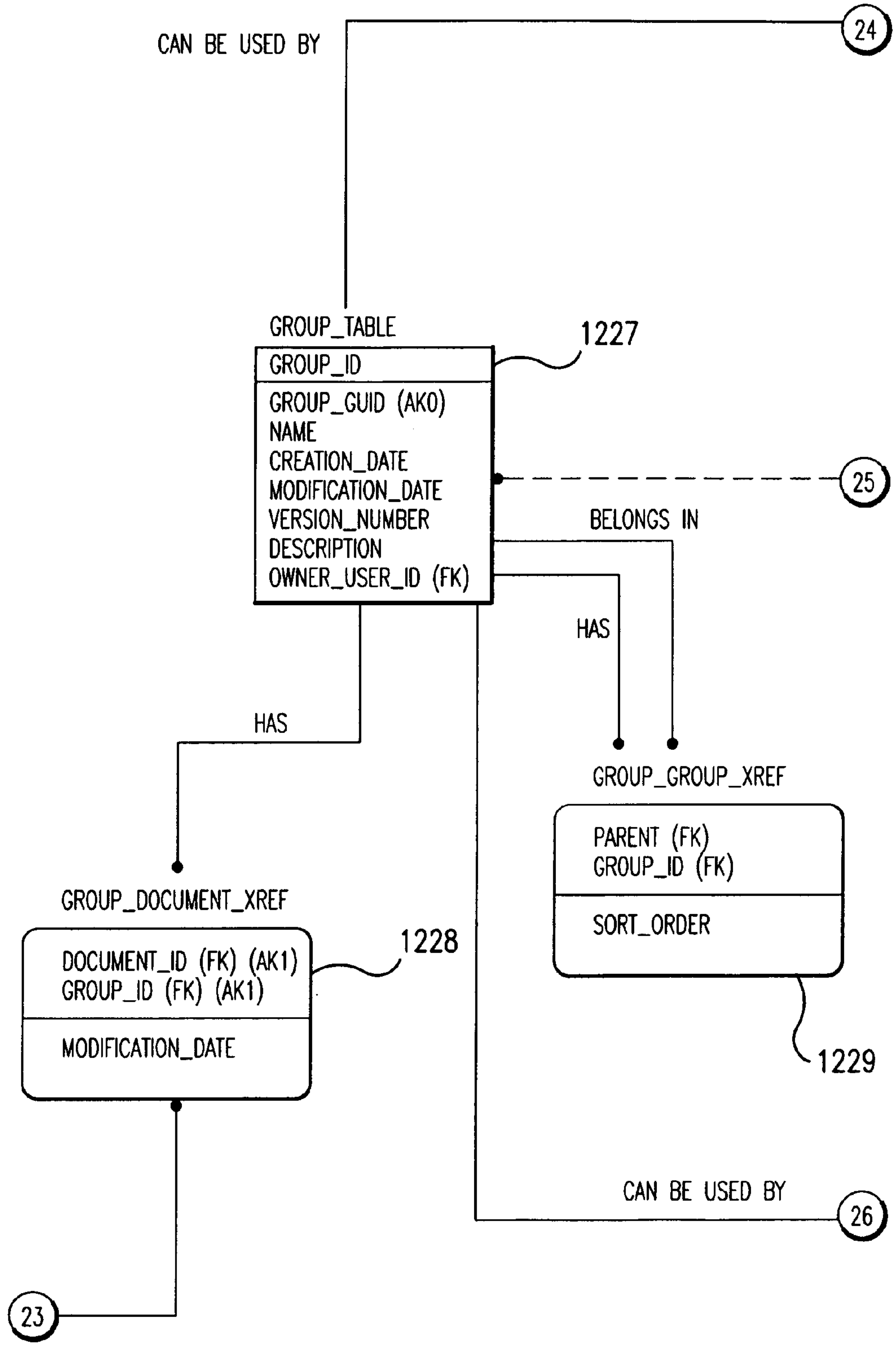

FIG. 12I depicts the user-defined group (also called arbitrary group) databases 624. A group_table database 1227 has a record for each user-defined group. Each record in the group_table database 1227 includes a group_id attribute that stores a key that uniquely identifies the user-defined group from all other user-defined groups. Each record of the group_table database 1227 also includes a group_guid which is an alternate key (identifier) of the record, a name attribute that stores the name of the user-defined group, a creation_date attribute that stores the date that the group was created, a modification_date attribute that stores the date that the group was last modified, a version_number attribute that stores the version number of the group, a description attribute that stores a description of the group, and an owner_user_id attribute that identifies the owner (that is, the creator) of the user-defined group.

According to the present invention, groups are hierarchically organized. In other words, a given group can be a child of one or more parent groups, and can also be a parent to one or more child groups. This hierarchical organization is illustrated by way of example in FIG. 18, which is an example screen shot 1801 displayed by the client grouping module 712 on the client display unit 1122. This screen shot 1801 includes a first window 1802 and a second window 1804. The first window 1802 graphically depicts the hierarchical organization of the groups, both user-defined and predefined. The highest level group is called the root group, or repository. A BOM group is a child of the root group. The BOM group is a pre-defined group and is discussed below.

A user-defined group is also a child of the root group. The user-defined group has a number of child groups. These child groups are user-defined groups. In the example, the child groups are: companies to acquire, patents about bikes, and litigation. The companies to acquire user-defined group has a number of child user-defined groups. They include: ABC Corp., XYZ Corp., and PQR Corp.

The hierarchical structure of the user-defined groups is defined by information in a group_group_xref table 1229 (FIG. 12I). The group_group_xref table 1229 includes a record for each parent/child relationship in the user-defined group hierarchical structure. Each record of the group_group_xref table 1229 includes a parent attribute and a group_id attribute. Both the parent attribute and the group_id attribute store group_id values. The parent attribute stores the group_id of the parent group, and the group_id stores the group_id of the child group.

The group_table database 1227 and the group_group_xref table 1229 shall be further described with reference to an example illustrated in FIGS. 19 and 20. FIG. 19 illustrates an example group_table database 1227X that includes information representative of the user-defined group hierarchical structure shown in FIG. 18. The example group_table database 1227X in FIG. 19 has a record for each user-defined group shown in FIG. 18. Accordingly, there is an entry in the group_table database 1227X for the following user-defined groups: companies to acquire, ABC Corp., XYZ Corp., PQR Corp., patents about bikes, and litigation. The group_id values of these user-defined groups are GRP1-GRP6, respectively. Note that the group_table database 1227X has no information pertaining to the hierarchical structure of the user-defined groups. Instead, such information on the hierarchical structure of the user-defined groups is contained in the group_group_xref table 1229.

FIG. 20 illustrates an example group_group_xref table 1229X. The group_group_xref table 1229X has entries that define parent/child relationships in the user-defined groups hierarchical structure. For example, an entry 2002 specifies that the parent attribute is GRP1 (corresponding to the companies to acquire group), and the group_id attribute is GRP2 (corresponding to the ABC Corp. group). Therefore, entry 2002 in the group_group_xref table 1229X specifies that the ABC Corp. group is a child of the companies to acquire group. Similarly, the entry 2004 specifies that the XYZ Corp. group is a child of the companies to acquire group, and entry 2006 specifies that the PQR Corp. group is a child of the companies to acquire group.

Referring again to FIG. 12I, a user-defined group can contain any number of documents, such as patents. The documents in a group are considered to be relevant to the group. In practice, a user places the documents in a group.

A group_document_xref table 1228 stores information that identifies the documents that are in each user-defined group. The group_document_xref table 1228 includes a record for each document in each user-defined group. Each record of the group_document_xref table 1228 stores a group_id attribute to identify the user-defined group, a document_id attribute to identify a document in that group, and a modification_date attribute that stores the date that the record in the group_document_xref table 1228 was last modified.

The group_document_xref table 1228 shall be further described with reference to an example shown in FIG. 21. FIG. 21 illustrates an example group_document_xref table 1228X. The example in FIG. 21 indicates that documents D1-D3 are in the user-defined group having the group_id of GRP2 (that is, the ABC Corp. group). Documents D7 and D8 are in the XYZ Corp. group; documents D11 and 12 are in the PQR Corp. group; documents D1-D3 and D9 are in the patents about bikes group; documents D22, D23, D18, D21, D16 and D1 are in the litigation group.

Referring again to FIG. 18, note that the user has selected the ABC Corp. group in the window 1802 (this is indicated by the dotted circle 1850). Selection of a group in window 1802 results in a listing of the documents in the selected group being displayed in a window 1804. Accordingly, a list including documents D1-D3 is displayed in window 1804. Other bibliographic information pertaining to these documents can also be displayed in window 1804 in a tabular or "spreadsheet" format by retrieving such bibliographic information from the appropriate tables in the document bibliographic databases 602.

Figure 18:
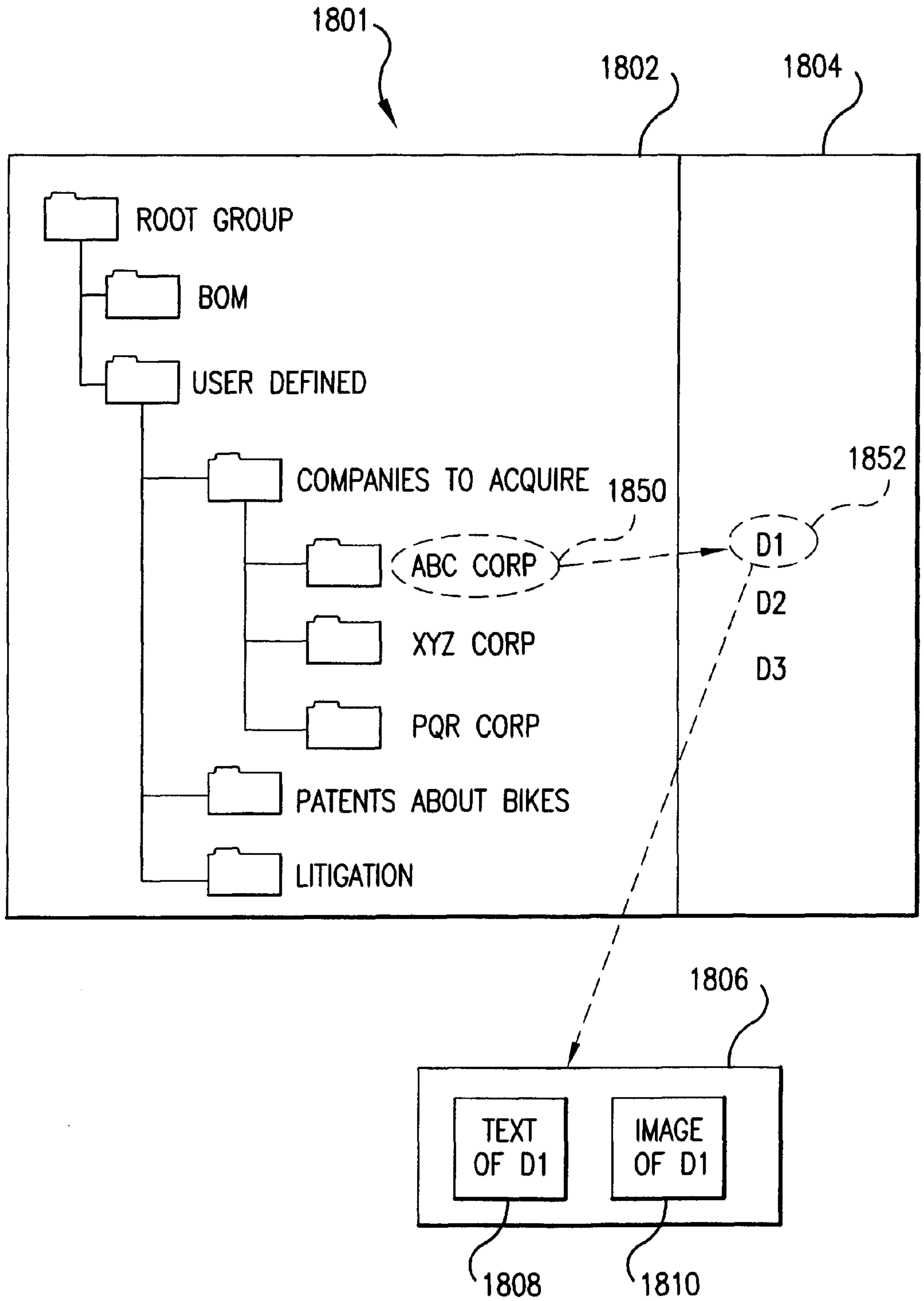
FIG. 18 illustrates an example display format depicting the hierarchical organization of groups according to the present invention.

A user can view a document by double-clicking (or use any other well known GUI technique) on that document in the window 1804. In the example of FIG. 18, the user has selected document D1 (indicated by dotted circle 1852). This results in the document being displayed in a window 1806. The window 1806 includes a window 1808, where the text of document D1 is displayed, and/or a window 1810, where the image of document D1 is displayed. The example of window 1806 where text and images of a document are selectively displayed is more particularly shown in FIG. 112. An example of screen shot 1801 where the user-defined group hierarchical structure is shown in one window 1802 and a list of documents is displayed in another window 1804 is more particularly shown in FIG. 58.

The procedures for initially loading the user-defined group databases 624 with data generally track the generic extract and load procedures illustrated in FIGS. 45 and 96. Such an initial extract and load procedure will only be required if any user-defined groups exist prior to initiation of the enterprise server 314 for a particular customer. If the customer does not have any user-defined groups prior to initiating the enterprise server 314 for the first time, then the user-defined group databases 624 will be loaded with information as the user creates and modifies user-defined groups.

Predefined Group Databases

The predefined group databases 622 (also called system defined group databases) are described in the following sections.

Bill of Materials (BOM) Databases

A bill of materials (BOM) is a well-known data structure often used by companies to abstractly represent a product. A BOM is a hierarchical and recursive data structure that identifies the subassemblies of a product, and that identifies the parts of the subassemblies. Accordingly, a product's BOM is useful for recording the sub-assemblies and parts needed to construct the product. BOMs are also called herein BOM data structures, or BOM structures, or BOM trees.

Figure 22:
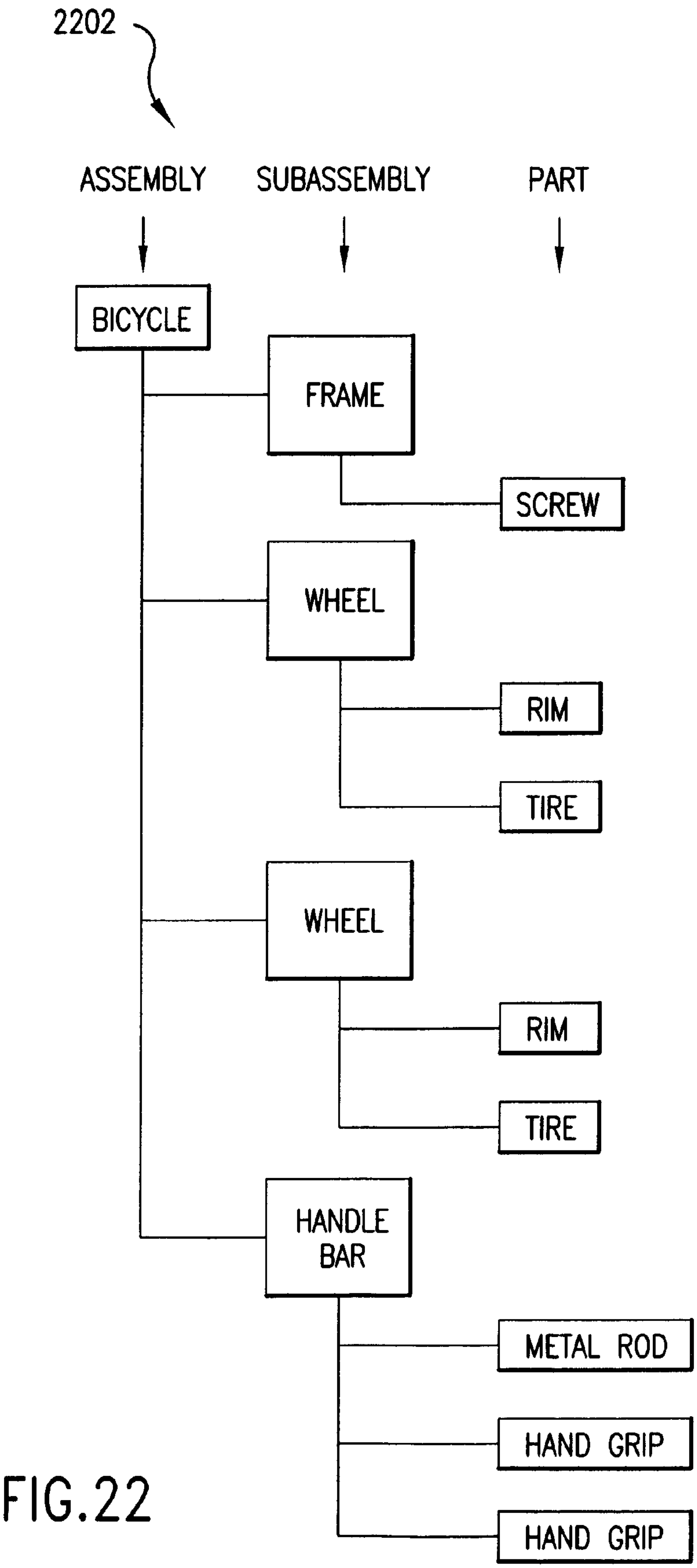
FIGS. 22 and 23A illustrate example bill of materials (BOM) data structures (also called BOM structures, or BOMs)

FIG. 22 illustrates an example BOM 2202 for a bicycle. The bicycle is the product (also called the assembly). As indicated in FIG. 22, the bicycle includes a frame, two wheels, and a handle bar (only a portion of the BOM for the bicycle is shown for simplicity purposes).

The frame, the two wheels, and the handle bar are subassemblies because they each are composed of one or more subassemblies or parts. For example, the frame subassembly includes a screw, which is a part. A part is defined as an item which does not have component parts separately represented in the BOM. Each of the two wheel subassemblies includes a rim and a tire, which are both parts. The handlebar subassembly includes a metal rod and two hand grips, all three of which are parts.

Although not indicated in the example of FIG. 22, a subassembly may be composed of any combination of parts and/or subassemblies.

The BOM 2202 in FIG. 22 includes a number of nodes, called BOM nodes. A node corresponds to each assembly (i.e., the bicycle node), each subassembly (i.e., the frame, wheel, and handle bar nodes), and each part (i.e., the screw, rim, tire, metal rod, and hand grip nodes).

In the context of and as applied by the present invention, each BOM node has a logical level in the hierarchical structure of the BOM. According to an embodiment of the invention, there are three BOM logical levels (although a customer can define others): assembly, subassembly, and part. Accordingly, the logical level of the bicycle node is assembly. The logical level of the frame, wheel, and handle bar nodes is subassembly. The logical level of the screw, rim, tire, metal rod, and hand grip is part.

In the invention, the reason for using logical levels is to enable enhanced reporting and analysis functions, such as the reporting functions described herein that are organized according to BOM logical level. As discussed above, an advantage of predefined groups is that their structure and attributes are better defined and more extensive than user-defined groups. Accordingly, more extensive and more useful analysis and reporting functions can be developed for predefined groups.

Figure 23A:
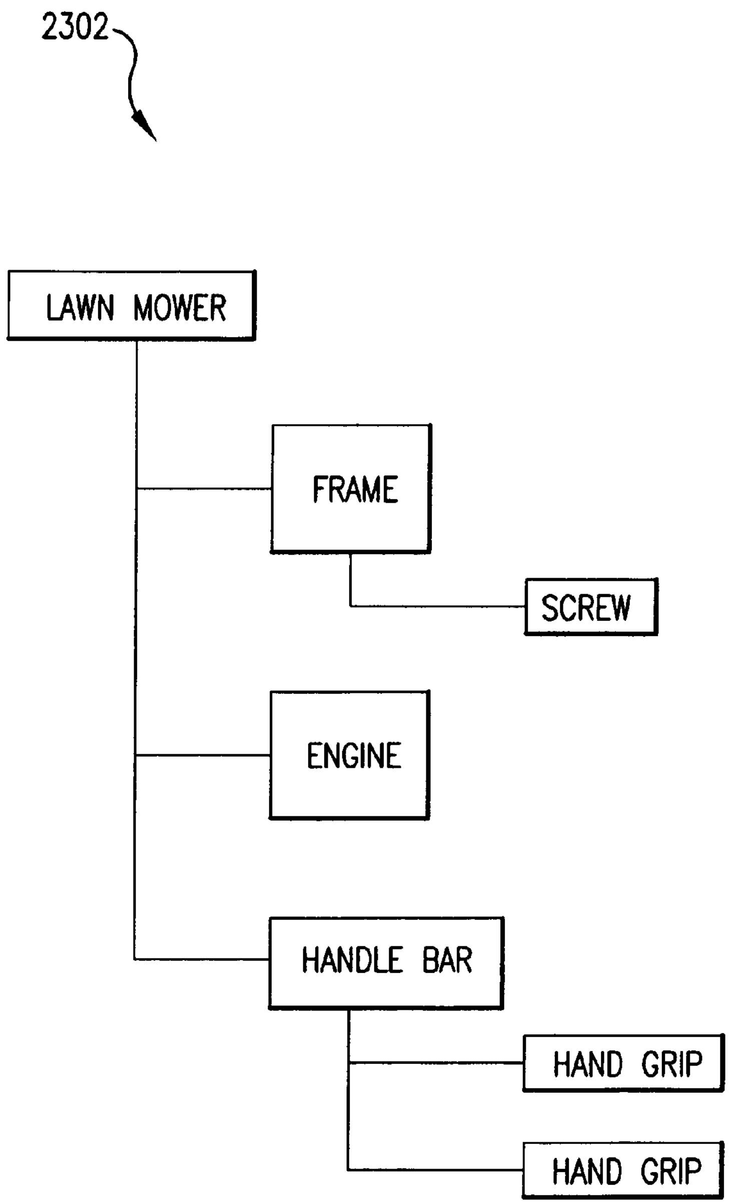

FIG. 23A illustrates an example BOM 2302 of a lawn mower. The lawn mower includes a frame, an engine, and a handlebar. These are all subassemblies (although for simplicity purposes the engine subassembly is not further defined in the BOM 2302 shown in FIG. 23A). The frame subassembly includes a screw. The handlebar subassembly includes two hand grips. The screw and the hand grips are parts. It is noted that the screw part in the bicycle BOM 2202 is the same physical part as the screw part in the lawnmower BOM 2302. Similarly, the hand grip part in the bicycle BOM 2202 is the same physical part as the handgrip part in the lawnmower BOM 2302. However, the frame subassembly in the bicycle BOM 2202 is not the same physical part as the frame subassembly in the lawnmower BOM 2302. Also, the handle bar subassemblies in the bicycle BOM 2202 and the lawnmower BOM 2302 are not the same.

Figure 23B:
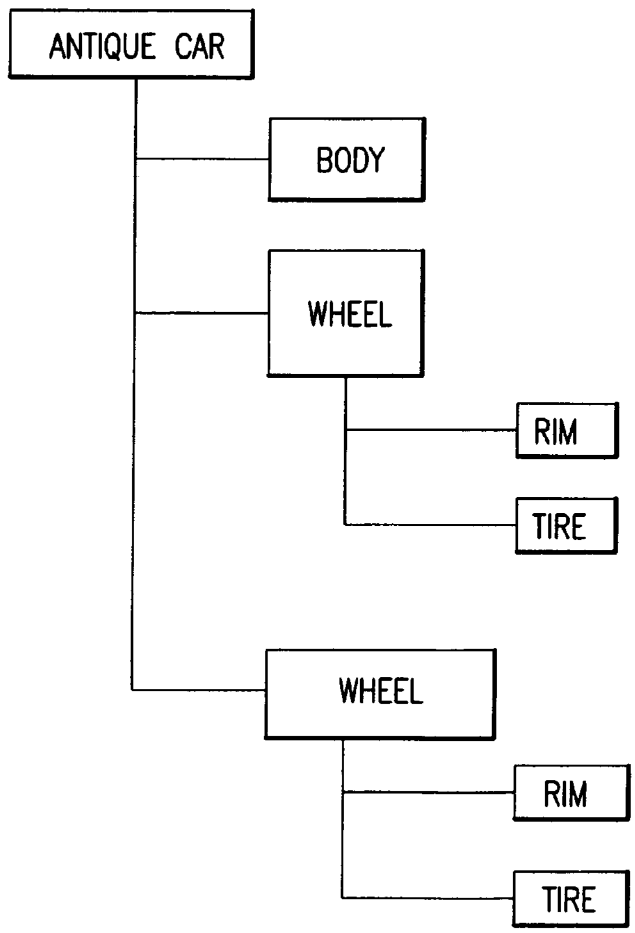
FIG. 23B, when considered in conjunction with FIG. 23A, illustrate the concept of shared groups.

FIG. 23B illustrates a portion of a BOM of an example antique car. This BOM includes a body subassembly, and two wheel subassemblies. In the present example, these wheel subassemblies are the same as the wheel subassemblies in FIG. 22. As discussed below, these wheel subassemblies are represented as a single BOM group in the BOM databases 626. Both the BOM group corresponding to the bicycle and the BOM group corresponding to the antique car include the wheel BOM group (that is, the wheel BOM group is a child group of the bicycle BOM group and the antique car BOM group). That is, the wheel BOM group is shared by the bicycle BOM group and the antique car BOM group. Accordingly, the wheel BOM group is herein called a shared group.

The BOM databases 626 are illustrated in FIG. 12G. A BOM table 1217 includes a record for each unique BOM node of each BOM of interest. Accordingly, each record in the BOM table 1217 represents a BOM node in a BOM of interest to the customer.

The BOM table 1217 includes entries for only unique BOM nodes of interest. Again referring to FIG. 22, the two wheel subassembly BOM nodes are not unique with respect to each other. Therefore, the BOM table 1217 only includes a single record for the wheel BOM node. Similarly, the screw node in the BOMs of FIGS. 22 and 23 represent the same physical part. Accordingly, the BOM table 1217 only includes one record for the screw part.

Each record in the BOM table 1217 includes a BOM_id attribute which stores a key that is unique to the associated BOM node. Each record of the BOM table 1217 also includes a BOM_guid representing an alternate key of the record, a name attribute storing a name of the BOM node, a level_id attribute representing the logical level of the BOM node (that is, whether the BOM node represents an assembly, a subassembly, apart, etc.), a status_id attribute representing the status of the BOM node in the customer's business (that is, whether the part, subassembly, or assembly represented by the BOM node is in production, is discontinued, is contemplated for a future product, etc.), a creation_date attribute identifying the date that the record was created, a modification_date attribute indicating the date that the BOM record was last modified, and a version_number attribute identifying the version of the BOM record.

The level_id attribute is actually a code. The values of the level_id codes are defined in a BOM_level table 1220. Similarly, the status_id attribute is a code whose values are defined in a BOM_status table 1221.

As evident by the examples of FIGS. 22 and 23, a BOM is a hierarchical and recursive structure, where each node in the structure may be a child of multiple parent nodes, and/or may itself have multiple child nodes. Information pertaining to this BOM hierarchical structure is not contained in the BOM table 1217. Instead, this information is contained in the BOM_BOM_xref table 1219.

The BOM_BOM_xref table 1219 includes a record for each parent/child relationship in the BOMs represented in the BOM table 1217. Each record of the BOM_BOM_xreftable 1219 includes a parent_BOM_id attribute and a BOM_id attribute. The parent_BOM_id attribute stores the BOM_id of the parent BOM node, and the BOM_id attribute stores the BOM_id of the child BOM node. Each record of the BOM_BOM_xref table 1219 also includes a sort_order attribute which specifies the order in which the records in the BOM_BOM_xref table 1219 should be displayed or printed, when an appropriate command is received from the user. The value of the sort_order attribute is set to a default value, which is preferably 100. The user may change this value to any other number, either below or above 100. When printing or displaying the records of the BOM_BOM_xref table 1219, such records are printed or displayed in ascending or descending order (as indicated in the user command) based on the sort_order attribute.

The BOM table 1217 and the BOM_BOM_xref table 1219 shall be further described by reference to examples shown in FIGS. 24-25. FIG. 24 includes an example BOM table 1217X and FIG. 25 illustrates an example BOM_BOM_xref table 1219X. These tables in FIGS. 24 and 25 store data corresponding to the example BOMs 2202 and 2302 shown in FIGS. 22 and 23, respectively. Accordingly, the example BOM table 1217X in FIG. 24 includes an entry for each BOM node in the bicycle BOM 2202 and the lawnmower BOM 2302. For simplicity purposes, only the BOM_id attribute and the name attribute are shown in the example BOM table 1217X. Accordingly, the BOM table 1217 includes an entry for the bicycle assembly, the bicycle frame subassembly, the screw part, the wheel subassembly, the rim part, the tire part, the bicycle handle bar subassembly, the metal rod part, the hand grip part, the lawnmower assembly, the lawnmower frame subassembly, the engine subassembly, and the lawnmower handle bar subassembly.

Information pertaining to the hierarchical structure of the bicycle BOM 2202 and the lawnmower 2302 is contained in an example BOM_BOM_xref table 1219X shown in FIG. 25. The BOM_BOM_xref table 1219X includes a record for each parent/child relationship in the BOM tables 2202 and 2302. Accordingly, record 2502 in the BOM_BOM_xref table 1219X indicates that BOM node 2 is a child of BOM node 1. In other words, record 2502 indicates that the bicycle frame node is a child of the bicycle node. Similarly, record 2504 indicates that the screw node is a child of the bicycle frame node, record 2506 indicates that the wheel node is a child of the bicycle node, record 2508 indicates that the rim node is a child of the wheel node, and record 2510 indicates that the tire node is a child of the wheel node. Further, record 2512 indicates that the bicycle handlebar node is a child of the bicycle node; record 2514 indicates that the metal rod node is a child of the bicycle handlebar node; record 2516 indicates that the handgrip node is a child of the bicycle handlebar node; record 2518 indicates that the lawnmower frame node is a child of the lawnmower node; record 2520 indicates that the screw node is a child of the lawnmower frame node; record 2522 indicates that the engine node is a child of the lawnmower node; record 2524 indicates that the lawnmower handle bar node is a child of the lawnmower node; and record 2526 indicates that the hand grip node is a child of the lawnmower handle bar node.

A BOM group represented in the BOM table 1217 may contain any number of documents. Preferably, the documents in a BOM group include patents that map to the BOM group. In other words, the documents in a BOM group include patents that map to the product represented by the BOM node corresponding to the BOM group in the BOM table 1217. As used herein, the term "product" refers to any assembly, subassembly, or part in a BOM.

A BOM_patent_xref table 1218 stores information that identifies the documents in a BOM group. The BOM_patent_xref table 1218 includes a record for each document in each BOM group. Each record of the BOM_patent_xref table 1218 includes a BOM_id attribute that identifies the BOM group, and a document_id attribute that identifies the document that is in that BOM group.

FIG. 26 illustrates an example BOM_patent_xref table 1218X that corresponds to the example in FIGS. 24 and 25. The example BOM_patent_xref table 1218X indicates that documents D1 and D2 are in the bicycle BOM group. Documents D1 and D2 are patents (see FIG. 17). Accordingly, the patents having document_ids D1 and D2 map to the BOM group having BOM_id 1 (that is, the bicycle assembly).

Figure 47:
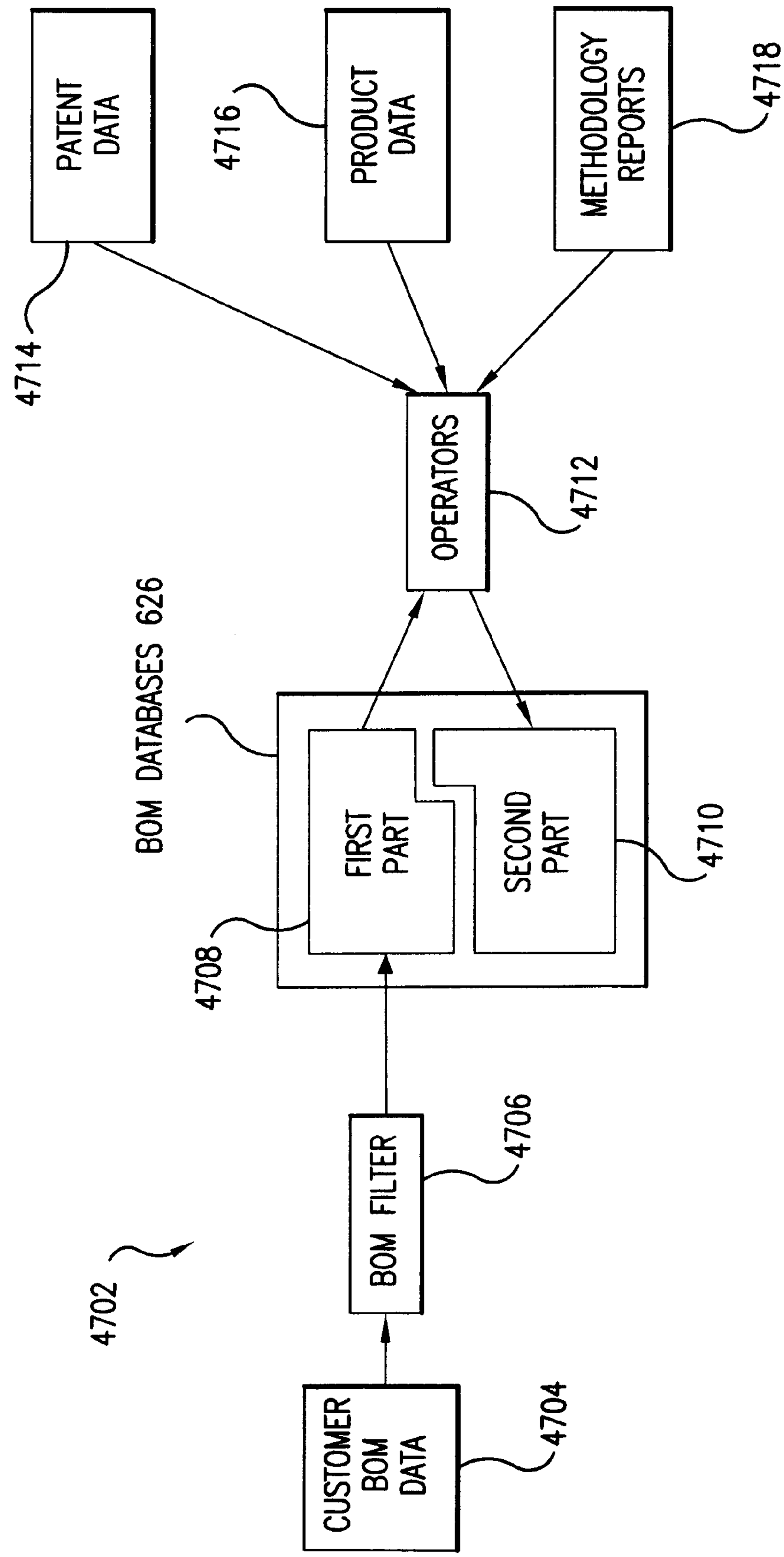
FIG. 47 is a dataflow diagram illustrating an exemplary extract and load process for the BOM databases.
Figure 97:
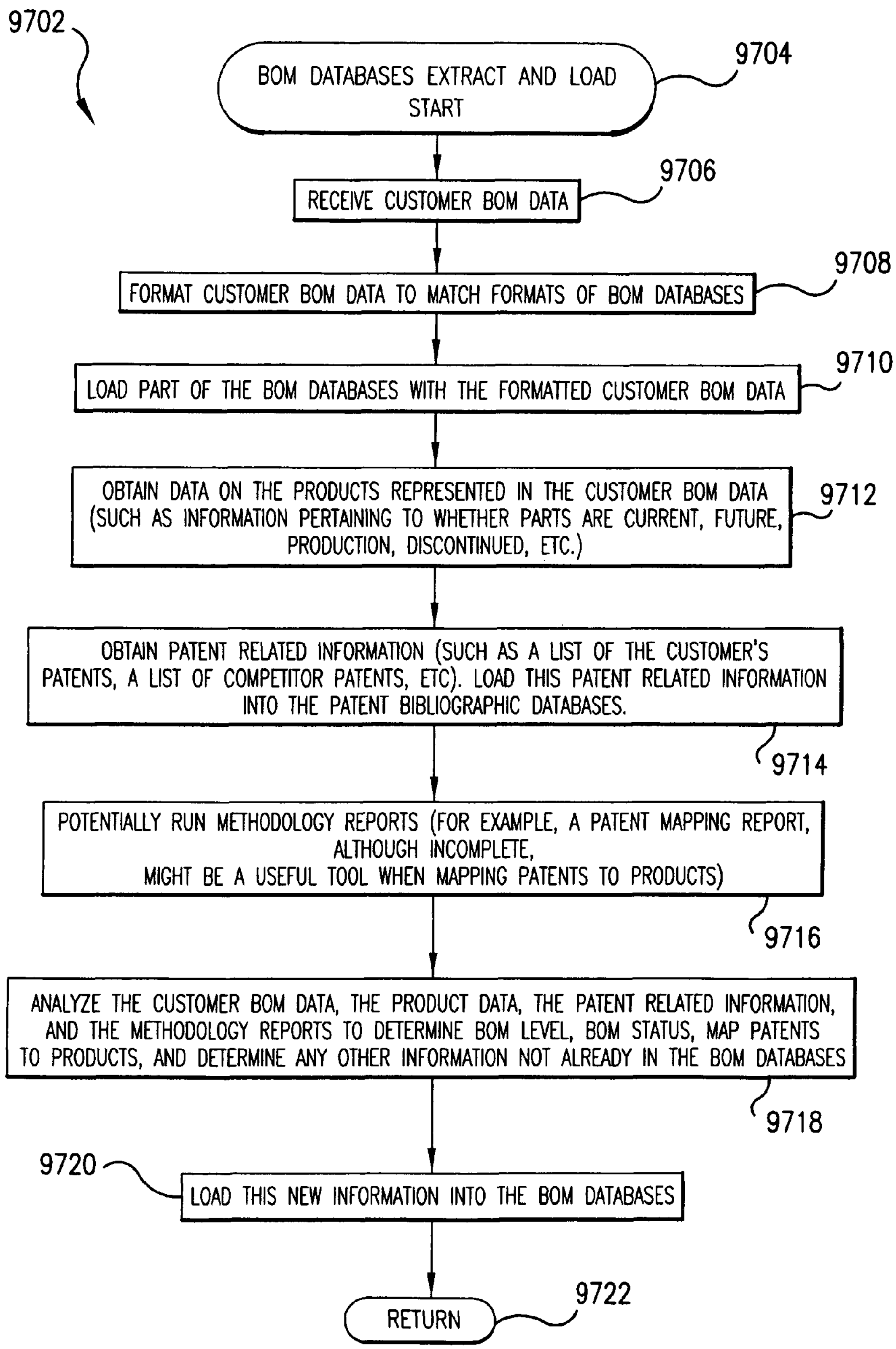
FIG. 97 is a flowchart of a extract and load process for the BOM databases.

The preferred methodology for initially loading the BOM databases 626 is represented by a data flow diagram in FIG. 47 and a corresponding flowchart 9702 in FIG. 97. In step 9706, customer BOM data is received. Typically, a customer will have his own database that stores BOM data. In preparation for performing step 9706, the customer exports the BOM data from his database into a computer file. This computer file is represented as the customer BOM data 4704 in FIG. 47.

In step 9708, a BOM filter 4706 formats the customer BOM data 4704 so as to conform with the format of the BOM databases 626. The formatting done by the BOM filter 4706 may be minor or extensive, depending on whether, during the extract of the BOM data from the customer's databases, the customer was able to format the extracted data (represented as the customer BOM data 4704) in a format that closely matched the format of the BOM databases 626. Database filters, such as the BOM filter 4706, for formatting data in preparation for upload to a database are well-known.

In some embodiments, the invention includes a filter that is specific to the database format of the BOM databases 626 (this is true for all filters discussed herein—that is, the filters are specific to their respective databases). The structure and operation of this specialized filter will be apparent to persons skilled in the relevant art(s) based on the discussion herein, particularly the discussion of the database formats.

In step 9710, the formatted customer BOM data 4704 is loaded into a portion of the BOM databases 626. This portion is indicated as the first part 4708 in FIG. 47. It is not possible to load the remaining parts of the BOM databases 626, indicated as the second part 4710, using only the customer BOM data 4704, since the customer BOM data 4704 probably does not include the data attributes represented by the second part 4710. For example, the customer BOM data 4704 probably does not contain BOM logical level information or status information required by attributes in the BOM table 1217. Additionally, the customer BOM data 4704 will not include the patent mapping information (that is, an identification of which patents/documents map to which BOM groups) required by the BOM_patent_xref table 1218.

In step 9712, data on the customer's products is obtained. This data is obtained from the customer, such as the customer's production department or R&D) department, and pertains to the status of the products (such as whether the products or parts are currently in production, whether they are contemplated for future production, whether they are discontinued, etc.).

In step 9714, patent related information is obtained. This patent related information may include, for example, a list of the customer's patents, and a list of competitor patents. Bibliographic information on these patents are loaded into the patent bibliographic databases 604 in the manner described above, to the extent that the patent bibliographic databases 604 do not already include patent bibliographic information on these patents.

In step 9716, operators 4712 may run methodology reports which will be later used to aid in the analysis of the data gathered in prior steps. The methodology reports which may be run include a patent mapping report (described below). The patent mapping report may be incomplete due to the lack of information in the BOM databases 626. However, even an incomplete patent mapping report may be useful to aid in the analysis of the data.

In step 9718, operators 4712 analyze the customer BOM data 4704, the product data 4716, and the patent related information 4714 to determine, for each BOM group, the BOM level, the BOM status, and the documents (that is, patents) that map to the BOM groups. For example, the operators 4712 will analyze the BOM data and the product data to determine the status (that is, whether discontinued, in production, contemplated for future production, etc.) of the BOM node associated with each BOM group. Additionally, the operators 4712 will analyze the customer BOM data 4704 and the patent related information to identify patents which map to the BOM group (that is, patents which map to the products represented by the BOM nodes corresponding to the BOM groups).

In step 9720, the information generated in step 9718 is loaded into the appropriate attribute fields of the BOM databases 626 (i.e., the second part 4710 of the BOM databases 626).

The steps of flowchart 9702 are periodically performed to update the BOM databases 626 with changes in BOMs, patents that map to BOMs, production changes, new products and features, etc.

In an alternate embodiment, the BOM databases 626 are not preloaded in the manner shown in FIG. 47 and discussed with reference to FIG. 97. Instead, referring to FIG. 48, BOM data is downloaded from a corporate BOM database 4808 via a corporate BOM database management system 4806 to the enterprise server 314 when needed. A translator 4804 translates the customer BOM data from the format of the corporate BOM database 4808 to the required format of the BOM databases 626 in the enterprise server 314.

It is noted that this alternative embodiment could also be used with the other tables of the databases 316.

Figure 48:
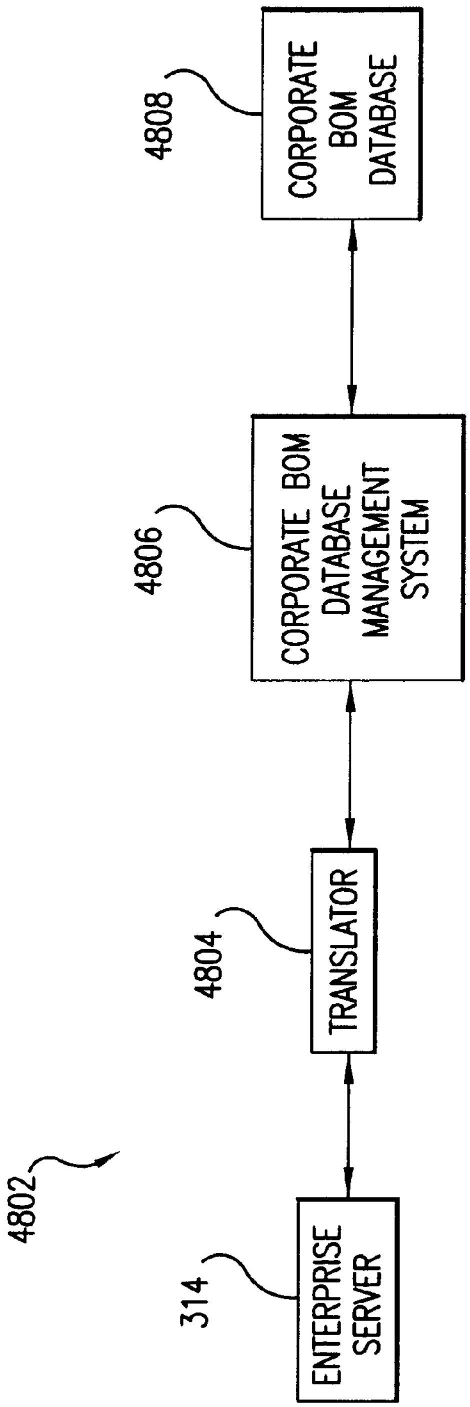
FIG. 48 illustrates an alternative process for obtaining corporate BOM data.

The approach of FIG. 48 is advantageous because the enterprise server 314 is assured of receiving and, accordingly, processing the most up to date BOM data. The disadvantage of the approach in FIG. 48 is that, typically, analysis of a customer corporation takes a number of weeks. During that period of analysis, the BOM data should be stable. In other words, during the period of analysis, the analysis should be conducted on a snapshot of the customer's BOM data. The approach illustrated in FIG. 48 would not lend this stability, since the corporate BOM database 4808 will no doubt change during the course of the analysis period. Accordingly, the enterprise server 314 when downloading BOM data from the corporate BOM database 4808 will be working with different versions of the BOM data at different times. In contrast, the approach of FIGS. 47 and 97 provide the desired stability of the BOM data during the analysis period.

BOM groups (and, in fact, any predefined group) can also be represented using user-defined groups as long as the operator is willing to abstract and map the BOM group attributes to the attributes supported by the user-defined groups. Such definition of BOM groups may be useful with BOMs that change frequently but core technologies change slowly, as in consumer products.

Corporate Entity Databases

A corporate entity is considered to be a predefined group because any number of documents can be associated with the corporate entity. These documents are preferably relevant and of interest to the corporate entity. For example, the documents could be patents that are owned, licensed, or otherwise of interest to the corporate entity.

The corporate entity databases 630 include information on the customer corporation, the corporations associated or affiliated with the customer corporation, and/or corporations that are otherwise of interest to the customer corporation, such as the customer corporation's competitors or potential competitors.

Figure 12J:
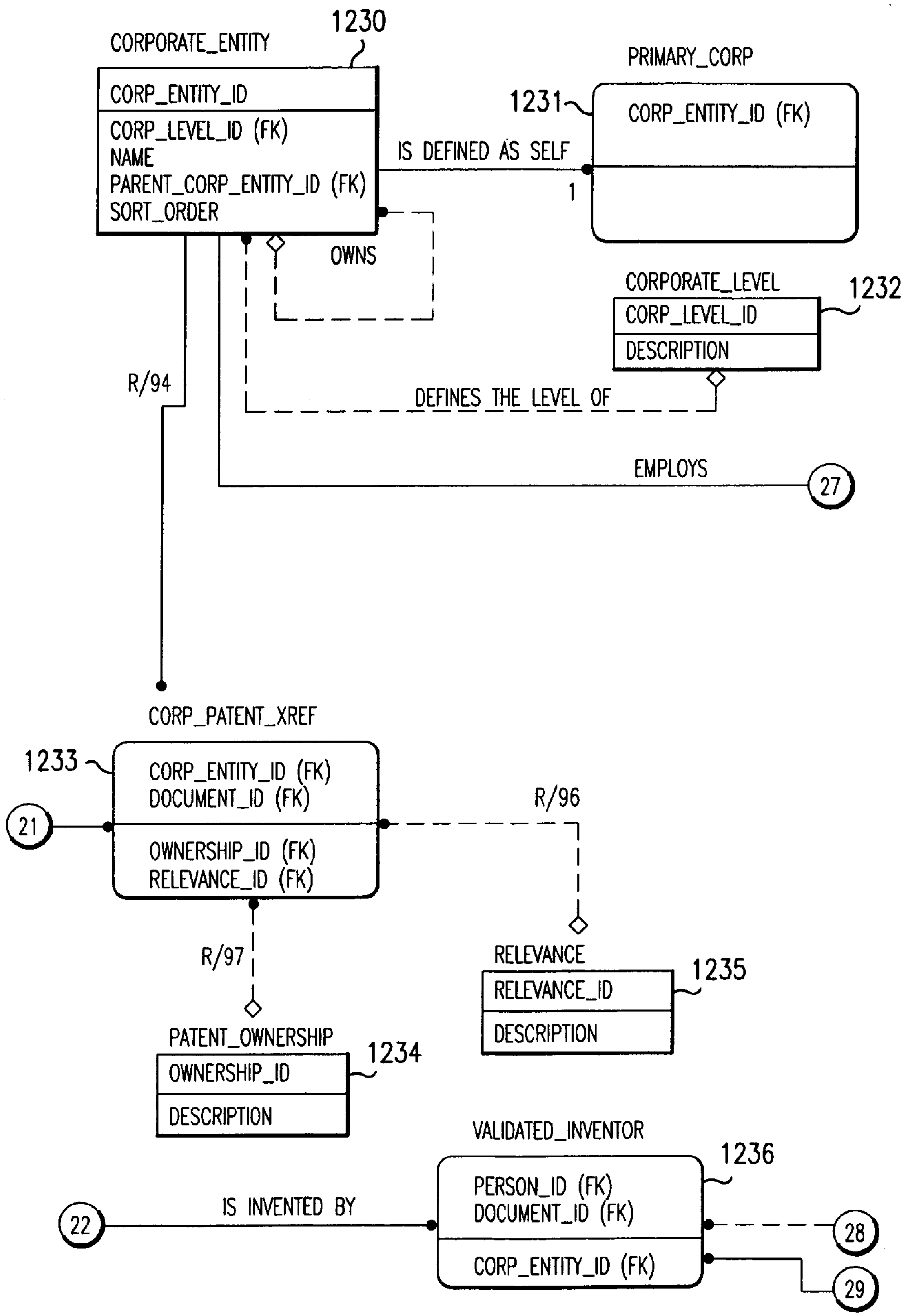

The corporate entity databases 630 are shown in FIG. 12J. A corporate_entity table 1230 includes a record for each corporate entity of interest. In each record of the corporate_entity table 1230 includes a corp_entity_id attribute that stores a key that is unique to the corporate entity. Each record of the corporate_entity database 1230 also includes a corp_level_id attribute that specifies the level of the corporate entity in its respective corporate structure (it is noted that data pertaining to one or many corporate structures may be stored in the corporate_entity table 1230). Possible values of the corp_level_id attribute include parent corporation, subsidiary corporation, franchise, headquarters, etc. A name attribute stores the name of the corporate entity.

Information on the corporate structure is also stored in the corporate_entity table 1230. In particular, each entry of the corporate_entity table 1230 includes a parent_corp_entity_id attribute. This attribute stores the corp_entity_id of the immediate parent corporation of the corporate entity.

A sort_order attribute stores information that identifies the order in which the records of the corporate entity database 1230 should be displayed or printed when requested by the user. The sort_order attribute is set to a default value of preferably 100. The user can change this value of the sort_order attribute. The records of the corporate_entity table 1230 are displayed and printed according to the sort_order attribute in the records. In particular, the records of the corporate_entity table 1230 are displayed or printed in ascending or descending order (specified by the user) of the sort_order attributes in the records.

The corp_level_id attribute is implemented as a code whose values are defined in a corporate_level database 1232.

A primary_corp database 1231 stores the corp_entity_id of the customer corporation. This primary_corp table 1231 is referenced when the enterprise server 314 needs to identify who the customer is during analysis operations. For example, if the user requests a listing of all patents owned by the customer corporation, the enterprise server 314 refers to the primary_corp table 1231 to identify who the customer is, and then refers to the corp_patents_xref table 1233 (described below) to identify all patents owned by the corporate customer.

A corporate entity group represented in the corporate_entity table 1230 can include any number of documents, such as any number of patents. Typically, the patents in a corporate entity group represent patents for which the corporate entity has some interest, such as patents owned by the corporate entity, patents assigned to the corporate entity, or patents that, for whatever reason, the corporate entity is analyzing. A corp_patent_xref table 1233 stores information that identifies the documents contained in each corporate entity group. The corp_patent_xref table 1233 includes a record for each document in each corporate entity group.

Each record of the corp_patent_xref table 1233 includes a corp_entity_id attribute that identifies the corporate entity group, and a document_id attribute that identifies the document that is in the corporate entity group.

Each record of the corp_patent_xref table 1233 also includes an ownership_id attribute and a relevance_id attribute. The ownership_attribute identifies the relationship of the document to the corporate entity. Possible values of the ownership_id attribute include owned, assigned, interested in, etc. The ownership_id attribute is implemented as a code whose values are defined by a patent_ownership table 1234, and are ultimately under the control of (i.e., defined by) the customer.

The relevance_id attribute identifies the relevance of the document to the corporate entity. Preferably, the possible values of the relevant_id attribute are core and non-core. A relevance of core indicates that the patent (identified by the document_id) maps to an assembly, subassembly or part that is currently in production, or that is contemplated for future production, or for some other reason is important to the corporate entity. As discussed above, such assemblies, subassemblies and parts are represented in the BOM table 1217 as BOM groups. A non-core relevancy value indicates that the patent either does not map to any assembly, subassembly or part of interest or that the patent maps to an assembly, subassembly, or part that is currently discontinued, or that, for whatever reason the corporate entity does not have great interest in the patent. The relevance_id attribute is implemented as a code whose values are specified in a relevance table 1235, and are ultimately under the control of (i.e., defined by) the customer.

The corporate entity databases 630 shall be further described with reference to an example in FIGS. 33-36. These figures correspond to an example corporate structure 3202 illustrated in FIG. 32, wherein corp1 has two child corporations, corp2 and corp3, and corp3 has a child corporation, corp4. Corp5 is a competitor of Corp1.

FIG. 33 illustrates an example corporate_entity_table 1230X. For simplicity purposes, only the corp_entity_id attribute, the corp_level_id attribute, and the parent_corp_entity_id attribute are shown in FIG. 33. The corporate_entity table 1230X has a record for each corporate entity of interest (that is, the corporate entities shown in FIG. 32). Each of these records in the corporate_entity table 1230X represents a corporate entity group that may contain any number of documents. Record 3304 in the corporate_entity table 1230X indicates that corp2 is a subsidiary of corp1. Similarly, record 3306 indicates that corp3 is a subsidiary of corp 1, and record 3308 indicates that corp4 is a subsidiary of corp3.

Figure 32:
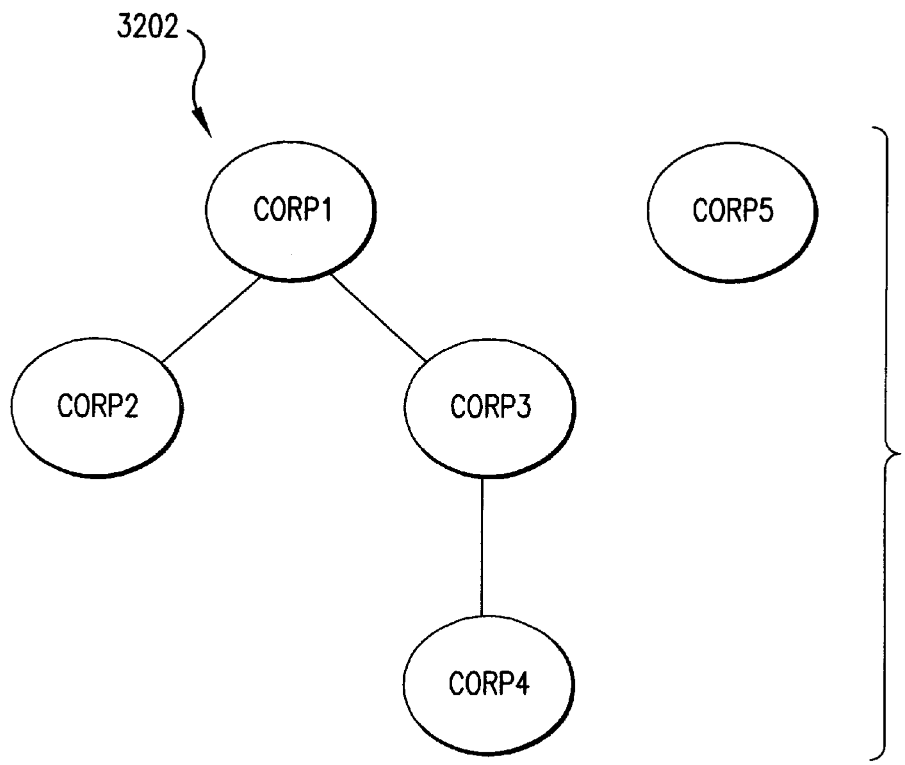
FIG. 32 illustrates an example corporate organizational structure.

Note that corp5 in FIG. 32 is not a part of the corporate structure that includes corp1, corp2, corp3 and corp4. In the example of FIG. 32, corp5 is a competitor of corp1.

The corporate_entity table 1230X also includes a record 3310 for corp 5. As indicated above, corp5 is a competitor of the customer corporation corp1. Therefore, the example of FIG. 33 indicates that the corporate_entity table 1230X includes a record for each corporate entity of interest including the competitors of the customer corporation corp1.

FIG. 36 illustrates an example corp_patent_xref table 1233X. This table indicates that the corp1 group includes documents D1, D2, and D3. These are patent documents (see FIG. 17). The ownership_id attribute and the relevance_id attribute are defined in the example patent_ownership table 1234X in FIG. 35 and in the example relevance table 1235X in FIG. 34, respectively. Pursuant to these tables, document D1 is indicated as being owned by corp1 and being a core patent. Similarly, documents D2 and D3 are indicated as being owned by corp1 and being core patents.

Figure 100:
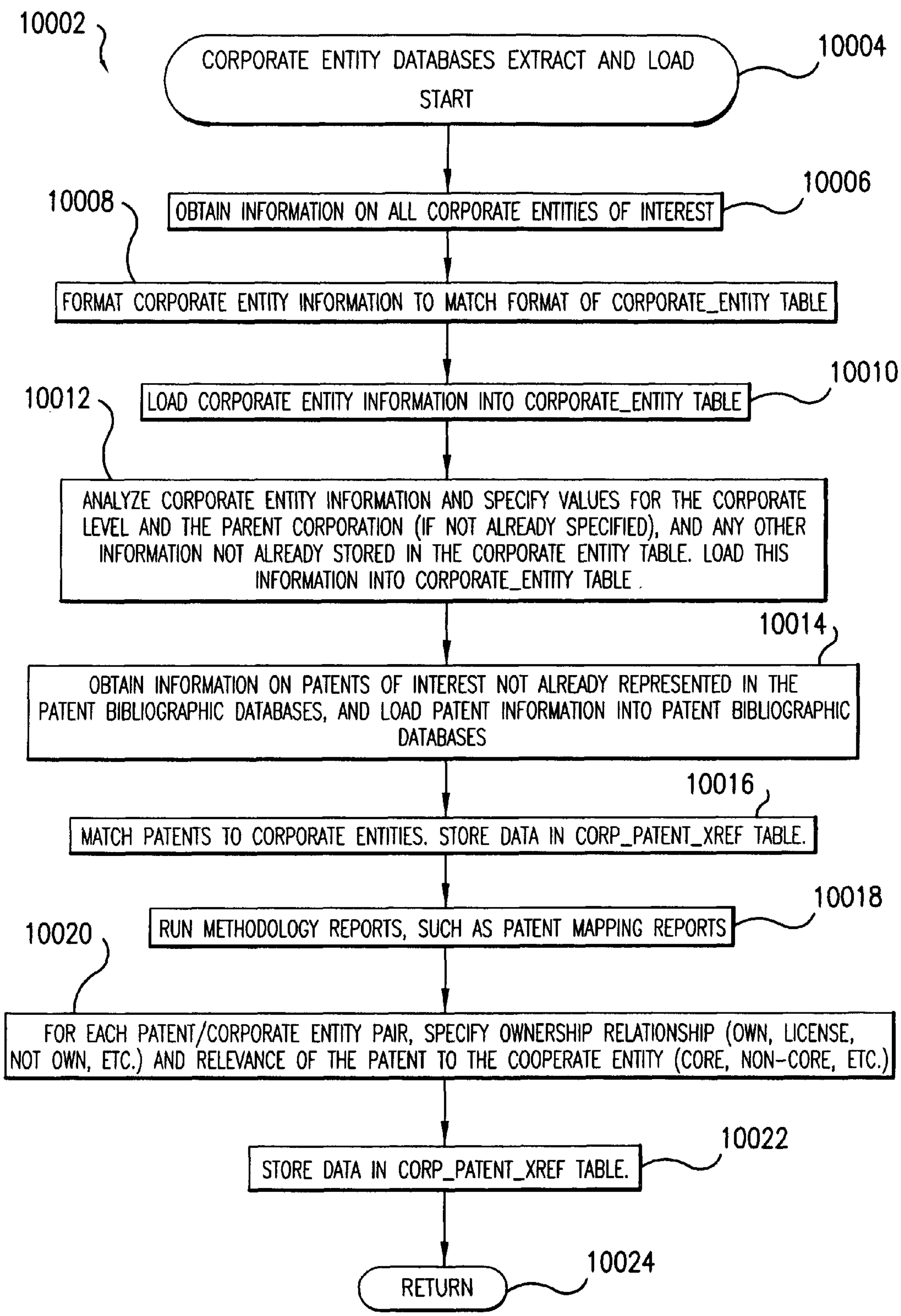
FIG. 100 is an extract and load flowchart for the corporate entity databases.

The methodology for initially loading the corporate entity databases 630 shall now be described with reference to the data flow diagrams in FIGS. 51 and 52 and the flowchart 10002 in FIG. 100. In step 10006, information on all corporate entities of interest is obtained. Such information includes compiling a list of the corporate entities of interest, determining their names, and determining their respective corporate structures. This information is represented in FIG. 51 as corporate entity data 5104.

In step 10008, a corporate entity filter 5106 formats the corporate entity data 5104 to conform to the format of the corporate_entity table 1230. Database filters for formatting data prior to upload to a database are well known.

Figure 51:
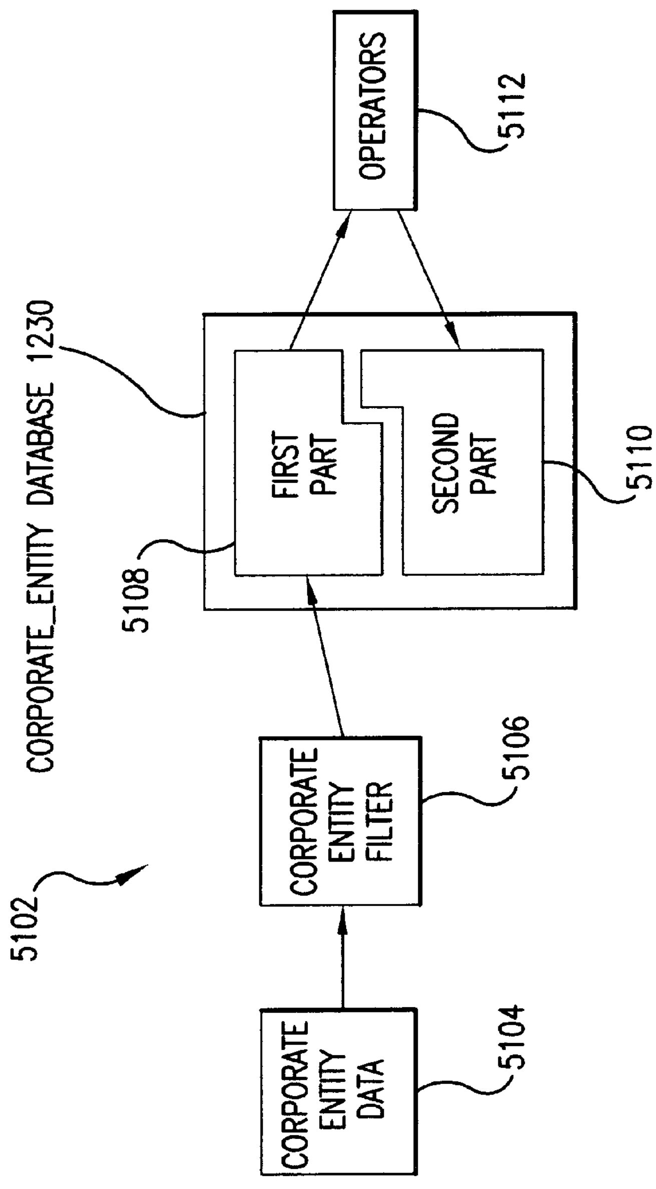
FIG. 51 is a dataflow diagram illustrating an exemplary process for extract and load of the corporate entity databases.

In step 10010, the formatted corporate entity data 5104 is loaded into a part of the corporate_entity table 1230 (this portion is indicated as the first part 5108 in FIG. 51). It is possible that the corporate entity data 5104 may include all the data necessary to load all of the fields of the corporate_entity database 1230. In this case, the formatted corporate entity data 5104 is also loaded into the second part 5110 of the corporate_entity database 1230. In other cases, however, the corporate entity data 5104 will not include all of the information necessary to load all of the fields of the corporate_entity table 1230, such as the parent_corp_entity_id attribute. In such cases, in step 10012, an operator 5112 analyzes the corporate entity data 5104 and determines values for the corp_level_id attribute and the parent_corp_entity_id attribute, when necessary. This information is loaded into the remaining portion of the corporate_entity table 1230 (this remaining portion is identified in FIG. 51 as the second part 5110).

In step 10014, information on patents of interest which are not already represented in the patent bibliographic databases 604 is obtained. This information is loaded into the patent bibliographic databases 604 in the manner discussed above to the extent that it is not already represented in the patent bibliographic databases 604.

Figure 52:
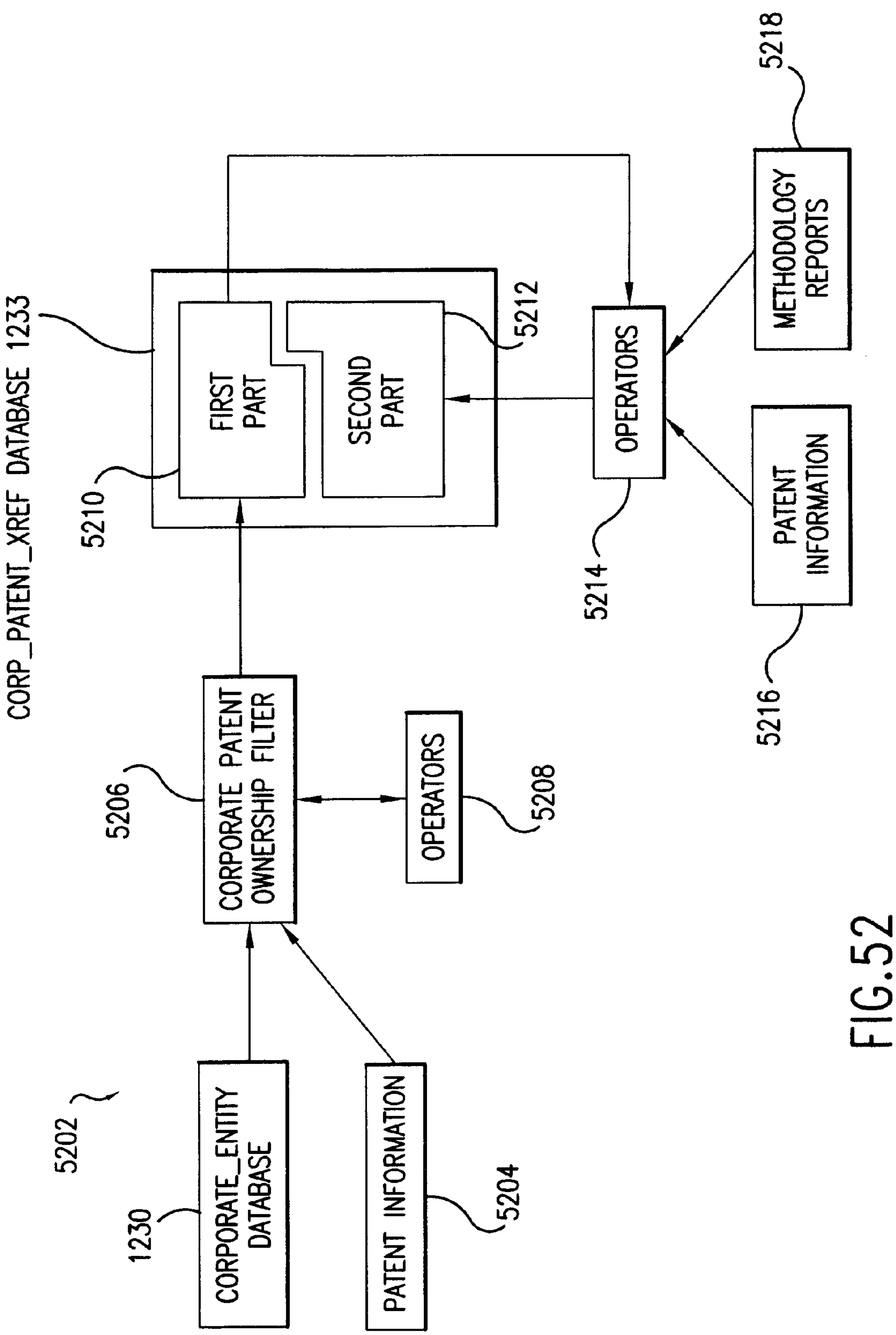
FIG. 52 is a dataflow diagram illustrating an exemplary process for extract and load of other corporate entity databases.

Referring to FIG. 52, this patent information that is of interest to the corporate entities represented in the corporate_entity table 1230 is represented as patent information 5204.

In step 10016, operators 5208 map patents to corporate entities. In particular, these operators 5208 determine which patents are relevant to which corporate entities. This data is stored in the corporate_patent_xref table 1233. In other words, the operators 5208 determine which patents go into which corporate entity groups, and store this information in the corp_patent_xref table 233.

In step 10018, the operators 5208 and 5214 run methodology reports, as needed, such as patent mapping reports. These reports will aid the operators 5208 and 5214 in performing the analysis of 10020.

In step 10020, the operators 5208 and 5214 identify the ownership relationship for each patent/corporate entity pair specified in the corp_patent_xref table 1233. In other words, for each record in the corp_patent_xref table 1233, the operators 5208 and 5214 identify the ownership relationship between the corporate entity and the patent. Additionally in step 10020, the operators 5208 and 5214 identify, for each record of the corp_patent_xref table 1233, the relevance of the patent to the corporate entity. Relevance can be core, non-core, etc.

In step 10022, this additional data generated in step 10020 is stored in the appropriate fields of the corp_patent_xref table 1233. These fields are presented by the second part 5212 in FIG. 52.

The steps of flowchart 10002 are periodically performed to update the corporate entity databases 630 to reflect changes in corporate structure, corporate acquisitions, corporate acquisition of patents, product line changes (that may change the relevance_id attribute), patent expirations (that would change the ownership_id attribute), etc.

Inventor, Employee, and Person Databases

An inventor is a predefined group because any number of patents can be associated with the inventor (i.e., patents where the person has been named an inventor). The inventorship databases 628 of the present invention preferably include information on the customer's past and present employee inventors, inventors of other companies, such as competitors, and inventors of any other patents of interest to the customer.

The inventor databases 628 are shown in FIG. 12J. These inventorship databases 628 interact with the person databases 632 and the employee 634. The person and employee databases 632 and 634 are shown in FIGS. 12J and 12L.

In particular, the person table 1242 represents the person databases 632. The person table 1242 includes a record of each person of interest to the customer. These persons could be past and present employees of the customer, inventors of patents of interest to the customer, employees (past and present) of competitors, etc. Each record of the person table 1242 includes a person_id attribute that represents a unique key of the person. Also included in each record of the person_id table 1242 are attributes that store the first name, middle name, and last name of the person, and the preferred suffix (Mr., Mrs., Ms., Dr., etc.) of the person.

An employee table 1243 is a table in the employee databases 634. The employee table 1243 includes a record of each employee of interest (whether or not the employee is an employee of the customer or a competitor, or is a past or present employee). Each record of the employee database 1243 includes a person_id attribute that identifies the person (from the person table 1242), and a corporate_entity_id attribute that identifies the corporate entity who is related to the person_id. There could be multiple entries in the employee table 1243 for the same person, if the person worked for many corporate entities represented in the databases 316.

Each record of the employee table 1243 further includes a job_function_id attribute that identifies the job function of the employee (for example, engineer, attorney, computer programmer, etc.), an employee_type_id that identifies the type of employee (such as part-time, full-time, etc.), an employee_status_id attribute that identifies the status of the employee (active, inactive, etc.), a start_date attribute and an end_date attribute that identify the period that the employee was employed by the corporate entity, and an employee_id attribute that indicates the employee's identification number within the corporate entity. The job_function_id attribute, the employee_type_id, and the employee_status_id attribute are preferably implemented as codes whose values are defined in an employee_job_func table 1245, an employee_type table 1244, and an employee_status table 1246, respectively.

Referring to FIG. 12J, a validated_inventor table 1236 represents the inventor databases 628. The validated_inventor table 1236 stores information that identifies the patents to which a person is a named inventor. In particular, the validated_inventor table 1236 includes a record for each patent for which a person or employee is an inventor. Each record of the validated_inventor table 1236 includes a person_id attribute that identifies a person, and a document_id attribute that identifies a patent with which the person is a named inventor. Each record of the validated_inventor table 1236 also includes a corp_entity_id attribute that identifies a corporate entity. This corporate entity is the corporate entity that the person was associated with when the patent was filed or issued, or the corporate entity with whom the person was employed when the invention of the patent was invented. If the person was not employed by or associated with a company, this field is left empty.

The inventor databases 628, person databases 632, and employee databases 634 will now further be described with reference to the example shown in FIGS. 37-39. FIG. 37 illustrates an example person table 1242X. For simplicity purposes, only the person_id attribute is shown. As indicated by FIG. 37, there are five persons of interest to the customer.

FIG. 38 illustrates an example employee table 1243X. For simplicity purposes, only the person_id attribute, the corporate_entity_id attribute, and the employee_status_id attribute are shown. As indicated by the example in FIG. 38, person1 is an active employee of corp1. Similarly, person2 is an active employee of corp2, person4 is an inactive employee corp1 and person5 is an inactive employee of corp3.

FIG. 39 illustrates an example validated_inventor table 1236X. For simplicity purposes, only the person_id attribute and the document_id attribute are shown in FIG. 39. As evident from FIG. 39, person1 is a named inventor in the patents having document_ids D1-D3. Person3 is a named inventor in the patents patents having document_ids D1, D4, and D5. Person5 is a named inventor in the patent having document_id D6.

Figure 49:
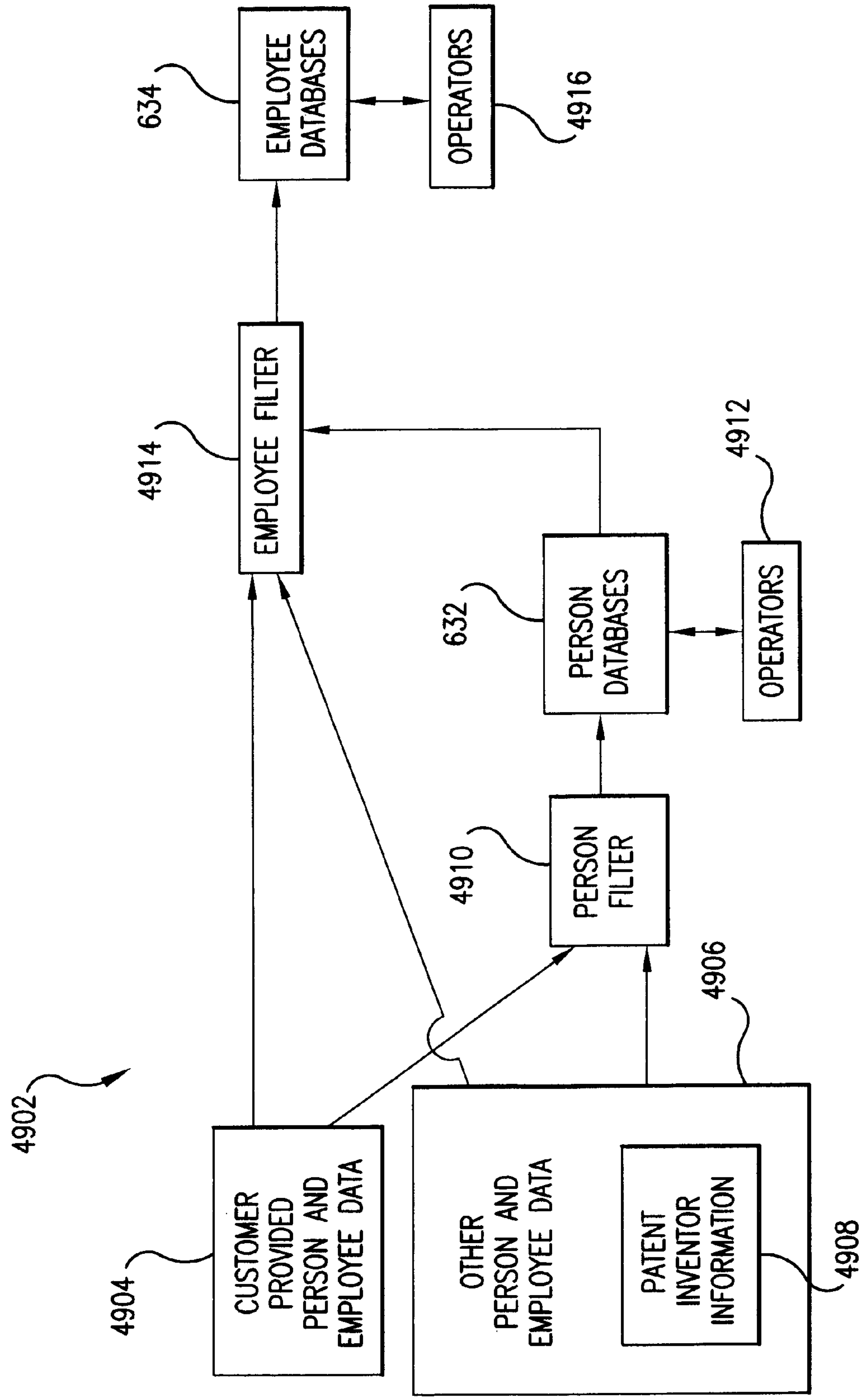
FIG. 49 is a dataflow diagram representing an exemplary process for extract and load of the person databases and the employee databases.
Figure 98:
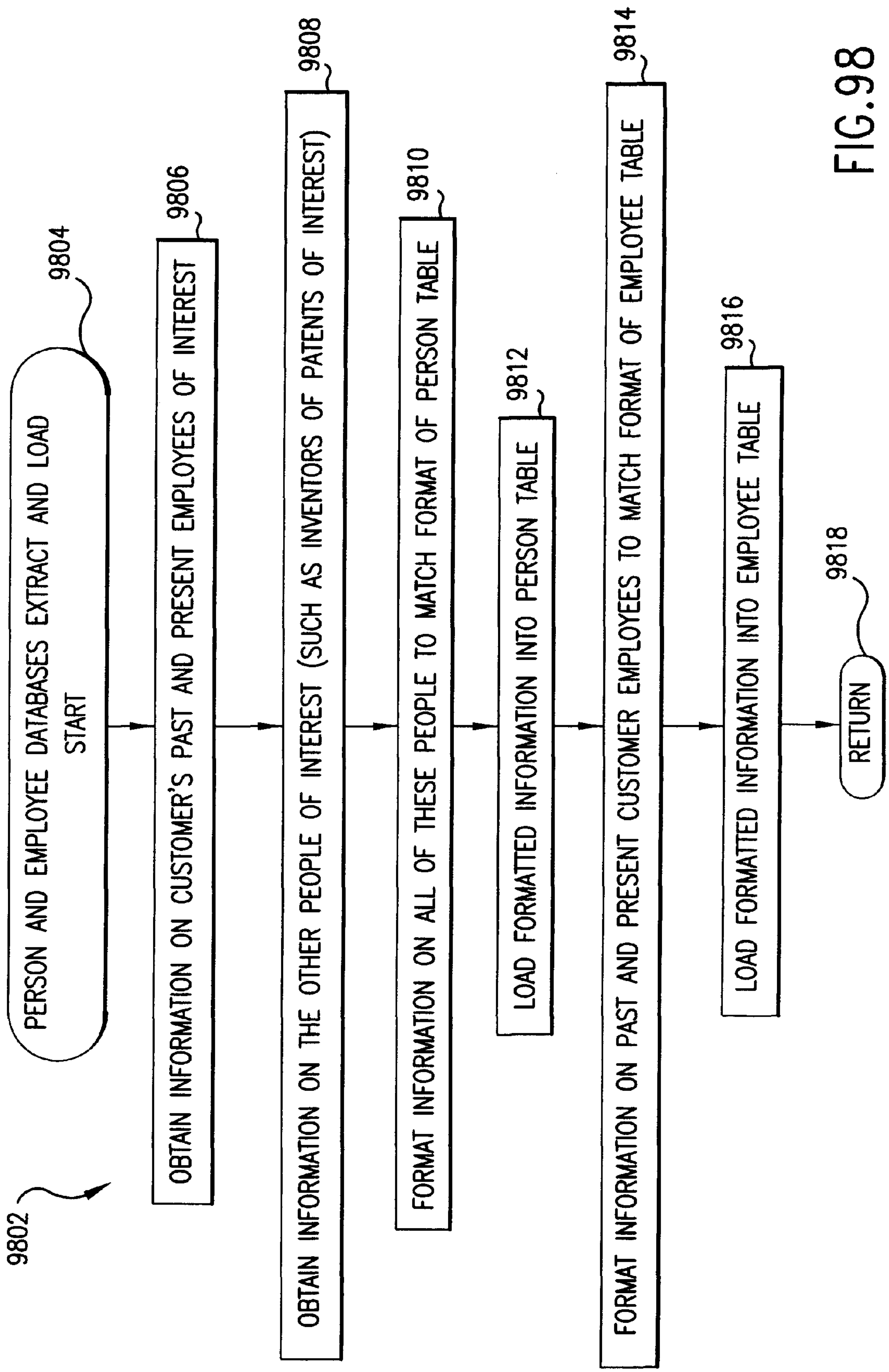
FIG. 98 is a flowchart of a extract and load process for an employee databases.

The preferred methodology for initially loading the person databases 632, the employee databases 634, and the inventor databases 628 shall now be described with reference to the data flow diagrams in FIGS. 49 and 50, and the flowcharts in FIGS. 98 and 99. FIGS. 49 and 98 corresponds to the extract and load procedures for the person databases 632 and the employee databases 634. In step 9806, information on the customer's past and present employees of interest are obtained, preferably from the customer's HR (Human Resources) or personnel department. This data is represented in FIG. 49 as the customer provided person and employee data 4904.

In step 9808, information on other people of interest (such as inventors of patents of interest or employees of competitors) is obtained. Such information is represented in FIG. 49 as other person and employee data 4906.

In step 9810, a person filter 4910 modifies the format of the customer provided person and employee data 4904 and the other person and employee data 4906 to match the format of the person databases 632 (that is, the person table 1242). Database filters for formatting data in preparation for database uploading are well-known.

In step 9812, the formatted customer provided person and employee data 4904 and the formatted other person and employee data 4906 are loaded into the person databases 632 (that is, the person table 1242).

In step 9814, an employee filter 4914 formats the customer provided person and employee data 4904 and the other person and employee data 4906 to match the format of the employee databases 634.

In step 9816, the formatted customer provided person and employee data 4904 and the formatted other person and employee data 4906 are loaded into the employee databases 634.

It is noted that in some cases, depending on the state of the data 4904, 4906, loading of the person databases 632 and the employee databases 634 may require the involvement of operators 4912, 4916.

Figure 50:
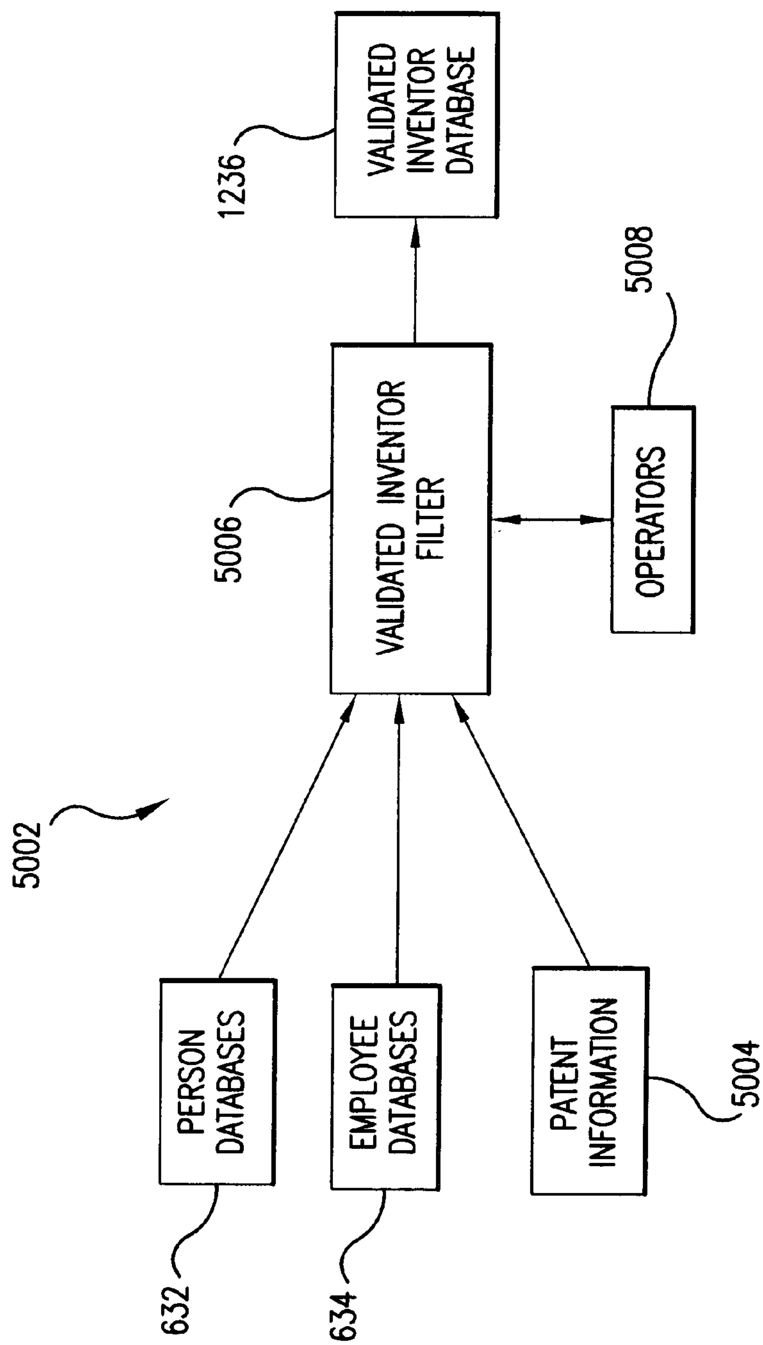
FIG. 50 is a dataflow diagram illustrating an exemplary process for extract and load of the validated inventor table.
Figure 99:
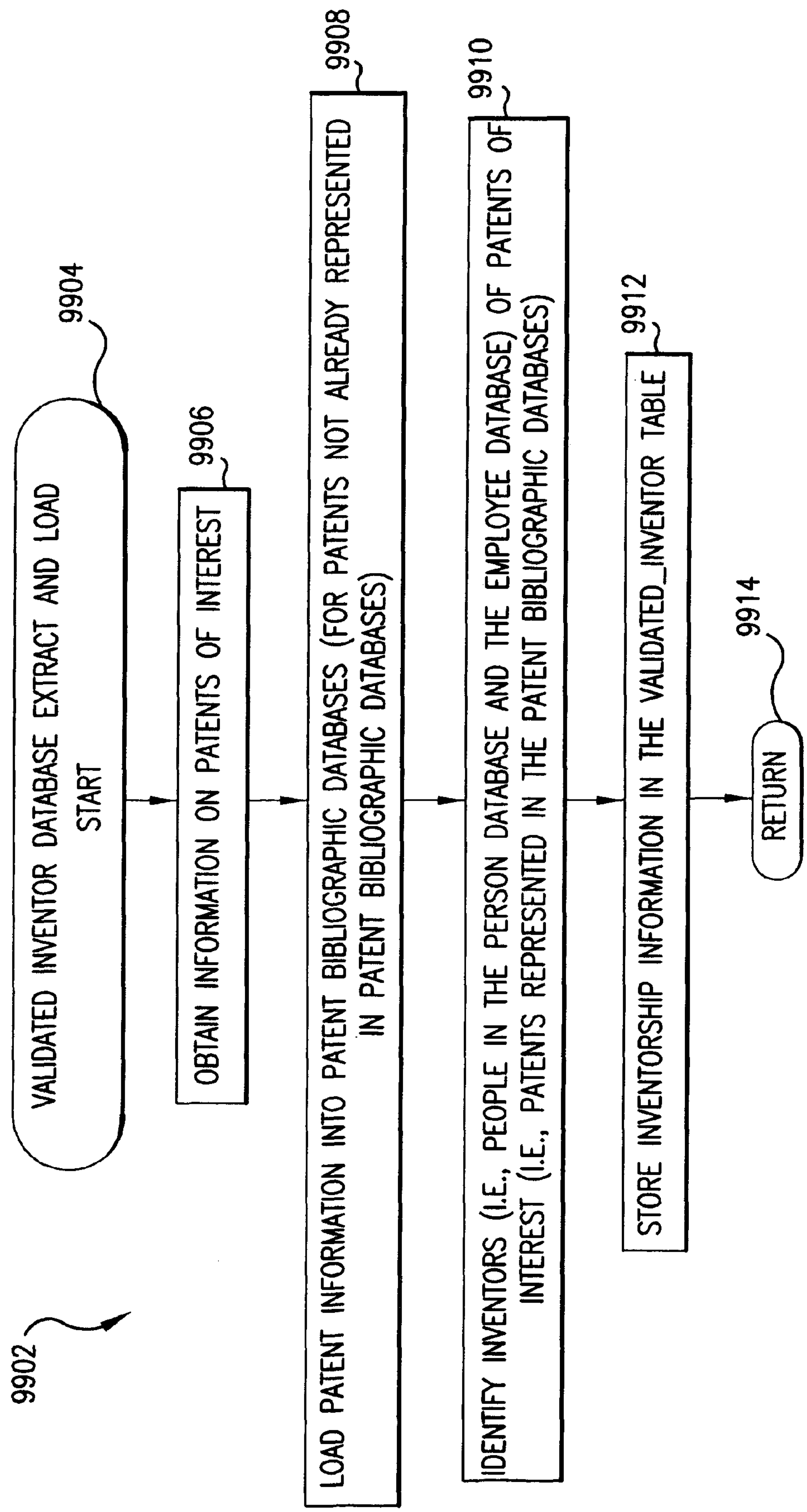
FIG. 99 is a flowchart of a extract and load process for the validated inventor databases.

FIGS. 50 and 99 pertain to the loading of the inventor databases 628 (that is, the validated_inventor database 1236). In step 9906, information is obtained on the patents of interest to the customer. Such patents of interest include the customer's own patents and patents of competitors.

In step 9908, bibliographic information on the patents obtained in step 9906 is loaded into the patent bibliographic databases 604 to the extent that such information is not already stored in the patent bibliographic databases 604.

In step 9910, operators 5008 analyze the patent information 5004 in conjunction with the person databases 632 and the employee databases 634 to map the patents obtained in step 9906 to the persons represented in the person databases 632 and in the employee databases 634. In other words, in step 9910, the operators 5008 identify, for each person represented in the person databases 632 and in the employee databases 634, the patents where that person is a named inventor.

In step 9912, the information generated in step 9910 is modified by a validated inventor filter 5006 to place the information in a form conforming with the format of the validated_inventor table 1236. Such formatted information is then loaded into the validated_inventor table 1236.

The steps of flowcharts 9802 in FIGS. 98 and 9902 in FIG. 99 are periodically repeated to update the inventor databases 628, the person databases 632, and the employee databases 634.

Financial Databases

Figure 12K:
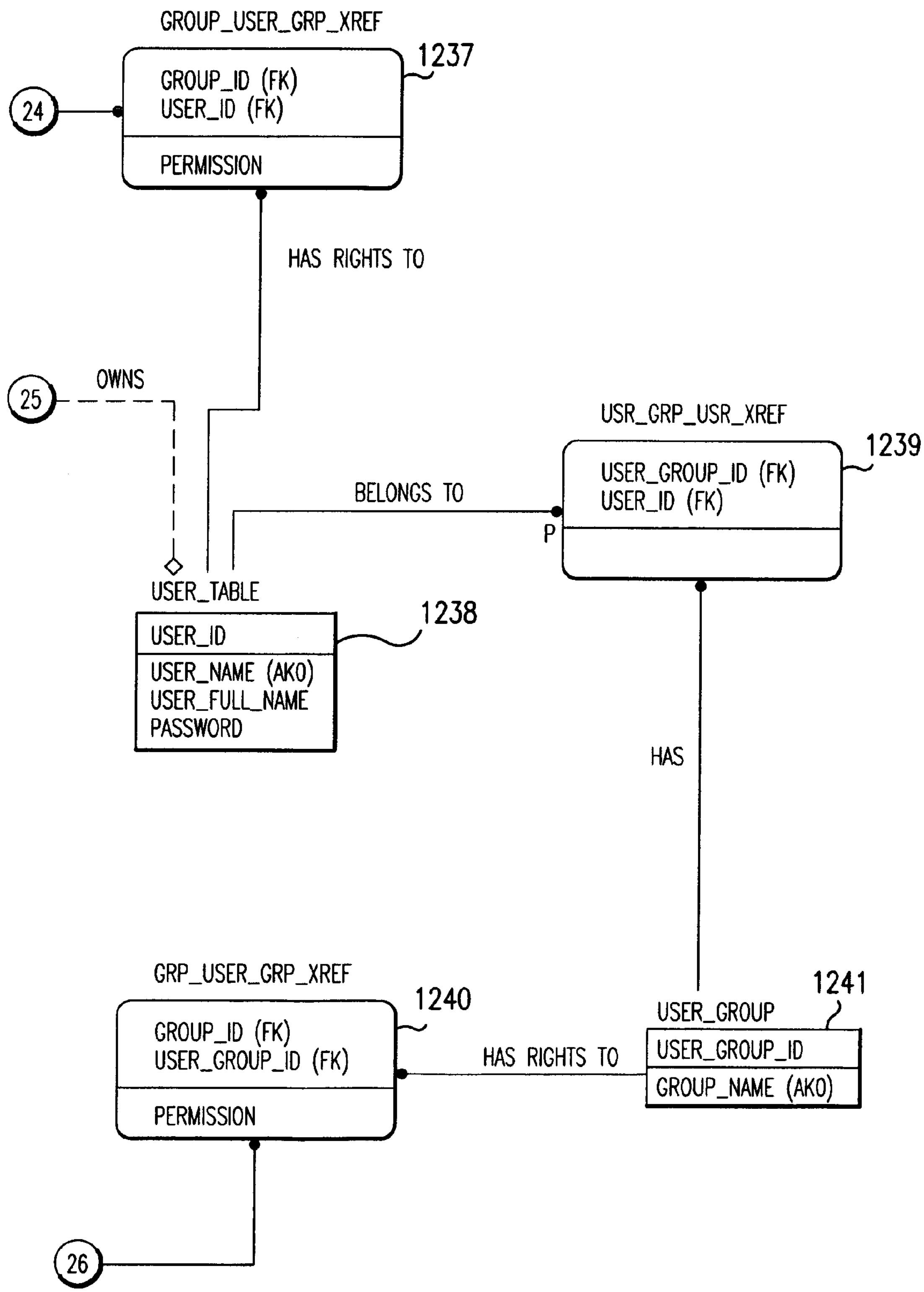
Figure 12L:
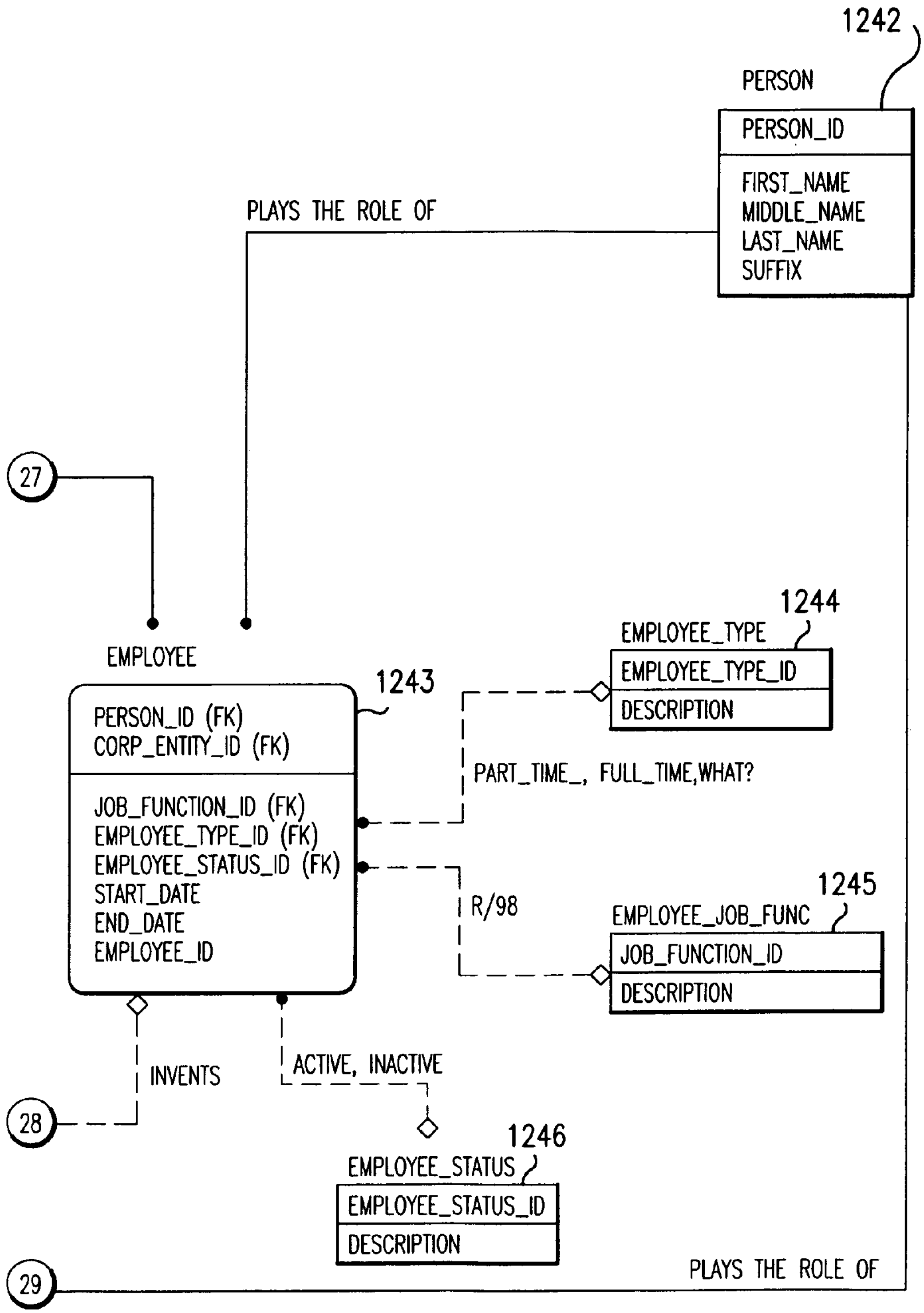
Figure 12M:
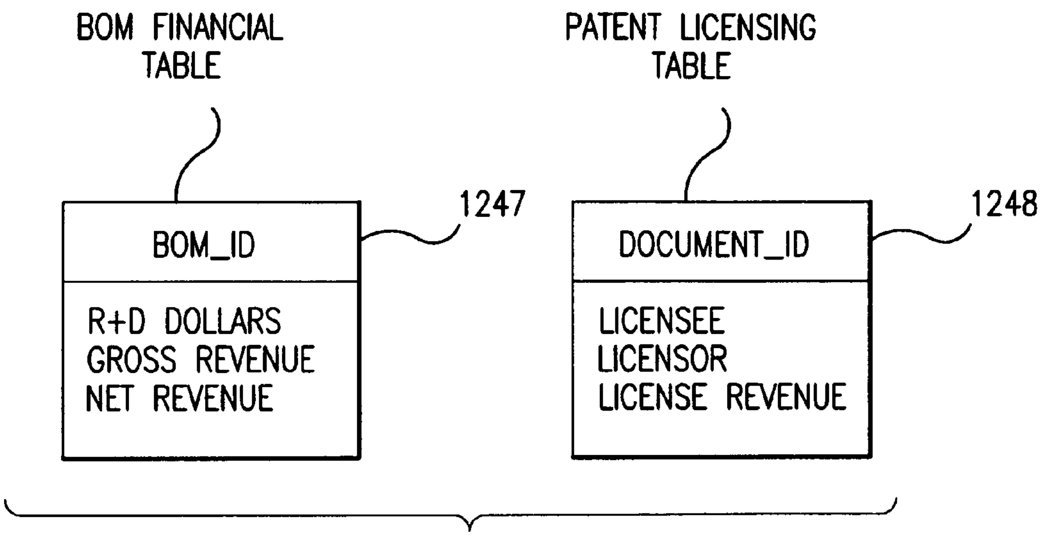

Example financial databases 638 are shown in FIG. 12M. These example financial databases include a BOM financial table 1247 and a patent licensing table 1248. The BOM financial table 1247 includes financial information pertaining to BOM groups. Each record of the BOM financial table includes a BOM_id attribute which identifies the BOM group, and also includes attributes that specify the R&D dollars that the customer spent to develop the assembly, subassembly, or part corresponding to the BOM group. Each record of the BOM financial table 1247 also includes attributes that specify the gross revenue generated by that assembly, subassembly, or part corresponding to the BOM group, and the net revenue generated by that assembly, subassembly, or part.

The patent licensing table 1248 includes financial information pertaining to the licensing fees generated by patents of interest. Each record of the patent licensing table 1248 includes a document_id attribute that identifies a document (more specifically, that identifies a patent). Each record of the patent licensing table 1248 also includes attributes that identifies the licensee of the patent, the licensor of the patent, and the current licensing revenue generated by such licensing of the patent.

It is noted that the financial tables 1247 and 1248 shown in FIG. 12M are only examples of the financial databases 638 supported and envisioned by the present invention. The invention is adapted and intended to include other financial tables directed to other financial information of interest to the customer. Accordingly, tables 1247, 1248 of FIG. 12M are provided for purposes of illustration, and not limitation.

The financial databases 638 are generally loaded as described above with reference to FIGS. 45 and 95. The extract and load procedure represented in these FIGS. 45 and 95 may need to be modified to accommodate the particular financial information being processed. Such modifications will be apparent to persons skilled in the relevant art(s) based on the discussion herein.

Security Databases

The security databases 636 are shown in FIG. 12K. A user_table database 1238 includes a record for each user (that is, each person having rights to any of the data in the databases 316). Each record of the user_table database 1238 includes a user_id representing a key that uniquely identifies the user. Each record of the user_table 1238 also includes a user_name attribute that is an alternate key of the record, a user_full name attribute that stores the full name of the user, and a password attribute that stores the user's password.

The present invention supports a multi-level security methodology. A first level of this security methodology specifies that the creator of a data item has full access privileges with respect to the data item. For example, consider the group_table database 1227 in FIG. 12I. Each record of the group_table database 1227 includes an owner_user_id attribute which identifies the creator (i.e., the owner) of the associated user-defined group. The owner_user_id attribute is implemented using codes whose values (user_id) are defined by the user_table database 1238 (FIG. 12K). Accordingly, the creator of a user-defined group as represented in a record of the group_table database 1227 has full access privileges with respect to that user-defined group.

A second level of the invention's security methodology defines that a user may have specific access privileges with respect to an object, called a secured object. Such secured objects include, for example, a note, a document and its notes, a document, and a database. Such secured objects also include a user-defined group.

This level of the security methodology as it relates to user-defined groups as secured objects is implemented using a group_user_xref table 1237. It is noted that other types of secured objects can be implemented in a similar manner.

Each record of the group_user_xref table 1237 includes a group_id attribute that identifies a user-defined group, and a user_id attributed that defines a user. Each record of the group_user_xref table 1237 also includes a permission attribute which defines the access privileges that the user has with respect to the group. Possible access privileges include no access privileges, a read access privilege, a change access privilege (which allows the user to both read and modify the data item), and a delete access privilege (that allows the user to read, modify, and delete the data item). Other access privileges could also be defined. Accordingly, a record in the group_user_xref table 1237 specifies that a person (represented by user_id) has specific privileges (indicated by the permission attribute) to a particular user-defined group (represented by the group_id).

A third level of the security methodology of the present invention specifies that a user group (such as a department) may have a particular access privilege with respect to a user-defined group. If a user is in that user group, then that user would also have that access privilege with respect to the user-defined group. This level of the security methodology is implemented using a grp_usr_grp_xref table 1240. Each record of this table 1240 includes a group_id attribute that identifies a user-defined group, and a user_group_id that identifies a user group. The user_group_id attribute is implemented as a code whose values are defined in a user_group table 1241. Each record of the grp_usr_grp_xref table 1240 also includes a permission attribute that defines the access privilege that the user group (specified by the user_group_id attribute) has with respect to the user-defined group (specified by the group_id attribute). Preferably, a user group permission is overridden by a users explicit permission, allowing the system administrator to give a user a higher or lower permission than the user group that the user is in.

A usr_grp_usr_xref table 1239 specifies the users who are in each user group. In particular, each record of this table 1239 includes a user_group_id attribute that identifies a user group, and a user_id attribute that identifies a user who is in that user group.

The security databases 636 will now be further described with reference to an example in FIGS. 27-31. FIG. 27 illustrates an example user_table 1238X. As evident by FIG. 27, three users have access privileges with respect to the data in databases 316, Mike, Jen, and Kathryn. Referring again to FIG. 19, a group_table database 1227X is shown wherein user 1 (Mike) is indicated as being the owner of groups GRP1-GRP4. User 2 (Jen) is indicated as being the owner of group GRP5. User 3 (Kathryn) is indicated as being the owner of group GRP6. Accordingly, according to the security methodology of the present invention, user 1 (Mike) has complete access privileges (that is, the delete access privilege) with respect to groups GRP1-GRP4. User 2 (Jen) has delete access privileges with respect to group GRP5. User 3 (Kathryn) has delete access privileges with respect to group GRP6.

FIG. 28 illustrates an example group_user_xref table 1237X. This table indicates that user 2 has the change privilege with respect to user-defined group GRP1, and no privileges with respect to user-defined group GRP2.

FIG. 31 illustrates an example grp_user_grp_xref table 1240X. This table 1240X indicates that a user group with user_group_id UGRP2 has delete access privileges with respect to user-defined group GRP5. Similarly, a user group UGRP3 has no access privileges with respect to user-defined group GRP5, and user group UGRP3 has delete access privileges with respect to user-defined group GRP6. FIG. 29 illustrates an example user_group table 1241X.

FIG. 30 illustrates an example usr_grp_usr_xref table 1239X. This table 1239X indicates that user 2 is in user group UGRP2, user 1 is in user group UGRP3, and user 3 is in user group UGRP4. Accordingly, considering both usr_grp_usr_xref table 1239X and grp_usr_grp_xref table 1240X, user 2 (Jen) has delete privileges with respect to GRP5, user 1 (Mike) has delete privileges with respect to user-defined group GRP6, and user 3 (Kathryn) has no privileges with respect to user-defined group GRP5.

Figure 110:
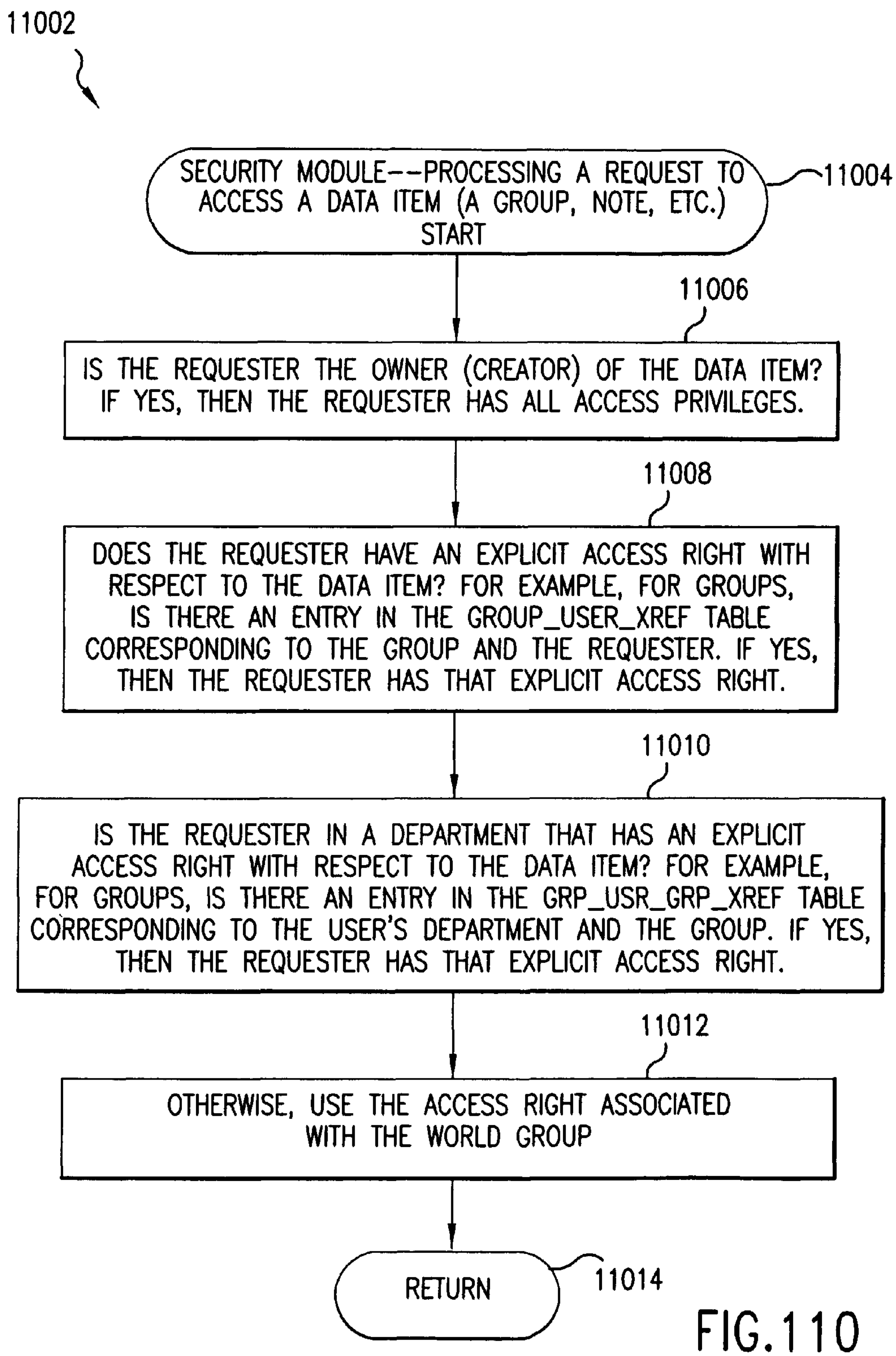
FIG. 110 is a flowchart depicting the operation of the security module.

The various levels of the security methodology of the present invention do not work individually. Instead, these security methodology levels work together in a well defined and integrated manner. This integrated security methodology is implemented by the security module 402 in the enterprise server 314. The operation of the security module 402 when processing a request to access a data item (in particular, a user-defined group) is depicted in a flowchart 11002 in FIG. 110.

The security module 402 performs the steps of flowchart 11002 to determine whether a user who is requesting an operation involving a data item has sufficient security access privileges with respect to that data item. Preferably, all operations performed by the enterprise server 314 are security checked. In other embodiments, only some operations performed by the enterprise server 314 are security checked. For example, operations involving reading patent documents are not security checked in some embodiments because patents are widely available public documents.

The user requesting the operation involving the data item is called the requestor for reference purposes. For purposes of example, the data item that is involved in the operation is assumed to be a user-defined group having associated with it a record in the group_table database 1227 (FIG. 12I).

In step 11006, the security module 402 determines whether or not the requester is the owner of the requested user-defined group. The security module 402 performs step 11006 by comparing the requestor's user_id with the owner_user_id attribute in the record of the group_table database 1227 corresponding to the requested user-defined group. If it is determined that the requestor is the owner of the requested user-defined group, then the requester is granted all access privileges (that is, the delete access privilege) with respect to the requested user-defined group. Processing of flowchart 11002 is then complete. If it is determined that the requester is not the owner of the requested user-defined group, then step 11008 is performed.

In step 11008, the security module 402 determines if the requester has an explicit access right with respect to the requested user-defined group. The security module 402 performs step 11008 by referring to the group_user_xref table 1237 (FIG. 12K). The security module 402 determines whether there is a record in the group_user_xref table 1237 having group_id equal to the key of the requested user-defined group, and also having the user_id attribute equal to the user_id of the requester. If such a record exists in the group_user_xref table 1237, then the requestor is given access to the requested user-defined group in accordance with the access right specified by the permission attribute in the record of the group_user_xref table 1237. Processing of flowchart 11002 is then complete. If such a record does not exist in the group_user_xref table 1237, then step 11010 is performed.

In step 11010, the security module 402 determines whether or not the requestor is in a user group that has an explicit access right with respect to the requested user-defined group. The security module 402 performs step 11010 by accessing the usr_grp_usr_xref table 1239 to identify all groups that has the requestor as a member. The security module 402 then accesses the grp_usr_grp_xref table 1240 to determine whether any of the user groups in which the requester is a member has an explicit access right with respect to the requested user-defined group. This is done by identifying a record in the grp_usr_grp_xref table 1240 where the group_id attribute is equal to the identifier of the requested user-defined group, and the user_group_id attribute is equal to an identifier of a user group in which the requestor is a member. If such a record exists, then the requester is given the explicit access right specified by the permission attribute in the record of the grp_usr_grp_xref table 1240.

Processing of flowchart 11002 is then complete. If such a record does not exist in the grp_usr_grp_xref table 1240, then step 11012 is performed.

In step 11012, the security module 402 accesses a record in the grp_usr_grp_xref table 1240 corresponding to a user group called World, if such a record is available. All users are considered to be a member of the user group World. The requester is then granted the access rights associated with the user group World (again, if such a World record is available). Referring to the example in FIG. 31, the World user group has the access right of read. Accordingly, in step 11012, the security module 402 grants the requester the read access right with respect to the requested user-defined group. Processing of flowchart 11002 is incomplete. Note that, if a World record is not available, the requester is given no access rights.

Some embodiments of the invention also include other levels of security. These levels can be in addition to, or in place of, one or more levels of security shown in FIG. 110. For example, the security module 402 before performing step 11006 may check to see if the requester has been explicitly revoked access to a particular portion of the database 316 that includes the data object. The requester may be revoked access to all of the data in the databases 316. As another example, the security module 402 before performing step 11006 may check to see if the requester is a super user, in which case the requester has complete access rights (i.e., the delete privilege) as to all data in the databases 316. These additional security levels can be implemented using tables in addition to the ones shown in FIG. 12K, or using modified variations of the tables shown in FIG. 12K. For example, additional fields can be added to the user_table 1238 that would indicate whether the user was a super user, or whether all access privileges for the user had been revoked as to a part of or all of the databases 316.

In an embodiment of the invention, the security module 402 preferably processes these security levels in the following order (other orderings of the security levels could also be used):

(1) Has the requester been revoked access? If not, then:

(2) Is the requester a super user? If not, then:

(3) Is the requester the owner of the data item? (step 11006) If not, then:

(4) Does the requester have explicit rights as to the data item? (step 11008) If not, then:

(5) Is the requester in a user group that has explicit rights as to the data item? (step 11010) If not, then:

(6) If a World group exists, then use the access rights associated with the World group. Otherwise, the requester is granted no rights.

It is noted that the security databases 636 shown in FIG. 12K and as described above apply only to the user-defined group databases 624. In other words, the security databases 636 only apply security measures as to the user-defined group databases 624. However, the invention is adapted and intended to extend the security of the security databases 636 and the security module 402 to all tables in the databases 316. The modifications necessary to the databases 316 and to the security module 402 to extend the security methodology of the present invention to all of the tables in the databases 316 will be apparent to persons skilled in the relevant art(s). For example, in order to extend the security methodology of the present invention to the BOM databases 626, it is only necessary to modify the BOM table 1217 to include an owner_user_id attribute. It would not be necessary to modify any of the security databases 636, as long as the group_id attribute could store identifiers of BOM groups.

In order to extent the security methodology to the notes databases 640, it would only be necessary to modify the notes databases 640 to include an owner_user_id. No modifications to the security databases 636 would be necessary, as long as the group_id attribute in the security databases 636 could be overloaded to store the identifiers of notes. Alternatively, additional security tables could be added to the security databases 636.

Only select persons have the ability to view and/or modify the data in the security databases 636. Such persons must have a high security level, and are typically system administrators. The client security module 702 provides a user interface at the clients 304, 306 that enable persons with sufficient security to view and/or modify the data in the security databases 636.

Some security information may be obtained from the underlying operating system, such as user IDs and passwords, and perhaps even access privileges. This information is then loaded into the security databases 636.

Enterprise Server and Client Functional Modules

The analysis modules 416 in the enterprise server 314 and the corresponding client analysis module 716 in the clients 304, 306 are described in detail below. FIG. 10 illustrates a block diagram of the analysis modules 416 in the enterprise server 314. The analysis modules 416 in FIG. 10 are not intended to be an exhaustive list of analysis modules that the invention is adapted or intended to support. The invention, instead, can support any analysis modules capable of processing data in the databases 316 in a useful manner as judged by the customer. The scope of the invention is intended to include these modules.

For the most part, the analysis modules 416 perform functions in a patent-centric and a group-oriented manner. In other words, the analysis modules 416 perform functions on patent related information, with or without consideration of other information. Also, the analysis modules 416 perform functions on documents in groups.

Patent Mapping Module

The patent mapping module 1002 operates to identify all patents that are mapped to a product. As discussed above, each product (assembly, subassembly, part) of interest to the customer is represented by a node in a BOM. Each BOM node is represented by a BOM group. Each BOM group is represented by a record in the BOM table 1217 (FIG. 12G). Accordingly, the patent mapping module 1002 operates to identify all patents within a BOM group. Such patents map to a product that is represented by the BOM group.

Figure 84:
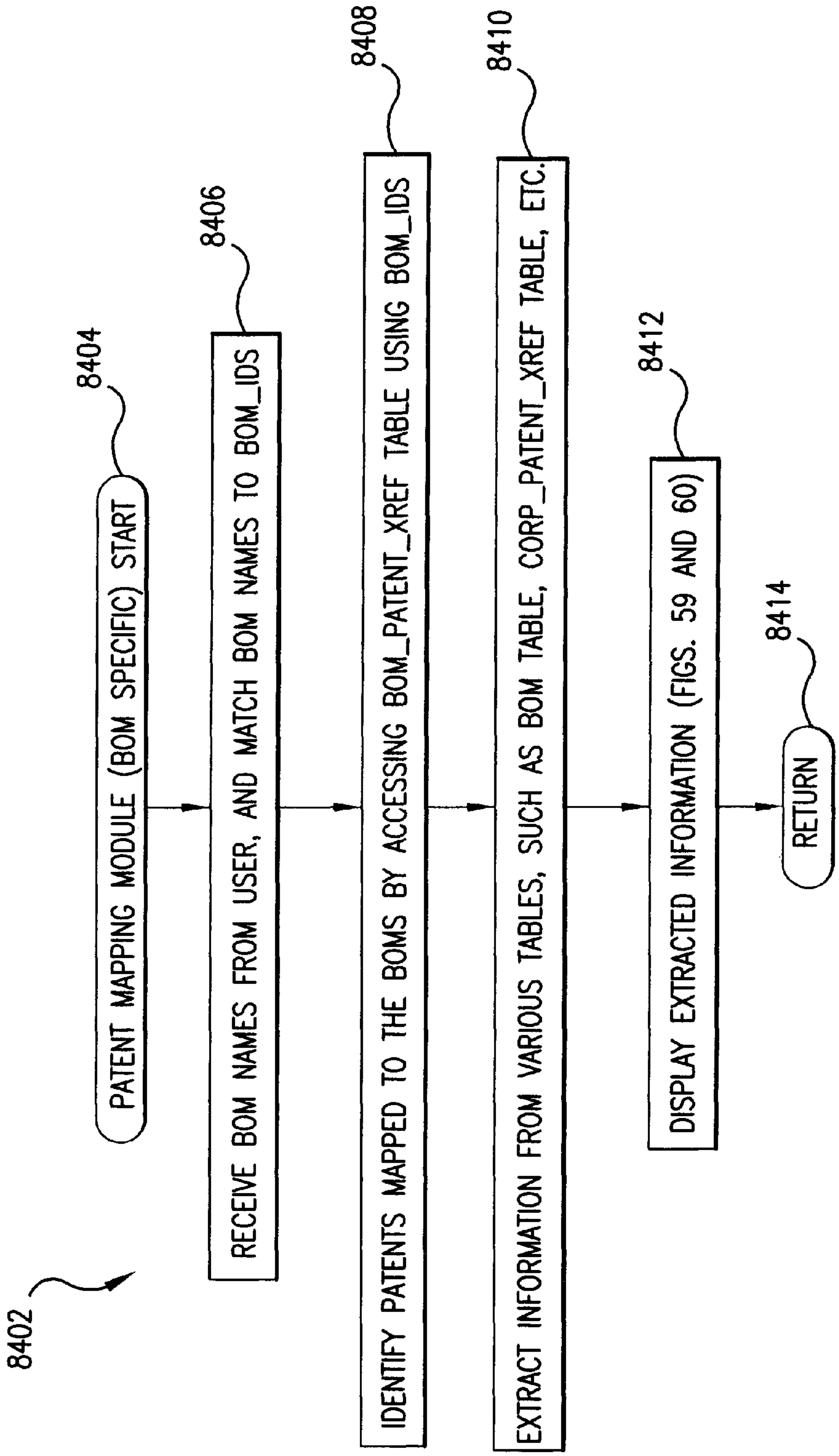
FIG. 84 is a flowchart depicting the operation of the patent mapping module according to the embodiment of the invention.

The operation of the patent mapping module 1002 is represented by a flowchart 8402 in FIG. 84. In step 8406, the patent mapping module 1002 receives from the operator (working at a client 304, 306, called the requesting client 304, 306) information that identifies one or more BOM groups (for reference purposes, these are called the operator-specified BOM groups). In an embodiment of the invention, this information identifies one or more BOM group names. The patent mapping module 1002 matches these BOM group names to BOM_ids by searching in the BOM table 1217 for matches of the operator-provided BOM names to the name attribute.

In step 8408, the patent mapping module 1002 identifies the patents contained in the BOM groups having the BOM_ids identified in step 8406. The patent mapping module 1002 performs step 8408 by searching in the BOM_patent_xref table 1218 for records having BOM_id attributes equal to the BOM_ids identified in step 8406.

In step 8410, the patent mapping module 1002 retrieves patent bibliographical information pertaining to the patents identified in step 8408. This is done by using the document_ids from the records of the BOM_patent_xref table 1218 identified in step 8408 as indexes into the patent bibliographic databases 604. This patent bibliographic information is transferred to the requesting client 304, 306.

In step 8412, the corresponding client analysis module 716 in the requesting client 304, 306 displays the received information. FIGS. 59 and 60 illustrate example display formats which the client analysis module 716 uses to display the patent data. In the display format 5902 of FIG. 59, the patent mapping data is sorted by BOM groups of logical level "subassembly". There are three BOM groups of logical level "subassembly" displayed in the example of FIG. 59, indicated by reference numbers 5904, 5906 and 5908. The BOM group of logical level "subassembly" having reference number 5904 is called "analog special effects controller subassembly". Each of its child BOM groups of logical level "part" are displayed under this title 5904. For each of these child BOM groups of logical level "part", the part description and part number (corresponding to data from the name attribute in the BOM table 1217) are displayed. Also displayed is the patent number of a patent that maps to the part (obtained from the BOM_patent_xref table 1218), as well as the part status (obtained from the status_id attribute in the BOM table 1217), the ownership (obtained from the corp_patent_xref table 1233), and the relevancy status (obtained from the corp_patent_xref table 1233).

The display format 6002 in FIG. 60 is similar to the display format 5902 in FIG. 59. Patent mapping data in the display format 6002 is also organized according to the BOM logical level "subassembly". Child BOM groups of logical level "part" are displayed below the respective titles of the BOM groups of logical level "subassembly".

Figure 85:
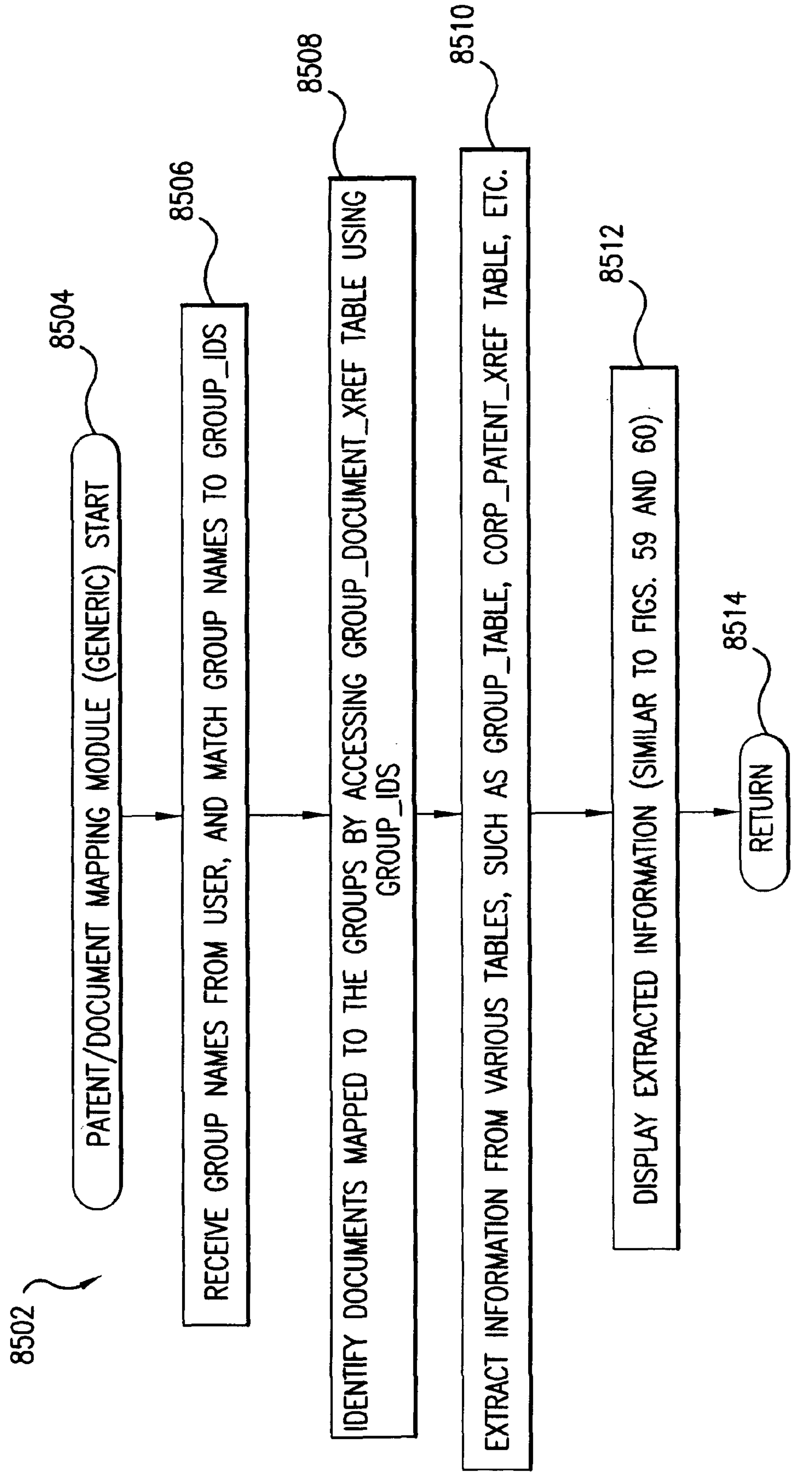
FIG. 85 is a flowchart depicting the operation of the patent/document mapping module according to an embodiment of the invention.

In some embodiments of the invention, the patent mapping module 1002 can also perform a document (as opposed to a patent) mapping function. This functionality is depicted in flowchart 8502 in FIG. 85. In step 8506, the patent mapping module 1002 receives from the operator (at the requesting client 304, 306) information that preferably identifies one or more group names. The patent mapping module 1002 matches these group names to group ids by reference to the BOM table 1217.

In step 8508, the patent mapping module 1002 identifies the documents that are in the groups corresponding to the group_ids identified in step 8506. The patent mapping module 1002 performs step 8508 by reference to the BOM_patent_xref table 1218. These identified documents may include patents and non-patent documents.

In step 8510, the patent mapping module 1002 extracts bibliographic information pertaining to the documents identified in step 8508 from the appropriate document bibliographic databases 602. This information is transferred to the requesting client 304, 306.

In step 8512, the client analysis module 716 in the requesting client 304, 306 displays the information using display formats similar to that shown in FIGS. 59 and 60.

Patent Citation Module

The patent citation module 1004 operates to identify, for a particular patent (called the source patent), the patents which were cited during the prosecution of the selected patent (these patents are called citing patents). This is called a backwards citation report, because its focus is on looking backwards from the perspective of the source patent.

The patent citation module 1004 also performs a forward citation function. In performing the forward patent citation function, the patent citation module 1004 identifies, for a source patent, the patents in which the source patent was cited. Again, these patents are called citing patents for reference purposes.

Figure 86:
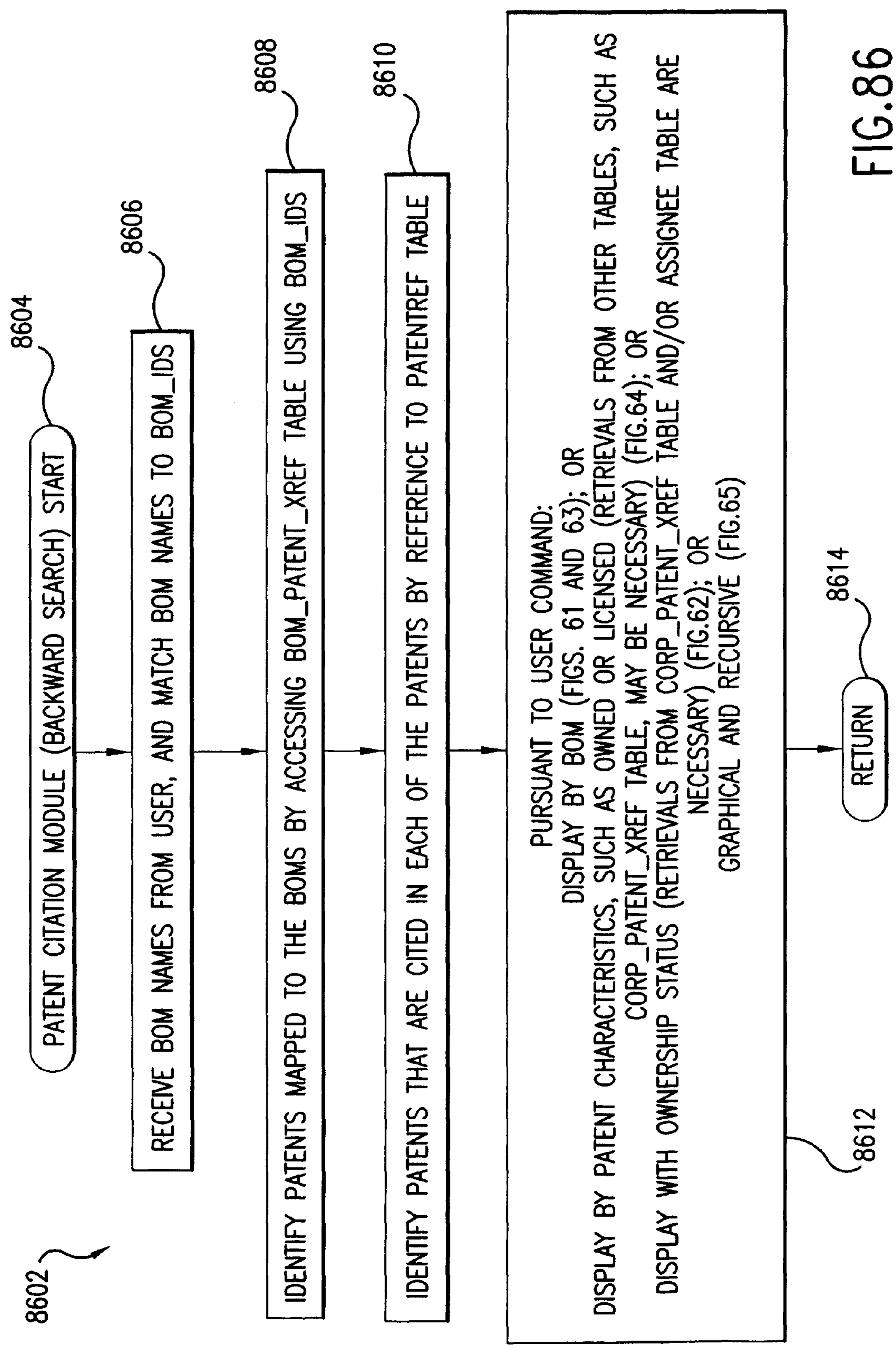
FIG. 86 is a flowchart depicting the operation of the patent citation module when conducting a backward patent citation search according to an embodiment of the invention.

A flowchart 8602 in FIG. 86 represents the operation of the patent citation module 1004 while performing the backward patent citation function.

In step 8606, the patent citation module 1004 receives information from the operator (at a client 304, 306 called the requesting client 304, 306) that identifies one or more BOM groups. In an embodiment of the invention, the information provided by the operator identifies one or more group names corresponding to one or more BOM groups. The patent citation module 1004 identifies the BOM_ids for the BOM groups corresponding to the BOM group names by conducting a search through the BOM table 1217 using the BOM group names (provided by the operator) as an index.

More generally, the patent citation module 1004 operates on any type of group, such as user-defined groups, inventor groups, corporate entity groups, etc. The operation of the patent citation module 1004 is discussed herein with reference to BOM groups for illustrative purposes only.

In step 8608, the patent citation module 1004 identifies the patents which are mapped to the BOM groups corresponding to the BOM_ids identified in step 8606. The patent citation module 1004 performs step 8608 by searching in the BOM_patent_xref table 1218 using the BOM_ids identified in step 8606 as indexes.

In step 8610, the patent citation module 1004 identifies the patents (called the citing patents) that are cited in the patents identified in step 8608 by reference to the PatentRef table 1208 (FIG. 12C). The patent citation module 1004 performs step 8610 by processing each patent identified in step 8608 in turn. In particular, the patent citation module 1004 selects one of the patents identified in step 8608 and uses the document_id of the selected patent as an index into the PatentRef table 1208. As a result of this operation, the patent citation module 1004 will identify a record in the PatentRef table 1208 for each patent that was cited in the selected patent. The patent citation module 1004 performs this operation for each of the patents identified in step 8608.

Also in step 8610, patent bibliographic information is retrieved from the patent bibliographic databases 604 for each of the citing patents.

Also in step 8610, the patent citation module 1004 forwards the results of the above operations to the requesting client 304, 306.

In step 8612, the client analysis module 716 in the requesting client 304, 306, displays the data received from the patent citation module 1004 to the operator. The client analysis module 716 displays this data in a format selected by the operator. FIGS. 61-65 depict example patent citation reporting formats. The operator can elect to view the patent citation information in any of these formats.

Figure 61:
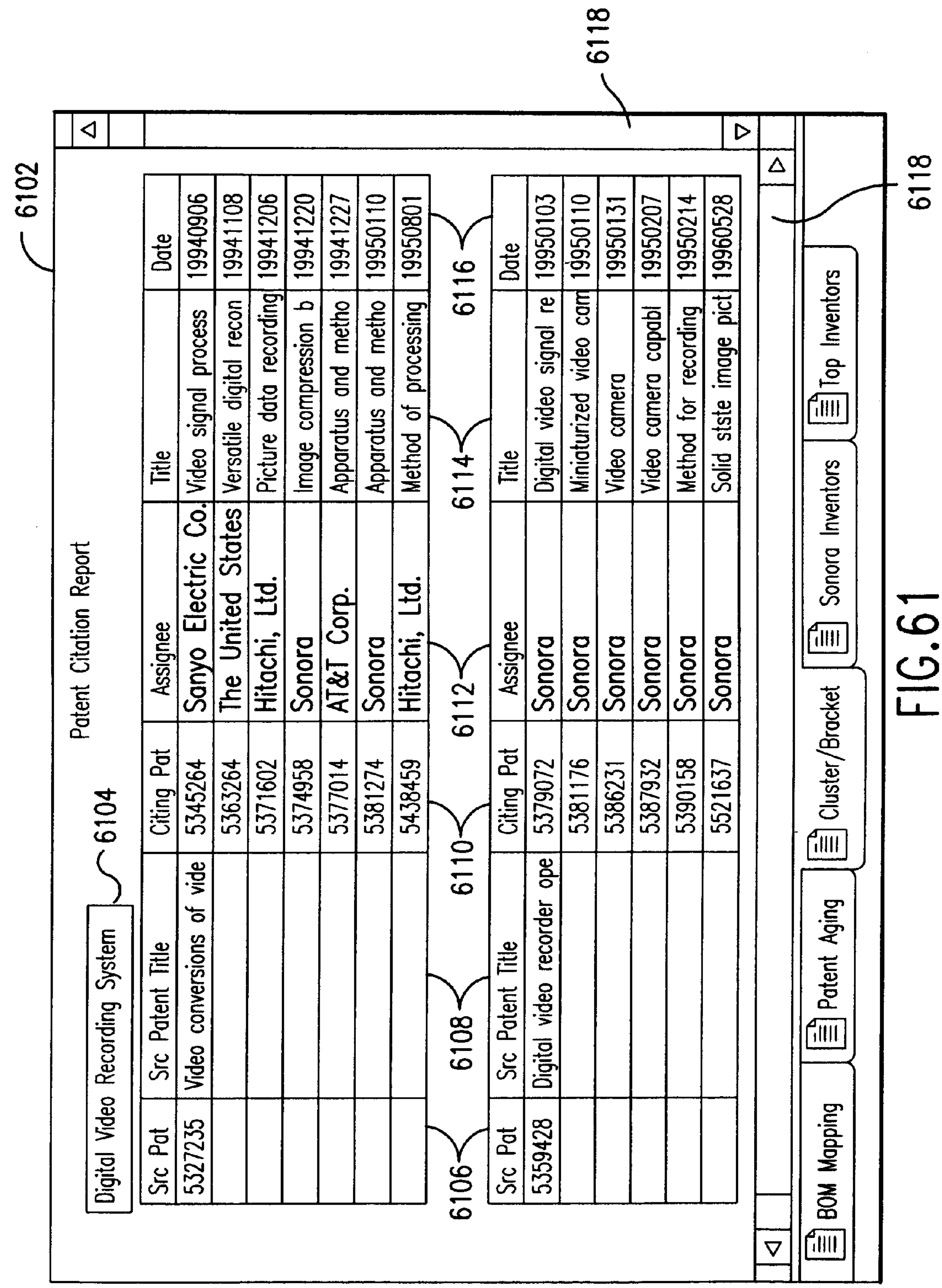

For example, if the operator chooses to view the patent citation information organized by BOM group, then the display format illustrated in FIG. 61 and/or FIG. 63 is used. In the display format 6102 of FIG. 61, the patent citation data is sorted by BOM group. A portion of the patent citation data for a BOM group titled "digital video recording system" is shown in the example of FIG. 61. A table is displayed for each patent mapped to this BOM group. In the example of FIG. 61, such patents include U.S. Pat. Nos. 5,327,235 and 5,359,428. These patents are called source patents, and they were identified in step 8608. Their patent numbers are displayed in the patent citation report in column 6106 of the tables. The titles of the source patents are displayed in column 6108 of the tables. The patents which are cited by the source patents are listed in column 6110 of the tables. These citing patents were identified in step 8610 of flowchart 8602. Bibliographic information on the citing patents is displayed in the remaining columns of the tables, such as the assignee information which is displayed in column 6112, title information which is displayed in 6114, and date information which is displayed in 6116. Other bibliographic information may be contained in the table and may be viewed by appropriate use of the navigation icons 6118.

The display format 6302 in FIG. 63 is similar to the display format 6102 in FIG. 61. The patent citation data in the format 6302 is organized by BOM group. Listed below each BOM group are the patents which are mapped to that BOM group. These patents are listed by their patent numbers in column 6304, and are called source patents. The patents which are cited in these source patents (called citing patents) are listed by their patent number in column 6306. Bibliographic information on these citing patents are displayed in the following columns of the tables.

Referring again to step 8612, if the operator elects to display the patent citation information sorted by selected patent characteristics, such as owned/license, then the display format 6402 in FIG. 64 is used. The display format 6402 includes a field 6404 which indicates whether owned or licensed patents are being displayed. If the operator elects to display only owned patents, then field 6404 would be modified to indicate this, and patent citation information on only patents owned by the customer (or any other corporate entity identified by the operator) would be displayed in the patent citation report using format 6402.

Referring again to step 8612, if the operator elects to display the patent citation information in conjunction with ownership information, then display format 6202 in FIG. 62 is used. In display format 6202, the patent citation data is sorted by source patent number. For each source patent, the patents which cite the source patent (called citing patents) are displayed by patent number. Other patent bibliographic information on the citing patents is also displayed. In addition, ownership information (that is, whether or not the citing patent is owned, licensed, etc.) is also displayed in column 6204. This information was previously retrieved in step 8610 by the patent citation module 1004 by conducting a search of the corp_patent_xref table 1233 (FIG. 12J) using as indexes the document_ids of the citing patents (identified earlier in step 8610) and the corp_entity_id of a corporate entity specified by the operator. Accordingly, the ownership information displayed in column 6204 of display format 6202 can be relative to any operator-specified corporate entity, not just the customer corporate entity. The operator may have specified a corporate entity for purposes of data mining in the information received by the patent citation module 1004 in step 8606.

Figure 65:
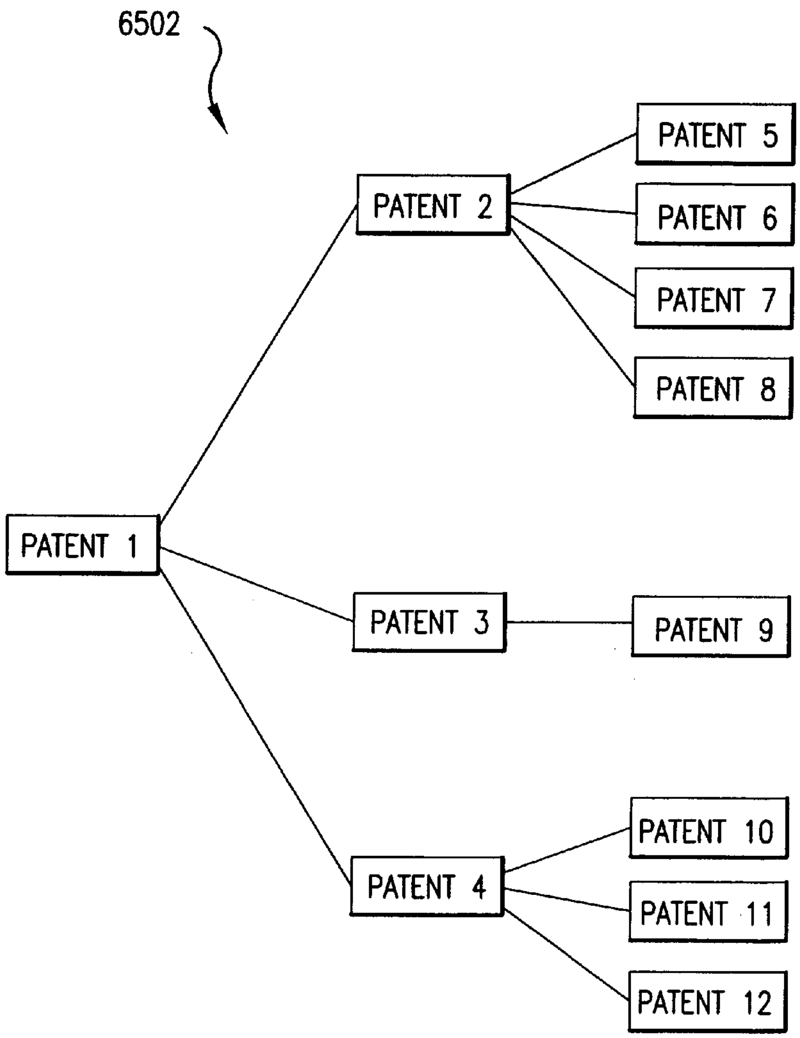

Referring again to step 8612 in FIG. 86, the patent citation report can be performed and displayed in a recursive fashion with an operator specified depth. The display of such a recursive patent citation function is shown in FIG. 65. In the example of FIG. 65, patent 1 is the source patent, and patents 2-4 are cited in patent 1 (that is, patents 2-4 are citing patents with respect to source patent 1). The patent citation report of FIG. 65 is multi-leveled. Accordingly, the display format of FIG. 65 indicates that patents 5-8 are cited in patent 2, patent 9 is cited in patent 3, and patents 10-12 are cited in patent 4. The example format 6502 shown in FIG. 65 is a two level patent citation report. The present invention can support patent citation reports of any operator specified level. Other display formats could be used by the invention to more effectively display the results of multi-level patent citation reports, such as the well-known Xerox hyperbolic tree display format.

The patent citation module 1004 collects data for a multi-level patent citation report by repetitively performing the steps of flowchart 8602, which will be apparent to persons skilled in the relevant arts. The level of the report desired by the operator could be contained in the information that the patent citation module 1004 receives in step 8606.

Figure 87:
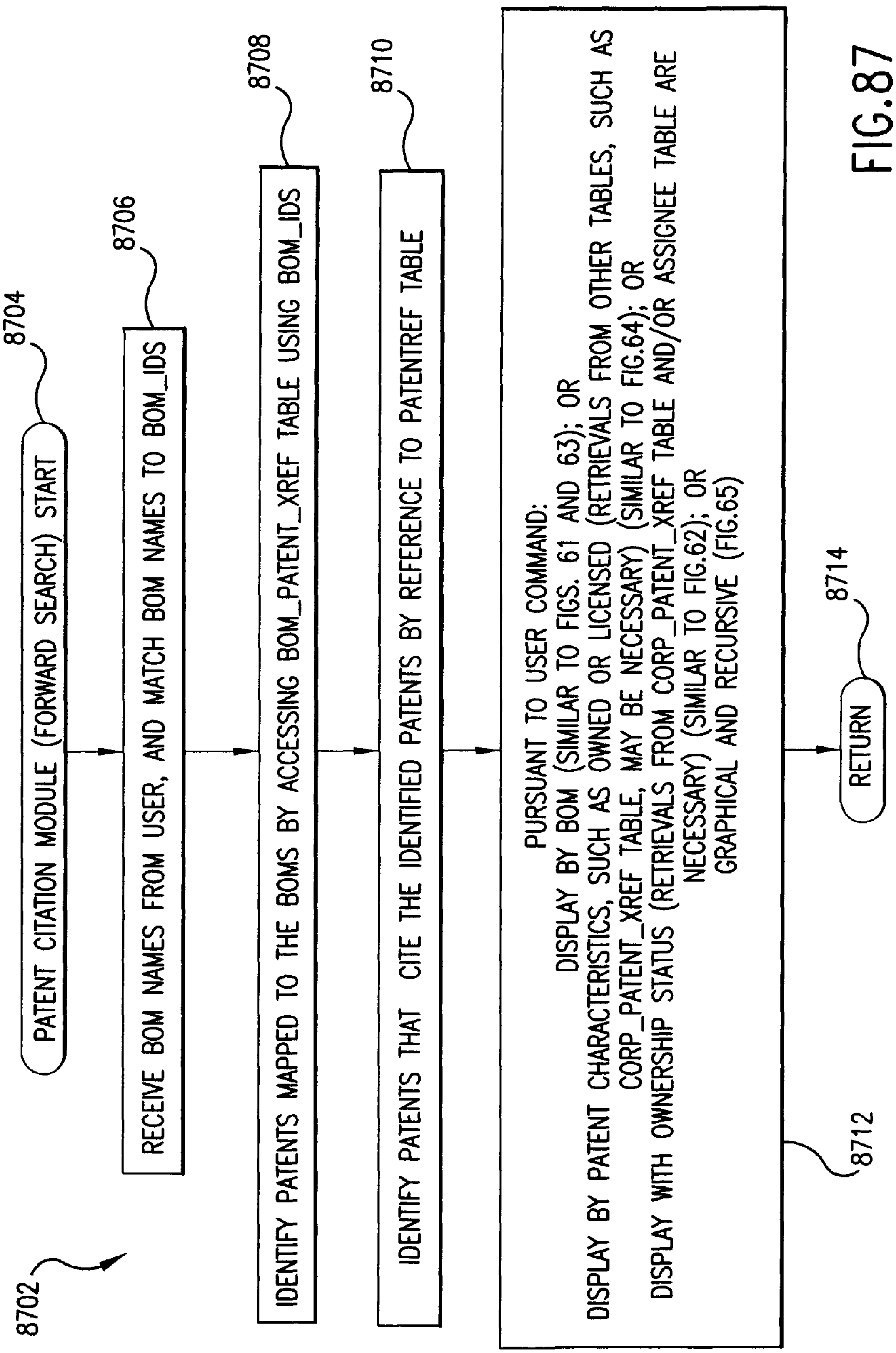
FIG. 87 is a flowchart depicting the operation of the patent citation module when performing a forward patent citation search according to an embodiment of the invention.

The forward patent citation function performed by the patent citation module 1004 is depicted in a flowchart 8702 shown in FIG. 87. In step 8706, the patent citation module 1004 receives information from the operator at the requesting client 304, 306 that identifies one or more BOM groups. In one embodiment, the information received from the operator identifies one or more BOM names that correspond to the one or more BOM groups. Also in step 8706, the patent citation module 1004 identifies the BOM_ids of the BOM groups by conducting a search in the BOM table 1217 using the BOM names as an index.

In step 8708, the patent citation module 1004 identifies the patents which are mapped to the BOM groups associated with the BOM_ids identified in step 8706. The patent citation module 1004 performs step 8708 by conducting a search in the BOM_patent_xref table 1218 using the BOM_ids identified in step 8706 as indexes.

In step 8710, the patent citation module 1004 determines the patents that cite the patents identified in step 8708. The patent citation module 1004 performs step 8710 by conducting a search through the PatentRef table 1208 using the document_ids corresponding to the citing patents identified in step 8708 as indexes. The patent citation module 1004 forwards the results of the above operation to the client analysis module 716 in the requesting client 304, 306.

In step 8712, the client analysis module 716 displays this information received from the patent citation module 1004 on the client display monitor 1122. The client analysis module 716 displays this information to the operator in any one of a number of display formats, examples of which are shown in FIG. 61-65. These display formats are described above.

Patent Aging Module

Figure 88A:
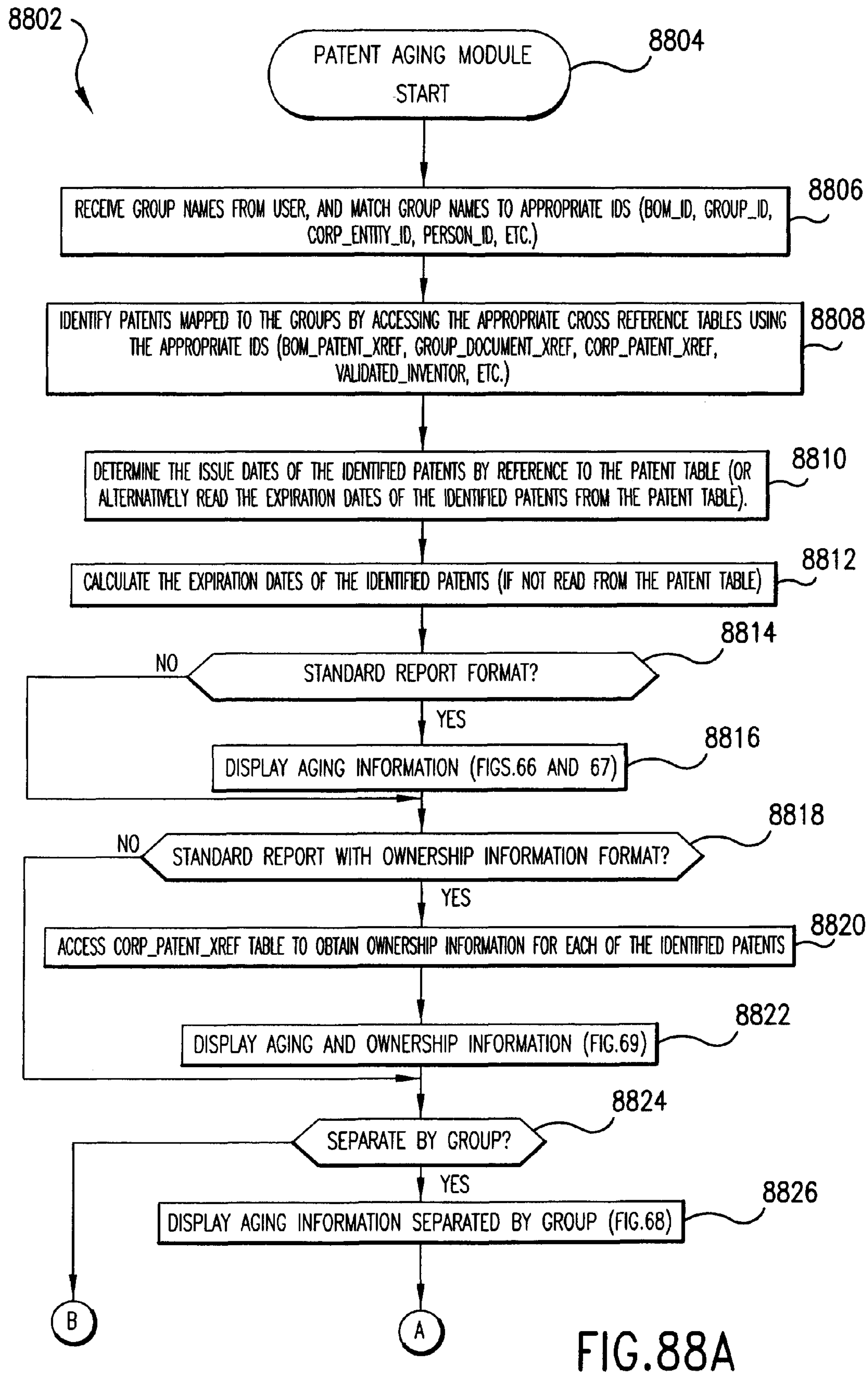
FIGS. 88A and 88B collectively illustrate a flowchart representing the operation of the patent aging module according to an embodiment of the invention.
Figure 88B:
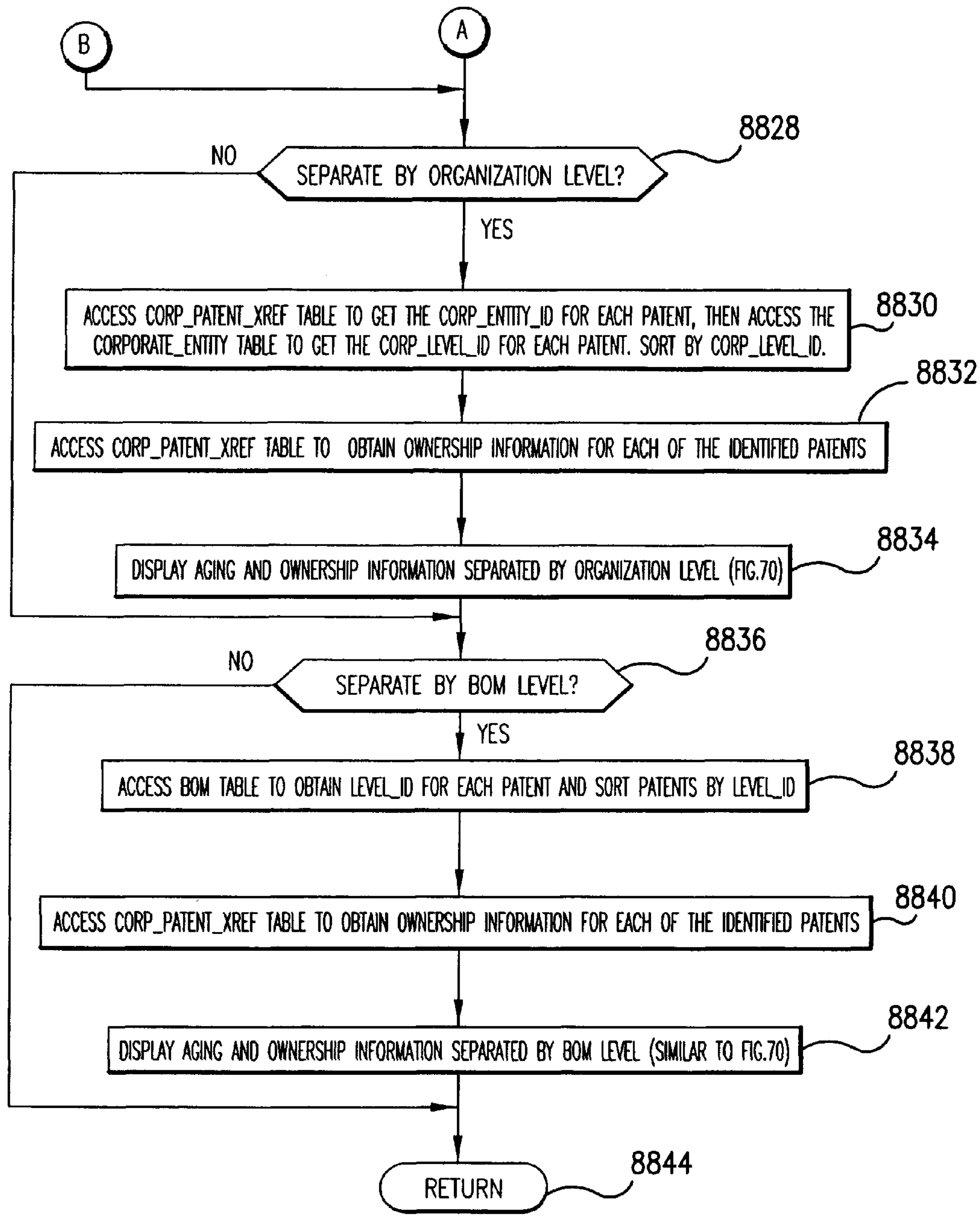

The patent aging module 1006 operates to identify and analyze the remaining terms of patents that map to products, corporate entities, or inventors (that is, that are in BOM groups, corporate entity groups, or inventor groups that correspond to the products, corporate entities, or inventors). The patent aging module 1006 also operates to identify and analyze the remaining terms of patents that are in user-defined groups. The operation of the patent aging module 1006 is depicted in a flowchart 8802 shown in FIGS. 88A and 88B.

In step 8806, the patent aging module 1006 receives from the operator at the requesting client 304, 306, information that identifies one or more groups. These can be user-defined groups or predefined groups, or any combination of such groups. In an embodiment of the invention, the patent aging module 1006 receives information from the operator that identifies group names that correspond to groups. The operator can identify such groups while located at the client 304, 306 by selecting one or more groups from the group hierarchy user interface (FIG. 58). This is true in all cases herein where the user identifies groups to the enterprise server 314.

In some embodiments, the information may also have to identify the group types (i.e., BOM group, corporate entity group, inventor group, user-defined group, etc.). The patent aging module 1006 identifies the appropriate group IDs of these groups by reference to the appropriate group tables (that is, the BOM table 1217 for BOM groups, the corporate_entity table 1230 for corporate entity groups, the validated_inventor table 1236 for inventor groups, the group_table database 1227 for user-defined groups, etc.).

In step 8808, the patent aging module 1006 identifies the patents which are contained in the groups corresponding to the group IDs identified in step 8806. The patent aging module 1006 performs step 8808 by searching through the appropriate patent xref tables, for example, the BOM_patent_xref table 1218, the group_document_xref table 1228, the corp_patent_xref table 1233, the validated_inventor table 1236, etc.

In step 8810, the patent aging module 1006 identifies the issue dates of the patents identified in step 8808 by reference to the patent table 1222 (FIG. 12H). The patent aging module 1006 does this by searching through the patent table 1222 using the document_ids identified in step 8808. In some embodiments, in step 8810, the patent aging module 1006 retrieves the expiration dates of the patents identified in step 8808 by reference to the calc_exp_date attribute in the patent table 1222.

In step 8812, to the extent that the expiration dates of the identified patents were not loaded in the patent table 1222, the patent aging module 1006 calculates the expiration dates of the identified patents in accordance with the existing patent laws of the appropriate jurisdiction. The patent aging module 1006 does this by using the patent issue dates. The patent aging module 1006 then forwards the results of the above operation to the client analysis module 716 in the requesting client 304, 306.

The client analysis module 716 then displays this information received from the patent aging module 1006 in an operator selected format. Such display of the patent aging information is described in the following steps.

In step 8814, the client analysis module 716 determines whether the operator requested to display the patent aging information in a standard report format. If the operator wishes to display the patent aging information in a standard report format, then the client analysis module 716 uses the display formats shown in FIG. 66 and/or FIG. 67 to display the patent aging information.

Figure 66:
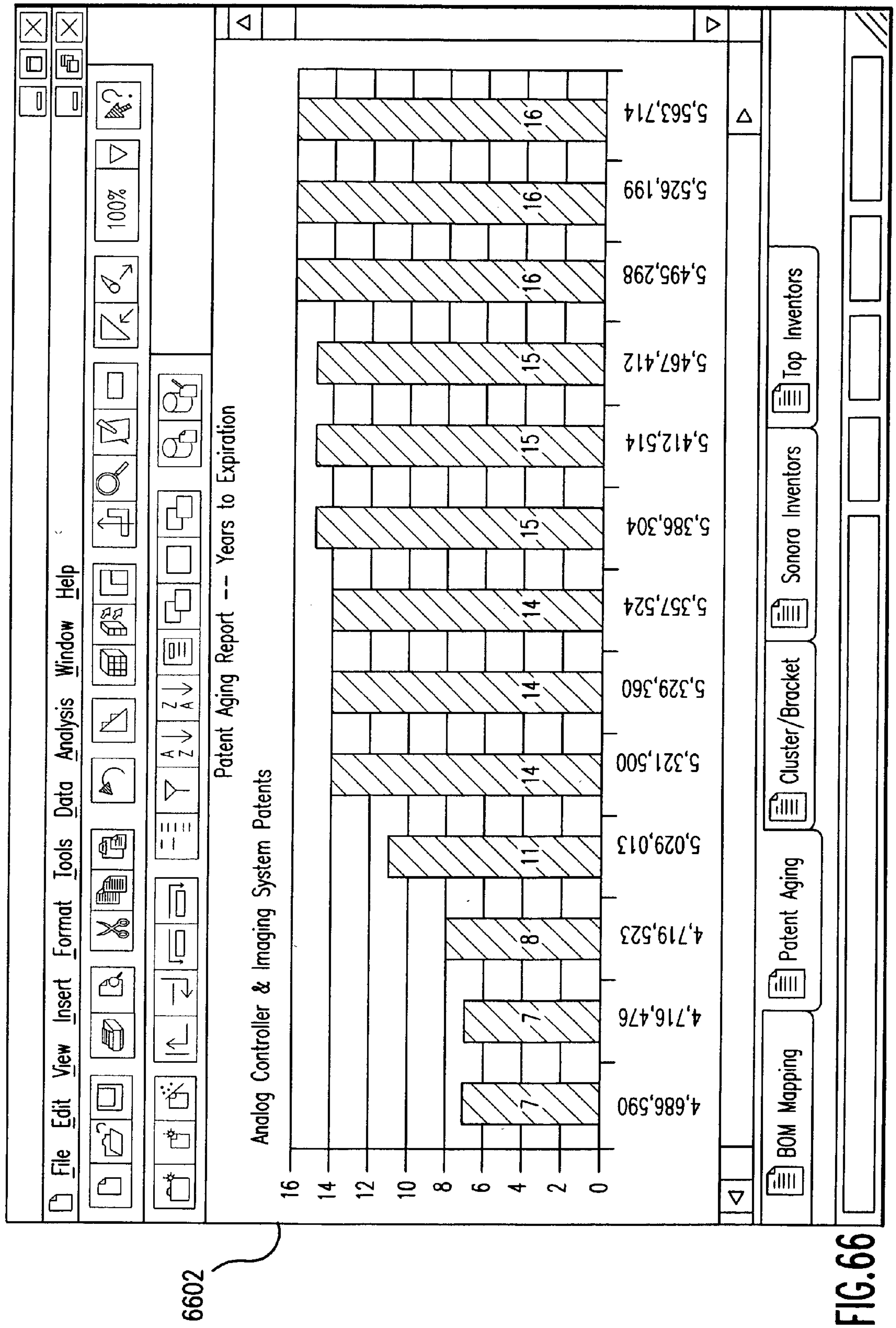

The display format 6602 of FIG. 66 is sorted by BOM group. The information for a BOM group titled "analog controller & imaging system patents" is shown in the example of FIG. 66. The display format 6602 displays the remaining patent term for the patents that map to the BOM group in a bar graph format.

Figure 67:
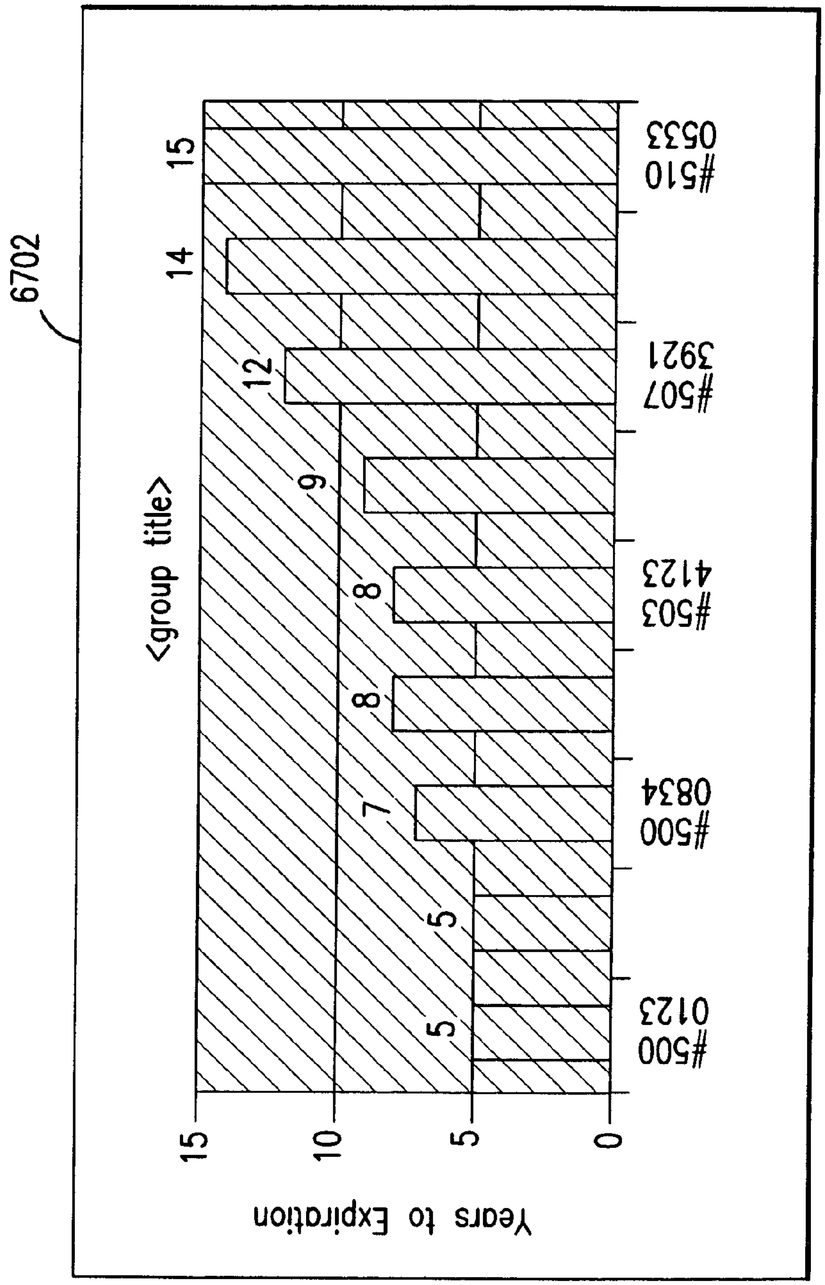

The display format 6702 shown in FIG. 67 is similar to that of display format 6602 shown in FIG. 66.

In step 8818, the client analysis module 716 determines whether the operator wishes to display the patent information in a standard format in conjunction with ownership information. If the operator elects to display the patent aging information in a standard report in conjunction with ownership information, then example display format 6902 shown in FIG. 69 is used. It is noted that, in order to utilize the display format 6902, the patent aging module 1006 must have previously have obtained ownership information on the patents identified in step 8808 from the corp_patent_xref table 1233, and forwarded this information to the requesting client 304, 306. Such an operation is represented by step 8820.

The example display format 6902 shown in FIG. 69 is organized by ownership status relative to a corporate entity which the operator previously identified (this corporate entity could have been identified, for example, in the information received by the patent aging module 1006 in step 8806). Thus, the information shown in the display format 6902 can refer to patents owned and licensed by the customer or any other corporate entity, such as the customer's competitors.

In step 8824, the patent aging module 1006 determines whether or not the operator wishes to view the patent aging information sorted by group. If the operator wishes to view the patent aging information sorted by group, then in step 8826 the patent aging information is displayed using an example format 6802 shown in FIG. 68. The display format 6802 displays patent expiration information sorted by group.

In step 8828, the patent aging module 1006 determines whether the operator wishes to view the patent aging information sorted by organization level. If the operator wishes to view the patent aging information sorted by organization level, then the patent aging information is displayed in step 8834 using an example format 7002 shown in FIG. 70. It is noted that format 7002 can be used only if corporate_level_id information is obtained from the corporate_entity table 1230 for each patent identified in step 8808, and if this information is forwarded to the requesting client 304, 306. This operation is performed by the patent aging module 1006 in the enterprise server 314, and is represented by step 8830. Additionally, the display format 7002 also requires that ownership information be obtained from the corp_patent_xref table 1233 by the patent aging module 1006, and that this information be forwarded to the requesting client 304, 306. Such ownership information is obtained for each patent identified in step 8808 and for the corporate entity identified by the operator in the information preferably received by the patent aging module 1006 in step 8806. This operation is represented by step 8832.

In the display format 7002 of FIG. 70, the patent aging information is sorted by organization level (that is, by the information from the corp_level_id attribute retrieved from the corporate_entity table 1230). Additionally, ownership information relative to the specified corporate entity is displayed along with remaining patent term information.

In step 8836, the patent aging module 1006 determines whether the operator wishes to view the patent aging information organized by BOM level. If the operator wishes to view the patent aging information organized by BOM level, then the client analysis module 716 displays the patent aging information in a display format similar to that shown in FIG. 70, however instead of being sorted by organization level as currently shown in FIG. 70, the patent aging information is sorted by BOM level. It is noted that, in order to display the patent aging information in this manner, the BOM level_id information must be retrieved from the BOM table 1217 for each of the patents identified in step 8808, and ownership information for these identified patents and for the operator-specified corporate entity must be obtained from the corp_patent_xref table 1233. Such operation is performed by the patent aging module 1006 in the enterprise server 314, and is represented by steps 8838 and 8840.

Patent Clustering and Bracketing Module

The patent clustering/bracketing module 1008 in the enterprise server 314 operates to identify and graphically represent potential relationships between a source patent and citing patents, where the citing patents are either cited in the source patent, or cite the source patent. Accordingly, the patent bracketing/clustering module performs a backwards operation, where it operates to identify potential relationships between a source patent and citing patents which were cited during the prosecution of the source patent. Additionally, the patent bracketing/clustering module 1008 also performs a forward function, where it attempts to identify potential relationships between a source patent and citing patents in which the source patent was cited.

Figure 89:
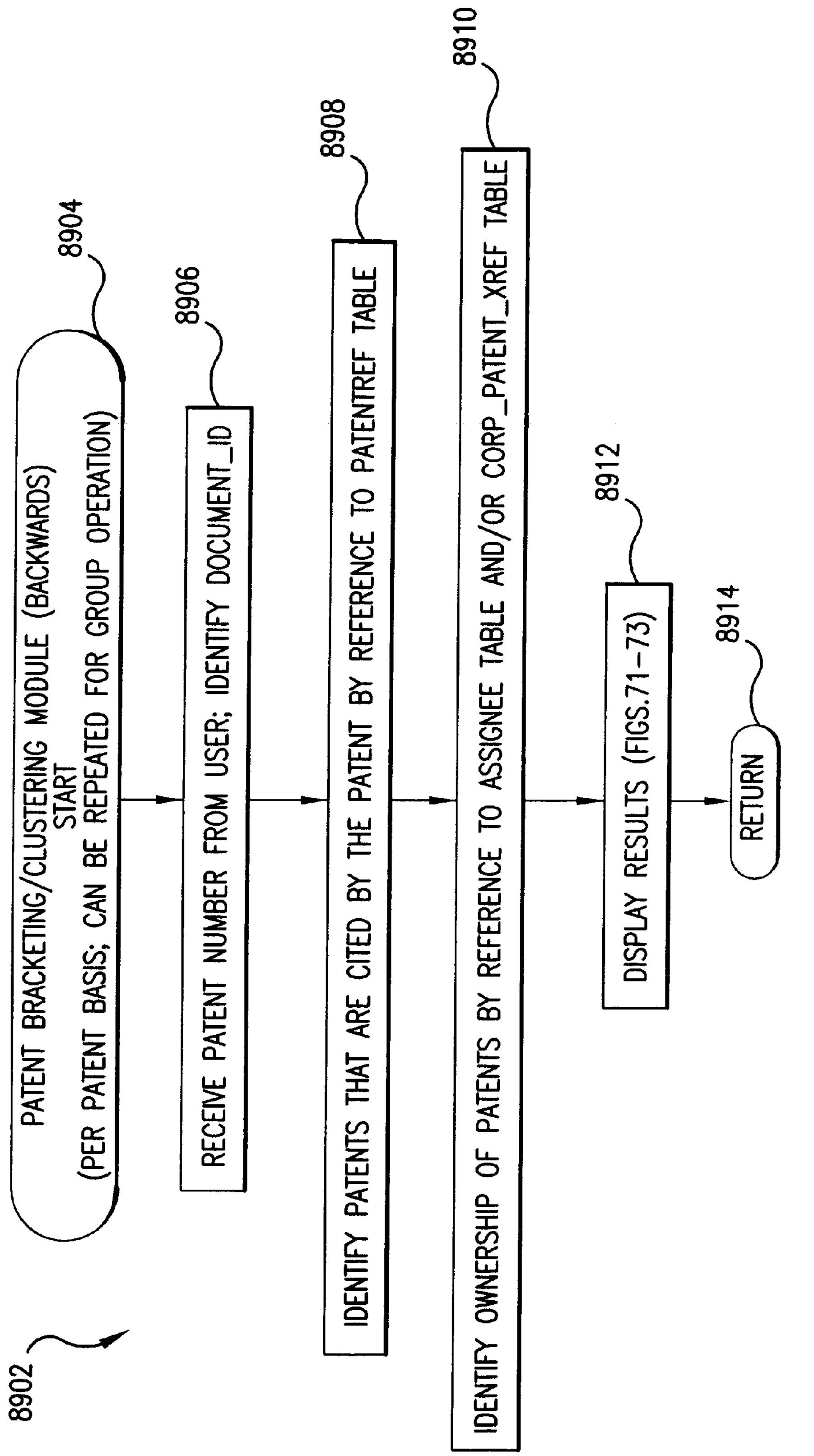
FIG. 89 is a flowchart representing the operation of the patent bracketing/clustering module when performing a backward patent bracketing/clustering function according to an embodiment of the invention.

The operation of the patent clustering/bracketing module 1008 when performing its backwards operation is represented by a flowchart 8902 in FIG. 89. In step 8906, the patent clustering/bracketing module 1008 receives information identifying a patent number from an operator at the requesting client 304,306. The patent clustering/bracketing module 1008 operates to identify the document_id of the patent having this patent number by using the patent number as an index in a search of the patent table 1222. This patent is called the source patent, for reference purposes.

In step 8908, the patent clustering/bracketing module 1008 identifies patents (called citing patents) that are cited by the source patent. The patent clustering/bracketing module 1008 performs step 8908 by using the document_id identified in step 8906 as an index during a search of the PatentRef table 1208.

In step 8910, the patent clustering/bracketing module 1008 identifies the ownership of the source patent and ownership of the citing patents by reference to the assignee table 1201 and/or the core_patent_xref table 1233. The patent clustering/bracketing module 1008 forwards the results of the above operations to the client analysis module 716 in the requesting client 304,306.

In step 8912, the client analysis module 716 displays the information received from the patent clustering/bracketing module 1008 in the client display unit 1122. The client analysis module 716 displays this information using any one of a number of formats, such as the example formats shown in FIGS. 71-73.

Figure 71:
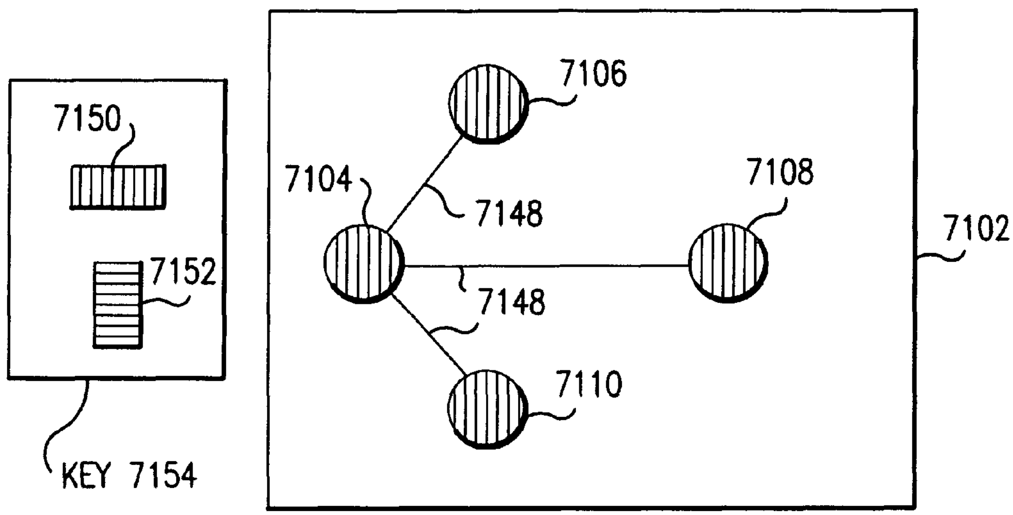
FIGS. 71-73 are examples of patent clustering/bracketing display formats.

In an embodiment, the display format 7102 in FIG. 71 displays the patent bracketing/clustering information in a horizontal-oriented tree format (this is also called a connected graph format). An icon 7104 at the root of the tree represents the source patent. This icon is filled with a first pattern designated by reference number 7150 in key 7154. Icons 7106, 7108 and 7110 represent the citing patents.

In the display format 7102, links 7148 are used to represent the relationship between the source patent (represented by icon 7104) and the citing patents (represented by icons 7106, 7108 and 7110). In particular, the links 7148 indicate that the citing patterns were cited during the prosecution of the source patent 7104.

The icons 7106, 7108, 7110 corresponding to citing patents are filled with the same pattern 7150 of the icon 7104 corresponding to the source patent if the citing patents are owned by the same corporate entity as the source patent. In the example of FIG. 71, the icons 7106, 7108, 7110 corresponding to the citing patents are all filled with the first pattern 7150, which is the same that is used to fill the icon 7104 corresponding to the source patent. Accordingly, the example in FIG. 71 indicates that all of the patents (both the source patent and the citing patents) are owned by the same corporate entity.

FIG. 71 illustrates a clustering scenario, because the corporate entity who owns the source patent and the citing patents has managed to cluster his patents in a given area of technology. Of course, this observation assumes that the source patent and the citing patents pertain to the same area of technology. However, this assumption is a reasonable one, given the relationship of the patents to one another (that is, given that the citing patents were cited during the prosecution of the source patent, and therefore can be presumed to be related to the source patent).

Figure 72:
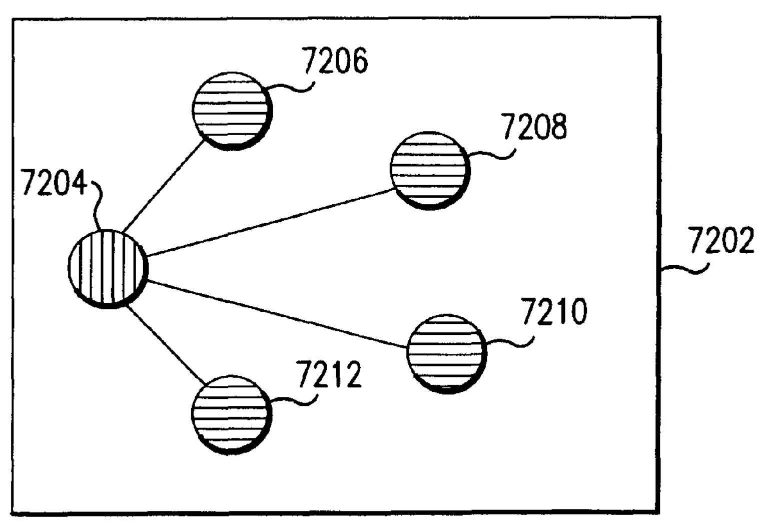

The example display format 7202 shown in FIG. 72 illustrates a scenario where the source patent 7204 is not owned by the same corporate entity as the citing patents 7206, 7208, 7210 and 7212. The scenario in FIG. 72 represents a potential bracketing situation, because the corporate entity who owns the source patent has not managed to obtain additional patents in the area of technology of the source patent. Instead, other corporate entities have obtained patents (represented by icons 7206, 7208, 7210 and 7212) in this area of technology. The source patent is potentially surrounded or bracketed by the citing patents.

Figure 73:
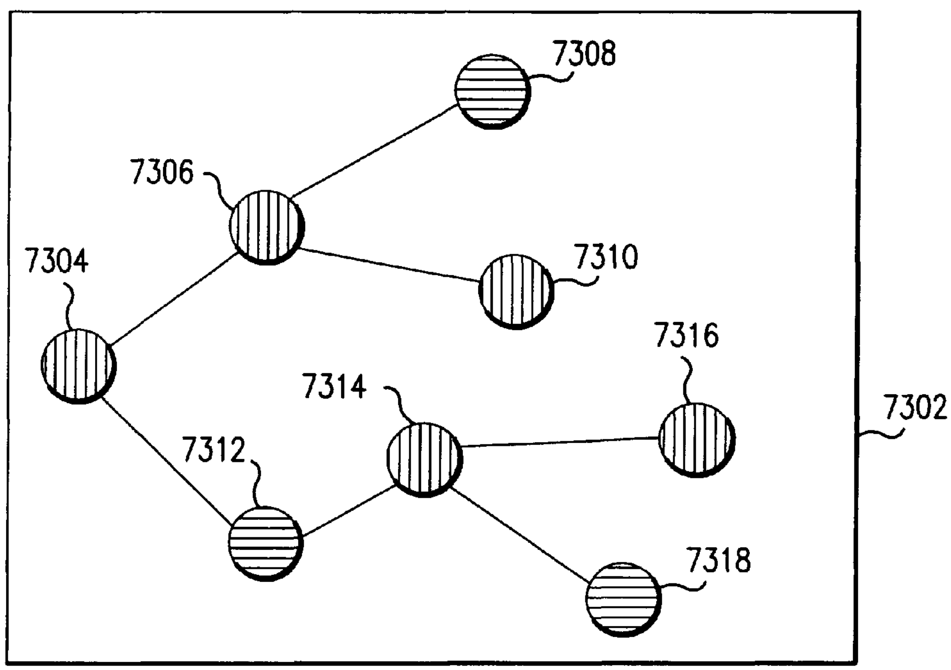

The patent clustering/bracketing module 1008 is capable of performing a multi-level, recursive patent bracketing/clustering function. The patent clustering/bracketing module 1008 performs such a function by performing steps 8908 and 8910 for each of the citing patents. This operation by the patent clustering/bracketing module 1008 can continue to any operator specified level of recursion. An example display format generated by the client analysis module 716 on the client display unit 1122 is shown in FIG. 73. The source patent is represented by icon 7304, and has two citing patents represented by icons 7306 and 7312. The patent corresponding to 7306 has itself two citing patents, represented by icons 7308 and 7310. The patent represented by 7312 has a citing patent represented by 7314, which itself has two citing patents represented by icons 7316 and 7318. The display in FIG. 73 represents a three-level patent bracketing/clustering scenario. This scenario in FIG. 73 also represents a hybrid clustering/bracketing situation. Note that the corporate entity who owns the root source patent (represented by icon 7304) also owns some of the citing patents in each level (that is, the patents represented by icons 7306, 7310, 7314 and 7316). However, there are some citing patents in the various levels which are not owned by this corporate entity.

Figure 90:
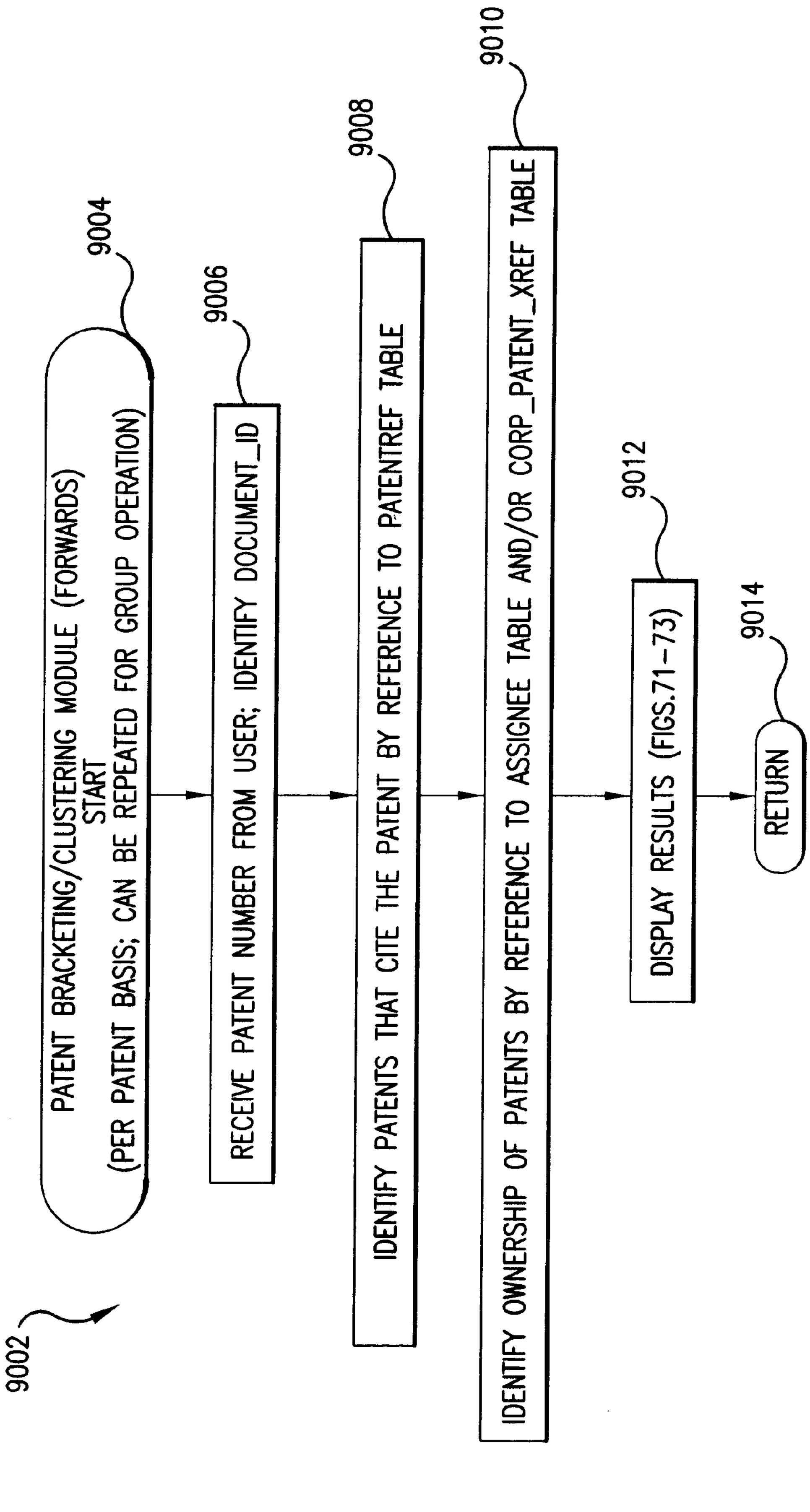
FIG. 90 is a flowchart illustrating the operation of the patent bracketing/clustering module when performing a forward patent bracketing/clustering function according to an embodiment of the invention.

The operation of the patent clustering/bracketing module 1008 when performing its forward operation is represented by a flowchart 9002 in FIG. 90. In step 9006, the patent clustering/bracketing module 1008 receives information from the operator that identifies a patent number. The patent clustering/bracketing module 1008 identifies the document_id that corresponds to a patent having this patent number by reference to the patent table 1222. This patent is called the source patent, for reference purposes.

In step 9008, the patent clustering/bracketing module 1008 identifies patents (called citing patents) in which the source patent is cited. The patent clustering/bracketing module 1008 performs step 9008 by reference to the PatentRef table 1208.

In step 9010, the patent clustering/bracketing module 1008 identifies the ownership of the source patent and the citing patents by reference to the assignee table 1201 and/or the core_patent_xref table 1233. The patent clustering/bracketing module 1008 sends the information obtained by the above operation to the client analysis module 716 at the requesting client 304, 306.

In step 9012, the client analysis module 716 displays this information on the client display unit 1122 using any of a number of display formats, such as the display formats shown in FIGS. 71-73. These display formats were described above.

It is noted that the operation of the patent clustering/bracketing module 1008, in performing the backwards operation (FIG. 89) and/or the forwards operation (FIG. 90), can be done on a group basis, instead of the individual patent basis as described above. In performing this functionality on a group basis, the patent clustering/bracketing module 1008 identifies all patents contained in the operator-specified group, and then identifies all citing patents of those patents in the operator-specified group. The client analysis module 716 displays the results of such group-oriented processing using any of a number of display formats, such as the formats shown in FIGS. 71-73, or in well-known formats suitable for displaying hierarchical data, such as the Xerox hyperbolic tree display format. It is noted that such display formats useful for displaying hierarchical structured data, such as the Xerox hyperbolic tree format, could also be used in the case of the individual patent operation represented by FIGS. 89 and 90.

Financial Module

The financial modules 1010 in the enterprise server 314 perform patent-centric and group-oriented processing of the data in the financial databases 638. Examples of the functions performed by the financial modules 1010 include determining the research and design (R&D) expenditures on a product or product line basis, determining the R&D expenditures per inventor or per employee on a product or product line basis, determining net licensing revenue on a product or product line basis, determining the number of patents issued on a product or product line basis, determining patent maintenance fees on a product or product line basis, determining market share on a product or product line basis, determining the tax rate on a product or product line basis, determining marketing costs on a product or product line basis, determining selling costs on a product or product line basis, determining the number of outstanding shares (P/E) on a product or product line basis, determining revenue on a product or product line basis, determining cumulative product revenue on a product or product line basis, etc. The financial modules 1010 can also perform the above processing on a geographical region basis, or on a time basis.

Reference is made to the financial databases 1247 and 1248 shown in FIG. 12M for an example of the processing performed by the financial modules 1010. For example, the financial modules 1010 operate to determine the R&D dollars on a product basis (more particularly, the R&D dollars on a group basis, such as a BOM group basis). Given a operator-specified product (or an operator-specified group, such as a BOM group), the financial modules 1010 reference the BOM financial table 1247 using the associated BOM_id as a key to identify the record in the BOM financial table 1247 associated with the operator-specified BOM group. From that record, the financial modules 1010 can retrieve the values stored in the R&D dollars attribute. This value represents the R&D dollars spent in developing the product associated with the BOM group. The financial modules 1010 can also retrieve from that record the gross revenue and the net revenue generated by that product.

As another example, the financial modules 1010 can determine the licensing revenue associated with any patent owned by the company. This is done by referencing the patent licensing table 1248 using the document_id of the operator-specified patent as an index to identify the record(s) in the patent licensing table 1248 corresponding to that operator-specified patent. Once the record is found, the financial modules 1010 can retrieve information on the licensee, licensor, and license revenue related to the license of the patent from the licensor to the licensee. It is noted that a given patent may have multiple entries in the patent licensing table 1248, corresponding to each licensor/licensee combination.

The financial modules 1010 transfer the information generated from the above-described operation to the client analysis module 716 in the requesting client 304, 306. The client analysis module 716 displays this information on the client display unit 1122, and enables the operator to manipulate the information.

Inventor Patent Count Module

Figure 91:
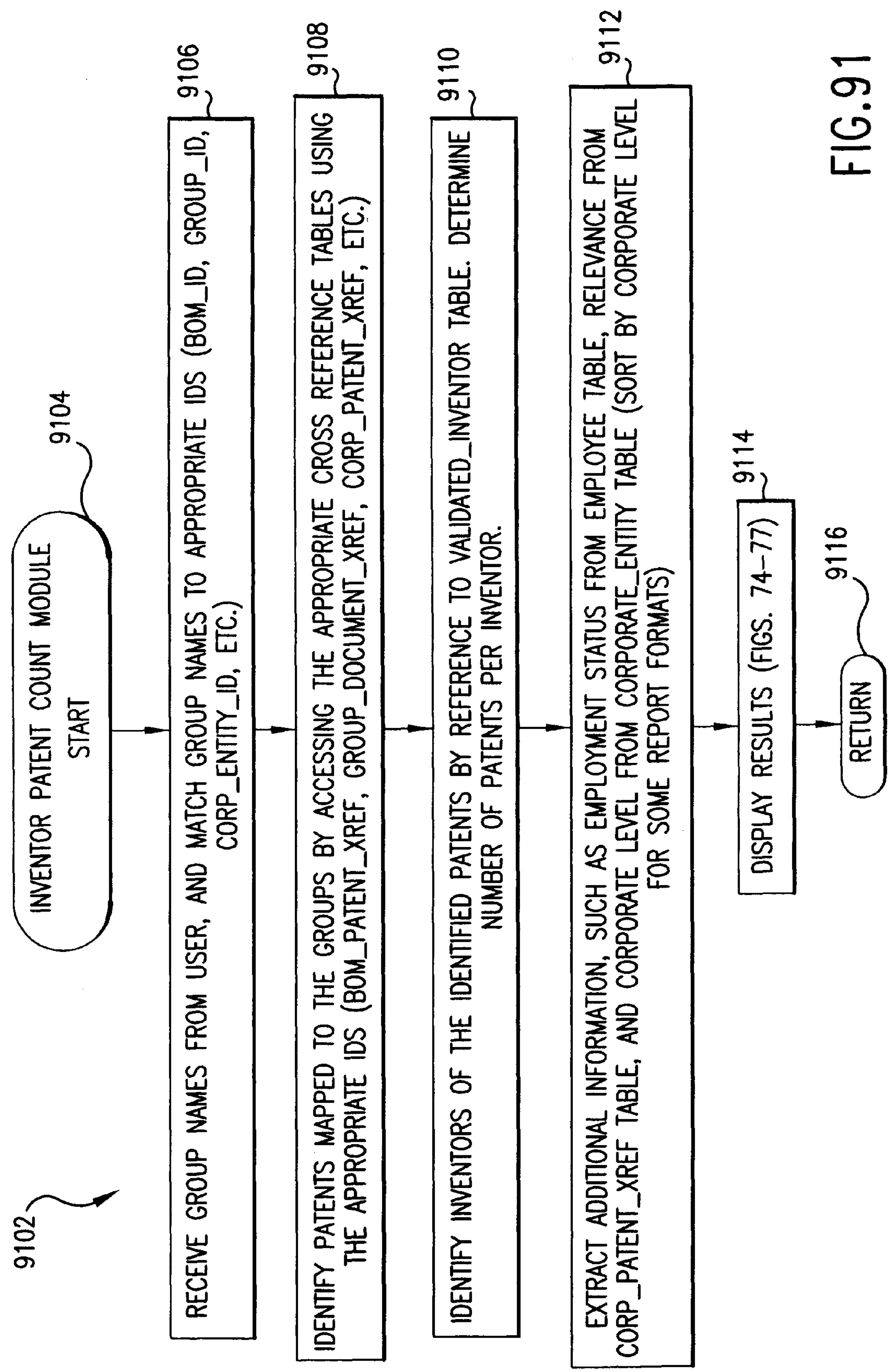
FIG. 91 is a flowchart depicting the operation of the inventor patent count module according to an embodiment of the invention.

The inventor patent count module 1012 in the enterprise server 314 operates to analyze patent inventor information to identify the top inventors for an operator-specified group. Top inventors are defined herein as being persons who most frequently are named as inventors on the patents in the group. The operation of the inventor patent count module is represented in the flowchart 9102 and FIG. 91.

In step 9106, the inventor patent count module 1012 receives from the operator at the requesting client 304, 306 information that identifies one or more groups. These can be any types of groups, such as BOM groups, corporate entity groups, operator-defined groups, etc. In an embodiment of the invention, the information received from the user identifies the group names of groups. These groups are called the operator-specified groups for reference purposes. In some embodiments, this information may also identify the types of the groups (i.e., BOM group, corporate entity group, user-defined group, etc.).

The inventor patent count module 1012 identifies the group IDs of the operator-specified groups by using the group names as indexes in searches of the appropriate group table (that is, the BOM table 1217, the group_table database 1227, and the corporate_entity table 1230).

In step 9108, the inventor patent count module 1012 identifies patents that are contained in the operator-specified groups. The inventor patent count module 1012 performs step 9108 by accessing the appropriate cross-reference tables using the group keys (identified in step 9106) as indexes. Such cross-reference tables include the BOM_patent_xref table 1218, the group_document_xref table 1228, and the corp_patent_xref table 1233.

In step 9110, the inventor patent count module 1012 identifies the inventors of the patents identified in step 9108 by reference to the validated_inventor table 1236. The inventor patent count module 1012 accesses the validated_inventor table 1236 using the document_ids of the patents identified in step 9108 as indexes. The inventor patent count module 1012 processes the patent and inventorship information obtained as described above to determine, for each person, the number of patents (in the operator-specified group) in which the person is named as an inventor.

In step 9112, the inventor patent count module 1012 extracts additional pertinent information from the databases 316, such as each person's employment status from the employee table 1243, the relevance of the identified patents from the corp_patent_xref table 1233, and the corporate levels of the corporate entities that own the identified patents from the corporate_entity table 1230. The inventor patent count module 1012 forwards the information resulting from the above operation to the client analysis module 716 in the requesting client 304, 306.

In step 9114, the client analysis module 716 displays this data to the operator on the client display unit 1122. The client analysis module 716 displays the inventor patent count information in any of a number of display formats, such as display formats shown in FIGS. 74-77.

Figure 74:
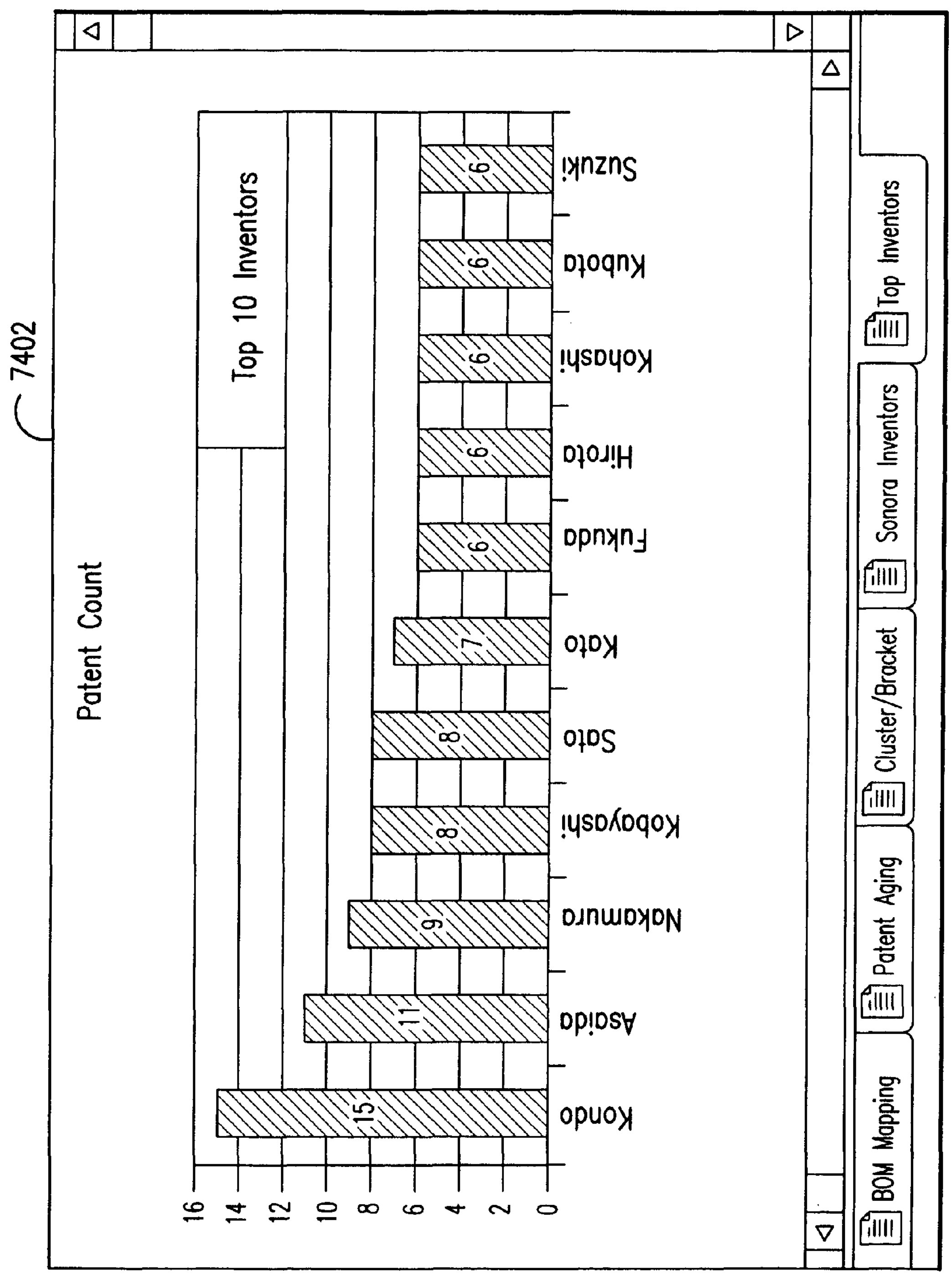
Figure 75:
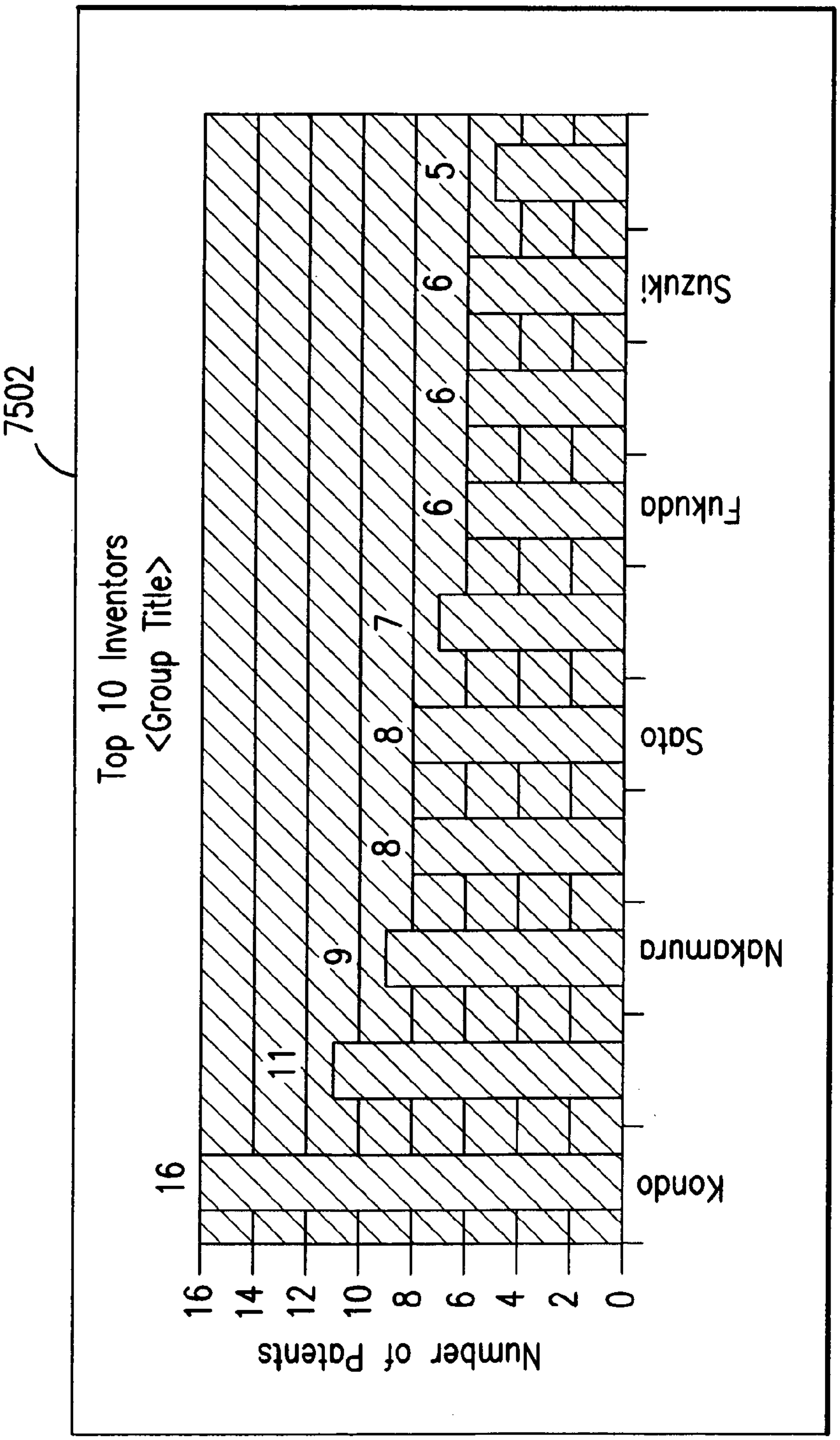

The sample displays in FIGS. 74 and 75 are similar, wherein the inventor patent count information is displayed in a bar graph format.

The display format 7602 in FIG. 76 displays the inventor patent count information in more of a spreadsheet or tabular format. This table lists, for a given group, the persons who are named as inventors of patents. Also listed are the number of patents in which each person is listed as inventor, as well as other information such as each person's employment status. Also listed in the display format 7602 of FIG. 76 is, for each person, the number of core patents and the number of non-core patents in which the person is named as an inventor.

The example display format 7702 in FIG. 77 is also a spreadsheet or tabular format sorted by organization level. The information contained in the format 7702 of FIG. 77 is similar to the information contained in the display format 7602 of FIG. 76.

Inventor Employment Information Module

Figure 92:
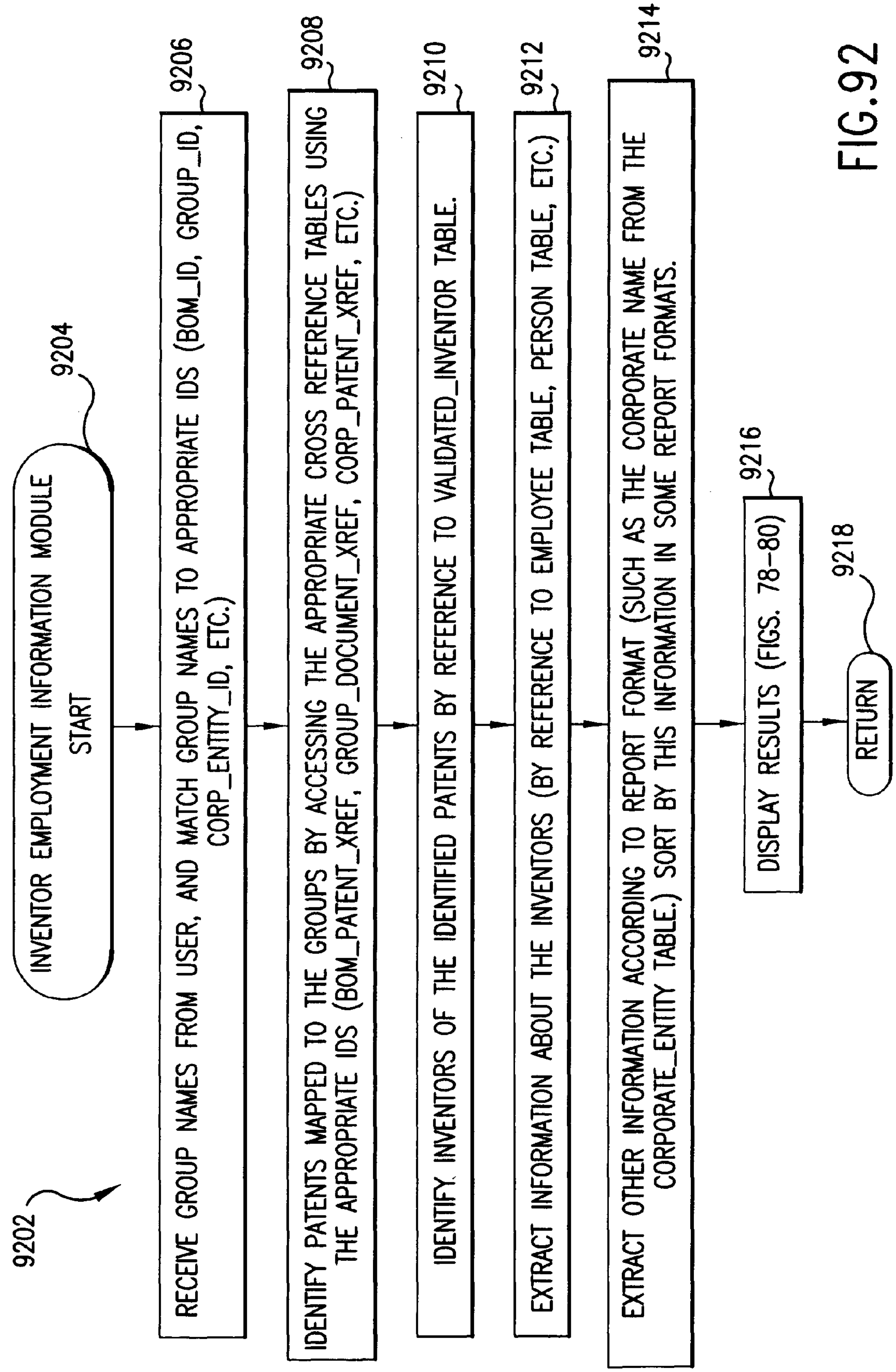
FIG. 92 is a flowchart depicting the operation of the inventor employment information module according to an embodiment of the invention.

The inventor employment information module 1014 in the enterprise server 314 operates to obtain information on persons who are named as inventors in patents that map to operator-specified groups. The operation of the inventor employment information module 1014 is represented by a flowchart 9202 in FIG. 92.

In step 9206, the inventor employment information module 1014 receives information from the operator at the requesting client 304, 306. This information identifies one or more groups, called operator-specified groups for reference purposes. Such groups may be BOM groups, user-defined groups, corporate entity groups, etc. In an embodiment of the invention, the information received from the operator identifies one or more group names that correspond to the operator-specified groups. The inventor employment information module 1014 identifies the group IDs of the operator-specified groups by reference to the appropriate group tables, such as the BOM table 1217, the corporate_entity table 1230, the group_table database 1227, etc. The inventor employment information module 1014 accesses these group tables using the group names as indexes.

In step 9208, the inventor employment information module 1014 identifies the patents which are contained in these operator-specified groups. These patents are called the identified patents for reference purposes.

The inventor employment information module 1014 performs step 9208 by accessing the appropriate cross-reference tables using the group IDs identified in step 9206. These cross-reference tables include the BOM_patent_xref table 1218, the group_document_xref table 1228, the corp_patent_xref table 1233, etc.

In step 9210, the inventor employment information module 1014 identifies the inventors of the identified patents (identified in step 9208) by reference to the validated_inventor table 1236. The inventor employment information module 1014 accesses the validated_inventor table 1236 using the document IDs for the identified patents identified in step 9208.

In step 9212, the inventor employment information module 1014 extracts from the databases 316 information about the inventors. Such information is extracted by the inventor employment information module 1014 from the person table 1242 and the employee table 1243.

In step 9214, the inventor employment information module 1014 extracts other information for display in reports, such as the names of the corporate entities who own or license the identified patents. Such information is retrieved from at least the corporate_entity table 1230. The inventor employment information module 1014 transfers the information obtained from the above processing to the client analysis module 716 at the requesting client 304, 306.

In step 9216, the client analysis module 716 displays this information on the client display unit 1122 in a variety of operator-selected display formats, such as the example display formats shown in FIGS. 78-80.

The display format 7802 in FIG. 78 sorts the inventorship data by group. Information pertaining to the patents that map to a particular group is displayed in tabular format. The display format 7902 in FIG. 79 is similar to the display format 7802 in FIG. 78.

The display format 8002 in FIG. 80 organizes data according to the corporate entity that owns the identified patent. Information pertaining to the patents owned by each corporate entity is presented in a tabular format.

Exporting Patent Data Module

Figure 94:
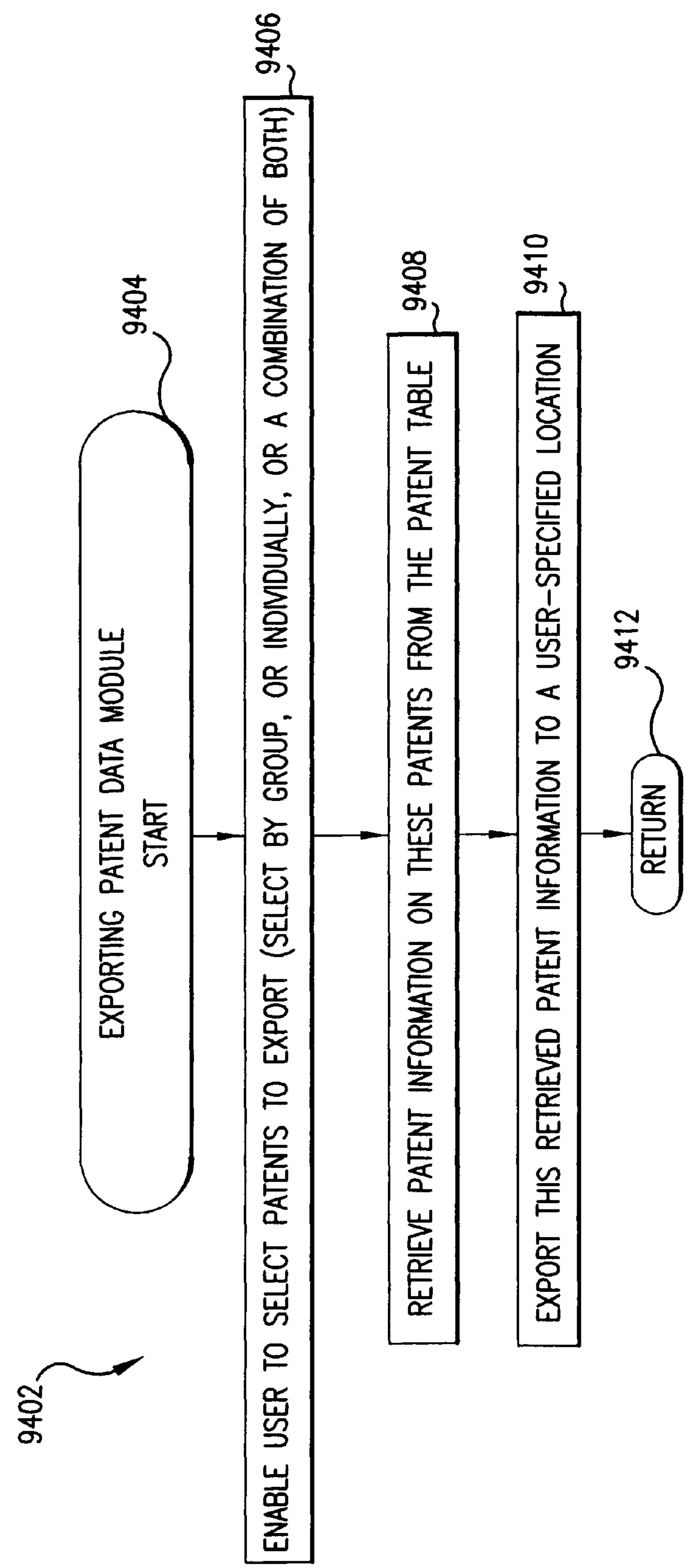
FIG. 94 is a flowchart depicting the operation of the exporting patent data module according to an embodiment of the invention.

The exporting patent data module 1018 in the enterprise server 314 operates to copy data from the databases 316 to an operator-specified location. For example, the exporting patent data module 1018, pursuant to operator command, can export a subset of the patent database 614 to an operator-specified location. The operator could then utilize this data locally, separate from the enterprise server 314. Operation of the exporting patent data module 1018 is represented by flowchart 9402 in FIG. 94.

In step 9406, the client analysis module 716 in the client 304, 306 enables the operator to select which of the patents in the patent database 614 to export. The operator can select such patents by group, or individually, or both by group and individually. The client analysis module 716 transfers this operator request to the exporting patent data module 1018 in the enterprise server 314.

In step 9408, the exporting patent data module 1018 causes the document storage and retrieval module 408 to retrieve information from the patent database 614 corresponding to the patents selected by the operator in step 9406. The enterprise server 314 transmits this information to the client 304, 306.

In step 9410, the client analysis module 716 copies the information retrieved from the enterprise server 314 to a operator-specified location.

Importing Patent Data Module

As discussed above, the exporting patent data module 1018 operates to copy a portion of the customer's patent repository (stored in the patent database 614) to a operator-specified location. The operator can then work locally with this patent information. Eventually, the operator may want to update the databases 316 in the enterprise server 314 with any updates made to this subset of the patent database 614.

Figure 93:
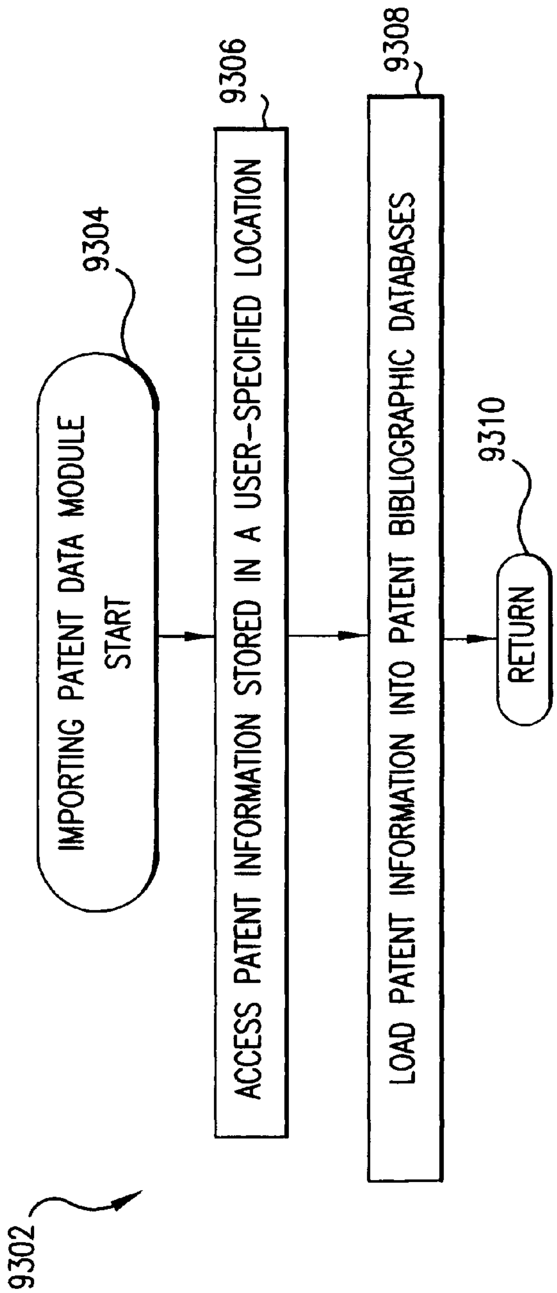
FIG. 93 is a flowchart depicting the operation of the importing patent data module according to an embodiment of the invention.

The importing patent data module 1016 in the enterprise server 314 operates to perform this functionality. In particular, the importing patent data module 1016 imports to the databases 316 data that a operator has been working with locally, separate from the enterprise server 314. The operation of the importing patent data module 1016 is represented by a flowchart 9302 in FIG. 93.

In step 9306, the client analysis module 716 in the client 304, 306 accesses patent information stored in an operator-specified location 9306 which is local to the client 304, 306. The client 304, 306 transfers this patent information to the enterprise server 314.

In step 9308, the importing patent data module 1016 receives this information from the client 304, 306 and loads the patent information into the databases 316, including the patent database 614 and the patent bibliographic databases 604.

Methodology Embodiments

The present invention can be used to perform many patent-centric and/or group-oriented tasks. These tasks would be of interest to business customers. These tasks include, but are not limited to:

- determining patent ownership;
- mapping patents to products;
- mapping patents to corporate entities;
- mapping patents to employees;
- mapping employees to inventors;
- identifying patents that are licensed;
- identifying remaining patent terms on licensed patents;
- analyzing unused licensed patents to determine whether the technology covered by these patents would be helpful in developing new products or features;
- determining if licensed patents are being used by the company;
- determining the extent and the length of patent protection on core products;
- determining whether additional patent protection should be sought on core products;
- determining whether the company has adequately protected an area of technology;
- determining whether competitor companies have been able to protect portions of an area of technology;
- examining a competitor's patents on a product line basis;
- examining a competitor's patents via patent term analysis;
- examining a competitor's inventors;
- identifying potential infringement of the company's patents;
- determining whether key inventors are still employed by the company;
- determining whether inventors currently employed by competitors should be hired;
- determining the extent to which a contemplated future product is currently protected by the company's patents;
- determining whether and to what extent patent applications should be filed on a contemplated future product;
- determining whether features of a contemplated future product are covered by competitors' patents;
- determining whether a present or future product should be modified in order to design around a competitor's patent;
- determining whether features in current or future products have been adequately protected by patents;
- determining whether the company should retain, sell, or expand a business area;
- determining whether non-core patents should be sold or licensed;
- determining whether the maintenance fees on non-core patents should be paid;
- determining whether the customer's human resources are being most effectively used;
- determining whether licensed patents cover the company's products in order to decide whether to maintain or cancel the licenses;
- determining whether the company should file continuation applications to offset the expiration of current patents;
- determining the R&D expenditures on a product basis;
- determining the R&D expenditures per inventor/employee on a product basis;
- determining the net licensing revenue on a product basis;
- determining the patent budget on a product basis;
- determining the number of patents issued on a product or product line basis;
- determining the patent maintenance fees on a product or product line basis;

- determining the customer's market share on a product or product line basis;
- determining the customer's tax rate on a product or product line basis;
- determining the marketing cost on A product or product line basis;
- determining the selling cost on a product or product line basis;
- determining the allocated cost on a product or product line basis;
- determining the number of outstanding shares (P/E) on a product or product line basis;
- determining the product revenue on a product or product line basis;
- determining the cumulative product revenue on a product or product line basis;
- determining the number of core patents on a product or product line basis;
- determining the number of non-core patents on a product or product line basis;
- determining the ratio of core to non-core patents on a product or product line basis; and
- determining the number of licensed patents on a product or product line basis.

The tasks listed above, and other tasks that would be useful to the business customer, can be performed by invoking the analysis modules 416, either individually or in combination. For example, some of the tasks mentioned above can be performed by invoking the patent mapping module 1002 alone. Others of the tasks listed above require, for example, the invocation of the patent mapping module 1002 in combination with one or more of the other analysis modules 416, such as the patent citation module 1004 or the patent aging module 1006.

The performance of some of the tasks mentioned above involve human intervention. Specifically, with some of the tasks, one or more of the analysis modules 416 are invoked. These analysis modules 416 automatically process data in the databases 316, and automatically prepare reports (generally called methodology reports) based on such processing. One or more human operators then analyze the reports to complete the tasks. The invention supports and assists the human operators in performing their functions by automatically analyzing data and running reports.

In some embodiments, the invention includes expert system(s) 1020 to automatically analyze and process the data in the reports that were automatically generated by the analysis modules 416. It is noted that the expert system 1020 is shown as being a part of the analysis modules 416 in FIG. 10, but may in practice be a separate component of the enterprise server 314, or may form part of the client 304, 306.

In these embodiments, the expert system 1020 either aids the human operators in performing the above-listed tasks, or completely replaces the human operators in analyzing the data that was automatically generated by the analysis modules 416. Such expert systems 1020 could be trained (using well known procedures) with the knowledge and experience of the human operators. The structure and operation of expert and rule based systems, and the training of such systems, are well known and are described in a number of publicly available documents, including (but not limited to) Charniak et al., *Introduction to Artificial Intelligence*, Addison Wesley, 1986, and Nils J. Nilsson, *Principles of Artificial Intelligence*, Morgan Kaufmann, Los Altos, Calif., 1980, which are incorporated herein by reference in their entireties. The manner in which to construct and train expert systems to automatically perform a part of or all of the processing described herein as being performed by human operators will be apparent to persons skilled in the relevant art(s).

Various patent-centric and group-oriented methodologies of the present invention are described below. These methodologies represent tasks that can be performed (either with or without human involvement) through use of the invention. These methodologies essentially involve two steps. In the first step, one or more analysis modules 416 are invoked for the purpose of automatically accessing and processing data contained in the databases 316, and for the purpose of automatically reporting on such processing (such reports are generally called methodology reports). In the second step, the reports generated by the analysis modules 416 are analyzed, and business-related actions, plans, and/or strategies are taken or developed based on the analysis. This second step may be performed by human operators, or may be automatically performed by expert systems (as described above), or may be performed by a combination of human operators and expert systems. In the following description of the methodologies, the second step is described as being performed by human operators. It should be understood, however, that the second step could alternatively be performed by expert systems, or by expert systems in combination with human operators.

The methodologies described below represent a sampling of the tasks that can be performed through use of the invention. The invention is adapted and intended to perform other patent-centric and group-oriented tasks, particularly tasks that can be implemented through mining and/or processing of the data in the databases 316. Accordingly, the following methodologies are described herein for purposes of illustration, and not limitation.

Patent Mapping and Mining

A corporate entity can utilize the present invention in order to perform a patent mapping and mining process. This process is an internally focused analysis where the impact of the corporate entity's patents (both owned and licensed) on the corporate entity is analyzed. The business impact of this process is to provide high financial leverage within the corporate entity. The patent mapping and mining process provides a tangible way of defining core (active) and non-core (non-active) patents and how they relate to the corporate entity's business. Short term financial results of the patent mapping and mining process can be found in licensing opportunities and non-renewal of inactive patents and licensed patents.

It is noted that the customer may, based on its own practices or needs, define the meaning of core and non-core. For example, core could correspond to patents being used by the customer, and non-core could correspond to patents not being used by the customer. Accordingly, the definition of core and non-core is implementation dependent.

Figure 102:
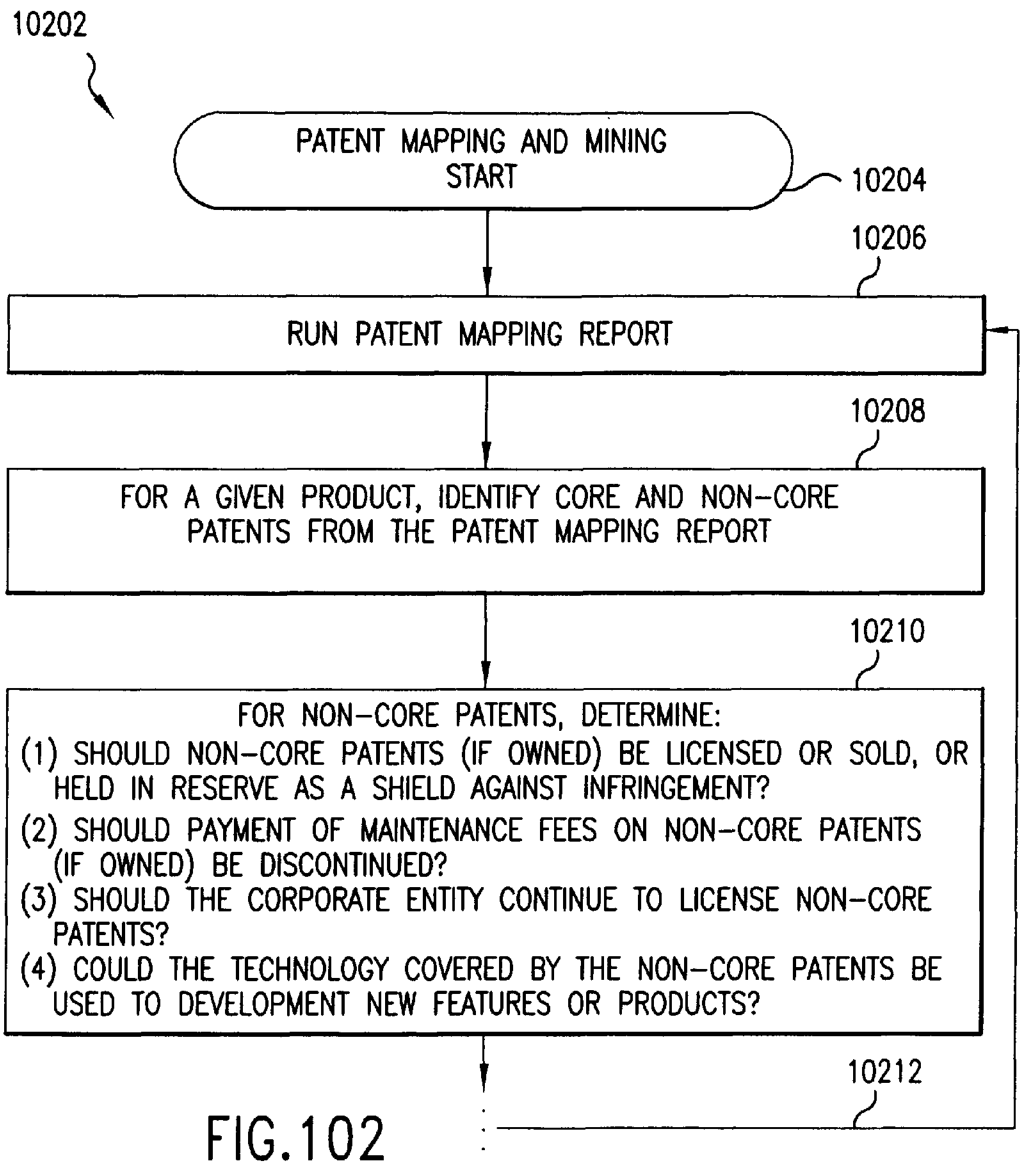
FIG. 102 is a flowchart representative of a patent mapping and mining process.

A flowchart 10202 in FIG. 102 illustrates an example patent mapping and mining process. In FIG. 10206, an operator (that is, an employee or agent of the customer corporate entity) at a client 304, 306 issues a command that causes the patent mapping module 1002 to run a patent mapping report with respect to a product specified by the operator. The patent mapping module 1002 runs a patent mapping report on the BOM group corresponding to the operator-specified product in the manner discussed above. Example patent mapping reports are shown in FIGS. 59 and 60.

In step 10208, the operator identifies from the patent mapping reports the core and non-core patents that map to the BOM group corresponding to the operator-specified product. For example, in the example display of FIG. 59, if the operator specified product is the analog special effects controller subassembly 5904, then the operator would be able to determine from the patent mapping report that U.S. Pat. Nos. 4,719,523; 4,686,590; 4,716,476 and 5,029,013 were non-core patents. In contrast, if the operator specified group was the digital color correction subassembly 5906, then the operator could identify from the patent mapping report that U.S. Patent Nos. 5,381,175; 5,452,018; and 5,353,059 were core patents.

In step 10210, the operator considers various business options with respect to the non-core patents. In particular, the operator considers whether the non-core patents should be licensed or sold. This determination may be based on whether the corporate entity is contemplating the introduction of future products having features that would be covered by the non-core patents.

The operator may also consider whether or not the non-core patents should be held in reserve as a shield against a possible allegation of infringement by a competitor. This issue may depend on whether the non-core patents cover technology which is used by competitors. The operator can run patent citation reports (performed by the patent citation module 1004) and/or patent clustering/bracketing reports (performed by the patent clustering/bracketing module 1008) to determine whether it appears that its competitors are active in the areas of technology covered by the non-core patents.

The operator could also consider whether patent maintenance fees should be paid on the non-core patents. This issue, like those discussed above, may depend on whether the corporate entity intends to use the technology covered by the non-core patents in future products, or whether or not the corporate entity's competitors are currently using the technology covered by the non-core patents. A decision to discontinue payment of maintenance fees on the non-core patents would result in an immediate monetary savings for the corporate entity.

Also, the operator could consider whether or not the corporate entity should continue to license the non-core patents. The issues involved with this determination are similar to those discussed above. If the corporate entity decides to discontinue the license of the non-core patents, then the corporate entity could realize an immediate cost savings.

Further, the operator could consider whether the technology covered by the non-core patents could be used in the development of new features or products for the corporate entity.

In the above, step 10210 is described as being performed by a single operator. In practice, the performance of step 10210 may require the involvement of many people with knowledge in many different fields and having different abilities (or expert systems with this knowledge and abilities).

The patent mapping and mining process as represented in flowchart 10202 is an iterative process, as represented by control arrow 10212. In other words, the patent mapping and mining process represented in flowchart 10202 could be performed repeatedly over time for the same product, or could be performed a number of times, each time for a different product.

Situation Assessment

A corporate entity could use the present invention to perform a situation assessment process. A situation assessment process focuses on the corporate entity's current business situation. The situation assessment process determines the strategic "playing field" of the corporate entity's business as it relates to its patents and products. By performing a situation assessment process or analysis, the corporate entity can begin to analyze its current market in the competitive situation in relation to its products and patents. The situation assessment analysis begins by running a number of methodology reports in order to better understand the corporate entity's competitive situation. These methodology reports provide a clear understanding of a number of patent related business metrics, including:

- potential patent infringement;
- the length of protection on core product patents based on patent aging reports;
- how well the corporate entity's patents are clustered to protect current and future products and key features;
- determination of whether competitors are bracketing the company's current and future products through their patents;
- determination of whether key technologists who have developed the current core products are still in the company or have gone to competitors;
- a determination of whether key inventors and other R&D personnel are working on appropriate products based on the corporate entity's strategic direction; and
- a determination of whether any R&D resources should be reallocated for best use of human resources.

Based on the above patent related business metrics, the corporate entity can determine what strategic steps need to be implemented in relation to: merger and acquisitions, human resources (HR) retention programs, patent licensing programs, patent acquisition programs, product or division sale, appropriate tax strategies, etc.

Figure 103:
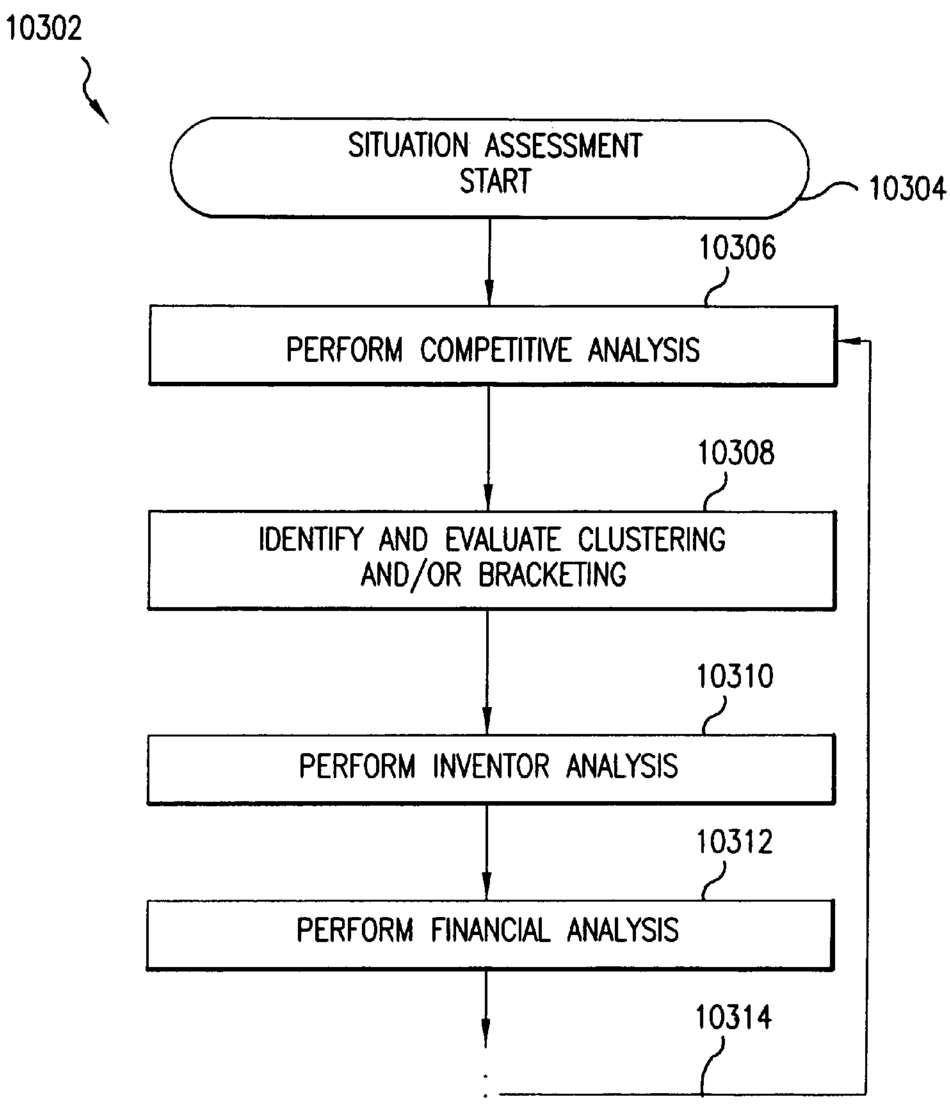
FIG. 103 is a flowchart representative of a situation assessment process.

A flowchart 10302 in FIG. 103 illustrates an example situation assessment process.

In step 10306, a competitive analysis process is performed to identify and analyze the positions of the corporate entity's competitors. In performing the competitive analysis process, the corporate entity examines the competitor's products per product line, examines competitor's patents via aging reports, profiles competitor's inventors, and determines whether competitors are potentially infringing the corporate entity's patents. Details of the competitive analysis process is described below.

In step 10308, patent clustering and bracketing are evaluated. In performing this evaluation, the corporate entity runs clustering and bracketing reports for future product protection, determines if product features have been adequately protected, determines if the corporate entity's present and future core technologies have been adequately protected by patents, etc. Details of the clustering and bracketing process are described below.

In step 10310, an inventor analysis is performed. In performing this inventor analysis, the corporate entity analyzes inventorship with respect to patents covering its core technology, analyzes cornpetitor's inventors, determines whether it should consider hiring the inventors of its competitors, determines whether its own employee retention program should be modified in any way, etc. Details of the inventor analysis are described below.

In step 10312, the corporate entity performs a financial analysis process using the present invention. In performing this financial analysis, the corporate entity evaluates a number of patent-centric and group-oriented business metrics, such as the R&D expenditures per product, the R&D expenditures per inventor for a product line, the net licensing revenue per product line, the patent budget for a product line, the patent maintenance fees associated with a product line, the market share of a product line, the tax rate of a product line, marketing costs of a product line, selling costs of a product line, allocated costs of a product line, product revenue over product costs, etc. Details of this financial analysis process are described below.

The situation assessment process is an iterative one, as represented by control arrow 10314 in the flowchart 10302. The steps of flowchart 10302 can be performed repeatedly, and in any order. Thus, the steps in FIG. 103 are provided for purposes of illustration, not limitation.

Competitive Analysis

Figure 104:
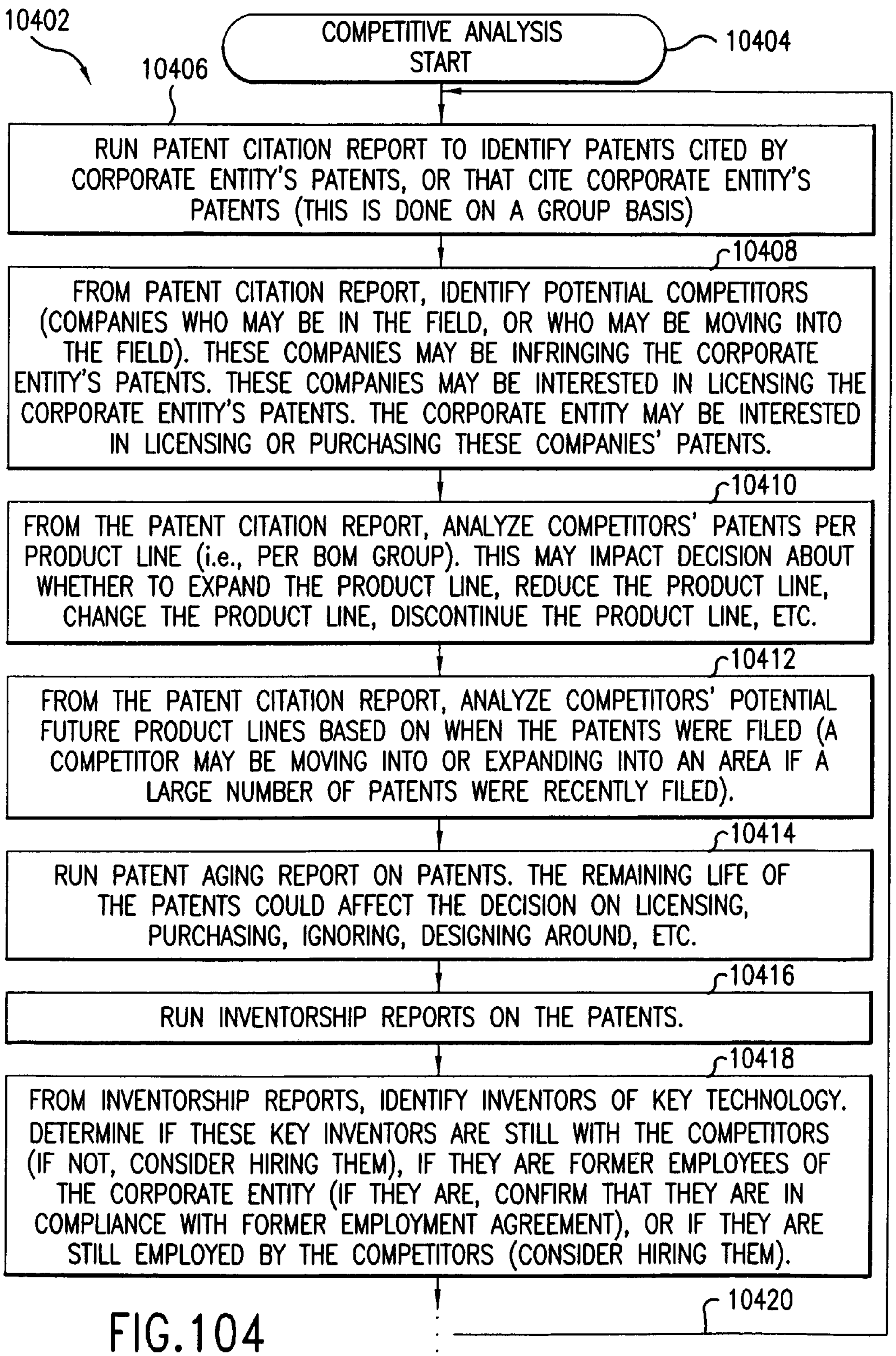
FIG. 104 is a flowchart representative of a competitive analysis process.

FIG. 104 is a flowchart 10402 representing the operation of the competitive analysis process.

In step 10406, an operator associated with the corporate entity (such as an employee or consultant of the corporate entity) located at a client 304, 306 issues a command to the patent citation module 1004 to run a patent citation report on the patents in a group specified by the operator. The operator may request that either a backwards and/or a forwards patent citation report be formed. The manner in which the patent citation module 1004 performs the patent citation process is described above. Examples of patent citation reports are shown in FIG. 61-65.

In step 10408, the operator, by reference to the patent citation report, identifies the companies who are the current assignees of the citing patents. These companies may be potentially working in the same technological areas as the source patents since their patents either cited the source patents (in the case of forwards patent citation reports), or they were cited in the source patents (in the case of backwards patent citation reports). Accordingly, the assignees of the citing patents may potentially be competitors of the customer corporate entity (assuming, of course, that the assignees of the citing patents are not the same as the customer corporate entity). Accordingly, in step 10408, the operator, through analysis of the patent citation report, is able to identify potential competitors of the customer client entity with respect to the technological area of the operator-specified group. It is noted that these potential competitors may be infringing the corporate entity's patents (that is, the source patents). These potential competitors may also be interested in licensing the corporate entity's patents (the source patents). Further, the customer corporate entity may be interested in licensing or purchasing the patents listed as citing patents in the patent citation report.

In step 10410, the operator further analyzes the patent citation report to determine the potential strength of the competitors' positions in the technological areas relative to the source patents. For example, if a large number of the citing patents are assigned to a given competitor company, then that may indicate that the competitor company has a strong patent position with respect to the technological area of the associated source patent. An operator may conclude from this that the customer corporate entity should consider reducing its product line or even discontinuing the product line given the potential strengths of the competitor's patents in the area. Other options would be to sell the product line to the potential competitor, or modify the product line to avoid any potential patent infringement by the customer client entity of the competitor's patents.

In step 10412, the operator reviews the patent citation report to identify a competitor's potential future product direction. The operator performs step 10412 by noting the number of patents that a potential competitor has in an area, and also noting the filing and issue dates of those patents. This information may indicate the extent to which a potential competitor is interested in a technological area. For example, if a potential competitor has a large number of patents in an area, and those patents were filed or issued relatively recently, then that may be an indication that the potential competitor is preparing to move into or expand its presence in the area.

In step 10414, the operator issues a command that causes the patent aging module 1006 to run an aging report. The patent aging reports are run with respect to the citing patents (that is, the patents which are owned by potential competitors). The manner in which the patent aging module 1006 performs the patent aging function is described above. Examples of patent aging reports are shown in FIGS. 66-70. The operator analyzes the patent aging report in view of issues including whether or not to license competitor patents, purchase competitor patents, design around competitor patents, ignore competitor patents, etc. These decisions are impacted by the remaining terms of the competitor patents. For example, if a potentially relevant competitor patent has a long patent term remaining, then the customer corporate entity may be more inclined to license or purchase the patent. In contrast, if the patent has a short term remaining, then the customer corporate entity may be more inclined to ignore the patent or design around the patent.

In step 10416, the operator issues commands that cause the inventor patent count module 1012 and the inventor employment information module 1014 to run inventorship reports on the patents owned by the potential competitors. The manner in which the inventor patent count module 1012 and the inventor employment information module 1014 operate to run these inventorship reports are described above. Examples of inventor patent count reports are shown in FIGS. 74-77. Examples of inventor employment information reports are shown in FIGS. 78-80.

In step 10418, the operator analyzes inventor patent count reports to identify the top inventors of patents covering key technology. The operator analyzes the inventor employment information reports to determine if these key inventors are still with the competitors. If they are not, then the operator can consider whether the corporate entity should consider hiring the inventors. Also from the inventor employment information reports, the operator can determine if the top inventors were former employees of the customer corporate entity. If they were, then the operator can set in motion processes to insure that these inventors are complying with their former employment agreements with the customer corporate entity. Further from the inventor employment information reports, the operator can determine if the top inventors are still employed by the competitors. If they are, the operator can consider whether the corporate entity should consider hiring these top inventors.

The competitive analysis process is an iterative one, as indicated by control arrow 10420. The steps of flowchart 10402 can be performed repeatedly, and in any order. Therefore, the steps of flowchart 10402 are provided in FIG. 104 for purposes of illustration, and not limitation.

The above operation is described as being performed by a single operator. In practice, the above operation may require the involvement of many people with knowledge in many different fields and having different abilities (or expert systems with this knowledge and abilities).

Clustering and/or Bracketing

Figure 105:
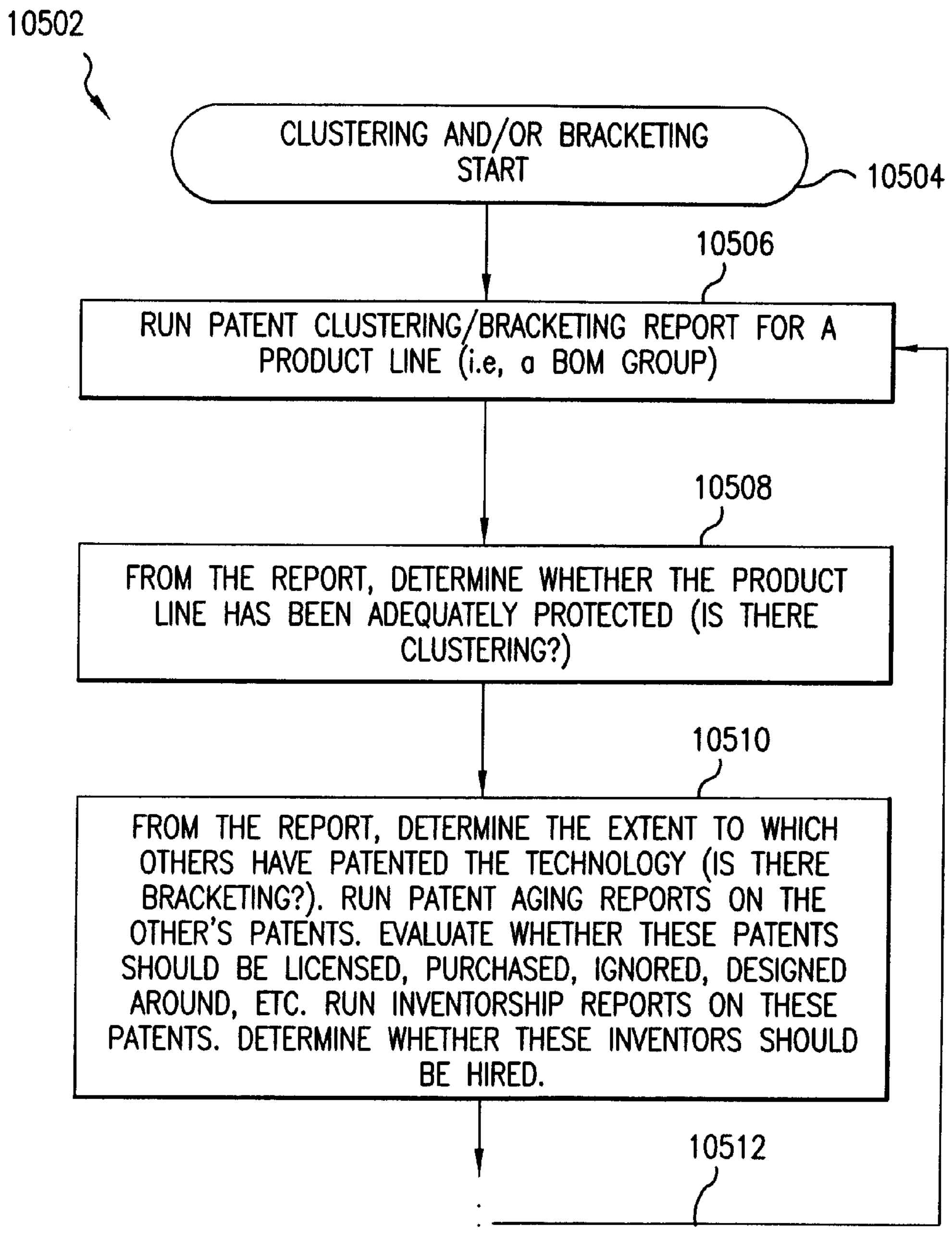
FIG. 105 is a flowchart representative of a clustering and/or bracketing process.

The clustering and/or bracketing process is illustrated in a flowchart 10502 in FIG. 105. In step 10506, an operator associated with the customer corporate entity at a client 304, 306 issues commands to run patent clustering/bracketing reports for a particular product, called the operator specified product for reference purposes. This product corresponds to a BOM group. The patent clustering/bracketing module 1008 in the enterprise server 314 runs these patent clustering/bracketing reports for the operator specified BOM group. The operation of the patent clustering/bracketing module 1008 is described above. Examples of patent clustering/bracketing reports are shown in FIGS. 89 and 90.

In step 10508, the operator studies the patent clustering/bracketing reports to determine whether the customer client entity's product has been adequately protected by the customer corporate entity's patents. In other words, the operator reviews the clustering/bracketing report to determine whether or not clustering exists. An example of clustering is shown in FIG. 71.

In step 10510, the operator reviews the patent clustering/bracketing reports to determine the extent to which others have patented the technology related to the patents in the BOM group associated with the operator-specified product. In other words, the operator in step 10510 analyzes the patent clustering/bracketing reports to determine whether full or partial bracketing exists. An example of full bracketing is shown in FIG. 72. An example of partial bracketing is shown in FIG. 73.

Based on the above analysis, the operator evaluates whether these patents owned by others should be licensed, purchased, ignored, designed around, etc. To assist in performing this evaluation, the operator may run patent aging reports and/or inventorship reports on these patents owned by others. These reports will aid the operator in conducting the evaluation.

The clustering and/or bracketing process is an iterative one, as represented by control flow arrow 10512. The steps of the clustering and/or bracketing flowchart 10502 can be performed repeatedly for the same or different BOM groups, and can be performed in any order. Accordingly, the steps of the clustering and/or bracketing flowchart 10502 are presented in FIG. 105 for purposes of illustration, and not limitation.

The above operation is described as being performed by a single operator. In practice, the above operation may require the involvement of many people with knowledge in many different fields and having different abilities (or expert systems with this knowledge and abilities).

Inventor Analysis

Figure 106:
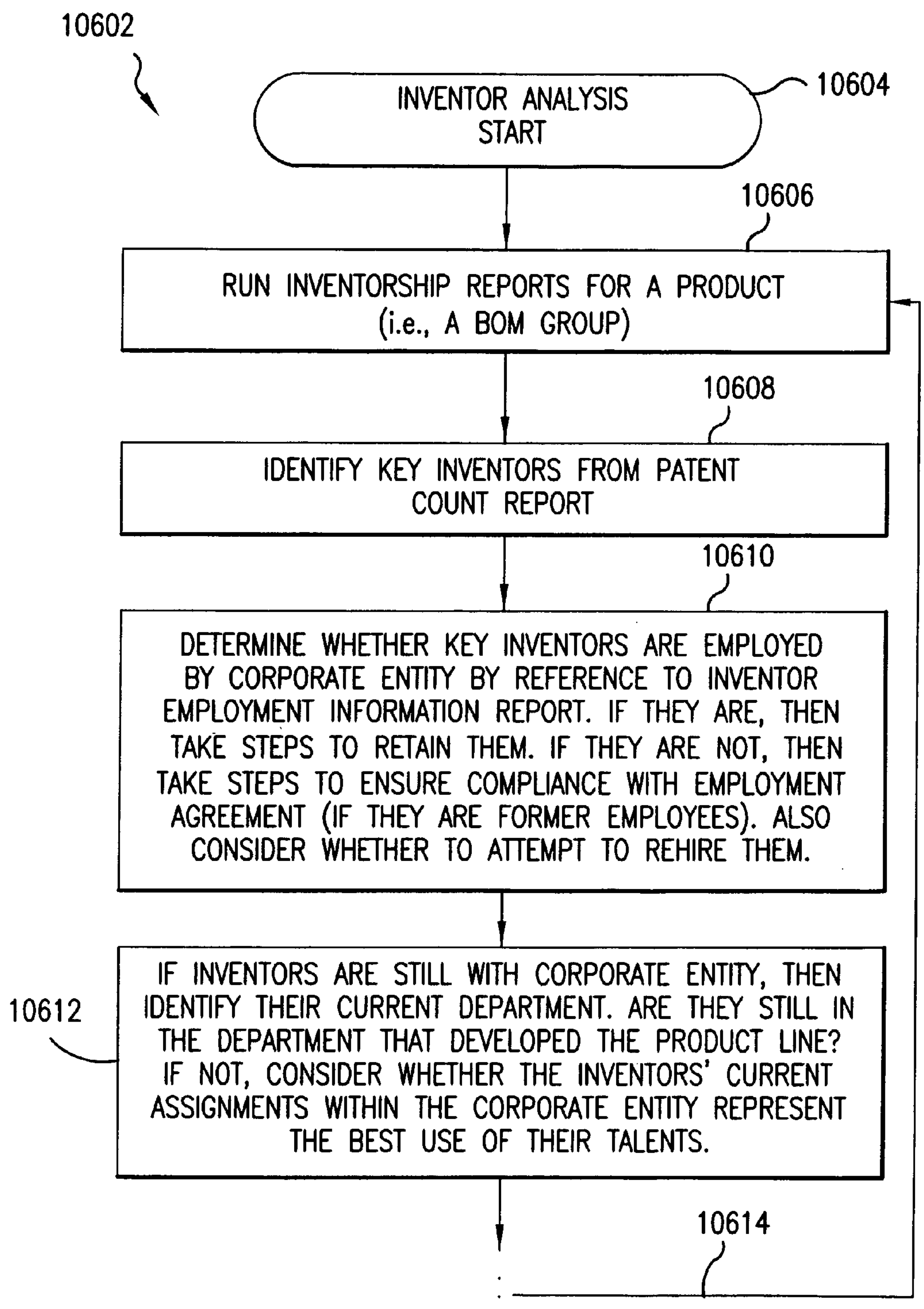
FIG. 106 is a flowchart representative of an inventor analysis process.

The inventor analysis process is illustrated in the flowchart 10602 shown in FIG. 106. In step 10606, an operator associated with the customer client entity located at a client 304, 306 issues commands to run inventorship reports for a product, called an operator specified product for reference purposes. The product corresponds to a BOM group. For references purposes, the BOM group is called the operator specified BOM group (because it corresponds to the operator specified product). The inventor patent count module 1012 and the inventor employment information module 1014 in the enterprise server 314 perform these inventorship report functions. In particular, the inventor patent count module 1012 performs the inventor patent count function, and the inventor employment information module 1014 performs the inventor employment information function. The operation of the inventor patent count module 1012 and the inventor employment information 1014 is described above. Examples of inventor patent count reports are shown in FIG. 74-77. Examples of inventor employment information reports are shown in FIGS. 78-80.

In step 10608, the operator identifies key or top inventors of the customer corporate entity's patents based on the inventorship reports.

In step 10610, the operator refers to the inventor employment information reports to identify whether these key inventors are still employed by the customer corporate entity. If they are still employed by the customer corporate entity, then the operator can initiate steps to ensure that the customer corporate entity retains them. If they are not still employed by the customer corporate entity, then the operator can initiate steps to ensure that these former employees are in compliance with their employment agreement with the customer corporate entity. Also, the operator can consider whether the customer corporate entity should consider rehiring them.

In step 10612, if the key inventors are still employed by the customer corporate entity, then the operator refers to the inventor employment information reports to determine whether the talents of these inventors are being most effectively utilized by the corporate entity. For example, if the inventors are no longer assigned to the department that developed the operator specified product, then the corporate entity may want to transfer them back to that department so that they can further enhance the product.

The inventor analysis process is an iterative one, as represented by control flow arrow 10614. The steps of the inventor analysis flowchart 10602 can be performed repeatedly or in any order for any given BOM group. Accordingly, the steps in the inventor analysis flowchart 10602 are provided for purposes of illustration, not limitation.

The above operation is described as being performed by a single operator. In practice, the above operation may require the involvement of many people with knowledge in many different fields and having different abilities (or expert systems with this knowledge and abilities).

Financial Analysis

Figure 107:
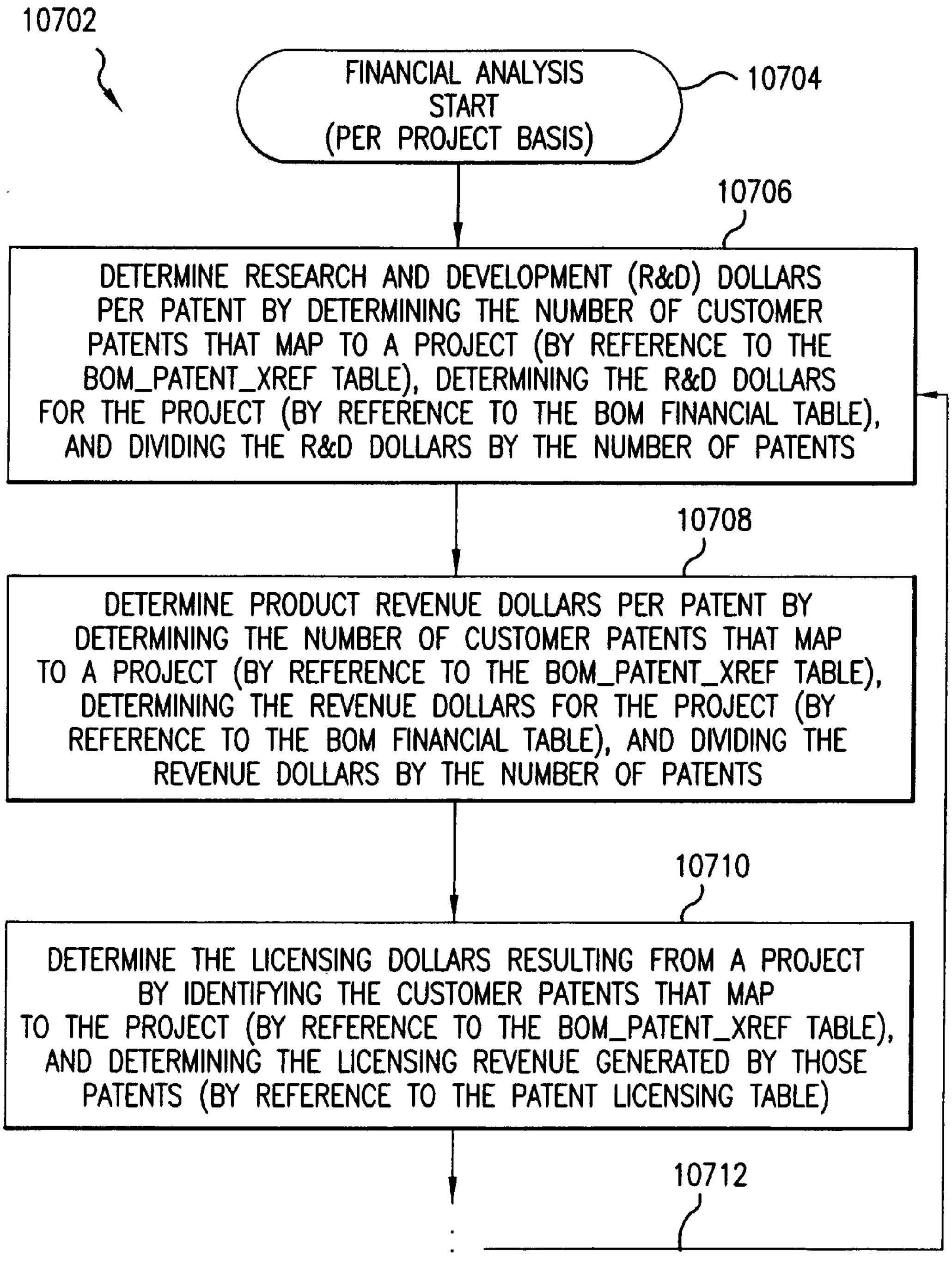
FIG. 107 is a flowchart representative of a financial analysis process.

The financial analysis process is represented by a flowchart 10702 in FIG. 107.

In step 10706, an operator associated with the customer corporate entity at a client 304, 306 issues instructions to the financial modules 1010 in the enterprise server 314. These instructions command the financial modules 1010 to calculate the research and development dollars per patent in a BOM group. The BOM group is specified by the operator.

The financial modules 1010 perform this function by first determining the number of customer patents that map to the BOM group (by reference to the BOM_patent_xref table 1218). Next, the financial modules 1010 determine the R&D dollars for a project (by reference to the BOM financial table 1247). Then, the financial modules 1010 divide the R&D dollars by the number of patents.

In step 10710, the financial modules 1010 calculate the licensing dollars resulting from a project by identifying the customer patents that map to the product (by reference to the BOM_patent_xref table 1218), and determining the licensing revenue generated by those patents (by reference to the patent licensing table 1248).

Operators analyze the data obtained from the above processing to evaluate the customer's business from a patent/financial point of view.

It is noted that the steps of flowchart 10702 are provided for purposes of illustration, and not limitation. Additional steps directed to other financial operations that process the data in databases 316 can be added to the flowchart 10702. Additionally, the financial analysis process of FIG. 107 is an iterative one, as represented by control flow arrow 10712. Further, the steps of the financial analysis flowchart 10702 can be repeatedly performed for the same or different BOM groups, and can be performed in any order. Therefore, the steps of the financial analysis flowchart 10702 are provided in FIG. 107 for purposes of illustration, and not limitation.

Strategic Planning

The customer corporate entity can utilize the present invention to perform a strategic planning process. The overall goal of the strategic planning process is to develop a future product direction and/or future business strategy that cannot be easily duplicated by competitors. This future product direction and/ or business strategy leverages the customer corporate entity's patent protection and technology ownership. The strategic planning process may result in considerable business process re-engineering based on future business analysis.

Figure 108:
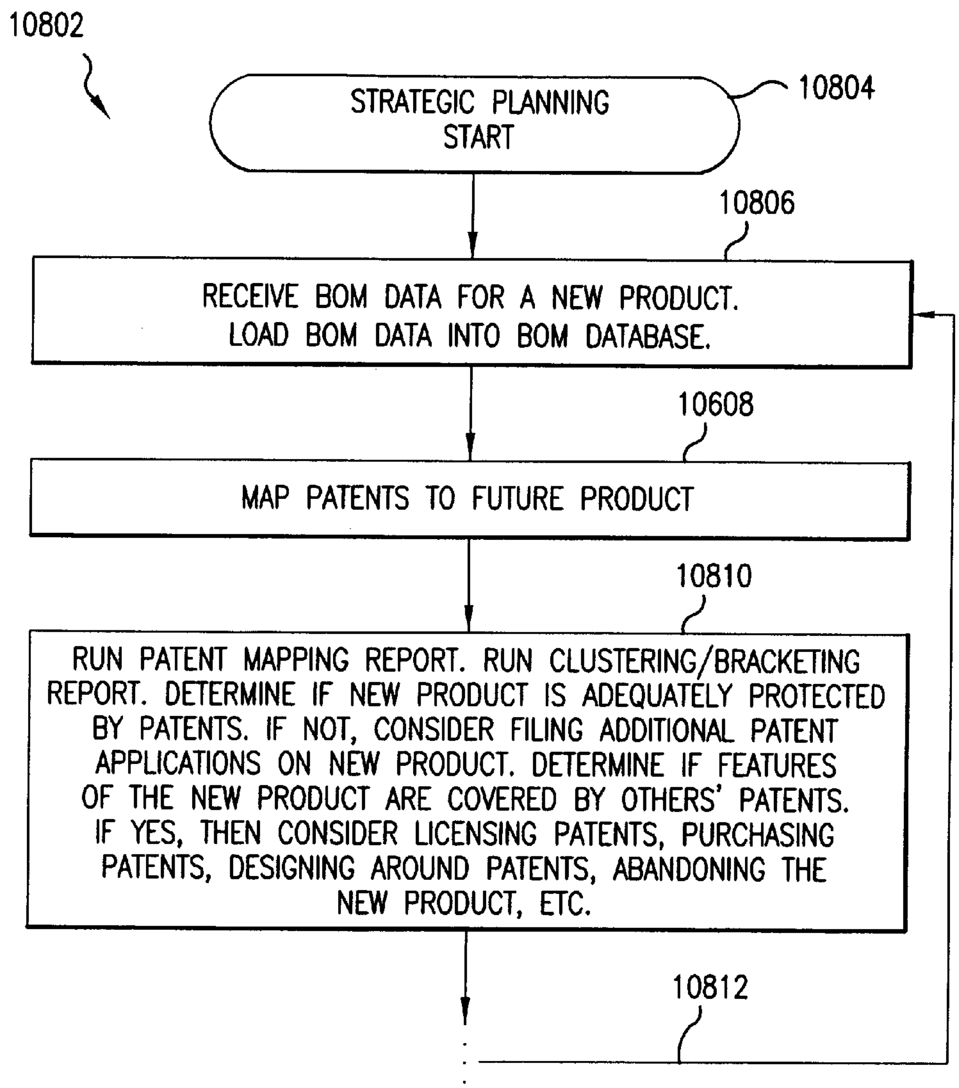
FIG. 108 is a flowchart representative of a strategic planning process.

An example of the strategic planning process is represented by flowchart 10802 shown in FIG. 108. In step 10806, BOM data for a contemplated new product is received. This BOM data may have been generated by the R&D department, for example. This BOM data is loaded into the BOM databases 626 in the manner described above.

In step 10808, an operator associated with the customer corporate entity maps the customer corporate entity's patents (both owned and licensed) to the new future product. The operator also maps competitors' patents to the new future product.

In step 10810, the operator issues instructions to run patent mapping reports pertaining to the BOM group of the proposed future product. The operator also issues reports to run clustering/bracketing reports for the proposed future product. The patent mapping module 1002 and the patent clustering/bracketing module 1008 in the enterprise server 314 automatically runs these reports in the manner discussed above.

From these methodology reports, the operator is able to determine if the proposed future product is adequately protected by the patents which the customer corporate entity currently owns or licenses. If the proposed future product is not adequately covered by the customer corporate entity's current patents, then the customer corporate entity may consider whether or not it should prepare and file additional patent applications to further cover the proposed future product.

Also from these methodology reports, the operator can determine if the features of the proposed future product are covered by the patents owned by others. If some features of the proposed future product are covered by patents owned by others, then the customer corporate entity can consider whether it should license the patents, purchase the patents, modify the proposed future product in order to design around the patents, ignore the patents, abandon plans for the proposed future product, etc.

The above operation is described as being performed by a single operator. In practice, the above operation may require the involvement of many people with knowledge in many different fields and having different abilities (or expert systems with this knowledge and abilities).

The above analysis and decision making process performed by the customer corporate entity may involve running additional methodology reports, such as patent citation reports, patent aging reports, inventorship reports, and financial reports.

It is noted that the steps of the strategic planning flowchart 10802 shown in FIG. 108 are only representative of the type of tactical and strategic functions that can be performed based on the analysis and methodology reports that are automatically prepared by the analysis modules 416.

The strategic planning process is an iterative one, as represented by control flow arrow 10812. The steps of the strategic planning flowchart 10802 can be performed repeatedly, and in any order. Additional steps can be added to represent the additional strategic planning functions mentioned above. Accordingly, the steps of the strategic planning flowchart 10802 shown in FIG. 108 are provided for purposes of illustration, and not limitation.

Integrated Methodology Embodiment

The functions and methodologies described above can be performed individually or in any combination to achieve the objectives of the customer corporate entity. For example, at times, the customer may wish to run individual reports to examine a particular aspect of its business, such as the remaining patent terms of patents that map to a particular product line. At other times, the customer may wish to run a combination of reports to analyze a larger part of its business, such as a strategic planning analysis to develop a patent strategy for a proposed future product. At still other times, the customer may wish to perform an extensive and integrated examination of its business from a patent-centric and group-oriented point of view.

Figure 109:
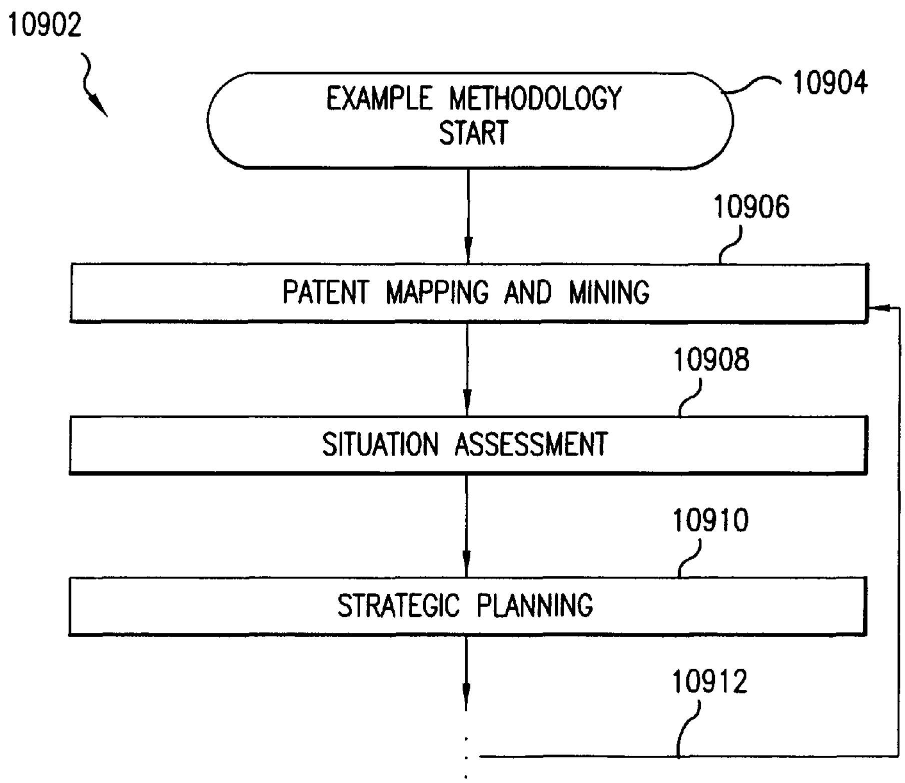
FIG. 109 is a flowchart representative of an example methodology process involving patent mapping and mining, situation assessment, and strategic planning process.

An example of such an integrated methodology is represented by a flowchart 10902 in FIG. 109. In this example, the patent mapping and mining process (described above with reference to FIG. 102) is combined with the situation assessment process (see FIGS. 103-107) and the strategic planning process (see FIG. 108).

It should be understood that the patent mapping and mining process, the situation assessment process, and the strategic planning process can be performed individually or in any combination with any other functions described herein according to the needs, requirements, and characteristics of the particular corporate entity being served.

User Interface

Referring to FIG. 114, the user interface module 11404 in the client 304, 306 supports a variety of user interface display formats, windows, and screens for enabling operators working at the client 304, 306 to view, manipulate, and otherwise interact with data. Many of the user interface display formats and display screens supported and provided by the user interface module 11404 are described above. Such user interface display formats and display screens described above include: example user interface display formats pertinent to the searching features of the present invention shown in FIGS. 53-57, an example user interface display format pertinent to the display of group information shown in FIG. 58, examples of patent mapping display formats shown in FIGS. 59 and 60, examples of patent citation report display formats shown in FIGS. 61-65, examples of patent aging display formats shown in FIGS. 66-70, examples of patent clustering/bracketing display formats shown in FIGS. 71-73, examples of inventor patent count display formats shown in FIGS. 74-77, examples of employment information display formats shown FIGS. 78-80, an example display format showing the display of patent text in a first window and patent notes in a second window shown in FIG. 111, and an example display format showing the display of patent text in a first window and patent images in a second window shown in FIG. 112.

Other user interface display formats, display windows, and display screens supported and provided by the user interface module 11404 in the client 304, 306 shall now be described. It should be understood that the present invention is intended and adapted to support and provide display formats, display windows, and display screens other than those shown and described herein. In fact, the present invention can support and provide any display format, display window, or display screen useful for enabling operators to view and interact with the data and the data processing described herein. Accordingly, the display screens, display windows, and the display formats shown in the figures and discussed herein are provided solely for purposes of illustration, and not limitation.

User Login

Figure 116:
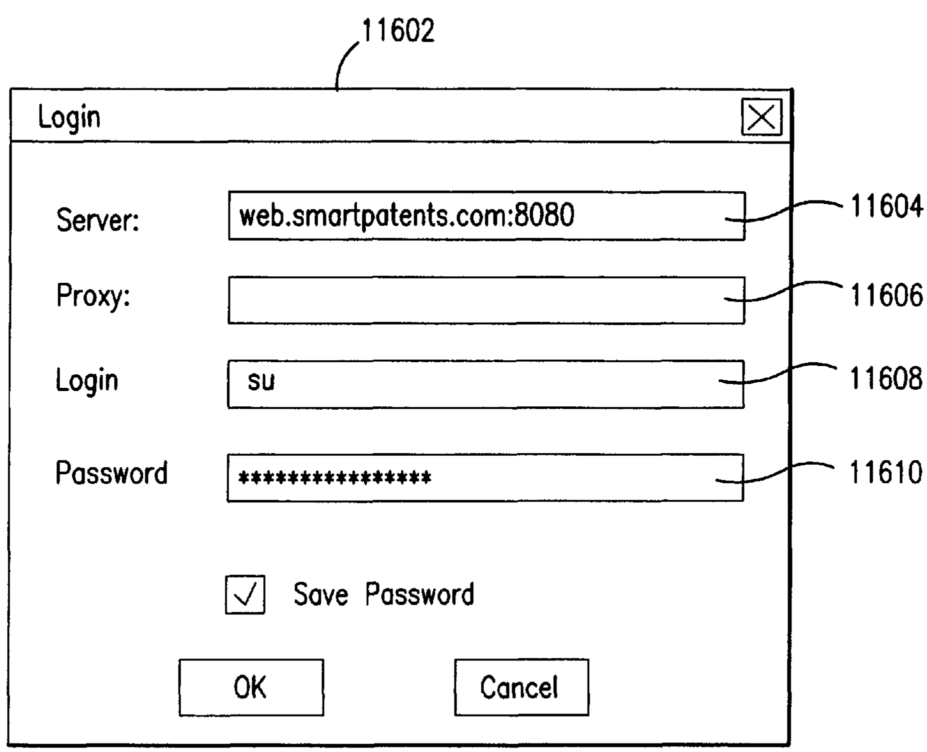
FIG. 116 is an example user login screen shot.

FIG. 116 illustrates an example user login window 11602. An operator at a client 304, 306 enters information into the fields of the login window 11602 in order to log into and establish a new session with the Enterprise server 314.

In order to establish a session with the Enterprise server 314, the operator enters his user name in a login field 11608, and enters his password into a password field 11610. If the operator wishes to connect with the Enterprise server 314 via a specific server, then the operator enters the address of this server in a server field 11604. If the customer's network is configured to use "fire walls" with proxy servers, the operator enters information about the proxy server(s) in the proxy field 11606.

Console

FIGS. 18 and 58 depict example display formats wherein a group hierarchy is graphically illustrated in a first window or pane, and a list of patents and other documents contained in one of the groups of the group hierarchy is displayed in a second window or pane. These example display formats of FIGS. 18 and 58 are herein called the console display format, or simply the console.

Figure 117:
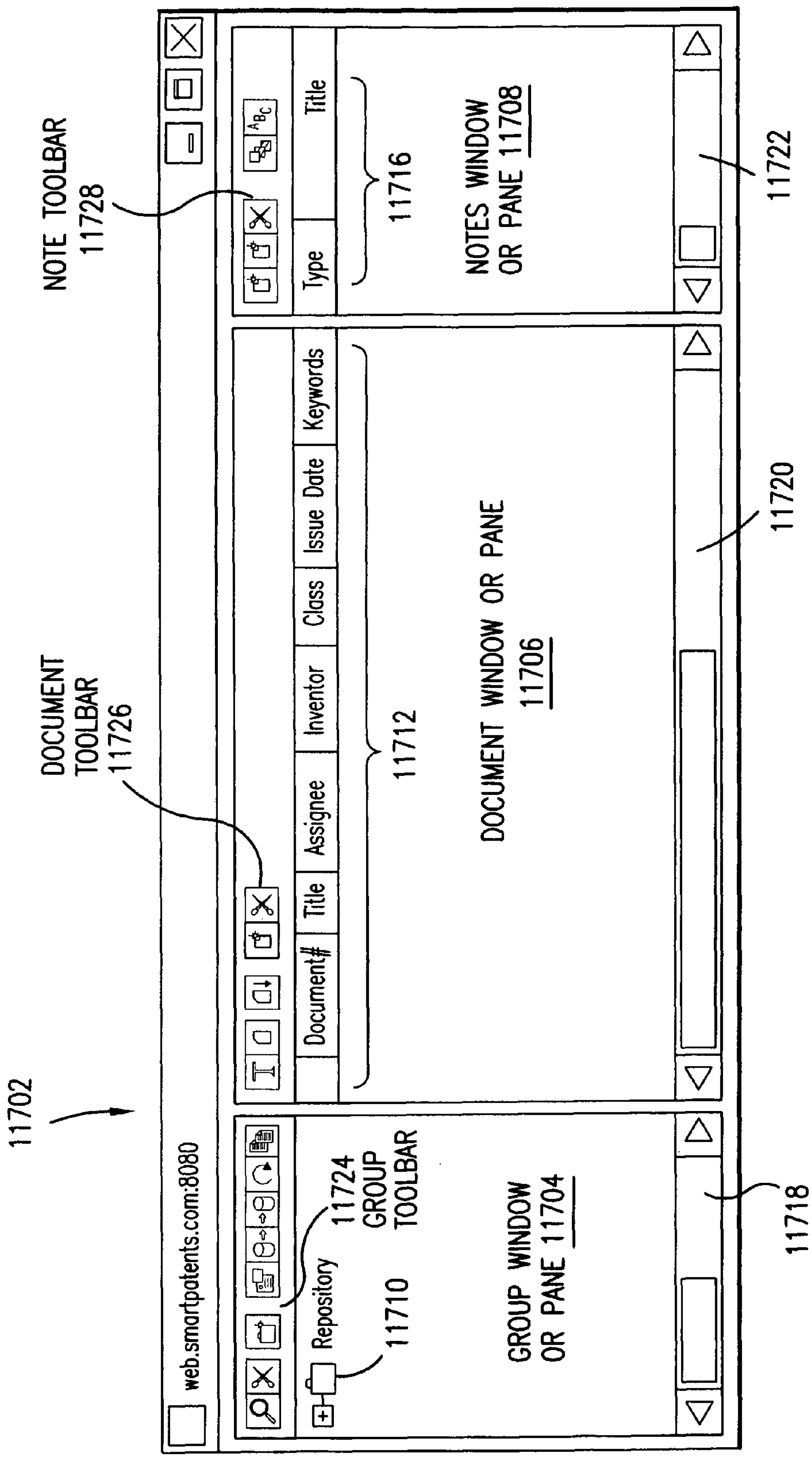
FIGS. 117 and 118 represent an example console screen shot.

FIG. 117 illustrates a console according to an alternative embodiment of the invention. The console 11702 includes a first window or pane 11704, a second window or pane 11706, and a third window or pane 11708. The first pane 11704 is also called the group pane 11704, the second pane 11706 is also called the document pane 11706, and the third pane 11708 is also called the notes pane 11708.

Figure 133:
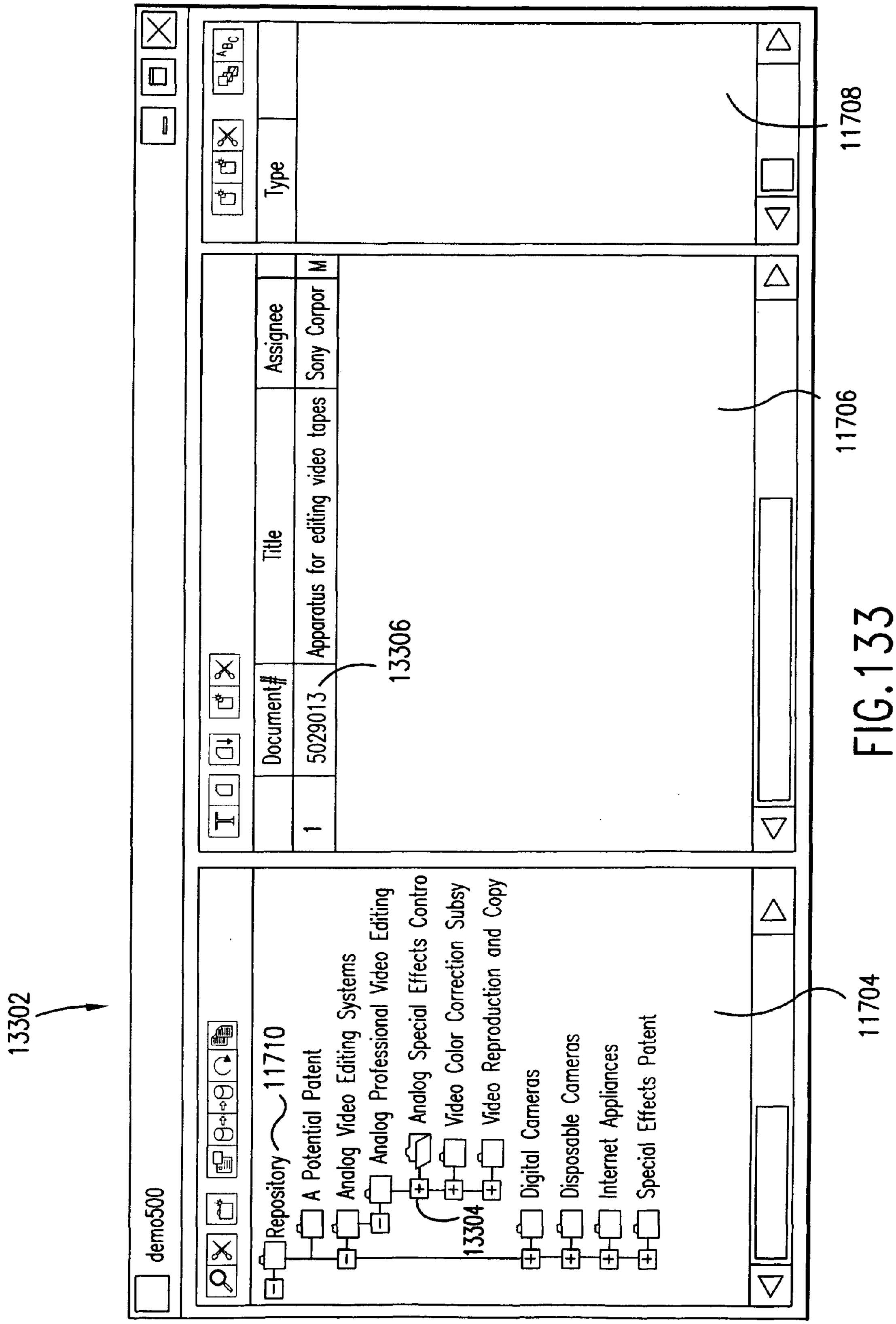
FIG. 133 is another example console screen shot.

A group hierarchy is depicted in the group pane 11704. In the example of FIG. 117, the top level or root group in the group hierarchy is called the repository group 11710. The child groups of the repository group 11710 are not shown in FIG. 117 (i.e., the operator has not expanded the repository group 11710 in the group pane 11704). The child groups of the repository group 11710 are shown in FIG. 133 (i.e., the operator has expanded the repository group 11710 in the group pane 11704 in the example of FIG. 133).

Referring again to FIG. 117, the document pane 11706 includes a list of patents and other documents which are contained within a group selected from the group hierarchy depicted in the group pane 11704. The patents and documents are listed in a tabular or "spreadsheet" format. The list of patents and documents in the document pane 11706 includes both the patent numbers and patent bibliographical information for the patents, and bibliographic information for the non-patent documents. Such patent bibliographic information displayed in the document pane 11706 includes the title, abstract, inventor, class, issue date, and user-defined keywords. All additional patent bibliographic information can be viewed in the document pane 11706 by utilizing the horizontal scroll bar 11720 to sideways scroll in the document pane 11706. Other embodiments of the invention allow the user to select an arbitrary number of bibliographic fields to view. In example of FIG. 117, no patents are listed in the document pane 11706 because a group has not been selected in the group hierarchy depicted in the group pane 11704.

The operator can restructure the group hierarchy displayed in the Group pane 11704 using well-known drag-and-dop operations. The operator can add any of the documents displayed in the Docunent pane 11706 to any group in the group hierarchy displayed in the Group pane 11704 by using well-known drag-and-drop operations.

The notes pane 11708 displays a list of the notes associated with either a group selected in the group pane 11704, or a patent or document selected in the document pane 11706. The list of notes in the notes pane 11708 is presented in a tabular or "spreadsheet" format. The list of notes in the notes pane 11708 includes information that identifies the type of the note (that is, either a patent/document note or a group note), and the title of the note. All other bibliographic or other information relating to notes can be viewed by manipulating the horizontal scroll bar 11722 in order to sideways scroll in the notes pane 11708.

As indicated above, FIG. 133 illustrates an example console 13302 wherein the repository group 11710 is expanded in the group pane 11704 so that its child groups are shown. In the example of FIG. 133, a group called "analog special effects controller subassembly" 13304 has been selected. Accordingly, a list of all patents and other documents in the selected group 13304 is displayed in the document pane 11706. In the example of FIG. 133, the selected group 13304 includes a single patent, U.S. Pat. No. 5,029,013.

According to the present invention, the operator can view the text and/or image of any patent or other document listed in the document pane 11706 by selecting the patent or document using well know item selection techniques. An operator can select a patent, for example, by double clicking on the patent number, or by using any other type of well known operator navigation procedure.

Suppose that the operator selects, from the document pane 11706, U.S. Pat. No. 5,029,013. In accordance with this selection, the user interface module 11404 displays the text of the selected patent in a text window 12302, (see FIG. 123), and the image of the selected patent in an image window 12402 (see FIG. 124). The operator may selectively view the text window 12302 individually, the image window 12402 individually, or the text window 12302 and the image window 12402 simultaneously.

FIG. 118 illustrates an example console 11802 wherein the group hierarchy 11712 (with the repository group 11710 as the root) is depicted in the group pane 11704. The repository group 11710 is selected in the example of FIG. 118. Accordingly, a list of all patents and other documents in the repository group 11710 is displayed in the document pane 11706. Accordingly, by opening the folder corresponding to the repository group 11710 in the group pane 11704, the operator can view all patents that are contained in the patent repository (that is, all patents that are in the patent database 614), and, in fact, can view all documents that are in the repository.

Console Tool Bars

Referring again to FIG. 117, a Group toolbar 11724 is displayed in the group pane 11704. The tools in the Group toolbar 11724 are used to manipulate the groups of the group hierarchy displayed in the group pane 11704. A Document toolbar 11726 is displayed in the second pane. The tools in the Document toolbar 11726 are used to manipulate the documents listed in the document pane 11706. A Note toolbar 11728 is displayed in a notes pane 11708. The tools in the Note toolbar 11728 are used to manipulate the notes listed in the notes pane 11708.

Figure 135:
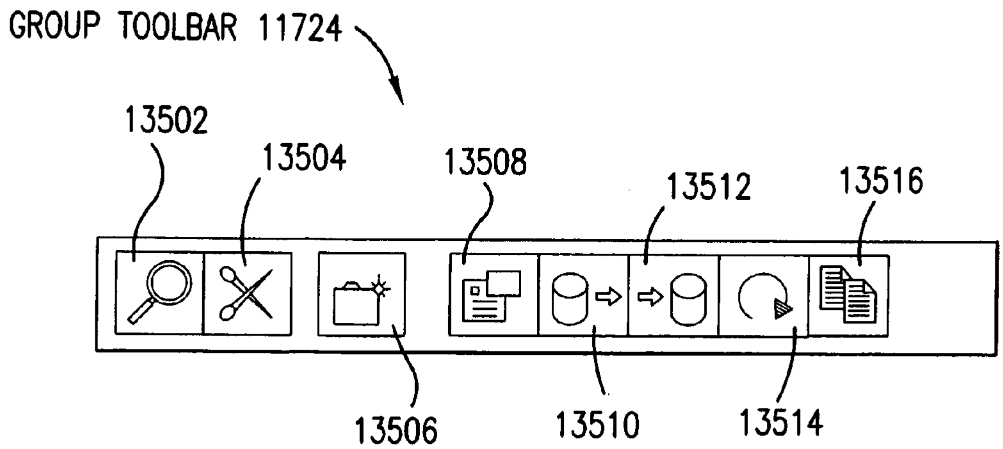
FIGS. 135-137 illustrate example tools bars from the console screen display.

The Group toolbar 11724 is illustrated in greater detail in FIG. 135. The Document toolbar 11726 is illustrated in greater detail in FIG. 136. The Note toolbar 11728 is illustrated in greater detail in FIG. 137.

Referring to FIG. 135, an operator presses a Search button 13502 in the Group toolbar 11724 in order to conduct a search for data in the databases 316. An operator presses a Delete Group button 13504 in order to delete the group selected in the Group pane 11704. An operator presses a create New Group button 13506 in order to create a new group. The new group is created as a child group of the group selected in the Group pane 11704.

An operator presses a Show Group Properties button 13508 in the Group toolbar 11724 in order to view and edit the properties of the group selected in the Group pane 11704. An operator presses an Import Data button 13510 in order to import data from an external data file into the repository 612, 602. An operator presses an Export Data button 13512 in order to export data from the repository 612, 602 into a user specified location, such as an external file.

An operator presses a Refresh Data button 13514 in the Group toolbar 11724 in order to refresh the listing of all data in the Group pane 11704, the Document pane 11706, and the Notes pane 11708. Refresh is needed to synchronize multi-user access to the database. Such data refresh is performed by reading from the databases 316. An operator presses a Reports button 13516 in order to execute methodology reports.

Figure 123:
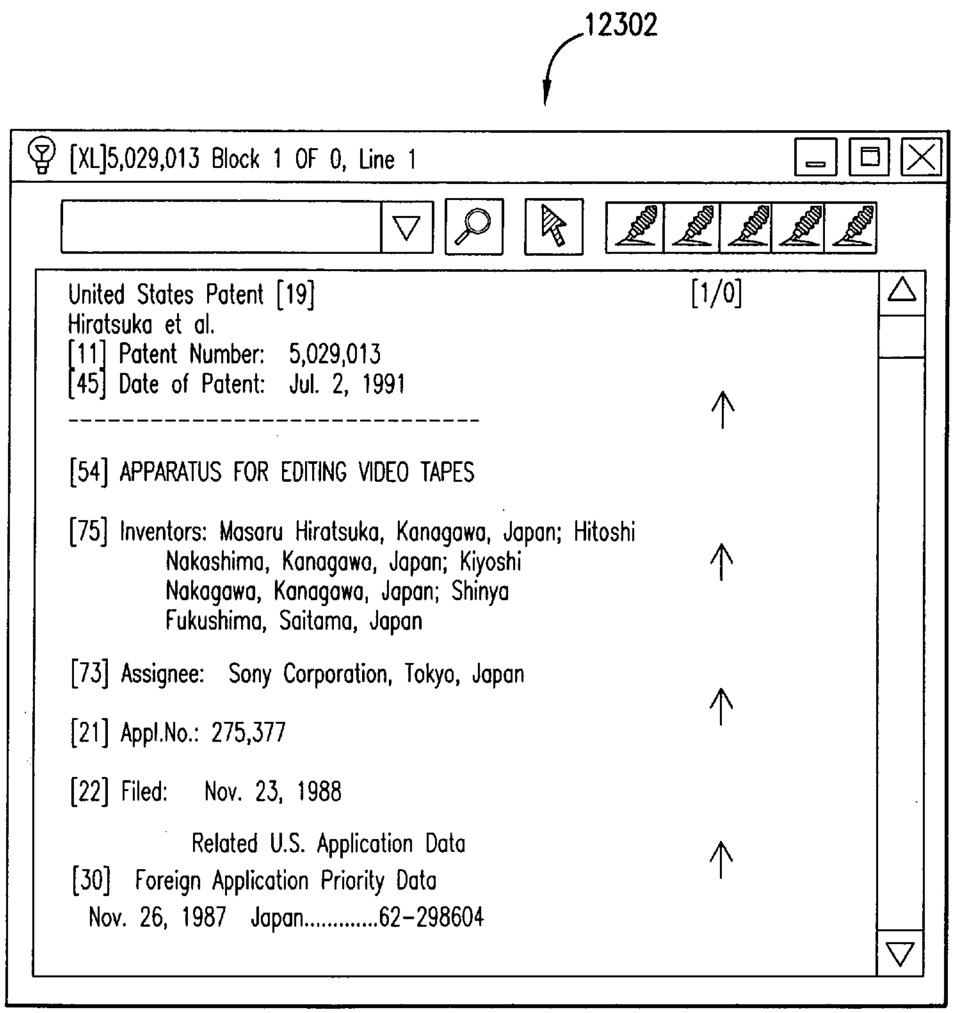
FIGS. 123 and 124 are example screen shots for displaying text and images of documents.
Figure 124:
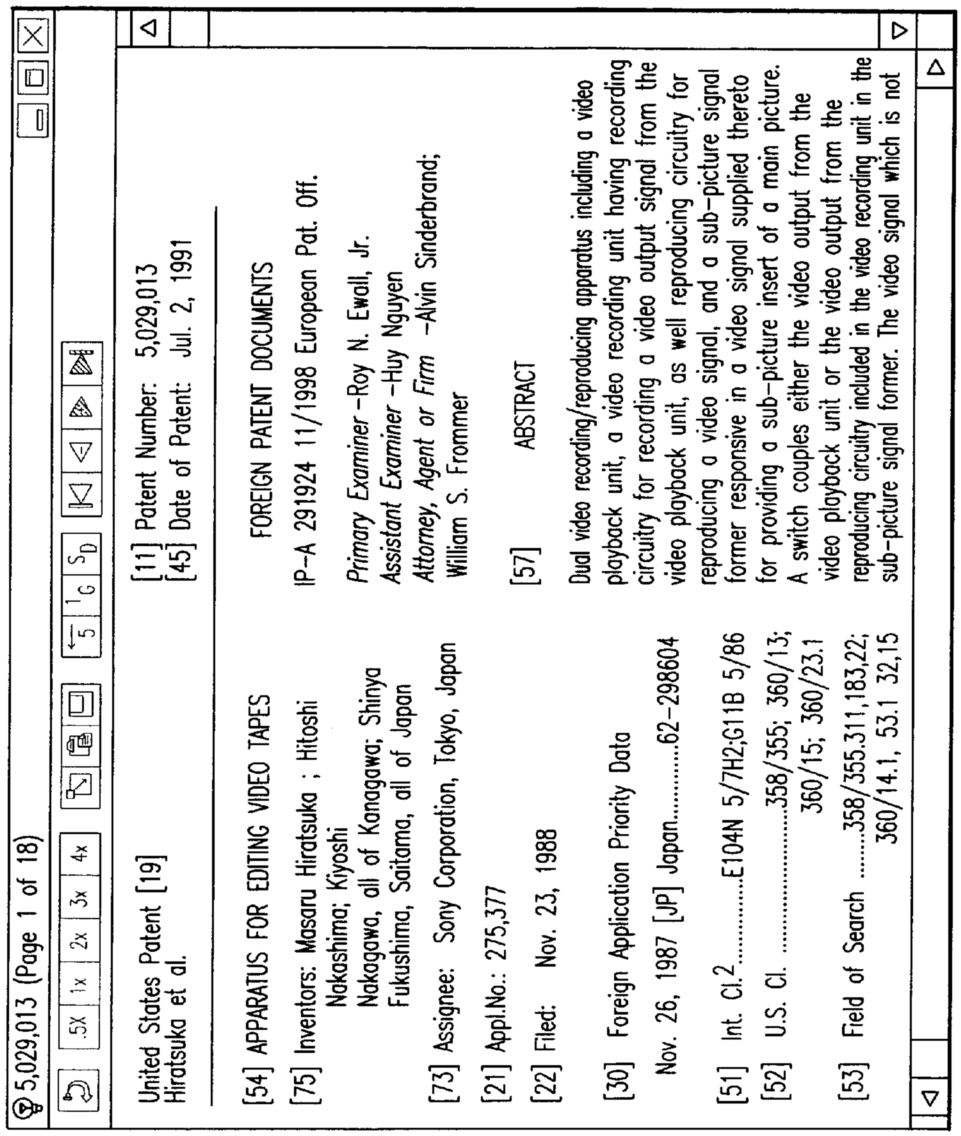
Figure 136:
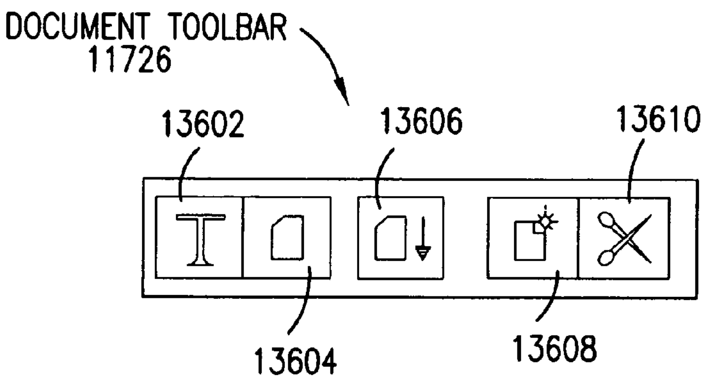

Referring now to FIG. 136, an operator presses a Show Text button 13602 in the Document toolbar 11726 in order to display the text of a document selected in the Document window 11706. An operator presses a Show Image button 13604 in order to display the image of the document selected in the Document pane 11706. Examples of the display of text and images are shown in FIGS. 123 and 124.

An operator selects a Skim Images button 13606 in the Document toolbar 111726 in order to perform a Skim Images function. In accordance with the Skim Images function, the first image page of each document listed in the Document window 11706 is displayed in succession by repeatedly clicking the Show Images button 13606.

An operator presses an Add Patent button 13608 in order to add a new patent or document to the list of patents displayed in the Document pane 11706 (that is, to add a new patent or document to the group selected in the Group pane 11704). An operator presses a delete patent button 13610 in order to delete the patent or document selected in the Document pane 11706 from the group selected in the Group pane 11704 (this does not delete the document from the repository).

Figure 137:
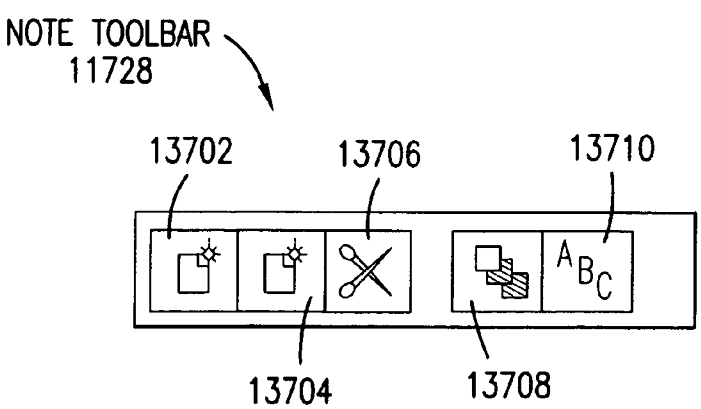

Referring now to FIG. 137, an operator presses an Add new Group Note button 13702 in order to add a new group note to a group selected in the Group pane 11704. An operator presses an Add New Patent/Document Note button 13704 in order to add a new patent note to the patent or document selected in the document pane 11706.

An operator presses a Delete Selected Group Or Patent Note button 13706 in order to delete the note selected in the Notes window 11708. An operator presses the Sort Notes By Type button 13708 in order to sort the list of notes depicted in the Notes window 11708 by their type (that is, by group or by patent). An operator presses a Sort Notes By Title button 13710 in order to sort the list of notes depicted in the Notes window 11708 according to their titles.

Various ones of these functions that are invoked by pressing buttons in the Group toolbar 11724, the Document toolbar 11726, and the note toolbar 11728 are further described in the following sections.

Creating a New Group

An operator presses the Create New Group button 13506 in the Group toolbar 11724 in order to create a new group in the group hierarchy displayed in the Group pane 11704. The new group is created as a child group of the group selected in the Group pane 11704.

Figure 119:
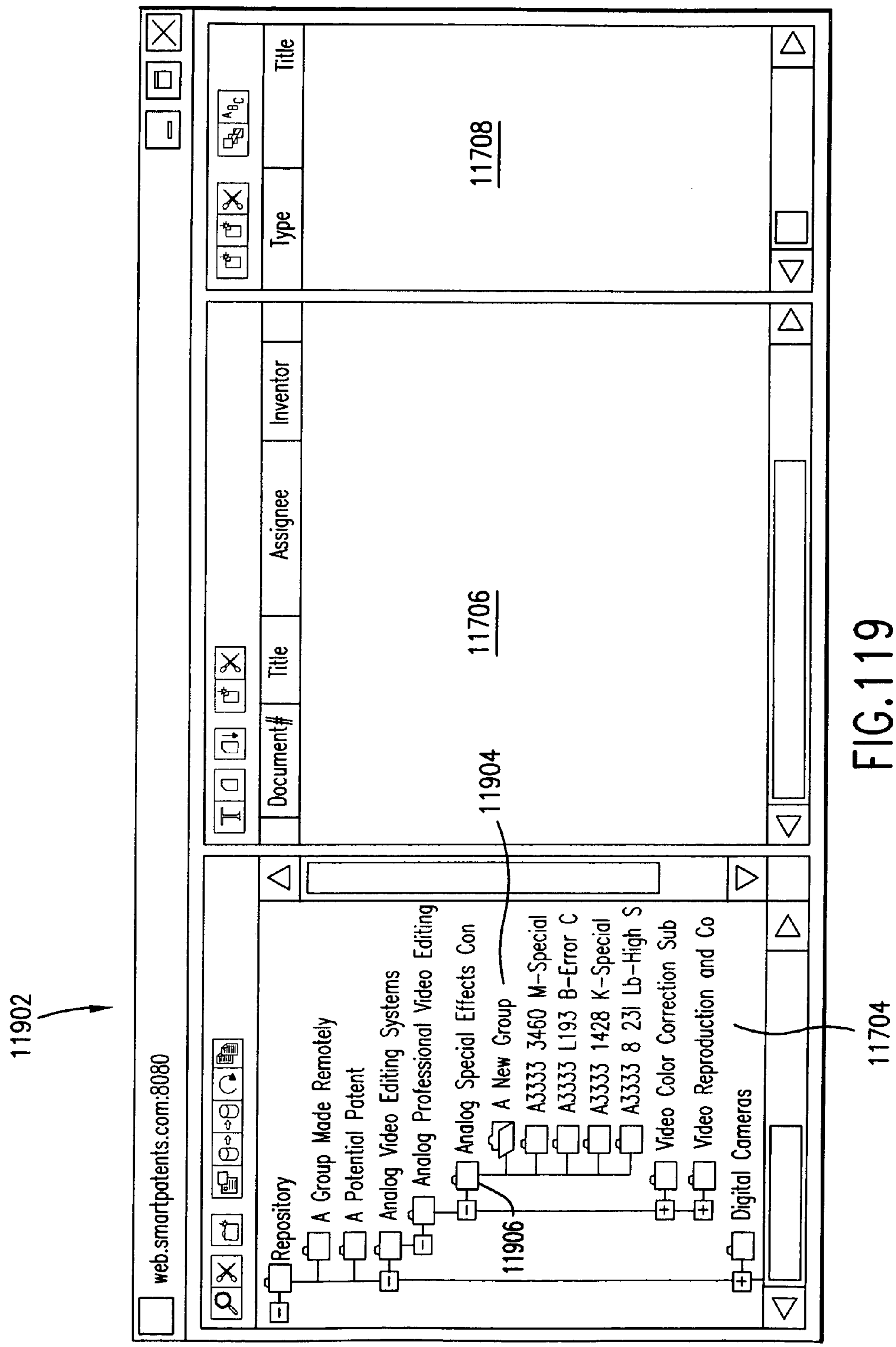
FIGS. 119 and 120 are screen shots for creating a new group.
Figure 120:
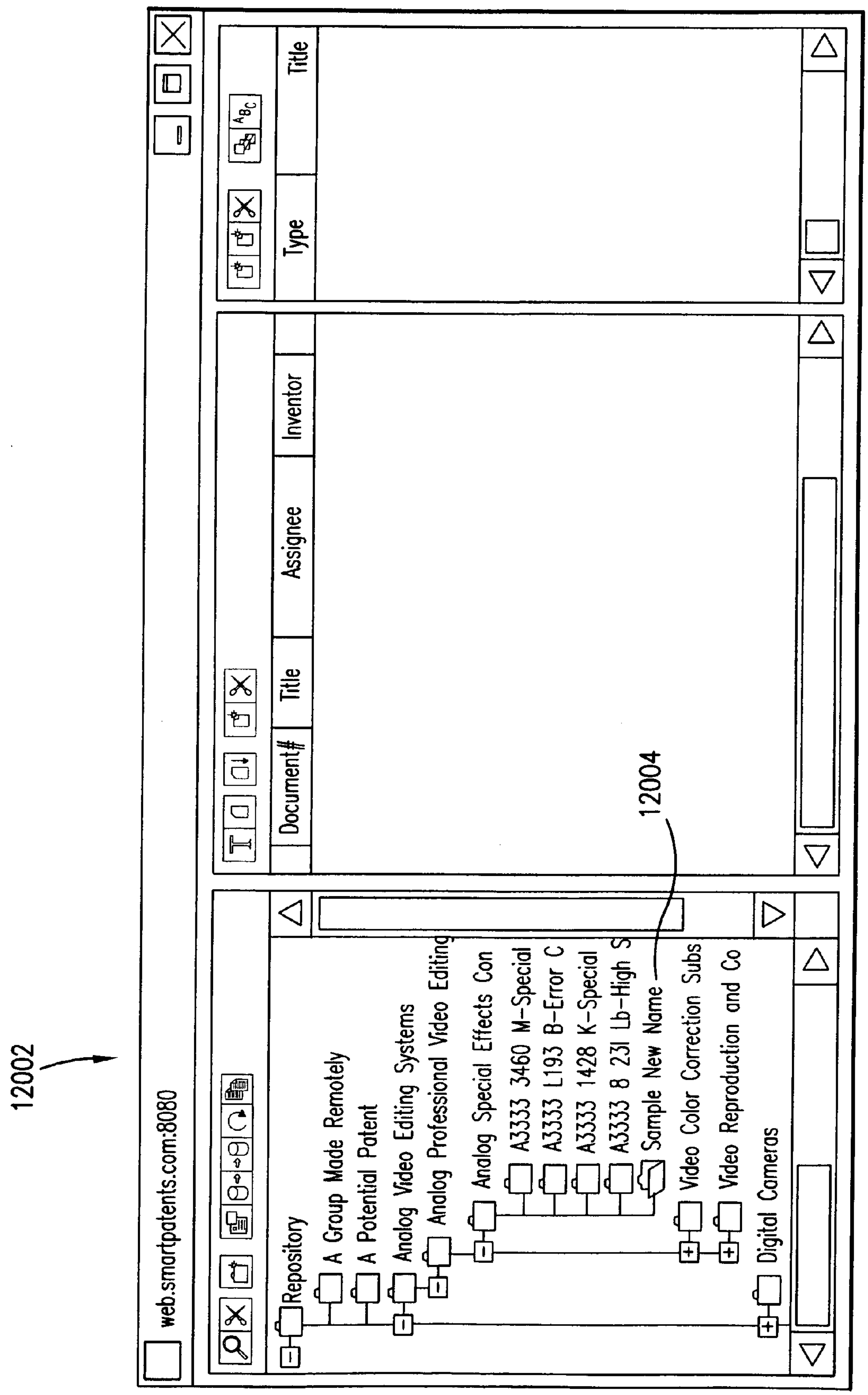

Consider, for example, the Example console 11902 illustrated in FIG. 119. Assume that the operator presses the Create New Group button 13506 when a group entitled "analog special effects controller subassembly" 11906 is selected. In this case, a new group 11904 is created as a child group of the selected group 11906. The default name of the new group 11904 is "A New Group". The name of the new group 11904 can then be modified using well-known procedures (such as by selecting the new group 11906, selecting a Rename command, and then typing in a new name for the new group 11904). FIG. 120 illustrates a scenario where the new group 11904 has been renamed as "Sample New Name."

Editing Group Properties

Figure 126:
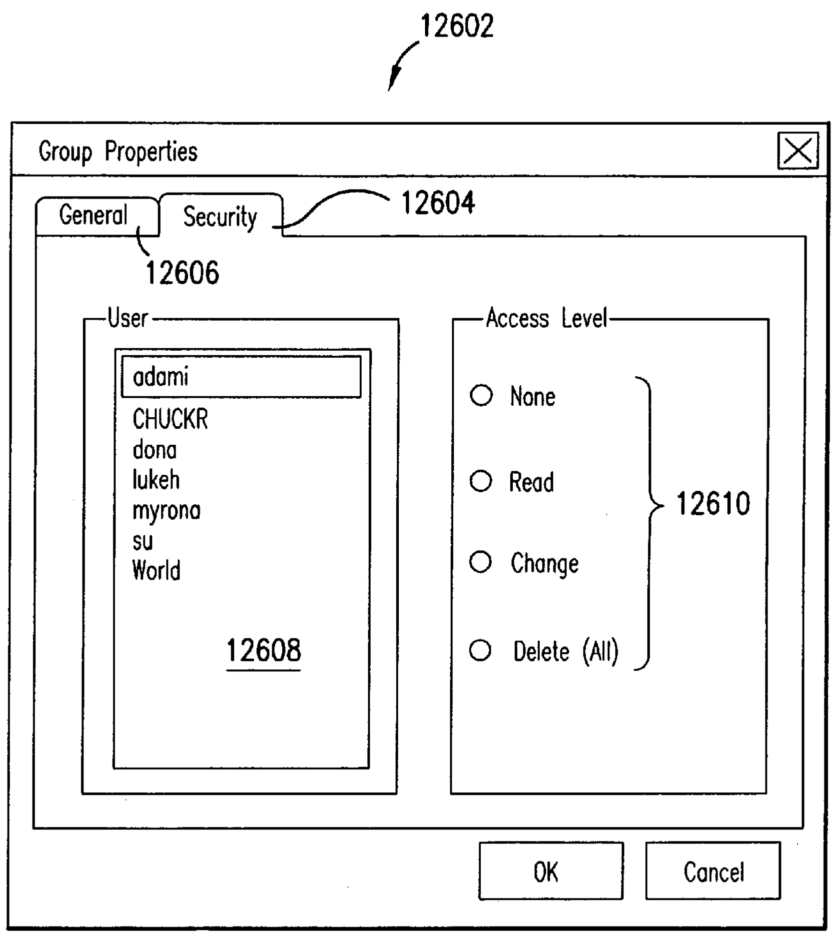
FIGS. 126 and 127 are example screen shots for editing group properties.
Figure 127:
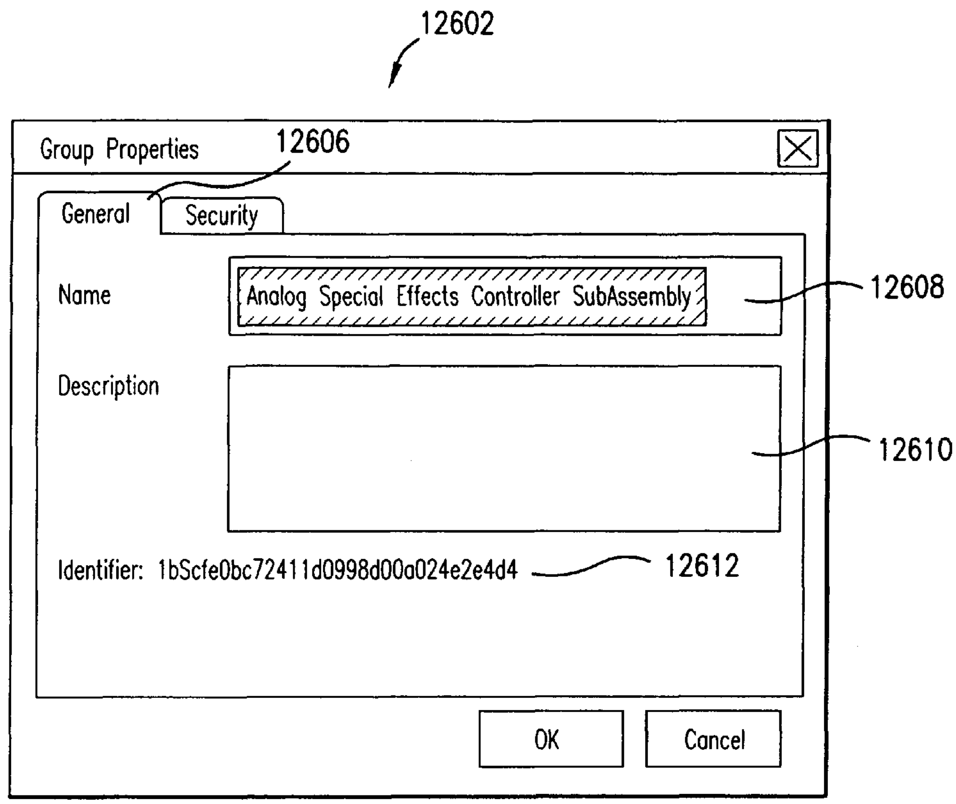

An operator presses the Show Group Properties button 13508 in the Group toolbar 11724 in order to view and edit the properties of the group selected in the Group pane 11704. Group Viewing And Editing windows 12602 are shown in FIGS. 126 and 127. Referring first to FIG. 127, a Group Properties tab 12606 is displayed. The operator can view and edit general information about the group selected in the Group pane 11704 by using the General Group Properties tab 12606. In particular, the operator can view and edit the group name via a Name field 12608, and a description about the group via a Description field 12610. The General Group Properties tab 12606 also displays the Group Identifier of the group selected in the Group pane 11704 in a field 12612.

FIG. 126 depicts a Group Properties Security tab 12604 in which the operator can view and enter security access information for the selected group. In particular, the operator can edit the users who have access to the selected group in a field 12608, and also can specify the access level for each of these users via fields 12610.

It is noted that access to the General Group Properties tab 12606 and the Group Properties Security tab 12604 is limited to operators having sufficiently high access levels with respect to the selected group.

Shared Groups

Figure 153:
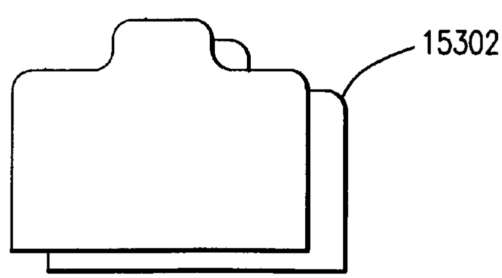
FIG. 153 illustrates a stacked folder icon used to represent shared groups.
Figure 154A:
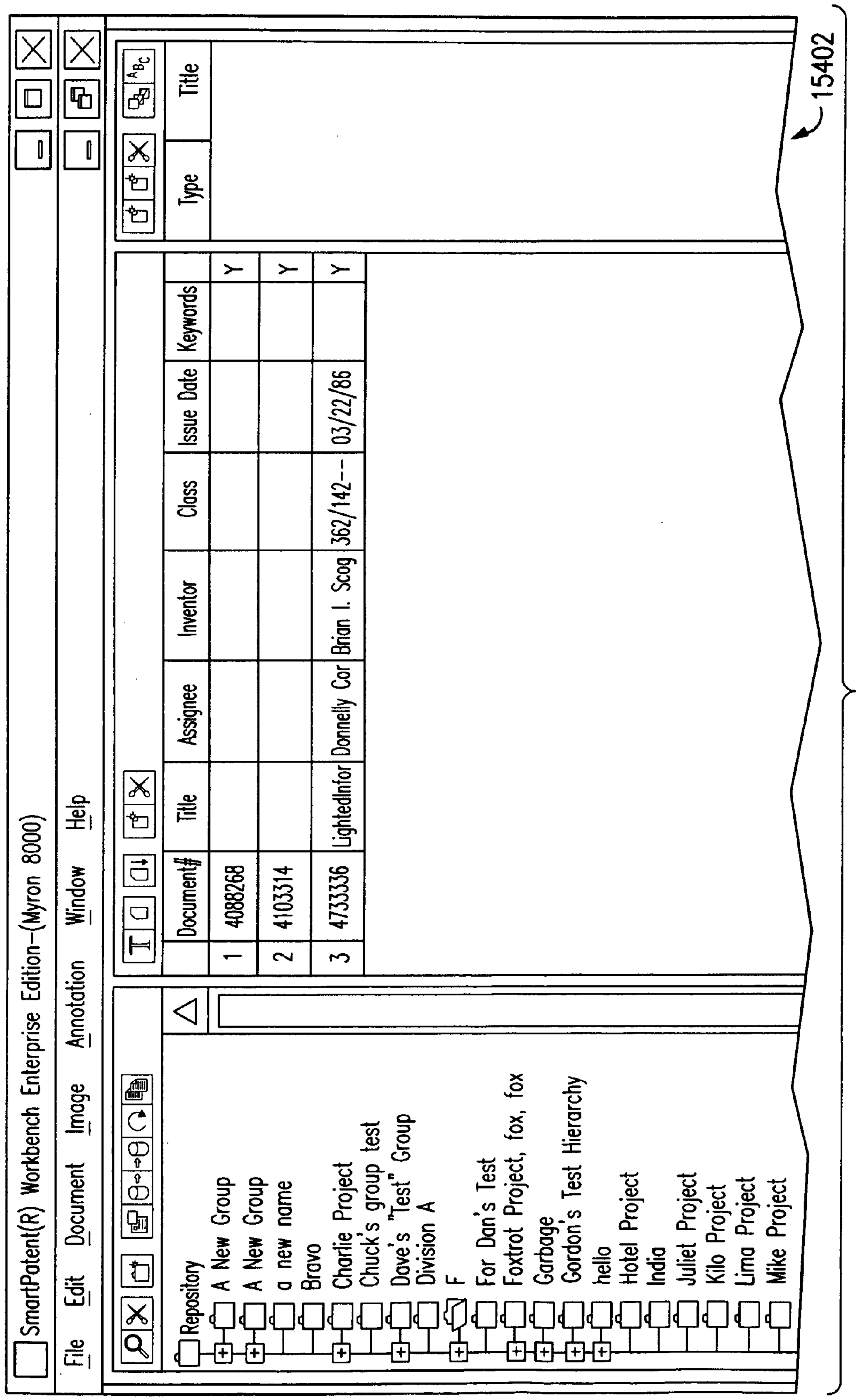
FIG. 154 illustrates an example console used to describe shared groups.
Figure 154B:
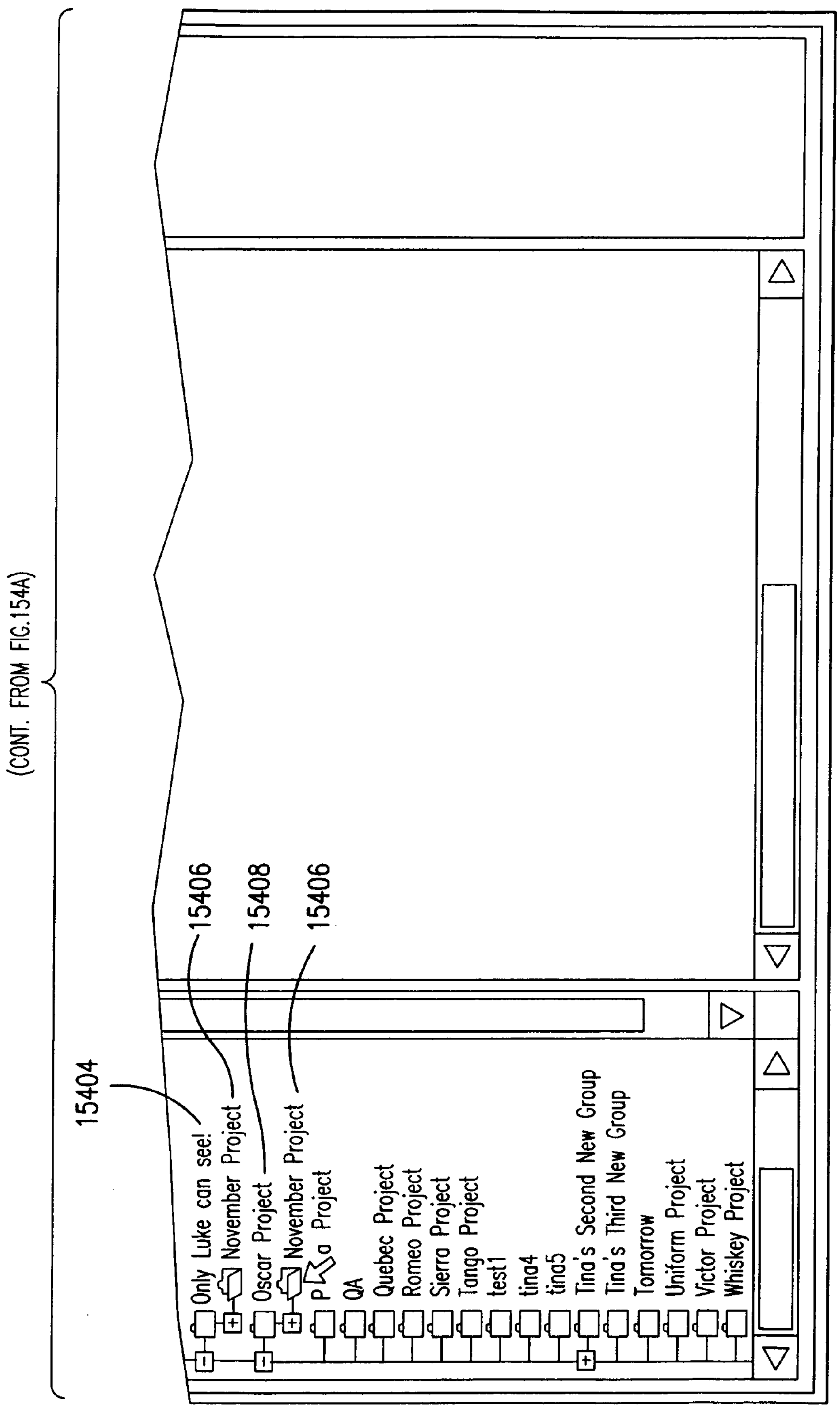

In an embodiment of the invention, shared groups are graphically depicted in the console using a stacked folders icon 15302 (FIG. 153). FIG. 154 shows an example console 15402 where both an "Only Luke can see!" group 15404 and an "Oscar Project" group 15408 share a "November Project" group 15406, which is a shared group.

Figure 156:
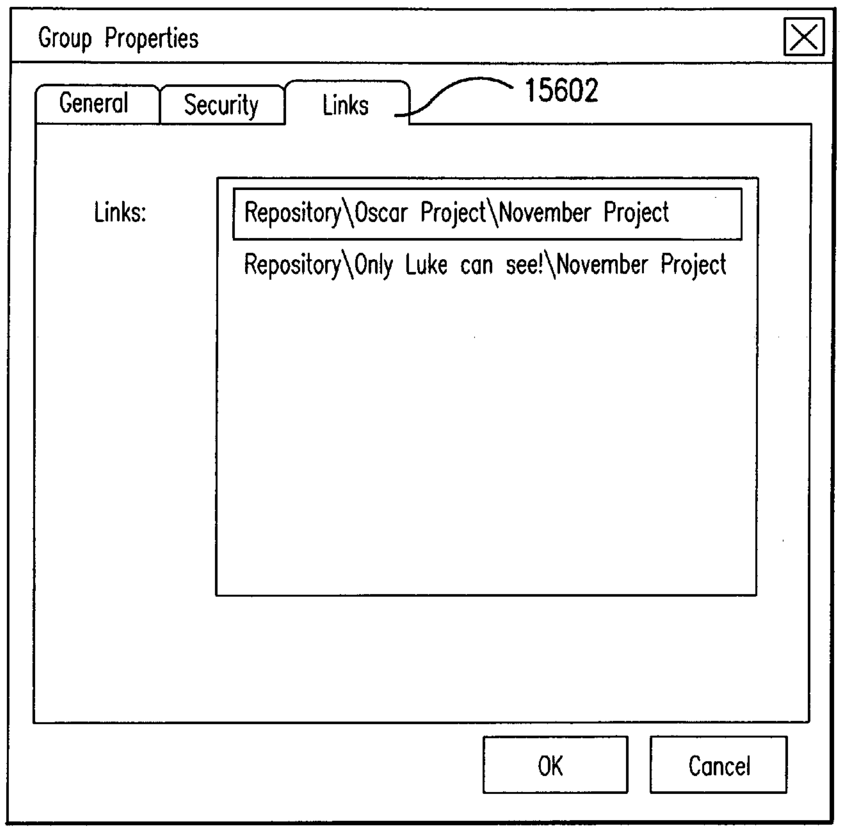
FIG. 156 illustrates a group links tab that lists a group’s links in the group hierarchy.

FIG. 156 illustrates a group links tab 15602, which is the interface to additional group properties. These group properties in the group links table 15602 pertain to the links associated with a selected group. The scenario shown in FIG. 156 corresponds to the example of FIG. 154. Accordingly, in FIG. 156, the November Project group is shown as being a child of the Oscar project group and the Only Luke can see! group, which are both shown as being children of the Repository group. The operator can double click (or otherwise select) any link to open the lowest level data object, in this case the November Project group.

Invoking Patent-Centric and Group-Oriented Analysis Functions

An operator presses the Run Reports button 13516 in the Group toolbar 11724 in order to execute methodology reports. These methodology reports are performed by the Analysis modules 416 in the Enterprise server 316 (see FIG. 10), and are described above.

Figure 128:
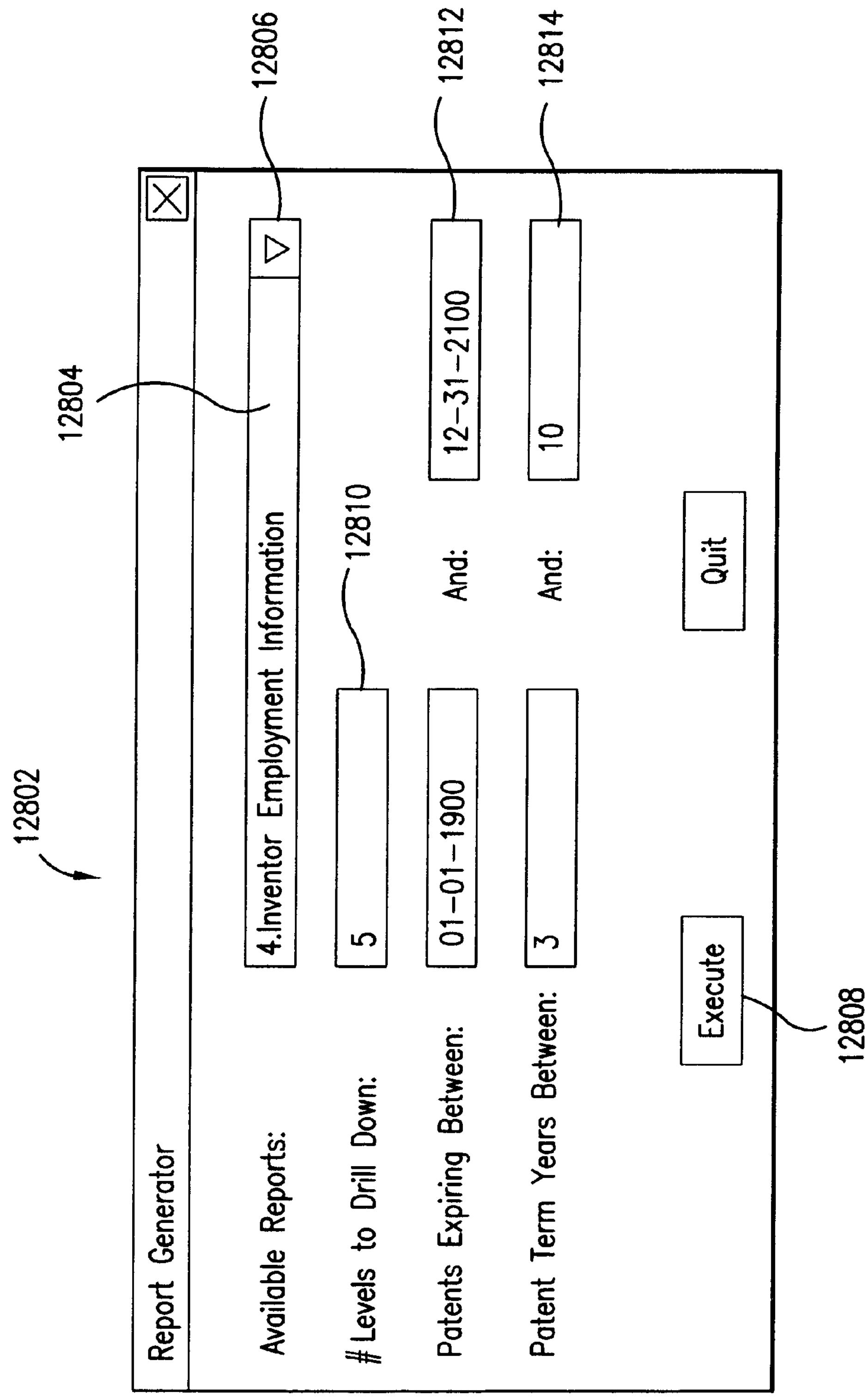
FIGS. 128 and 129 are example screen shots for invoking patent-centric and group-oriented functions.
Figure 129:
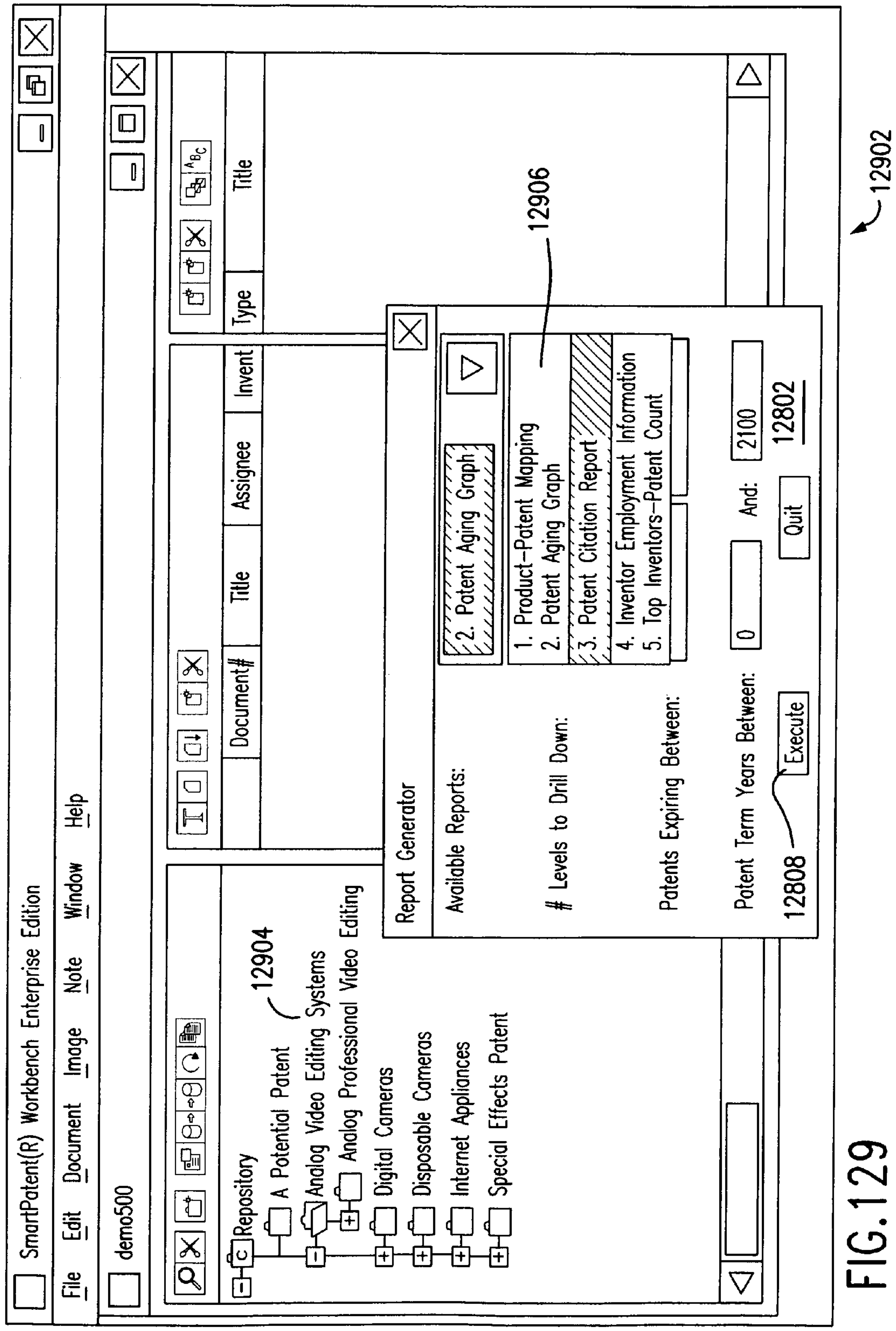

Upon the pressing of the Run Report button 13516, a Report Generator screen 12802 is displayed (FIG. 128). The operator selects the report or function that is to be executed by pressing a button 12806. This results in displaying a list of all available reports/functions. An example display of this function/reports list 12906 is shown in FIG. 129. The operator selects one of the function/reports from this list in a well-known manner. In the example of FIG. 128, the operator has selected the inventor employment information function (which is executed by the inventor employment information module 1014 of the Enterprise server 314).

The operator can enter information into the other fields of the report generator screen 12802 in order to define and/or limit the scope of the function that is to be performed. In particular, the operator can specify the number of levels in the group hierarchy to consider in performing the function (specified in field 12804) by entering the appropriate level information into a field 12810. If, for example, the operator enters the value 1 into field 12810, then only the group selected in the Group pane 11704 is considered in performing the selected function. If, instead, the operator enters the value 2 into field 12810, then both the selected group and its immediate child group (one level down from the selected group) are considered in performing the selected function. In the example of FIG. 128, the operator has entered the value 5 into field 12810. Accordingly, in performing the inventor employment information function, both the selected group and four levels of its child groups are considered.

The operator can limit the patents which are to be considered in performing the selected function by patent expiration dates by entering information into fields 12812. In the example of FIG. 128, all patents which are expiring or which have expired between the dates of Jan. 1, 1900 and Dec. 21, 2100 are considered in performing employment information function.

The operator can also limit the patents which are to be considered in performing the selected function according to the remaining patent terms of the patents. This information is entered into fields 12814. In the example of FIG. 128, only patents with remaining patent terms between three years and 10 years are considered in performing the inventor employment information function.

Once the operator has defined the function that is to be performed by entering information into the report generator screen 12802, the operator presses the Execute button 12808 in order to execute the selected function.

Adding Documents to a Group

Figure 130:
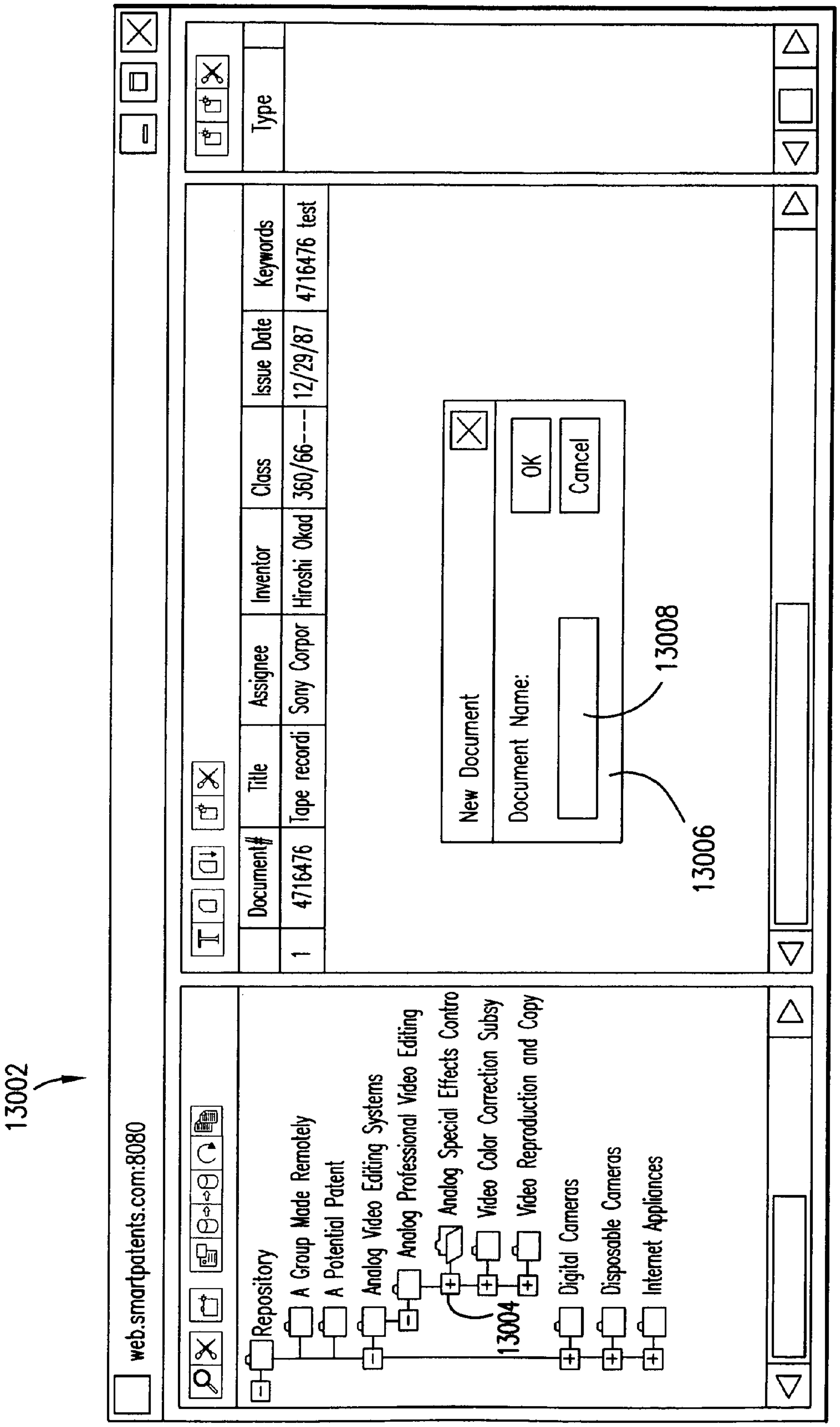
FIG. 130 is an example screen shot for adding a document to a group.

The operator presses an Add a Patent/Document button 13608 in the Document toolbar 11726 in order to add a patent or some other document to the group selected in the Group window 11704. Upon pressing the Add a Patent/Document button 13608, a new Document window 13006 is displayed (FIG. 130). The operator inserts information identifying the document that is to be added to the selected group in a Document Name field 13008. In an alternative embodiment, the operator can select a document for insertion into the selected group by browsing through a graphical list of the documents in the Document databases 612, and use well-known drag and drop techniques to place documents into the selected group.

Adding a Document Note

The operator presses the Add a New Patent/Document Note button 13704 in the note toolbar 11728 in order to add a new note to a document. Consider the example shown in FIG. 125. In this example, a Text window 12506 displays a portion of the text from U.S. Pat. No. 5,029,013. The present invention allows the operator to attach a note to any portion of this patent. Suppose that the operator wishes to attach a note to the title, "Apparatus for Editing Videotapes" 12510. According to the present invention, the operator selects a pen 12508, and then uses the selected pen 12508 to highlight the title 12510. The operator then presses the Add a New Patent/Document Note button 13704. This results in a new note being created. This new note is displayed in a Note window 12514. The operator can enter a title for the note in field 12520, and can enter the text or other information for the note in field 12524. The operator can also indicate whether this note represents attorney work product via field 12522.

The Note window 12514 includes location information that identifies the location of the text in the document to which the note is linked. This location information is represented by reference numbers 12516 and 12544. The location information 12516 indicates that the note is attached to a portion of U.S. Pat. No. 5,029,013 starting at line 6. The location information 12544 indicates that this portion in U.S. Pat. No. 5,029,013 represents bibliographical information portion (indicated by the symbol B1).

In some embodiments, it is not necessary for the operator to press the Add a New Patent/Document Note button 13704. Instead, the new note is automatically created once the selected pen 12508 is used to highlight the title 12510. Other aspects of the present invention relating to creating and manipulating notes are described in U.S. Pat. No. 5,623,681, U.S. Pat. No. 5,623,679, pending U.S. application Ser. No. 08/341,129, and pending U.S. application Ser. No. 08/590,082, incorporated herein by reference in their entireties.

The Notes window 12514 includes an Unlink button 12534 which, when pressed, operates to unlink the note from the document. The note is then called a floating note. The Notes window 12514 also includes a Contract button 12536 which operates to reduce the area on the display screen which is used to display notes. The Notes window 12514 also includes an Expand button 12538 which operates to increase the amount of space on the display screen which is used to display notes.

As described above, the Notes pane 11708 in the console 12502 lists the notes associated with the selected document in the Document pane 11706, or the selected group in the Group pane 11704. In the example of FIG. 125, the Notes window 11708 lists the notes associated with the document selected in the Document pane 11706. The document selected in Document pane 11706 is U.S. Pat. No. 5,029,013. As just explained above, the operator has created a new note that is linked to this selected document. The title of this new note is "Simple Note". Accordingly, this note is listed in the Notes window 11708. The listing corresponding to this new note indicates the type of a note (in this case, the type is P, indicating a patent note) and the title of the new note (in this case, the title is "Simple Note"). Additional information relating to the new note, and any other notes listed in the Notes pane 11708, can be viewed by sideways scrolling in the Notes pane 11708 by use of the horizontal scroll bar 11722.

Adding a Group Note

Figure 134:
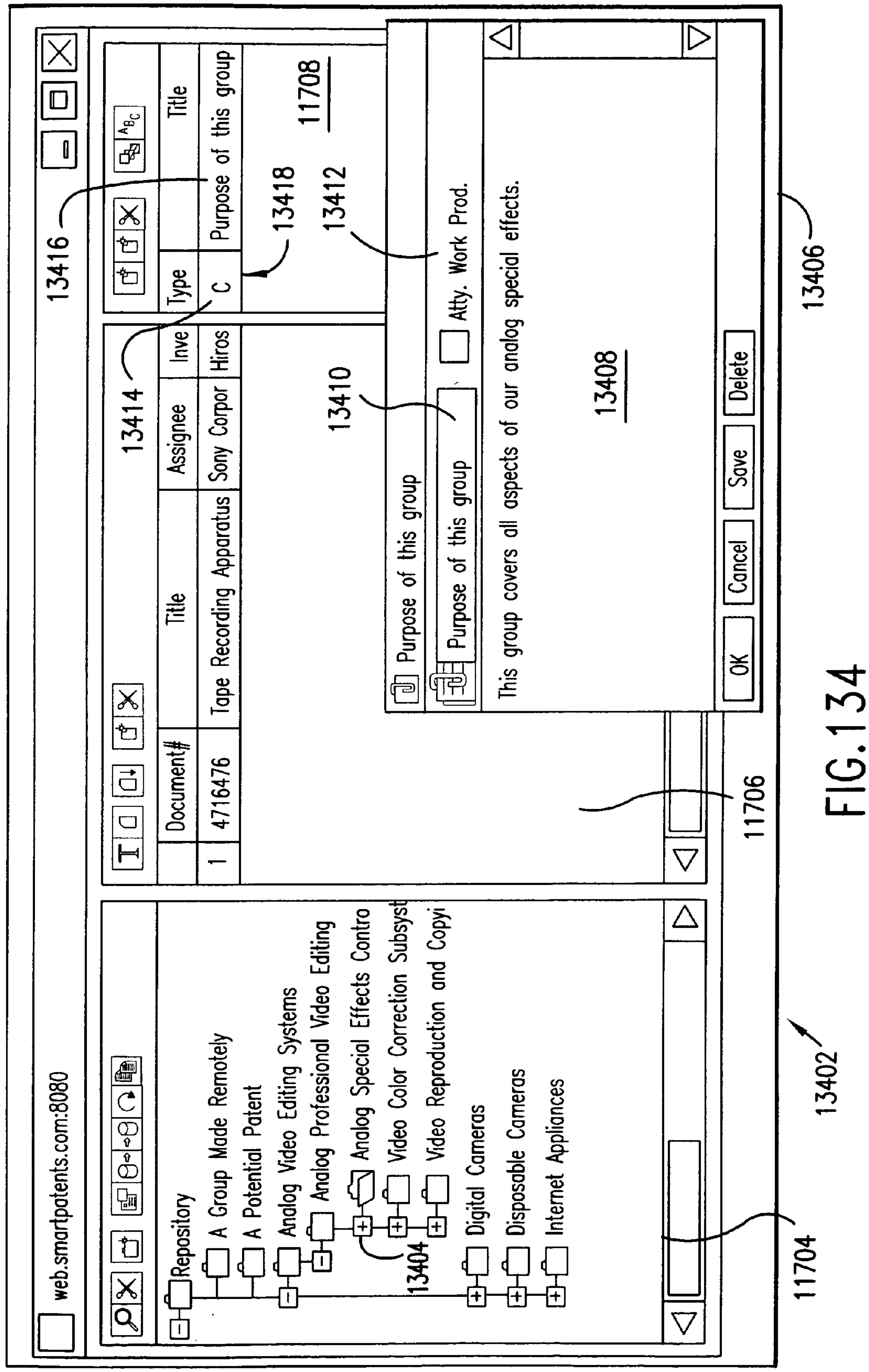
FIG. 134 is an example screen shot for creating a group note.

The operator presses the Add a New Group Note button 13702 in the Note toolbar 11728 in order to create a new group note for the group selected in the group pane 11704. Upon selection of the Add a New Group Note button 13702, a New Group window 13406 is displayed (FIG. 134). In the New Group window 13406, the user can enter the title of the group note in field 13410, and can enter information for the group note in field 13408. The operator can also indicate whether the group note constitutes attorney work product by checking field 13412.

The Notes pane 11708 lists the notes corresponding to the document selected in the Document pane 11706, or the group selected in the Group pane 11704. In the example of FIG. 134, the group titled "Analog special effects controller subsystem" 13404 is selected. Accordingly, the Notes pane 11708 lists all group notes associated with this selected group 13404. The New Group note (represented by the data in the New Group window 13406) is linked to the selected group 13404. Accordingly, the new group note is listed in the notes pane 111708. The listing for this new group note indicates the type of the note (in this case, the type is C, for a case or group note) and the title of the group note (in the example of FIG. 134, the title is "Purpose of this group"). Other information pertaining to the group notes can be viewed in the Notes pane 11708 by horizontally scrolling in the Notes pane 11708 by using the horizontal scroll bar 11722.

Searching

Figure 121:
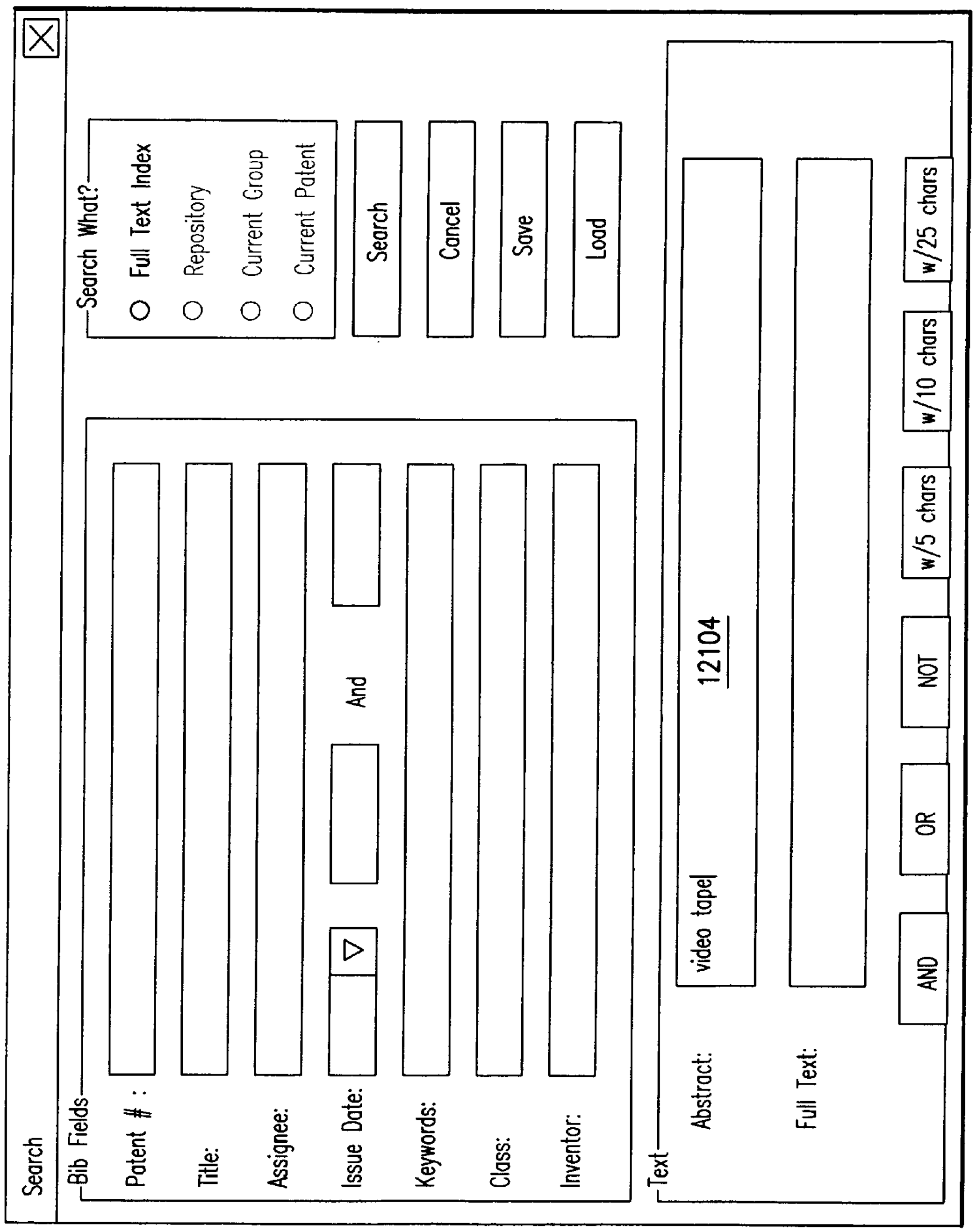
FIGS. 121 and 122 are example screen shots for searching through the databases.

The operator presses the Search button 13502 in the Group toolbar 11724 in order to perform a search of the data in the databases 316. Upon pressing the Search button 13502, a search screen 12102 is displayed (FIG. 121). Other example search screens are shown in FIGS. 53 and 57. The operator enters information into the Search screen 12102 in order to define the parameters of a new search. In the example of FIG. 121, the operator has entered the phrase “video tape” into an abstract field 12104. Accordingly, the operator has indicated that he wishes to conduct a new search for all documents where the phrase “video tape” appears in the abstract.

Figure 122:
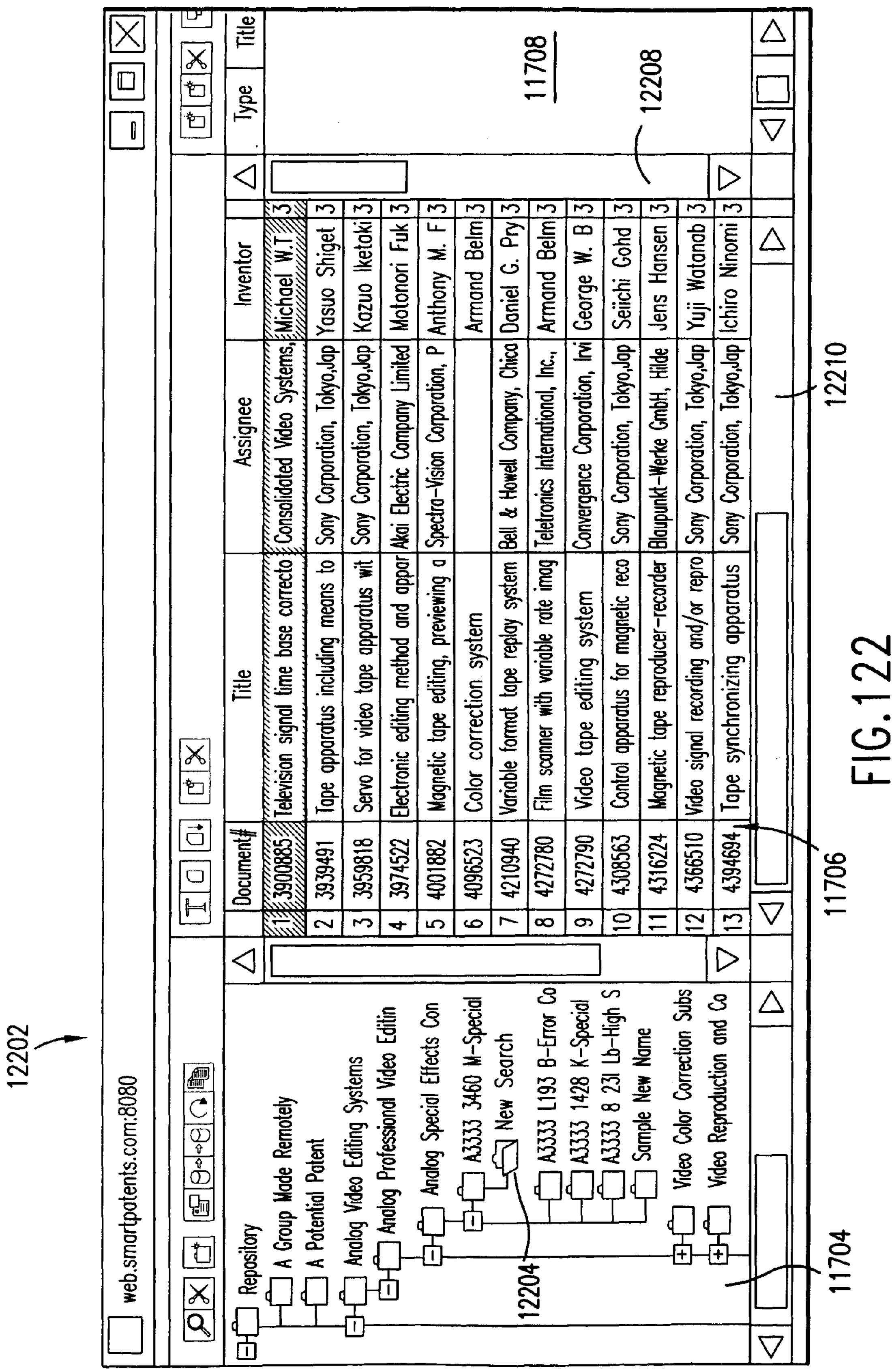

FIG. 122 illustrates an example console 12202 that results after the search defined in the example Search screen 12102 (FIG. 121) is performed. According to the present invention, a new temporary group 12204 (called New Search) is created to hold the search results (in other words, the documents that are identified from performance of the search are placed in the new group 12204 called “New Search”). This new group 12204 is created as a child group of the group that was selected in the group pane 11704 when the search was executed.

A list of the documents identified by operation of the search is displayed in the Document pane 11706. The operator can add these documents to any other group in the group hierarchy (displayed in the Group pane 11704) using well-known drag-and-drop operations. Alternatively, the operator can convert the new group 12204 to a permanent group (predefined or user-defined), and maintain these documents in the permanent group 12204 entitled “New Search”.

Figure 155A:
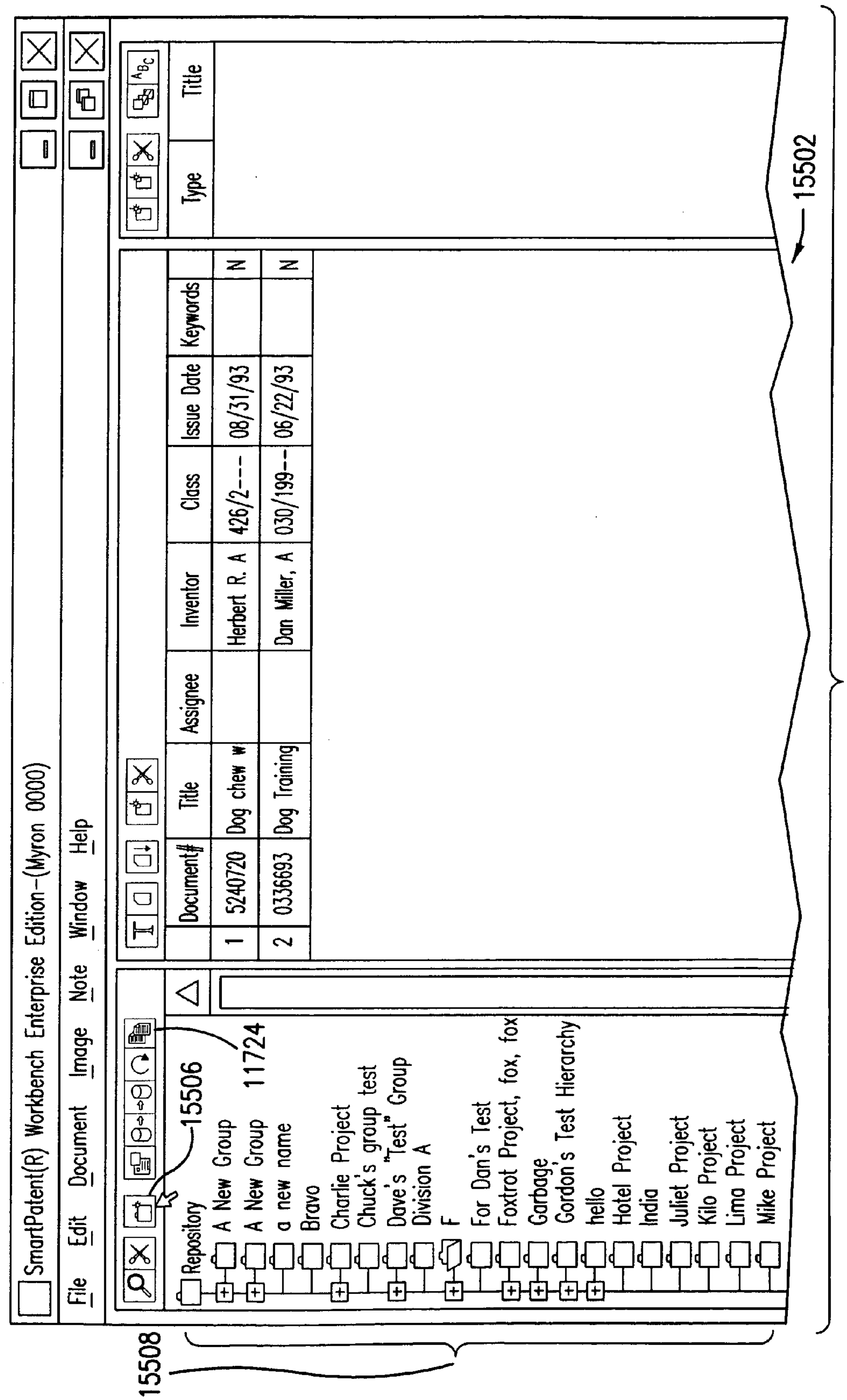
FIG. 155 illustrates an example console used to describe temporary groups.
Figure 155B:
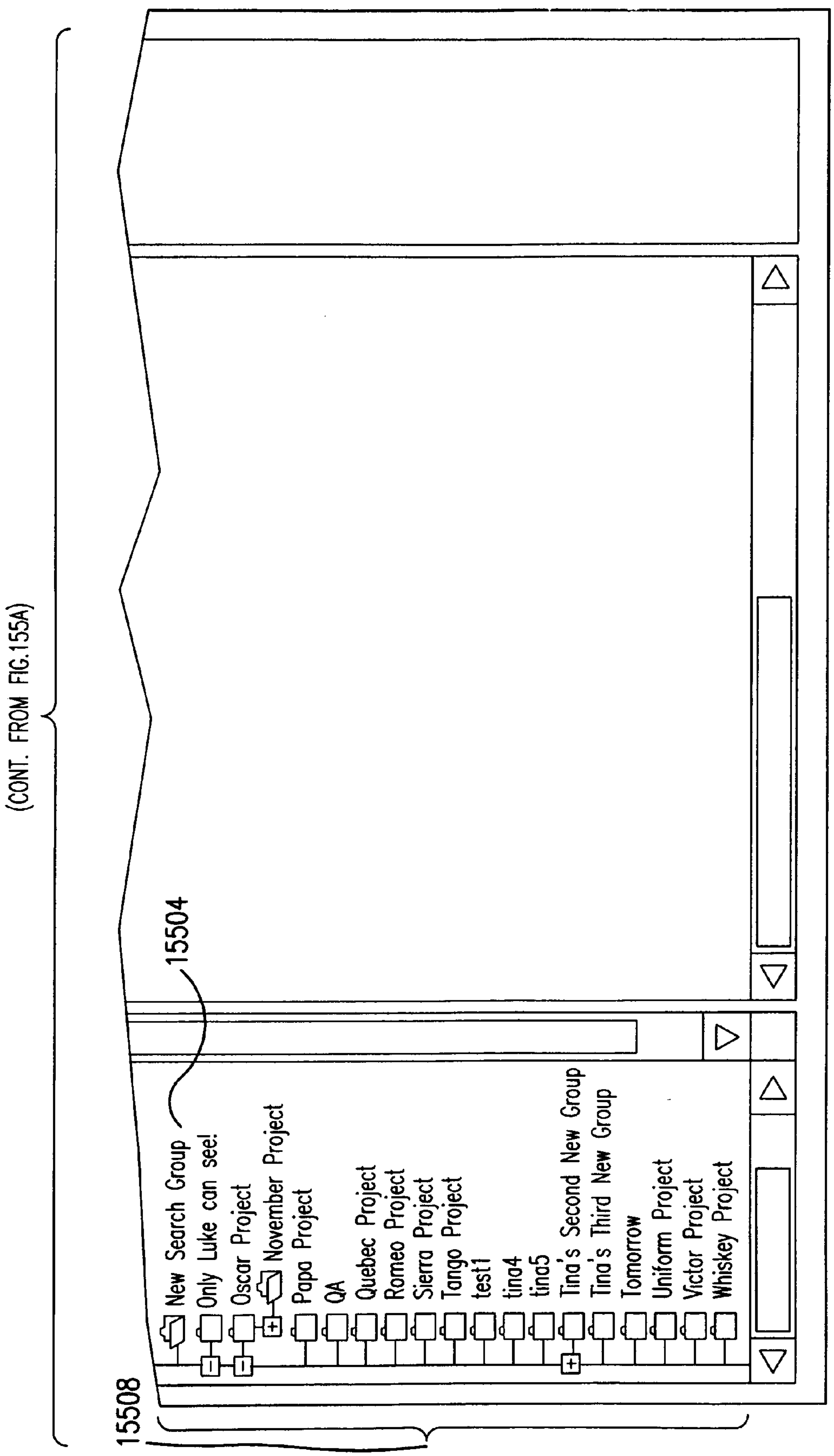

FIG. 155 illustrates an example console 15502 where a temporary group 15504 called “New Search Group” has been created. Temporary groups may be color coded differently from other groups in the group hierarchy 15508. In the embodiment of FIG. 155, the group toolbar 11724 includes a “regular group” button 15506. By pressing the regular group button 15506, the temporary group 15504 becomes a permanent group. In an embodiment of the invention, the type of the new permanent group is the same as the permanent group’s immediate parent. Thus, if the parent is a user-defined group, then the new permanent group is a user-defined group. If the parent is a BOM group, then the new permanent group is a BOM group. In an alternate embodiment, the operator is prompted to enter a type for the temporary group 15504. In another embodiment, the type is predefined, such as BOM.

In an embodiment of the invention, a temporary group is automatically deleted at some time in the future, such as after a timeout or at the conclusion of the session with the enterprise server 314, if not converted to a permanent group before then.

Web Searching

The operation of a web client 304 with regard to searching for data in the databases 316 according to an embodiment of the invention is described in this section. It should be understood, however, that the search capabilities described herein are applicable to all clients 304,306 in various embodiments of the invention. That is, in some embodiments of the invention, all clients 304,306 include at least the capabilities described herein.

In the following, searching at the web clients 304 is described in the context of patent searching. However, the following description applies to searching for all types of documents.

An operator at a web client 304 presses the Search button 13502 in the Group toolbar 11724 in order to access the search capabilities of the present invention. Upon pressing the Search button 13502, a Patent Search screen or window 14002 is displayed (FIG. 140). This Patent Search screen 14002 is similar to the one shown in FIG. 53. In fact, some embodiments use the Patent Search screen 5302 shown in FIG. 53. Other embodiments use both the Patent Search screens 5302 and 14002 shown in FIGS. 53 and 140, respectively.

The operator enters information into the fields of the Patent Search screen 14002 in order to define the parameters of the search. For example, the operator can define the search in terms of patent number, title, inventor, assignee, class, user-defined key words, date of issue, abstract, and/or full patent text by entering search terms into the corresponding fields of the Patent Search screen 140. Also, the operator can select which fields to display in the search results by appropriate selection of the Check Box fields 14004. Further, the operator can order the display or printing of the search results according to a number of factors, such as patent number, assignee, expiration date, number of years remaining in patent term, or score. The score corresponds to the number of hits of the search parameters in a patent. The operator orders the search results by appropriate selection in the Order field 14006. The operator can also specify the number of patents in the search results to display per screen by entering the appropriate information in field 14008.

In the example of FIG. 140, the operator has entered the search term “PCMCIA” in the Abstract field. In other words, the search defined by the operator is one that will identify all patents having abstracts with one or more occurrences of the word “PCMCIA”. After the operator has fully defined the search in the Patent Search screen 14002, the operator presses the search button 14010 in order to execute the search.

Figure 143:
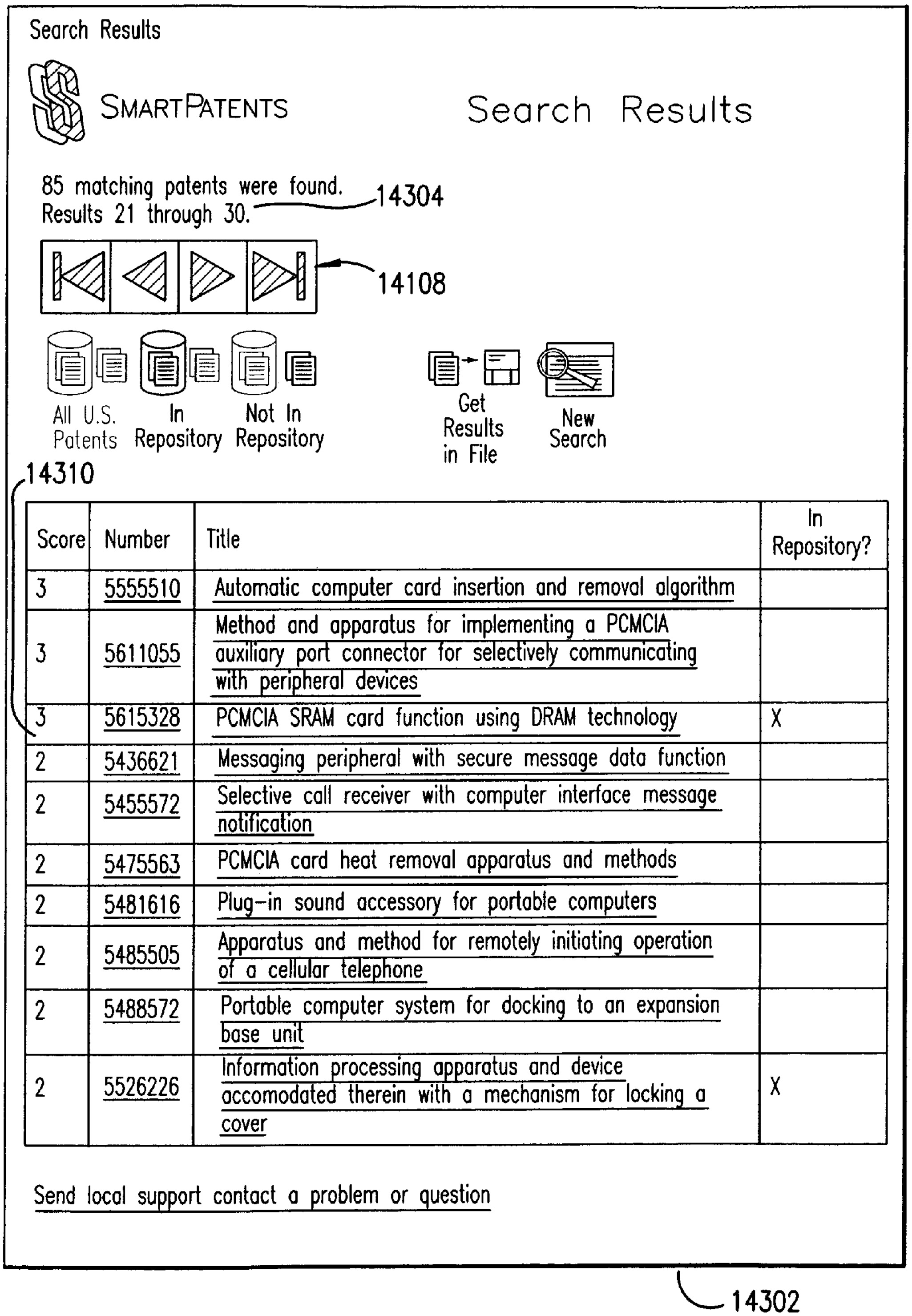

FIGS. 141-143 illustrate example Search Results screens corresponding to the search specified in the example Patent Search screen 14002 of FIG. 140. The execution of this search identified 85 patents. This information is indicated at reference number 14104 in Search Results screen 14102. Search Results screen 14102 displays information on the first 10 of these 85 patents. This is indicated at reference number 14106. Search Results screen 14202 (FIG. 142) displays information on the second 10 of these 85 patents. This is indicated at reference number 14204. Search Results screen 14302 displays information corresponding to the third 10 of these 85 patents. This is indicated at reference number 14304. The operator can display information on different ones of the 85 patents by use of the navigation arrows 14108. In other words, the operator can scroll through search results screens 14102, 14202, 14302 by use of the navigation arrows 14108.

Referring to FIG. 141, the information on the patents identified by performing the search is presented in a tabular format. The information displayed for each patent includes the score (that is, the number of hits of the search parameters in the patent), the patent number, and the title. More or less information can be displayed for each patent. This is controlled by the operator by appropriately checking the check boxes 14004 in the Patent Search screen 14002.

The information for each patent also includes an indication of whether or not the patent is in the local repository (i.e., stored in the patent database 614). This is indicated in the column called “In Repository?” In the example of FIGS. 141-143, for example, U.S. Pat. No. 5,334,030 is not in the patent database 614. However, U.S. Pat. No. 5,540,597 is stored in the patent database 614.

The operator can view additional information on any of the patents listed in the Search Results screens 14102, 14202, 14302 by selecting the patent (for example, by double-clicking on the patent number in the list of patents). The extent of the information that is displayed for a selected patent depends on whether or not the patent is stored in the patent database 614. If the patent is not stored in the patent database, then patent bibliographic information (retrieved from the patent bibliographic databases 604) is displayed for the selected patent. An example display of such patent bibliographic information for a selected patent is shown in FIG. 144. The information in this example display 14402 corresponds to U.S. Pat. No. 5,183,404 (which the operator selected by selecting entry 14110 in the Search Results screen 14102 of FIG. 141).

The display screen 14402 includes patent bibliographic information 14404 on U.S. Pat. No. 5,183,404. Also, in accordance with an embodiment of the invention, the display screen 14402 also includes text corresponding to the abstract 14406 of U.S. Pat. No. 5,183,404. In other words, for patents not stored in the patent database 614, the system of the present invention maintains both patent bibliographic information and the abstract. Such patent bibliographic information and abstract are stored in the patent bibliographic databases 604. (For example, the abstract can be stored in an Abstract database that is keyed to the primary patent table 1222 according to document_ID.)

Figure 145A:
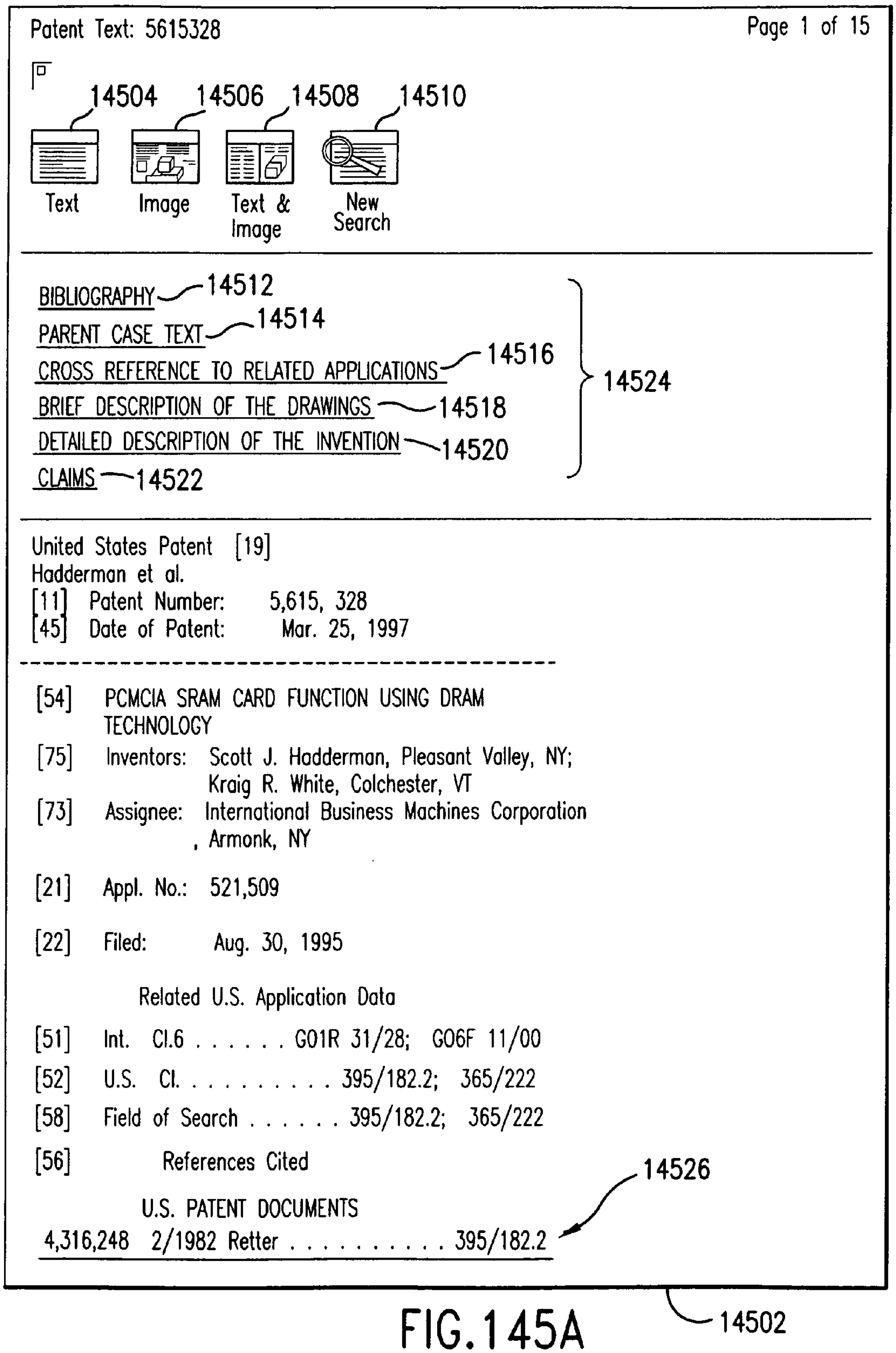

FIGS. 145A-145C depict example patent information screens that display patent information on patents that are contained in the Patent database 614. The Patent display screen 14502 in FIG. 145A corresponds to U.S. Pat. No. 5,615,328 (which the operator selected by double-clicking on entry 14310 in the Search Results screen 14302 of FIG. 143).

The operator can elect to display the text of the selected patent by pressing the Text button 14504. In the example of FIGS. 145A-145C, the operator has pressed the Text button 14504. Accordingly, the text of the selected patent is displayed in the Patent Information screens of FIGS. 145A-145C. FIGS. 145A-145C represent the first three (of 15) electronic pages of the text of the selected patent.

The operator presses an Image button 14506 to display the images of the selected patent. An example of such a display is shown in FIG. 56 (although the example in FIG. 56 does not correspond to U.S. Pat. No. 5,615,328). The operator presses a Text And Image button 14508 to simultaneously display the text and images of the selected patent. An example display of such text and image is shown in FIG. 112 (although the example display in FIG. 112 does not correspond to U.S. Pat. No. 5,615,328 shown in FIG. 145A). If the operator wishes to initiate a new search, the operator presses a New Search button 14510. This causes the Patent Search screen 14002 (FIG. 140) to be displayed.

The selected patent as displayed in the display screens of FIGS. 145A-145C is internally hyperlinked. Such hyperlinks are represented by buttons 14524. This button represented hyperlinking is a well known use of HTML.

If the operator wishes to view the bibliography of the selected patent, for example, then the operator presses the Bibliography button 14512. The operator presses the Cross Reference To Related Applications button 14516 to view cross-reference information of the selected patent. The operator presses the Brief Description Of Drawings button 14518 to view the brief description of the drawings section of the selected patent. The operator presses the Detailed Description Of The Invention button 14520 to view the detailed description section of the selected patent. The operator presses the Claims button 14522 to view the claims section of the selected patent.

Preferably, the invention implements such internal hyperlinking using a linked list of nodes, wherein each node corresponds to a section of the selected patent. Specifically, each node includes a link to the corresponding section of the selected patent. When the operator selects one of the Internal Linking buttons 14524, the invention traverses through the linked list corresponding to the selected patent until it finds the node corresponding to the section that the operator wishes to view. The invention then follows the link stored in the node to access the data corresponding to the section that the operator wishes to view. Additional details pertaining to this linked list is described in U.S. Pat. No. 5,623,679, incorporated by reference herein.

The Patent Information display screens in FIGS. 145A-145C may also linked to external objects, such as other patents, documents, etc. In other words, the selected document is linked to external objects. For example, if the operator wishes to view the patent representing the immediate parent of the selected patent, then the operator presses a Parent Case Text button 14514. This results in the parent patent being retrieved and displayed.

The selected patent may also be linked to references to other documents that are contained in the selected patent. For example, the selected patent as displayed in FIGS. 145A-145C includes links to cited U.S. patent documents. These links are represented by reference numbers 14526 and 14528. Hyperlinks in the selected patent are denoted by underlining. Alternatively, any other method of highlighting can be used, such as fonts, color coding, symbols, icons, etc.

The selected patent may also include links to citations of other publications, as represented by reference number 14530, and citations to related applications, as represented by reference number 14532.

For reference purposes, citations to documents that are linked to the actual documents are called linked citations.

The operator can view the document corresponding to any linked citation by selecting that linked citation. For example, FIG. 146 illustrates a display screen that shows information pertaining to U.S. Pat. No. 5,206,830. This display screen 14602 was generated pursuant to the operator selecting a corresponding linked citation 14536 in the selected patent (see FIG. 145B). In the display screen 14602 of FIG. 146, the operator can elect to electronically order a copy of the patent from a third party provider by pressing an Order button 14604.

Referring again to FIGS. 145A-145C, not all document citations contained in the selected patent are linked to the cited documents. For example, referring to FIG. 145B, the citation to U.S. Pat. No. 5,430,681 is not linked to the cited document (that is, it is not linked to an electronic copy of U.S. Pat. No. 5,430,681). According to the present invention, a citation in a document being displayed is linked to the cited reference only if that cited reference is represented in the document bibliographic databases 602 and/or the document databases 612. In other words, the documents corresponding to linked citations are represented in the document bibliographic databases 602 and/or the document databases 612.

A citation in a document being displayed is not a linked citation if the corresponding document is not represented in the document bibliographic databases 602 or the document databases 612. Accordingly, in the example of FIG. 145B, the document bibliographic databases 602 and the document databases 612 include no information pertaining to U.S. Pat. No. 5,430,681.

In other words, whether a citation to a document is linked to the document depends on whether or not the databases 316 store information on that document. If the databases 316 store information on the document, then the citation to the document is linked to the document (i.e., the citation is a linked citation). Otherwise, the citation to the document is not linked to the document (i.e., the citation is not a linked citation).

According to an embodiment of the invention, hyperlinking information is stored in a table in the databases 316. This hyperlinking table stores information pertaining to the links between documents. For a particular document, the hyperlinking table stores information that identifies the links between that particular document and other documents (these other documents being cited in the particular document). More particularly, each entry of this table corresponds to a linked citation, and stores information identifying both ends of the link of the linked citation. Specifically, each entry stores information that identifies a first document and the linked portion in the first document, and also includes information that identifies the object to which the linked portion in the first document is linked. This object may be a second document, for example. In the example of FIGS. 145A-145C, the hyperlinking table includes hyperlinking information that identifies the documents that are linked to the patent being displayed (that is, U.S. Pat. No. 5,615,328).

In an alternate embodiment, when a document is displayed, the document is automatically analyzed to identify and generate a list of all citations to other documents contained in the document. This list is then compared to the information stored in the databases 316. If the databases 316 have stored therein information on a document in the list, then the citation to that document becomes a linked citation. Otherwise, the citation to the document does not become a linked citation.

The invention also allows a document to have user-defined links. In operation, an operator would select a portion of a document being displayed, and then link that portion to some object. That object may be internal to the document (that is, linking a portion of a patent to another portion of the same patent), or external to the document (for example, linking a portion of a patent to another document or to a website). One portion corresponding to a user-defined link can completely or partially overlap with another portion corresponding to a user-defined link.

For example, as represented in FIG. 145C, the user has selected the company name "International Business Machines Corporation" and has linked this selected portion 14534 of the document being displayed to an external object. In the example of FIG. 145C, the operator has linked this portion 14534 of the document being displayed to the IBM patent website. Accordingly, when the operator selects this linked portion 14534, the IBM website is accessed.

Preferably, information pertaining to user-defined links is stored in a user-defined linking table in the databases 316. Each entry of this table corresponds to a user-defined link, and stores information identifying both ends of the link. Specifically, each entry stores information that identifies the document and the linked portion in the document, and also includes information that identifies the object to which the linked portion in the document is linked.

In practice, when the operator selects a linked citation, the client 304,306 generates a request to the Enterprise server 314 to retrieve information pertaining to the document corresponding to that linked citation (assuming that such information is not already stored in the cache within the client 304, 306). In the case of web clients 304, patent-centric URL commands are sent to the Enterprise server 314 (see FIG. 151).

Referring again to the Search Results screens in FIGS. 141-143, the operator can press a Get Results In File button 14194 to write the search results to a user-specified file. The operator can also press an "In Repository" button 14190 to view a subset of the search results corresponding to patents that are in the local patent repository (that is, patents that are in the Patent database 614). An example display screen that results from pressing the "In Repository" button 14190 is presented in FIG. 147.

Still referring to FIG. 141, the operator can press a "Not In Repository" button 14192 in order to view a subset of the search results corresponding to patents that are not in the Patent database 614. This list of patents not in the Patent database 614 may be useful to the operator. For example, the operator can generate a purchase order to obtain these patents using this list.

Referring now to FIG. 147, the Search Results: Patents In Repository display screen 14702 includes a Skim Images button 14704. The operator presses the Skim Images button 14704 in order to view the first image page of each of the patents listed in table 14706 (this table lists the patents from the search results that are contained in the Patent database 614). The operator displays the first image page of successive patents listed in table 14706 by repeatedly clicking the Skip Images button 14704.

Figure 148:
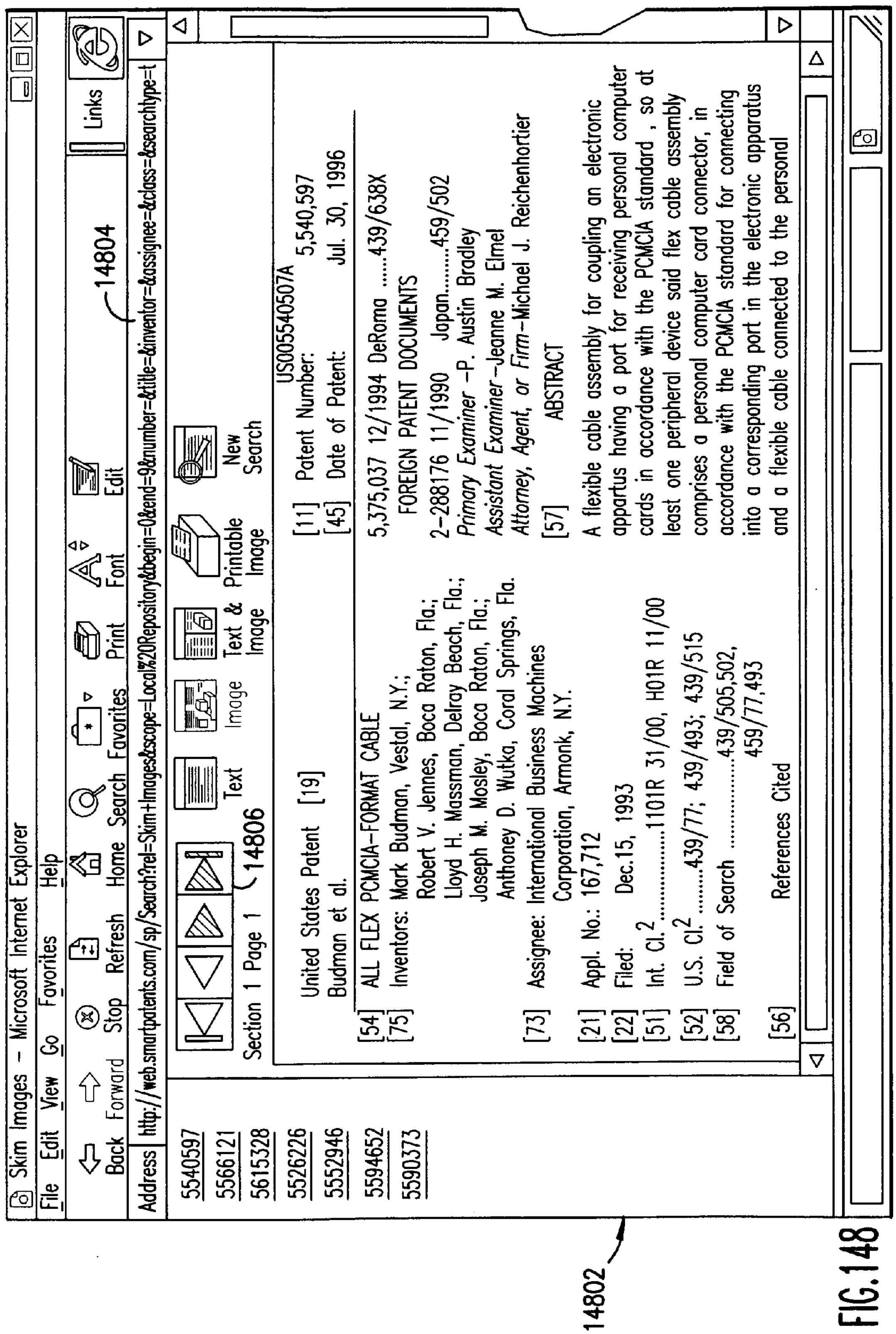
FIG. 148 illustrates an example display screen corresponding to the Skim Images function of the present invention.

A Skip Images display screen 14802 is shown in FIG. 148. This Skim Images Display screen 14802 results from clicking the Skip Images button 14704 a first time (that is, the image displayed in the Skip Images display screen 14802 corresponds to the first page of the first patent listed in table 14706). The operator can view the first image page of either a previous patent or a next patent in the list 14706 by use of the Navigation buttons 14806.

With regard to the web client 304, pressing the Skip Images button 14704 causes the web browser 808 to generate a patent-centric URL command. This patent-centric URL command represents a request to the Enterprise server 314 to retrieve the first image page of the associated patent (that is, the next patent in the list 14706). Enterprise server 314 responds by returning raw data corresponding to this image page. The translator 804 in the web server 310 converts this raw data to HTML data. The HTML data is sent to the web client 304. The browser 808 in the web client 304 receives this HTML data, and renders the HTML data in order to display the first image page of the patent, as shown by way of example in FIG. 148.

An example patent-centric URL command is displayed in field 14804 of the Skim Images display 14802.

The Skim Images feature of the present invention is analogous to a manual search of patents in the shoes of the USPTO Search Room. During such manual searches, practitioners often quickly thumb through the patents in a patent shoe by looking at the first pages of the patents. The Skim Images feature of the present invention enables an operator to quickly electronically scan over the first image pages of the patents in the list 14706, thereby emulating a manual search through the shoes in the PTO Search Room. It should be noted that the images displayed to the user are preferably HTML data rendered by the browser 808.

Importing Data

Figure 131:
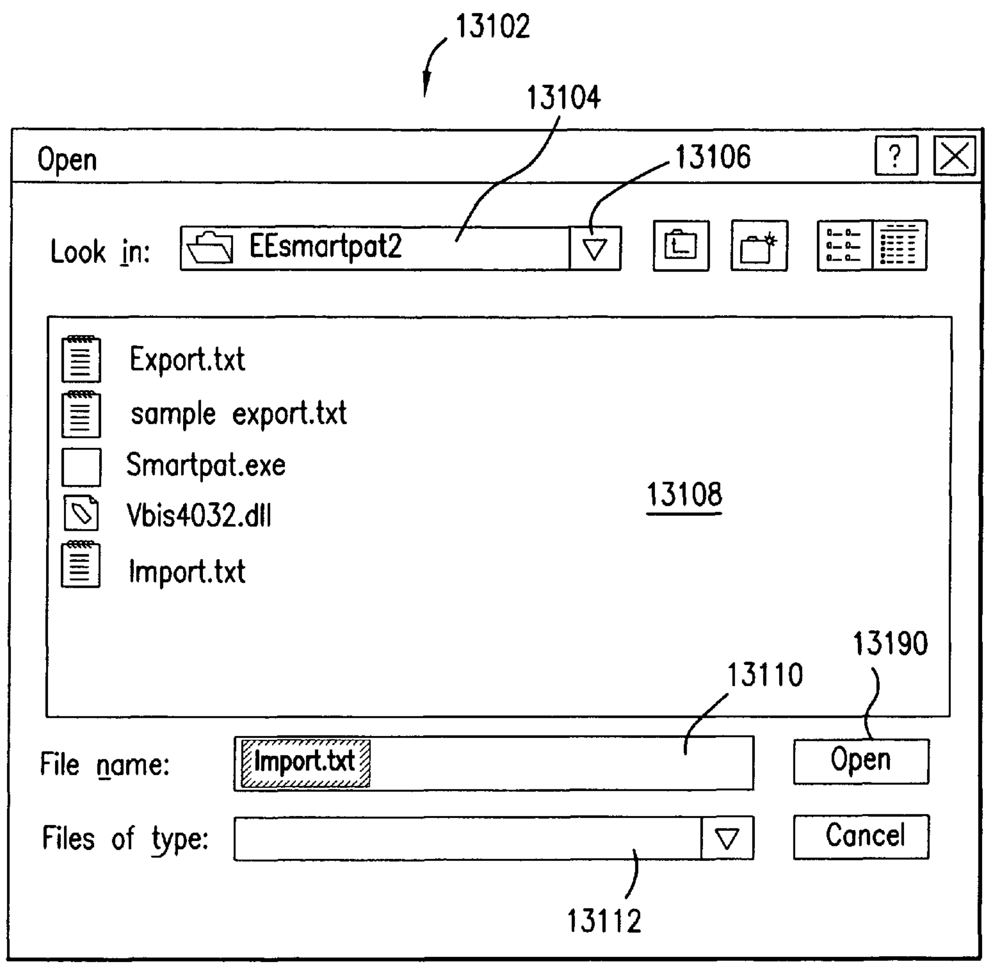
FIG. 131 is an example screen shot for importing data.

The operator presses the Import Data button 13510 in the Group toolbar 11724 in order to import data from an external location into the repository 612,602. Upon pressing the Import Data button 13510, an Import Data window 13102 is displayed (FIG. 131). In the Import Data window 13102, the user specifies the external drive in field 13104 (the user can browse through the available storage locations by pressing button 13106). The files in this selected location are displayed in window 13108. The operator enters the name of the file to import in field 13110. The type of this file (such as text, database, spreadsheet, etc.) is entered in field 13112. After specifying the parameters of the import operation, the operator presses the Open button 13190 in order to import the selected file from the selected external storage location into the repository 612, 602.

Exporting Data

Figure 132:
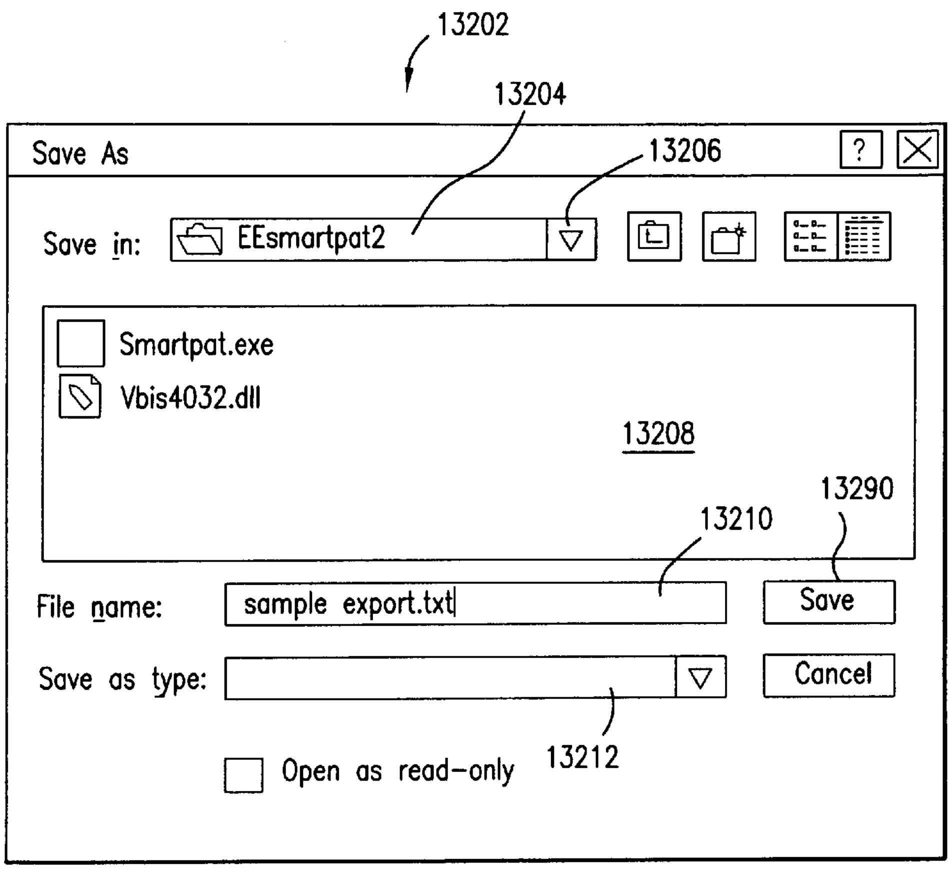
FIG. 132 is an example screen shot for exporting data.

The operator presses the Export Data button 13512 in the Group toolbar 11724 in order to export data from the repository 612,602 to an external location, such as an external file. Upon pressing the Export Data button 13512, an Export window 13202 is displayed (FIG. 132). In the Export window 13202, the operator enters the external location of the file to which the export operation is to be directed. This external location is entered in field 13204. It is noted that the operator can browse through all available external locations by pressing button 13206. A list of the files located in the external location (specified in field 13204) is displayed in field 13208. The user enters the name of the external location (to which the data is to be exported) in field 13210. The type of the file (such as text, spreadsheet, database) is entered in field 13212. After the operator has specified the parameters of the export operation, the operator presses the Save button 13290 in order to execute the export data operation.

Data Presenting and Processing Hyperbolic Trees

As described above, hyperbolic trees can be used for processing and presenting data in the context of the patent citation function. In the following, example uses of hyperbolic trees for data presentation and processing in the context of the present invention are described. First, the hyperbolic tree mechanism is generally described. Next, various functions of the present invention that optionally use hyperbolic trees for data presentation and processing are described.

General Description of Hyperbolic Trees

A hyperbolic tree or hyperbolic browser is a well known "focus+context" technique for visualizing and manipulating large hierarchies, such as trees. A hyperbolic browser assigns more display space to a portion of the tree while still embedding it in the context of the entire tree. The essence of this scheme is to lay out the tree in a uniform way on a hyperbolic plane and map this plane onto a circular display region. Thus, hyperbolic trees support a smooth blending between focus and context, as well as continuous redirection of the focus. Well known procedures exist for manipulating the focus using pointer clicks as well as interactive dragging, and for smoothly animating transitions across such manipulation.

Figure 177:
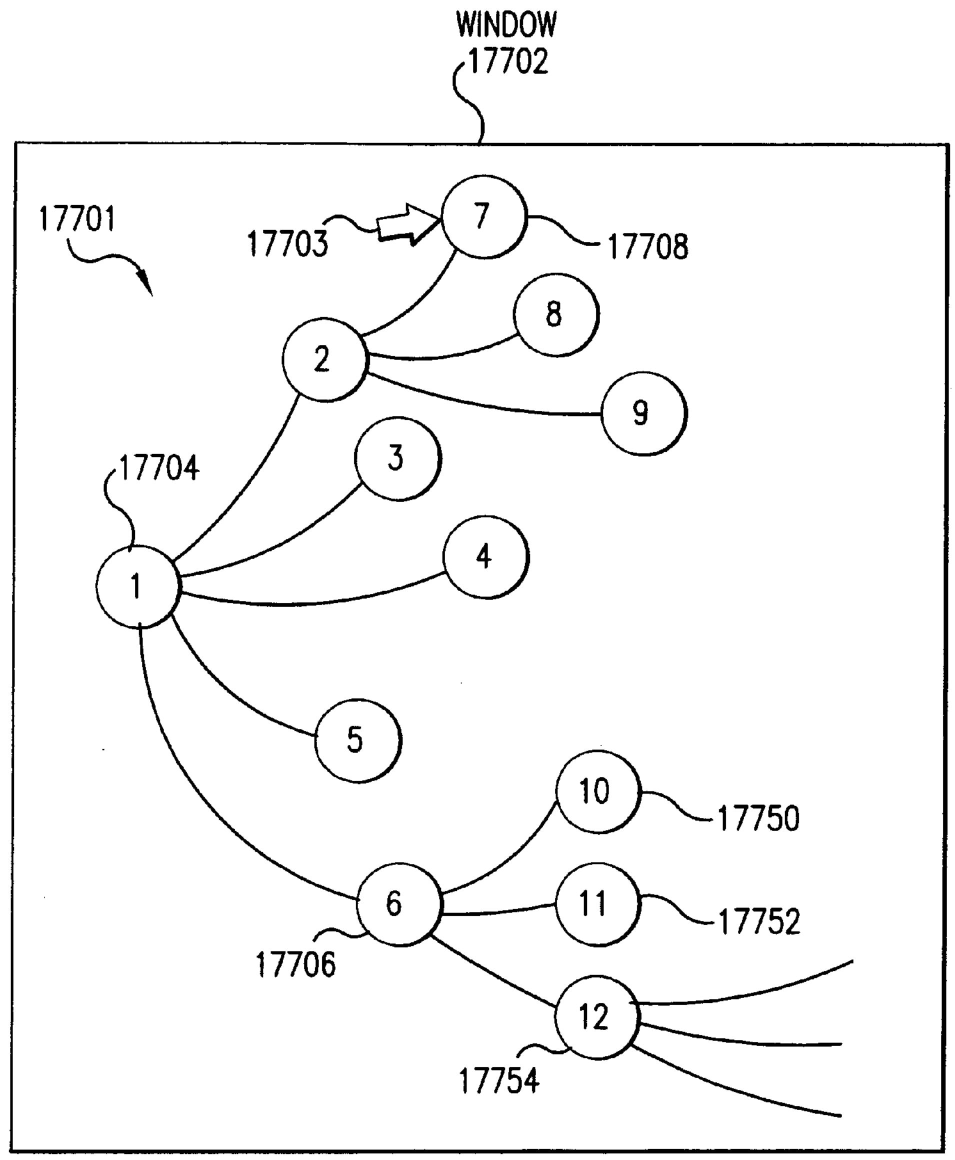
Figure 178:
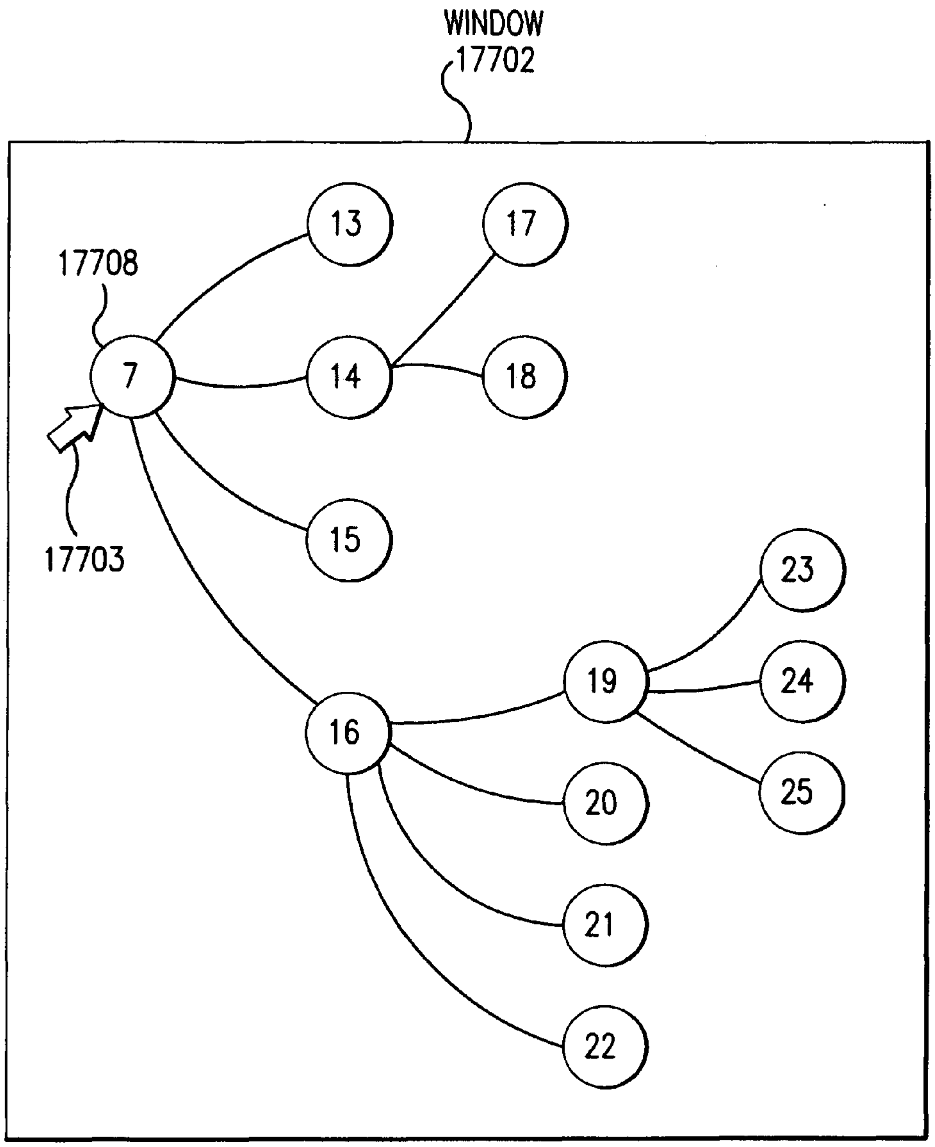

A hyperbolic browser initially displays a tree with its root at the center, but the display can be smoothly transformed to bring other nodes into focus. This is shown in the example of FIGS. 177 and 178. FIG. 177 illustrates an example hyperbolic tree 17701. A portion of the hyperbolic tree 17701 is displayed in a window 17702. The hyperbolic tree 17701 includes a root node 17704 and a plurality of additional nodes connected either directly or indirectly to the root node 17704. For example, node 17706 is connected directly to root node 17704. Node 17708 is connected indirectly to root node 17704.

Additional portions of the hyperbolic tree 17701 can be expanded and displayed in the window 17702 (that is, focus can be redirected to those portions) by traversing to the desired portions in the hyperbolic tree 17701. An operator traverses the hyperbolic tree 17701 using a pointer device, such as a mouse. For example, suppose that the operator wishes to focus the hyperbolic tree 17701 at node 17708. In this case, the operator moves the mouse (represented by icon 17703) and clicks proximate to node 17708. In response, the portion of the hyperbolic tree 17701 proximate to node 17708 is expanded and displayed. This is shown in FIG. 178.

With hyperbolic trees, the amount of space available to a node falls off as a continuous function of its distance in the tree from the point in the center. Thus, the context always includes several generations of parents, siblings, and children, making it easier for the user to explore the hierarchy without getting lost.

Hyperbolic trees exploit well known hyperbolic geometry. Hyperbolic geometry is described in a number of publicly available documents, such as Coxeter, *Non-Euclidean Geometry*, University of Toronto Press, 1965, and Moise, *Elemental Geometry from an Advanced Standpoint*, Addison-Wesley, 1974. As is well known, the essence of hyperbolic trees is to lay out the hierarchy, such as a tree, on a hyperbolic plane and map this plane onto a circular display region. The hyperbolic plane is a non-Euclidean geometry in which parallel lines diverge away from each other. This leads to the convenient property that the circumference of a circle on the hyperbolic plane grows exponentially with its radius, which means that exponentially more space is available with increasing distance. Thus, trees—which tend to expand exponentially with depth—can be laid out in hyperbolic space in a uniform way, so that the distance (as measured in the hyperbolic geometry) between parents, children, and siblings is approximately the same everywhere in the hierarchy.

While the hyperbolic plane is a mathematical object, it can be mapped in a natural way onto the unit disk, which provides a means for displaying it on an ordinary (Euclidean) display. This mapping displays portions of the plane near the origin using more space than other portions of the plane. Very remote parts of the hyperbolic plane get minuscule amounts of space near the edge of the disk. Translating the tree on the hyperbolic plane provides a mechanism for controlling which portion of the structure receives the most space without compromising the illusion of viewing the entire hyperbolic plane.

Much of the above general description of hyperbolic trees and browsers was taken or adapted from Lamping et al., "A Focus+Context Technique Based on Hyperbolic Geometry for Visualizing Large Hierarchies," *CHI '95 Proceedings Papers*, Xerox Palo Alto Research Center, 1995 (including the Appendix entitled "Implementing Hyperbolic Geometry"), incorporated herein by reference in its entirety. In addition to conventional sources, the Lamping et al. document and its Appendix are available on the Internet at www.acm.org/sigchi/chi95/Electronic/documnts/papers/jl-_bdy.htm. Hyperbolic trees and browsers are described in a number of additional publicly available documents, such as *Hyperbolic Tree Toolkit Application: Programmer's Reference*, Version 1.0, Xerox Corporation and InXight Software, Inc., January 1997, which is incorporated herein by reference in its entirety.

Each node in a hyperbolic tree, when being displayed, includes one parent node and zero or more child nodes. The one exception is the root node, which does not have a parent node, but which has zero or more child nodes. For example, node 17706 in FIG. 177 includes one parent node (node 17704) and three child nodes (nodes 17750, 17752, and 17754).

This description of the hyperbolic tree is a general description of the "tree" construct. That is, a tree includes a root node and multiple non-root nodes each having a single parent node and zero or more child nodes.

A graph, such as a directed acyclic graph (DAG), differs from a tree. Like a tree, a DAG includes a root node that does not have any parent nodes, and that has zero or more child nodes. (Generally, a DAG is not limited to a single root, or parentless, node. However, DAGs when used with the present invention either include a single root node, or are made to include a single root node. This is done by creating an artificial root node, and adding to it as children all of the previously parentless nodes.)

Figure 179:
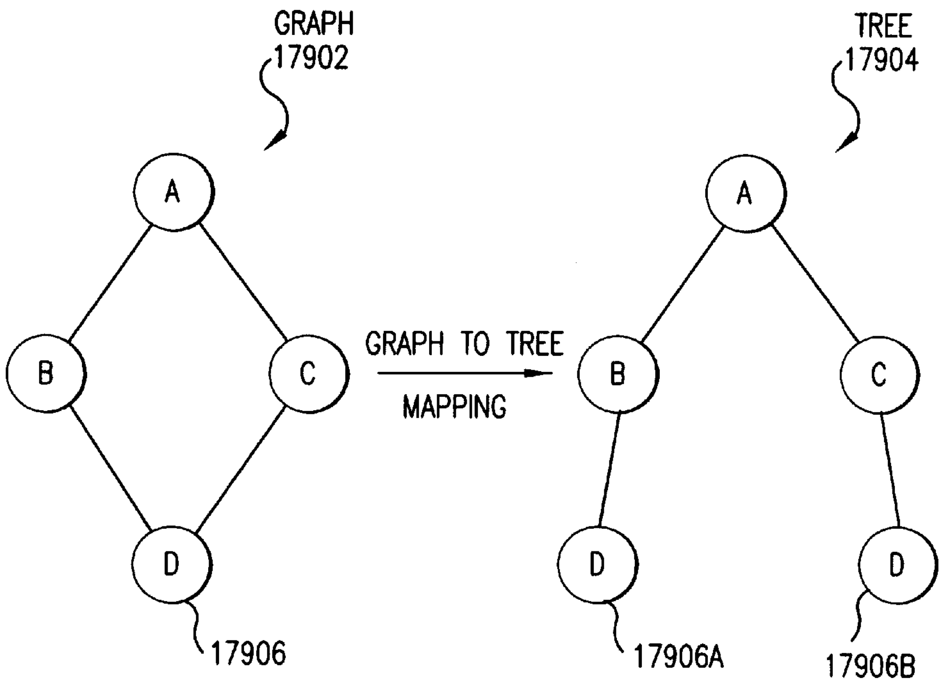

Also like a tree, each non-root node in a DAG includes zero or more child nodes. However, unlike trees, each non-root node in a DAG includes one or more parent nodes. An example DAG 17902 is shown in FIG. 179 where non-root node 17906 includes parent nodes B and C.

Trees and graphs (such as DAGs) are well known and are described in many publicly available documents, such as Aho et al., *Data Structures and Algorithms*, ISBN 0-201-00023-7, 1983.

Many of the modules of the present invention generate data which is optimally represented as a graph, such as a DAG. For example, patent citation data is best represented as a DAG since any given patent can be cited in multiple patents, and can also itself cite multiple patents. Also, claim charts are optimally represented as DAGs since any given dependent claim can depend from multiple parent claims (that is, a multiple dependent claim).

At the same time, the data generated by modules of the present invention can often be effectively represented through use of hyperbolic trees. This is the case, for example, with multi-level patent citation data (as described above). Accordingly, various modules of the present invention enable the operator to display data using hyperbolic trees.

Preferably, the present invention represents data, where appropriate, as a graph, such as a DAG. When an operator elects to display the data using a hyperbolic tree format, the invention does so.

Some well known hyperbolic browser implementations are capable of generating and displaying hyperbolic trees directly from DAGs. These hyperbolic browser implementations conceptually operate by mapping the root node in the DAG to the root node in the hyperbolic tree. Also, non-root nodes in DAG that have a single parent node are directly mapped to corresponding nodes in the hyperbolic tree. These hyperbolic browser implementations conceptually map non-root nodes in the DAG that have multiple parent nodes to multiple nodes in the hyperbolic tree, wherein each of these tree nodes are linked to a single parent node in the hyperbolic tree. This is shown in FIG. 179, where node D has parent nodes B and C in DAG 17902. As a result of this conceptual mapping process in hyperbolic browser, nodes 17906A and 17906B are created in the hyperbolic tree 17904. Each of these nodes 17906A and 17906B is linked to a single parent node (that is, nodes B and C) in the hyperbolic tree 17904. The process of generating and populating a hyperbolic tree from a DAG by such hyperbolic browser implementations will be apparent to persons skilled in the relevant art(s).

When operating with such hyperbolic browser implementations, the invention passes the DAG to the hyperbolic browser. The hyperbolic browser generates and displays a hyperbolic tree directly from the DAG.

Other well known hyperbolic browser implementations are not capable of generating and displaying hyperbolic trees directly from DAGs. When working with such hyperbolic browser implementations, the invention translates or maps the DAG to a tree format. This mapping process is illustrated in FIG. 179. According to this mapping process, the root node in the DAG 17902 is directly mapped to the root node in the tree 17904 (see node A). Also, non-root nodes in DAG 17902 that have a single parent node are directly mapped to corresponding nodes in the tree 17904 (see nodes B and C). Non-root nodes in the DAG 17902 that have multiple parent nodes are mapped to multiple nodes in the tree 17904. Each of these tree nodes are linked to a single parent node in the tree 17904. See node D, which has parent nodes B and C in DAG 17902. As a result of the mapping process, nodes 17906A and 17906B are created in the tree 17904. Each of these nodes 17906A and 17906B is linked to a single parent node (that is, nodes B and C).

The invention then passes the tree 17904 to the hyperbolic browser. The hyperbolic browser generates and displays a hyperbolic tree from the tree 17904. The process of generating and populating a hyperbolic tree from the tree 17904 will be apparent to persons skilled in the relevant art(s).

In some embodiments, the invention performs this mapping process even when working with a DAG-enabled hyperbolic browser. This may be done for performance reasons. For example, performance may be enhanced by having the invention perform the mapping function, as opposed to the hyperbolic browser performing the mapping function.

Since the invention generates a graph or DAG 17902 to represent data, where appropriate, it is possible to easily display the information in DAG 17902 using other display mechanisms that are DAG-capable or DAG-enabled, or more generally graph-capable or graph-enabled. The scope and spirit of the present invention is intended and adapted to operate with DAG-capable or DAG-enabled display mechanisms, or more generally graph-capable or graph-enabled mechanisms, including those presently existing and those that will be developed in the future.

Various functions of the present invention that optionally use hyperbolic trees to present and process data are described in the following sections.

Patent Citation Tree

According to an embodiment of the present invention, the patent citation module 1004 performs a patent citation tree function (in addition to the functions described above).

Figure 164:
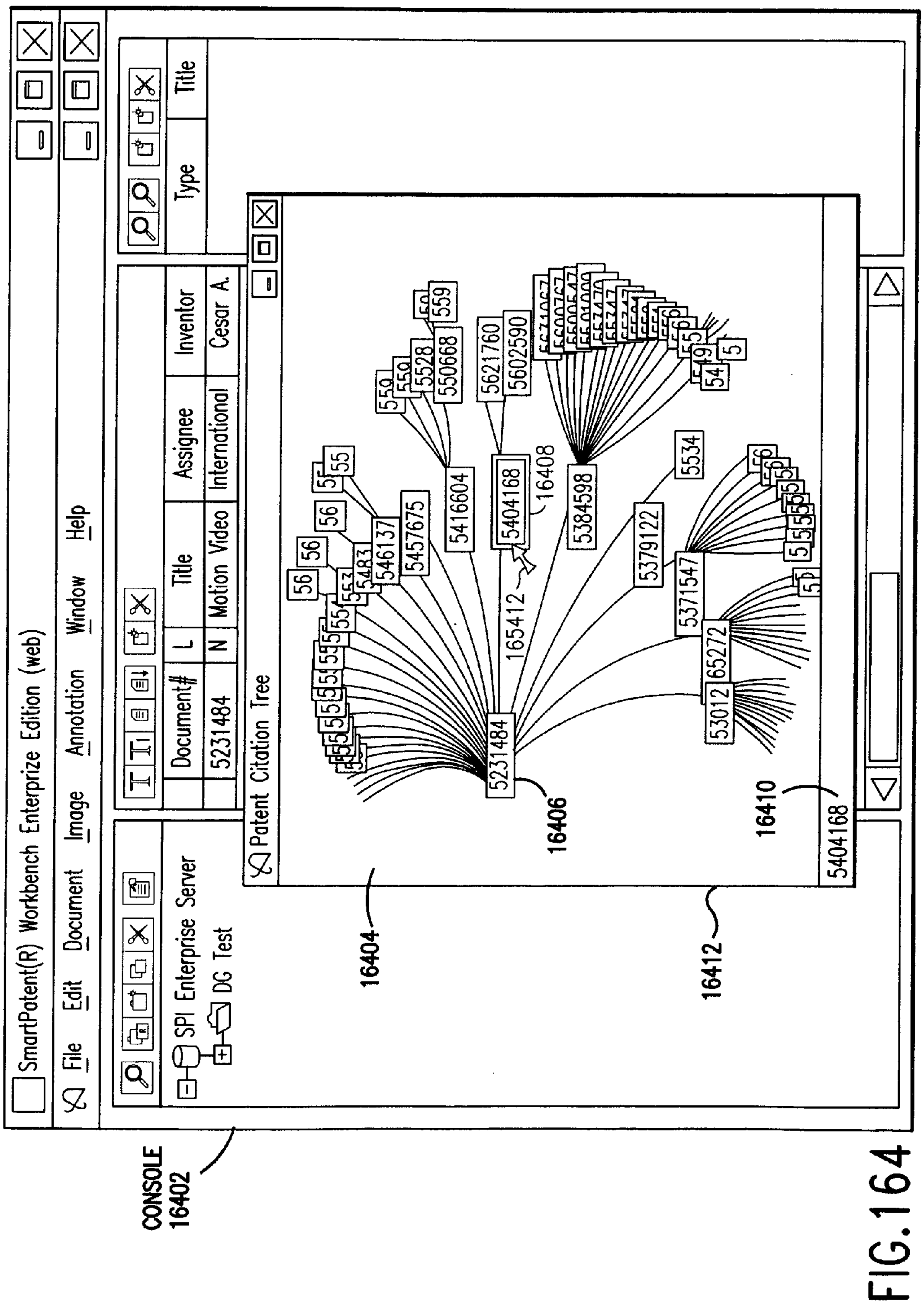
FIG. 164 illustrates an example patent citation tree.

FIG. 164 illustrates an example patent citation tree 16404, a portion of which is being displayed in window 16412. In the patent citation tree 16404, each node represents a patent, and each link represents a citation. When performing a forward patent citation function, the links going from the root node toward the children nodes or leaves represent the directed association "is cited in," as in "<parent-node> is cited in <child-node>." When performing a backward citation function, the links going from the root node toward the leaves represent the directed association "cites," as in "<parent-node> cites child-node>."

As discussed below, the nodes in the patent citation tree 16404 are preferably color coded or otherwise emphasized (by modifying the display properties of the nodes) according to patent ownership or assignee, or some other criteria, such as time (i.e., issue date) or user-selection (this is described below). As a result, the patent citation tree 16404 is very useful when performing clustering analysis and/or bracketing analysis. In fact, the patent clustering/bracketing module 1008 in some embodiments is capable of using hyperbolic trees to represent its data output. Accordingly, the description below of the patent citation module 1004 when performing the patent citation tree function using hyperbolic trees is also applicable to the patent clustering/bracketing module 1008. Additionally, other modules of the invention are capable of presenting their data output using hyperbolic trees. Accordingly, the following description is also applicable to these other modules of the invention.

Patent Citation Tree (Network Client)

The patent citation tree function when being performed by a network client 306 interacting with the enterprise server 314 shall now be described with reference to a flowchart 15702 in FIG. 157. For illustrative purposes, suppose that an operator at a network client 306 is viewing the example console 16102 shown in FIG. 161.

In step 15706, the operator selects a patent from a listing of patents displayed in document pane 16104. The patent selected shall be referred to as the '484 patent. The operator selects the '484 patent using a pointing device, such as a mouse (represented by icon 16110). An indication of this selection of the '484 patent is received by the network client 306.

Figure 162:
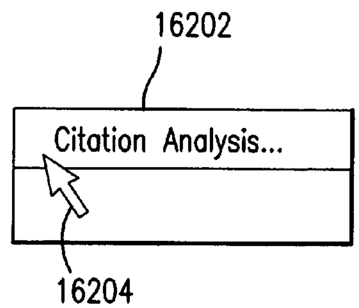
FIG. 162 is an example drop-down menu used to illustrate the manner in which an operator selects the citation analysis function.

In step 15708, while the '484 patent is selected, the operator issues a command to perform a citation analysis function. The operator may issue this command by right-clicking (while the mouse is positioned over the '484 patent in the document pane 16104) to bring up a context-sensitive pop-up menu 16202, a portion of which is shown in FIG. 162. Alternatively, the operator can press a button associated with the citation analysis function in the toolbar 16108 (which has been modified to include options in addition to those described above, such as the citation analysis function option), or make a selection from a menu accessible via the menu bar. The network client 306 receives an indication of this command issued by the operator.

Figure 163:
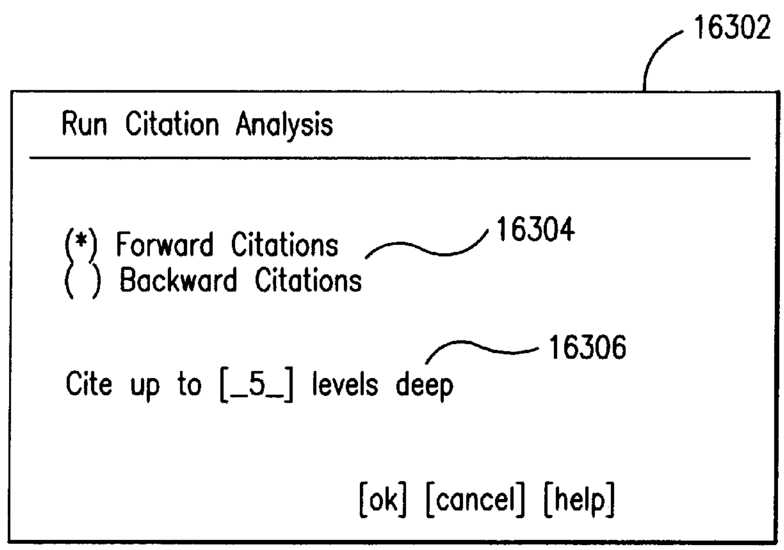
FIG. 163 is an example dialog box used to indicate how an operator defines a citation analysis command.

In step 15710, the network client 306 presents a dialogue box 16302 (FIG. 163) to the operator. In this dialogue box 16302, the operator identifies whether he wishes to perform a forward citation function or a backward citation function. Also, the operator defines the scope of the citation analysis to be performed by indicating the number of levels that should be cited. This information entered into the dialogue box 16302 is received by the network client 306.

In step 15712, the network client 306 interacts with the enterprise server 314 as necessary to retrieve information from the databases 316 pertinent to the citation analysis tree function specified by the operator. The manner in which step 15712 is performed is illustrated in a flowchart shown in FIG. 158.

In step 15804, the network client 306 sends a request to the enterprise server 314. The network client 306 generates the request in accordance with the enterprise server API discussed above. Accordingly, the request generated by the network client 306 conforms to the enterprise server API. Preferably, the request is made using the ReqAnalysis Citation command (described above). Alternatively, the request can be made using a properly formed ReqFunction command (described above). The request specifies: (1) either a backward citation search or a forward citation search (as indicated by the user in dialogue box 16302); (2) the '484 patent; and (3) the number of levels (as specified by the operator in dialogue box 16302).

In step 15806, the enterprise server 314 processes the request. In particular, the enterprise server 314 accesses the patent table 1222 (FIG. 12H) to identify the document_id associated with the '484 patent. For backward citation searches, the enterprise server 314 then accesses the PatentRef Table 1208 (FIG. 12C) using this document_id as the key to identify all patents which are cited in the '484 patent. Each hit in the PatentRef table 1208 corresponds to a patent that is cited in the '484 patent. When performing a forward patent citation search, the enterprise server 314 accesses the PatentRef Table 1208 to identify all patents which cite the '484 patent. In this case, the enterprise server 314 uses the document_id of the '484 patent as a key in searching the RefPatentNo field of the PatentRef table 1208 (in backward searches, the document_id field of the PatentRef table 1208 is searched). Each hit in the PatentRef table 1208 corresponds to a patent that cites the '484 patent.

For patent citations of one level, the search is then complete. However, for patent citations of greater than one level, the enterprise server 314 must repeatedly accesses the Patent RefTable 1208. For example, consider abackward patent citation function of two levels. Suppose that the above described operation identified that patents P1 and P2 are cited in the '484 patent. This is the first level. The second level refers to the patents that are cited in patents P1 and P2. Accordingly, the enterprise server 314 must perform the above described operations for each of patents P1 and P2, to identify the patents cited in P1 and P2.

In practice, to enhance performance, a single search command is issued for each level of the citation function. For example, a first search command is issued to identify all patents that cite a patent P1 (for a forward citation function). This is the first level. Suppose that patents P2, P3, and P4 are identified by this first search command. In the second level, a second search command is issued to identify all patents that cite patents P2, P3, and P4. In a similar manner, a single search command is issued for each of the other levels of the citation function being performed.

Figures 180, 181:
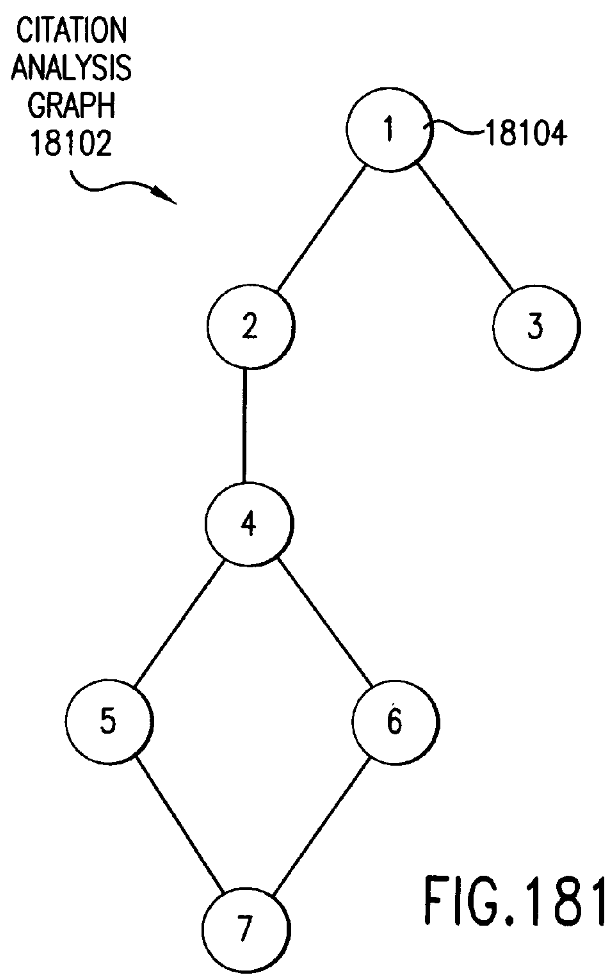

Further in step 15806, the enterprise server 314 processes the information retrieved from the databases 316 and generates two tables. In particular, the enterprise server 314 generates a parent/child table. An example patent/child Table 18002 is shown in FIG. 180. In the parent/child Table 18002, parent/child relationships between the patents retrieved from the databases 316 are indicated. The parent/child DAG 18102 corresponding to the parent/child Table 18002 is shown in FIG. 181. In DAG 18102, in the context of the example involving the '484 patent, node 1 corresponds to the '484 patent.

Figures 182, 183:
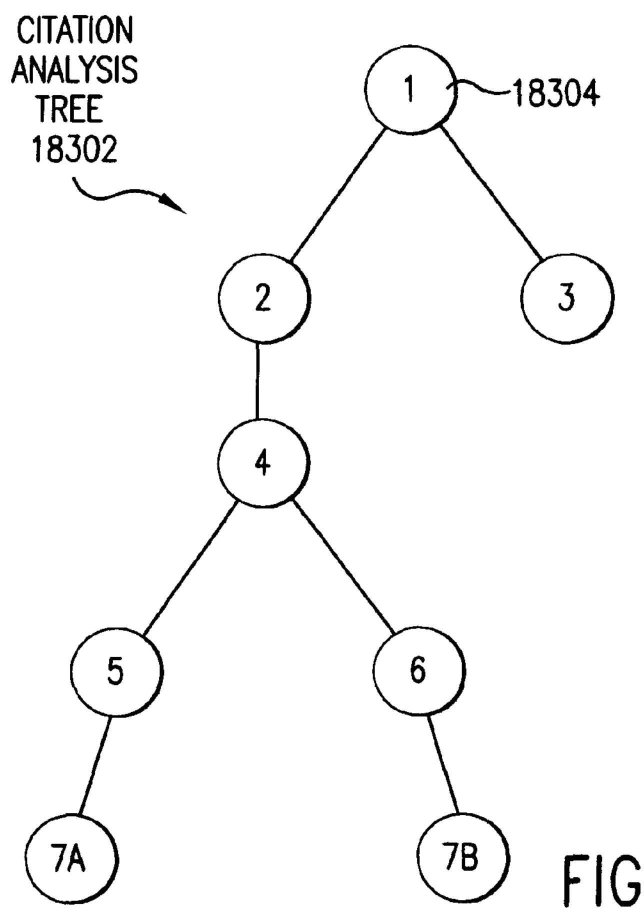

The enterprise server 314 also creates a patent bibliographic information table. An example patent bibliographic information Table 18202 is shown in FIG. 182. In the patent bibliographic information Table 18202, there is a row for each patent represented in the parent/child Table 18002. The row corresponding to each of these patents stores bibliographic information for that patent.

In other embodiments, the client 306 issues two commands, a first command to retrieve the parent/child information, and a second command to retrieve bibliographic information on the parents and children. In such embodiments, the ReqAnalysis Citation function may be configured to optionally return only the parent/child information. Other enterprise server API commands (described above) could be used to retrieve patent bibliographic information.

In step 15808, the enterprise server 314 transfers the patent/child table 18002 and the patent bibliographic information table 18202 to the requesting network client.

Figure 159:
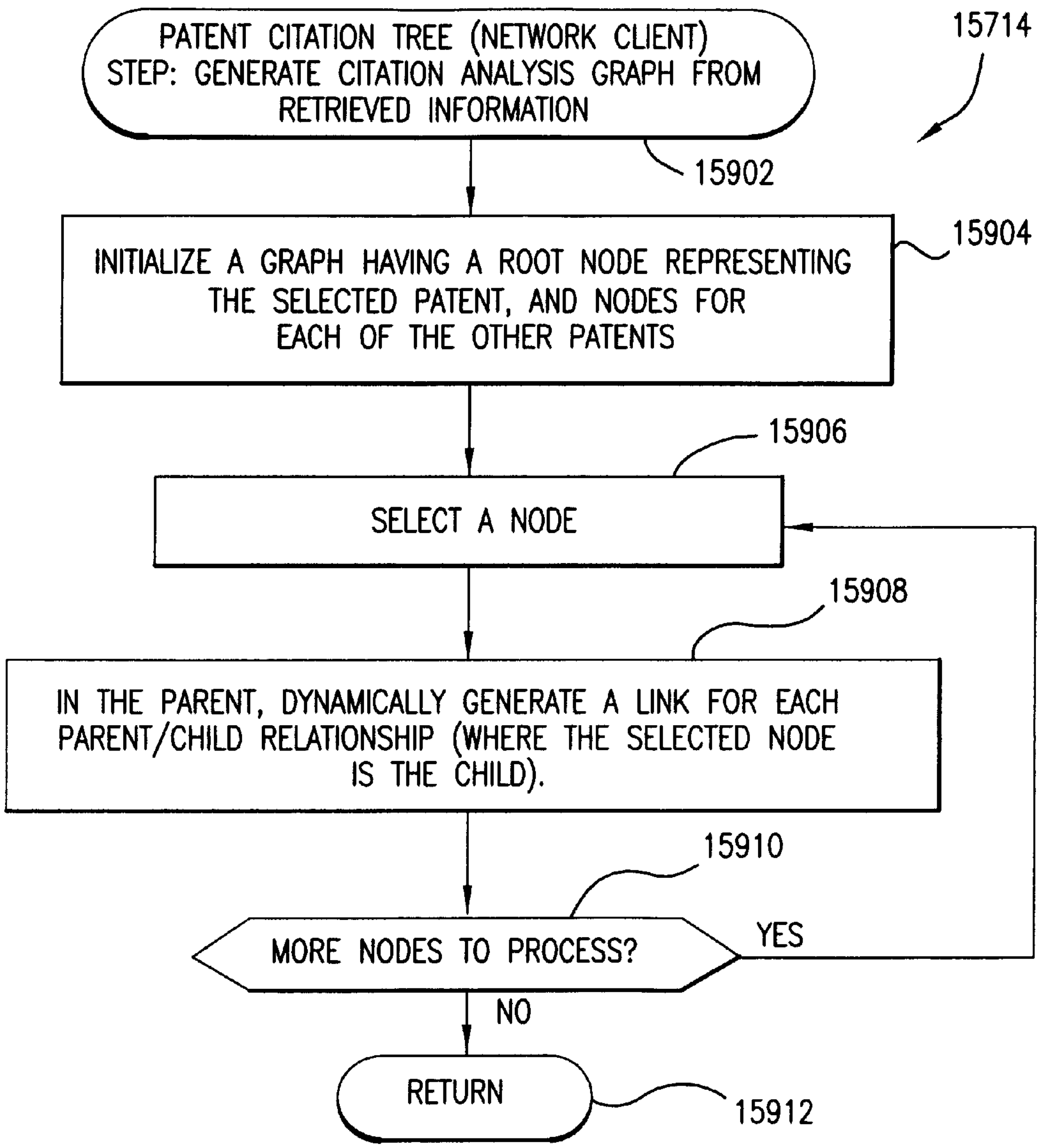

Referring again to FIG. 157, in step 15714 the network client 306, after receiving the parent/child table 18002 and the patent bibliographic information table 18202, generates a citation analysis DAG corresponding to the patent/child relationships indicated in the parent/child table 18002. Alternatively, the patent bibliographic information table 18202 can be retrieved as necessary, when the operator wants to view a patent (as described below). As indicated above, FIG. 181 illustrates the citation analysis DAG 18102 for the parent/child table 18002 of FIG. 180. The manner in which the network client 306 performs step 15714 is represented by a flowchart shown in FIG. 159.

In step 15904, the network client 306 initializes the citation analysis DAG 18102. The citation analysis DAG 18102 includes a root node representing the selected patent (that is, the '484 patent), and nodes for each of the other patents (i.e., patents that cite the '484 patent, or that are cited in the '484 patent). In the example of FIG. 181, the root node, representing the '484 patent, is node 1. The other nodes 2-7 represent patents that are cited by the '484 patent (in the case of a backward citation function), or patents that cite the '484 patent (in the case of a forward citation function). Note that, upon completion of step 15904, the links between nodes in the citation analysis DAG 18102 have not yet been established.

In step 15906, the network client 306 selects one of the nodes in the citation analysis DAG 18102 for analysis.

In step 15908, the network client 306 generates a link for each parent/child relationship for the selected node, where the selected node is the child. Such parent/child relationship information is obtained from the parent/child Table 18002. For example, assume that node 7 is the selected node. As indicated in the parent/child Table 18002, node 7 (or, equivalently, patent 7) is the child of patent 5 and patent 6. Accordingly, in step 15908, the network client 306 creates a link to node 7 in both node 5 and node 6. The information representing these links is preferably stored in the parent nodes of the selected node to allow navigation of the tree from the root down.

In step 15910, the network client 306 determines whether there are any additional nodes in the citation analysis DAG 18102 that have not yet been processed. If there are such nodes, then control returns to step 15906. Otherwise, the citation analysis DAG 18102 is complete, and control returns to flowchart 15702 in FIG. 157.

Figure 160:
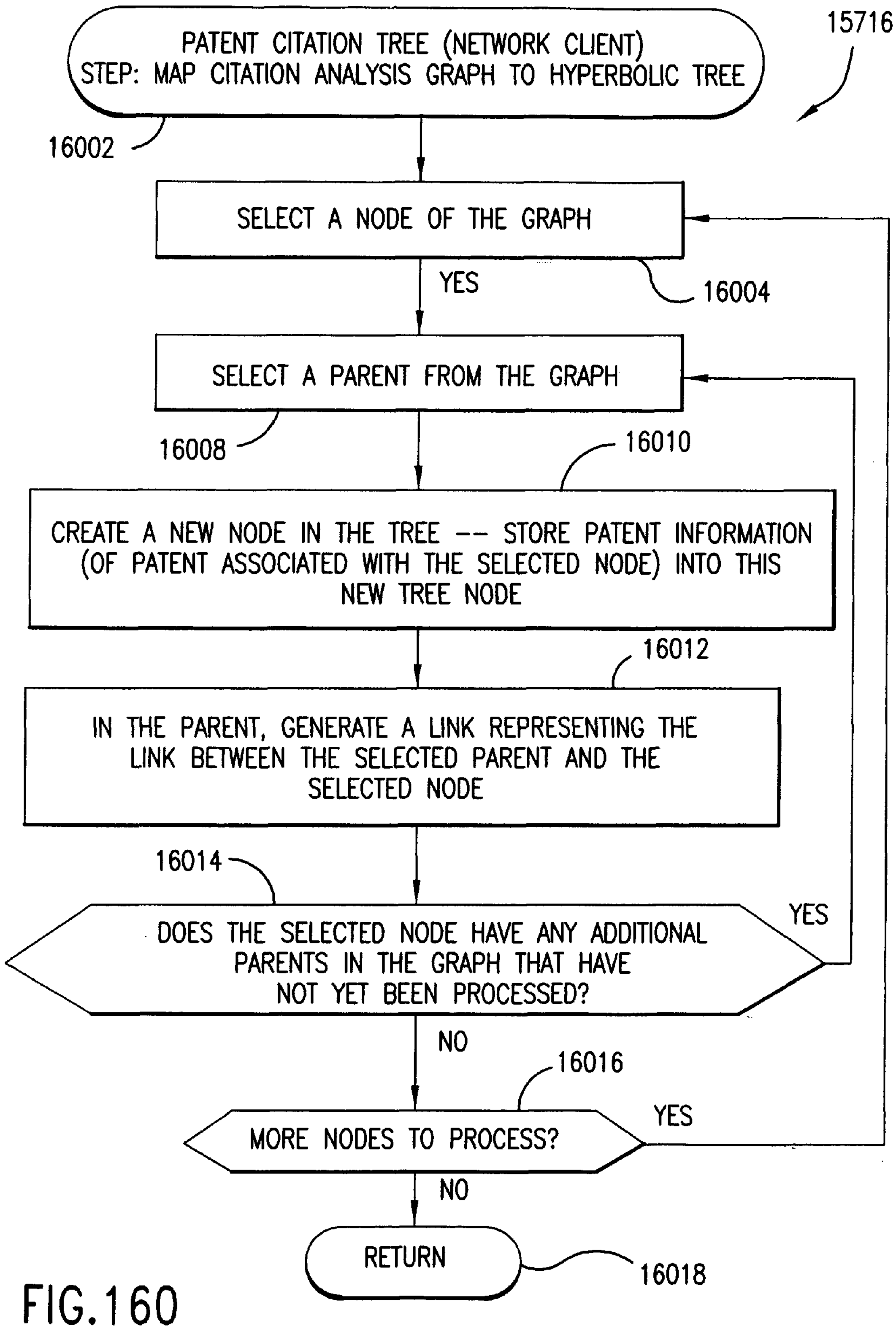

Referring again to FIG. 157, in step 15716 the network client 306 creates the citation analysis hyperbolic tree 16404. When necessary (as described above), the network client 306 creates a tree (that differs from the hyperbolic tree 16404 that will ultimately be constructed) that corresponds to the citation analysis DAG 18102 generated in step 15714. The manner in which the network client 306 performs this function is represented by a flowchart in FIG. 160.

In step 16004, the network client 306 selects a node of the citation analysis DAG 18102 (it is noted that the root node 18104 corresponding to the '484 patent is not subject to selection). Also, the network client 306 initializes the tree 18302 (an example of which is shown in FIG. 183) by constructing the root node 18304 that corresponds to the '484 patent.

In step 16008, the network client 306 selects one of the parents of the selected node from the citation analysis DAG 18102. It is noted that, by definition, the selected node must have at least one parent Assume, for example, that node 7 was selected in step 16004, and node 5 was selected in step 16008.

In step 16010, the network client 306 generates a new node in the tree 18302 being constructed. Specifically, the network client 306 generates node 7A in tree 18302.

In step 16012, the network client generates a link that represents the parent/child relationship between nodes 7A and 5. The information corresponding to this link is stored in tree node 5 of tree 18302.

In step 16014, the network client 306 determines whether the selected node (that is, node 7 in the citation analysis DAG 18102) has any additional parents in the DAG 18102 that have not yet been processed. In the case of the current example, node 7 has a parent, node 6, that has not yet been processed. Accordingly, control returns to step 16008 to process the parent node 6 with respect to the selected node 7. If, in step 16014, the selected node does not have any additional parents in the DAG 18102 to process, then control flows to step 16016.

In step 16016, the network client 306 determines whether there are additional nodes in the citation analysis DAG 18102 to process. If there are additional nodes to process, then control returns to step 16004. Otherwise, construction of tree 18302 is complete, and control returns to flowchart 15702 in FIG. 157.

Referring again to FIG. 157, further in step 15716 the tree 18302 is used to generate a hyperbolic tree. In generating the hyperbolic tree, a hyperbolic tree node is generated for each node in the tree 18302. Also, links between nodes in the hyperbolic tree correspond to links in the tree 18302. In addition to linking information, the nodes in the hyperbolic tree may also include bibliographic information for corresponding patents. Such bibliographic information is obtained from the patent bibliographic information Table 18202. Alternatively, such patent bibliographic information is maintained in the patent bibliographic information Table 18202, and retrieved as necessary (that is, such patent bibliographic information is not stored in the hyperbolic tree). Further details concerning construction of a hyperbolic tree corresponding to tree 18302 will be apparent to persons skilled in the relevant arts.

As discussed above, in some embodiments, the invention generates a hyperbolic tree directly from the DAG generated in step 15714. Whether this is possible depends on the capabilities of the hyperbolic browser being used in the client 306, and potentially other issues, such as performance issues. In these embodiments of the invention where the hyperbolic tree is generated directly from the DAG, it is not necessary to perform the above described functions of step 15716.

In step 15718 the network client 306 displays the hyperbolic tree generated in step 15716. An example patent citation hyperbolic tree 16404 corresponding to the '484 patent is shown in FIG. 164, wherein a portion of the patent citation tree 16404 is being displayed in a window 16412.

Figure 176:
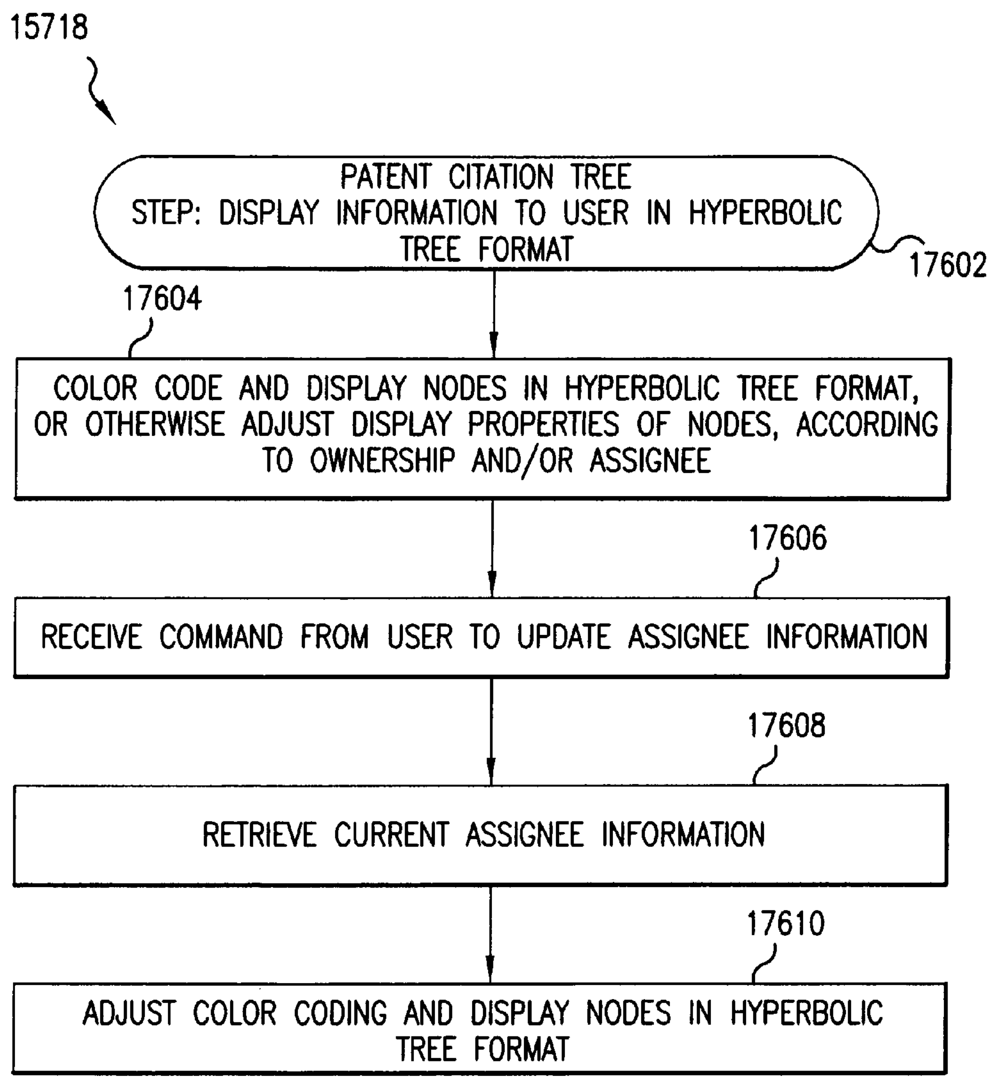

As indicated above, the nodes of the patent citation tree 16404 may be color coded or otherwise emphasized according to some criteria. Examples of such criterions are described below, although the invention is not limited to these examples. The operation of step 15718 in performing this function is represented by a flowchart shown in FIG. 176.

In step 17604, based on user command, the network client 306 color codes or otherwise emphasizes and displays the nodes in the patent citation tree 16404 according to ownership and/or assignee (or some other criteria specified by the operator). For example, the nodes corresponding to patents owned by company A may be color coded red, whereas the nodes corresponding to patents owned by company B may be color coded blue. Alternatively, the nodes corresponding to patents owned or licensed by the customer corporate entity may be color coded purple, whereas the nodes owned by any other corporate entity are color coded black.

It is noted that other means for highlighting or emphasizing the nodes in the patent citation tree 16404 (other than color coding) can be used. In fact, any of the display properties of the nodes can be adjusted to reflect the criteria of interest. Such display properties include uppercase, lowercase, typefaces, fonts, underlining, bold, italics, type size, etc.

The enterprise server 314 retrieves ownership and/or assignee information (upon receiving a command from the network client 306 requesting such information) from the assignee table 1201 (FIG. 12B) and/or the patent_ownership Table 1234 (FIG. 12J). This information is preferably returned to the network client 306 in the patent bibliographic information Table 18202 from the enterprise server 314.

In one embodiment, the assignment information in the assignee Table 1201 reflects any original assignment information on the front page of patents. In some embodiments, the assignee Table 1201 is periodically modified to reflect updated assignment information as recorded in the U.S. Patent Office or other national Patent Offices (in the case of non-U.S. patents).

In other embodiments, such updated assignment information is stored in a separate table (not shown), called the current_assignee table. The original assignment information in the assignee table 1201 is not changed.

In these other embodiments, according to the present invention, the operator can instruct the network client 306 to update the display of the patent citation tree 16404 to reflect such current assignment information using the information in the current_assignee table.

Accordingly, in step 17606, the network client 306 receives a command from the operator to update the patent citation tree 16404 with the current assignee information in the current_assignee table.

In step 17608, the network client 306 sends a request to the enterprise server 314 for updated assignment information. This request, which is in conformance with the enterprise server API, lists the patents represented in the patent citation tree 16404. In accordance with this request, the enterprise server 314 accesses the current_assignee table for any updated assignment information regarding the listed patents. It is noted that not all patents may have updated assignment information. The enterprise server 314 transfers this information back to the requesting network client 306.

In step 17610, the network client 306 adjusts the display properties (such as the color coding) of the nodes in the patent citation tree 16404 to reflect any new assignment information as received from the enterprise server 314. According to an embodiment of the invention, the network client 306 allows the operator to switch back and forth between the original assignment information and the updated assignment information. In other words, upon appropriate operator command, the network client 306 toggles between displaying the patent citation tree 16404 according to the assignment information stored in the assignee Table 1201, and displaying the patent citation tree 16404 according to the updated assignee information in the current_assignee table.

Nodes can also be color coded according to other criteria as selected by the operator. For example, in step 17604, based on user command, the network client 306 color codes or otherwise emphasizes and displays the nodes in the patent citation tree 16404 according to issue date. For example, patents that issued in 1984-1986 are color coded blue, patents that issued in 1986-1988 are color coded red, patents that issued in 1988-1990 are color coded yellow, etc. In a similar manner, the nodes can be color coded according to other time-based criteria, such as filing date, priority date, length of pendency, effective filing date, invention date, critical date, on-sale date, public disclosure date, public use date, etc. Such information is either retrieved from the databases 316, calculated based on information retrieved from the databases 316, or entered by operators. Information entered by an operator on a patent (such as the invention date) is preferably stored in the node that is associated with the patent. Such information is, upon receipt of appropriate user command, referred to when displaying and emphasizing the node.

Operators can also specify the time increment (1984-1986 or 1984-1988, for example), the beginning date to view, the ending date to view, etc.

The invention also allows operators to enter their own user-defined criteria. For example, an operator can specify that patents P1 and P3 should be color coded blue, patents P10 and P21 should be color coded red, etc. Such specification by the operator may be based on information or analysis conducted by the operator. For example, the operator may have previously determined that patents P1 and P3 are unenforceable, and patents P10 and P21 contain claims that are infringed.

In an embodiment, the operator right clicks over a node to display a context sensitive menu. Via this menu, the operator can specify user-defined criteria for displaying the node (i.e., that the node should be color coded blue, or the node should be color coded as an unenforceable patent, where the color for unenforceable patents is defined elsewhere). The operator has the option of entering text that describes the meaning of his criteria, such as "Blue: Patents that are infringed." This text is displayed in the legend (described below).

Preferably, nodes can be emphasized using any combination of operator-selected criterions. This is done by using different display properties to represent different criterions. For example, color could be used to represent ownership, font could be used to represent issue date, underlining could be used to represent enforceable/unenforceable, etc.

According to an embodiment of the invention, a legend is displayed next to the patent citation tree 16404. This legend specifies the meaning for the colors or other display properties used to highlight the nodes of the patent citation tree 16404. For example, the legend may indicate that blue is for patents owned by IBM, or is for patents issued in 1994-1997, or is for patents indicated by the operator as being infringed.

The present invention enables operators to interact with the data in the patent citation tree 16404. For example, operators can elect to view information regarding any of the patents represented in the patent citation tree 16404. Such operation is represented by steps 15720, 15722, and 15724.

In step 15720, the operator selects one of the patents represented in the patent citation tree 16404. In the example of FIG. 164, the operator has selected the '168 patent by double-clicking while the mouse (represented by icon 16412) is positioned over node 16408 corresponding to the '168 patent.

In step 15722, the network client 306 retrieves information pertaining to the selected '168 patent.

Figure 165:
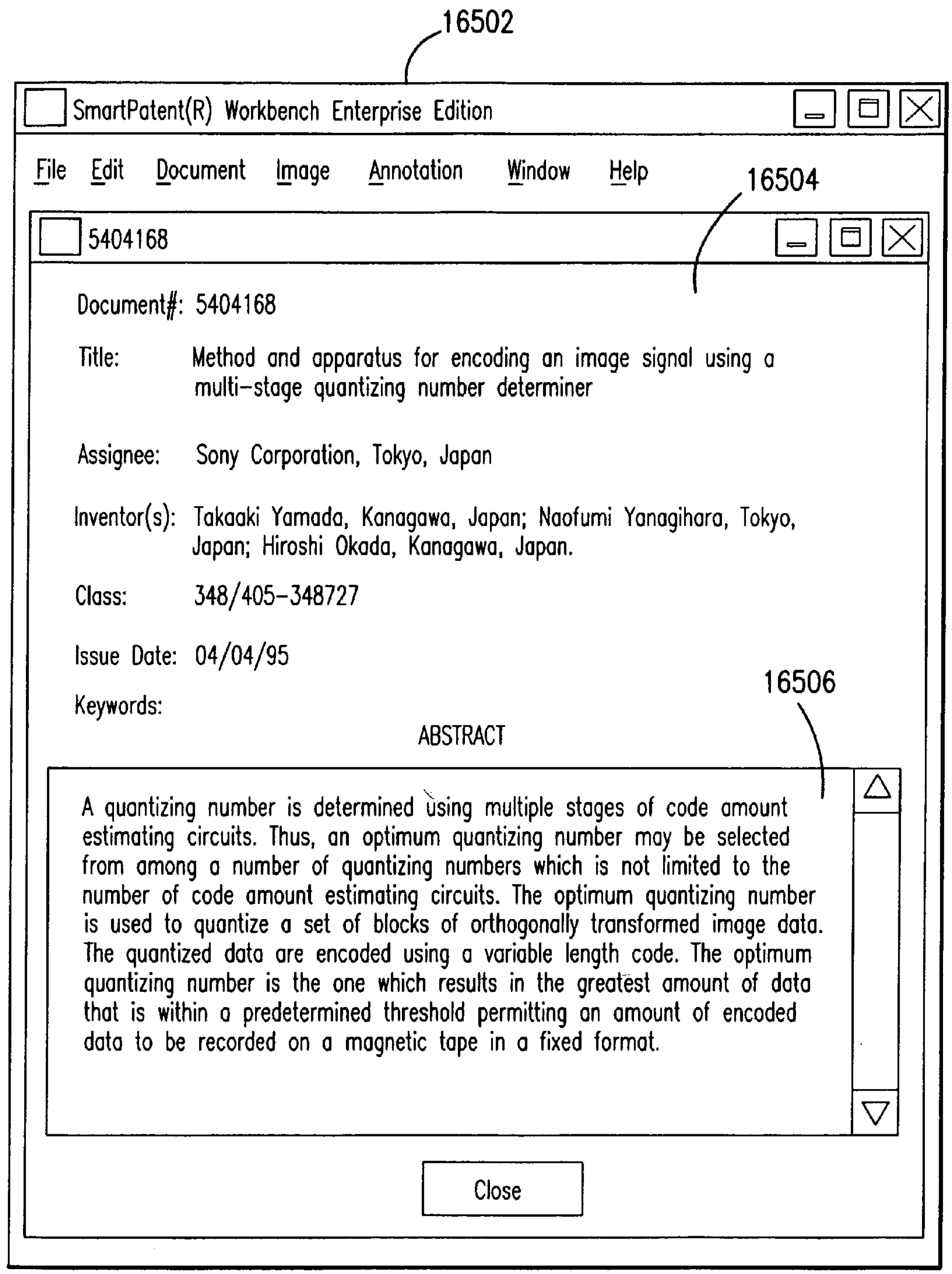
FIG. 165 illustrates an example display that is generated when an operator selects a patent represented in the patent citation tree of FIG. 164.

In step 15724, at a minimum, the network client 306 displays the Abstract and bibliographic information on the '168 patent. This information was preferably transferred to the network client 306 in the patent bibliographic information table 18202 (FIG. 182). FIG. 165 illustrates an example window 16502 where the Abstract and bibliographic information pertaining to the 186 patent is displayed.

If the selected patent (that is, the '168 patent) is in the local repository, then the network client 306 in step 15722 interacts with the enterprise server 314 to download the patent text and/or the patent image of the '168 patent. The network client 306 then displays the patent text and/or patent image as described above (see, for example, FIGS. 123 and 124). This is represented by step 15724.

As indicated above, the operator can elect to color code or otherwise adjust the display properties of the nodes in the patent citation tree 16404 according to various criteria. Such criteria includes assignee and ownership information, as described above. Another criteria is patent aging. Specifically, an operator can elect to adjust the display properties of the nodes in the patent citation tree 16404 according to the age of the patents relative to the base patent.

Figure 157:
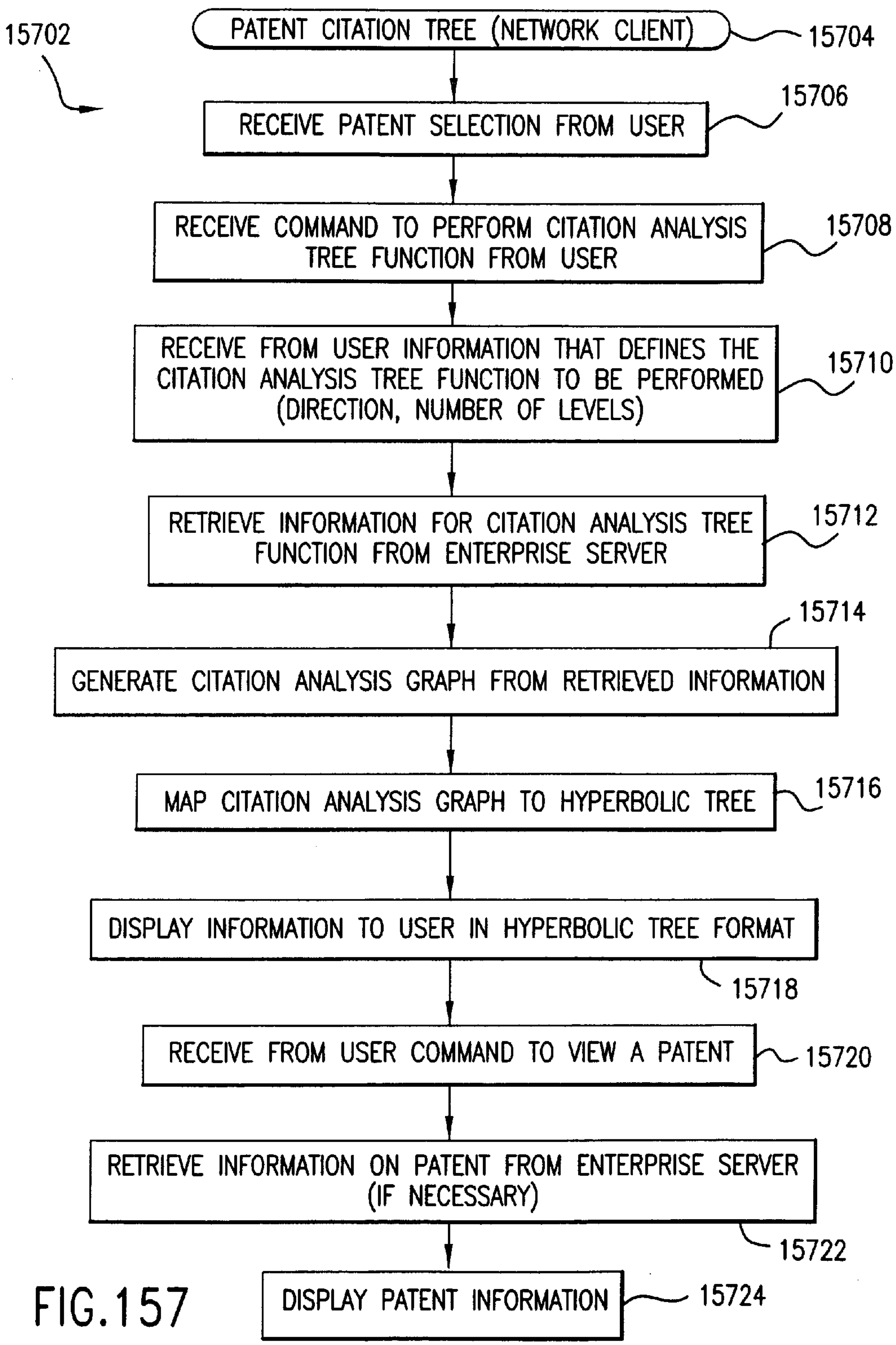
FIGS. 157-160 are flowcharts representing the operation of the patent citation tree function when performed by a network client interacting with the enterprise server.

In the example of FIG. 164, the base patent is the '484 patent which was originally selected by the operator in step 15706 (FIG. 157). According to this aspect of the invention, the nodes corresponding to the other patents in the patent citation tree 16404 are color coded to reflect their age relative to the base '484 patent. For example, patents that issued less than a year after the '484 patent are color coded blue. Patents that issued more than one year but less than two years after the '484 patent are color coded red. Patents that issued more than two years but less than three years after the '484 patent are color coded yellow.

Alternatively, gray scales can be used to reflect the age of the patents relative to the base '484 patent. For example, the closer the issue date of a patent is to the issue date of the '484 patent, the darker the gray used, and the farther away the issue date of a patent is to the issue date of the '484 patent, the lighter the gray used.

Alternatively, patent aging can be visualized by displaying in the patent citation tree the root plus any patent that issued within a year of the root (or any other time increment specified by the operator). The tree then grows upon receipt of user command to include patents that issued later. For example, upon receipt of user command, the tree grows to additionally include patents that issued within two years of the root, then three years, four years, five years, etc.

Patent aging visualizations (described here and in other places of this application) are valuable because they represent when patent-related activity occurred with respect to a given technology.

Patent Citation Tree (Web Client)

Figure 166:
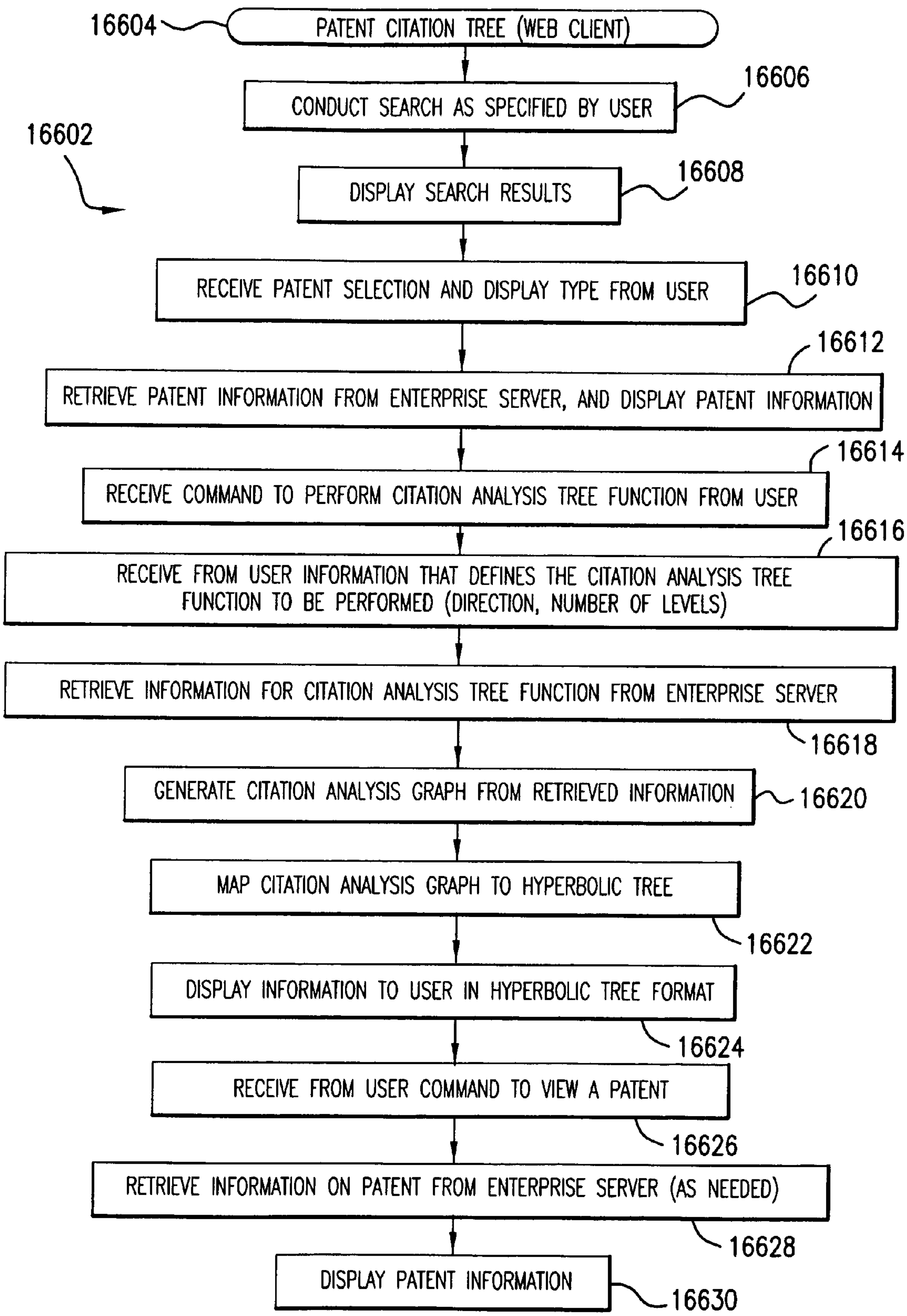
FIGS. 166 and 167 are flowcharts representing the operation of the patent citation tree function when performed by a web client interacting with the enterprise server via the web server.

The operation of the patent citation tree function when performed by a web client 304 interacting with the enterprise server 314 via the web server 310 (FIG. 3) shall now be described with reference to a flowchart 16602 shown in FIG. 166.

In step 16606, the operator at the web client 304 defines a search to be performed by entering search criteria into a patent search window, such as patent search widow 14002 shown in FIG. 140. In the manner described above, the web client 304 interacts with the enterprise server 314 via the web server 310 to conduct the search defined by the operator. The web client 304 displays the search results in a search results window, such as search results widow 14102 shown in FIG. 141. This is represented by step 16608 in flowchart 16602.

In step 16610, the operator selects one of the patents listed in the search results window 14102. In step 16612, the web client 304 interacts with the enterprise server 314 via the web server 310 to retrieve information pertaining to the selected patent, and to display such information (such processing is described above). Preferably, such information is displayed in windows, such as those shown in FIGS. 144, 145A-145C, and/or FIG. 146. Further details regarding the operation of steps 16606, 16608, 16610, and 16612 are provided above.

In step 16614, the operator at the web client 304 issues a command to perform a patent citation analysis of the patent being displayed. For example, suppose that in step 16612, information regarding an 830 patent was retrieved and displayed in a window 14602 shown in FIG. 146. In step 16614, the operator presses a patent citation tree button 14610 in order to perform a patent citation analysis of the '830 patent.

In step 16616, the web client 304 presents a dialog box 16302 (FIG. 163) to the operator. In this dialog box 16302, the operator identifies whether he wishes to perform a forward citation function or a backward citation function. Also, the operator defines the scope of the citation function to be performed by indicating the number of levels that should be cited. This information entered into the dialog box 16302 is received by the web client 304.

Figure 167:
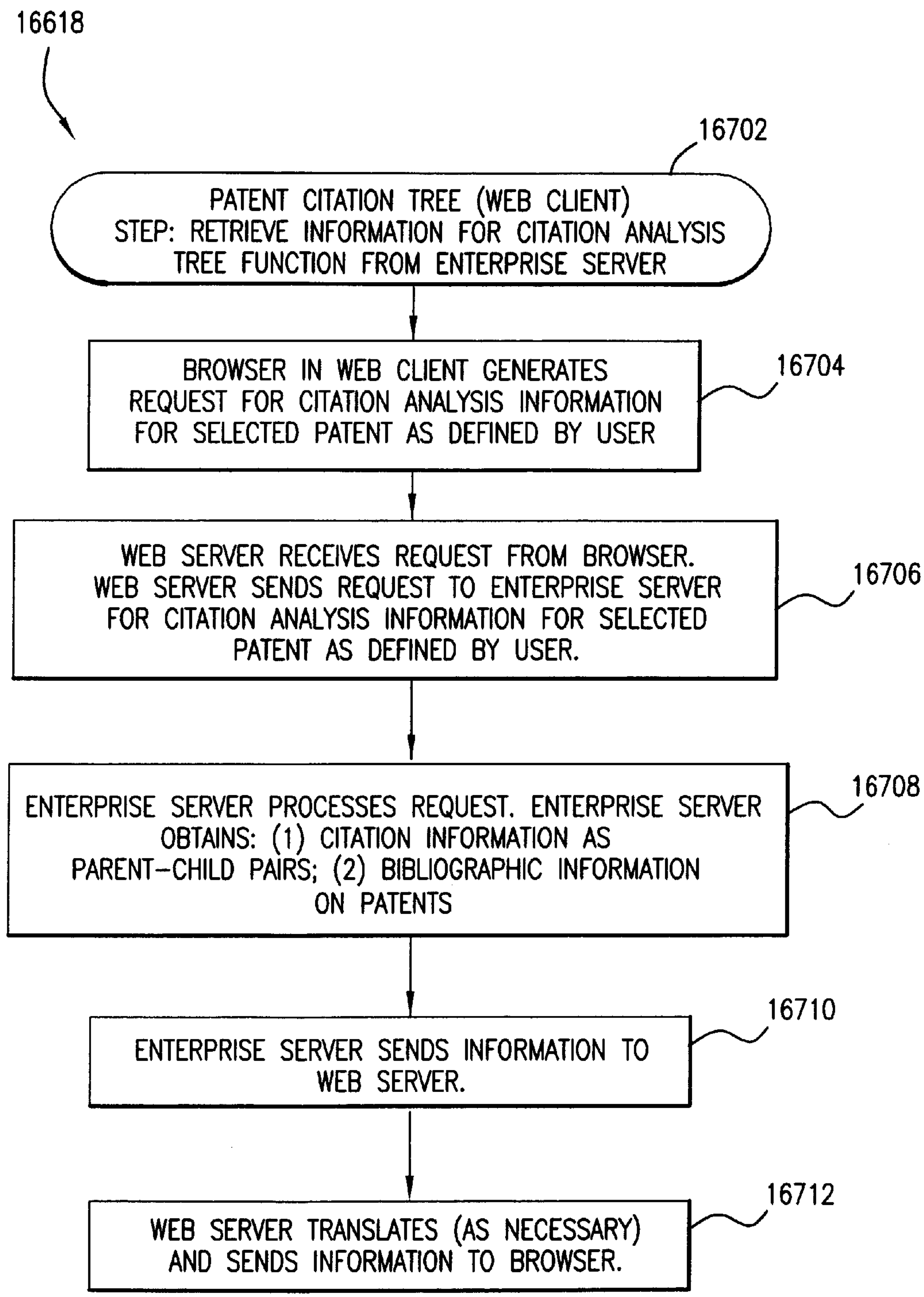

In step 16618, the web client 304 interacts with the enterprise server 314 via the web server 310 to retrieve information from the databases 316 pertinent to the citation analysis tree function specified by the operator. The manner in which step 16618 is performed is illustrated in a flowchart shown in FIG. 167.

In step 16704, the browser 808 in the web client 304 generates and sends a request to the web server 310 (see FIG. 8). This request preferably includes patent-centric URL commands as described above. The request specifies: (1) either a backward citation search or a forward citation search (as indicated by the operator in dialog box 16302); (2) the '830 patent; and (3) the number of levels (as specified by the operator in dialog box 16302). Preferably, the request is formed using the GetCitationTree command, described above.

In step 16706, the web server 310 receives the request from the browser 808. The translator 804 in the web server 310 translates the request to a new request that is in conformance with the enterprise server API. This translation function is described above. The web server 310 sends the translated request to the enterprise server 314. In effect, the web server 310 is playing the role of the network client 306.

In step 16708, the enterprise server 314 processes the request. In particular, the enterprise server 314 access the patent table 12222 (FIG. 12H) to identify the document_id associated with the '830 patent. For backward citation searches, the enterprise server 314 then accesses the PatentRef table 1208 to identify all patents which are cited in the '830 patent. For forward patent citation searches, the enterprise server 314 accesses the PatentRef table 1208 to identify all patents which cite the '830 patent. The enterprise server '314 repeatedly accesses the PatentRef table 1208 according to the number of levels as indicated in the request from the web server 310. Further details regarding the operation of the enterprise server 314 are described above.

The enterprise server 314 processes the information retrieved from the databases 316 and generates two tables, the parent child table 18002 (FIG. 180) and the patent bibliographic information table 18202 (FIG. 182). The operation of the enterprise server 314 when performing step 16708 is similar to its operation when performing step 15806 (described above).

In step 16710, the enterprise server 314 transmits the parent/child table 18002 and the patent bibliographic information table 18202 to the web server 310.

In step 16712, the translator 804 in the web server 310 translates, as necessary, the information received from the enterprise server 314, and forwards the translated information to the web client 304. The translator 804 translates the information from the enterprise server 314 to a format that is compatible with the capabilities and plug-ins associated with the browser 808. This operation shall be further described with reference to FIG. 186.

Figure 186:
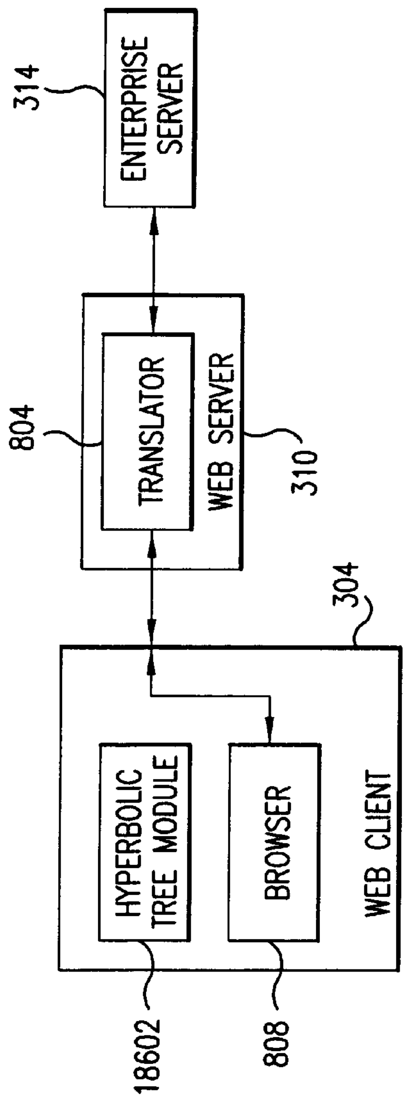

As shown in FIG. 186, in an embodiment of the invention, the web client 304 includes a hyperbolic tree module 18602 that interacts with the browser 808. In some embodiments, the hyperbolic tree module 18602 may optionally include or interact with a hyperbolic tree DLL (dynamic link library), not shown.

The translator 804 in step 16712 translates the information received from the enterprise server 314 to a format that is useable by the hyperbolic tree module 18602. Accordingly, the operation of the translator 804 in this respect is specific to the particular functions and capabilities of the hyperbolic tree module 18602 being used in the web client 304. The browser 808 receives this translated information from the web server 310, and then forwards the translated information to the hyperbolic tree module 18602 for processing. As described below, the hyperbolic tree module 18602 modifies and formats this information from the browser 808, as necessary, and then displays and processes the patent citation hyperbolic tree.

Referring again to FIG. 166, in step 16620, the hyperbolic tree module 18602 in the web client 304 generates a citation analysis DAG from the information received from the enterprise server 314 via the web server 310. The operation of the hyperbolic tree module 18602 when performing step 16620 is similar to the operation of the network client 306 when performing step 15714.

In step 16622, the hyperbolic tree module 18602 maps the citation analysis DAG to a tree where necessary (as described above), and then generates a hyperbolic tree from this tree. The operation of the hyperbolic tree module 18602 when performing step 16622 is similar to the operation of the network client 306 when performing step 15716.

In some embodiments, at least parts of steps 16620 and 16622 are performed by the translator 804 in the web server 310. In particular, the translator 804 generates a citation analysis DAG from the information received from the enterprise server 314, and maps the citation analysis DAG to a tree. The translator 804 may also generate a hyperbolic tree from the tree. The translator 804 forwards the results of its processing (i.e., the translated information referred to above) to the browser 808.

As discussed above, in some embodiments, the invention generates a hyperbolic tree directly from the DAG generated in step 16620. Whether this is possible depends on the capabilities of the hyperbolic tree module 18602 in the web client 304, and potentially other issues, such as performance issues. In these embodiments of the invention where the hyperbolic tree is generated directly from the DAG, it is not necessary to perform the above described functions of step 16622.

In step 16624, the hyperbolic tree module 18602 displays the patent citation information to the operator in a hyperbolic tree format. In other words, in step 16624, the hyperbolic tree module 18602 displays the hyperbolic tree generated in step 16622. The operation of the hyperbolic tree module 18602 when performing step 16624 is similar to the operation of the network client 306 when performing step 15718, wherein at the web client 304, the patent citation tree 16404 is displayed in a window similar to the window 16412 shown in FIG. 164.

In step 16626, the operator at the web client 304 selects one of the patents represented in the patent citation tree 16404. Step 16626 is similar to step 15720 (FIG. 157).

In step 16628, the web client 304 retrieves information on the patent selected in step 16626. Step 16628 is similar to step 15722 (FIG. 157).

In step 16630, the web client 304 displays the retrieved patent information. Step 16630 is similar to step 15724 (FIG. 157).

Preferably, the web client 304, when displaying the patent citation tree 16404, color codes or otherwise emphasizes the nodes of the patent citation tree 16404 according to some user selected criteria, such as ownership, assignee, relative age, issue date, filing date, user-defined criteria, etc., as described above.

Additional Patent Citation Visualizations

Figure 174:
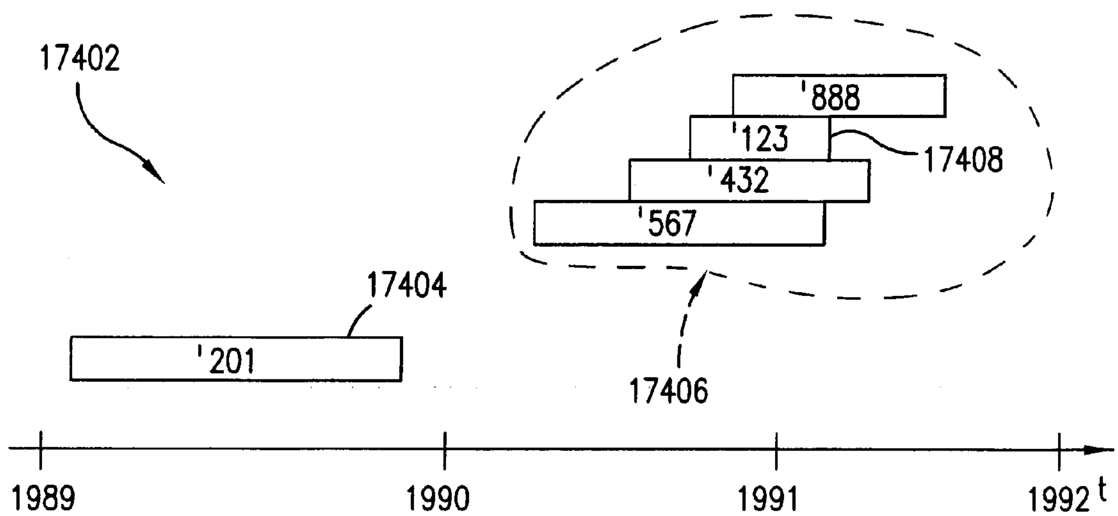

The present invention includes the capability to display patent citation data in additional formats. For example, FIG. 174 illustrates an example display format 17402 where patent citation information is visualized as a modified bar graph. Display format 17402 represents a backward patent citation visualization of a '201 patent. The '201 patent is cited by a '567 patent, a '432 patent, a '123 patent, and an '888 patent. Each of these patents is represented by a bar. The horizontal length of each bar graphically represents the pendency duration of the associated patent. The longer the bar, the longer the pendency of the patent. Also, the beginning and ending locations of each bar graphically represent the filing and issue dates of the patent. For example, the '201 patent was filed at the beginning of 1989, and issued at the end of 1989. The bars in display format 17402 can be color-coded or otherwise emphasized to reflect user-selected criteria, such as ownership, assignee, etc., as described above.

Figure 175:
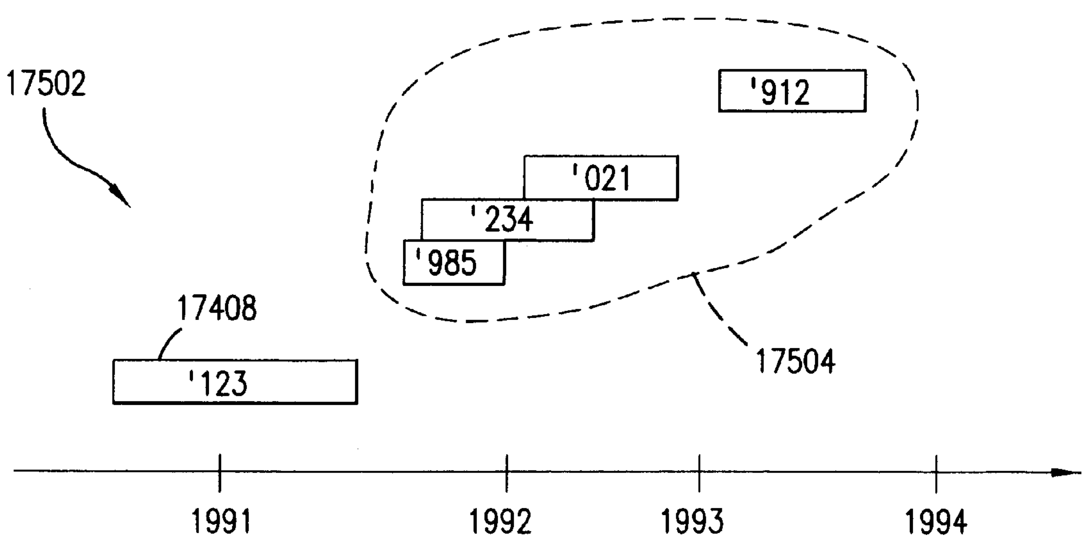

Note that display format 17402 in FIG. 174 represents a one-level patent citation function. Additional levels can be viewed by selecting the patent of interest. For example, if the operator double clicks on the '123 patent, then the patents that cite the '123 patent will be displayed. This is shown in FIG. 175.

Patent Claims Tree

Figure 171:
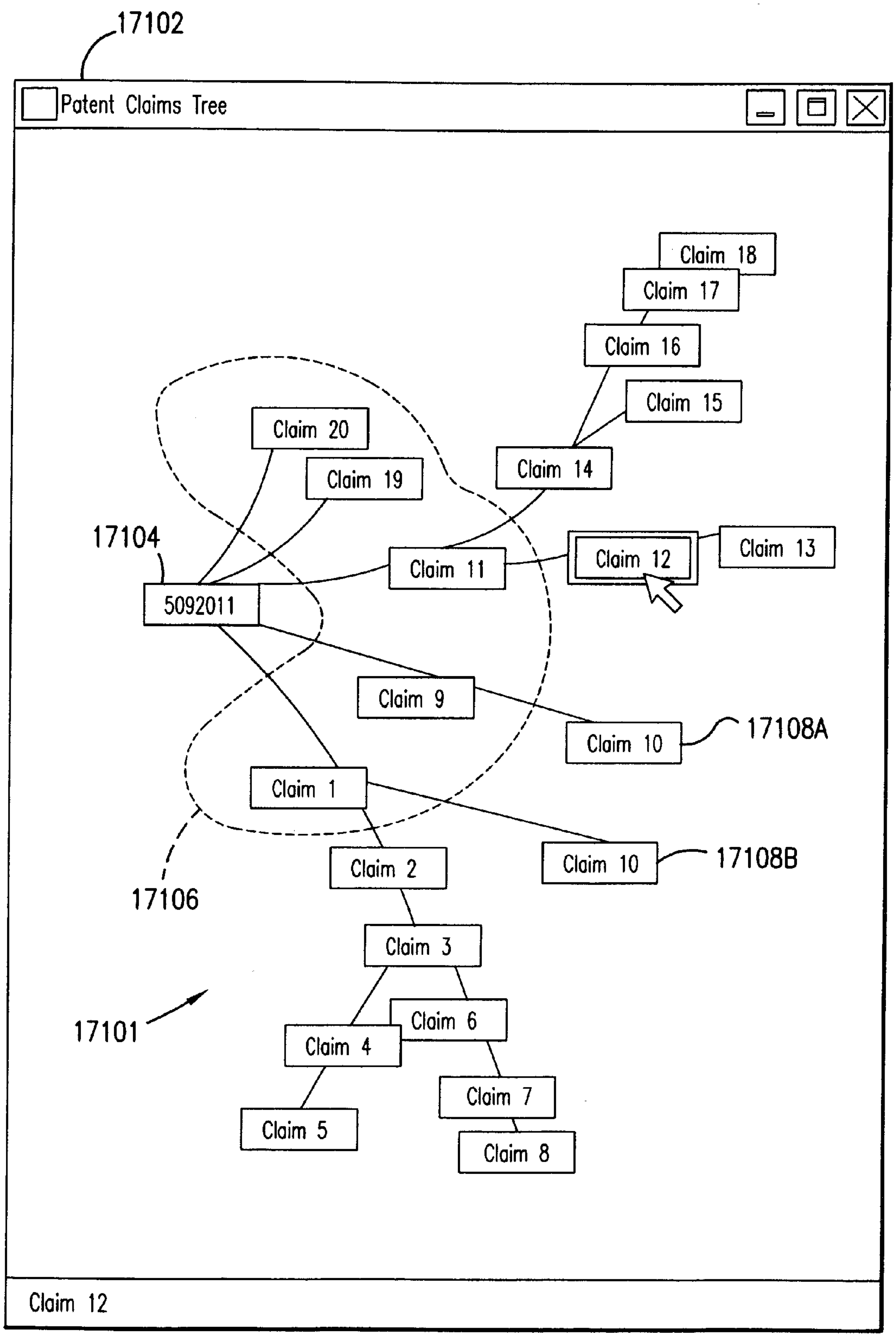
FIG. 171 illustrates an example patent claims tree.

According to an embodiment of the present invention, the analysis modules 416 in the enterprise server 314 include a patent claim tree module 1022 (FIG. 10). FIG. 171 illustrates an example patent claims tree 17101. In this patent claims tree 17101, the root node 17104 represents the patent (in this case, U.S. Pat. No. 5,092,011). The nodes 17106 directly connected to the root node 17104 represent the independent claims in the patent. The nodes connected to these independent claim nodes represent the dependent claims of the respective independent claims. The links in the patent claims tree 17101 represent the dependencies between claims.

The nodes in the patent claims tree 17101 can be color coded or otherwise emphasized (by modifying some display property) according to various criteria, including user-defined criteria. For example, when performing an infringement analysis, the operator can elect to color code claims that are believed to be infringed using one color, and claims that are not believed to be infringed using another color. When conducting a validity analysis, the operator can elect to color code claims that are believed to be valid using one color, and claims that are believed to be invalid using a different color. As discussed below, nodes can also be color coded or emphasized according to whether they correspond to patents or claims, or whether they correspond to independent or dependent claims. Also, as with the patent citation tree (described above), operators can color code according to operator-defined criteria. Other criterions for color coding the claims will be apparent to persons skilled in the relevant art(s).

Figure 168:
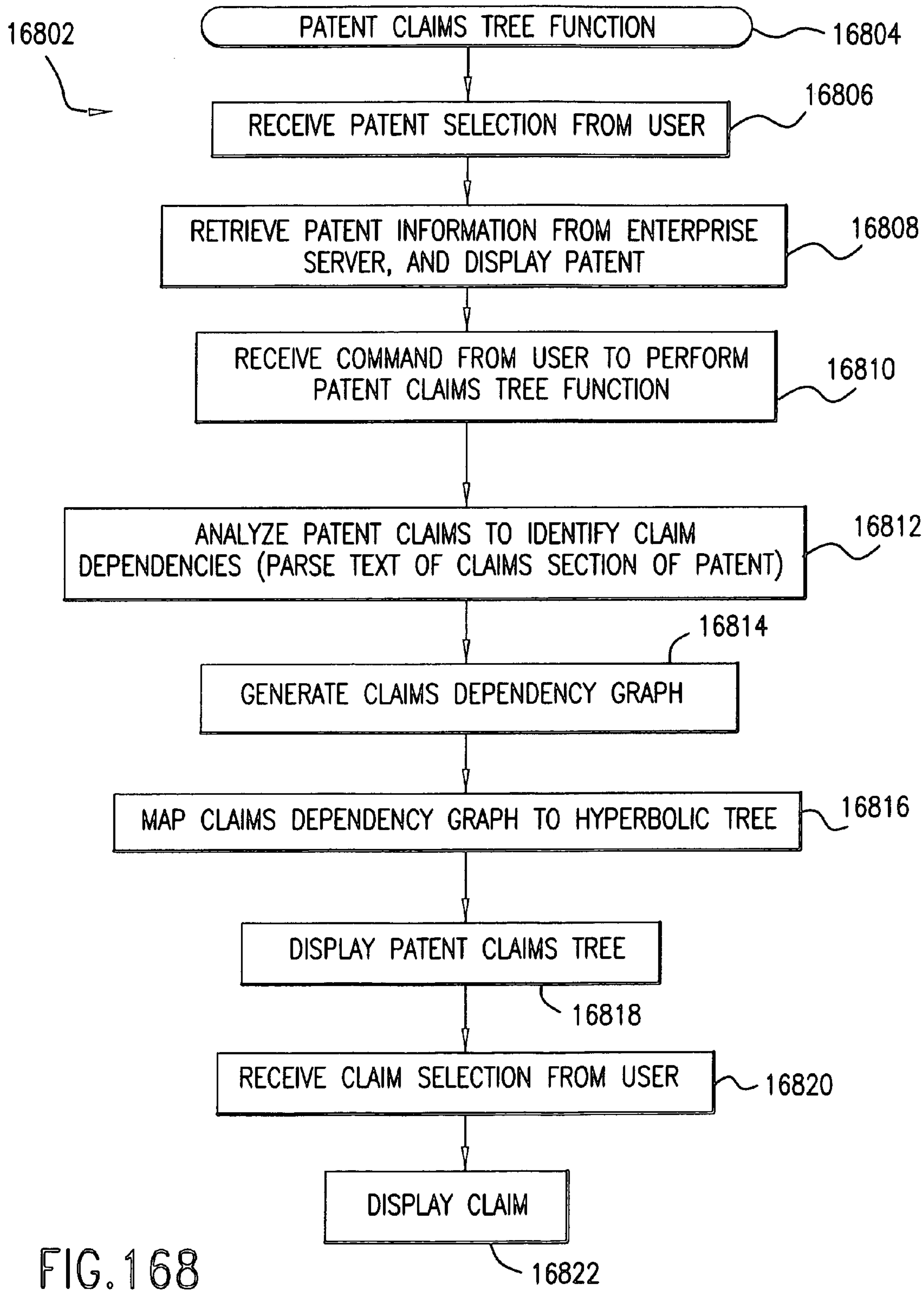
FIGS. 168-170 are flowcharts illustrating the operation of the patent claims tree function.

The patent claims tree function, when performed by either a network client 306 or a web client 304, shall now be described with reference to a flowchart 16802 shown in FIG. 168.

Figure 161:
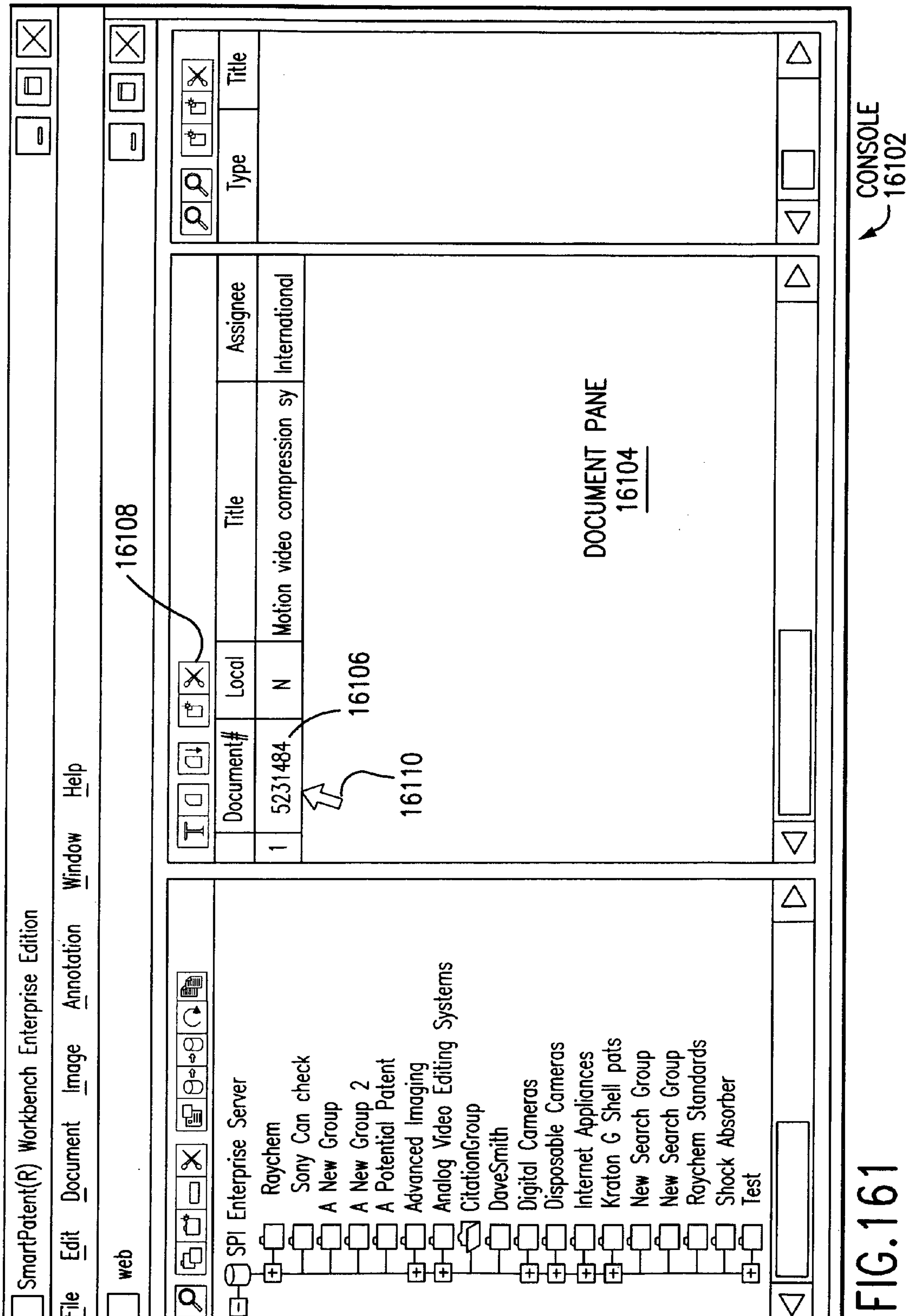
FIG. 161 is an example console used to illustrate the operation of the patent citation tree function.

In step 16806, the operator selects a patent using any of the mechanisms described herein, such as selecting a patent from a listing of patents displayed in the document pane 16104 of the console 16102 (FIG. 161).

In step 16808, information pertaining to the selected patent is retrieved from the databases 316 (as necessary) and displayed using any of the display formats described herein (see, for example, FIGS. 123 and 124).

In step 16810, the operator issues a command to display a patent claims tree for the patent being displayed. The operator may issue this command using any of the mechanisms described herein, such as by selecting a command from the menu bar, selecting a command from a pop-up window, selecting the command from a toolbar, etc.

In step 16812, the client 304/306 retrieves (as necessary) and analyzes the text of the claims section of the patent in order to identify claim dependencies (since it is necessary to analyze the claims, the patent claims tree function according to one embodiment of the invention is only available for those patents in the local repository). The dependency relationship between claims is identified by parsing the claim text of the patent and identifying claim dependency language contained therein (particularly in the claim preambles), such as "the apparatus of claim 1," "the method of claim 1," "the method according to claims 3 or 4," "the system as in one of claims 4-7," "a product produced according to the method of claim 1," "a system, comprising," etc. The dependency between claims is derived by inspection and analysis of these phrases in the preambles of the claims.

Figure 169:
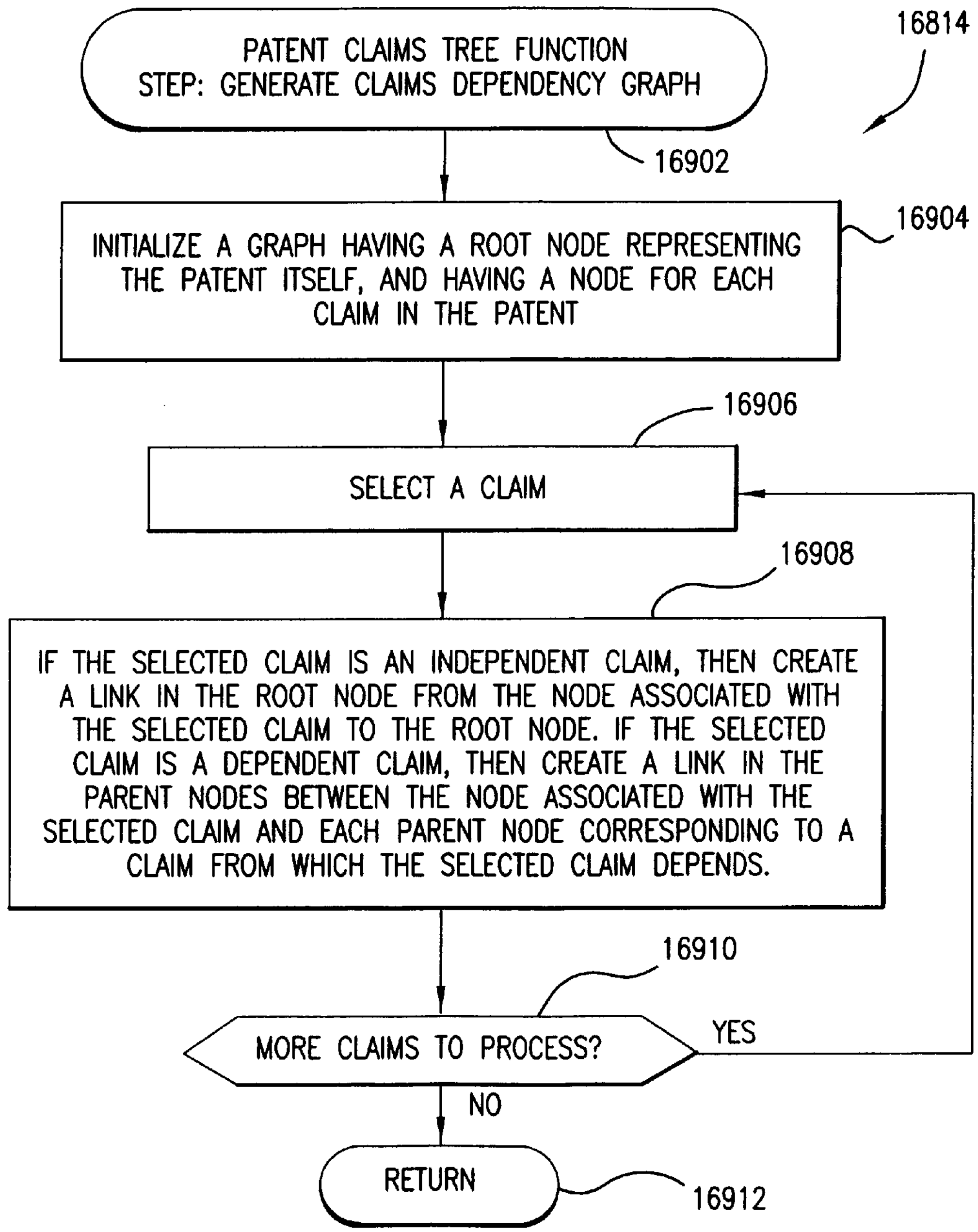
Figure 184:
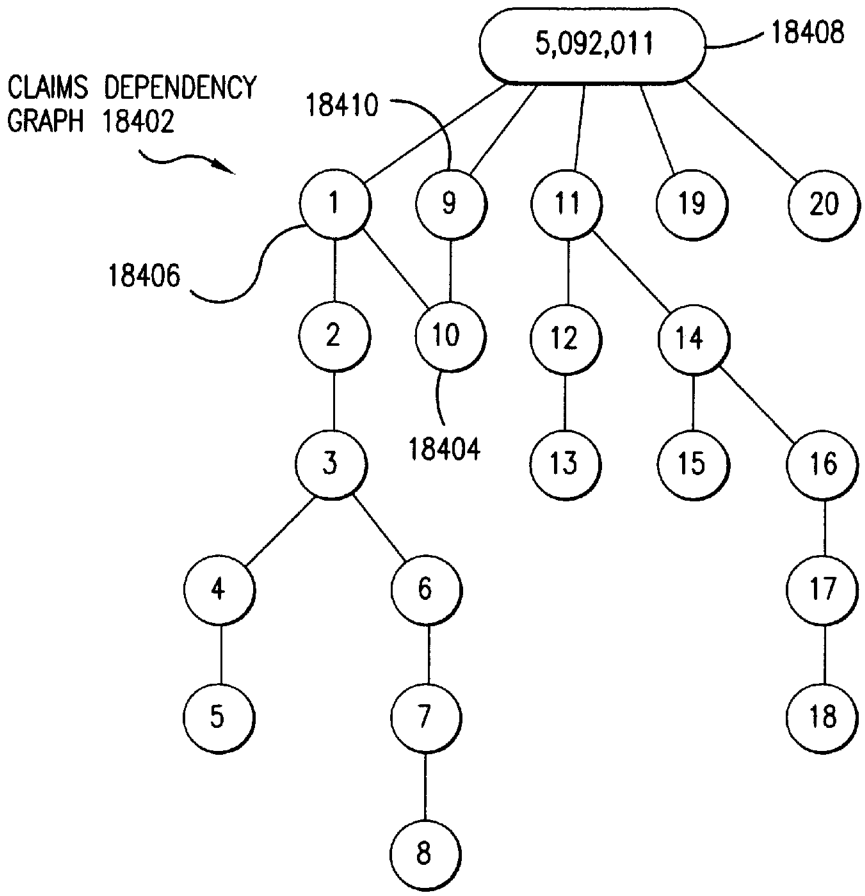

In step 16814, the client 304/306 generates a claims dependency DAG. For example, FIG. 184 illustrates a claims dependency DAG 18402 corresponding to the '011 patent shown in FIG. 171. The manner in which the client 304/306 performs step 16814 is represented in a flowchart shown in FIG. 169.

In step 16904, the client 304/306 initializes the claims dependency DAG 18402. This initial DAG 18402 includes a root node representing the '011 patent, and a node for each claim in the '011 patent.

In step 16906, the client 304/306 selects one of the nodes of the DAG 18402 (or, equivalently, the client 304/306 selects one of the claims of the '011 patent).

In step 16908, if the selected claim is an independent claim, then the client 304/306 creates a link from the root node to the selected node. For example, if claim 1 is the selected claim, then the client 304/306 creates a link between node 18406 to the root node 18408. Information representative of the link is stored in the parent of the selected claim. For example, information representing the link between node 18406 and the root node 18408 is stored in root node 18408.

If the selected claim is a dependent claim, then in step 16908 the client 304/306 creates a link between the selected node and each node (called parent nodes) corresponding to a claim from which the selected claim depends. Information representing these links is stored in the parent nodes. For example, assume that node 18404 corresponding to claim 10 was selected in step 16906. Claim 10 depends from claims 1 and 9, the parent nodes of claim 10. Accordingly, in step 16908, the client 304/306 creates a link from node 18404 to node 18406 and node 18410. The link information is stored in parent nodes 18406 and 18410.

In step 16910, the client 304/306 determines whether there are additional claims in the '011 patent to process. If there are additional claims to process, then control returns to step 16906. Otherwise, construction of the claims dependency DAG 18402 is complete, and control returns to flowchart 16802.

Figure 170:
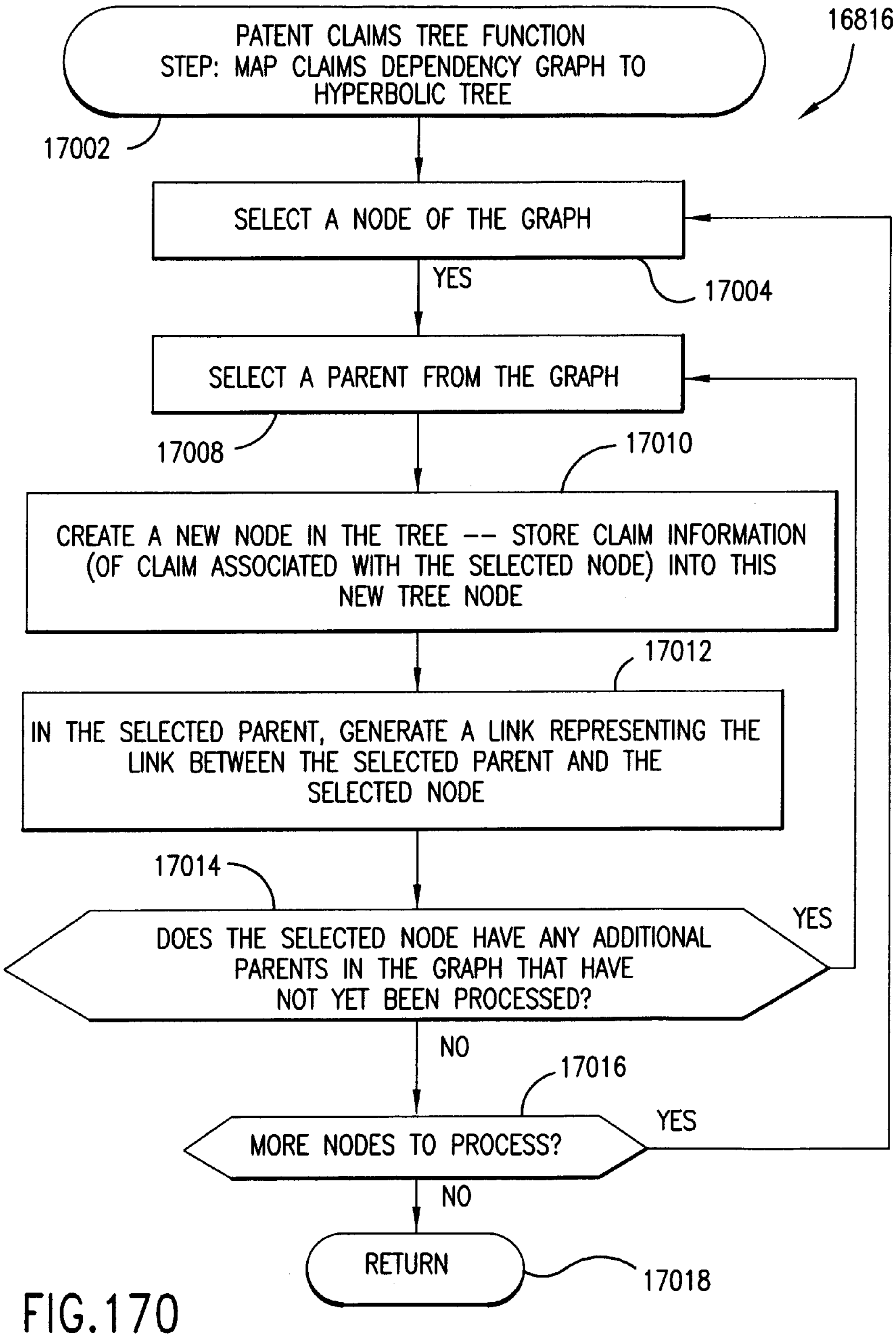
Figure 185:
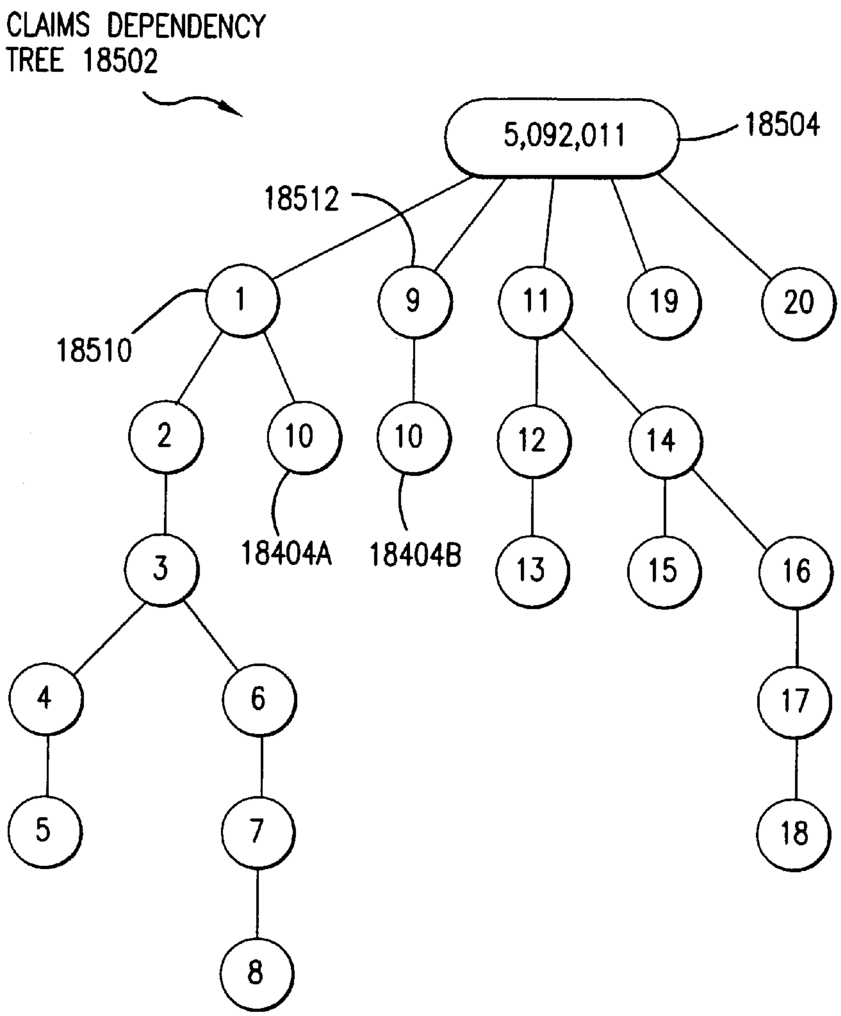

Referring again to FIG. 168, in step 16816 the client 304/306 generates the patent claims hyperbolic tree. In so doing, the client 304/306 generates a claims dependency tree, if necessary (as described above). FIG. 185 illustrates a claims dependency tree 18502 that corresponds to the claims dependency DAG 18402 in FIG. 184. The manner in which client 304/306 generates the claims dependency tree 18502 is represented by a flowchart in FIG. 170.

In step 17004, the claims dependency tree 18502 is initialized to include the root node 18504 corresponding to patent '011. Also, the client 304/306 selects a node from the claims dependency DAG 18402 for processing. Preferably, the root node 18408 is not subject to selection (since a corresponding root node 18504 in the claims dependency tree 18502 has already been created). Preferably, nodes in the claims dependency DAG 18402 are selected in ascending order of their corresponding claims. For example, the node corresponding to claim 1 is selected first. The nodes corresponding to claims 2, 3, 4, etc., are then selected. In this manner, it is assured that, in the claims dependency tree 18502, the tree nodes corresponding to a dependent claim's parent claims will exist before the dependent claim is processed.

In step 17008, the client 304/306 selects one of the parents of the selected node. By definition, each node (other than the root node) in the claims dependency DAG 18402 includes at least one parent.

In step 17010, the client 304/306 creates a new node in the claims dependency tree 18502. This new tree node corresponds to the selected node of the claims dependency DAG 18402. Any claim information (such as the text of the claim) is optionally stored in this new tree node.

In step 17012, in the claims dependency tree 18502, the client 304/306 generates a link between the node corresponding to the selected parent, and the new tree node. Information for this link is stored in the selected parent node. For example, assume in step 17004 that node 18404 corresponding to claim 10 was selected, and in step 17008 claim 1 (parent to claim 10) was selected. In step 17012, a link is generated between node 18404A (corresponding to claim 10) and node 18510 (corresponding to claim 1) in the claims dependency tree 18502. The link information is preferably stored in node 18510.

In step 17014, the client 304/306 determines whether the selected node has any additional parents in the claims dependency DAG 18402 that has not yet been processed. If the selected node in the claims dependency DAG 18402 has additional parents, then control returns to step 17008 to process another parent. Otherwise, step 17016 is performed.

In step 17016, the client 304/306 determines whether there are additional nodes in the claims dependency DAG 18402 to process. If there are additional nodes to process, then control returns to step 17004. Otherwise, construction of the claims dependency tree 18502 is complete.

Referring again to FIG. 168, further in step 16816, the client 304/306 uses the claims dependency tree 18502 to generate the patent claims hyperbolic tree 17101. In generating the hyperbolic tree, a hyperbolic tree node is generated for each node in the claims dependency tree 18502. Also, links between nodes in the patent claims hyperbolic tree 17101 correspond to links in the claims dependency tree 18502. In addition to linking information, the nodes in the patent claims hyperbolic tree 17101 may also include any claim information that was in the corresponding node of the claims dependency tree 18502, such as claim text. The node type and the sub-type are also stored in the nodes of the patent claims hyperbolic tree 17101. The node type refers to whether or not the node is a patent node (such as node 17104) or a claim node (such as node 17108A). The sub-type refers to whether the node corresponds to an independent claim (such as nodes 17106) or a dependent claim (such as nodes 17108A and 17108B). Further details concerning construction of a hyperbolic tree representative of the claims dependency tree 18502 will be apparent to persons skilled in the relevant art(s).

As discussed above, in some embodiments, the invention generates a hyperbolic tree directly from the DAG generated in step 16814. Whether this is possible depends on the capabilities of the hyperbolic browser being used in the client 304/306, and potentially other issues, such as performance issues. In these embodiments of the invention where the hyperbolic tree is generated directly from the DAG, it is not necessary to perform the above described functions of step 16816.

In step 16818, the client 304/306 displays the patent claims tree 17101 generated in step 16816. As indicated above, an example patent claims tree 17101 is shown in FIG. 171.

In displaying the patent claims hyperbolic tree 17101 in step 16818, the nodes of the patent claims tree 17101 may be color coded or otherwise emphasized (by modifying display properties) according to a number of criteria, such as node type and/or sub-type. For example, patent nodes may be color coded a first color whereas claim nodes may be color coded a second color. Nodes corresponding to independent claims may be color coded a third color, and nodes corresponding to dependent claims may be color coded a four color. As described above, nodes can also be color coded according to user-defined criteria and user-provided information, such as claims that are being infringed, claims that are invalid, etc.

The present invention enables operators to interact with the data displayed in the patent claims tree 17101. For example, operators can elect to view the text of claims of any of the claims represented in the patent claims tree 17101. Such operation is represented by steps 16820 and 16822.

In step 16820, the operator selects one of the patents in the patent claims tree 17101 using any of the selection mechanisms described above.

Figure 172:
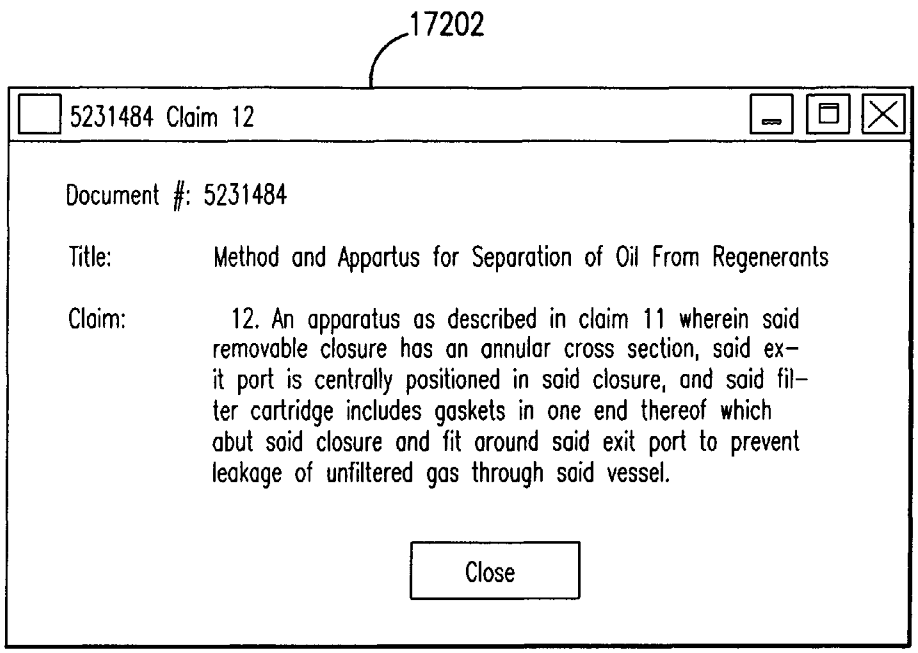
FIGS. 172 and 173 illustrate example displays which are presented when the operator selects a claim represented in the patent claims tree of FIG. 171.
Figure 173:
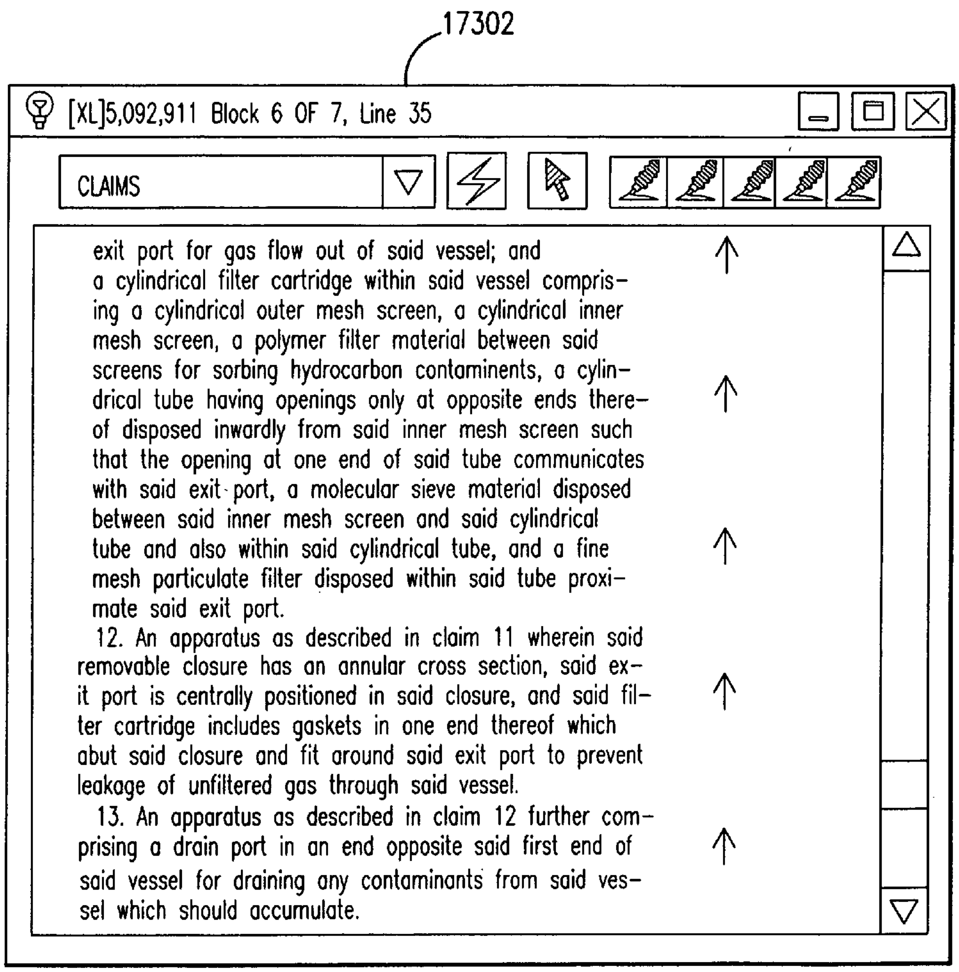

In step 16822, the client 304/306 retrieves information on the selected claim, such as the text of the selected claim, and displays the claim text. The invention includes a number of formats for displaying the claim text. For example, FIG. 172 illustrates a display format 17202 where the text of the claim is displayed independent of and apart from the patent. In contrast, FIG. 173 illustrates a display format 17302 where the claim is displayed in the context of the patent.

Such user interaction may be based on the node type and subtype. For example, if the user selects a patent node, such as node 17104, then the patent would be displayed (see FIGS. 123 and 124). Alternatively, if the operator selects a node corresponding to a claim, then the text of the claim is displayed, as described above.

Licensing Module

As shown in FIG. 187A, an embodiment of the invention includes a licensing module 18702 (also herein called the licensing system 18702). The licensing module 18702 is also referred to herein as the SmartPatents Prism™ system.

Customers use the licensing module 18702 to manage their intellectual property (IP) assets for maximal value through the creative use of licensing. The licensing module 18702 provides the tools a licensor needs to manage its licensing effectively through tracking a variety of objects, including but not limited to out-licenses (i.e., licenses where the corporate entity is the licensor), in-licenses (i.e., licenses where the corporate entity is the licensee), licensing parties (i.e., any parties involved with a license agreement, such as the licensee(s), the licensor(s), license agents, license organizations, attorneys, etc.), royalty statements, royalty payments, etc.

Customers also use the licensing system 18702 to better understand how they are making strategic use of their IP assets and to audit the licensees' contribution to the value of those assets.

As shown in FIG. 188, in an embodiment of the invention the licensing module 18702 is a standalone system, existing and operating independently of the enterprise server 314 and the enterprise databases 316. In this standalone configuration 18801, the licensing module 18702 does not access data in enterprise/IPAM database 316. Instead, the licensing module 18702 utilizes data in its own databases, i.e., a licensing database 18804 and a core database 18808, among potentially others. These databases are described in detail below. (The invention is not limited to the arrangement of data described herein. In other embodiments, the data and attributes described herein are stored in combinations of databases and tables other than that described herein.)

As shown in FIG. 189, in another embodiment, the licensing module 18702 interacts with the enterprise server 314 and/or the enterprise databases 316, such that users of the licensing module 18702 may access and utilize groups and/or IP assets, as well as other information, stored in the enterprise databases 316, and/or may interact with the enterprise server 314 to further manage groups of IP assets and/or other objects that are being tracked through the licensing module 18702.

According to some embodiments of the invention, the enterprise server 314 is herein also sometimes referred to as the Intellectual Property Asset Manager™ (IPAM™) server 314.

The database architecture associated with the licensing module 18702 includes a number of databases. As noted above, the standalone embodiment of the licensing module 18702 (shown in FIG. 188) includes a Licensing database 18804 and a Core database 18808.

The IPAM-integrated embodiment of the licensing module 18702 (shown in FIG. 189) includes the Licensing database 18804. The Core database 18808 is substantially or completely replaced with the enterprise database 316 (also called the IPAM database 316). The Core database 18808 contains standalone versions of all of or at least a subset of the tables included in the IPAM Server database 316. Accordingly, when the IPAM database 316 is available, there is little or no need for the core database 18808.

In an embodiment, the licensing module 18702 is implemented as a two-tier client/server model. In an alternate embodiment, the licensing module 18702 is implemented as a three-tier model using standard middleware technology such as CORBA or COM along with technologies compatible with them, including the appropriate security manager for the application server middleware layer. The invention is not limited to these embodiments. The architecture preferably provides a thin-client C++ component, a secure application domain server, and a secure database server (such as a SQL Server), linking the latter two components with ODBC for maximal portability. The user interface and object model are tightly integrated and use well known component technologies such as ActiveX and DAO. In an embodiment, security relies on defining SQL Server database users with passwords and appropriate privileges on the database objects.

An example thread of operation of the licensing module 18702 shall now be generally described. At initial set up of the licensing module 18702, and periodically thereafter (or as the circumstances dictate), a License Administrator and a System Administrator must perform various set up tasks, such as entering territories, fields of use, and currency conversion intervals.

After initial set up, the customer enters IP business related information, such as but not limited to existing license agreements, new license agreements, and/or related objects, such as but not limited to assets, asset packages, contacts, compensation terms, and so on. Specifically, in an embodiment, the Data Entry Clerk enters assets, and the License Administrator creates asset packages to package assets for licensing. The Data Entry Clerk enters contacts by entering organizations, people, and contact methods. Then the Data Entry Clerk enters the license information. At that point, the License Administrator takes over to modify the license agreement with more complex data that requires an understanding of licensing.

As data grows, the License Administrator begins querying the system interactively in response to questions and issues that arise. He or she will also start generating reports. At some point, an auditor or other interested party will also query and generate reports. The License Administrator then may need to do some maintenance on the agreements, accompanied by occasional maintenance by the IPAM Administrator on objects that require Administrator privileges to remove.

As time goes on, licensees submit royalty statements and payments. The Data Entry Clerk enters these. The License Administrator then allocates the payments to expected revenue and to royalty statement details. This linking enables the Licensing module 18702 to generate meaningful revenue reports.

More generally, the licensing module 18702 enables users to manage, track, interact with, process, analyze, etc., intellectual property (IP) related transactions. In a preferred embodiment, such IP related transactions include the licensing of IP assets, and the management, tracking, interaction with, processing, analysis, etc., of such licensing activities using license agreements, asset packages, royalty statements, payments, etc. However, the invention is not limited to this embodiment. Instead, the invention is intended and adapted to cover the management, tracking, interaction with, processing, analysis, etc., of IP related transactions using any object, vehicles, data, etc., in accordance with the scope and spirit of the functions described herein.

The Licensing module 18702 includes a number of features, including but not limited to the following:

- Import/Export: Support for loading various kinds of objects into the Licensing databases from flat files in a standard format to reduce the need for extensive data entry (or, worse, reentry).
- Strategic analysis: Features that help license administrators and marketers to understand the strategic implications of licensing their intellectual property. This includes offering a database of SEC 10K filings of "material" license agreements on which you can search to determine the range of royalty terms and the strategic issues that arise in a specific industry.
- Market opportunity tracking: Tracking of sales opportunities related to contacts, including inquiries, targeted potential customers, and infringement tracking.
- Marketing Communications and Sales support: Support for customer inquiries, IP marketing brochure querying, and e-commerce sales support.
- Asset types: Support for more asset types, particularly in the arena of Know How. In an embodiment, Know How is a class with various kinds. In alternate embodiments, subclasses are created for the broad areas within Know How such as Technical Data, Technical Assistance, Process, Software, and other such categories with specific attributes.
- Electronic Data Interfacing: support for the ability to transfer royalty statements and payments from licensee to licensor automatically through the Internet or other communications media to improve compliance, simplify auditing, and reduce data entry requirements.
- Licensing In: Extensive support for the licensee, including royalty statement generation, payment due flagging, and sublicense tracking.
- Compliance workflow: Support for the contract administrator in monitoring the compliance of agreement parties to the terms and conditions of the license agreement, such as generating royalty invoices, checking revenue numbers, and detailed representation of contract clauses and their compliance requirements
- Sublicense tracking: The ability to track sublicensing of a license agreement for better royalty tracking and control and contract compliance.
- Contract development workflow: Support for user-defined templates for license agreements and generation of standard agreements with designated clauses.
- International licensing support: support for various issues that arise with international licenses, including support for offset licensing ("counter trade" or "industrial participation" licensing) and the various registration requirements for copyrights, trademarks, and patents in foreign countries and the import/export requirements of foreign governments that impact royalty and fee payments.
- Custom report integration: the ability to integrate custom reports into the Reports View and run them along with standard reports. This includes integration of a complete report writer into the Licensing module 18702.
- Administrative audit trails: support for object version auditing through recording the user and timestamp for each change to the persistent data.
- Help Desk support: Extensive support for internal customers of the system getting answers to basic questions through query facilities in the Licensing module 18702, ranging from a simple frequently-asked-question style to the ability to query information about licenses, royalty statements, and payments.
- Valuation: Support for alternative methods of valuing a license and its licensed assets.

The licensing module 18702 is described in greater detail in the following sections.

User Roles

Generally, the licensing module 18702 involves a number of user roles, including but not limited to the following. The invention is not limited to these functions being performed by the people specified below. In other embodiments, other people in other user roles can perform the following functions.

- The Data Entry Clerk: a user who enters basic data about contacts, licenses, royalty statements, and license payments. Generally, a Data Entry Clerk does not require much knowledge about licensing or intellectual property.
- The License Administrator: a user who enters more complex information about licenses, royalty statements, and payments and who works with executives, corporate counsels, licensees, and others to provide information about the licenses and revenue in the IPAM system 18702. Generally, a License Administrator requires extensive knowledge about licensing and licensed intellectual property.
- The Auditor: a user who generates summary and detail reports about the licenses and their associated revenue and who queries information interactively to investigate specific issues. Generally, an Auditor requires extensive knowledge about licensing and the details of accounting for license revenue, but does not require write access to the system.
- The System Administrator: a user who handles security management, data entry of supporting database information, and cleanup of the database on demand from others.
- The Database Administrator: a user who sets up and controls the physical layout of the database that the licensing module 18702 uses.

Generally, the System and Database Administrators have full access to everything in the system. The other users have access granted to them by owners of asset packages or those with write access to security classifications. The different roles above do not imply any particular security access; each user has whatever access they are granted by the Administrator or other users.

FIG. 191 illustrates an object-oriented view of a preferred actor hierarchy 19102 for the licensing system 18702. As FIG. 191 illustrates, all actors inherit the base capabilities of a generic user 19104, who may be a user of the licensing system 18702. This user, for example, could have the authority to view data, conduct searches, and run reports. Other actors, such as the system administrator 19106, the data entry clerk 19108, the auditor 19112, and the database administrator 19116, have capabilities above and beyond that of the user 19104. These additional capabilities are elaborated above, and further indicated below. A super user, the licensing administrator 19118, preferably has complete access to the licensing system 18702, and thus is shown in FIG. 191 as inheriting all the capabilities of all the other actors.

Architecture

FIG. 187B is a block diagram of the licensing system 18702 according to an embodiment of the invention.

There are three general functions of the Licensing module 18702: data entry, data exploration, and reports. Underneath the user interface, there is an object model that implements all the different kinds of licensing objects that Licensing module 18702 needs to support data entry, to provide exploration of the database, and to permit generation of effective reports. Licensing module 18702 preferably connects to a SQL Server database server 18740 through ODBC 18738 to provide persistent storage of its data and to support third-party report definitions.

User Interface

The user interface preferably includes the following components.

Licensing System User Interface Module

The licensing system user interface module 18701 is the primary user interface for the licensing related functions of the licensing system 18702 described herein. The licensing system user interface module 18701 interacts with users via the windows and dialogs described herein. Preferably, the licensing system user interface module 18701 is written in Visual C++ and MFC (Microsoft Foundation classes, a well known class library for Visual C++), although the invention is not limited to this implementation.

Licensing System Administrator User Interface Module

The licensing system administrator user interface module 18704 is the user interface to the licensing related administrative functions described herein. The licensing system administrator user interface 18704 is preferably written in Visual C++ and MFC, although the invention is not limited to this implementation.

Data Entry

In an embodiment, operation of the licensing module 18702 is based on license agreements. (The invention is not limited to this embodiment. Specifically, in other embodiments, the licensing module 18702 is based on other IP related transactions, such as assignment agreements, technology transfer agreements, security interests, or any other agreement involving a transaction that includes or relates to an IP asset.)

Generally, license agreements are completely nonstandard in text format, but customers need to track specific, standard information about the agreement: its terms, its duration, its parties, the payments and statements customers receive, etc. They need to explore how their IP assets are generating revenue. They need to be able to license IP assets including patents, trademarks, copyrights, know how, trade secrets, other licenses, etc. Customers need to package multiple assets for licensing through a single license. They need to report on different aspects of their license portfolio. They need to search the document text to identify agreements that they can use as templates for further agreements.

Consequently, the Licensing module 18702 enables users to enter structured data about license agreements, royalty statements, payments (this information is preferably stored in the licensing database 18804). The licensing module 18702 also enables users to enter data about companies and people to which IP assets can be licensed (this information is preferably stored in the licensing database 18804). The licensing module 18702 also enables users to enter IP assets (patents and other types) (this information is preferably stored in the licensing database 18804). This part of the licensing system 18702 can link to the IPAM Server 314 for access to the IP assets and groups it supports. The licensing module 18702 also adds to those IP assets as necessary to round out the range of asset types that customers wish to license: trademarks, copyrights, and trade secrets as well as patents. Generally, information on non-patent assets are stored in the licensing database 18804 or the core database 18808. Information on patent assets are stored in the IPAM database 316 when working in the IPAM integrated mode (FIG. 189), and stored in the licensing database 18804 or the core database 18808 when working in the standalone mode (FIG. 188). The Licensing module 18702 also provides asset packaging options beyond lists of assets, including search packages based on IPAM search groups and descriptive asset packages that define asset groups with text rather than enumerating assets.

Licensing Reports

Licensing reports are an important feature of the Licensing module 18702. Customers use reports generated by the licensing module 18702 to track the revenue due from licenses, to compare that expected revenue to the actual revenue received, and to evaluate the success of license management in their business units. The invention also supports other reports.

Preferably, the report generation module 18706 is responsible for generating the reports requested by users. The report generation module 18706 generates reports using the data in the licensing related databases, including printing the contents of each major object in the system (Print License, Print Asset, and so on). Preferably, the report generation module 18706 connects to the databases through ODBC 18738 or through the Microsoft SQL Server driver, for example. The report generation module 18706 can be implemented using a commercial report generation product, such as Crystal Reports, although the invention is not limited to that embodiment.

In embodiments where the report generation module 18706 is implemented using a commercial report generation product, a report generator interface 18732 interacts with the report generator 18706 to cause the report generator 18706 to generate reports per user instructions. For example, the generator interface 18732 may interact with the report generator 18706 in a manner consistent with the API (application program interface) of the report generator 18706 to cause the report generator 18706 to access the databases 19208 for appropriate information, and to process and format that information in reports, per user commands.

Data Exploration Module

Strategically, licensing managers will use the Licensing module 18702 to access license data in creative ways.

A strategic use of the licensing system 18702 involves ad-hoc query functions in combination with reports to identify IP assets that are underperforming or outperforming and to cross-reference between license agreements, licensees, royalty terms, royalty statements, and royalty payments. The ad-hoc query facility uses the same user interface that provides data entry facilities in an easy-to-use query-by-example format.

The ad-hoc query facilities also support licensing personnel and auditors in interactive tactical tracking down of issues such as payments due, payments not received, royalty statement details, and errors in data entry.

Object Model

The object model of the Licensing module 18702 represents the transient aspect of the persistent data in the database server. The subsystems of the object model provide interfaces to the various licensing-related objects and higher-level objects that aggregate them for use in the Licensing module 18702. The object model supports a number of subsystems and/or object/data types, including but not limited to the following:

- Entity 18712: The people and corporate entities that make up the licensors, licensees, and other parties to the license agreement.
- Contact: The contact-related information for entities.
- Role: The relationships between entities and other subsystems.
- Agreement 18714: The licensing agreement, including basic royalty terms and advanced royalty structures.
- Package 18718: IP assets and their groupings, including enumerated groups of license agreements, groups based on a search condition from the IPAM Server, and descriptive groupings.
- Royalty 18720: The royalty statement that details the responsibility of the licensees for royalty payments.
- Payment 18722: The payments received from entities related to licenses and their links to the general ledger.

More particularly, the licensing system domain A08 is an object layer called a licensing system domain 18708 that represents a series of subsystems (generally indicated as 18748 in FIG. 187B) that contain objects that the licensing system 18702 requires to provide the functionality described herein. Preferably, each subsystem design minimizes the connections to other subsystems from its internal objects with the objective of maximal reusability as components. Each subsystem provides a complete interface to the subsystem and its component objects. Each subsystem is preferably a separate DLL (dynamic link library) and is preferably contained within a separate C++ namespace.

Each subsystem exports a set of Transaction subclasses, where a transaction is a Database subsystem component that provides support for database transactions. Each transaction subclass represents a transaction use case. Some transaction classes provide methods for generating objects either as new objects or as objects queried from the database. Others provide the ability to update and delete objects from the database. Each use case is a single transaction through the system, and each must execute entirely within a single thread to ensure thread safety. The use cases supported by an embodiment of the invention are described in sections below.

The user interface accesses the transaction subclasses as the primary interfaces. Transactions correspond to the work the user does with those objects (entering new assets, adding payments to a license, and so on). Block diagrams of the subsystems are illustrated in FIGS. 302-326. Details on these subsystems will become apparent from the following discussion of use cases.

It is noted that allocation of functions to the subsystems 18748 may vary according to the implementation. Accordingly, the subsystems shown in FIG. 187B should be considered only an example.

Data Access Module

The data access module 18710 provides an interface between system databases 19208 and the modules of the licensing system 18702. Preferably, the data access module 18710 includes the Microsoft Active Data Objects COM component (preferably version 1.5) that provides a SQL interface for accessing various data sources. In this case, it connects to ODBC 18738.

Database Architecture

The database architecture preferably includes a Database Server 18740 (such as a SQL Server or an Oracle server) that preferably manages the persistent data as a set of relational tables. The databases 19208 in the database architecture each preferably includes a number of databases, each containing a well-defined and reusable set of data components. (It is noted that the invention is not limited to this arrangement of data. In other embodiments, the data described herein is stored in database arrangements other than that described below.)

- The Licensing database 18804 contains the Role, Agreement, Royalty, and Payment data. More particularly, the licensing database 18804 contains tables that provide information about licensing-related objects (agreements, royalties, payments, currency, and so on). The Licensing database 18804 also contains the standalone asset data. The Licensing Database 18804 further includes tables supporting time periods (start date/end date type relationships). The licensing database 18804 also contains the Entity and Contact data, i.e., data supporting people, organizations, and contact information for them. The Licensing database 18804 provides a series of views for tables in all the other databases. The domain and the report definitions access the Licensing database 18804, using the views to access data in the other databases. This provides a single, unified database interface for the higher level layers in the licensing system 18702. Views in the Licensing database 18804 are preferably integrated when necessary to provide easier access to complexly related tables. The objective in dividing the tables between several databases is to separate the data for reuse in other applications.
- The Core database 18808, which contains Group data (that is, information on groups and the assets in each of the groups) and patent asset data (either downloaded from the IPAM Server database 316 or a standalone version of that database 316 that Licensing module 18702 uses). More generally, the Core database 18808 contains exactly the same or, alternatively, substantially the same tables that are in the IPAM database 316 (optionally, any databases in the IPAM database 316 that are not accessed by the licensing system 18702 are not included in the core database 18808).

The standalone version of Licensing module 18702 has a stand-in version of the IPAM database 316 (i.e., the Core database 18808) that, in an embodiment, contains only some of the tables in that database that the module uses (for example, group, document, and a few miscellaneous tables). The patent tables in the IPAM Server database 316 also replaces the patent tables (but not non-patent asset tables) in the licensing database 18804 or the core database 18808 for the integrated version of the Licensing module 18702 (FIG. 188).

FIG. 19202 illustrates a conceptual, object oriented view of the databases 19208. The licensing database 18804, the core database 18808, and the IPAM database 316 inherit all the abilities of a generic database 19204.

Licensing Module as a Standalone Module or Integrated with IPAM (IPAM Integrated)

As discussed above, in one embodiment the Licensing module 18702 integrates with the IPAM Server 314 through the IPAM database 316, which it accesses directly.

The standalone version of the Licensing module 18702 replaces the IPAM database 316 with a Core database 18808 that emulates the IPAM tables 316 that the Licensing module 18702 uses, including the Group-related tables, the Document table, the IP Document table hierarchy, and the UDD (unique document descriptor) tables. See FIGS. 12A-12M.

With IPAM integration, the Licensing module 18702 has all the patent and UDD (user defined documents) documents available as assets and all groups available for group asset packages from the IPAM database 316. With the standalone version of the Licensing module 18702, the customer must enter patents through data entry screens in the Licensing module 18702 interface (in an embodiment, these are not present when the system is integrated).

Preferably, the Licensing module 18702 integrates with the IPAM security system through the IPAM security broker, a library that is part of the IPAM server technology.

Object Display Window of the User Interface of the Licensing module

FIG. 190 illustrates an object display window 19002 of the user interface of the Licensing module 18702. The object display window 19002 includes a number of elements:

- Menus: At the top of the object display window 19002 are a variety of pull-down menus 19006. These menus 19006 allow easy access to all of the transactions you can accomplish with the Licensing module 18702
- Tool Bar: Under the pull-down menus 19006 is a tool bar 19004, which presents a line of often-used tools, such as New, Save, Print, and Find.
- Licensing Functions Tool Bar: Along the side of the object display window 19002 is a licensing functions tool bar 19008 that include icons providing access to the major objects in the Licensing module 18702. These icons include a license agreements icon 19012, a contacts icon 19014, an asset packages icon 19016, a royalty statements icon 19018, a payments icon 19020, a reports icon 19022, and a recycle bin icon 19024. Clicking on one of these icons changes the content of the content view area 19026 so as to display the indicated kind of objects and the various components that make them up.
- Content View area: The content view area 19026 is the main area of the object display window 19002. The content view area 19026 contains one or more controls for managing the objects that make up Licensing module 18702. These panes include spreadsheet views, and one or more "explorer" or hierarchical views for organizational structure. A spreadsheet view lets you configure the columns to display and sorts on a column when you click on the header.
- Status Bar: A status bar 19010 appears at the bottom of the object display window 19002. The status bar 19010 displays application status, short help messages, keyboard status (CAPS LOCK, NUM, etc.), etc.
- Recycle Bin: If you remove one of the major objects (entity, asset, asset package, license, royalty statement, payment, currency, etc.), the object gets recorded in the Recycle Bin 19024. You can either restore individual objects in the Recycle Bin view, or you can empty the recycle bin 19024 to make the changes permanent. An object in the recycle bin 19024 is preferably not visible anywhere else in the application.
- Dialogs: There are various dialogs that pop up (not shown in the example of FIG. 190), usually as a result of clicking on a tool button or double-clicking on an object in a spreadsheet; the dialogs accomplish data entry, data modification, searching, etc.

Operational Features of the Licensing Module

Operational functions supported by embodiments of the licensing module 18702 are described in detail in the following sections.

Preferably, these functions are implemented by one or more computers operating according to control logic, or software. Such software is preferably written in an object oriented manner. Accordingly, the licensing module 18702 can be said to be an object oriented system.

Use cases are sometimes used to describe the manner in which an object oriented system works. Generally, a use case describes a transaction processed in an object oriented system.

Use cases often include extensions. Extensions are conditional. For example, the enter contact method use case described below extends the enter entity method use case. In other words, under certain conditions when you are entering an entity, you will enter a contact method.

In the following section, the functions supported by embodiments of the licensing module 18702 are described by describing use cases that correspond to these functions. Coding of software to achieve these functions will be readily apparent to persons skilled in the relevant arts, based on the description contained herein, including but not limited to the following description of use cases. In the following, use cases are described as being implemented as procedures, but in practice the functionality of any number of use cases can be achieved through one or more software procedures.

An embodiment of the licensing system 18702 is shown in FIG. 193A. Each of the ovals shown in FIG. 193A corresponds to a logical functional module of the licensing system 18702. Generally, these functional modules correspond to the use cases that are described below. The relationships between the functional modules are indicated in FIG. 193A.

The invention also preferably includes a licensing administration module 19301 (FIG. 193B). The licensing administration module 19301 performs administrative tasks associated with the licensing system 18702. The licensing administration module 19301 is preferably accessible only by administrators.

A functional module may "use" another functional module. In other words, in the course of performing its specified function, a functional module may call or invoke the services of another functional module. Alternatively, a functional module may "extend" another functional module. In other words, a functional module may extend the capabilities of another functional modules. In some cases, not all relationships between modules are shown in the figures. The relationships between functional modules are further described in the following sections.

In the following, certain steps are described as being preferably performed by some actors, but in practice and/or in other embodiments, the steps are performed by other actors, including but not limited to those described herein.

General Purpose Use Cases

There are several general-purpose use cases that apply to all users or to generic objects. These are described in the following sections.

Login

Figure 194:
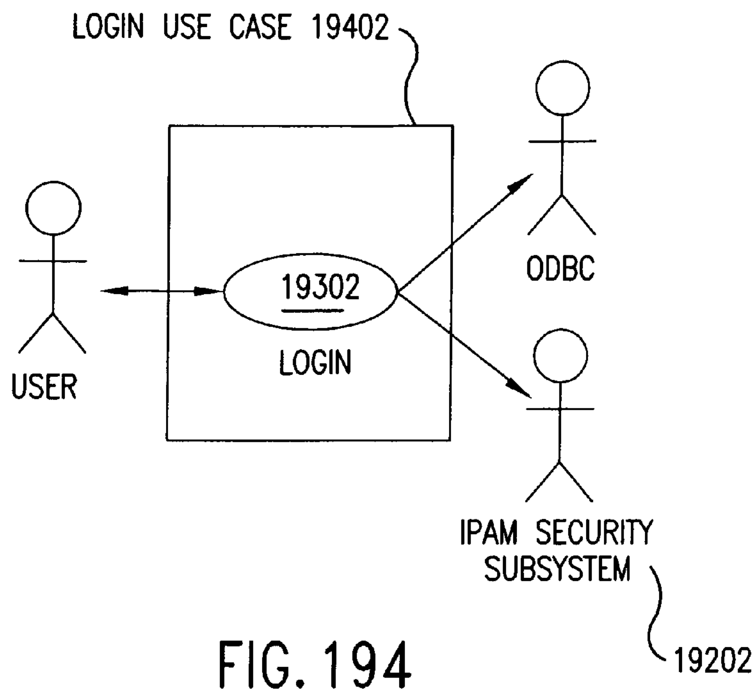

The login use case 19402 is diagramed in FIG. 194.

The User enters his or her user name and password and any connection string required by the ODBC data source in a login dialog 19502 shown in FIG. 5195. The licensing module 18702 logs the user into the server preferably through the ODBC connection mechanism and authenticates the user through the IPAM security system 19202.

Display Help

Figure 196:
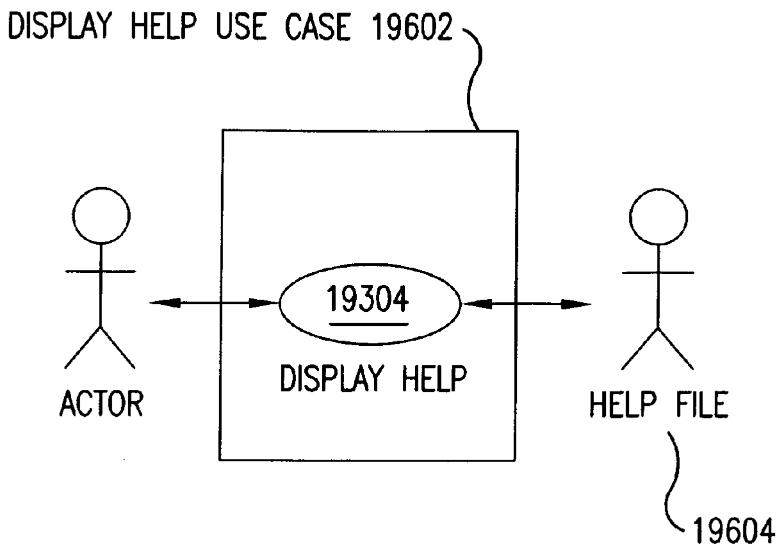

The display help use case 19602 is diagramed in FIG. 196.

The User requests help in a specific context or requests display of the help contents, index, or query preferably using a standard help system, such as the Microsoft Windows help system. The display help module 19304 displays the appropriate help screen by accessing, retrieving, and displaying pertinent information from a help file 19604.

Print Object

Figure 197:
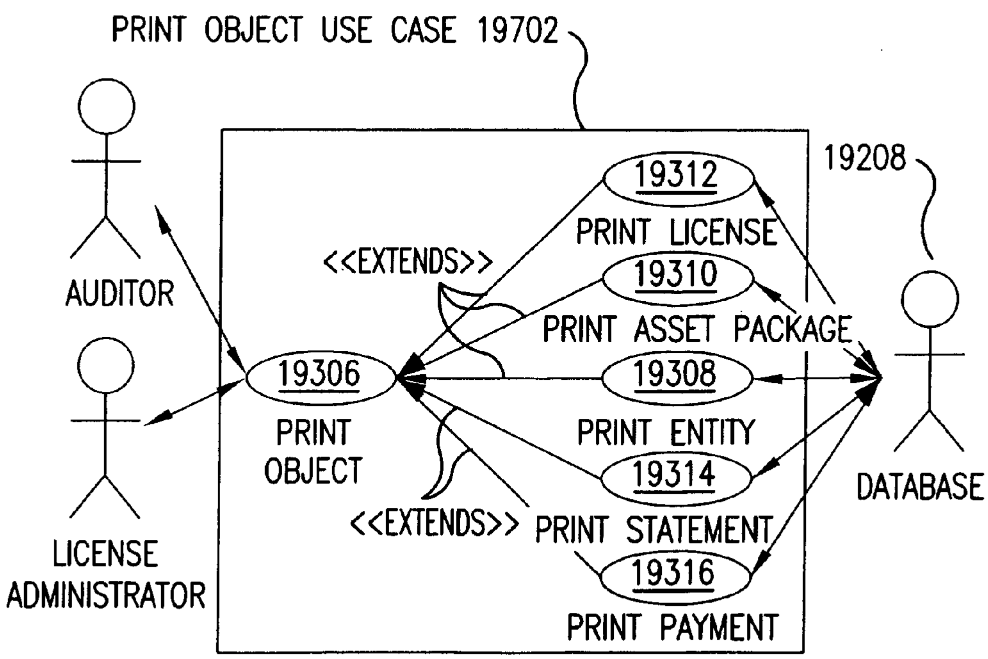

The print object use case is diagramed in FIG. 197.

The Auditor or License Administrator selects an object and prints the object in a standard print format to a system printer using the print object module 19306.

The operation of the print object module 19306 is further detailed below:

Step 1: The Auditor or License Administrator (the Actor) starts the read-only transaction by selecting an object (license agreement, asset package, entity, royalty statement, or payment), and then selects the Print command.

Step 2: The print object module 19306 displays a Print <Object> dialog, where <Object> is one of the five basic objects from step 1.

Step 3: The Actor sets the printing options, including any printer setup commands, then issues the instruction to print, ending the transaction.

Step 4: The print object module 19306 prints the object.

If the Actor in step 1 selects a License Agreement, the Print License use case extends the print object module 19306.

If the Actor selects an Asset Package, the Print Asset Package module 19310 use case extends the print object module 19306.

If the Actor selects an Entity, the Print Entity module 19308 extends the print object module 19306.

If the Actor selects a Royalty Statement, the Print Statement module 19314 use case extends the print object module 19306.

If the Actor selects a Payment, the Print Payment module 19316 extends the print object module 19306.

Contacts

A Contact is an organization or person (general term "entity", which also encompasses users and user groups in the security system). People play roles in organizations, and both people and organizations have contact methods (telephone, mail address, and email).

A Contact View 19802 is displayed by selecting the contacts icon 19014 (FIG. 19802). The contact view 19802 contains two panes, an explorer view (organization pane) 19804 of organizations and a list of people (people pane) 19806. It is possible to expand and contract the organization hierarchy in a well known manner. When you select an organization, the people in that organization appear in a people list pane 19806 in a tabular spreadsheet format.

Double-clicking on an organization in the explorer view 19804 displays the data modification dialog for organizations. Double-clicking on a person in the people list pane 19806 displays the data modification dialog for people. You can double-click on an empty record or click the New button to create a new organization or person.

The Licensing System Administrator creates, modifies, and/or removes roles from the Licensing Database 18804.

Enter Entity

Figure 199:
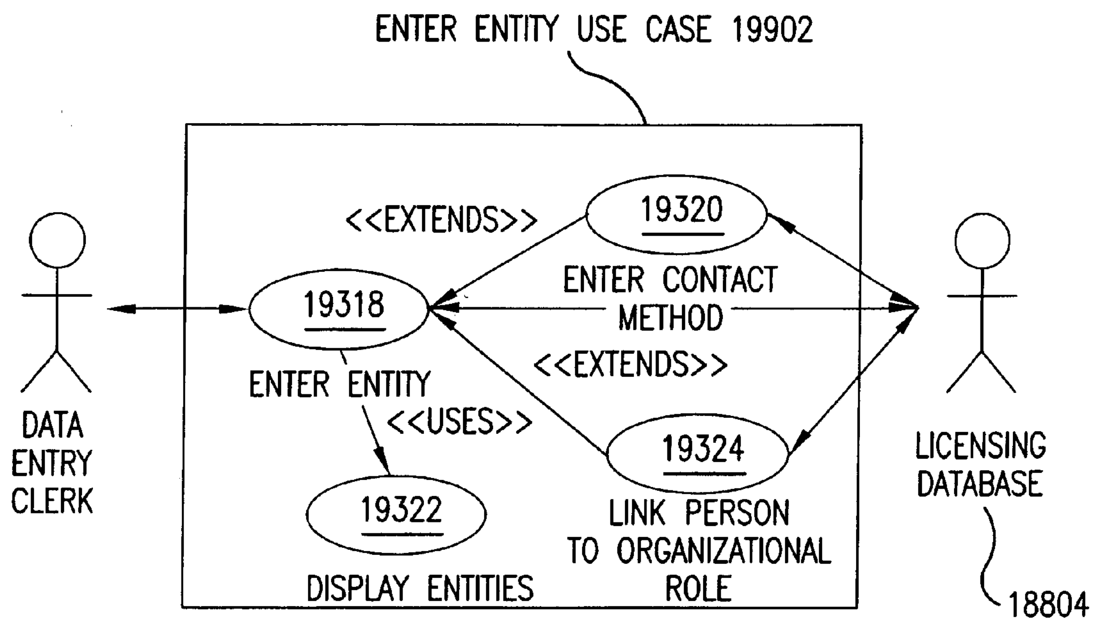

The enter entity use case 19902 is diagramed in FIG. 199.

The Data Entry Clerk enters entity information for people and organizations, including organization levels, people's names, and (optionally) contact methods. The Data Entry Clerk may optionally link a person to an organization with a specific role.

The enter entity use case 19902 is further described below:

Step 1: The Data Entry Clerk begins the transaction.

Step 2: The enter entity module 19318 displays the organizations in the organization pane 19864 and people in the people pane 19806 stored in the licensing database 18804 using the Display Entities module 19322.

Step 3: The Data Entry Clerk takes any of these actions (for example):

- Step 3.1: The Data Entry Clerk adds an organization to the list of organizations.
- Step 3.2: The Data Entry Clerk adds a new person to a list of people for an organization.
- Step 3.3: The Data Entry Clerk copies an existing person into a new organization.

Step 4: The enter entity module 19318 displays a data entry form and creates a new entity unique identifier.

Step 5: The Data Entry Clerk enters an optional description for the new organization/person.

Step 6: The Data Entry Clerk commits the transaction.

Step 7: The licensing system 18702 stores the entered entity information in the licensing database 18804 and confirms the commit to the Data Entry Clerk.

There are a number of extensions to the enter entity module 19318.

- For a person, the Data Entry Clerk enters the First Name, Middle Name, and/or Last Name.
- For an organization, the DataEntry Clerk enters the Name. Optionally for an organization, the Data Entry Clerk enters the date on which the organization came into existence.
- Optionally for an organization, the Data Entry Clerk chooses an organizational level from a list.
- If the Data Entry Clerk wants to enter contact information for the entity, the Enter Contact Method use case extends this use case.
- If the Data Entry Clerk is entering a person and wants to link that person to an organizational role, the Link Person to Organizational Role use case extends this use case.

Enter Contact Method

Figure 200:
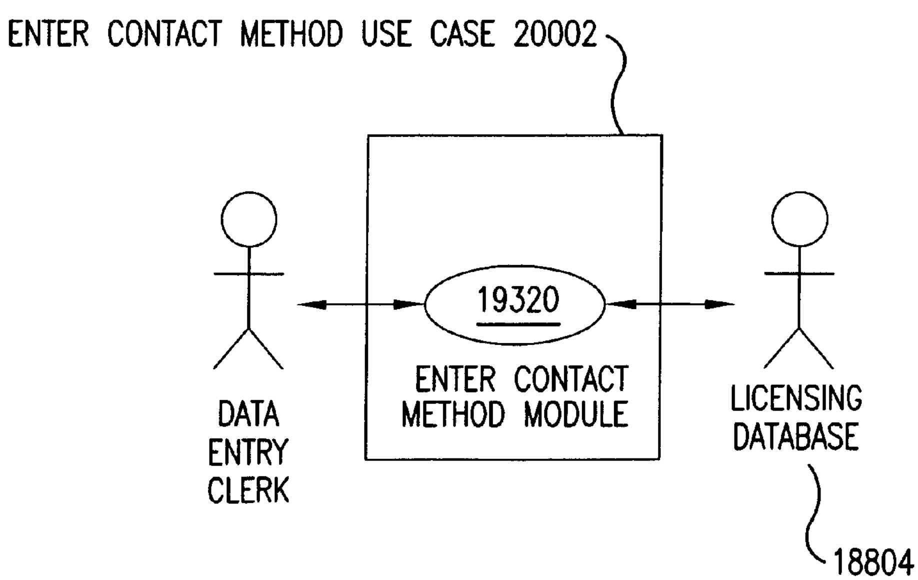

The enter contact method use case 20002 is diagramed in FIG. 200.

This use case extends or is used by another use case, which supplies the unique identifier of an entity. The Data Entry Clerk enters one or more contact methods for that entity.

The enter contact method module 19320 is further described below:

Step 1. The using use case passes in an object identifier for an entity with which to associate a contact method.

Step 2. The Data Entry Clerk chooses one of three types of contact method: telephone, email, or mail address.

Step 3. The enter contact method module 19320 displays an entry form appropriate for the type of contact method selected and generates a unique priority, defaulting it to one more than the last priority entered for methods associated with this entity:

```
SELECT MAX(Priority)+1
 FROM Contact_Method
WHERE Entity_ID = :Entity_ID
```

where :Entity_ID is the entity object identifier passed into this use case. Note: The Data Entry Clerk can modify the priorities in the Modify Entity use case.

Step 4. The Data Entry Clerk optionally enters a Description for the contact method and terminates the use case.

Step 5. The enter contact method module 19320 inserts the contact method into the Licensing Database 18804, linking the entity and contact method.

There are a number of extensions with this use case:

If the contact method is telephone, the Data Entry Clerk enters a country code (default 1), an area code, a telephone number, and (optionally) an extension and whether the phone is a fax line.

If the contact method is email, the Data Entry Clerk enters a domain and an address.

If the contact method is a mail address, the Data Entry Clerk enters a street address, a city, a state or province, and a country (default=USA). Optionally, the Data Entry Clerk enters a second line of street address and/or a postal code. The Clerk can enter this data in any order.

If the Data Entry Clerk presses F1 or the equivalent, the application extends the use case with the Display Help use case.

Display Entities

Figure 201:
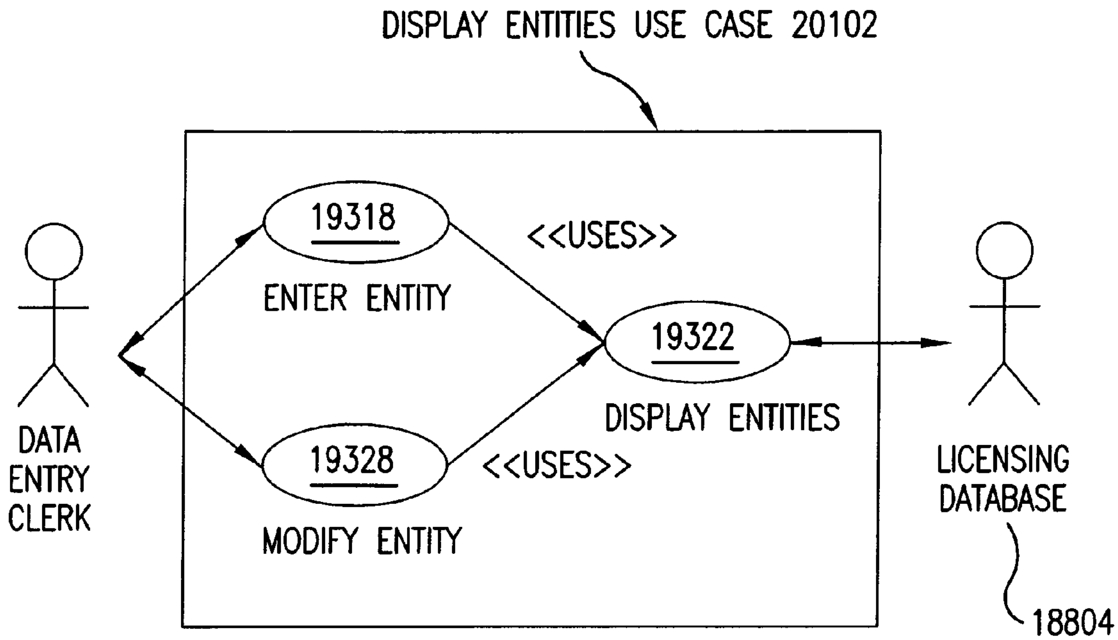

The display entities use case 20102 is diagramed in FIG. 201.

The Enter Entity module 19318 and Modify Entity module 19328 both use the display entities module 19322 to display organizations and people. The display entities module 19322 displays a tree of organizations and displays all the people in an organization that the Data Entry Clerk selects.

The display entities module 19322 is further described below:

Step 1. The display entities module 19322 displays a list of top level organizations in alphabetical order from the Licensing database 18804 in the organization pane 19804 of the contact view 19802. The display entities module 19322 then displays in the organization pane 19804, for each organization, the hierarchy of organizations that have the top-level organization as a parent.

Step 2. The Data Entry Clerk selects an organization from the organization pane 19804.

Step 3. The display entities module 19322 displays in the people pane 19806 an alphabetical list of all the people in the organization from the Licensing database 18804, preferably displaying the Entity unique identifier, the entity Name, the entity Description, the role Name, and the Start Date and End Date (if any) of the interval during which the person played the particular role in the organization, all preferably ordered by the last name then first name of the person. The user can select to order the data in other ways (this is true whenever data is displayed in the present invention). Note that a person may have different roles in the organization, perhaps at different times. The display entities module 19322 displays the person only once but supplies a list of roles and time periods for the person with multiple roles.

Modify Entity

Figure 202:
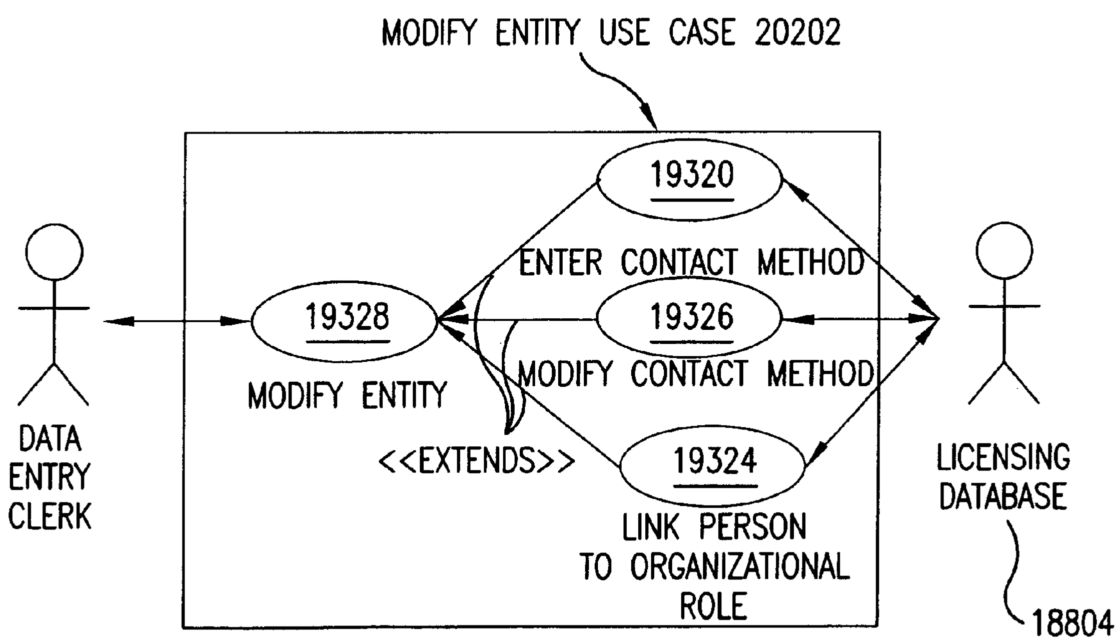

The modify entity use case 20202 is diagramed in FIG. 202.

The Data Entry Clerk interacts with the modify entity use case 20202 to modify entity information for people and organizations, including organization levels, people's names, and contact methods. The Data Entry Clerk may optionally modify the links between a person and their roles in organizations.

The modify entity module 19328 is further described below:

Step 1. The Data Entry Clerk begins the transaction by selecting an appropriate menu option, or pressing an appropriate dialog button.

Step 2. The display entities module 19322 displays a list of top level organizations in alphabetical order from the Licensing database 18804 in the organization pane 19804 of the contact view 19802. The display entities module 19322 then displays, for each organization, the hierarchy of organizations that have the top-level organization as a parent.

Step 3. The Data Entry Clerk selects an organization.

Step 4. The display entities module 19322 displays an alphabetical list of all the people in the organization from the Licensing database 18804 in the people pane 19806.

Step 5. The Data Entry Clerk selects an entity (person or organization) for modification.

Step 6. The modify entity module 19328 displays a data entry form for the appropriate kind of entity.

Step 7. The Data Entry Clerk optionally changes the entity name and/or description in any order.

Step 8. The Data Entry Clerk commits the transaction.

Step 9. The modify entity module 19328 updates the Licensing database 18804 with the modified entity information and confirms the commit to the Data Entry Clerk.

This use case has a number of extensions:

For a person, the Data Entry Clerk modifies the individual elements of the name, which the modify entity module 19328 then concatenates together for the Entity Name.

For an organization, the Data Entry Clerk can optionally modify an organizational level from a list Optionally for an organization, the Data Entry Clerk enters or changes the date on which the organization came into existence.

Optionally for an organization, the Data Entry Clerk links the organization to another organization as its parent (the organization the Clerk is entering is the child, the other organization is a parent). Preferably, there can be only one such parent, so the change modifies any current link.

Optionally for a person, the Data Entry Clerk adds, modifies, or removes a role in an organization using the Link Person to Organizational Role use case, which extends this use case.

If the Data Entry Clerk wants to enter additional contact information for the entity, the Enter Contact Method use case extends this use case. This repeats as often as necessary.

If the Data Entry Clerk wants to change existing contact information for the entity, the Modify Contact Method use case extends this use case. This repeats as often as necessary. This use case must query the set of contact methods and let the Data Entry Clerk identify which one to modify.

Modify Contact Method

Figure 203:
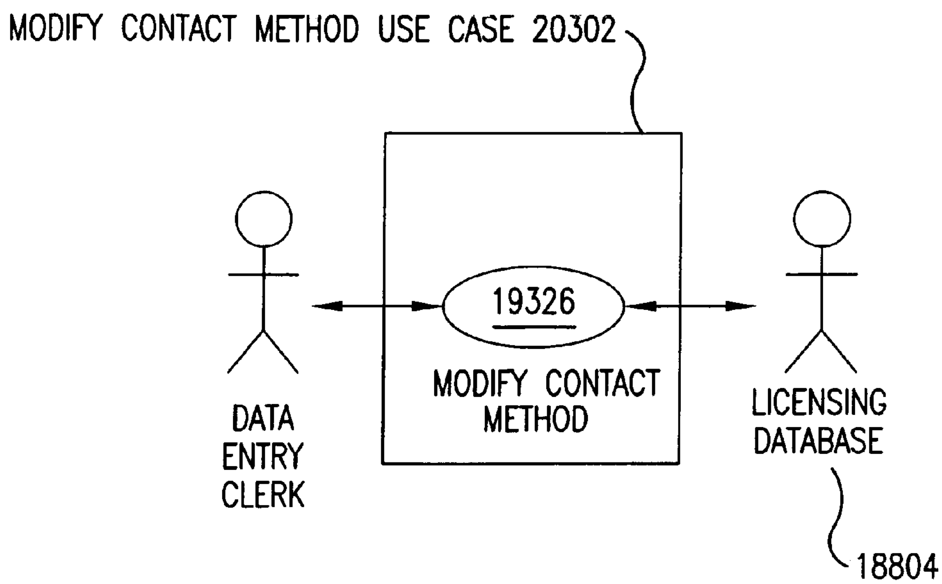

This use case is diagramed in FIG. 203.

This use case extends or is used by another use case, which supplies the object identifier for an entity and the priority of the contact method for that entity, which taken together identify the contact method. The Data Entry Clerk can change any of the characteristics of the contact method, which may be a telephone number, a mail address, an email address, etc.

The modify contact method module 19326 is discussed further below:

Step 1. The modify contact method module 19326 accesses a contact method from the licensing database 18804. The modify contact method module 19326 displays the contact method in a dialog.

Step 2. The Data Entry Clerk optionally modifies the Description and details (see Extensions) for the contact method and terminates the use case.

Step 3. The modify contact method module 19326 inserts the contact method into the Licensing database 18804, linking the entity and contact method.

This use case includes the following extensions:

If the contact method is telephone, the Data Entry Clerk enters a country code (default 1), an area code, a telephone number, and (optionally) an extension and whether the phone is a fax line.

If the contact method is email, the Data Entry Clerk enters a domain and an address.

If the contact method is a mail address, the Data Entry Clerk enters a street address, a city, a state or province, and a country (default=USA). Optionally, the Data Entry Clerk enters a second line of street address and/or a postal code. The Clerk can enter this data in any order.

Link Person to Organizational Role

Figure 204:
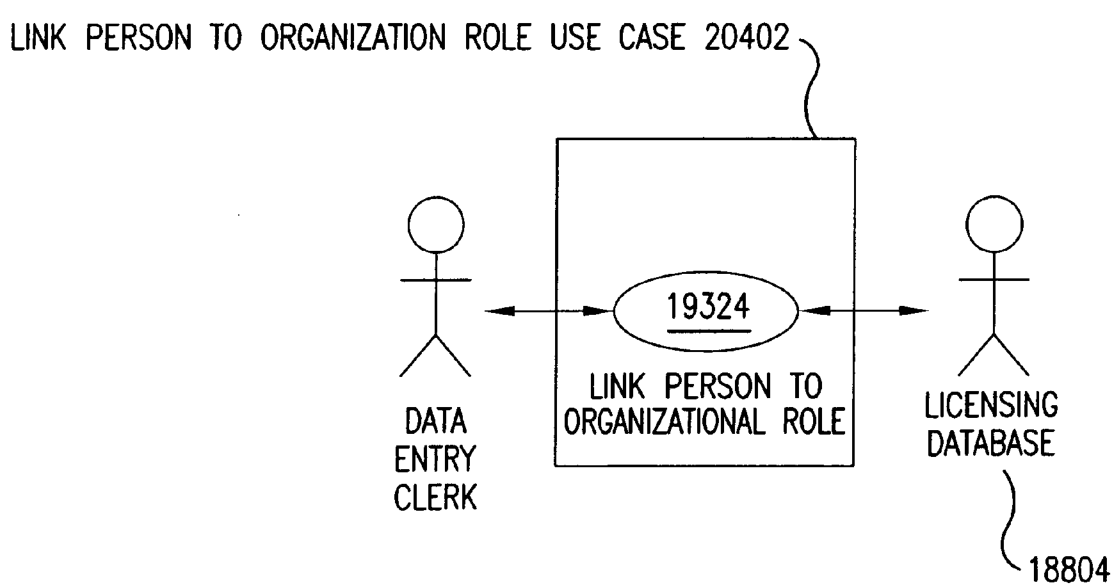

The link person to organization role use case 20402 is diagramed in FIG. 204.

This is a use case that extends other use cases when the Data Entry Clerk wants to model a particular person's role in an organization during a given period of time. The extended use case passes in the object identifier for the person and the organization. The Data Entry Clerk selects the role from a list of roles and sets the time period.

This use case is further described below:

Step 1. The extended use case passes in the object identifiers for aperson and an organization.

Step 2. The link person to organization role module 19324 displays a form containing a list of roles ordered by name, displaying the Name and Description for each role, and entry fields for Start and End Dates.

Step 3. The Data Entry Clerk selects a role and enters the Start Date (required) and optionally the End Date.

Step 4. The link person to organization role module 19324 creates a link between the person, the role, and the organization in the Licensing database 18804 as an instance of Organization People and a time period using the Start and End Dates.

This use case has a number of extensions:

If the Data Entry Clerk supplies only a Start Date, the link person to organization role module 19324 creates an Open-Ended Period using that date.

If the Data Entry Clerk supplies both a Start Date and an End Date, the link person to organization role module 19324 creates a Fixed Interval using those dates.

Print Entity

Figure 205:
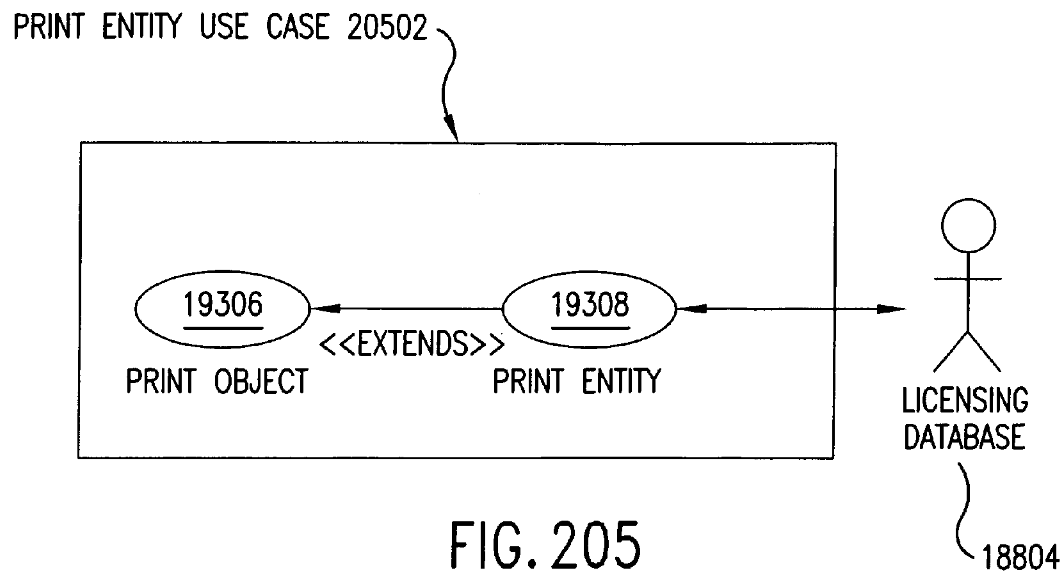

The print entity use case 20502 is diagramed in FIG. 205.

This use case extends the Print Object use case. The print entity module 19308 prints information on an Entity, including all information in the Licensing database 18804 about the entity, its relationships to other objects, and its contact information.

The operation of this use case is further described below:

Step 1. The Actor via the print entity module 19308 selects an Entity and selects a command to print it.

Step 2. The print entity module 19308 prints a formatted report with the Entity ID, Name, Description, and Named Entity Type (Organization or Person).

Step 3. The print entity module 19308 prints the contact information for the entity in priority order, printing the Priority, Description, and Contact Method Type for each method.

Step 4. The print entity module 19308 prints the Role Name and Know How Description for any Contributor relationship the Entity participates in.

Step 5. The print entity module 19308 prints the Role Name and Agreement Number and Name for any license agreement to which the Entity is a party.

This use case has a number of extensions.

If the Entity is an Organization, the print entity module 19308 prints the parent organization's Name and the Description of the Organizational Level of the organization.

If the Entity is a Person, the print entity module 19308 prints the Organizations to which the Person belongs in order by time period.

If the Contact Method is a Telephone, the print entity module 19308 prints the number in the format "+<Country Telephone Code > <Area Code> <Telephone Number>x<Extension>." If Is Fax is true, the print entity module 19308 adds "(facsimile)" to the string.

If the Contact Method is an Address, the print entity module 19308 prints the address in the format "<Address 1>, <Address 2>, <City>, <State or Province>, <Country Abbreviation>, <Postal Code>".

If the Contact Method is an Email, the print entity module 19308 prints the address in the format "<Address>@<Domain>".

Remove Entity

Figure 297:
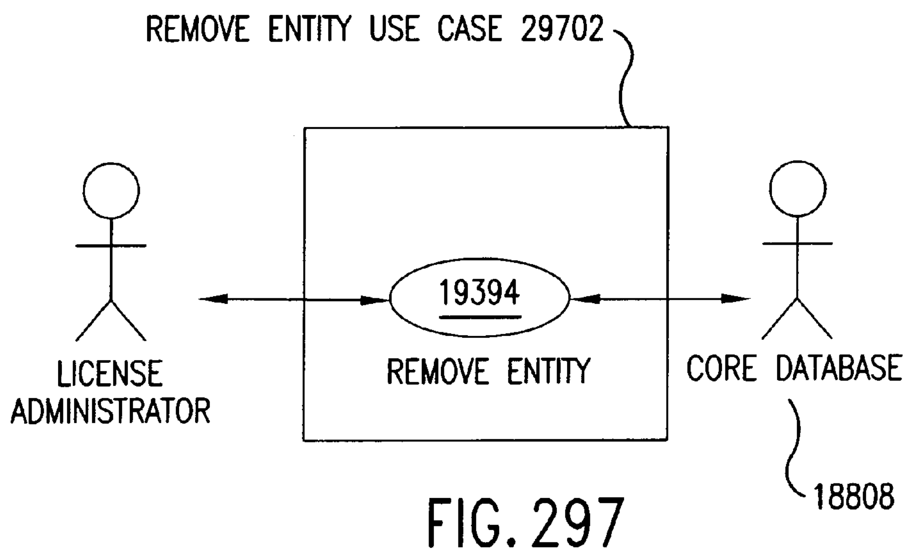

The remove entity use case 29702 is diagramed in FIG. 297. According to this use case, the Licensing system Administrator selects an entity and removes it from the Licensing database 18804. Preferably, an entity can be removed only if it does not participate as a party to a license agreement or as a contributor to a know-how asset. In removing an entity, a number of different objects are also removed:

The entity's contact methods

Organization or person corresponding to the entity

Links from the entity to an organization/role combination

Name fragments associated with the person

The operation of this use case is further described below.

Step 1. The License Administrator begins the transaction.

Step 2. The Remove entity module 19394 displays a list of existing entities ordered by name, displaying the name and entity type.

Step 3. The License Administrator selects an entity and removes it. This is allowed only if the entity is not associated with a license (no rows in the Party table for this entity) or has no payments (no rows in the Payment table with Payor_ID=OID) The License Administrator can select and remove multiple entities at once or in sequence. At the end of the process, the License Administrator commits the transaction.

Step 4. The Remove entity module 19394 deletes the entity, removing also the corresponding subclass (Person or Organization), links to Organization for people, name fragments, and contact methods.

Step 5. The Remove entity module 19394 confirms the commit to the License Administrator.

This use case has a number of extensions:

If there are any payments linked to the entity, the Remove entity module 19394 disallows removal and reports the error message "<Name> has one or more payments in the remove entity module 19394, so you cannot remove it." The <Name> is the name of the entity.

If there are any licenses linked to the entity, the Remove entity module 19394 disallows removal and reports the error message "<Name> has one or more license agreements in the remove entity module 19394, so you cannot remove it." The <Name> is the name of the entity.

If the License Administrator presses F1 or the equivalent, the application extends the use case with the Display Context-Sensitive Help use case.

Query Entities

Figure 330:
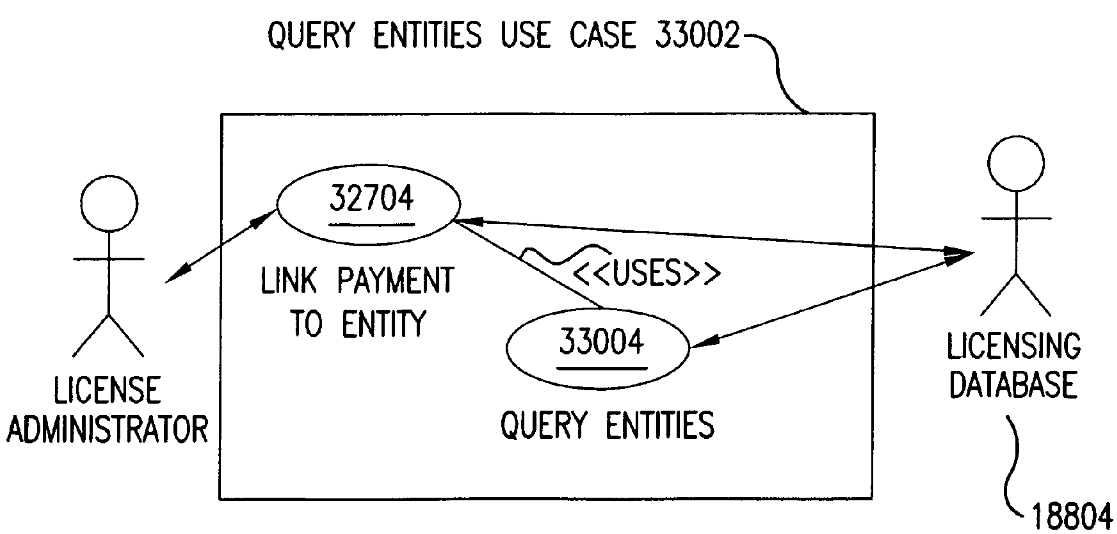

The query entities use case 33002 is diagramed in FIG. 330. This use case is used by the Link Payment to Entity use case to supply an entity to that use case for linking to a license payment. The License Administrator (and potentially any User) queries a named entity from the Licensing Database 18804 based on any of the structured fields of the entity (name, description, and entity type). The query entities module 33004 displays the name, description, and entity type of the named entities that match the query conditions and allows the License Administrator to select some for further processing in a using use case. The operation of this use case is further described below.

Step 1. The query entities module 33004 displays a query form with the name, description, and entity type fields available for specifying a query.

Step 2. The License Administrator enters the search criteria.

Step 3. The query entities module 33004 queries all the entities that meet the query criteria from the Licensing Database 18804. The query entities module 33004 displays the entities, showing the name, description, and type.

Step 4. The License Administrator selects one or more entities for use in the using use case.

Asset Use Cases

An asset is an intellectual property document (for example, patent, copyright, trademark, trade secret, etc.) or an intellectual asset (for example, know how). According to the invention, assets are combined into asset packages, which may be standard (lists of assets), group (reference to an IPAM group, for example, described above), or descriptive (a text describing the assets with language from the license agreement).

Preferably, a group as described above (sometimes herein refer to as an IPAM group) differs from an asset package. When the licensing system 18702 is integrated with the IPAM server 314, it is possible to create a type of an asset package (the IPAM group type) that links to a group and that acquires all of the documents associated with that group. In an embodiment, changes to the contents of the group automatically affect the asset package (in other embodiments, changes to the contents of the group do not automatically affect the asset package). The asset package is said to be linked (where the link is said to be "active") or associated with the group. But the asset package itself is a separate object from that group.

Linking the package to a license agreement preferably means that the license licenses all of the assets in the package to the licensee, unless the license agreement indicates otherwise.

An asset view 20602 is displayed when the asset packages icon 19016 is pressed (FIG. 206). The Asset View 20602 contains two panes. The first pane, called the asset packages pane 20604, displays a spreadsheet of asset packages, and the second pane, called the assets pane 20606, displays the assets in the asset package selected in the asset packages pane 20604.

Selecting an asset package in the asset packages pane 20604 displays the assets in that package in the assets pane 20606. Double-clicking on an asset package in the asset packages pane 20604 displays the asset package modification dialog, while double-clicking on the asset in the asset pane 20606 displays the asset modification dialog. You can enter a new package or asset by double-clicking on an empty record or clicking on the New button. If no package is selected, you create the new asset independently of any package; otherwise, you create the asset in the selected package.

Clicking on a Find tool displays the Find Asset dialog (FIGS. 240A and 241, for example), which lets you enter search conditions to search for an asset. The find tool may be accessed in a number of ways, such as from the tool bar or via the menu (see FIG. 243). Entering search conditions into this dialog and clicking on Find Now displays the matching assets in the extended dialog. See FIGS. 240B and 242. You can then double-click on the asset to display the modification dialog with all the details of the asset, or you can drag-and-drop or copy-and-paste the assets into a selected asset package.

Enter Patent

Figure 207:
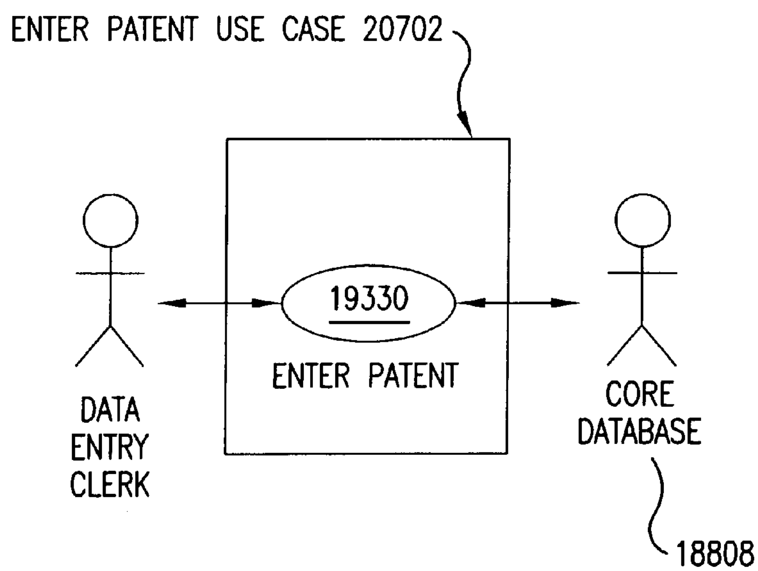

The enter patent use case 20702 is diagramed in FIG. 207.

The enter patent use case 20702 enables a Data Entry Clerk to enter information for a patent (U.S. or foreign) asset. The patent can be packaged alone or with other assets into asset packages that can be licensed.

The operation of the enter patent use case 20702 is further described below:

Step 1. The Data Entry Clerk starts a transaction to enter a new patent asset by issuing an appropriate command. This can be done, for example, by selecting New, Patent from the menu bar 19006 (FIG. 208).

Step 2. The enter patent module 19330 displays a data entry form called an enter new patent dialog 20902 (FIG. 209) for input and generates an object identifier for the new asset. The enter new patent dialog 20902 has two tabs, a general tab 20904 and a optional tab 20906.

Step 3. The Data Entry Clerk chooses from a list of publishing organizations and document kinds. For example, the Data Entry Clerk can press a down arrow key 20908 (FIG. 209) to view a list of available publishing organizations 21002 (FIG. 210). The Data Entry Clerk can press another down arrow key 20912 to view and choose from a list of different types of documents, such as utility patent, design patent, plant patent, SIR, provisional application, patent application, etc.

Step 4. The Data Entry Clerk enters data into the following fields in any order: DocumentNumber, Long Display Name, Patent Type, and Filing Date. Optionally, the user can enter the following fields in any order: Description, Title, Filing Date, Issue Date, and Publication Date. See FIGS. 209 and 211. The Data Entry Clerk sets the Security Class from a list of available security classes with Write privilege for the user.

Step 5. The Data Entry Clerk commits the transaction by pressing a save button 20910 (FIG. 209).

Step 6. The enter patent module 19330 creates an IP Document, a Document, and an object of the appropriate subclass for the patent type in the Core Database 18808. The enter patent module 19330 marks the Document as an IP Document.

This use case has a number of extensions:

If the Data Entry Clerk presses F1 or the equivalent, the application extends the use case with the Display Help use case.

If the IPAM Server 314 and IPAM database 316 are available, the Licensing System 18702 disallows entry of patent information via the enter patent module 19330. Essentially, the enter patent module 19330 cannot be accessed when the IPAM Server 314 and IPAM database 316 are available. Instead, all patent information is obtained from the IPAM Server 314 and IPAM database 316.

Enter Trademark

Figure 212:
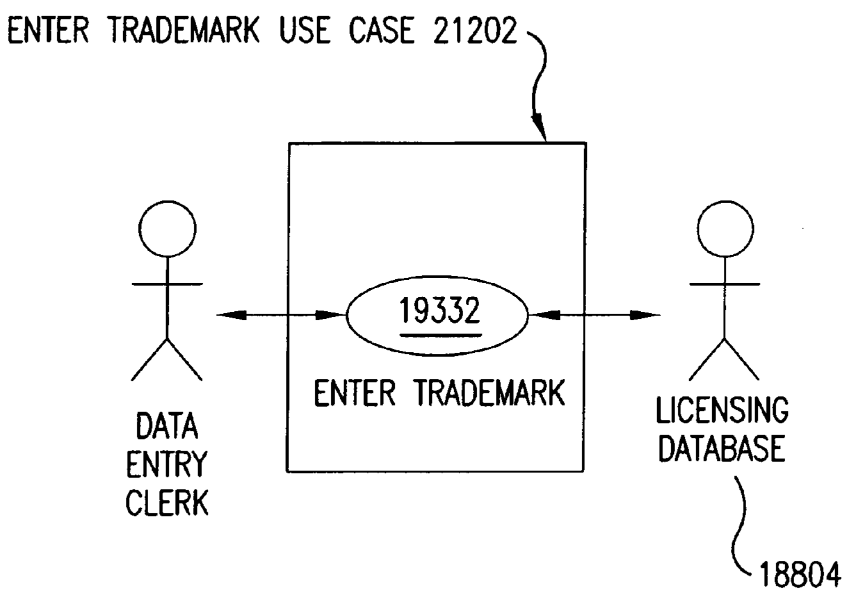
Figure 213:
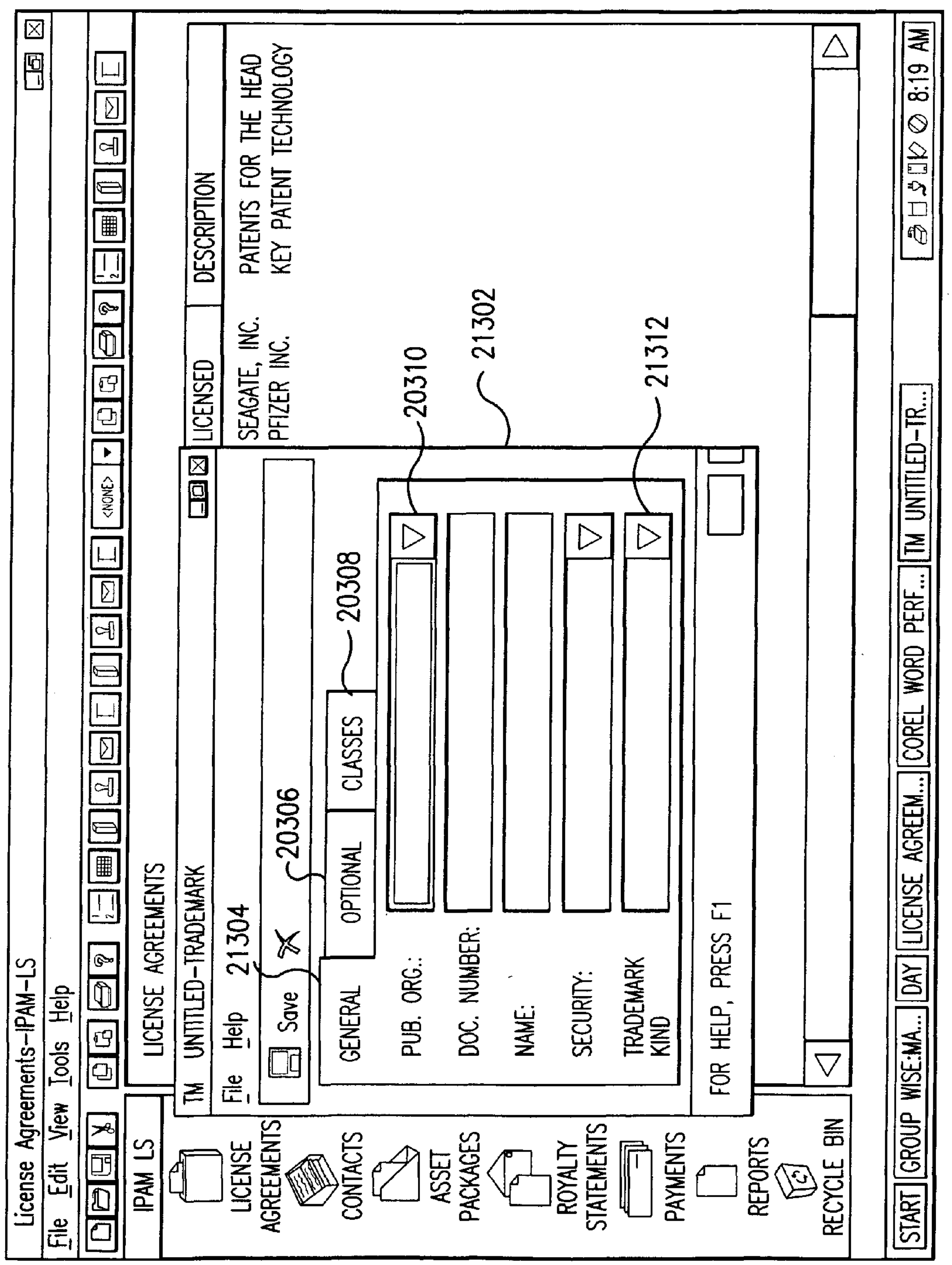
Figure 214:
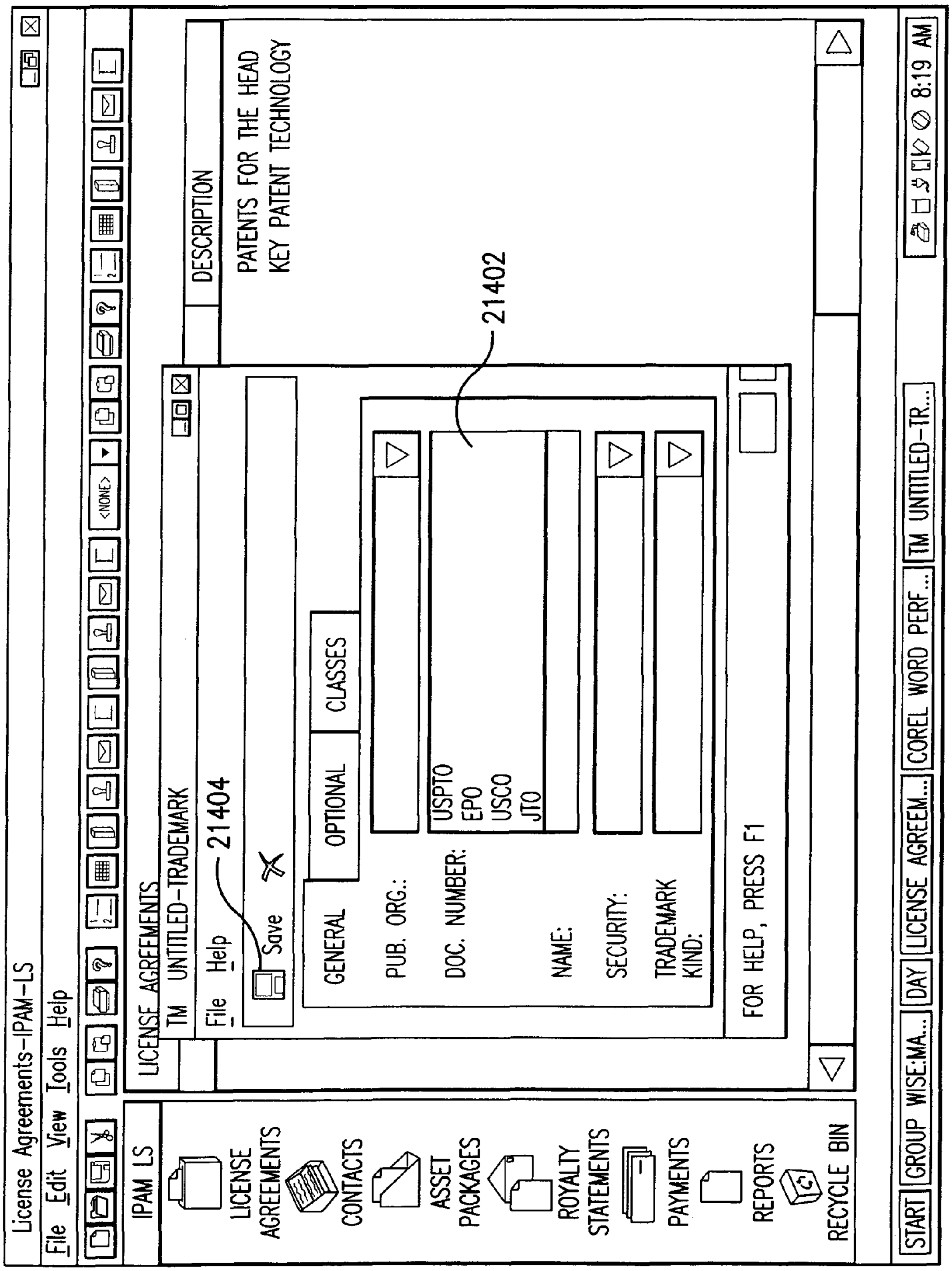
Figure 215:
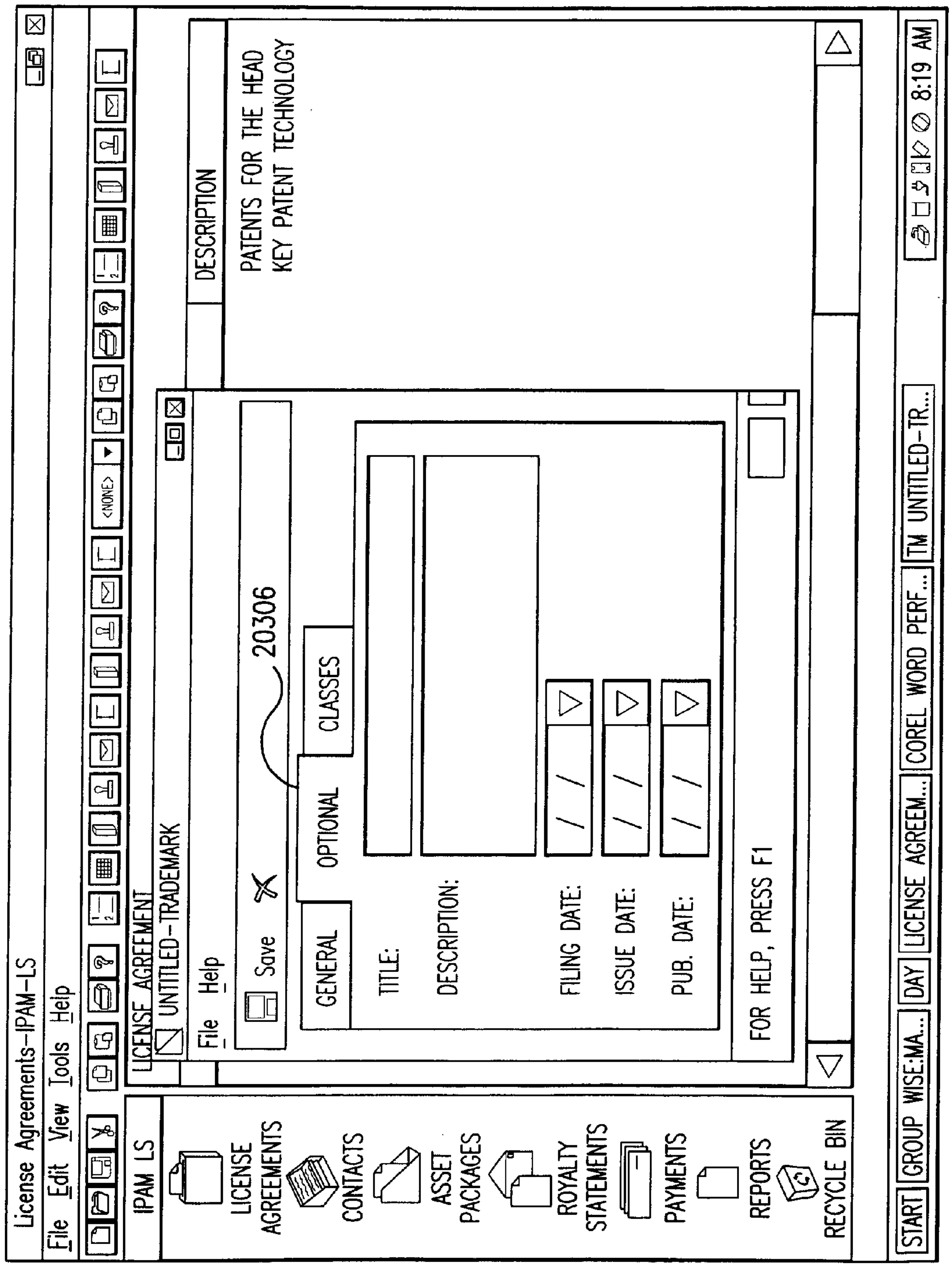
Figure 216:
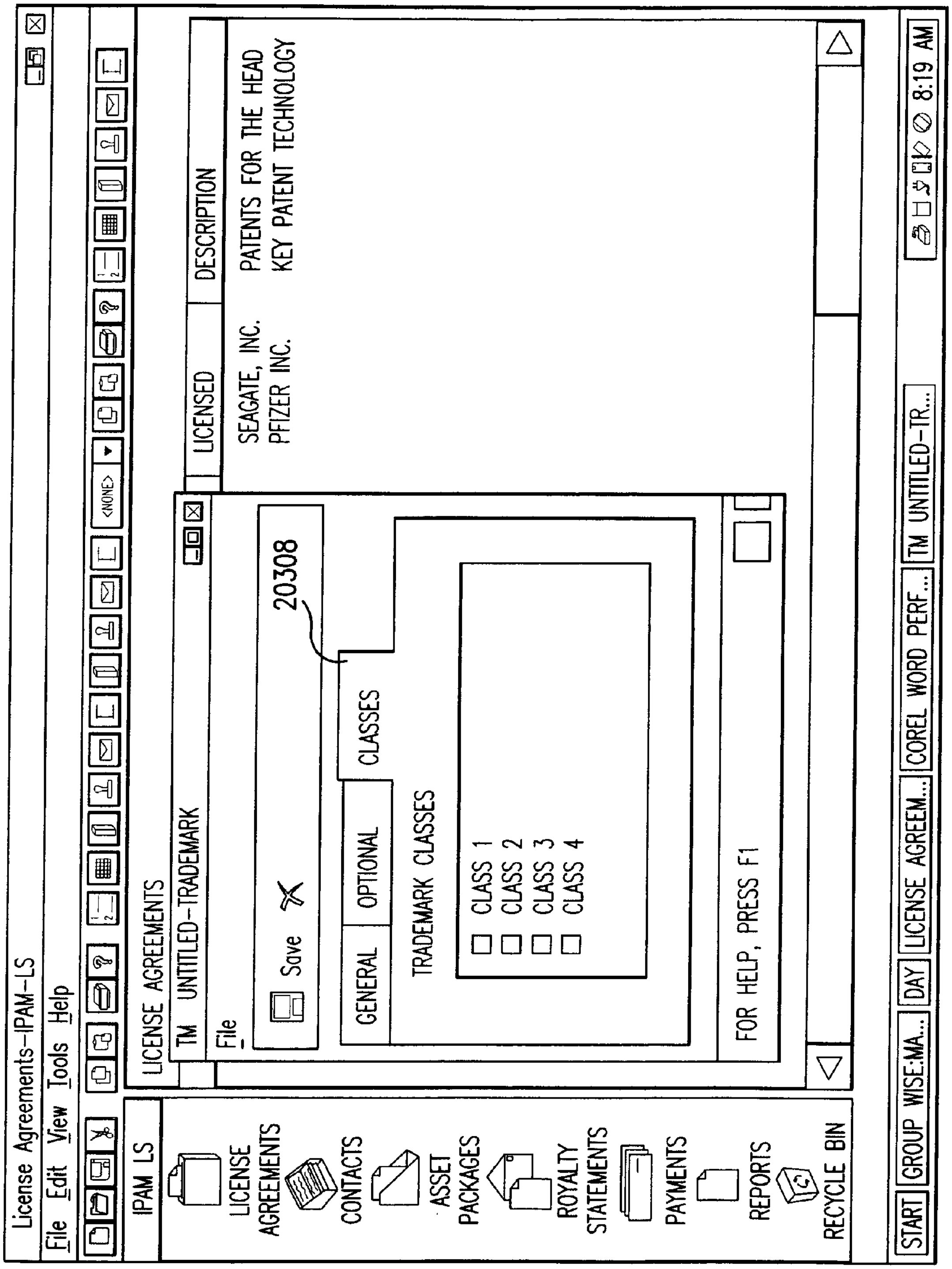

The enter trademark use case 21202 is diagramed in FIG. 212.

The Data Entry Clerk enters information for a trademark asset, including the trademark classes and the kind of trademark (US Federal, State, WIPO, etc.).

The operation of the enter trademark use case 21202 is further described below.

Step 1. The Data Entry Clerk starts a transaction to enter a new trademark asset. This can be done in a number of ways, such as by selecting New, Trademark from the menu bar 19006 (FIG. 208).

Step 2. The enter trademark module 19332 displays a data entry form 21302 (FIG. 213) for input of trademark information and generates an object identifier for the new asset. The data entry form 21302 has a general tab 21304, an optional tab 20306, and a classes tab 20308.

Step 3. The Data Entry Clerk chooses from a list 21402 of publishing organizations (FIG. 214) and document/trademark kinds (by pressing a down arrow key 21312 to display a list of document/trademark kinds, where such document/trademark kinds are any known types).

Step 4. The Data Entry Clerk enters data into the following fields in any order: Doc Kind, Document Number, Long Display Name, and Filing Date. Optionally, the user can enter the following fields in any order: Description, Title, Filing Date, Issue Date, and Publication Date. The Data Entry Clerk enters a set of Trademark Classes from a list of classes. The Data Entry Clerk sets the Security Class from a list of available security classes with Write privilege for the user. See FIGS. 213-216.

Step 5. The Data Entry Clerk commits the transaction by pressing a save button 21404.

Step 6. The enter trademark module 19332 creates an IP Document, a Document, an object of class Trademark, and an association object relating the trademark to a series of Trademark Classes in the Licensing Database 18804. The enter trademark module 19332 marks the Document as an IP Document.

At any time, if the Data Entry Clerk presses F1 or the equivalent, the application extends the use case with the Display Help use case.

Enter Copyright

Figure 217:
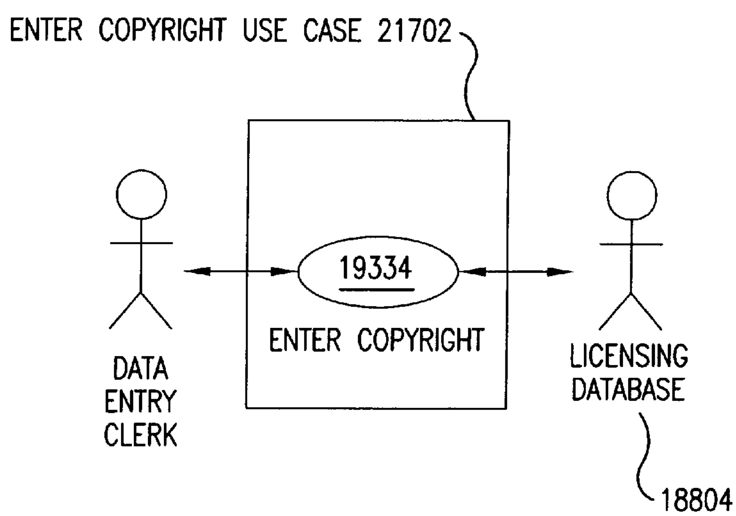

The enter copyright use case 21702 is diagramed in FIG. 217. In this use case, the Data Entry Clerk enters basic information for a copyright asset.

The operation of the enter copyright use case 21702 is further described below:

Step 1. The Data Entry Clerk starts a transaction to enter a new copyright asset. This can be done in a number of ways, such as by selecting New, Copyright from the menu bar 19006 (FIG. 208).

Step 2. The enter copyright module 19334 displays a data entry form 21802 (FIG. 218) for input and generates an object identifier for the new asset. The data entry form 21802 has a general tab 21806 and an optional tab 21808.

Step 3. The Data Entry Clerk chooses from a list of publishing organizations and document kinds. See, for example, FIG. 219.

Step 4. The Data Entry Clerk enters data into the following fields in any order: Document Number, Long Display Name, and Filing Date. Optionally, the user can enter the following fields in any order: Description, Title, Filing Date, Issue Date, and Publication Date. The Data Entry Clerk sets the Security Class from a list of available security classes with Write privilege for the user. See FIGS. 218-220.

Step 5. The Data Entry Clerk commits the transaction by pressing a save button 21804.

Step 6. The enter copyright module 19334 creates an IP Document, a Document, and an object of class Copyright in the Licensing Database 18804. The enter copyright module 19334 marks the Document as an IP Document.

At any time, if the Data Entry Clerk presses F1 or the equivalent, the application extends the use case with the Display Help use case.

Enter Trade Secret

Figure 221:
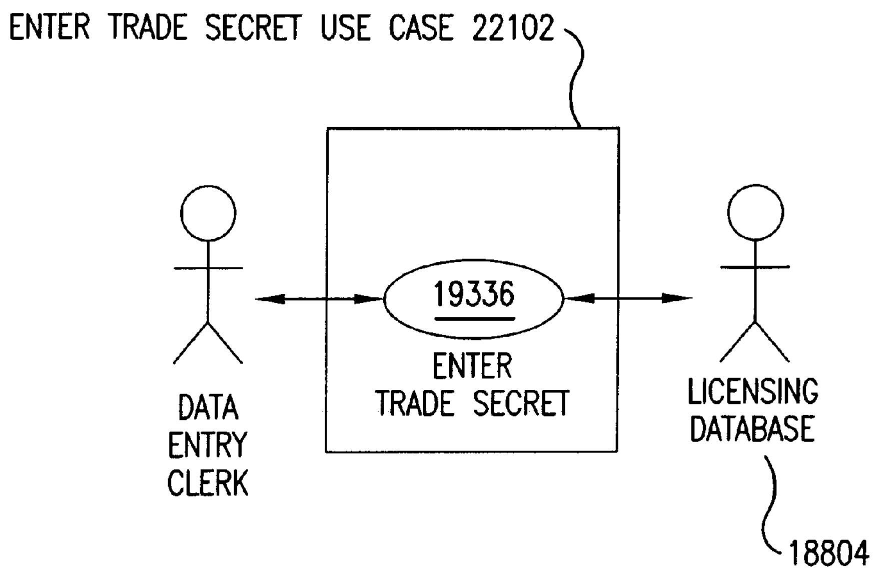

The enter trade secret use case 22102 is diagramed in FIG. 221. According to this use case, the Data Entry Clerk enters information for a Trade Secret asset.

The operation of the enter trade secret use case 22102 is further described below:

Step 1. The Data Entry Clerk starts a transaction to enter a new trade secret asset using any procedure described herein.

Step 2. The enter trade secret module 19336 displays a data entry form for input and generates an object identifier for the new asset.

Step 3. The Data Entry Clerk chooses from a list of publishing organizations and document kinds.

Step 4. The Data Entry Clerk enters data into the following fields in any order: Document Number, Long Display Name, and Filing Date. Optionally, the user can enter the following fields in any order: Description, Title, Filing Date, Issue Date, and Publication Date. The Data Entry Clerk sets the Security Class from a list of available security classes with Write privilege for the user.

Step 5. The Data Entry Clerk commits the transaction.

Step 6. The enter trade secret module 19336 creates an IP Document, a Document, and an object of class Trade Secret in the Licensing Database 18804. The enter trade secret module 19336 marks the Document as a type of know how.

As always, at any time, if the Data Entry Clerk presses F1 or the equivalent, the application extends the use case with the Display Context-Sensitive Help use case.

Enter Know How

Figure 222:
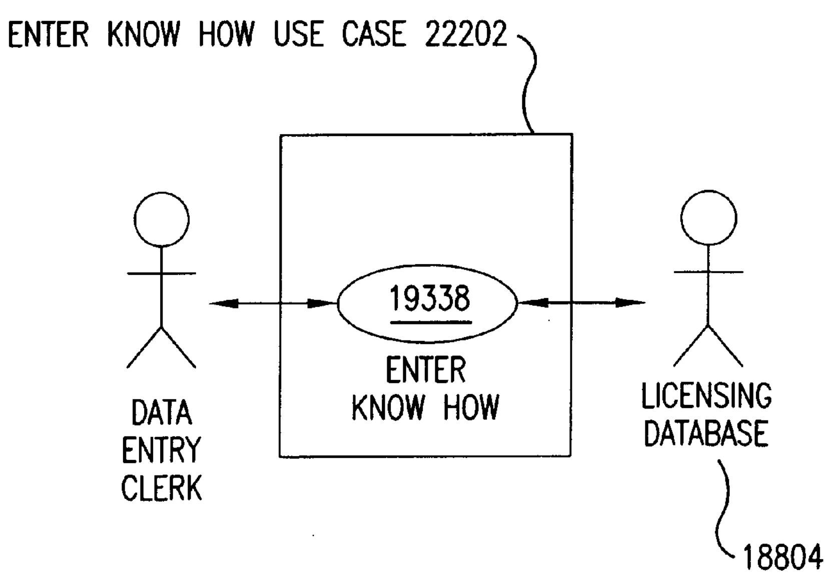

The enter know how use case 22202 is diagramed in FIG. 222. In this use case, the Data Entry Clerk enters information for a Know-How asset into the Licensing Database 18804.

The operation of this use case is further described below:

Step 1. The Data Entry Clerk starts a transaction to enter a new know how asset. This can be done in a number of ways, such as by selecting New, Know How from the menu bar 19006 (FIG. 208).

Step 2. The enter know how module 19338 displays a data entry form 22302 (FIG. 223) for input and generates an object identifier for the new asset.

Step 3. The Data Entry Clerk enters various items:

Step 3.1. The Data Entry Clerk sets the Description of the know how by entering text. The Data Entry Clerk can also link this asset to one or more other objects (such as documents, figures, software programs, etc.) that represent or illustrate the know how asset.

Step 3.2. The Data Entry Clerk chooses from a list of intellectual asset kinds. This list can include any standard or use defined terms describing intellectual asset kinds, and could be based on technology area, market area, industrial area, corporate organization level, etc.

Step 3.3. The Data Entry Clerk sets the Security Class from a list of available security classes with Write privilege for the user. The security class indicates the users who have access to this record.

Step 4. The Data Entry Clerk commits the transaction.

Step 5. The enter know how module 19338 creates a Document and an object of class Know How in the Licensing Database 18804. The enter know how module 19338 marks the Document as a Know How.

At any time, if the Data Entry Clerk presses F1 or the equivalent, the application extends the use case with the Display Help use case.

Modify IP Asset

Figure 224:
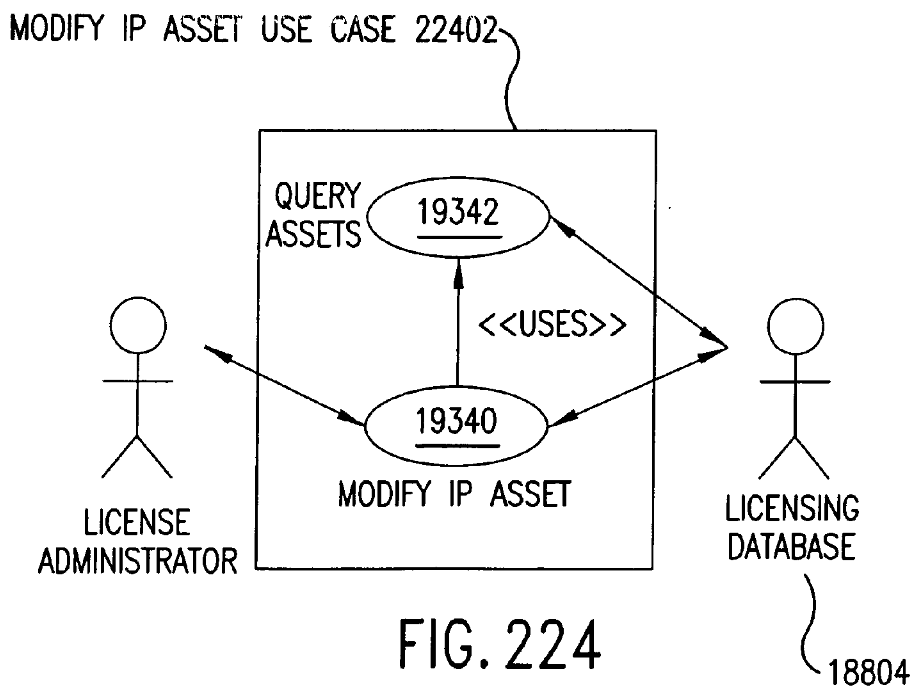

The modify IP asset use case 22402 is diagramed in FIG. 224. According to this use case, the License Administrator queries an IP asset and modifies it. The operation of this use case is further described below.

Step 1. The License Administrator begins the transaction to modify an IP asset using any of the techniques described herein.

Step 2. The modify IP asset module 19340 uses the Query Assets module 19342 to display a set of assets and to allow the License Administrator to select one for modification.

Step 3. If the License Administrator has Write permission on the selected asset, the IP asset module 19340 displays a form containing, for example, these fields for the asset document: Document Number, Title, Long Display Name, Issue Date, Filing Date, Publication Date, Description, Asset Type ("Disc Switch"), Publishing Organization (Description from Pub Organization class), and Doc Kind (Description from IP Doc Kind class).

Step 4. The License Administrator modifies any of the fields in any order and signals the end of the transaction.

Step 5. The IP asset module 19340 writes the changes to the licensing database 18804 or the core database 18808 and confirms the commit to the License Administrator.

There are a number of extensions of this use case:

If the asset is a patent from the IPAM Database 316, the user cannot modify any of the asset details.

If the asset is a patent (JPO_PATENT, EPO_PATENT, PCT, or PTO_PATENT classes), the extended fields include Assignee, Class, International Class, and Inventor.

If the asset is a Trademark, the extended fields include Trademark Class Display Name and Description.

If the asset is a Know How, the extended fields include the IA Kind Description and the Know Description.

If the License Administrator presses F1 or the equivalent, the application extends the use case with the Display Help use case.

Asset Package Use Cases

An asset package includes one or more IP assets. Use cases related to asset packages are described below.

Create IP Asset Package

Figure 225:
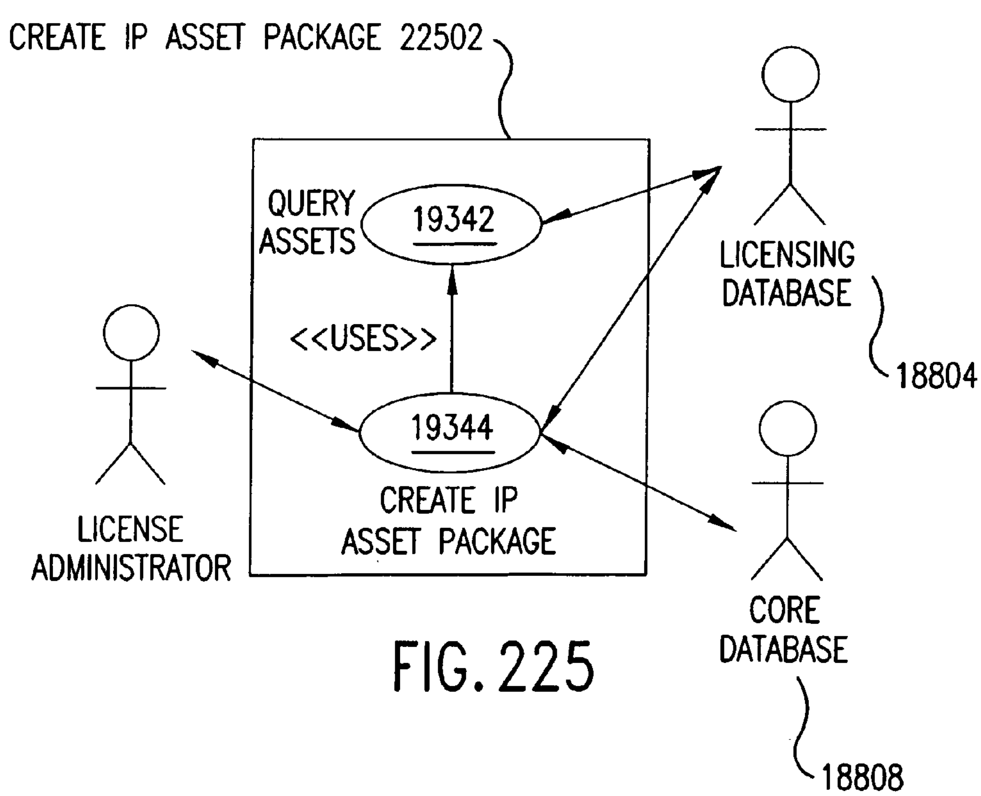

The create IP asset package use case 22502 is diagramed in FIG. 225. According to this use case, the License Administrator creates a named package of intellectual property (IP) assets in the Licensing Database 18804. All or part of this asset package (possibly along with one or more other asset packages) may then be licensed via a license agreement. An asset package can be generated in a number of ways: by querying the assets from the Licensing Database 18804, by querying a group from the Core Database 18808, or by entering a textual definition of the assets. The operation of this use case is further described below.

Step 1. The License Administrator begins the transaction to create a new IP asset package. This can be done in a number of ways, such as by selecting New, Asset Package from the menu bar 19006 (FIG. 208).

Figure 226:
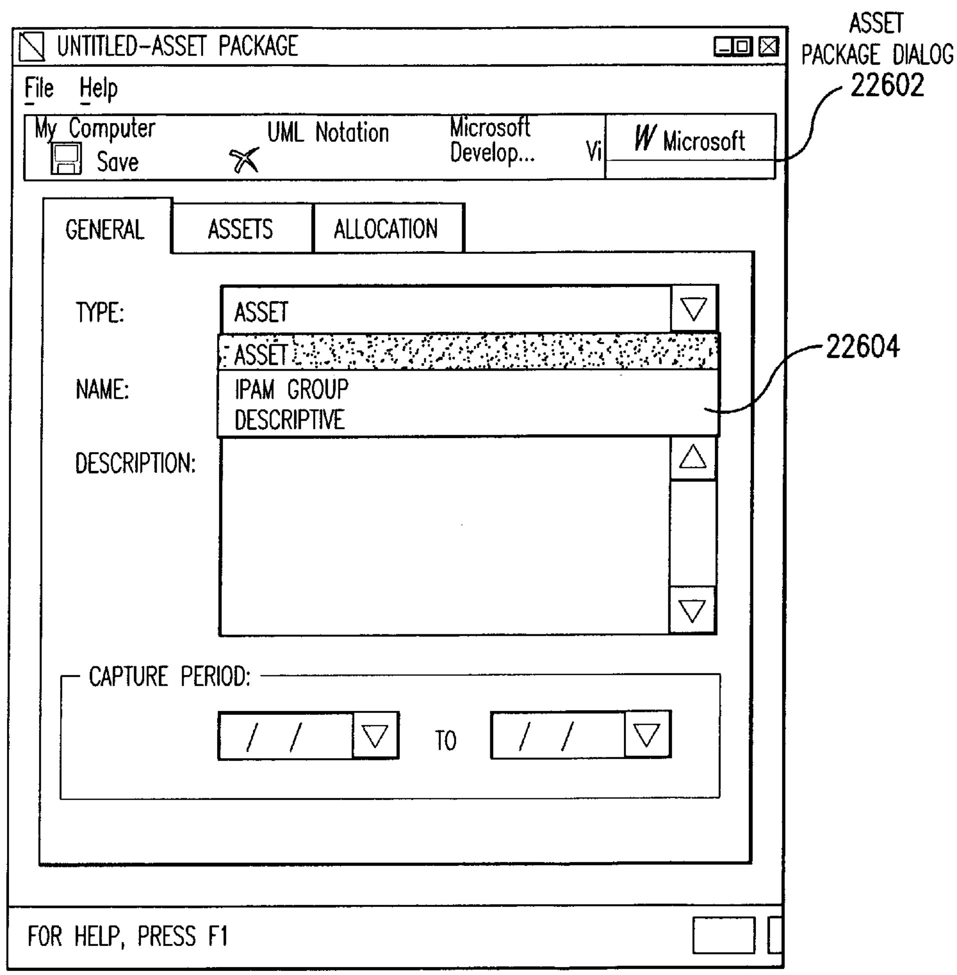

Step 2. The create IP asset package module 19344 displays an asset package dialog 22602 (FIG. 226). From a pull down list 22604, the License Administrator chooses the type of asset package to create (Asset/Standard, Group, or Descriptive Package Type). The Asset/Standard type is an asset package containing any combination of assets selected by the user. The Group type is an asset package containing the assets included in one or more pre-existing groups. The Descriptive Package type is an asset package whose assets are indicated by way of a description, such as a textual description, an audio description, a multimedia description (the files for those media types may be linked to this record).

Step 3. The create IP asset package module 19344 creates a new package with a new object identifier.

Step 4. The License Administrator enters a Name for the package. Optionally, and in any order, the License Administrator enters the Description and/or the capture period (Start and End timestamps). See FIG. 227.

Figure 227:
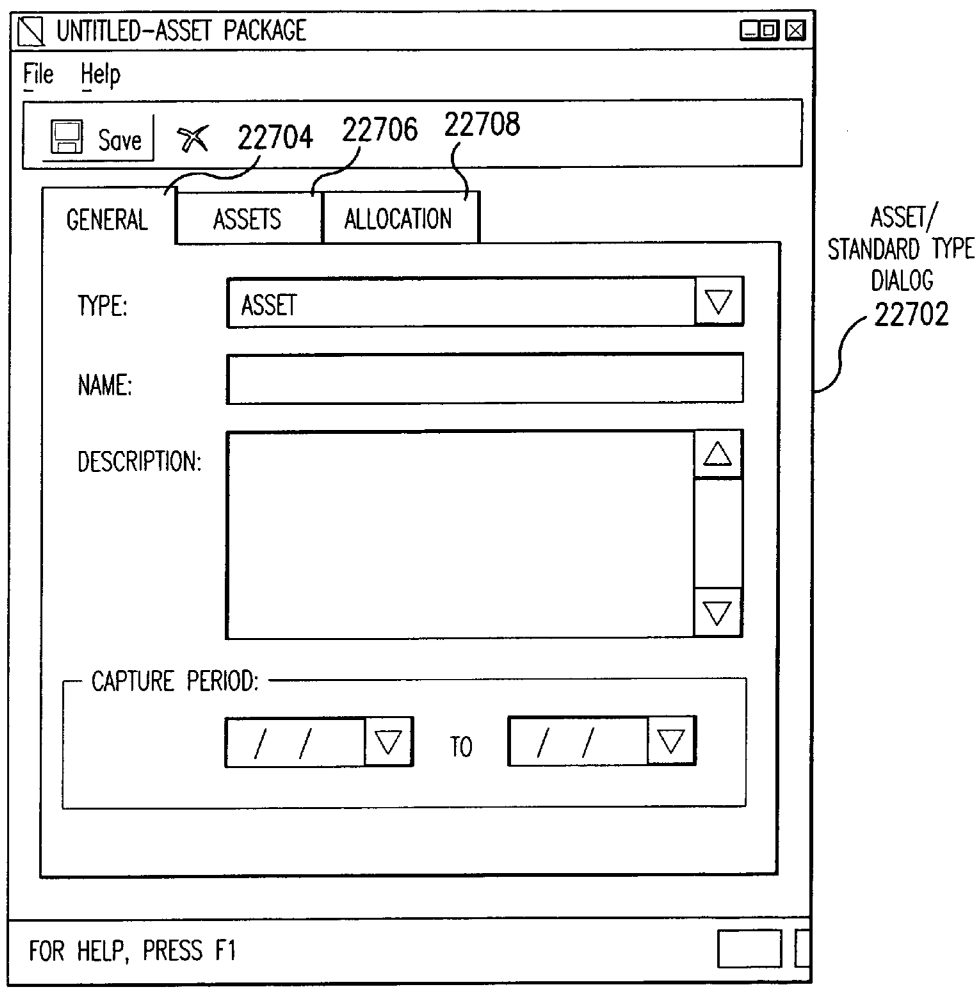
Figure 228:
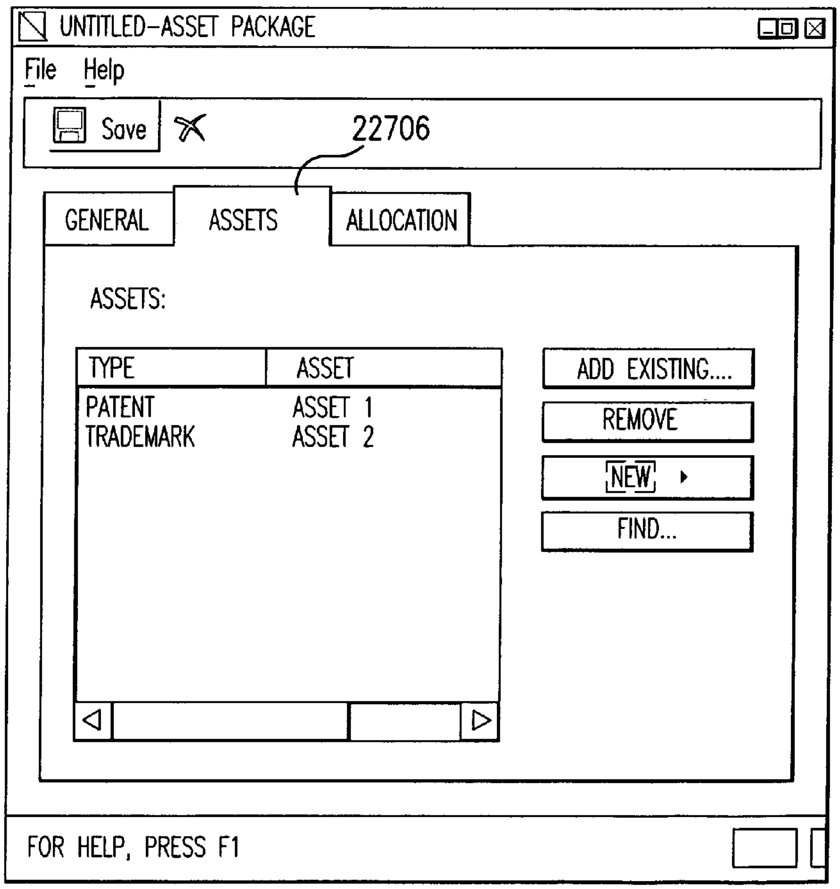

If the Asset/Standard type is selected, then an asset/standard type dialog 22702 is displayed (FIG. 227). The asset/standard type dialog 22702 has a general tab 22704, assets tab 22706, and allocation tab 22708. The License Administrator can use the Query Assets module 19342 to query a set of asset documents from the Licensing Database 18804 for the package. The create IP asset package module 19344 links these documents to the new package. The new assets are listed in the assets tab 22706 (FIG. 228).

Figure 229:
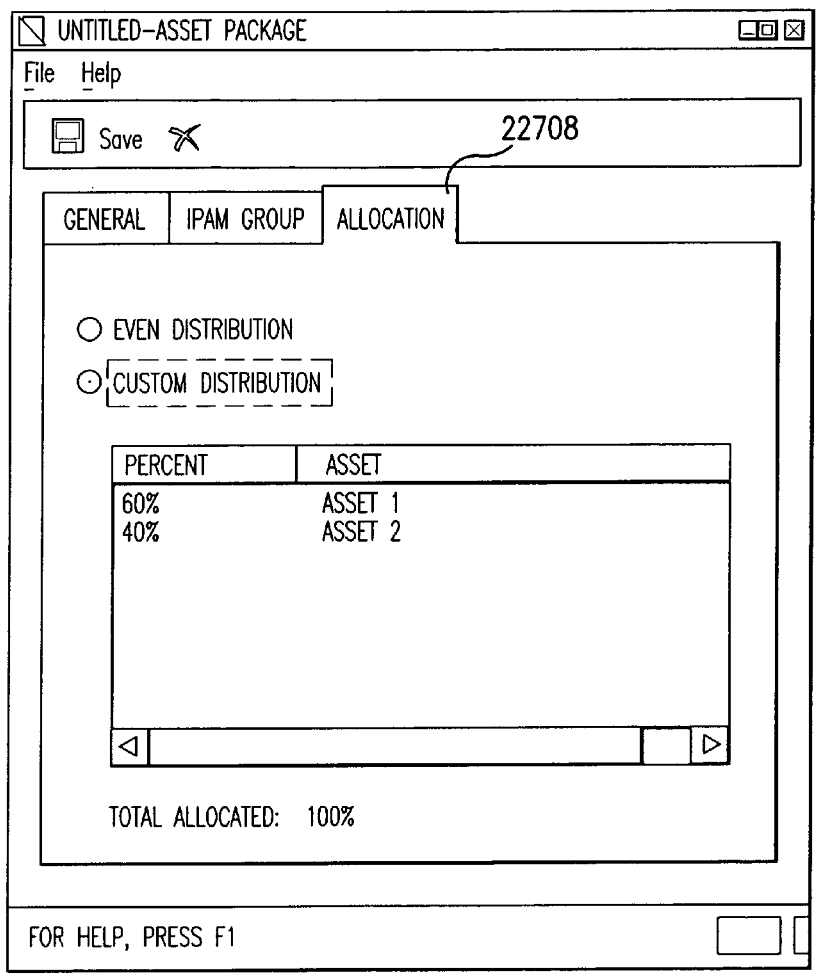
Figure 230:
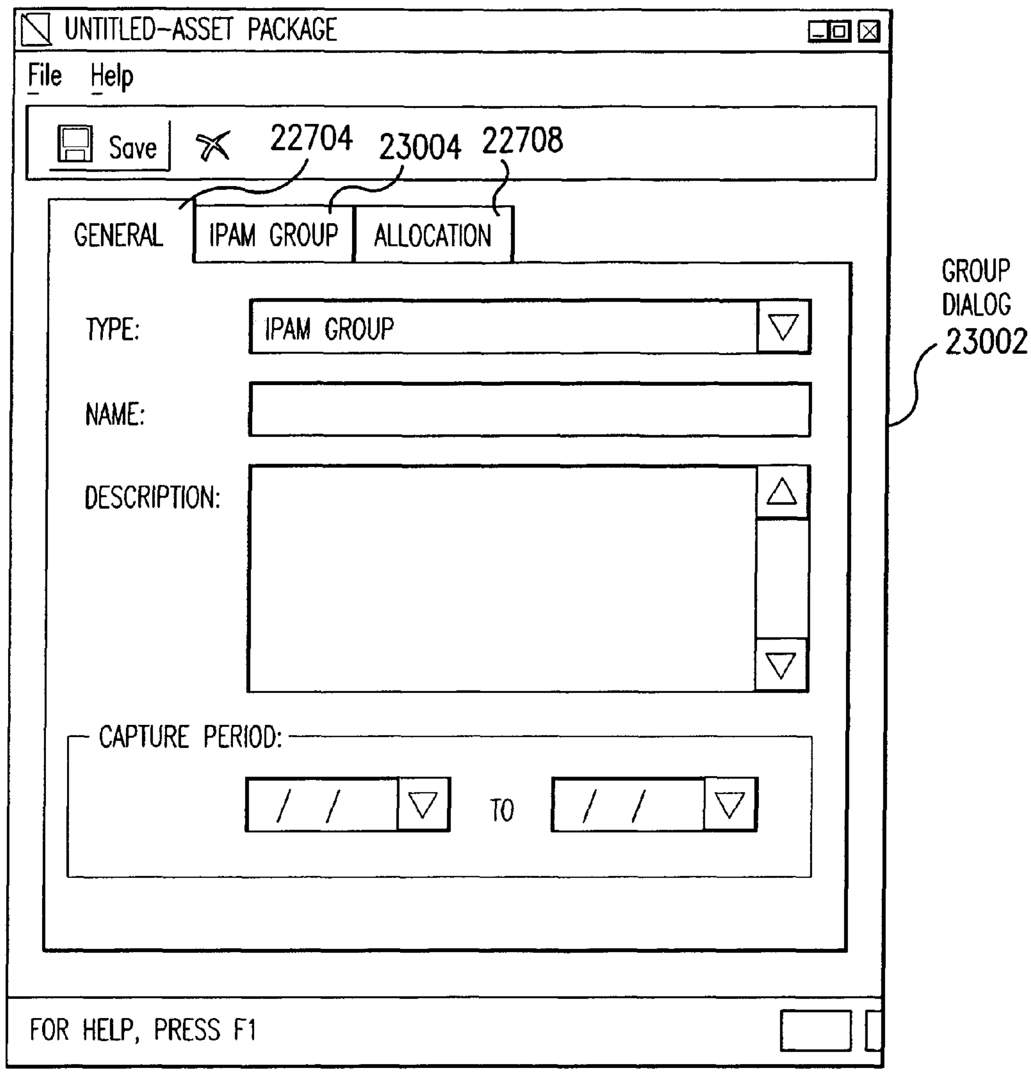

If the Package Type is Asset/Standard or Group, the License Administrator can choose to allocate the assets within the package. The create IP asset package module 19344 displays a list of the assets in the package, and the License Administrator enters an Allocation Percent for each asset. See FIG. 229. The License Administrator can select an even distribution or a custom distribution, where relative percentages are entered by the License Administrator. These allocations affect the manner in which license fees will be attributed to the assets in a package. For example, suppose an asset package includes an Asset1 having an allocation of 60%, and an Asset2 having an allocation of 40% (as shown in the example of FIG. 229). In this case, 60% of any license revenue attributed to this asset package will be considered to have been generated by Asset1, and 40% of any license revenue attributed to this asset package will be considered to have been generated by Asset2.

Figure 231:
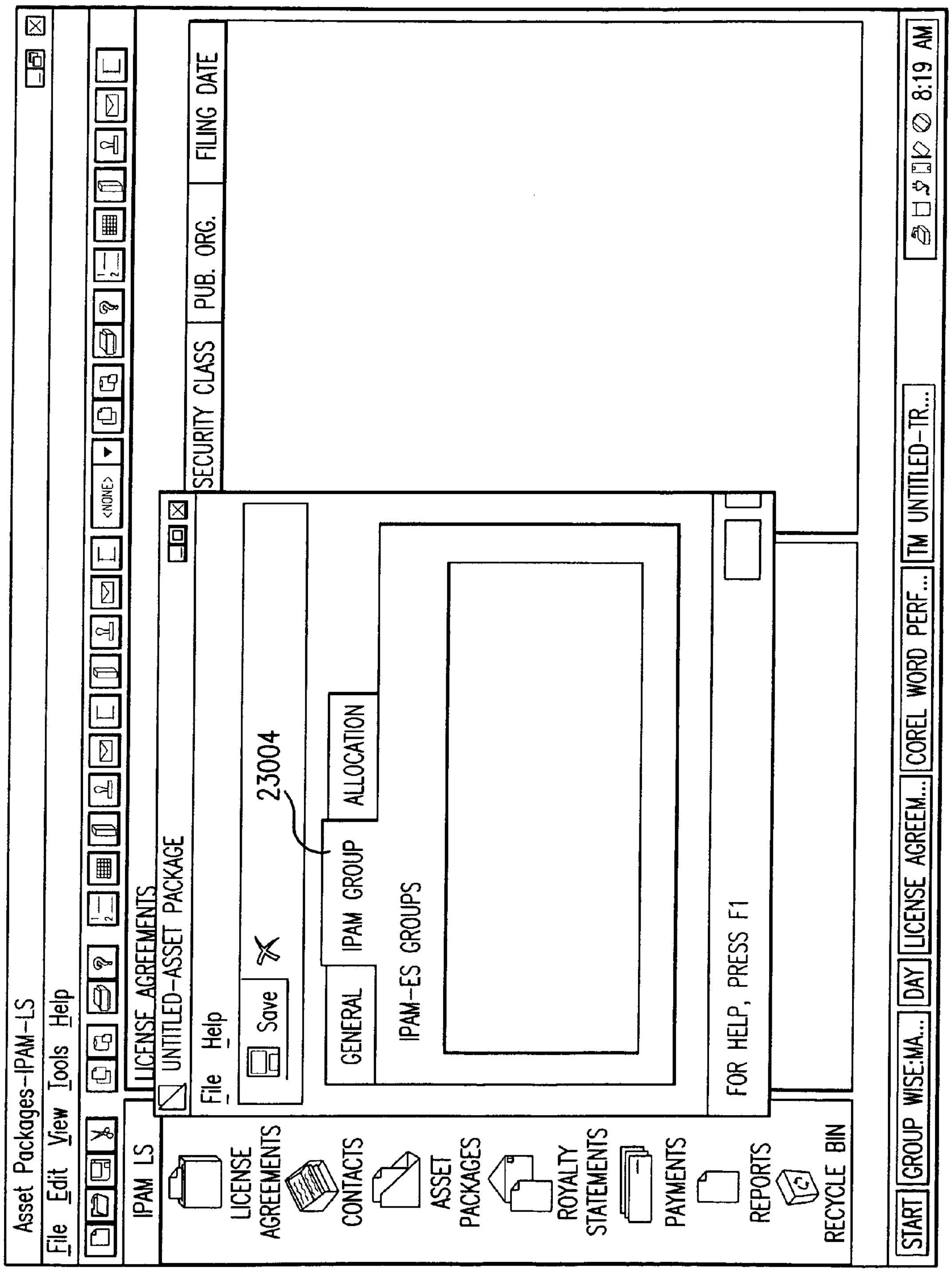
Figure 232:
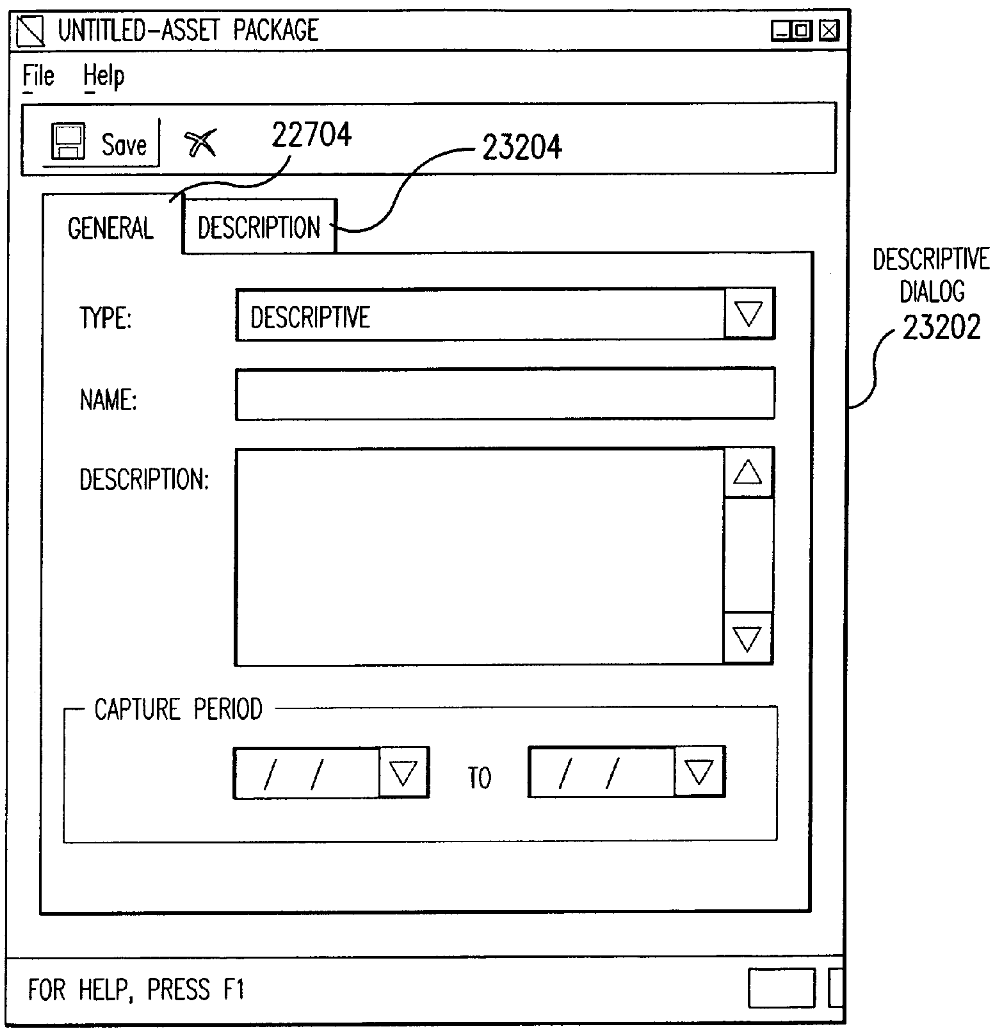
Figure 233:
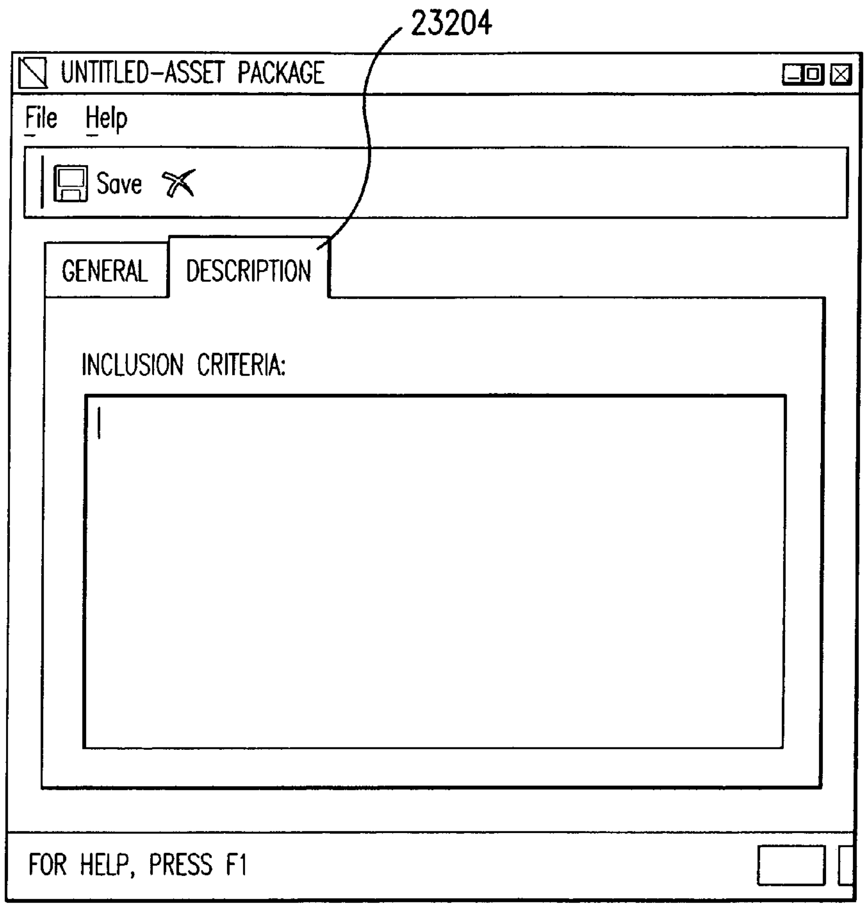

If the Group type is selected, a group dialog 23002 is displayed (FIG. 230) having a general tab 22704, a group tab 23004, and an allocation tab 22708. The create IP asset package module 19344 displays a list of group names from the Core Database 18808, preferably in alphabetical order. The License Administrator as a User must have the ability to read the groups in the list. The License Administrator selects one or more groups that hold the documents/assets that the package is to package. The create IP asset package module 19344 displays the group documents and links them to the package in the group tab 23004 (FIG. 231).

If the Descriptive type is selected, then a descriptive dialog 23202 is displayed (FIG. 232) having a general tab 22704 and a description tab 23204. The License Administrator enters text regarding Inclusion Criteria that describes the legal qualities of the assets, preferably in the language from the Licensing Agreement, in addition to the Standard behavior. See FIG. 233.

Step 5. The create IP asset package module 19344 writes the new asset package to the Licensing Database 18804, making the License Administrator user the owner of the package, then confirms the transaction commit to the License Administrator.

Modify IP Asset Package

Figure 234:
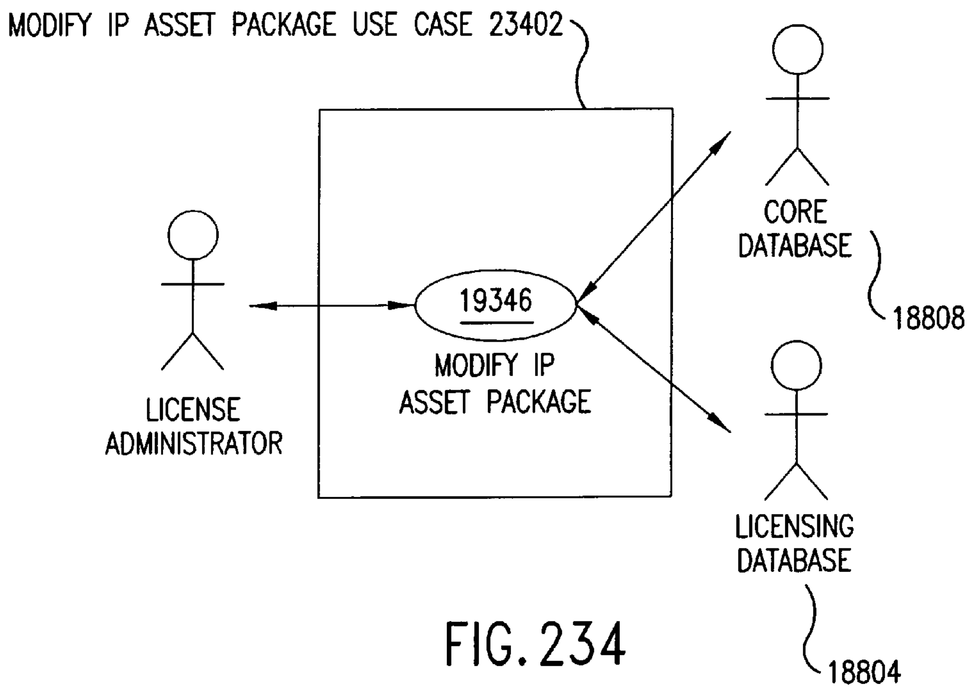
Figure 235:
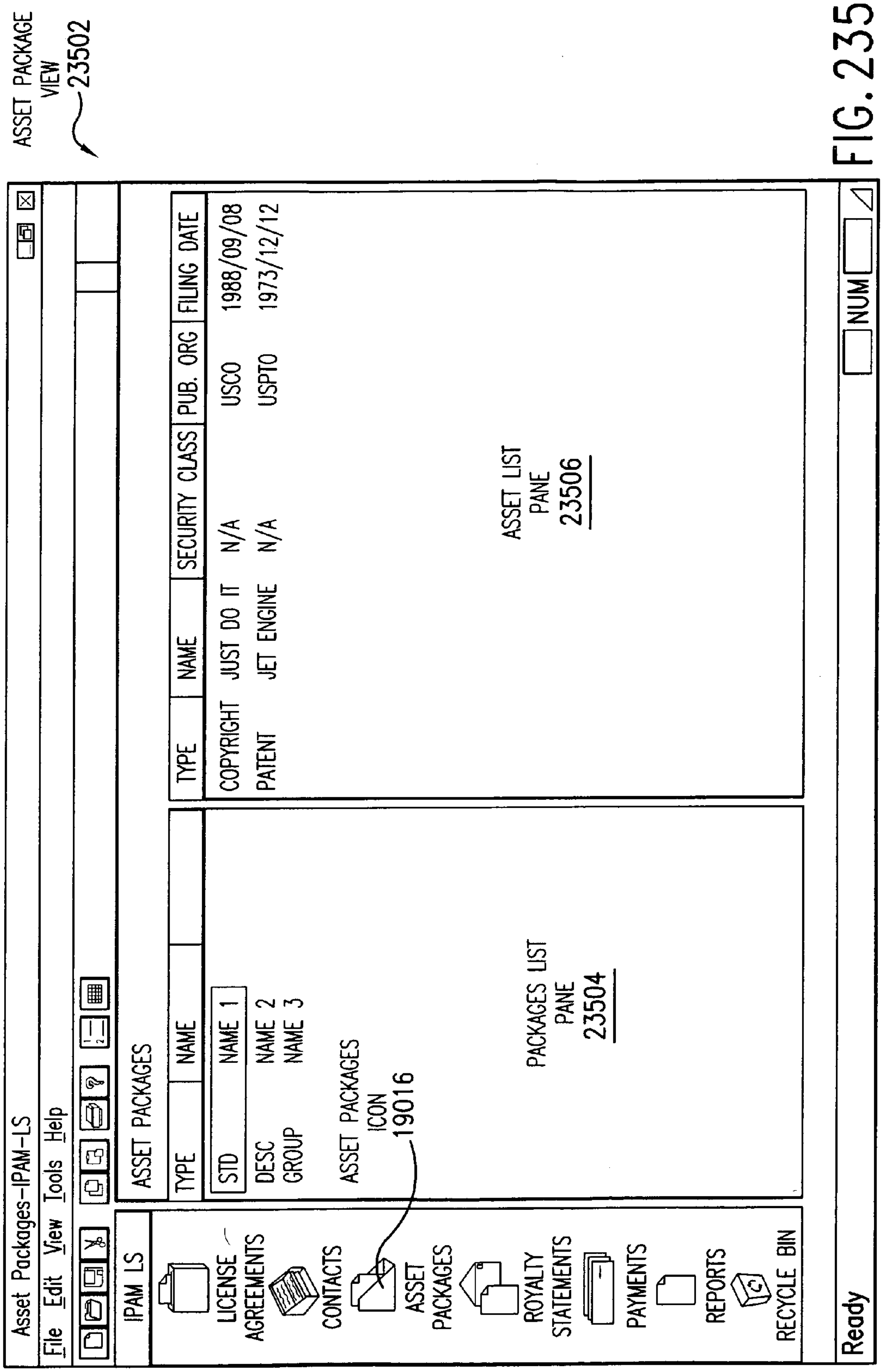

The modify IP asset package use case 23402 is diagramed in FIG. 234. According to this use case, the License Administrator selects an IP Asset Package from the Licensing Database 18804, then modifies the information about the package and/or its contents: the documents listed in a standard package, the group contained within a Group package, or the text contained within a Descriptive package. The operation of this use case is further described below.

Step 1. The License Administrator starts the transaction to edit an IP asset package. This can be done, for example, by selecting the asset packages icon 19016 to display an asset package view 23502. The asset package view 23502 has a package list pane 23504 where asset packages are listed, and an asset list pane 23506 where assets in a selected asset package (selected in the package list pane 23504) are listed.

Step 2. The modify IP asset package module 19346 displays the asset packages in the packages list pane 23504 by querying the Licensing Database 18804, preferably displaying the Name, Description, and/or Package Type preferably in alphabetical order by name. The modify IP asset package module 19346 displays only those packages for which the License Administrator has Read permission or ownership.

Step 3. The License Administrator selects a package in the packages list pane 23504.

Step 4. If the License Administrator has Write permission on the selected package or owns it, the modify IP asset package module 19346 displays a form showing all the fields of the package, including the object identifier, the Package Name, the Description, the capture period (Start and End date/time), and the Package Type. This is similar to the examples shown in FIGS. 226-233.

Step 5. The License Administrator changes the Name, Description, Capture Period, Package Type, or other information in any order, then ends the transaction.

Step 6. The modify IP asset package module 19346 updates the Licensing Database 18804 with the changes and confirms the commit to the License Administrator.

This use case has a number of extensions:

- If the License Administrator changes Package Type, the modify IP asset package module 19346 uses the same logic as in the Create IP Asset Package use case 22502 to create a new subclass for the package with the appropriate contents. The modify IP asset package module 19346 removes any asset allocation percents. The modify IP asset package module 19346 can undo the change until the License Administrator ends the transaction.
- If the Package is a Standard package, the modify IP asset package module 19346 displays a list of assets. The License Administrator can add or remove assets from the list. The License Administrator uses the Query Assets use case to query a set of additional asset documents from the Core Database 18808 for the package. The modify IP asset package module 19346 links these documents to the new package. The License Administrator selects and removes asset documents. The License Administrator adjusts the Allocation Percent of each asset as required.
- If the Package is a Group package, the modify IP asset package module 19346 displays the Name and Description of the group. The License Administrator can change the group by selecting from a list of available groups (groups from the Core database 18808 that the user has at least read access to, see the query in the Create IP Asset Package use case). The modify IP asset package module 19346 displays a list of group names from the Core Database 18808 in alphabetical order. The License Administrator as a User must have the ability to read the groups in the list. The License Administrator selects a group that holds the documents thatthe package packages. The modify IP asset package module 19346 displays the group documents and links them to the package. The modify IP asset package module 19346 removes current Allocation Percent values (all links get deleted).
- If the Package is a Descriptive package, the modify IP asset package module 19346 displays the Description. The License Administrator can change the Description by editing the text.
- If the License Administrator wants to modify the allocation of assets within the package, the modify IP asset package module 19346 displays the current allocations and the Administrator changes them.

Print Asset Package

Figure 236:
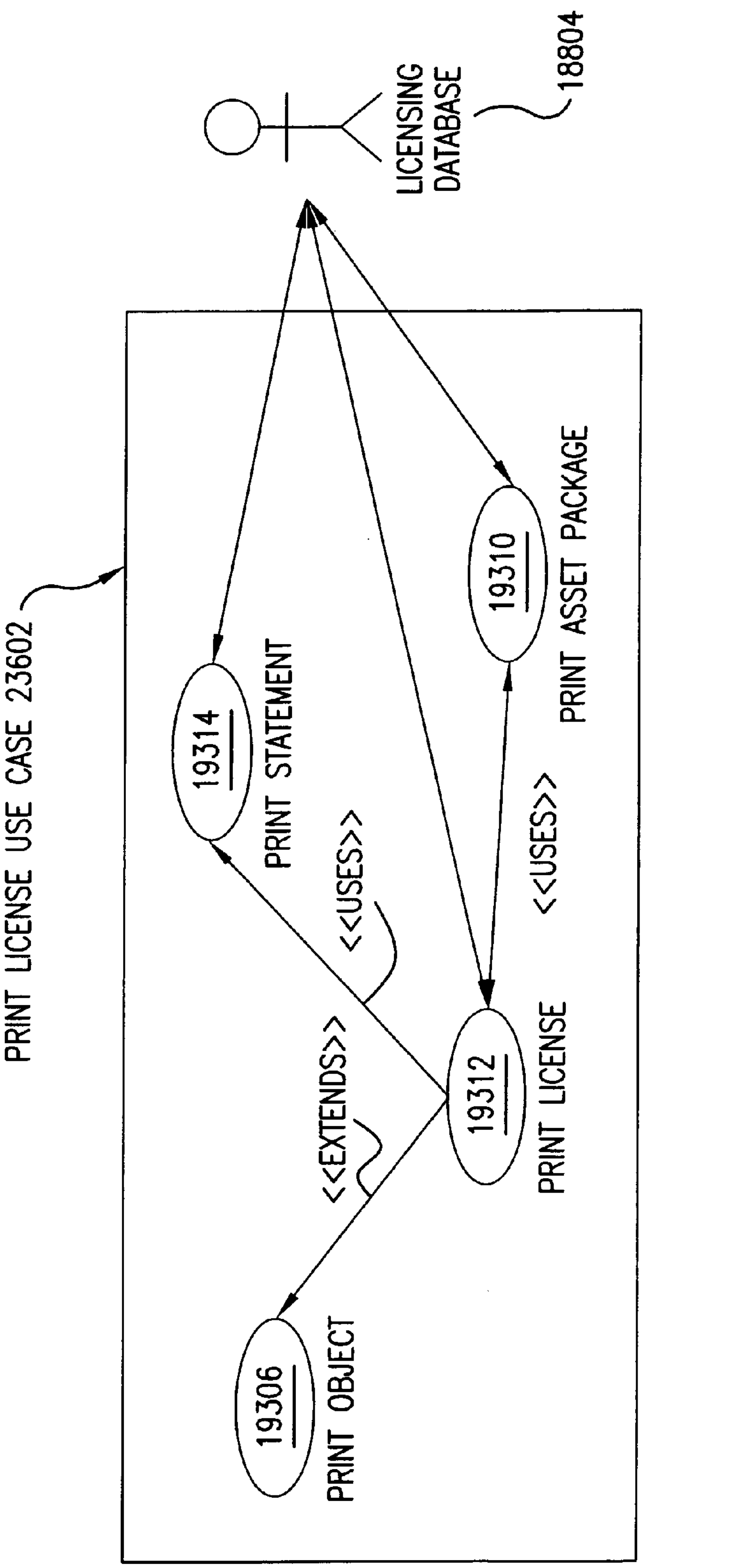

The print asset package use case 23602 is diagramed in FIG. 236. This use case extends the Print Object use case, and the Print License use case uses it. The print asset package module 19310 prints an Asset Package, including all information in the Licensing Database 18804 and the Core Database 18808 about the package and its documents. The operation of the print asset package module 19310 is further described below.

Step 1. The Actor in the Print Object use case or the Print License Use case selects an Asset Package and prints it.

Step 2. The print asset package module 19310 prints a formatted report with the Start Date, End Date, Name, Description, Package Type, etc. It then prints package-specific information (see Extensions).

Step 3. The print asset package module 19310 prints the Document IDs of the documents and the document-specific information (see Extensions).

This use case has a number of extensions:

- If the package is a Descriptive Asset Package, the print asset package module 19310 prints the Inclusion Criteria for the package and does not print any documents.
- If the package is a Group Asset Package, the print asset package module 19310 prints the Group ID, Name, and Description of the group and prints the IP Documents and UDDs in the group.
- If the package is a Standard Package, the print asset package module 19310 prints the Documents in the package.
- If a Document is an IP Document, the print asset package module 19310 prints the Publishing Organization Description, the IP Doc Kind Description, the Document Number, the Title, and the Description.
- If a Document is a Know-How, the print asset package module 19310 prints the Intellectual Asset Kind Description and the Description.
- If a Document is a User Defined Document (UDD), the print asset package module 19310 prints information pertaining to the document.

Remove IP Asset

Figure 237:
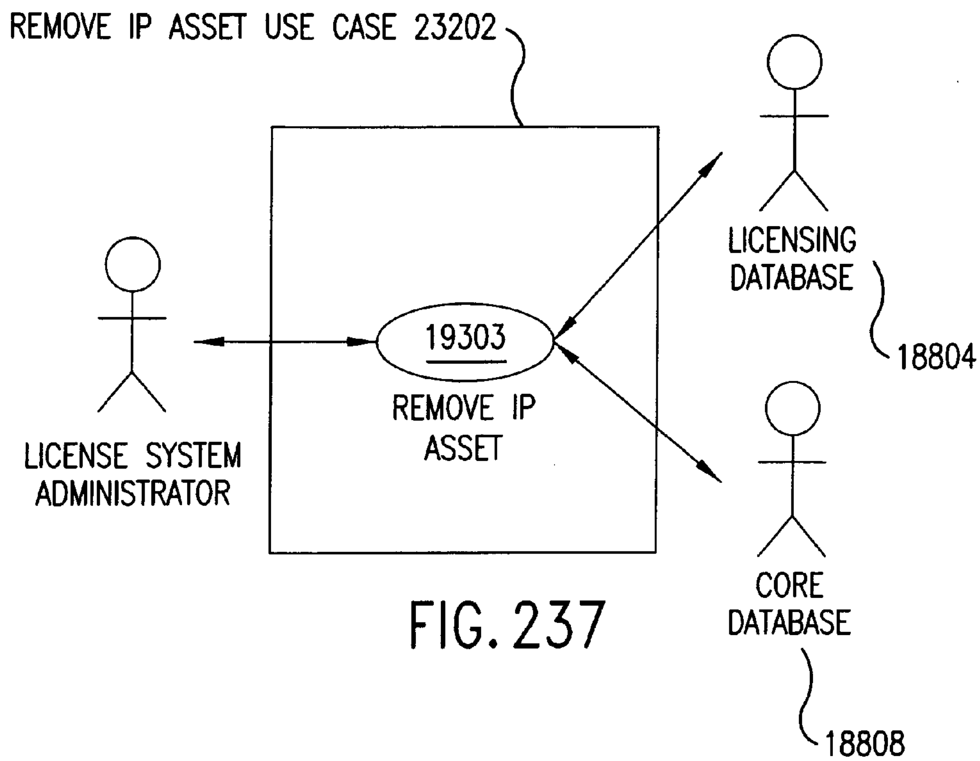

The remove IP asset use case 23702 is diagramed in FIG. 237. This is preferably an administrator use case. According to this use case, the licensing system administrator removes an IP asset (an IP Document or a Know How document, for example) and its related data from the Licensing Database 18804 and Core Database 18808. The operation of this use case is further described below:

Step 1. The System administrator begins the transaction.

Step 2. The remove IP asset module 19303 displays a list of all assets (the IP Documents and Know Documents) in the Licensing Database 18804 and Core Database 18808, displaying the Document ID, the Document Type (disc_switch for IP Documents and IA_Kind Description for Know How), the DocumentNumber and Title for IP Documents, ordering by the type and document ID.

Step 3. The Administrator selects one or more assets and removes them.

Step 4. The remove IP asset module 19303 deletes the information from the Licensing and Core databases 18804 and 18808 and moves it to the Recycle Bin (implementation may differ, deferring the actual SQL deletes, and there is no notification of commit to the Administrator).

This use case has a number of extensions:

At any time until clearing the Recycle Bin, the administrator can restore the removed Asset If the system integrates with the IPAM Server 314, the Administrator sees only assets from the Licensing Database 18804, not those from the Core 18808 (JPO_Patent, EPO_Patent, PCT, and PTO_Patent). The deletes from the IP_Document and Document classes are done with Administrator privileges in the Core database 18808 but do not affect patents in any way.

If the Administrator presses F1 or the equivalent, the application extends the use case with the Display Help use case.

Remove IP Asset Package

Figure 238:
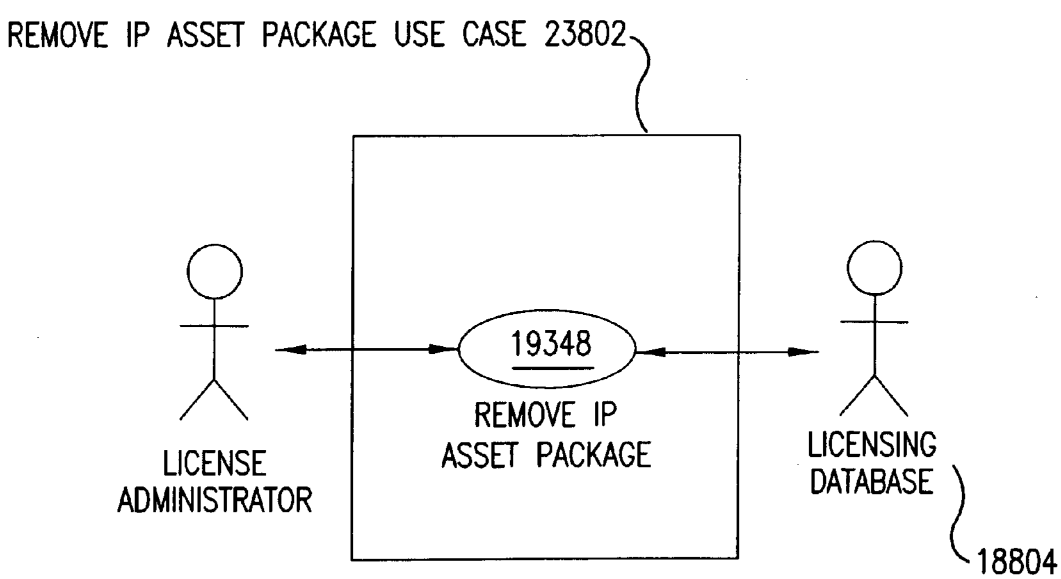

The remove IP asset package use case 23802 is diagramed in FIG. 238. According to this use case, the License Administrator selects an asset package from a list and removes it from the Licensing Database 18804, subject to security access and links to license agreements. The operation of this use case is further described below.

Step 1. The License Administrator begins a transaction.

Step 2. The remove IP asset package module 19348 displays a list of the asset packages to which the user has Read access or which the user owns, displaying the object identifier, the Name, the Description, and the Package Type, ordered by Name.

Step 3. The License Administrator selects one or more asset packages to which the user has Delete access or which the user owns and removes them. The License Administrator then commits the transaction.

Step 4. The remove IP asset package module 19348 removes the persistent asset packages from the Licensing Database 18804 and confirms the operation to the License Administrator. The remove IP asset package module 19348 propagates the delete to the appropriate subclass based on Package_Type (Standard Asset Package, Descriptive Asset Package, Group Asset Package) and to the Secure Object superclass.

This use case has a number of extensions.

If the asset package has links to a license agreement, the remove IP asset package module 19348 does not allow removal, displaying the error message "The <oid> license agreement uses this asset package; you cannot remove it." The <oid> is the object identifier for the license agreement.

If the Data Entry Clerk presses F1 or the equivalent, the application extends the use case with the Display Context-Sensitive Help use case.

Query Assets

Figure 239:
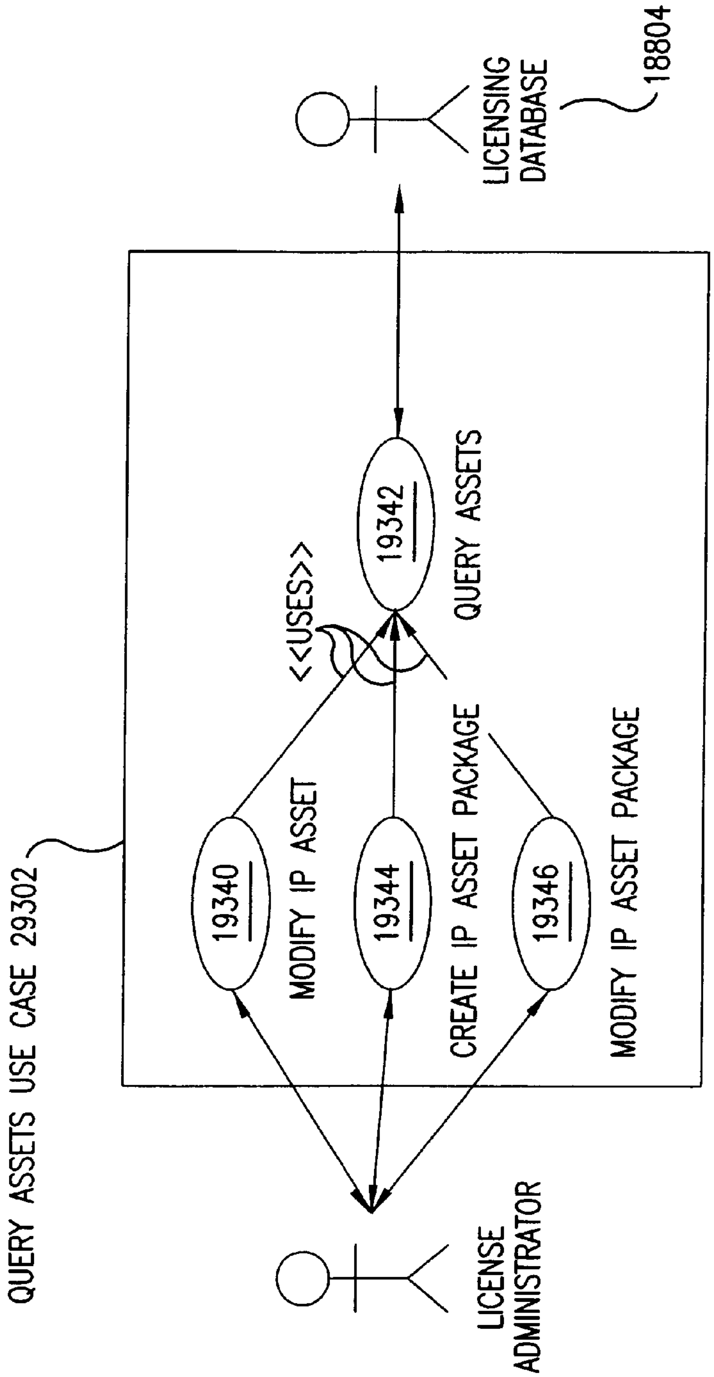
Figure 240A:
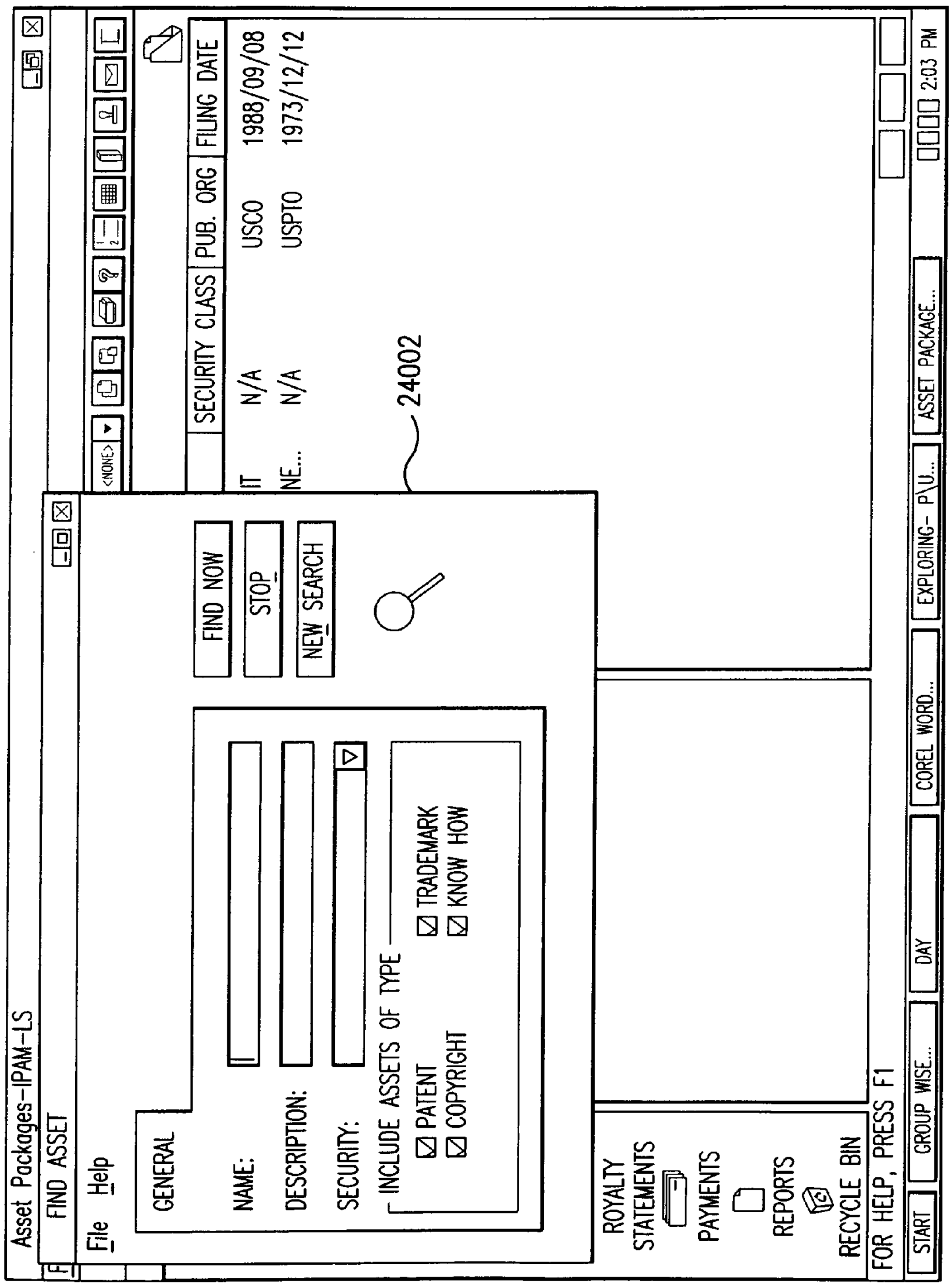
Figure 240B:
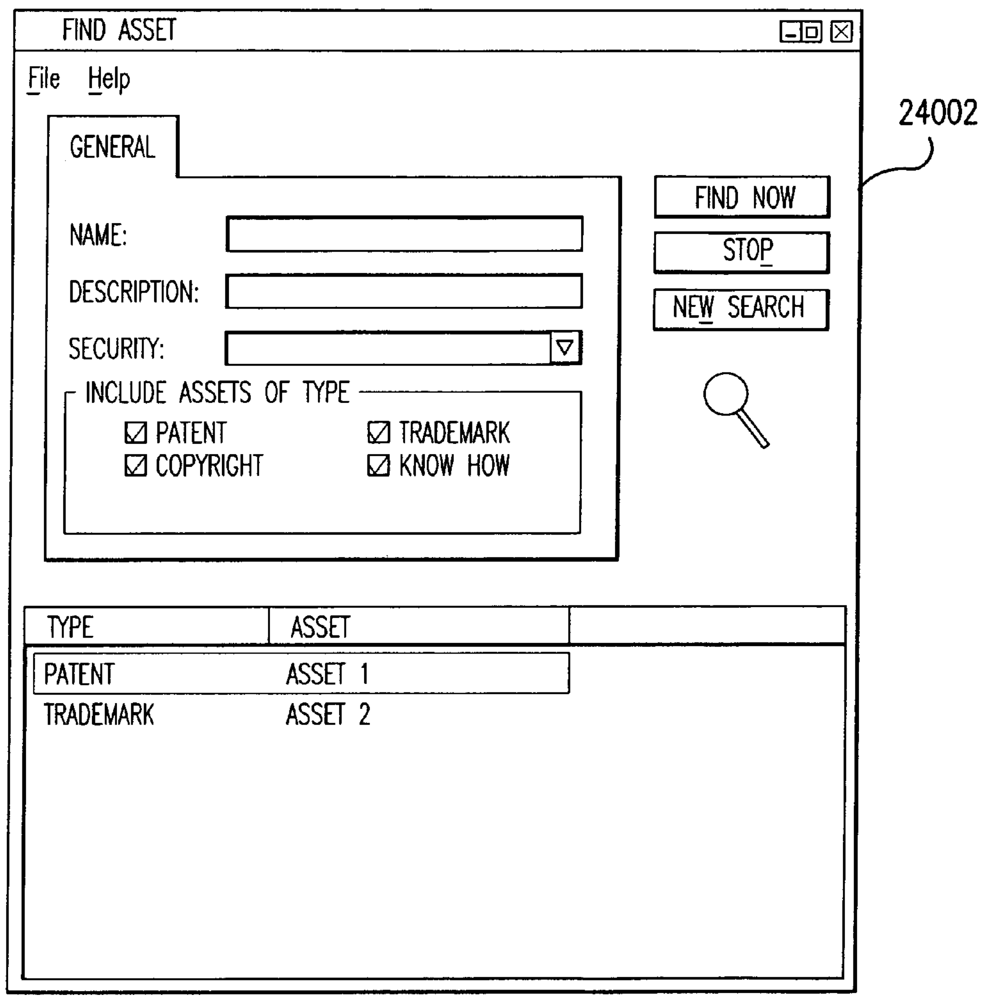
Figure 241:
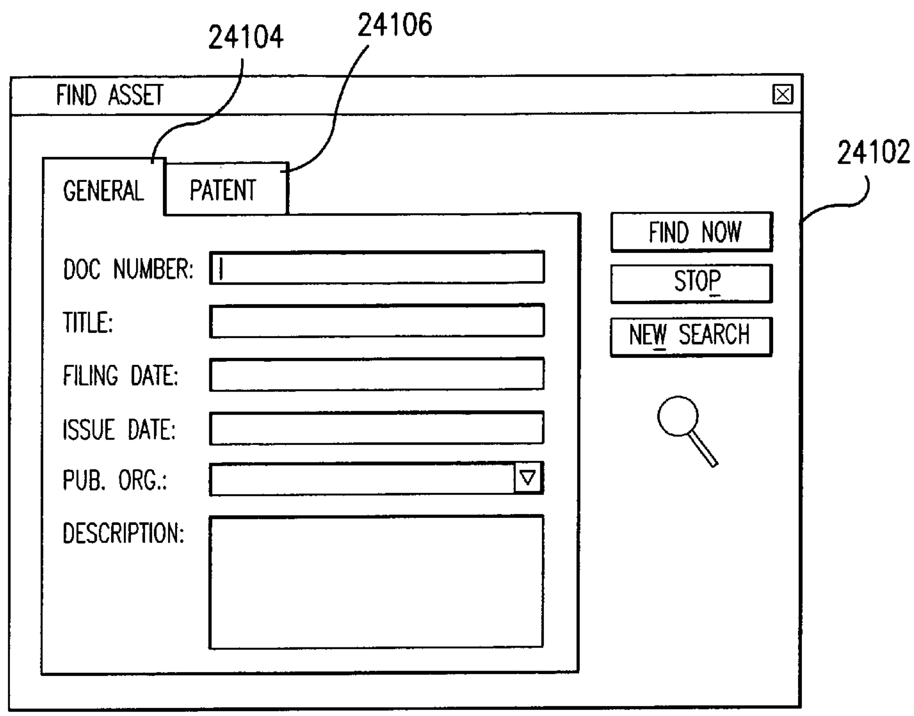
Figure 242:
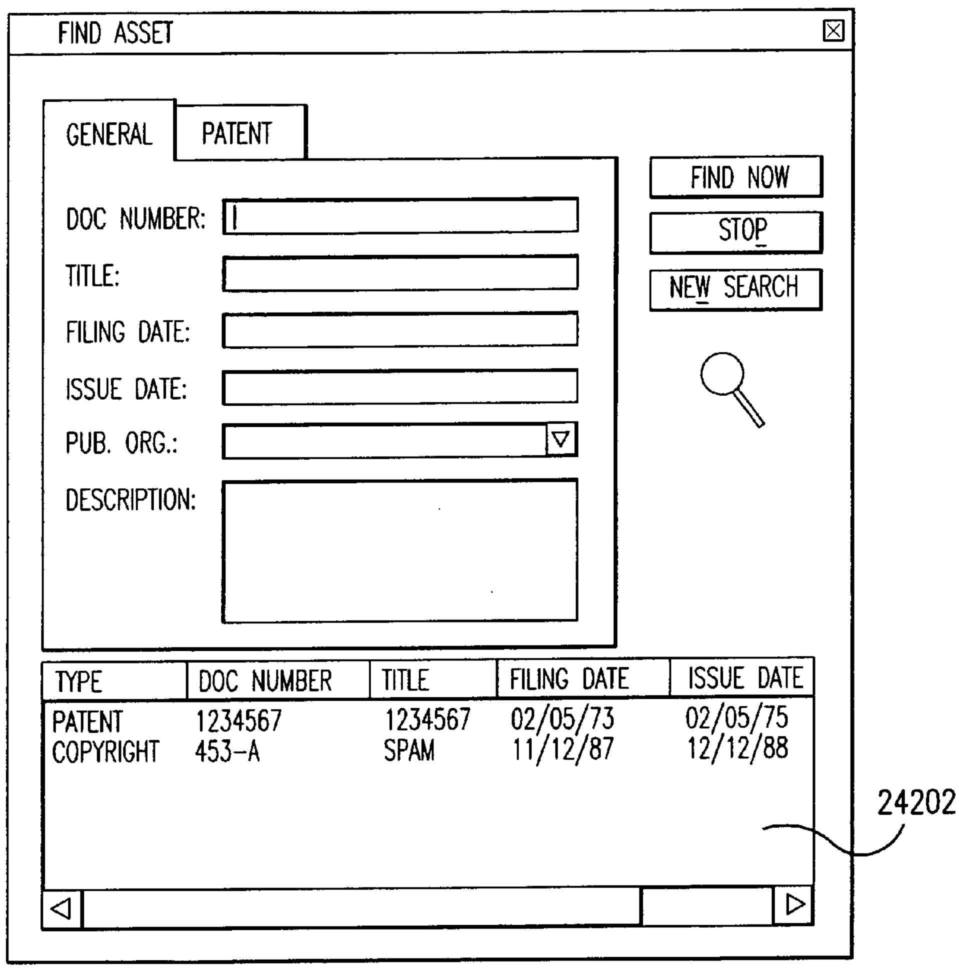

The query assets use case 23902 is diagramed in FIG. 239. This use case is used by other use cases. The License Administrator queries the Licensing Database 18804 for a set of asset documents by entering search criteria into a form (see FIGS. 240-242, for example). The License Administrator can remove assets from this set individually. The use case returns a set of License object identifiers (OIDs). The operation of this use case is further described below.

Step 1. The using use case calls this use case, and the query assets module 19342 displays, for example, a screen that contains these fields for search criteria: Document Number, Title, Long Display Name, Issue Date, Filing Date, Publication Date, Description, Asset Type ("Disc Switch"), Publishing Organization (Description from Pub Organization class), Doc Kind (Description from IP Doc Kind class), and/or any other search fields discussed herein, or conventionally used. See example displays in FIGS. 240A, 240B, and 241.

Step 2. The License Administrator enters one or more fields of search criteria and submits the query.

Step 3. The query assets module 19342 displays a list of documents 24202 that satisfy the query, displaying the Asset Type, Document Number, and Title (for IP documents) and/or IA Kind and Description (for Know How), and to which the License Administrator has READ access. See FIGS. 240B and 242.

Step 4. The License Administrator may take any number of actions, including one of these actions:

Step 4.1. The License Administrator may select an asset for editing (Modify IP Asset use case).

Step 4.2. The License Administrator may drag and drop or copy and paste an asset into a list of assets (Create or Modify IP Asset Package).

Step 5. The License Administrator ends the use case.

This use case has a number of extensions:

If the asset is a patent (JPO_PATENT, EPO_PATENT, PCT, or PTO_PATENT classes), the extended search criteria includes Assignee, Class, international Class, and Inventor.

If the asset is a Trademark, the extended search criteria include sTrademark Class Display Name and Description and the Trademark Kind Description If the asset is a Know How or Trade Secret, the extended search criteria includes the IA Kind Description and the Know How Description.

If the License Administrator presses F1 or the equivalent, the application extends the use case with the Display Help use case.

Query Asset Packages

Figure 335:
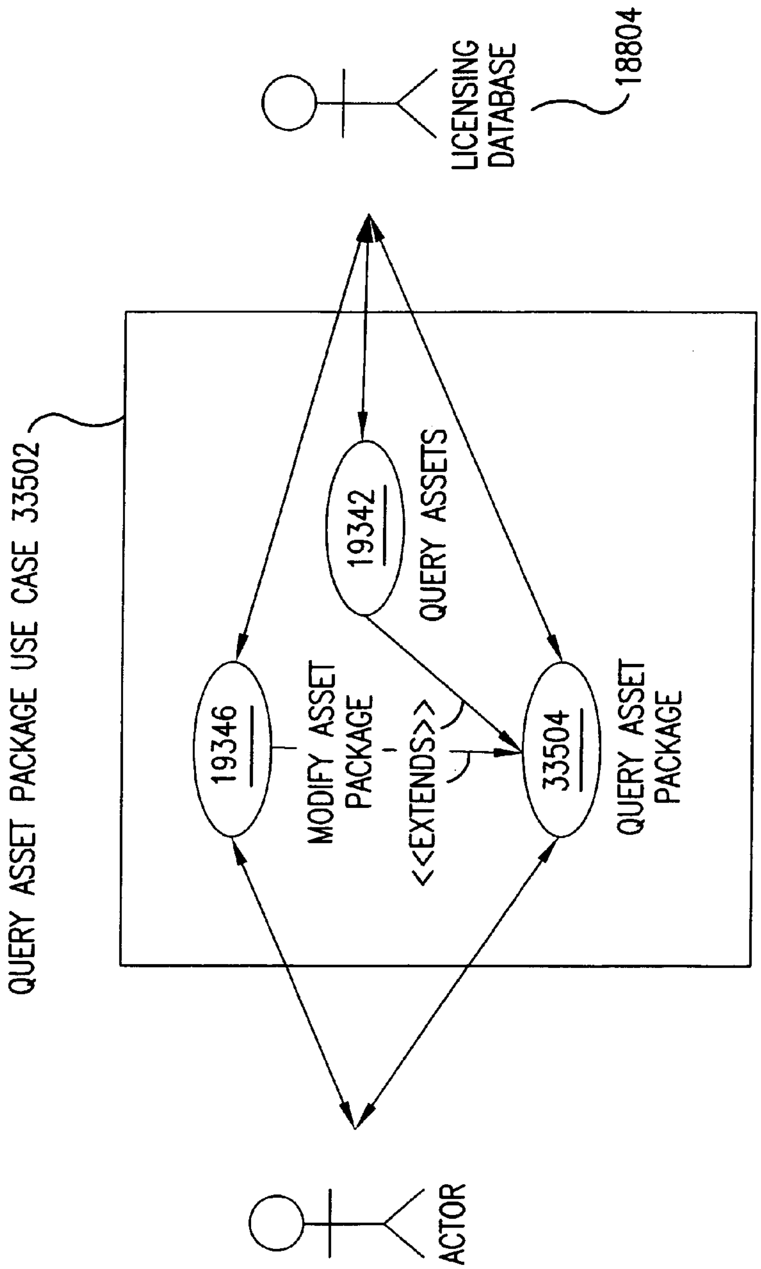

The query asset packages use case 33502 is diagramed in FIG. 335. According to this use case, the Auditor, the Data Entry Clerk, or the License Administrator (and potentially any actor) queries an asset package from the Licensing Database 18804 based on any of the structured fields of the package (including inclusion criteria for descriptive asset packages and group name and description for group packages) or the list of assets (documents) associated with the package. The query asset package module 33504 displays the set of asset packages that qualify given the search criteria. The Modify Asset Package use case extends this one, enabling the actor to modify a package found through the query. This use case is further described below.

Step 1. The Actor begins the transaction.

Step 2. The query asset package module 33504 displays a form that allows the Actor to specify a set of search criteria for the query. The main part of the form contains these fields:

Start Date (date on which asset package becomes effective, start of availability of assets in the package)

End Date (date on which asset package terminates, end of availability of assets in the package usually due to patent expiration or similar asset loss)

As Of Date (a date that is potentially between the Start Date and End Date, allowing the actor to search for asset packages that are effective as of the date)

Package Name (the text name of the package)

Package Description (the text describing the nature of the package)

Package Type (Standard, Descriptive, or Asset), defaulting to Standard

Step 3. The Actor enters any of the fields and tells the query asset package module 33504 to execute the query.

Step 4. The query asset package module 33504 concatenates all the conditions with a logical AND, then queries the Licensing Database 18804 using the resulting search condition. The query asset package module 33504 then displays a list of all the asset packages that satisfy the search condition. The query asset package module 33504 displays the Package Name, Description, and Package Type.

Step 5. The Actor ends the transaction.

This use case has a number of extensions:

If the Actor selects a Package Type of Standard or Descriptive, the query asset package module 33504 displays an additional form that allows the user to enter a search expression that specifies a logical conditional expression of ANDs, ORs, and NOTs (with parenthetical grouping) combining assets ((Asset 1 AND Asset 2) OR Asset 3) which it gathers with the Query Assets use case. The query asset package module 33504 queries the Licensing Database to find those packages with the appropriate combination of assets.

If the Actor selects a Package Type of Descriptive, the query asset package module 33504 displays an additional form that allows the user to enter a text search on Inclusion Criteria The query asset package module 33504 queries the Licensing Database to find those Descriptive packages that qualify.

If the Actor selects a Package Type of Group, the query asset package module 33504 displays an additional form that allows the user to enter a text search on Group Name and/or Group Description. As well, the query asset package module 33504 displays a form for entering a search expression for grouped documents with AND, OR, and NOT relational operators as for Standard or Descriptive packages. The query asset package module 33504 queries the Licensing Database to find those group packages with the appropriate combination of assets.

License Agreements Use Cases

A license agreement is a contract in which an entity, the licensor, licenses intellectual property to another entity, the licensee. There may be a plurality of licensors and/or licensees. In addition to a variety of contract clauses and the links to any number of asset packages, the license agreement in the context of the present invention contains definitions of the parties to the agreement, compensation terms, territorial restrictions, field-of-use (market area) restrictions, and any other terms and/or clauses used in license agreements.

Figure 245:
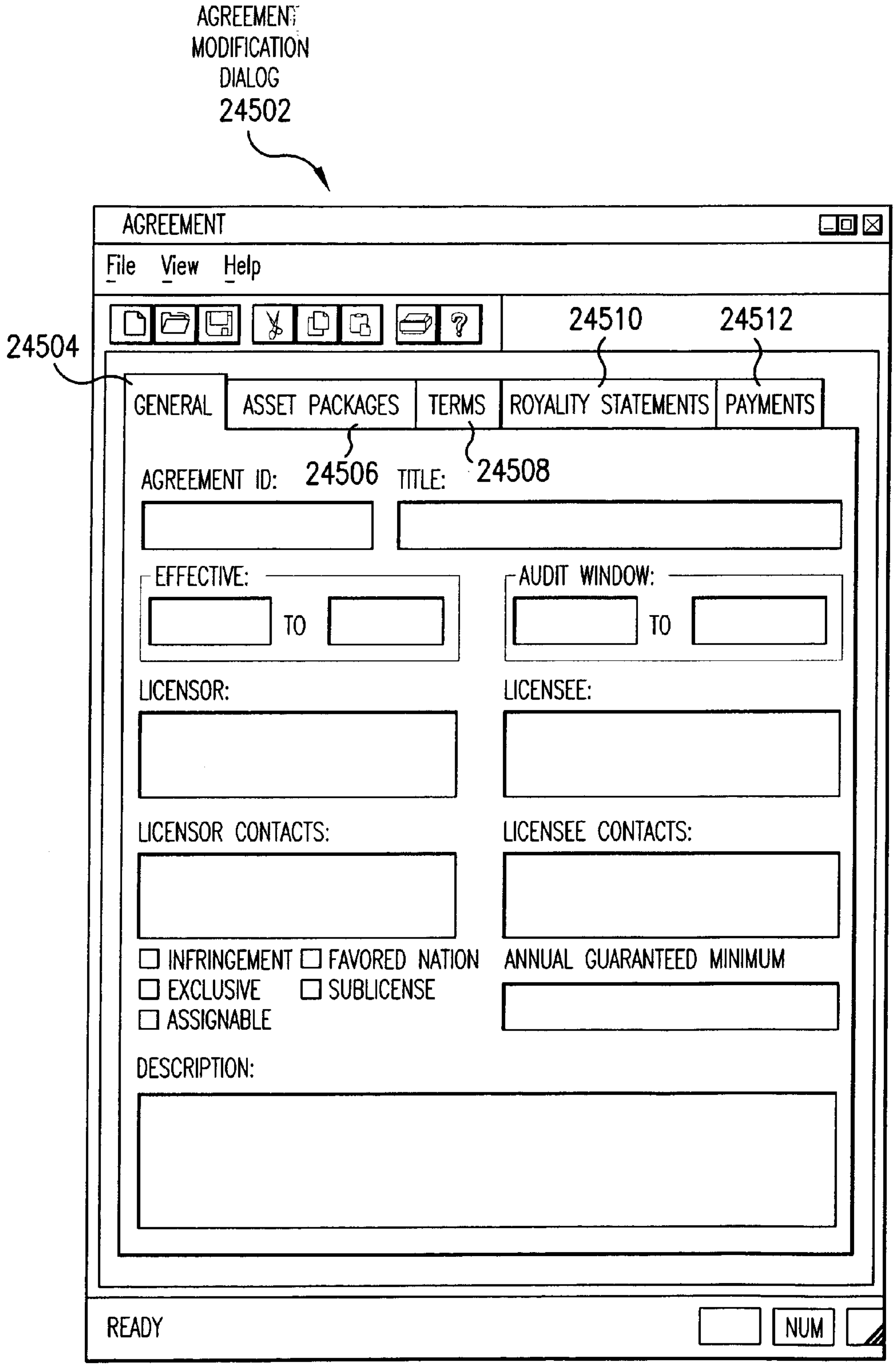
Figure 246:
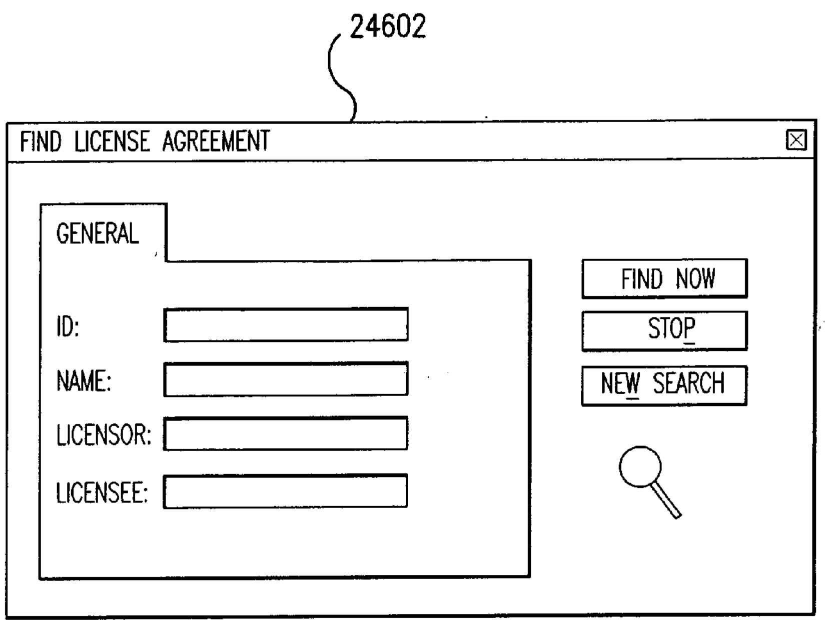

A License Agreements View 24402 (FIG. 244) displays a spreadsheet pane of all the license agreements. Double-clicking on a license displays the agreement modification dialog 24502 (FIG. 245). This dialog 24502 displays five tabs. The General tab 24504 shown here contains the basic information about the agreement. The Asset Packages tab 24506 lists the asset packages that are the subject of the license and lets the License Administrator administer the list. The Terms tab 24508 lists the compensation terms of the license (fees, royalties, advances, minimum guarantees, and other). The License Administrator can modify these terms through that tab. The Royalty Statements tab 24510 and Payments tabs 24512 let the License Administrator see the linked statements and payments related to the license, but not modify them.

Figure 248:
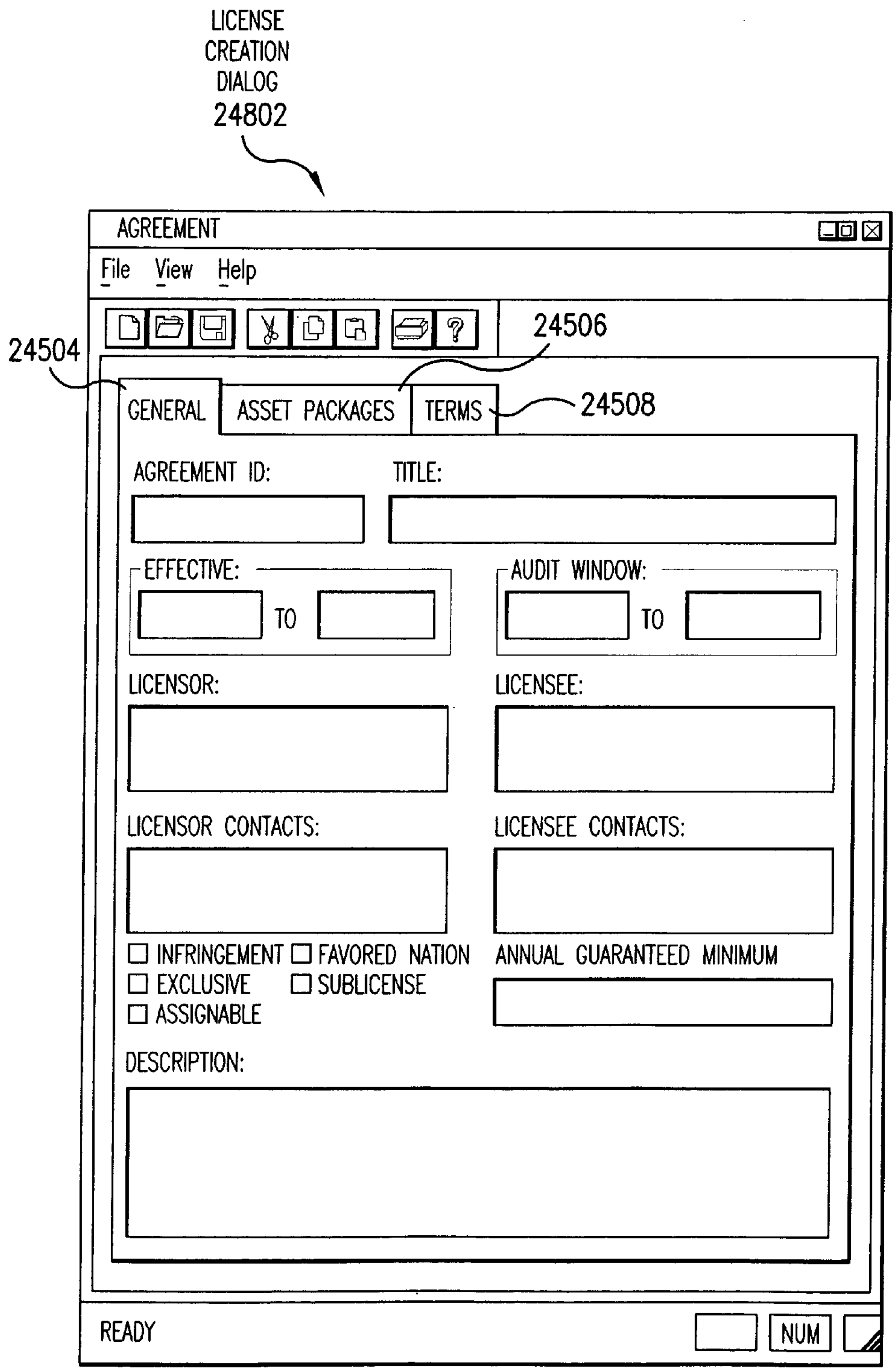

Double-clicking on the empty row or on the new button in the license agreements view 24402 displays the license creation dialog 24802 (FIG. 248). This dialog is the same as the modification dialog but does not display the Statements and Payments tabs, as a new license has none.

Figure 247:
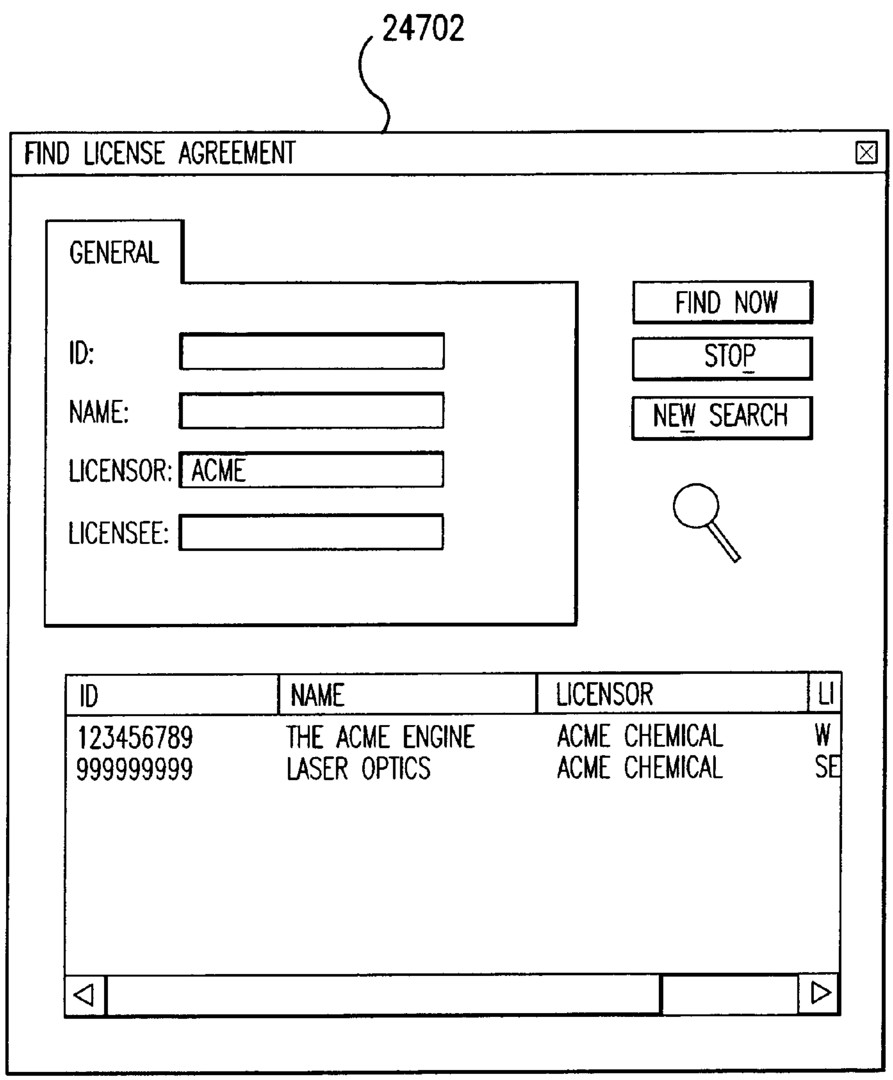

Selecting a Find tool in this view displays the Find Agreement dialog 24602 (FIG. 246), which lets you enter search terms for agreements. Entering search conditions into this dialog 24602 and clicking on Find Now displays the matching agreements in the extended dialog 24702 (FIG. 247). You can then double-click on the agreement to display the modification dialog with all the details of the license.

Enter License Agreement

Figure 249:
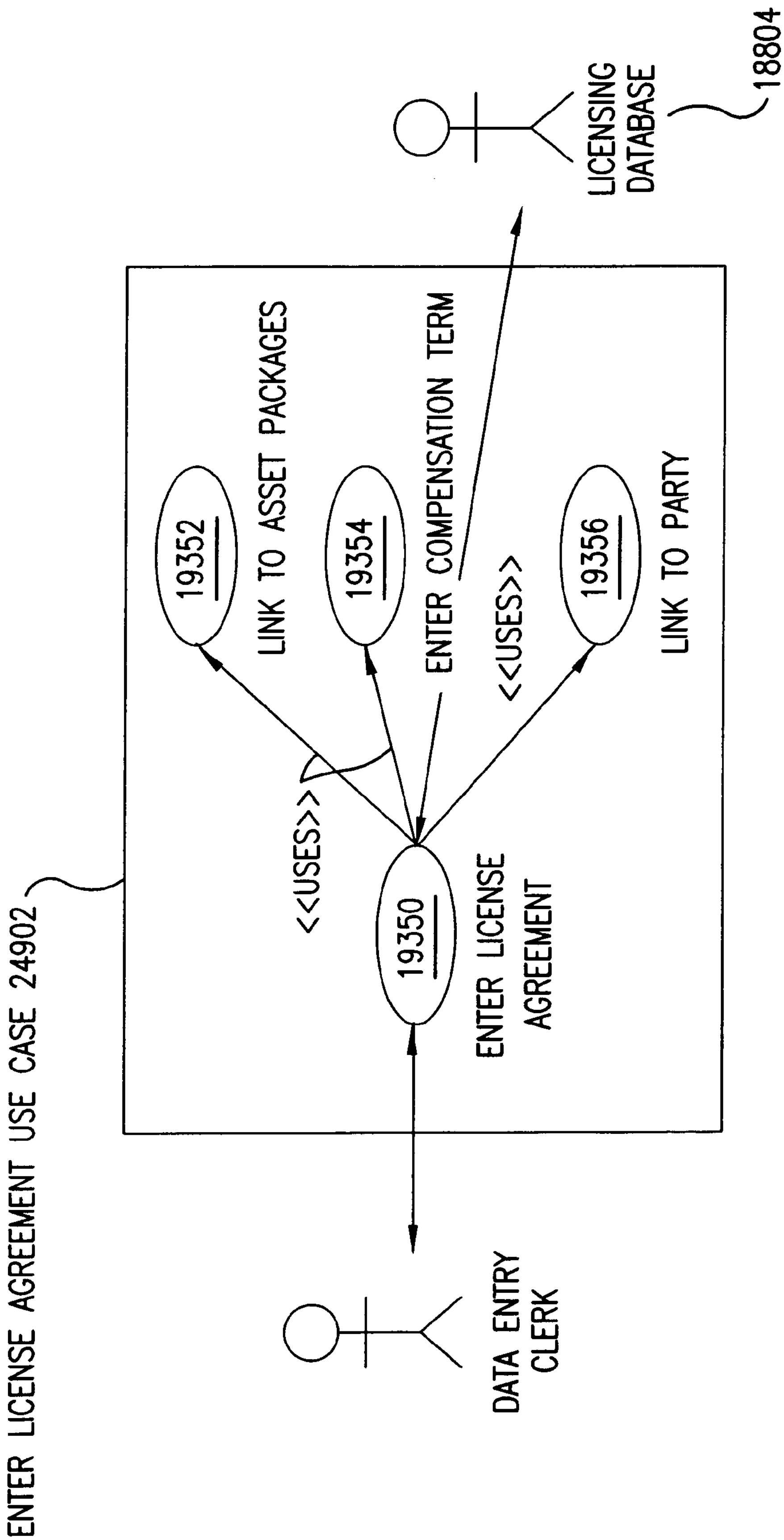

The enter license agreement use case 24902 is diagramed in FIG. 249. According to this use case, the Data Entry Clerk enters a license agreement into the Licensing Database 18804. Entering the agreement entails entering structured data (name, description, effective date, and so on). The Data Entry Clerk enters a set of compensation terms that describe the fee and royalty structure of the agreement. The Data Entry Clerk also links the agreement to a set of asset packages representing the licensed IP assets and to the various parties to the agreement (licensor, licensees, attorneys, and so on). The operation of this use case is further described below.

Step 1. The Data Entry Clerk begins the transaction.

Step 2. The enter license agreement module 19350 generates a new object identifier for the license agreement and displays a data entry form 24802 for the new license.

Step 3. The Data Entry Clerk enters data into the structured data fields of the license creation dialog 24802 and links other objects as required:

Step 3.1. The Data Entry Clerk enters the structured fields of the agreement: the Agreement ID, the Title/Name, Description, Effective Date, Expiration Date, Exclusivity, Assignable, Transferable, Revocable, Confidential, Terminated, etc.

Step 3.2. The Data Entry Clerk enters the structured fields of the license agreement: Perpetual, Infringement Based (see Extensions), Can Sublicense, Annual Audit, Audit at Licensee Expense, Favored Nation, Improvements, Grant Back, Withholding Percentage, etc.

Step 3.3. The Data Entry Clerk uses the Link to Asset Packages use case to specify the set of asset packages for the license. These linked asset packages are displayed in the asset packages tab 24506.

Step 3.4. The Data Entry Clerk uses the Enter Compensation Term use case to enter the compensation terms for the license. This step repeats until the clerk enters all the terms in the license agreement. These terms are displayed in the terms tab 24508.

Step 3.5. The Data Entry Clerk uses the Link to Party use case to specify a party to the agreement. Required parties include one licensor and at least one licensee. You can also add other parties such as attorneys and other roles entered through the Add Role use case by the License System Administrator. This step repeats until the clerk has linked all the parties to the agreement. This information is displayed in the Licensor and Licensee fields (FIG. 248).

Step 3.6. The Data Entry Clerk selects the Security Class for the new document from a list of available security classes, which control who has access to this license.

Step 4. The Data Entry Clerk commits the transaction.

Step 5. The enter license agreement module 19350 creates the License Agreement or Infringement Based Agreement in the Licensing Database 18804. The enter license agreement module 19350 confirms the commit to the Data Entry Clerk.

This use case has a number of extensions:

If the correct asset package or packages don't exist, extend the use case with the Create IP Asset Package use case to create the appropriate package(s).

If the correct entity does not exist, extend the use case with the Enter Entity use case to create the appropriate entity.

If the Data Entry Clerk indicates that the license agreement is infringement based, create an Infr Based Agreement rather than a License Agreement and add the Infringement Release Granted flag and the Infringement Comment field to the data entry form. A license is infringement based if it resulted or is somehow associated with or related to an allegation of infringement (whether or not an infringement suit was filed in court). An embodiment of the invention supports additional information that you track for infringement based license agreements.

If the Data Entry Clerk presses F1 or the equivalent, the application extends the use case with the Display Help use case.

Link to Part

Figure 250:
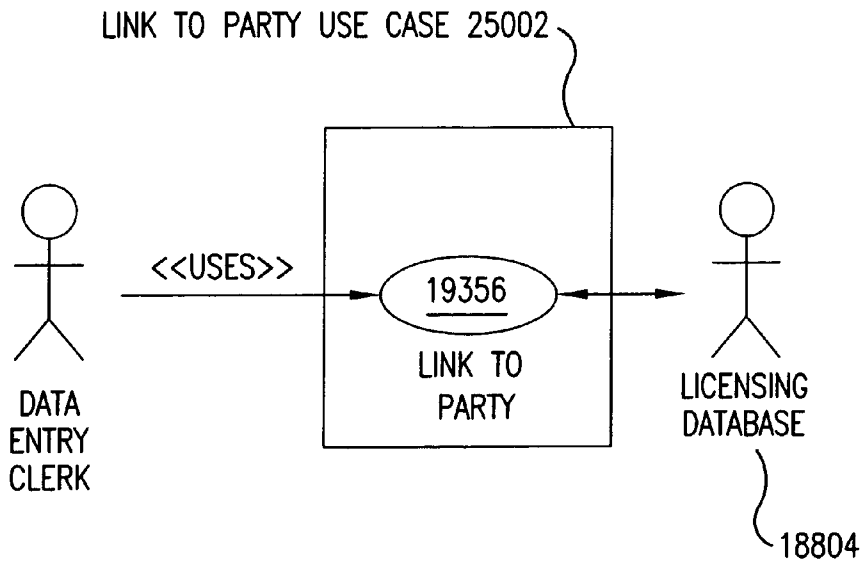

The link to party use case 25002 is diagramed in FIG. 250. According to this use case, a Data Entry Clerk selects an entity from a list and a role from another list. The Licensing Database 18804 creates a link between the entity, the role, and the license agreement from the using use case. This use case is further described below.

Step 1. The Data Entry Clerk starts the use case with an open transaction containing a license agreement that will link to the entity and role, passing in the object identifier for the license agreement.

Step 2. The link to party module 19356 queries the Licensing database 18804 and displays the names and descriptions of the entities and roles.

Step 3. The Data Entry Clerk selects one entity from the entity list and one role from the role list.

Step 4. The Data Entry Clerk signals the end of the use case.

Step 5. The Licensing Database 18804 creates a Party link using the License Agreement OID, the Entity OID, and the Role OID.

This use case has a number of extensions.

The user can cancel the use case at any time. The result will be that the license agreement is unchanged from its status before using the use case, with no additional Party links.

If the Data Entry Clerk presses F1 or the equivalent, the application extends the use case with the Display Help use case.

Link to Asset Package

Figure 251:
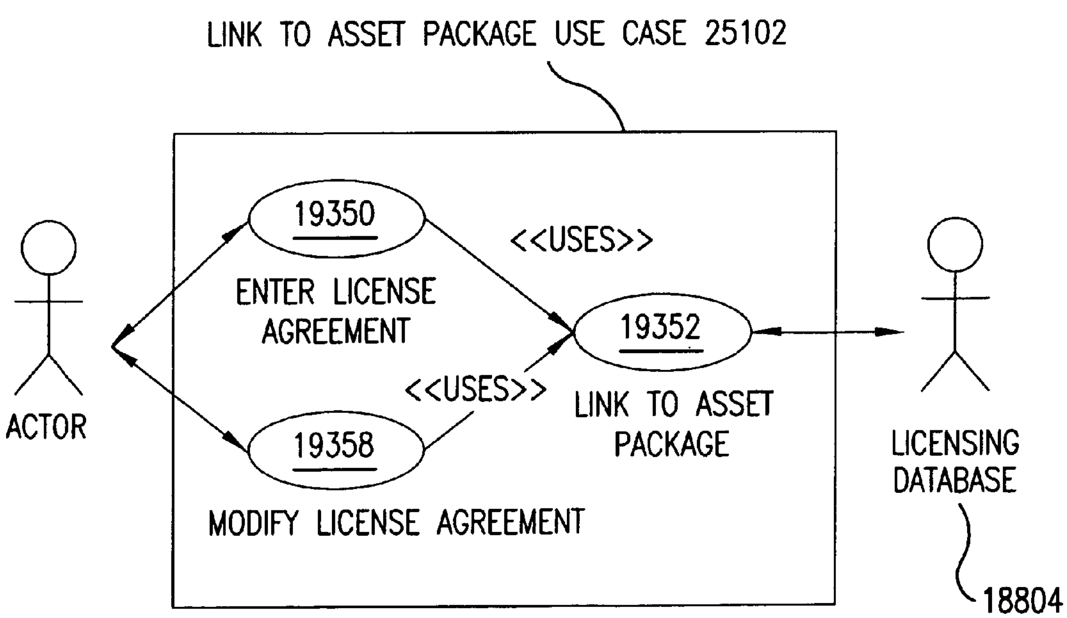

The link to asset package use case 25102 is diagramed in FIG. 251. According to this use case, a Data Entry Clerk selects one or more asset packages from a list. The link to asset package module 19352 creates a link between the input license agreement and the selected asset packages. The Data Entry Clerk sets the territorial and field-of-use restrictions (and any other license details) on each asset package link. The Data Entry Clerk indicates whether the link is a cross license and/or has any further limitations, obligations, rights, etc. as part of this license. The link to asset package module 19352 is further described below.

Step 1. The Data Entry Clerk starts the use case with an open transaction containing a license agreement that will link to the asset packages. The extended use case supplies the object identifier for the agreement.

Step 2. The link to asset package module 19352 displays the names and descriptions of the asset packages in a list ordered by name.

Step 3. The Data Entry Clerk selects one or more packages from the list.

Step 4. The link to asset package module 19352 creates and displays a link between the license agreement and each package the Data Entry Clerk selects and assigns default territorial and field-of-use values. The link to asset package module 19352 sets the default Cross-Licensed flag to false.

Step 5. The Data Entry Clerk adds territorial and field-of-use restrictions to the links using lists of the available territories and fields of use from the Licensing Database 18804. The Data Entry Clerk also sets the Cross-License flag to true if the particular package represents assets licensed by the licensee to the licensor instead of vice versa. The Data Entry Clerk removes unwanted territorial and field-of-use restrictions from the links. The Data Entry Clerk enters any additional limitations in the Limitations field. All of these actions may occur in any order. The Data Entry Clerk signals the end of the use case.

Step 6. The Licensing Database 18804 links the asset packages and the input license agreement and adds links to the required territories and fields of use for each link.

This use case has a number of extensions:

The user can cancel the use case at any time. The result will be that the license agreement is unchanged from its status before using the use case.

If the Data Entry Clerk presses F1 or the equivalent, the application extends the use case with the Display Help use case.

Enter Compensation Term

Figure 252:
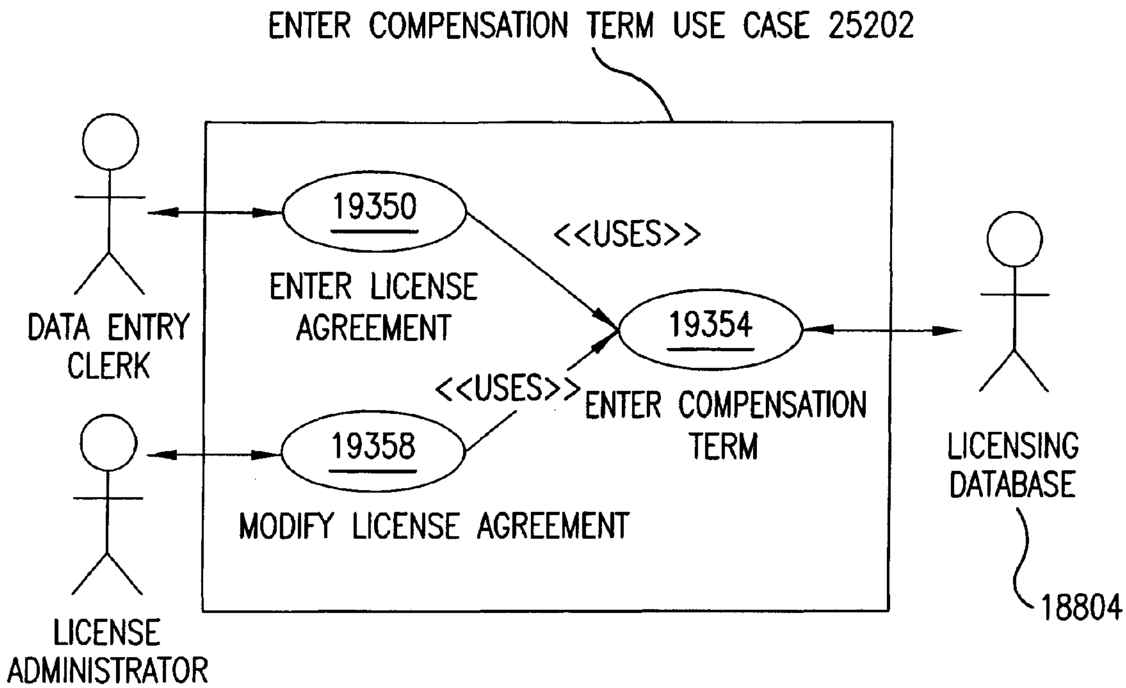

The enter compensation term use case 25202 is diagramed in FIG. 252.

The Enter License Agreement and Modify License Agreement use cases use this one to enter compensation terms to a license agreement in the Licensing Database 18804. The Licensing Administrator or Data Entry Clerk creates a licensing term with the details appropriate to the particular term. AU terms have a description, an amount, and late payment penalties, and perhaps other attributes. Ongoing royalties have a time period and possibly tables of escalating amounts based on number of units/sales plus tables of estimated number of units/sales. Ongoing royalties break down into royalties on units sold, on revenue, or on revenue from sublicense royalties. A minimum guarantee also has a time period and possible escalations. An advance has a due date and may be refundable or not. A fee may be ongoing with a time period or a lump sum fee with a due date.

The operation of this use case is further described below.

Step 1. The using use case passes in the object identifier for the license agreement to which the Data Entry Clerk or License Administrator (the Actor) wants to add compensation terms.

Step 2. The enter compensation term module 19354 displays a list of the current set of compensation terms (if any) for this license, preferably in order of term number, displaying the term Description, the compounding period Description, the Amount with its currency symbol, the Late Payment Interest Rate (if any), and the Term Type.

Step 3. The Actor creates a new term and selects one of the term types (Royalty Per Unit, Royalty Per Sales Amount, Royalty Per Royalty Amount, Minimum Guarantee, Advance, Ongoing Fee, Lump Sum Fee, or Other).

Step 4. The enter compensation term module 19354 displays the term with default values (Amount 0, Currency from the last term or the default currency for the system, interest rate 0, fields for entering a Time Unit Period (see Extensions) with default Time Unit Type of Month, Term Type, Royalty_Per_Sales_Amount). The enter compensation term module 19354 displays a form for the term given the default term type (see Extensions). It displays a choice of several period types and entry fields that differ depending on the period type the user chooses.

Step 5. The Actor enters the standard details for the term and the details for the particular term type (see Extensions), then either repeats from step 3 or ends the use case.

Step 6. The enter compensation term module 19354 inserts the new terms into the Licensing Database 18804. The enter compensation term module 19354 extends the use case with the Create Expected Revenue use case, which computes the expected revenue amounts per period for the existing compensation terms.

This use case has a number of extensions:

If the Actor presses F1 or the equivalent, the application extends the use case with the Display Help use case.

If the term type is Ongoing Royalty, the enter compensation term module 19354 displays fields for entering a Recurring Period (see below) and an ongoing royalty type (Per Unit, Per Sales, Per Royalty (Sublicense), default Per Sales.

If the term type is Ongoing Royalty and the Royalty Type is Royalty Per Unit, the enter compensation term module 19354 displays fields for entering a Royalty Unit (default 'Unit'), the Estimated Number of Units per Period (default 0), a table for an escalation schedule (Starting Units, Ending Units, and Amount), and a table for Estimated Units (Period Number, Estimated Units).

If the term type is Ongoing Royalty and the Royalty Type is Royalty Per Sales Amount, the enter compensation term module 19354 displays fields for entering the Percentage, the Net flag (default True), the Estimated Revenue Per Period (default 0), a table for an escalation schedule (Starring Amount, Ending Amount, and Royalty Percentage), and a table for Estimated Revenue (Period Number, Estimated Revenue).

If the term type is Ongoing Royalty and the Royalty Type is Royalty Per Royalty Amount, the enter compensation term module 19354 displays the same fields as for Royalty Per Sales Amount.

If the Term Type is Minimum Guarantee, the enter compensation term module 19354 displays fields for entering a Time Unit Period (see below), a Due Date, and a table for an escalation schedule (Start Date, End Date, Amount).

If the Term Type is Advance, the enter compensation term module 19354 displays the Due Date of the advance and the Refundable flag.

If the Term Type is Fee and the Fee Type is Ongoing Fee, the enter compensation term module 19354 displays fields for entering a Time Unit Period (see below).

If the Term Type is Fee and the Fee Type is Lump Sum, the enter compensation term module 19354 displays the Due Date.

If the Actor must enter a Recurring Period, the enter compensation term module 19354 displays the Time Unit Type, the Start Date, the Recurrence Rate, the Starting Interval, the Interval Unit Type, and the choice of ending the cycle with a specific number of recurrences (Recurring Period) or a specific End Date (End Date Period).

Create Expected Revenue

Figure 253:
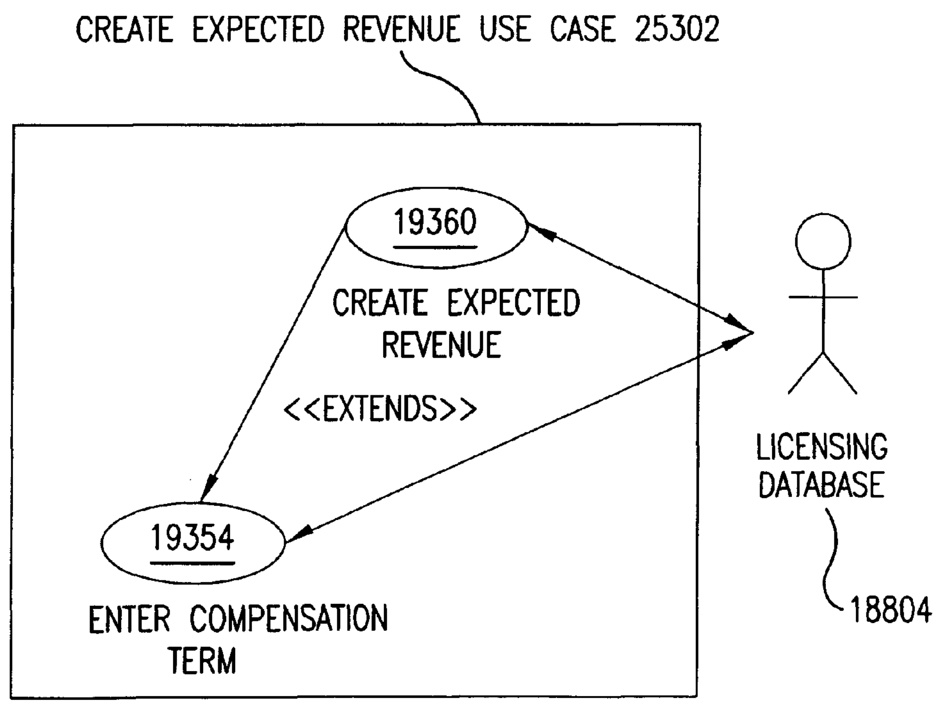
Figure 254:
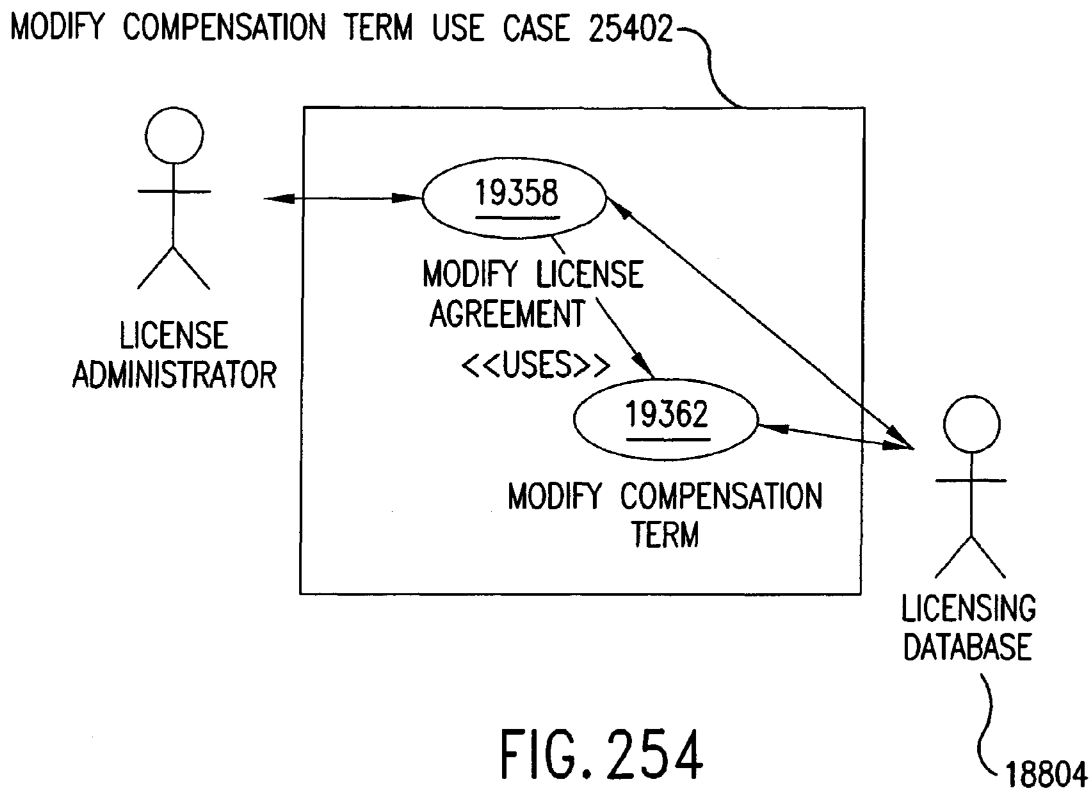

The create expected revenue use case 25302 is diagramed in FIG. 253. This use case extends the Enter Compensation Term use case to build a series of expected future revenue payments. In other words, based on the compensation terms of the license agreement, it is possible for the invention to calculate expected revenue to be generated in the future by the license agreement. Such expected future revenue can then be compared to actual revenue.

The extending use case passes in the compensation term object identifier. The create expected revenue module 19360 queries the compensation term and its components and generates the appropriate payments expected from that term.

Operation of the create expected revenue module 19360 is further described below.

Step 1. The create expected revenue module 19360 queries the Compensation Term in question from the Licensing Database 18804 to get the Amount and subtype of the term.

Step 2. For each period that is part of the structure of the compensation term, the create expected revenue module 19360 creates an Expected License Revenue object in the Licensing Database 18804, giving it a payment number and a due date as well as the expected amount of the payment.

Step 3. The create expected revenue module 19360 iterates through the expected revenues calculated in step 2 to subtract advance payment amounts from expected royalties and to reset Minimum Guarantees to the amount needed to bring the guarantee up to the guaranteed amount.

This use case has a number of extensions:

For an Ongoing Royalty, the create expected revenue module 19360 queries the time period, the scaling royalty structure, and the royalty type.

For a Royalty Per Unit, the create expected revenue module 19360 queries the Estimated Units Per Period and the set of period estimates. Using this information, the time period, and the scaling royalty structure, the Create expected revenue module 19360 computes the series of royalty payments due through the expiration of the license. The Description is "Per-unit royalty for the period from <start> to <end> at <Amount> currency symbol> per <unit> [using scaled royalty from <starting units> to <ending units> ]". The <start> and <end> are the computed period boundaries, the Amount is the term amount, the <currency symbol> is the term Unit Symbol, the <unit> is the Unit from the Ongoing Royalty, and the optional string exists only for scaling royalties and lists the Starting Units and Ending Units from the Ongoing Royalty.

For a Royalty Per Sales Amount, the Create expected revenue module 19360 queries the Estimated Revenue Per Period and the set of period estimates. Using this information, the time period, and the scaling royalty structure, the Create expected revenue module 19360 computes the series of royalty payments due through the expiration of the license. The Description is "Revenue-based [sublicense] royalty for the period from <start> to <end> at <Percentage> per <currency unit> of revenue [using scaled royalty from <starting units> to <ending units> ]". The optional "sublicense" string appears when the object is a Royalty Per Royalty Amount. The <start> and <end> are the computed period boundaries, the Percentage is the Royalty Per Sales Amount Percentage, and the <currency unit> is the Unit Symbol for the term currency. The optional string exists only for scaling royalties and lists the Starting Units and Ending Units from the Ongoing Royalty.

For a Minimum Guarantee, the Create expected revenue module 19360 queries the time period, the Due Date, and the scaling guarantee structure. Using this information, the Create expected revenue module 19360 computes the series of guarantee dates, setting the Expected Revenue Amount to the term Amount given the scaling table based on the Due Date. The Description is "Minimum Guarantee for period from <start> to <end> using scaled guarantee for <Due Date>", where <start> and <end> are the guarantee period boundaries and the <Due Date> is the Due Date of the actual scaling term used.

For an Advance, the Create expected revenue module 19360 queries the due date. The Create expected revenue module 19360 sets the Amount to the term amount and the Due Date to the term Due Date. The Description is "Advance on royalties due to be paid on <Due Date>".

For a Fee, the Create expected revenue module 19360 queries the fee type.

For an Ongoing Fee, the Create expected revenue module 19360 queries the time period. Using this information, the Create expected revenue module 19360 computes the series of fee payments due through the expiration of the license. The Amount is the term amount. The Description is "Ongoing fee for period from <start> to <end>", where <start> and <end> are the time period boundaries.

For a Lump Sum Fee, the Create expected revenue module 19360 sets the Amount to the term amount and the Due Date to the Lump Sum Fee due date. The Description is "Lump-sum fee due on <Due Date>".

For Other Compensation, the Create expected revenue module 19360 queries the Description and Due Date and sets the Expected Revenue Amount to 0 and the Due_Date to the Other Compensation Due Date. The Description is the term Description Modify Compensation Term The modify compensation term use case 25402 is diagramed in FIG. 254. The Modify License Agreement use case uses this one to change existing compensation terms that belong to a license agreement in the Licensing Database 18804. The Licensing Administrator selects a particular term and modifies its attributes. The operation of this use case is further described below.

Step 1. The using use case passes in the object identifier for the license agreement in which the License Administrator wants to change compensation terms.

Step 2. The modify compensation term module 19362 displays a list of the current set of compensation terms for this license in order of term number, displaying the term Description and the Term Type.

Step 3. The License Administrator selects a term for modification.

Step 4. The modify compensation term module 19362 displays the current values. It displays a data entry form for the term given the term type (see Extensions) that display the current values for the selected term.

Step 5. The License Administrator changes any of these values, then ends the use case.

Step 6. The modify compensation term module 19362 updates the term in the Licensing Database 18804.

This use case has a number of extensions:

If the License Administrator presses F1 or the equivalent, the application extends the use case with the Display Help use case.

If the term type is Ongoing Royalty, the Modify compensation term module 19362 displays fields for entering a Time Unit Period (see below) and an ongoing royalty type (Per Unit, Per Sales, Per Royalty (Sublicense), default Per Sales.

If the term type is Ongoing Royalty and the Royalty Type is Royalty Per Unit, the Modify compensation term module 19362 displays fields for entering a Royalty Unit (default 'Unit'), the Estimated Number of Units per Period (default 0), a table for an escalation schedule (Starting Units, Ending Units, and Amount), and a table for Estimated Units (Period Number, Estimated Units).

If the term type is Ongoing Royalty and the Royalty Type is Royalty Per Sales Amount, the Modify compensation term module 19362 displays fields for entering the Percentage, the Net flag (default True), the Estimated Revenue Per Period (default 0), a table for an escalation schedule (Starting Amount, Ending Amount, and Royalty Percentage), and a table for Estimated Revenue (Period Number, Estimated Revenue).

If the term type is Ongoing Royalty and the Royalty Type is Royalty Per Royalty Amount, the Modify compensation term module 19362 displays the same fields as for Royalty Per Sales Amount.

If the Term Type is Minimum Guarantee, the Modify compensation term module 19362 displays fields for entering a Time Unit Period (see below), a Due Date, and a table for an escalation schedule (Start Date, End Date, Amount).

If the Term Type is Advance, the Modify compensation term module 19362 displays the Due Date of the advance and the Refundable flag.

If the Term Type is Fee and the Fee Type is Ongoing Fee, the Modify compensation term module 19362 displays fields for entering a Time Unit Period (see below).

If the Term Type is Fee and the Fee Type is Lump Sum, the Modify compensation term module 19362 displays the Due Date.

If the License Administrator must enter a Time Unit Period, the Modify compensation term module 19362 displays the Time Unit Type, the Start Date, the Recurrence Rate, the Starting Interval, the Interval Unit Type, and the choice of ending the cycle with a specific number of recurrences (Recurring Period) or a specific End Date (End Date Period).

Remove Compensation Term

Figure 255:
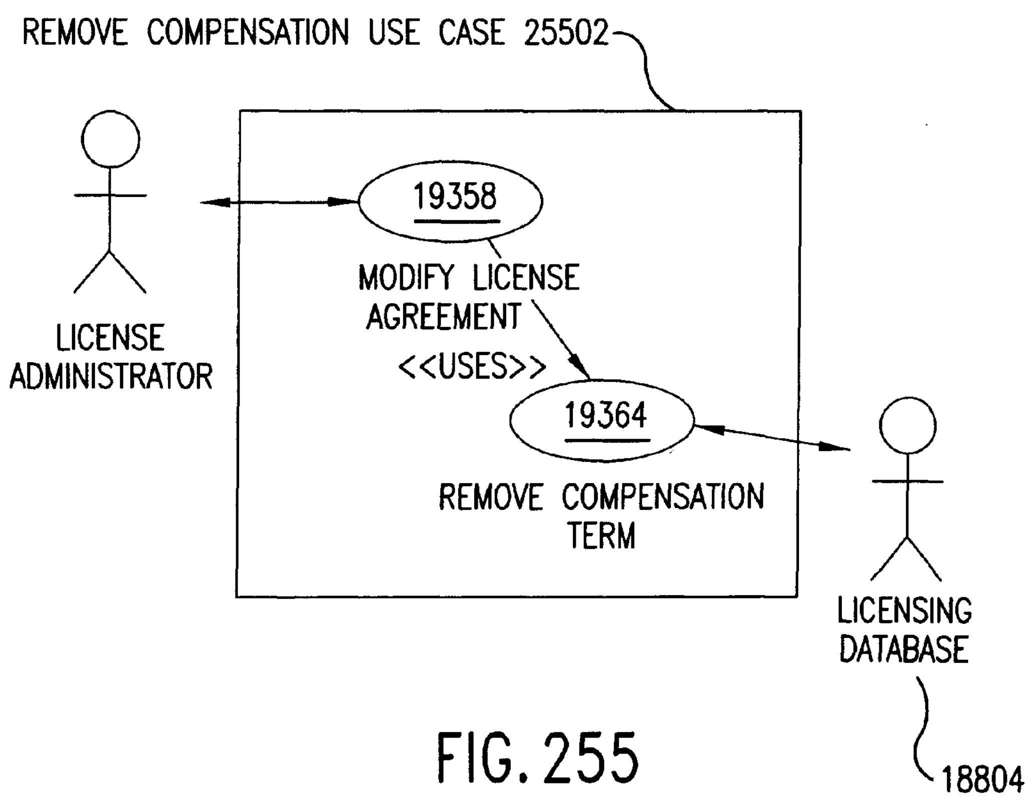

The remove compensation term use case 25502 is diagramed in FIG. 255. The Modify License Agreement use case uses this one to remove existing compensation terms that belong to a license agreement in the Licensing Database 18804. The Licensing Administrator selects a particular term and removes it. The operation of this use case is further described below.

Step 1. The using use case passes in the object identifier for the license agreement in which the License Administrator wants to change compensation terms.

Step 2. The Remove compensation term module 19364 displays a list of the current set of compensation terms for this license in order of term number, displaying the term Description and the Term Type.

Step 3. The License Administrator selects a term to remove.

Step 4. The Remove compensation term module 19364 deletes the information from the Licensing Database and moves it to the Recycle Bin (implementation may differ regarding deferring the actual SQL deletes, and there is no notification of commit to the Administrator).

Query License

Figure 256:
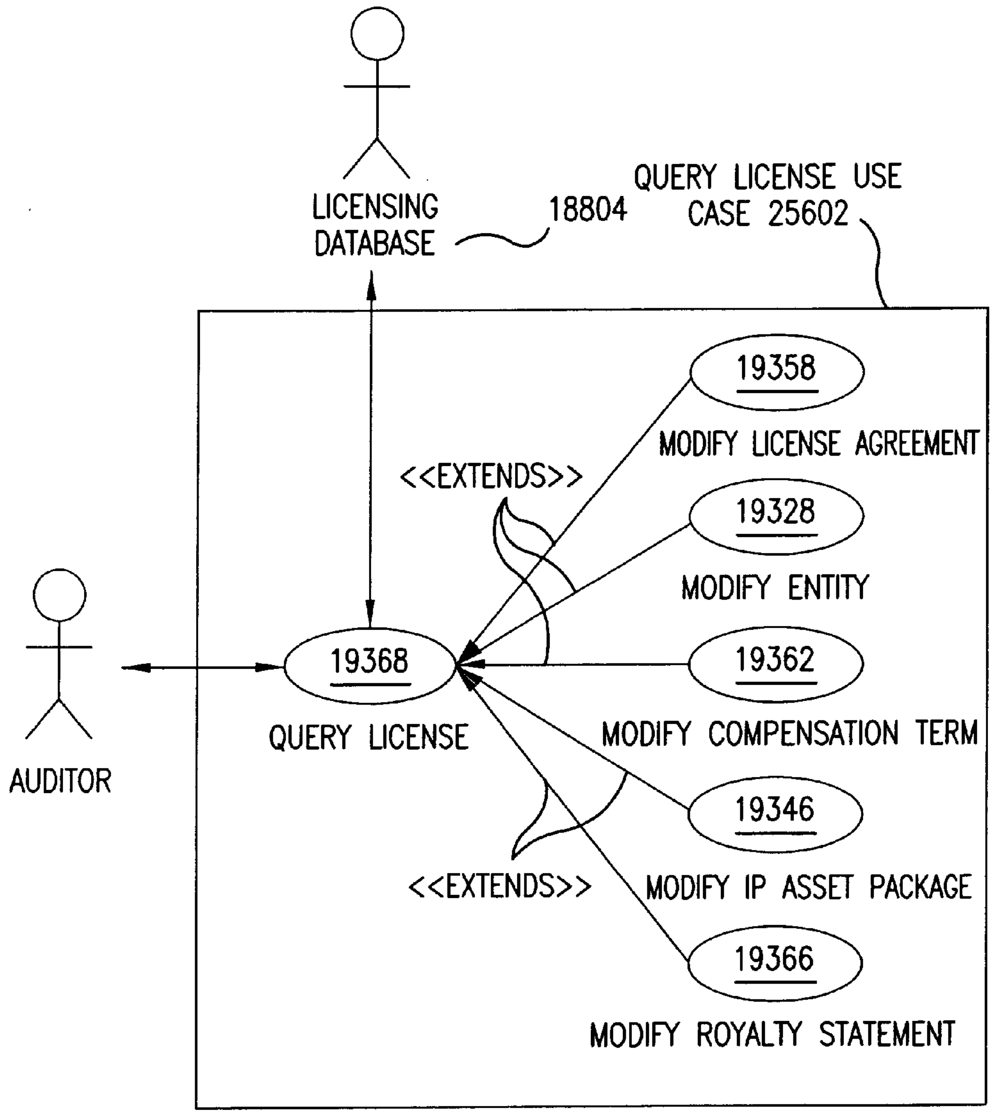

The query license use case 25602 is diagramed in FIG. 256. According to this use case, the Auditor, the Data Entry Clerk, or the License Administrator (and potentially any User) queries a license from the Licensing Database 18804 based on any of the structured fields of the license. The system displays the details of the license agreement, including a list of asset packages, the parties to the agreement, a list of compensation terms, a list of royalty statements, etc. The operation of this use case is further described below.

Step 1. The Auditor starts the transaction. This can be accomplished in a number of ways, such as by selecting Tools, Find, License Agreement from the menu bar (FIG. 243).

Figure 257:
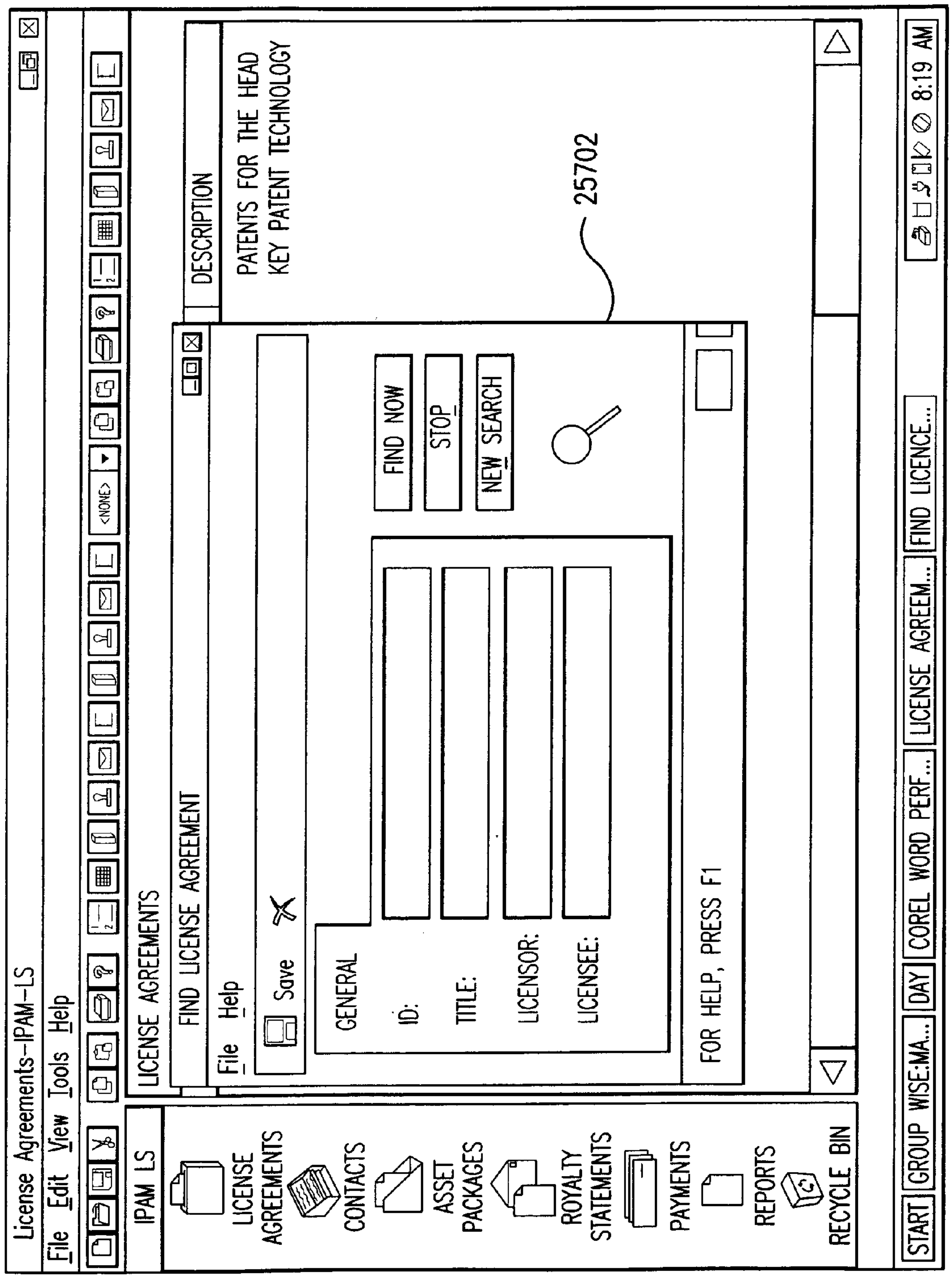

Step 2. The Query license module 19368 displays a query form 25702. (FIG. 257) with any combination of the following structured fields available for query specification: object identifier, Agreement ID, Name, Title, Licensee, Licensor, Description, Effective Date, Exclusivity, Assignable, Transferable, Revocable, Confidential, Terminated, Expiration Date, Perpetual, Infringement Based, Can Sublicense, Annual Audit, Audit at Licensee Expense, Favored Nation, Improvements, Grant Back, Withholding Percentage, Asset Package Name, Field of Use, Territory, Party Name, etc. The example query form 25702 in FIG. 257 shows only a subset of these fields.

Step 3. The Auditor enters the search criteria.

Step 4. The Query license module 19368 queries all the licenses that meet the query criteria from the licensing database 18804 and for which the Auditor has Read access. The Query license module 19368 displays the licenses, preferably showing all of the fields in step 2 except for Party Name, Asset Package Name, Territory, and Field of Use, which are extensions. The Query license module 19368 orders the licenses by Agreement ID.

Step 5. The Auditor ends the transaction.

This use case has a number of extensions:

If the license agreement has any asset packages to which the Auditor has Read access or which the Auditor owns, the Query license module 19368 displays the package name, whether the package is a cross-license package, and the Limitations field in a list ordered by name. If the Auditor selects a package, the Query license module 19368 extends the use case with the Modify IP Asset Package use case.

If the license agreement/package combination has any territorial restrictions, the Query license module 19368 displays the territory's Abbreviation, Full Name, and Description in a list ordered by Abbreviation. The Auditor cannot change territories here but must instead use the Modify License Agreement use case.

If the license agreement/package combination has any field-of-use restrictions, the Query license module 19368 displays the field-of-use Display Name and Description in a list ordered by name. The Auditor cannot change territories here but must instead use the Modify License Agreement use case.

If the license agreement has any parties, the Query license module 19368 displays the entity name and role name of the parties in a list ordered by role name and entity name. If the Auditor selects a party, the Query license module 19368 extends this use case with the Modify Entity use case.

If the license agreement has any compensation terms, the Query license module 19368 displays the term number, term type, and description in a list ordered by term number. If the Auditor selects a term, the Query license module 19368 extends this use case with the Modify Compensation Term use case.

If the license agreement has any royalty statements, the Query license module 19368 displays the royalty statement reporting period in a list ordered by period. If the Auditor selects a statement, the Query license module 19368 extends this use case with the Modify Royalty Statement use case.

If Infringement Based is True, the Query license module 19368 displays the two Infr Based Agreement fields Infringement Release Granted and Infringement Comment.

If the Auditor selects a queried license agreement row, the Query license module 19368 extends the use case with the Modify License Agreement use case.

If the Auditor presses F1 or the equivalent, the application extends the use case with the Display Help use case.

Modify License Agreement

Figure 258:
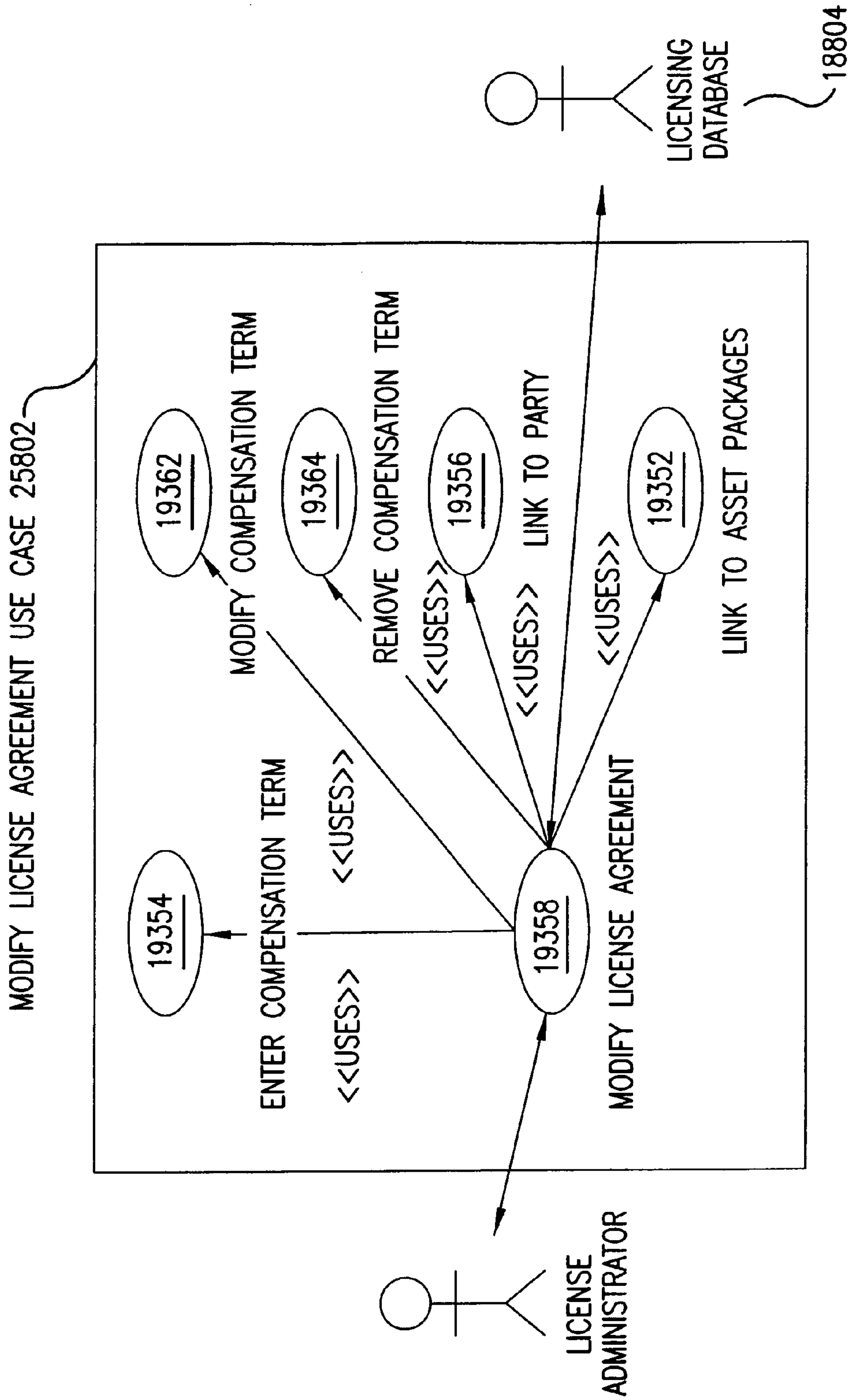

The modify license agreement use case 25802 is diagramed in FIG. 258. According to this use case, the Data Entry Clerk modifies a license agreement in the Licensing database 18804. Modifying the agreement entails entering/revising structured data (name, description, effective date, and so on). The Data Entry Clerk can edit or add new compensation terms that describe the fee and royalty structure of the agreement. The Data Entry Clerk can revise the links between the agreement and the set of asset packages representing the licensed IP assets. The Data Entry Clerk can revise the links between the agreement and the set of entity roles that identify the various parties to the agreement (licensor, licensees, attorneys, and so on). This use case is further described below.

Step 1. The License Administrator begins the transaction.

Step 2. The Modify license agreement module 19358 displays the License Agreements in the Licensing Database.

Step 3. The License Administrator chooses a license agreement to modify.

Step 4. If the License Administrator has write permission on the selected document, the Modify license agreement module 19358 displays the license agreement in a data entry form such as that used in the Enter License Agreement use case and shows the current values of all fields. See FIG. 245.

Step 5. The License Administrator modifies any of the structured fields and linked objects of the license agreement in any order Step 5.1. The License Administrator modifies the structured fields of the agreement: the Agreement ID, the Name, Description, Effective Date, Expiration Date, Exclusivity, Assignable, Transferable, Revocable, Confidential, and Terminated.

Step 5.2. The License Administrator modifies the structured fields of the license agreement: Perpetual, Infringement Based (see Extensions), Can Sublicense, Annual Audit, Audit at Licensee Expense, Favored Nation, Improvements, Grant Back, and Withholding Percentage.

Step 5.3. The License Administrator uses the Link to Asset Packages use case to modify the set of asset packages for the license.

Step 5.4. The License Administrator uses the Enter Compensation Term use case to create the compensation terms for the license. This step can be repeated.

Step 5.5. The License Administrator uses the Remove Compensation Term use case to remove any unwanted compensation terms from the license to the Recycle Bin. This step can be repeated.

Step 5.6. The License Administrator uses the Link to Party use case to modify the set of parties to the agreement. Required parties include one licensor and at least one licensee. You can also add other parties such as attorneys and other roles entered through the Add Role use case by the System Administrator. This step can be repeated.

Step 5.7. The License Administrator selects a different Security Class for the document from a list of available security classes.

Step 6. The License Administrator commits the transaction.

Step 7. The Modify license agreement module 19358 updates the Agreement, License Agreement, and Infr Based Agreement objects in the Licensing Database 18804 and confirms the commit to the License Administrator.

This use case has a number of extensions:

If the asset package or packages the License Administrator wants to add do not exist, extend the use case with the Create IP Asset Package use case to create the appropriate package(s).

If the correct entity the License Administrator wants to add does not exist, extend the use case with the Enter Entity use case to create the appropriate entity.

If the License Administrator presses F1 or the equivalent, the application extends the use case with the Display Help use case.

Remove License Agreement

Figure 259:
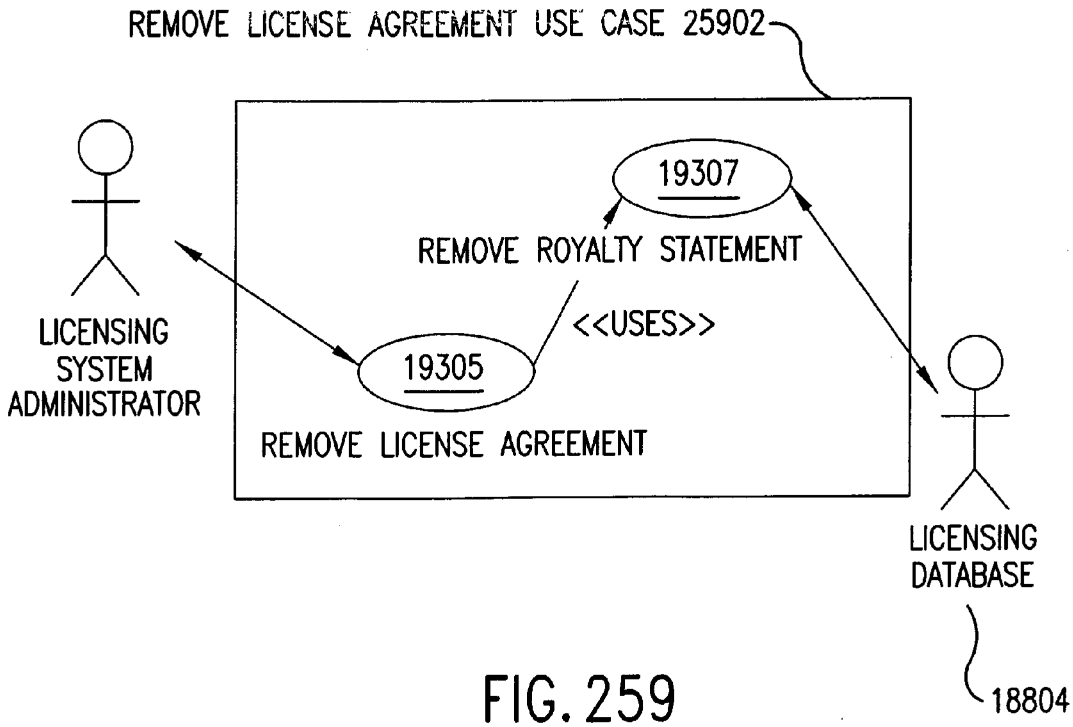

The remove license agreement use case 25902 is diagramed in FIG. 259. This is preferably an administrator use case. According to this use case, the license system Administrator removes a license agreement and its related data from the Licensing Database 18804, including infringement information, compensation terms, expected revenue, royalty statements, party links, asset package links, territorial restrictions, and field-of-use restrictions. The operation of this use case is described below.

Step 1. The License system Administrator begins the transaction.

Step 2. The Remove license agreement module 19305 displays a list of all the licenses in the Licensing Database, displaying the document ID, the Agreement ID, and the Name.

Step 3. The License system Administrator selects one or more license agreements and removes them.

Step 4. The Remove license agreement module 19305 uses the Remove Royalty Statement use case to remove the Royalty Statements with the agreements.

Step 5. The Remove license agreement module 19305 deletes the information from the Licensing database 18804 and moves it to the Recycle Bin (implementation may differ regarding deferring the actual SQL deletes, and there is no notification of commit to the License system Administrator).

This use case has a number of extensions:

At any time until clearing the Recycle Bin, the administrator can restore the removed License Agreement and its related information.

If the License system Administrator presses F1 or the equivalent, the application extends the use case with the Display Help use case.

Print License

Figure 260:
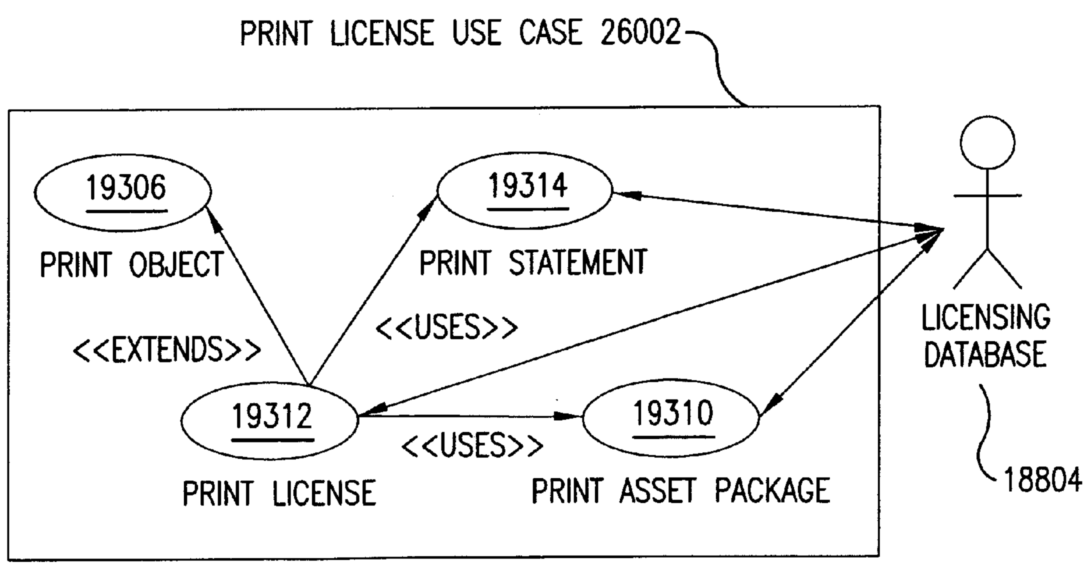

The print license use case 26002 is diagramed in FIG. 260. This use case extends the Print Object use case. The System prints a License Agreement, including all information in the Licensing Database 18804 about the agreement, its parties, its compensation terms, its asset packages (with territorial and field-of-use restrictions), its royalty statements, and the expected revenue and payments received to date. The operation of this use case is further described below.

Step 1. The Actor in the Print Object use case selects a License Agreement and prints it.

Step 2. The Print license module 19312 prints a formatted report with the Document ID, the Agreement ID, the Name, the Description, the Effective Date, the Expiration Date, and the various clause flags as check boxes.

Step 3. The Print license module 19312 prints the parties to the agreement, with name, organization, and primary contact information.

Step 4. The Print license module 19312 prints the compensation terms of the agreement, printing the Term Number, Term Type, and the Description of each term along with the currency symbol and the Amount and any Due Date for the term.

Step 5. The Print license module 19312 prints the Asset Packages for the license using the Print Asset Package use case.

Step 6. The Print license module 19312 prints the Royalty Statements received for the license using the Print Royalty Statement use case.

Step 7. The Print license module 19312 prints the Expected Revenues and the Payments linked to them, printing the Payment Number, Amount, and Due Date for each Revenue and the Payment ID, Receipt Date, Currency Unit Symbol, and Amount Allocated for each Payment.

Administer Territories

Figure 261:
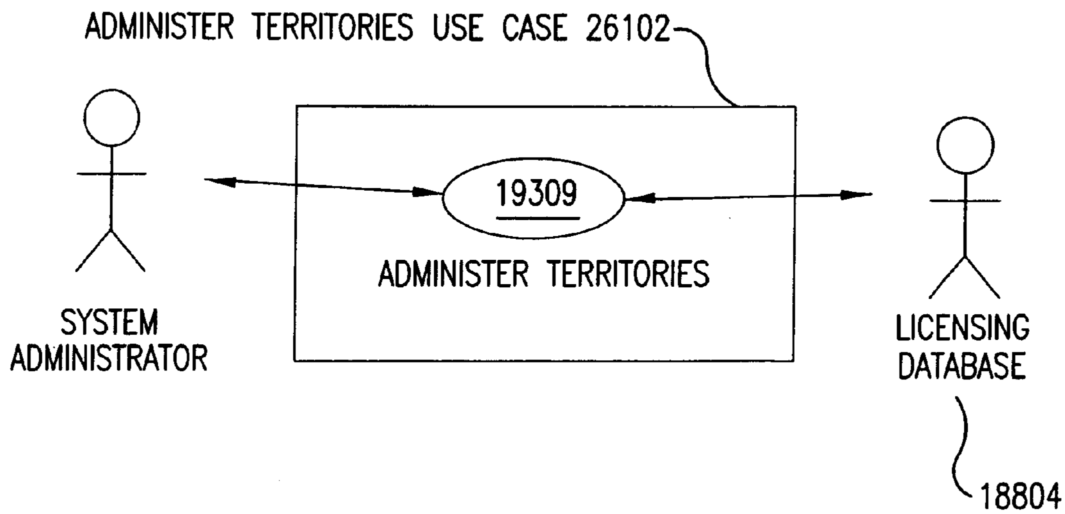

The administer territories use case 26102 is diagramed in FIG. 261. This is preferably an administrator use case. According to this use case, the system Administrator creates, modifies, and/or removes territories from the Licensing Database 18804. The system comes preinstalled with the territories Worldwide, USA, Japan, and EU. The operation of this use case is further described below.

Step 1. The System Administrator starts the transaction.

Step 2. The Administer territories module 19309 displays a list of Territories, displaying the Territory ID, Abbreviation (such as EUSA), Full Name (such as East Coast of the United States of America), and Description (such as "the region including all eastern states of the United States of America").

Step 3. The System Administer takes one of the following actions:

Step 3.1. The System Administrator creates a new Territory, entering the Abbreviation, Full Name, and Description (the Administer territories module 19309 generates the Territory ID).

Step 3.2. The System Administrator selects one of the current Territories and modifies the Abbreviation, the Full Name, or the Description.

Step 3.3. The System Administrator selects one of the current Territories and sets that territory to be the default.

Step 3.4. The System Administrator selects one of the current Territories and removes it.

Step 4. The System Administrator ends the transaction.

Step 5. The Administer territories module 19309 commits the changes in the Licensing Database 18804. The Administer territories module 19309 confirms the commit to the System Administrator.

This use case has a number of extensions:

If the System Administrator presses F1 or the equivalent, the application extends the use case with the Display Help use case.

If removing a territory, the Administer territories module 19309 deletes the information from the Licensing database 18804 and moves it to the Recycle Bin (implementation may differ regarding deferring the actual SQL deletes, and there is no notification of commit to the System Administrator). The Administer territories module 19309 confirms the commit to the System Administrator. At any time until clearing the Recycle Bin, the administrator can restore the removed Territory and its related information.

Administer Fields of Use

Figure 262:
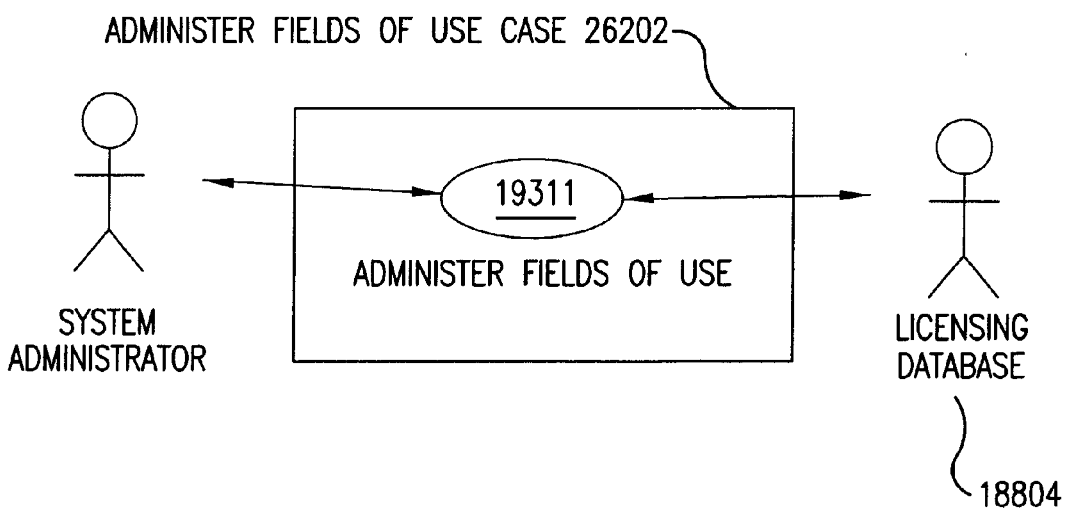

The administer fields of use case 26202 is diagramed in FIG. 262. This is preferably an administrator use case. According to this use case, the system Administrator creates, modifies, and/or removes fields of use from the Licensing Database 18804. The operation of this use case is further described below.

Step 1. The System Administrator starts the transaction.

Step 2. The Administer fields of use module 19311 displays a list of Fields of Use, displaying the Field of Use ID, Display Name (for example, "semi"), and Description (for example, "semiconductor applications").

Step 3. The System Administer takes any of the following actions:

Step 3.1. The System Administrator creates a new Field of Use, entering the Display Name and Description (the Administer fields of use module 19311 generates the Field of Use ID).

Step 3.2. The System Administrator selects one of the current Fields of Use and modifies the Display Name or the Description.

Step 3.3. The System Administrator selects one of the current Fields of Use and sets it to be the default.

Step 3.4. The System Administrator selects one of the current Fields of Use and removes it.

Step 4. The System Administrator ends the transaction.

Step 5. The Administer fields of use module 19311 commits the changes in the Licensing Database 18804. The Administer fields of use module 19311 confirms the commit to the System Administrator.

This use case has a number of extensions:

If the System Administrator presses F1 or the equivalent, the application extends the use case with the Display Help use case.

If removing a Field of Use, the Administer fields of use module 19311 deletes the information from the Licensing database 18804 and moves it to the Recycle Bin (implementation may differ regarding details for deferring the actual SQL deletes, and there is no notification of commit to the System Administrator). The Administer fields of use module 19311 confirms the commit to the System Administrator. At any time until clearing the Recycle Bin, the administrator can restore the removed Field of Use and its related information.

Display License Agreements

Figure 329:
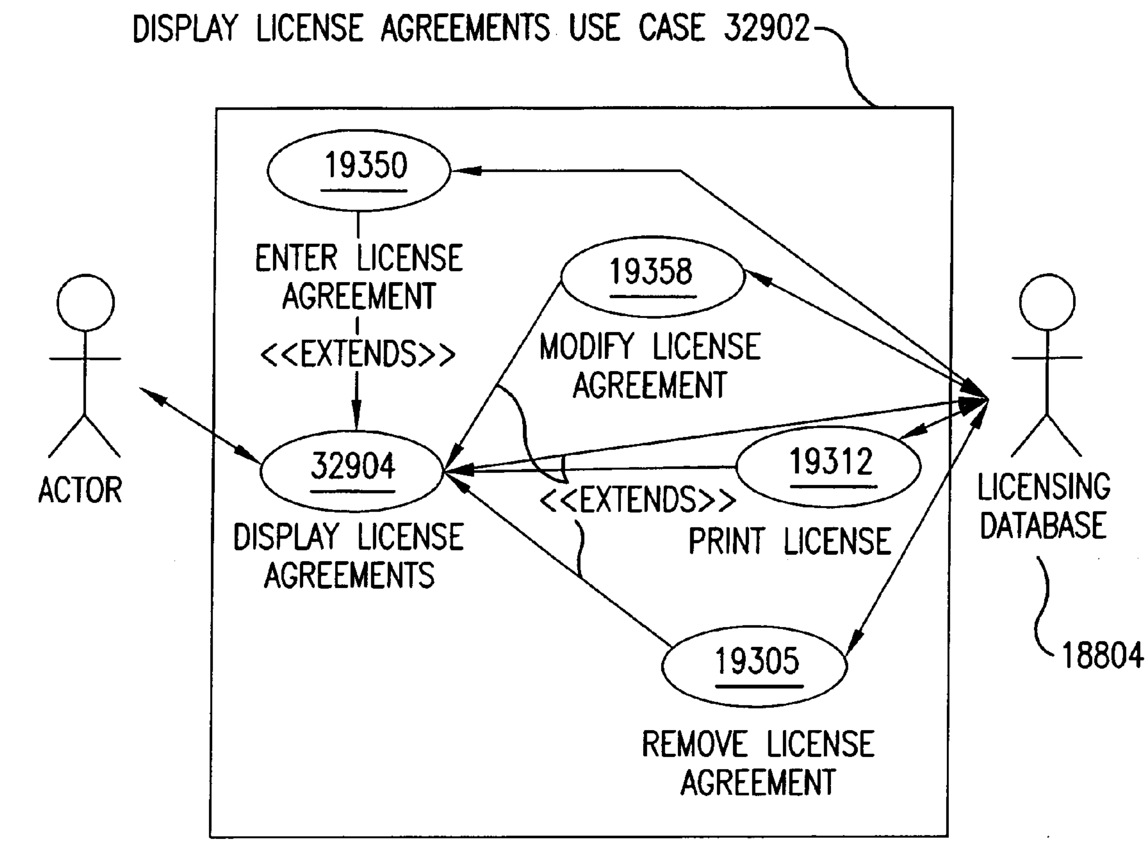

The display license agreements use case 32902 is diagramed in FIG. 329. This use case displays a table of license agreements with the basic data for each agreement. The Actor may select one or more agreements and conduct further operations such as Modify License Agreement. The operation of this use case is further described below.

Step 1. The Actor starts the transaction.

Step 2. The display license agreements module 32904 displays a table of all the License Agreements to which the Actor has read access. Each row of the table corresponds to a License Agreement The columns include the License Agreement ID, the Name, the Description, the Effective Date, the Expiration Date, the Withholding Percentage, and a series of checkbox items: Exclusivity, Assignable, Transferable, Revocable, Confidential, Terminated, Perpetual, Infringement Based, Can Sublicense, Annual Audit, Audit At Licensee Expense, Favored Nation, Improvements, and Grant Back.

Step 3. The Actor ends the transaction.

This use case has a number of extensions:

If the Actor wants to enter a new license, the Enter License Agreement use case extends this one in a separate transaction. When the extending use case ends, the display license agreements module 32904 displays the new license and its fields in the table.

If the Actor wants to see or modify the details of the license agreement, the Modify License Agreement use case extends this one in a separate transaction. The Actor selects a license agreement from the table and initiates the extending use case. The saved changes from the extending use case appear in the table when that use case ends.

If the Actor wants to print a license agreement, the Print License use case extends this one. The Actor selects one or more license agreements from the table and initiates the extending use case.

If the Actor is the License Administrator and wants to remove the selected licenses, the Remove License Agreement use case extends this one. The Actor selects one or more license agreement from the table and initiates the extending use case. When the extending use case returns, the display license agreements module 32904 removes the selected license or licenses from the table.

Enter Adjustment

Figure 333:
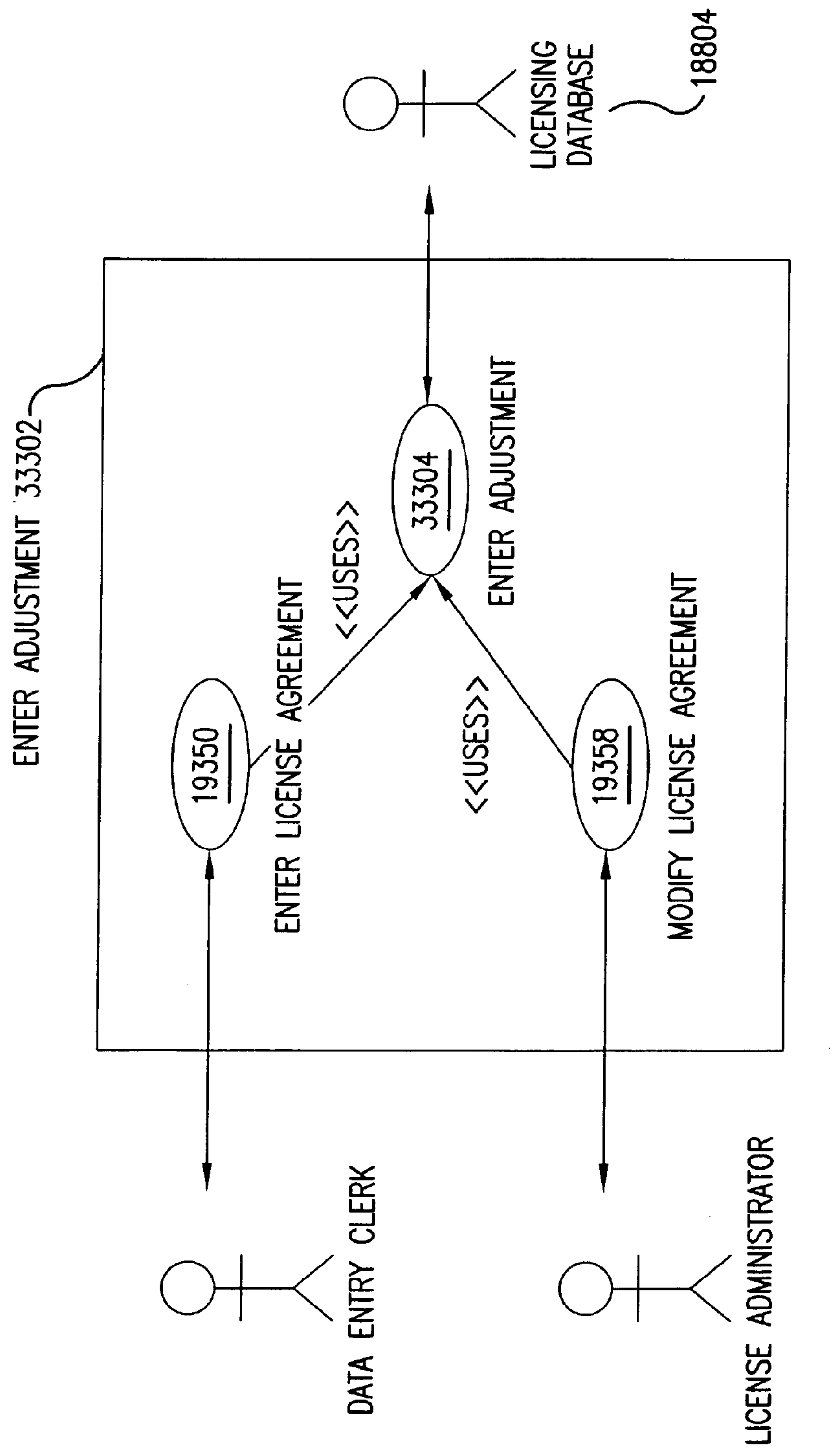

The enter adjustment use case 33302 is diagramed in FIG. 333. The Enter License Agreement and Modify License Agreement use cases use this one to enter adjustments to compensation terms in a license agreement in the Licensing Database 18804. The Licensing Administrator or Data Entry Clerk creates an adjustment with the details appropriate to the particular kind of adjustment. Adjustments have a description, an amount, a currency, and a due date. A minimum guarantee also has a time period and possible escalations. An advance may be refundable or not.

The adjustments modify the revenue stream that compensation terms generate, and the Link Adjustment to Terms use case relates an adjustment to the terms that generate the revenue that it adjusts.

It will be illustrative to consider selected background items. A license agreement structures its revenue stream based on a combination of fees and royalty payments (and possibly some other kinds of compensation). The agreement also contains terms that affect the revenue from these terms, the minimum guarantee and the advance.

A minimum guarantee is an amount of money that the licensor must receive by the end of the guarantee period, usually one year but sometimes quarterly or some other period. If the revenue from certain compensation terms does not add up to this amount, the licensee must make up the difference.

An advance is an amount paid to the licensor by the licensee in advance of revenue (usually royalties). The licensee then subtracts the advance amount from the compensation due until the entire amount of the advance is accounted for. From that point on, the licensee then begins payments to the licensor.

Any given adjustment may cover any number of different compensation terms for the same license. For example, an advance may cover an initial fee and a series of royalty payments. A minimum guarantee could cover two or three different royalty terms but not a maintenance fee.

The operation of this use case is further described below.

Step 1. The using use case passes in the object identifier for the license agreement to which the Data Entry Clerk or License Administrator (the Actor) wants to add adjustments.

Step 2. The enter adjustment module 33302 displays a list of the current set of adjustments for this license in preferably order of term number, displaying the Description, the Amount with its currency symbol, the Due Date, and the Adjustment Type.

Step 3. The Actor creates a new adjustment and selects one of the term types (Minimum Guarantee or Advance).

Step 4. The enter adjustment module 33302 displays the adjustment with default values (Amount 0, Currency from the last term or the default currency for the system, and Due_Date empty). It displays a form for the term given the default term type (see Extensions).

Step 5. The Actor enters the standard details for the adjustment and the details for the particular term type (see Extensions), then either repeats from step 3 or ends the use case.

Step 6. The enter adjustment module 33302 inserts the new terms into the Licensing Database 18804.

This use case has a number of extensions.

If the Actor presses F1 or the equivalent, the application extends the use case with the Display Help use case.

If the Term Type is Minimum Guarantee, the Actor uses the Enter Recurring Time Period use case to enter a Recurring Period (see below) or enters a Single Date. Optionally, the Actor enters a table for an escalation schedule (an Open Ended Period and an Amount for each row of the table). The enter adjustment module 33302 inserts the items into the Minimum_Guarantee table and the Date_Amount_Interval table.

If the Term Type is Advance, the enter adjustment module 33302 displays a field for entering a Single Date representing the due date of the advance and a field for the Refundable flag. The enter adjustment module 33302 inserts these into the Advance table.

If the Actor must enter a Recurring Period for a minimum guarantee, the enter adjustment module 33302 displays the Time Unit, the Start Date, the Recurrence Rate, the Starting Interval, the Interval Unit, and the choice of ending the cycle with a specific number of recurrences (Count Limited Recurring Period) or a specific End Date (Date Limited Recurring Period).

Modify Adjustment

Figure 337:
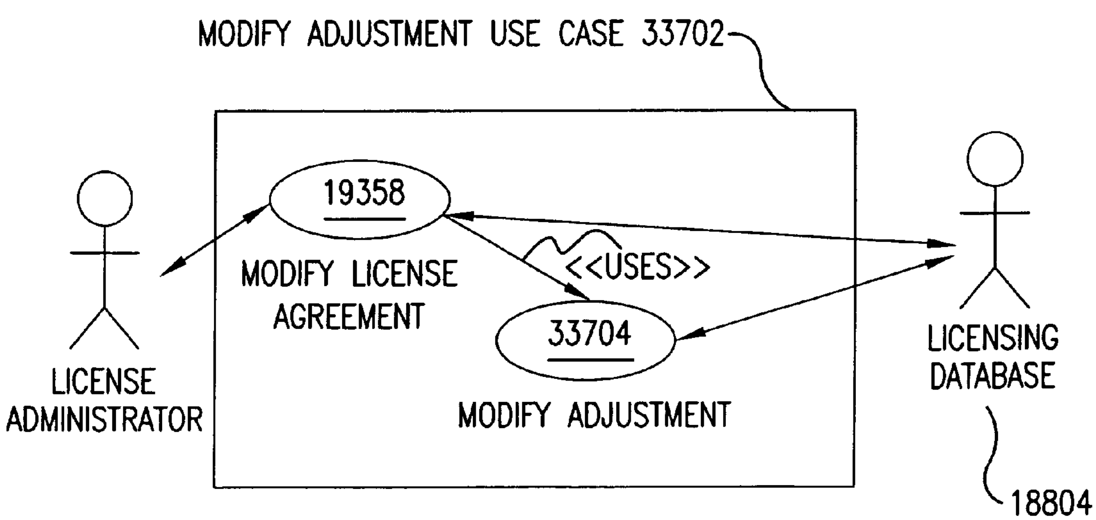

The modify adjustment use case 33702 is diagramed in FIG. 337. The Modify License Agreement use case uses this one to change existing adjustments that belong to a license agreement in the Licensing Database 18804. The Licensing Administrator selects a particular adjustment and modifies its attributes.

The Licensing Administrator also modifies the links between adjustments and compensation terms for the license agreement in the Link Adjustment to Terms use case. See the Enter Adjustment use case for background material on adjustments.

The operation of this use case is further described below.

Step 1. The using use case passes in the object identifier for the license agreement in which the License Administrator wants to change adjustments.

Step 2. The modify adjustment module 33704 displays a list of the current set of adjustments for this license in order of term number, displaying the term Description and the Term Type.

Step 3. The License Administrator selects an adjustment for modification.

Step 4. The modify adjustment module 33704 displays the current values for the selected adjustment through a data entry form for the adjustment, including due date, currency, amount, or description.

Step 5. The License Administrator changes any of these values, then ends the use case.

Step 6. The modify adjustment module 33704 updates the adjustment in the Licensing Database 18804.

If the License Administrator presses F1 or the equivalent, the application extends the use case with the Display Help use case.

If the Term Type is Minimum Guarantee, the modify adjustment module 33704 displays fields for entering a Recurring Period (see below) and a table for an escalation schedule (an Open Ended Period and an Amount). The License Administrator may add or remove intervals from the escalation schedule or may change the amount or start date for an existing interval.

If the Term Type is Advance, the modify adjustment module 33704 displays the Due Date of the advance and the Refundable flag.

If the Actor must enter a Recurring Period, the modify adjustment module 33704 displays the Time Unit, the Start Date, the Recurrence Rate, the Starting Interval, the Interval Unit, and the choice of ending the cycle with a specific number of recurrences (Count Limited Recurring Period) or a specific End Date (Date Limited Recurring Period).

If the modification to the adjustment affects the expected revenue for the license agreement, then all the expected license revenues not linked to any payment and affected by the adjustment are removed and replaced with the changed values.

Link to Adjustment

Figure 338:
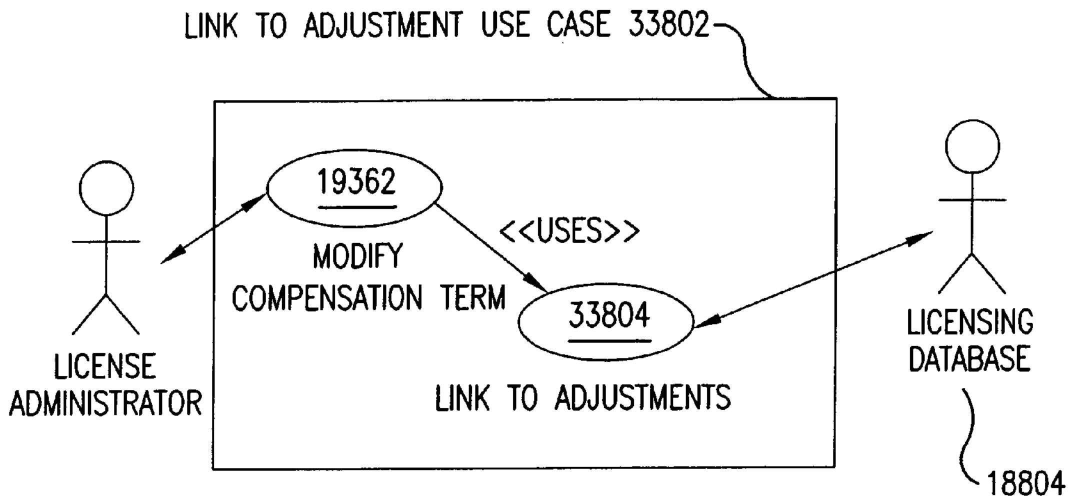

The link to adjustment use case 33802 is diagramed in FIG. 338. According to this use case, a License Administrator selects one or more adjustments from a list. The link to adjustment module 33802 creates a link between the input compensation term and the selected adjustments.

It will be illustrative to consider selected background items. The invention allows one to adjust the revenue stream from a compensation term through advances or minimum guarantees. These are adjustment objects that are part of the license.

The advance is a payment from the licensee to the licensor in anticipation of revenue from the license. When the revenue comes due, the amount from the compensation terms covered by the advance is reduced by the amount of the advance until the revenue accounts for the entire advance.

The minimum guarantee is a floor for revenue during a specific period, usually a year. If the revenue for that period does not come up to the guaranteed amount, the difference becomes due as a separate payment.

Advances and minimum guarantees may apply to only certain compensation terms associated with the license. Linking the compensation terms to the adjustments lets you specify exactly how to adjust the revenue generated from the compensation terms in the Create Expected Revenue use case.

The operation of this use case is further described below.

Step 1. The License Administrator starts the use case with an open transaction containing a compensation term that will link to the adjustments. The extended use case supplies the object identifier for the agreement.

Step 2. The link to adjustment module 33804 displays the types and descriptions of the adjustments for the license that owns the compensation term in a list ordered by adjustment number within the license, displaying any existing links.

Step 3. The License Administrator selects one or more adjustments from the list.

Step 4. The adjustment module 33804 creates and displays a link for each adjustment the License Administrator selects.

Step 5. The Licensing Database 18804 links the adjustments to the compensation term through the Term Adjustment association table.

This use case has a number of extensions.

The License Administrator can cancel the use case at any time. The result will be that the compensation term is unchanged from its status before using the use case.

If the License Administrator presses F1 or the equivalent, the application extends the use case with the Display Help use case.

Figure 339:
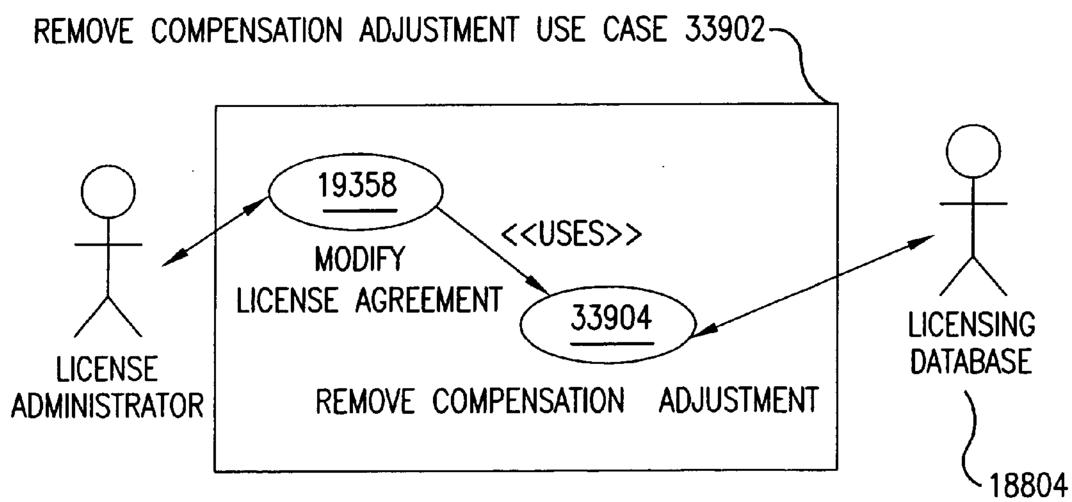

If the License Administrator selects an existing link from a compensation adjustment to a compensation term, he or she can delete the link Remove Compensation Adjustment The remove compensation adjustment use case 33902 is diagramed in FIG. 339. The Modify License Agreement use case uses this one to remove existing compensation adjustments that belong to a license agreement in the Licensing Database 18804. The operation of this use case is further described below.

Step 1. The using use case passes in the object identifier for the license agreement in which the License Administrator wants to change compensation adjustments.

Step 2. The remove compensation adjustment module 33904 displays a list of the current set of compensation adjustments for this license in order of adjustment number, displaying the term Description and the Adjustment Type.

Step 3. The License Administrator selects an adjustment to remove. In an embodiment, the adjustment cannot link to any compensation terms of the license.

Step 4. The remove compensation adjustment module 33904 deletes the information from the Licensing Database 18804 and moves it to the Recycle Bin.

Preferably, if the selected compensation adjustment has any compensation term objects associated with it, the remove compensation adjustment module 33904 refuses to remove the compensation adjustment and instead displays an error message, "Cannot remove this compensation adjustment because there are links to compensation terms of this license."

Royalty Statements Use Cases

A royalty statement is a document that a licensee submits to a licensor to specify the licensed royalties owed for a given royalty period. A royalty statement includes a number of royalty statement details. Each royalty statement detail lists a product, a number of units sold, an amount of revenue, and a calculated royalty amount.

Figure 263A:
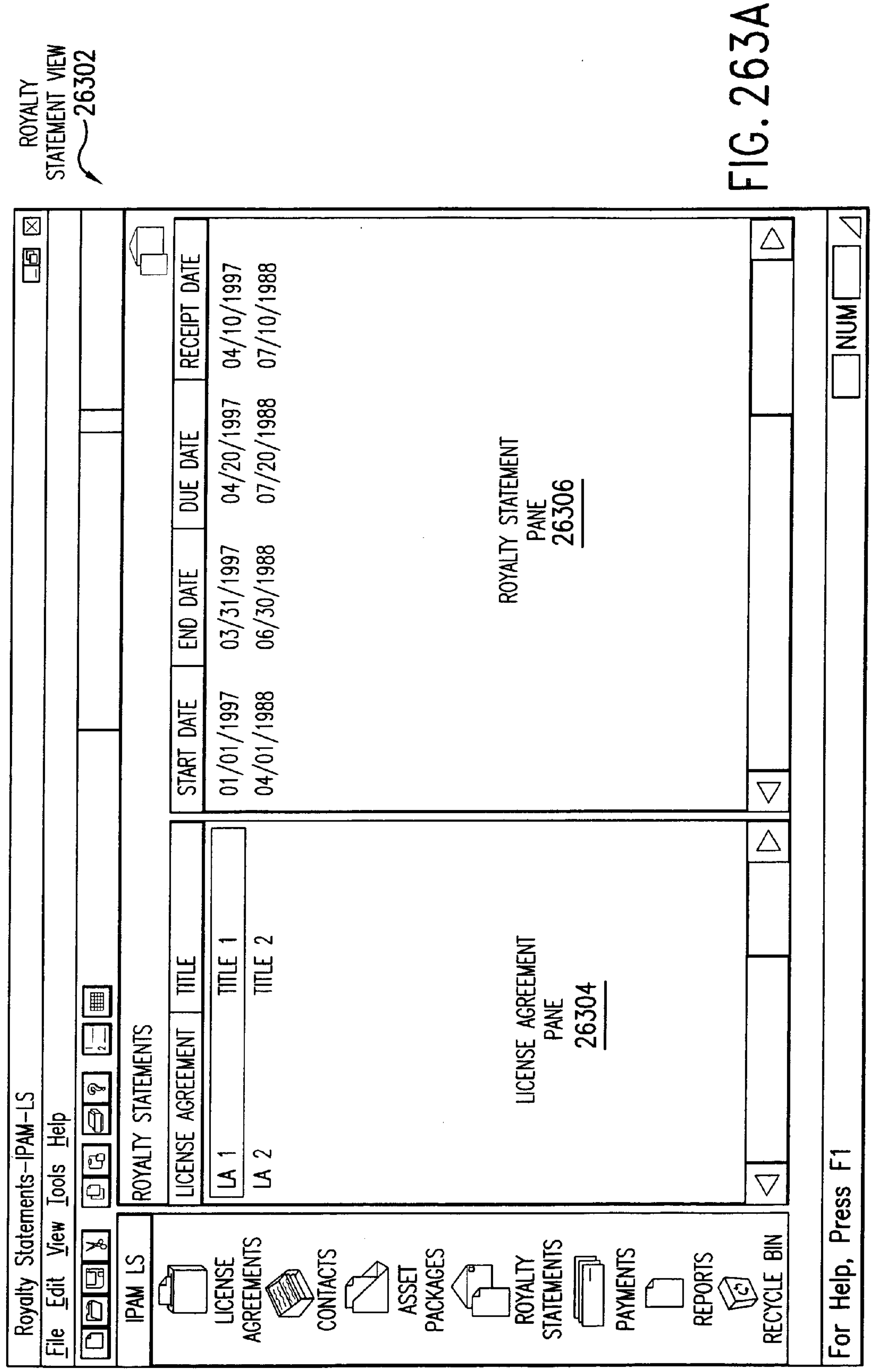

The Royalty Statements View 26302 contains two panes, a license agreement spreadsheet 26304 and a royalty statement spreadsheet 26306. FIG. 263A. The agreement pane 26304 lets you select a license, and the royalty statement pane 26306 displays the royalty statements for that license. You add and modify statements by double-clicking on a blank row or an existing row, as with all the other views.

Enter Royalty Statement

Figure 263B:
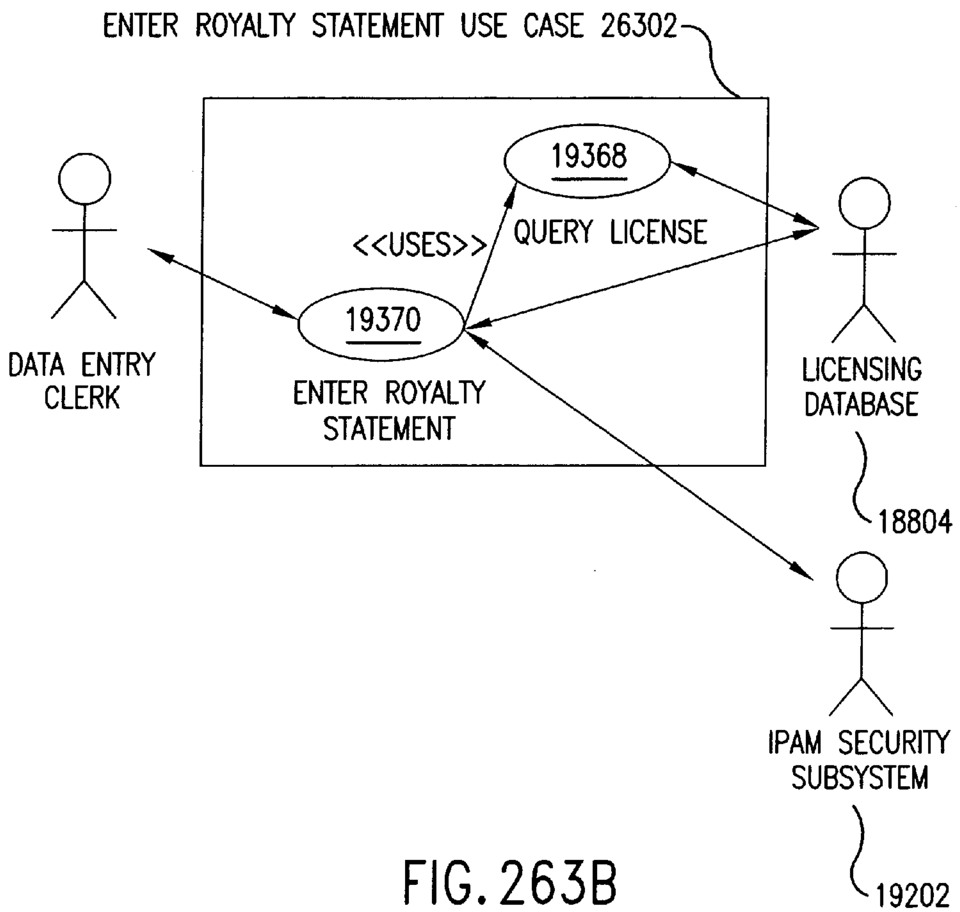
Figure 264:
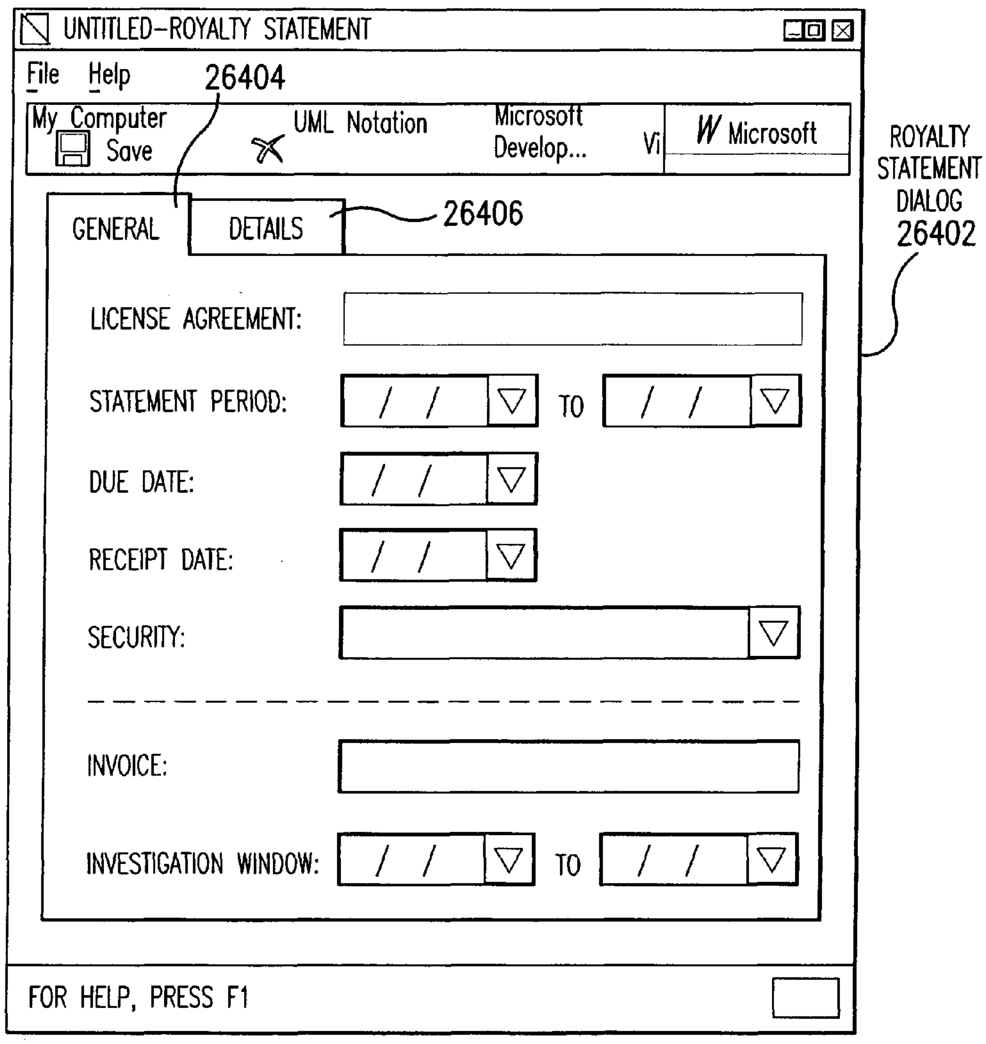

The enter royalty statement use case 26301 is diagramed in FIG. 263B. According to this use case, the Data Entry Clerk queries a license, then enters information about a royalty statement that applies to that license into the database, then enters a series of detail items, one for each product detail on the royalty statement. The new document has the classifier the Data Entry Clerk sets for it. The operation of this use case is further described below.

Step 1. The Data Entry Clerk begins the transaction to enter a new royalty statement. The royalty statement view 26302 (FIG. 263A) is displayed.

Step 2. The Data Entry Clerk uses the Query License use case to identify and select the license to which the new royalty statement applies. Alternatively, the Data Entry Clerk can select a license in the license agreement pane 26304 of the royalty statement view 26302.

Step 3. The Enter royalty statement module 19370 creates an object identifier for the new royalty statement that it uses to relate the statement to the queried license agreement and to the statement details. It then links the royalty statement to the queried license.

Step 4. A royalty statement dialog 26402 (FIG. 264) is displayed. The royalty statement dialog 26402 has a general tab 26404 and a details tab 26406. In the general tab 26404, the Data Entry Clerk enters the Fixed Time Interval for the reporting/statement period (Start Date and End Date). The Data Entry Clerk enters the royalty statement due date, receipt date, and (optionally) an investigation window date and a licensor invoice number. The Data Entry Clerk optionally sets a security classification from a list of available Write classifications from the IPAM Security Subsystem 19202, to indicate the persons who have access to this royalty statement record.

Figure 265:
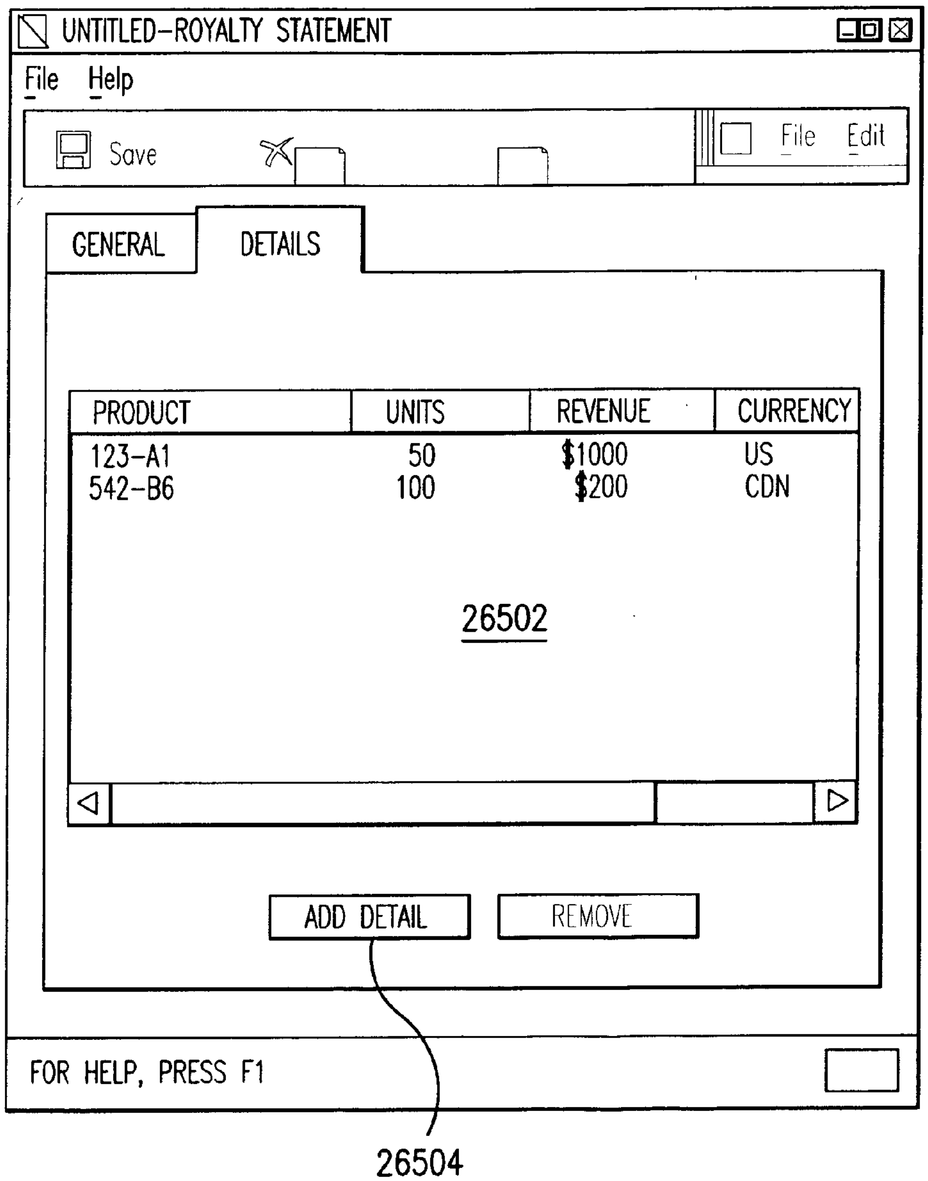
Figure 266:
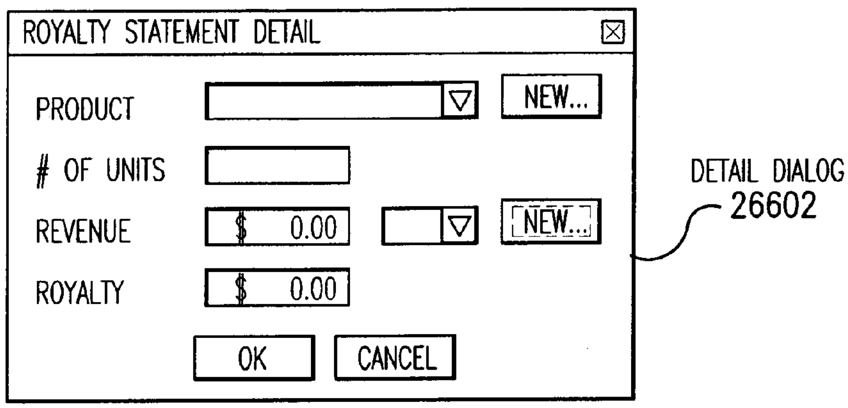

Step 5. In the details tab 26406 (see FIG. 265), for each detail item on the royalty statement, the Data Entry Clerk creates a new detail for the royalty statement record by pressing the Add Detail button 26504. This results in displaying a detail dialog 26602. The Data Entry Clerk enters the product (selecting from a list of products associated with the licensee), the number of units sold of the product, the revenue received from the sale and the currency unit for the revenue, and the royalty due for the product, where this information is obtained from the royalty statement provided by the licensee. All details for the royalty statement are listed in a details area 26502 (FIG. 265).

Step 6. The Data Entry Clerk commits the transaction.

Step 7. The Enter royalty statement module 19370 inserts the Royalty Statement and its details into the licensing database 18804. The Enter royalty statement module 19370 requests the IPAM Security System 19202 to set the document classification. The enter royalty statement module 19370 confirms the commit to the Data Entry Clerk.

At any time, if the Data Entry Clerk presses F1 or the equivalent, the application extends the use case with the Display Context-Sensitive Help use case.

Modify Royalty Statement

Figure 267:
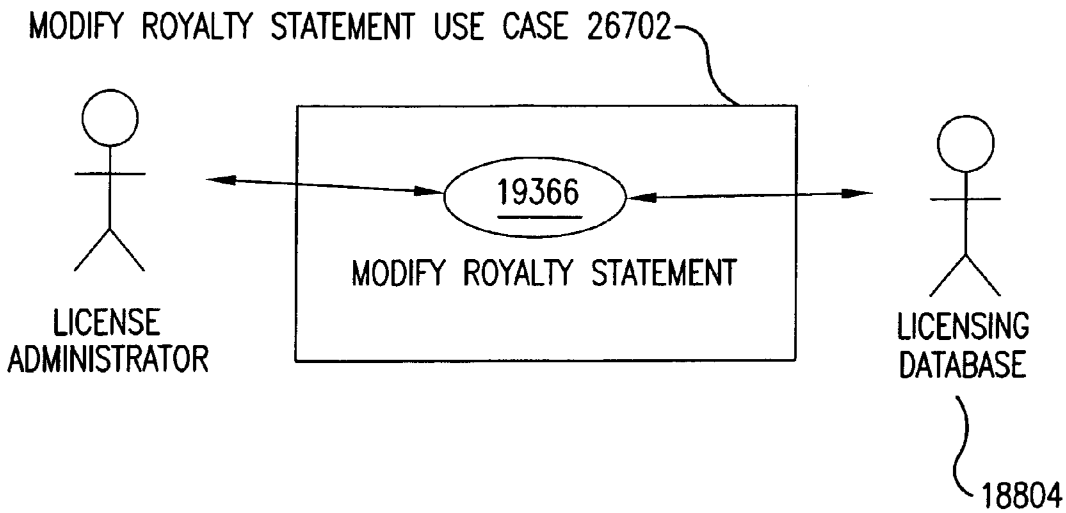

The modify royalty statement use case 26702 is diagramed in FIG. 267. According to this use case, the License Administrator queries a license, then modifies any of the attributes of any of the linked royalty statements, and/or modifies any of the statement details, one for each product detail on the statement. The operation of this use case is further described below.

Step 1. The License Administrator begins the transaction.

Step 2. The Modify royalty statement module 19366 displays the licenses to which the License Administrator has read access, displaying the object identifier, the Agreement ID, the Name, and the Description, in a form similar to that shown in FIG. 263A.

Step 3. The License Administrator selects a license from the license pane 26304.

Step 4. The Modify royalty statement module 19366 displays a list of existing royalty statements attached to the license in the royalty statement pane 26306. The Modify royalty statement module 19366 displays only those royalty statements to which the License Administrator has Read access.

Step 5. The License Administrator selects a royalty statement for modification from the royalty statement pane 26306.

Step 6. If the License Administrator has Write access to the royalty statement, the Modify royalty statement module 19366 displays the current field values in a form similar to that shown in FIG. 264.

Step 7. The License Administrator may modify the royalty statement Invoice Number, Due Date, Receipt Date, or the Investigation Window Date in any order.

Step 8. If the details tab 26406 is selected, the Modify royalty statement module 19366 displays the details for the selected royalty statement, displaying the product, the Units Sold, the Currency, and the Revenue.

Step 9. For each detail item on the royalty statement, the License Administrator can modify the name of the product, the number of units sold, or the revenue received and its currency unit, in any order.

Step 10. The License Administrator commits the transaction.

Step 11. The Modify royalty statement module 19366 updates the royalty statement.

Step 12. If the License Administrator updated the time interval for the reporting period, the Modify royalty statement module 19366 creates a new time interval and adds the new period to the Licensing Database 18804 and removes the previous one if it is not linked to any other statements, making the relevant changes to the Time Period extent as well.

Step 13. For each detail modified, the Modify royalty statement module 19366 updates the detail.

Step 14. The Modify royalty statement module 19366 confirms the commit to the License Administrator.

This use case has a number of extensions:

If the License Administrator wants to move the Royalty Statement to a different license, he or she drags the Royalty Statement to the license and drops it. The Modify royalty statement module 19366 changes the License ID in the Royalty Statement.

If the License Administrator presses F1 or the equivalent, the application extends the use case with the Display Context-Sensitive Help use case.

Query Statement

Figure 268:
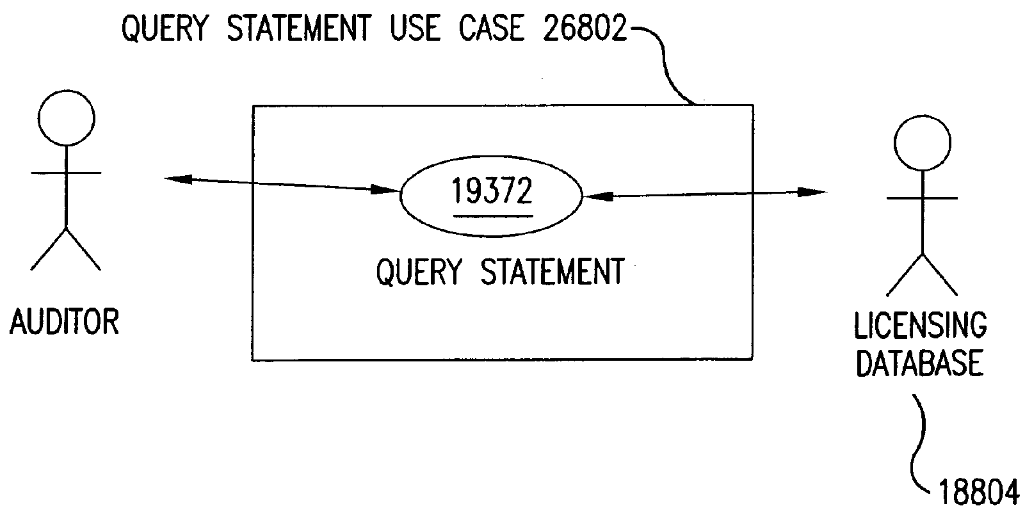

The query statement use case 26802 is diagramed in FIG. 268. According to this use case, the Auditor enters search criteria for the statement, and the Query statement module 19372 displays the statement from the Licensing Database 18804. The Auditor can select a statement to see the statement details, and he or she can select a detail to see any payment allocations for the detail. The operation of this use case is further described below.

Step 1. The Auditor starts the transaction.

Step 2. The Query statement module 19372 displays the licenses to which the Auditor has read access, displaying the object identifier, the Agreement ID, the Name, and the Description in a format similar to that shown in FIG. 263A.

Step 3. The Auditor selects a license for query of statements.

Step 4. The Query statement module 19372 displays a query form that lets the Auditor enter selection conditions on the set of statements, including object identifier, the reporting period Start and End Dates, the Invoice Number, the Due Date, the Receipt Date, and/or the Investigation Window Date.

Step 5. The Auditor enters query criteria and starts the query.

Step 6. The Query statement module 19372 displays the royalty statements for the license in preferably reverse chronological order to which the Auditor has Read access, displaying the object identifier, the reporting period Start and End Dates, the Invoice Number, the Due Date, the Receipt Date, and the Investigation Window Date.

Step 7. The Auditor selects a statement.

Step 8. The Query statement module 19372 queries all the details of the selected royalty statement from the Licensing Database 18804 and displays them, if any, showing the Product, the Units Sold, the Revenue and its currency unit symbol, and the Royalty Due, in a form similar to that shown in FIG. 265.

Step 9. The Auditor selects a detail.

Step 10. The Query statement module 19372 queries all the payment detail allocations from the Licensing Database 18804 and displays the Amount Allocated for each one with a label that allows the Auditor to see it, if any. The Query statement module 19372 displays the Amount Allocated in the currency of the detail, converting it if the currency of the payment is different from the detail currency unit using the Convert Currency use case. The Query statement module 19372 lists the allocations in preferably Receipt Date order.

Step 11. The Auditor ends the transaction.

Remove Royalty Statement

Figure 269:
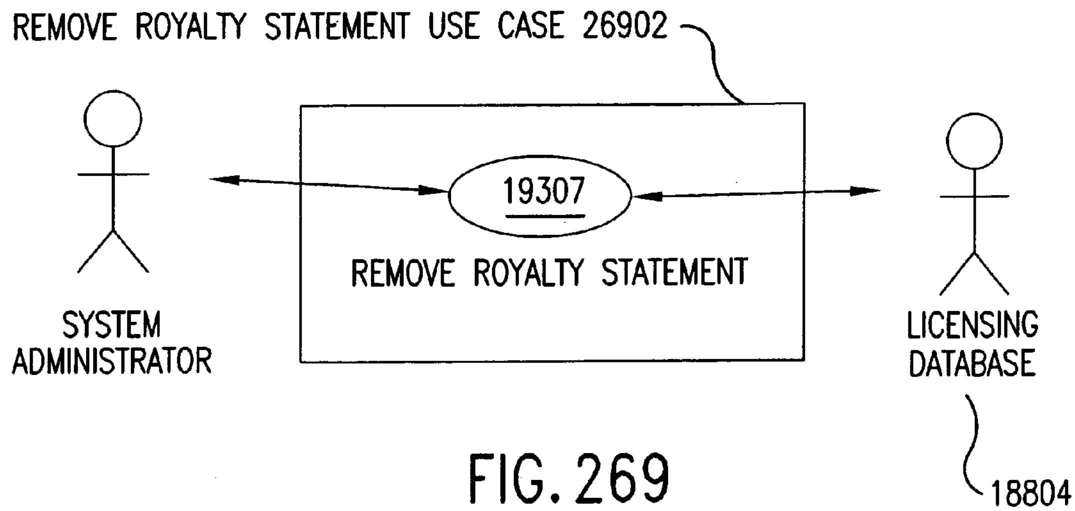

The remove royalty statement use case 26902 is diagramed in FIG. 269. Preferably, this is an administrator use case. According to this use case, the system Administrator removes a linked royalty statement, which removes the statement details as well, all from the Licensing Database 18804. This operation is available only through the System Administrator interface to limit the potential for accidental removal of the data. The operation of this use case is further described below.

Step 1. The System Administrator begins the transaction.

Step 2. The Remove royalty statement module 19307 displays a list of existing royalty statements.

Step 3. The System Administrator selects one or more royalty statements and removes them.

Step 4. The Remove royalty statement module 19307 deletes the information from the licensing database 18804 moves it to the Recycle Bin (implementation may differ regarding details on deferring the actual SQL deletes, and there is no notification of commit to the System Administrator).

This use case has a number of extensions:

If a using use case supplies a license object identifier, the use case shows only the royalty statements for that license (where License_Agreement_ID=:License_ID).

At any time until clearing the Recycle Bin, the administrator can restore the removed royalty statement If the System Administrator presses F1 or the equivalent, the application extends the use case with the Display Help use case.

Print Statement

Figure 270:
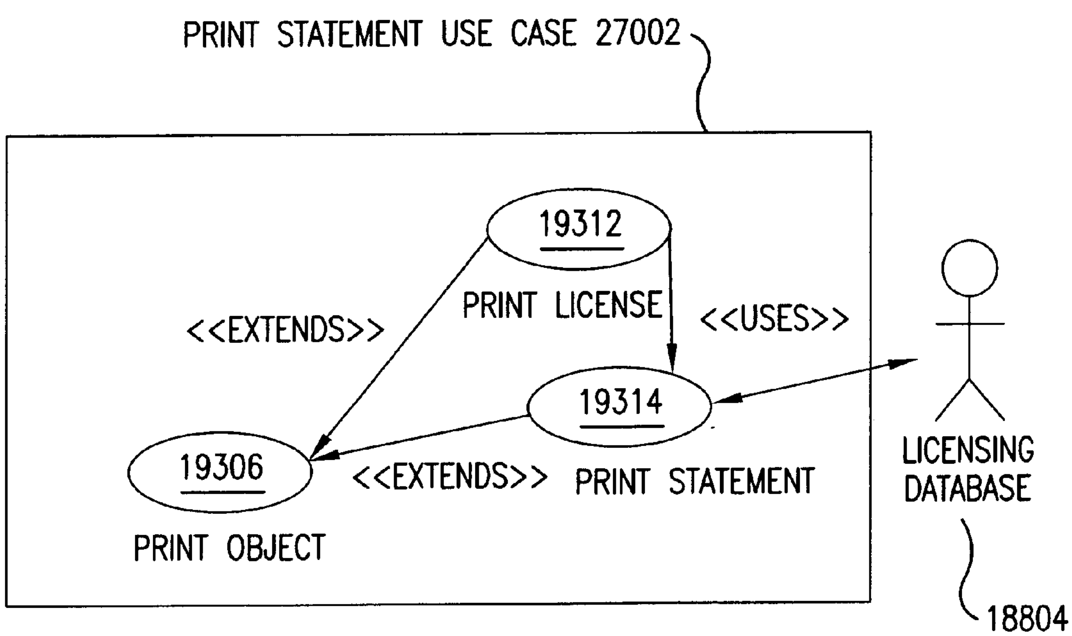
Figure 271:
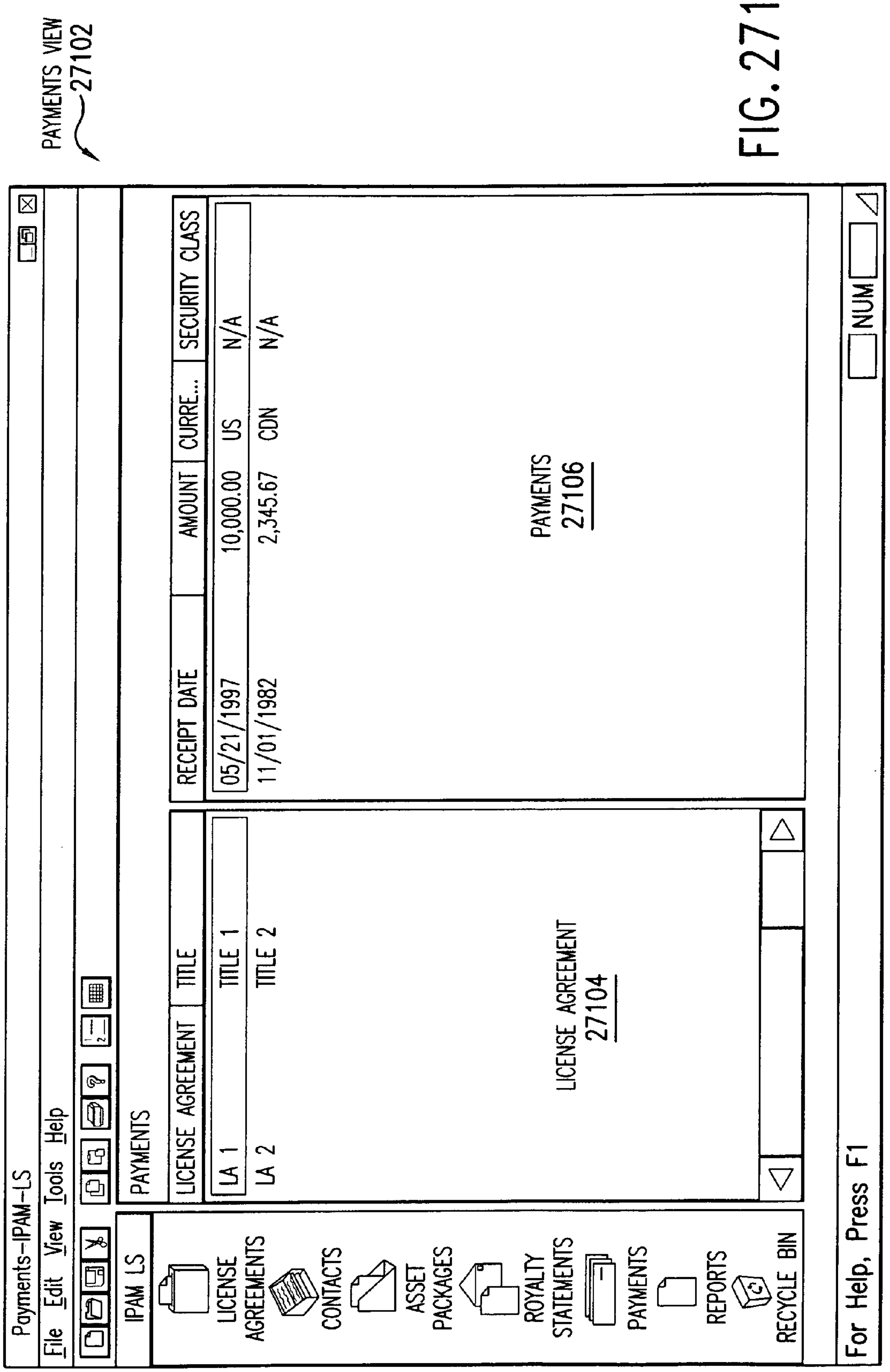

The print statement use case 27002 is diagramed in FIG. 270. This use case extends the Print Object use case, and the Print License use case uses it. The Query statement module 19372 prints a Royalty Statement, including all information in the Licensing Database 18804 about the statement, its details, and the allocation of payments to those details. This use case is further described below.

Step 1. The Actor in the Print Object use case or the Print License Use case selects a Royalty Statement and prints it.

Step 2. The Print statement module 19314 prints a formatted report with the Start Date, End Date, Agreement Name, Agreement ID, any Invoice Number, the Due Date, the Receipt Date, and/or the Investigation Window Date.

Step 3. The Print statement module 19314 prints the Royalty Statement Details for the statement. Each detail contains the Product Name, Product Description, Units Sold, Revenue, Currency Unit Symbol, and/or Royalty Due.

Step 4. For each detail, the Print statement module 19314 prints any payment allocations, printing the Payment ID, the Receipt Date, any Invoice Number, the Payor Name, the Amount Allocated, the Currency Unit Symbol, the Payment Amount, and/or the Payment Withheld Amount, preferably ordering the list by receipt date of the payment.

Display Royalty Statements

Figure 334:
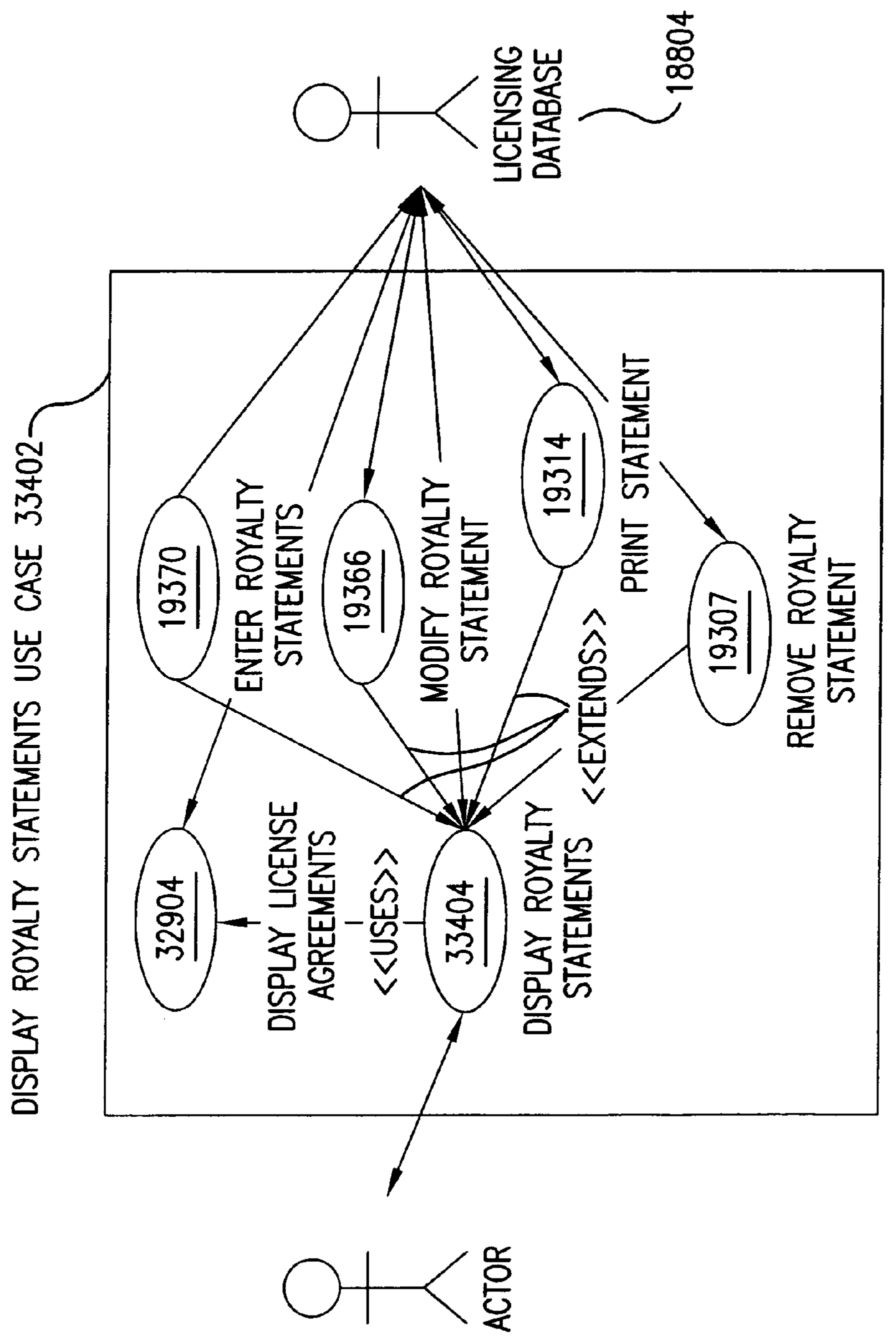

The display royalty statements use case 33402 is diagramed in FIG. 334. This use case displays a table of licenses and a table of royalty statements with the basic data for each agreement and statement within the agreement. The Actor may select an agreement. The display royalty statements module 33404 then displays all the royalty statements to which the Actor has read access that belong to the selected license agreement. The Actor may then select one or more statements within the agreement. The operation of this use case is further described below.

Step 1. The Actor starts the transaction.

Step 2. The display royalty statements module 33404 displays a table of all the License Agreements to which the Actor has read access using the Display License Agreements use case.

Step 3. The Actor selects a single license agreement from that table.

Step 4. The display royalty statements module 33404 displays a table of all the Royalty Statements from the Licensing Database 18804 to which the Actor has read access. Each row of the table corresponds to a single Royalty Statement The columns include the Reporting Period's Start Date and End Date, the Invoice Number, the Due Date, the Receipt Date, and the Investigation Window Date.

Step 5. The Actor ends the transaction.

If the Actor wants to enter a new royalty statement, the Enter Royalty Statement use case extends this one in a separate transaction. When the extending use case ends, the System displays the new statement and its fields in the table.

If the Actor wants to see or modify the details of the Royalty Statement, the Modify Royalty Statement use case extends this one in a separate transaction. The Actor selects a statement from the table and initiates the extending use case. The saved changes from the extending use case appear in the statement table when that use case ends.

If the Actor wants to print a royalty statement, the Print Statement use case extends this one. The Actor selects one or more royalty statements from the table and initiates the extending use case.

If the Actor is the License Administrator and wants to remove the selected statements, the Remove Royalty Statement use case extends this one. The Actor selects one or more royalty statements from the table and initiates the extending use case. When the extending use case returns, the display royalty statements module 33404 removes the selected license or licenses from the table.

Query Statement

Figure 331:
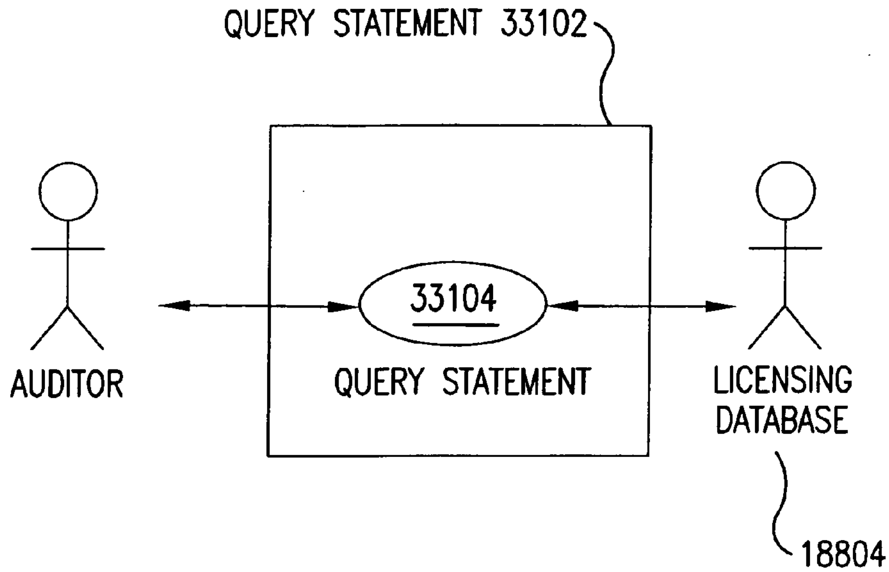

The query statement use case 33102 is diagramed in FIG. 331. According to this use case, the Auditor enters search criteria for the statement, and the query statement module 33104 displays the statement from the Licensing Database 18804. The Auditor can select a statement to see the statement details, and he or she can select a detail to see any payment allocations for the detail. The operation of this use case is further described below.

Step 1. The Auditor starts the transaction.

Step 2. The query statement module 33104 displays the licenses using the Display Licenses use case.

Step 3. The Auditor selects a license for query.

Step 4. The query statement module 33104 displays a form that lets the Auditor enter any combination of the reporting period Start and End Dates, the Invoice Number, the Due Date, the Receipt Date, and the Investigation Window Date.

Step 5. The Auditor enters values into the query form fields and starts the query.

Step 6. The query statement module 33104 combines the entries into a complete query expression, executes the query in the Licensing Database 18804, then displays the resulting statements in the system that satisfy the query conditions to which the Auditor has read access, ordered by start date.

Step 7. The Auditor selects a statement.

Step 8. The query statement module 33104 queries all the details of the selected royalty statement from the Licensing Database 18804 and displays them in order of Line Number, if any, showing the Product, the Units Sold, the Revenue and its currency unit symbol, and the Royalty Due.

Step 9. The Auditor selects a detail.

Step 10. The query statement module 33104 queries all the payment detail allocations from the Licensing Database 18804 and displays the Amount Allocated for each one with a label that allows the Auditor to see it, if any. The query statement module 33104 displays the Amount Allocated in the currency of the detail, converting it if the currency of the payment is different from the detail currency unit using the Convert Currency use case. The query statement module 33104 lists the allocations in preferably Receipt Date order.

Step 11. The Auditor ends the transaction.

Payment Use Cases

A payment is an amount of money the licensee sends to the licensor based on the amount they owe for fees, royalties, advances, minimum guarantees, and other compensation terms. To produce various reports, the License Administrator must link these payments to expected revenue periods and to royalty statement details.

The Payments View 27102 contains two panes, a license agreement spreadsheet 27104 and a payment spreadsheet 27106. The agreement pane 27104 lets you select a license, and the payment pane 27106 displays the payments for that license. You add and modify payments by double-clicking on a blank row or as existing row, as with all the other views.

Enter Payment

Figure 276:
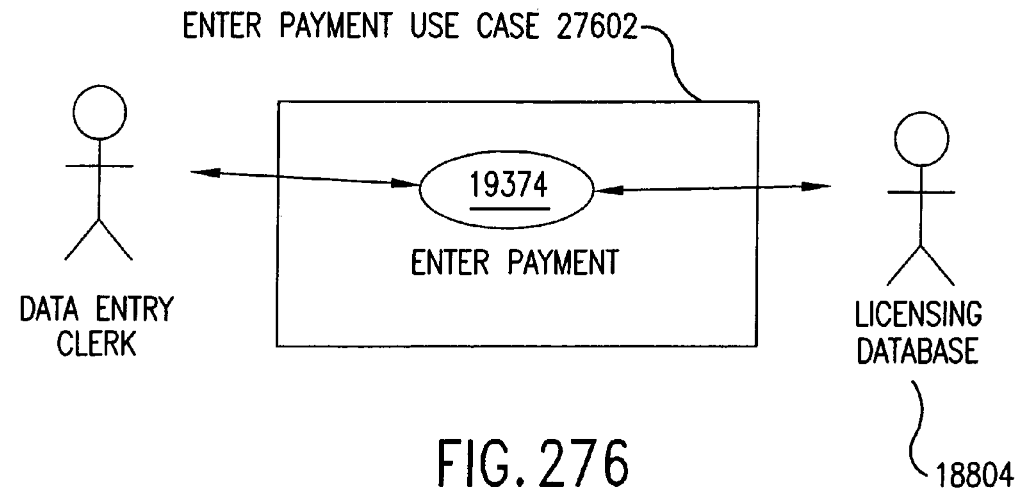

The payment use case 27602 is diagramed in FIG. 276. According to this use case, the Data Entry Clerk records the details of a payment related to a license in the Licensing Database 18804. The operation of this use case is further described below.

Step 1. The Data Entry Clerk starts the transaction to enter a new payment.

Step 2. The Enter payment module 19374 displays a list of licenses in the license pane 27104 of the payments view 27102.

Step 3. The Data Entry Clerk selects a license in the license pane 27104 of the payments view 27102.

Step 4. The Enter payment module 19374 displays a list of payments for the license in the payments pane 27106.

Step 5. The Data Entry Clerk signals the desire to add a new payment for the selected license using any procedure described herein.

Step 6. The Enter payment module 19374 displays a form 27202 (FIG. 272) for entering the details of a payment and creates a new object identifier for the payment object and a link from that payment to the selected license. The form 27202 includes a general tab 27204, a royalty statement details tab 27206, and an expected revenue tab 27208.

Step 7. In the general tab 27204, the Data Entry Clerk enters the Receipt Date, the Amount received, and the Currency in any order. Optionally, the Data Entry Clerk enters a withheld amount (the part of the total amount of the payment that represents a foreign company's withholding of tax due on the payment), an invoice number (for an invoice needed to release the payment from a foreign tax authority), and any late payment interest amount (part of the total amount of the payment that is a penalty for late payment based on the interest rate in the license agreement), again in any order. The Data Entry Clerk selects a Security Class for the payment.

The Data Entry Clerk commits the transaction. Data is not typically entered into the royalty statement details tab 27206 and the expected revenue tab 27208, although these tabs are active and accessible according to an embodiment of the invention.

Step 8. The Enter payment module 19374 creates a persistent payment and a link to the indicated license. The Enter payment module 19374 confirms the committed transaction to the Data Entry Clerk.

At any time, if the Data Entry Clerk presses F1 or the equivalent, the application extends the use case with the Display Help use case.

Modify Payment

Figure 277:
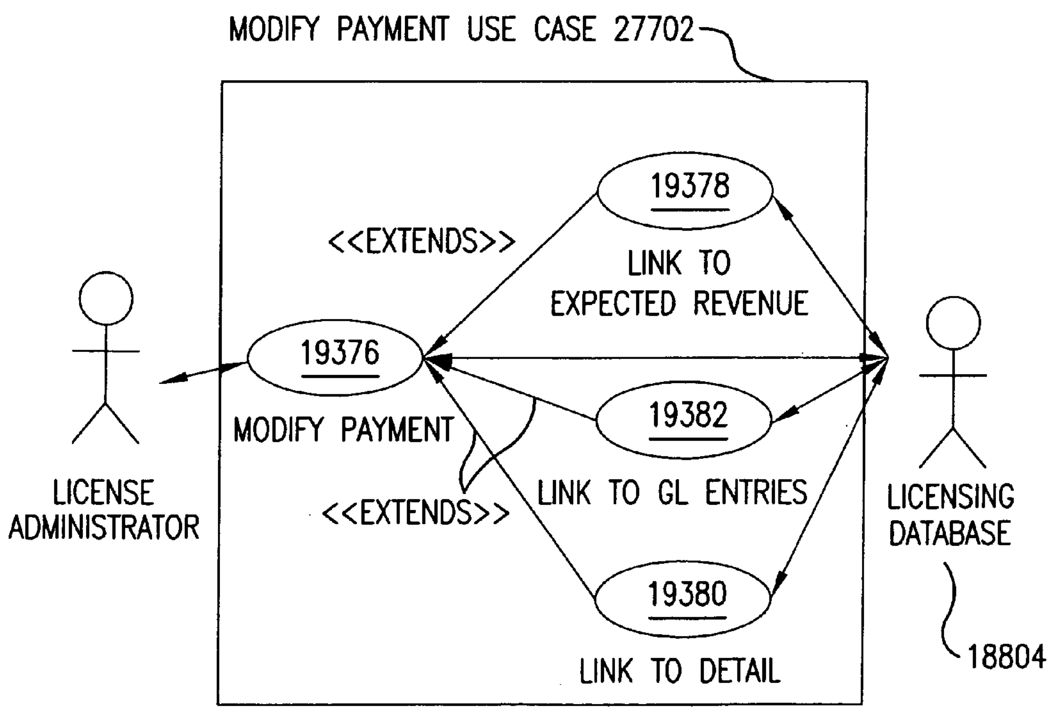

The modify payment use case 27702 is diagramed in FIG. 277. According to this use case, the License Administrator modifies the details of a payment related to a license. The License Administrator then optionally links the licensee's payment to the expected revenue estimates of the license, to the details of a royalty statement, and to the general ledger debit and credit entries. The operation of this use case is further described below.

Step 1. The License Administrator starts the transaction.

Step 2. The Modify payment module 19376 displays using the payments view 27102 the licenses in the modify payment module 19376 to which the License Administrator has read access, displaying the object identifier, the Agreement ID, the Name, and the Description.

Step 3. The License Administrator selects a license listed in the license agreement pane 27104.

Step 4. The Modify payment module 19376 displays in the payments pane 127106 the payments for the license to which the License Administrator has Read access, displaying the object identifier, the Payor Name, the Security Class, the Currency Symbol, The Amount, the Withheld Amount, the Late Payment Interest Amount, the Receipt Date, and/or the Invoice Number.

Step 5. The License Administrator selects a payment from the payments pane 27106.

Step 6. If the License Administrator can write to the payment, the Modify payment module 19376 displays a form 27202 (FIG. 272) for modifying the details of a payment, showing the fields from step 4 with their current values for the selected payment.

Step 7. The License Administrator optionally modifies any of the fields except for the object identifier and commits the transaction.

Step 8. The Modify payment module 19376 updates the payment in the Licensing Database 18804. The Modify payment module 19376 confirms the committed transaction to the Licensing Administrator.

This use case has a number of extensions:

If the business is linking payments to expected license revenue estimates, the License Administrator uses the Link to Expected Revenue use case to link the payment to the estimates. The license and payment object identifiers for the selected license and payment pass into the used use case. The used use case creates or removes any links in the Licensing Database.

If the business is linking payments to royalty statement details, the License Administrator uses the Link to Detail use case to link the payment to the details of one or more royalty statement details. The license and payment object identifiers for the selected license and payment pass into the used use case. The used use case creates or removes any links in the Licensing Database.

If the business is recording GL entries, the License Administrator enters two General Ledger Entry items, supplying a GL Account Number from a list of valid numbers, an Amount, and an Entry Date (the date on which the GL recorded the payment) for each entry. The License Administrator chooses whether each entry is a debit or a credit entry. (These entries should usually be supplied by the accounting department, which then sends the records on to the licensing department for allocation purposes. The GL feature is optional and configurable.) The Modify payment module 19376 creates a Debit General Ledger Entry or a Credit General Ledger Entry and a General Ledger Entry linked to the payment depending on the Entry Type.

If the License Administrator presses F1 or the equivalent, the application extends the use case with the Display Help use case.

Link to Expected Revenue

Figure 278:
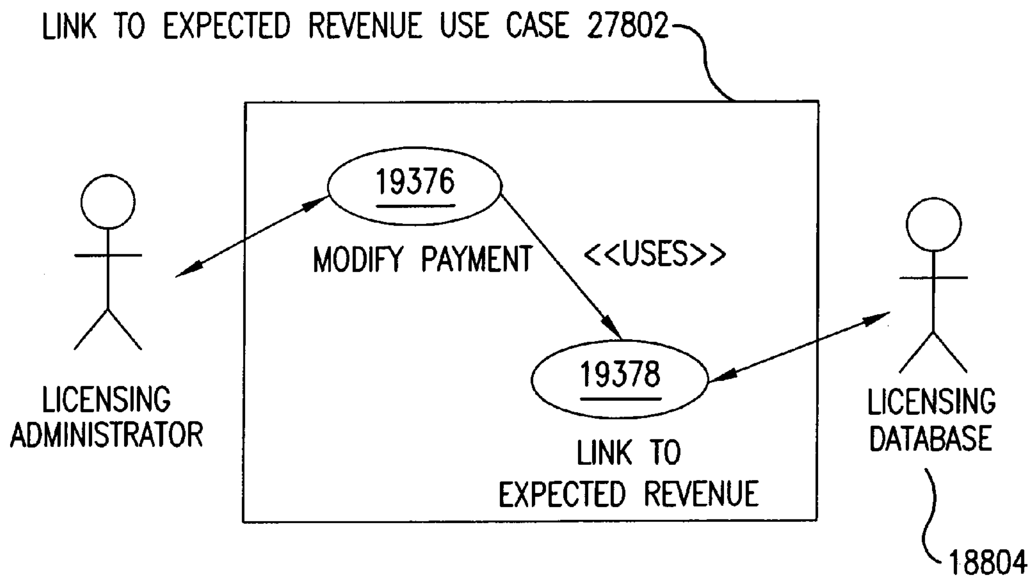

The link to expected revenue use case 27802 is diagramed in FIG. 278. According to this use case, a License Administrator allocates a payment to the expected revenue estimates deriving from the license compensation terms. The link to expected revenue use case 27802 creates a series of links to these estimates in the Licensing Database 18804. Via these links, it is possible to compare estimated license revenue to actual license revenue/payments. The operation of this use case is further described below.

Step 1. The License Administrator initiates the use case from the calling use case, passing in an object identifier for a payment and an object identifier for a license agreement to which the payment applies.

Step 2. The Link to expected revenue module 19378 displays in an estimate pane 27408 of the expected revenue tab 27208 (FIGS. 274 and 275) the Expected Amount, Due Date, and optionally a Description for each expected revenue estimate for the license. Note that there are estimates for each compensation term, and the compensation terms for the license agreement are listed in a term pane 27410.

Step 3. The License Administrator selects an estimate and enters an allocation amount for it. This can be done by entering an amount in field 27402, or a percentage of the total payment in field 27404. The total payment amount is displayed in field 27406. This step repeats, as necessary.

Step 4. The Link to expected revenue module 19378 stores an allocation amount into the Licensing Database 18804 for each non-zero allocation entered in step 3.

This use case has a number of extensions:

If the License Administrator enters an allocation that violates the constraint on the set of allocations with respect to the total payment, the Link to expected revenue module 19378 displays the error message "Sum of allocations must be less than or equal to total payment" and clears the entered allocation.

If the License Administrator signals completion of linking and there are any nonpositive allocation amounts, the Link to expected revenue module 19378 displays the error message "You must enter a positive allocation for each revenue estimate you select" and puts the focus on the first nonpositive amount in the list.

The currency unit of the payment should match the currency unit of the expected revenue estimate. If not, the Link to expected revenue module 19378 displays a warning message ("Converting currencies from % s to % s") that the amounts are in different currencies and offers the user the chance to use the Convert Currency use case to convert one currency to the other. The link to expected revenue module 19378 displays both the amounts in each allocation link.

If the License Administrator presses F1 or the equivalent, the application extends the use case with the Display Help use case.

Link to Detail

Figure 279:
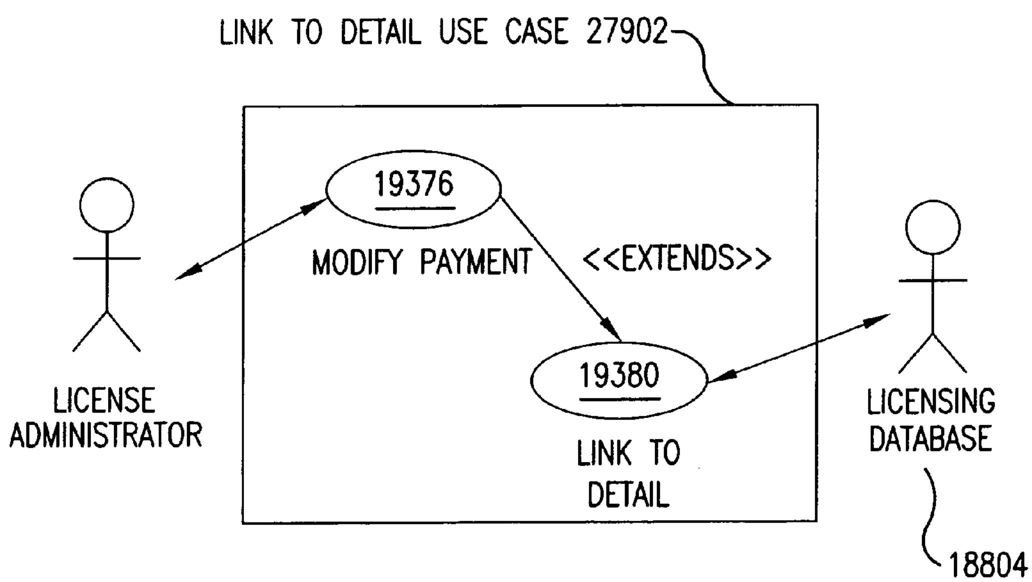

The link to detail use case 27902 is diagramed in FIG. 279. This use case extends the Modify Payment use case. While modifying a payment, the License Administrator selects one or more details from a royalty statement. The use case links the selected details to the payment, allocating part of the payment to each of the details. The operation of this use case is further described below.

Step 1. The License Administrator initiates the use case from the calling use case, passing in an object identifier for a payment and an object identifier for a license agreement to which the payment applies.

Figure 272:
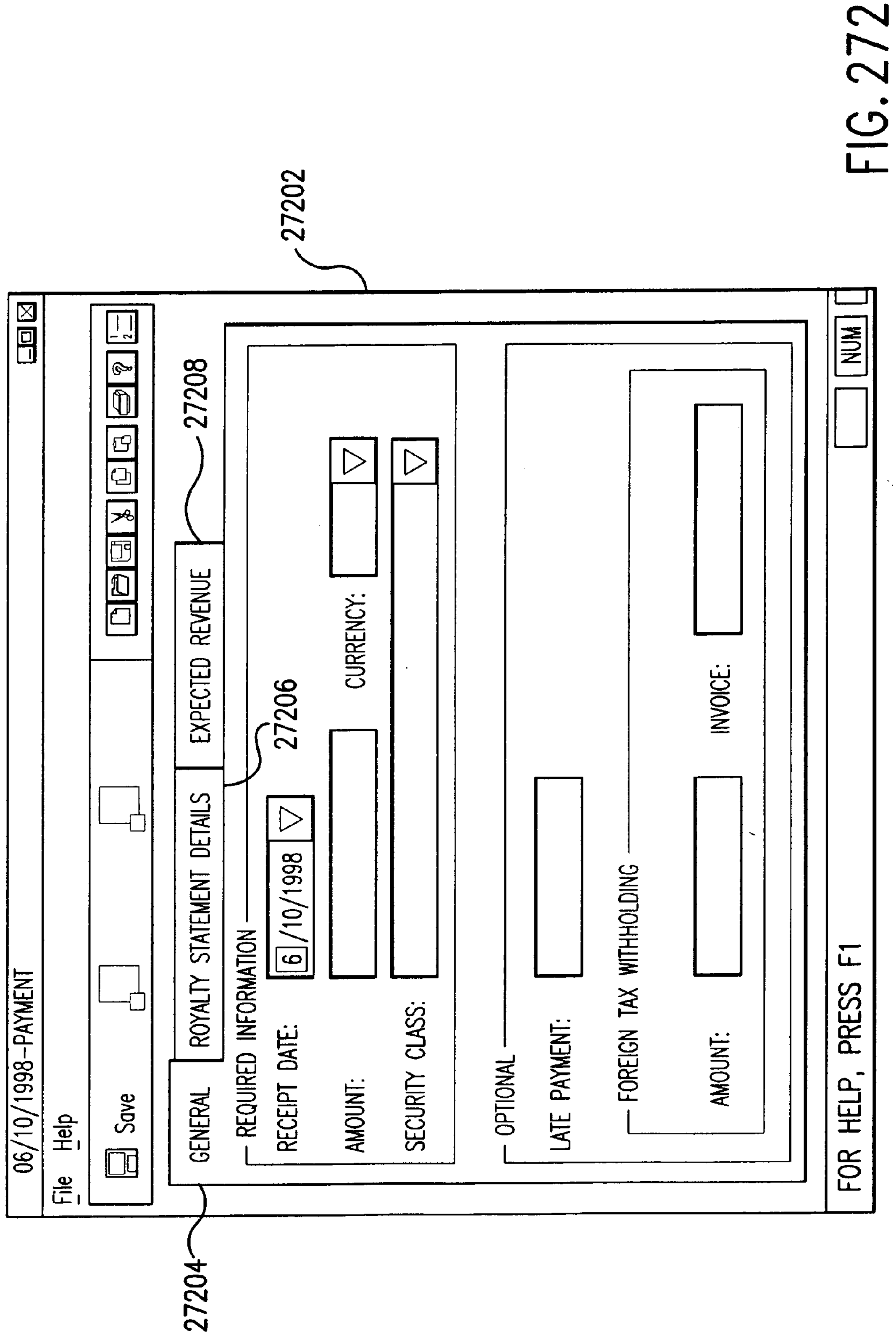
Figure 273:
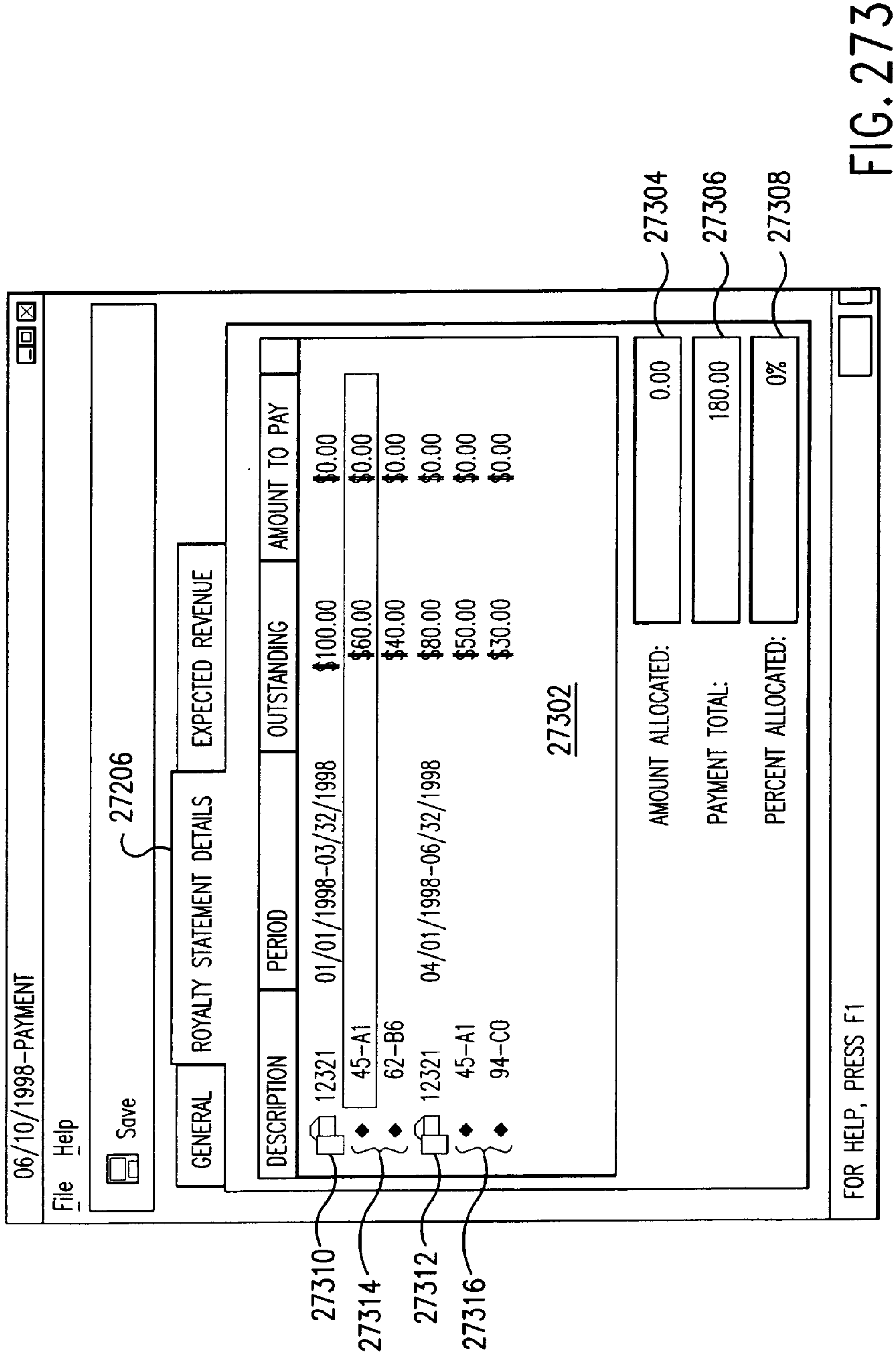
Figure 274:
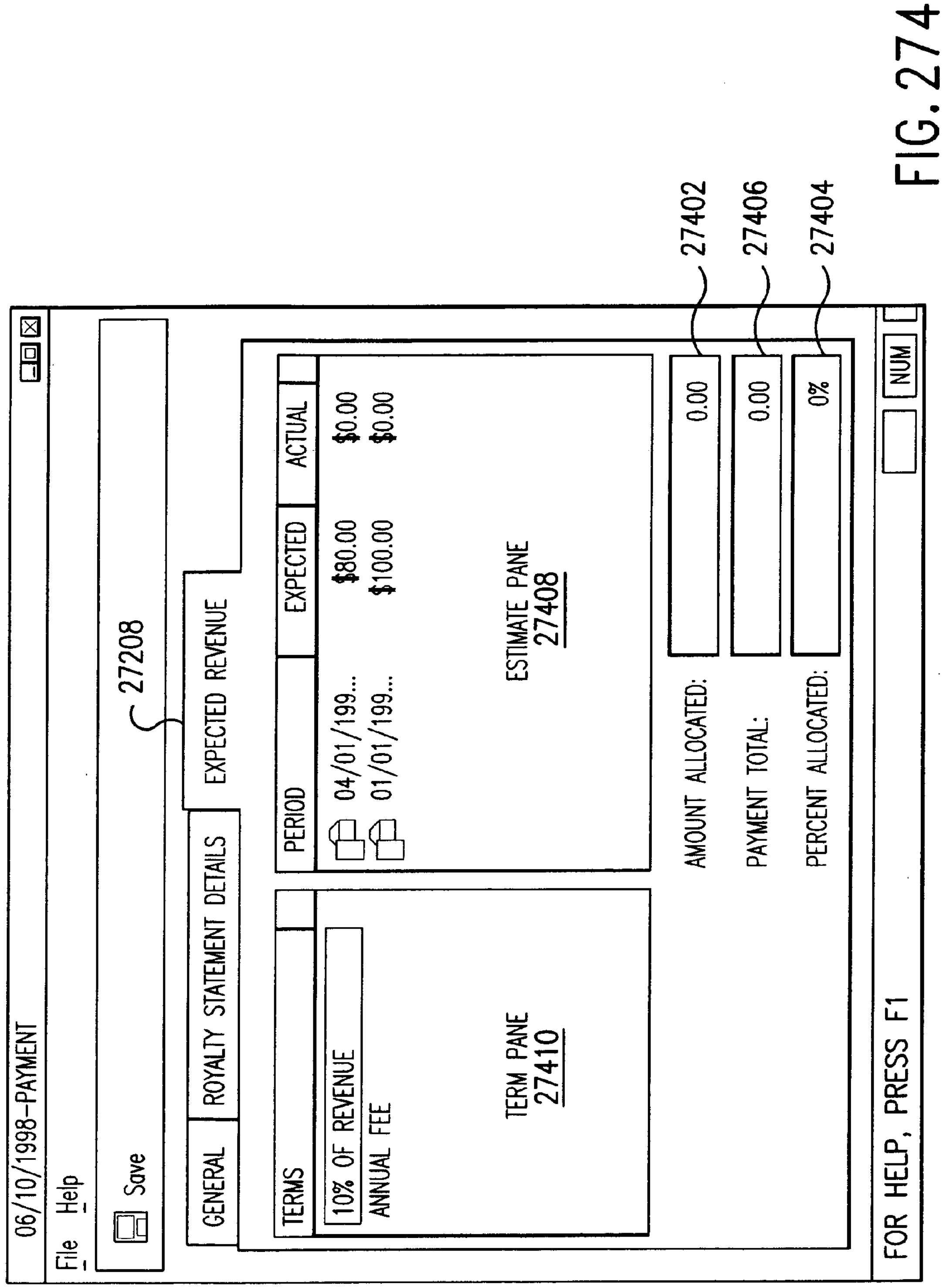
Figure 275:
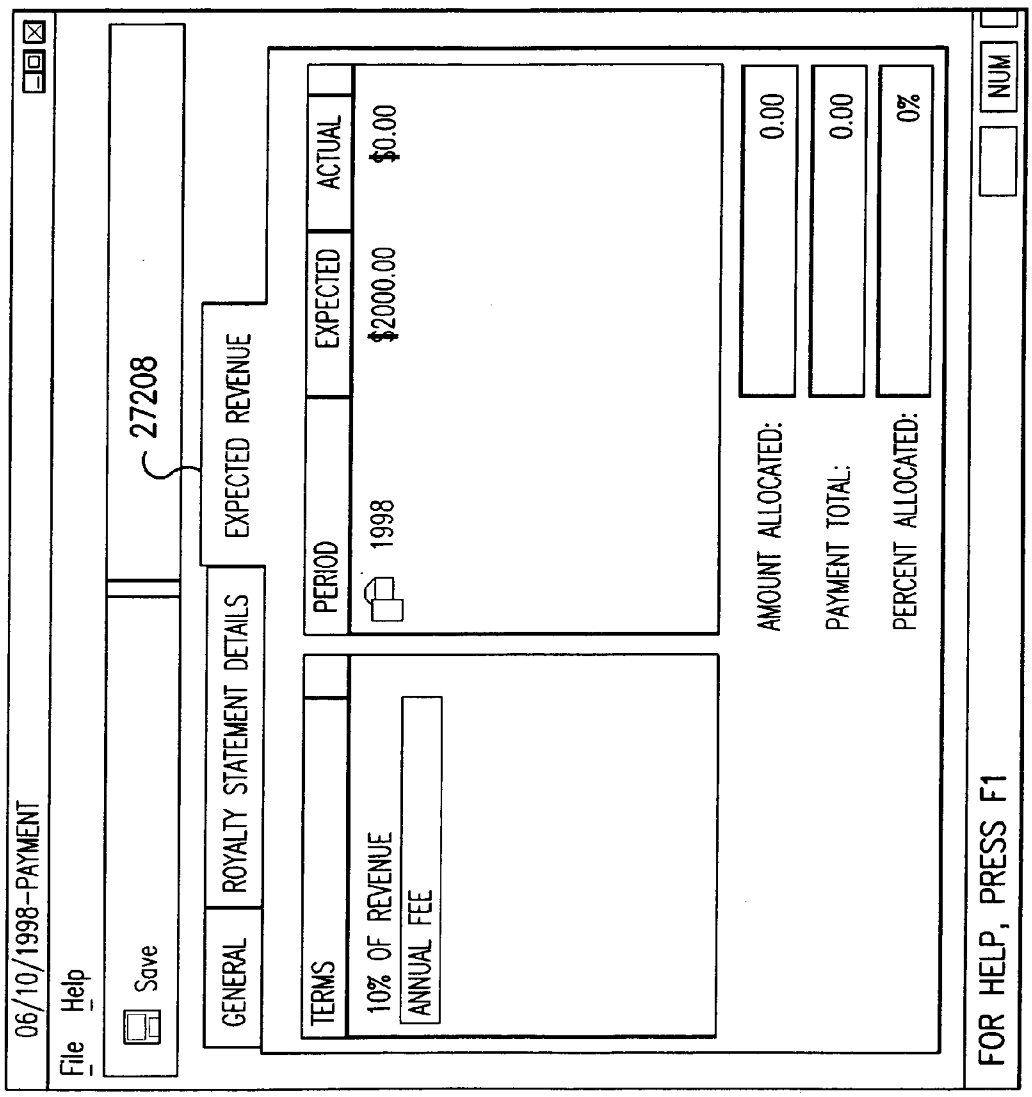

Step 2. The Link to detail module 19380 displays the royalty statements for the license in the royalty statement details tab 27206 (FIG. 272). In the example of FIG. 273, there are two royalty statements 27310 and 27312 displayed. Royalty statement 27310 has two details 27314, and royalty statement 27312 has two details 27316. In an embodiment, more complete information is displayed for each detail at this point. Such information may include the line number, product name, units sold, revenue amount, royalty due with currency symbol, etc.

Step 3. The License Administrator selects a detail and enters an allocation amount. This can be done by entering an amount (such as in field 27304), or a percentage of the payment total (such as in field 27308). This step repeats as necessary.

Step 4. The License Administrator signals completion.

Step 5. The Link to detail module 19380 creates links between the details and the payment.

This use case includes a number of extensions:

If the License Administrator enters an allocation that violates the constraint on the set of allocations with respect to the total payment, the Link to detail module 19380 displays the error message "Sum of allocations must be less than or equal to total payment" and clears the entered allocation.

If the License Administrator signals completion of linking and there are any nonpositive allocation amounts, the Link to detail module 19380 displays the error message "You must enter a positive allocation for each detail you select" and puts the focus on the first nonpositive amount in the list.

The currency unit of the payment should match the currency unit of the statement detail. If not, the Link to detail module 19380 displays a warning message ("Converting currencies from % s to % s") that the amounts are in different currencies and offers the user the chance to use the Convert Currency use case to convert one currency to the other. The link to detail module 19380 displays both the amounts in each allocation link.

If the License Administrator presses F1 or the equivalent, the application extends the use case with the Display Help use case.

Print Payment

Figure 280:
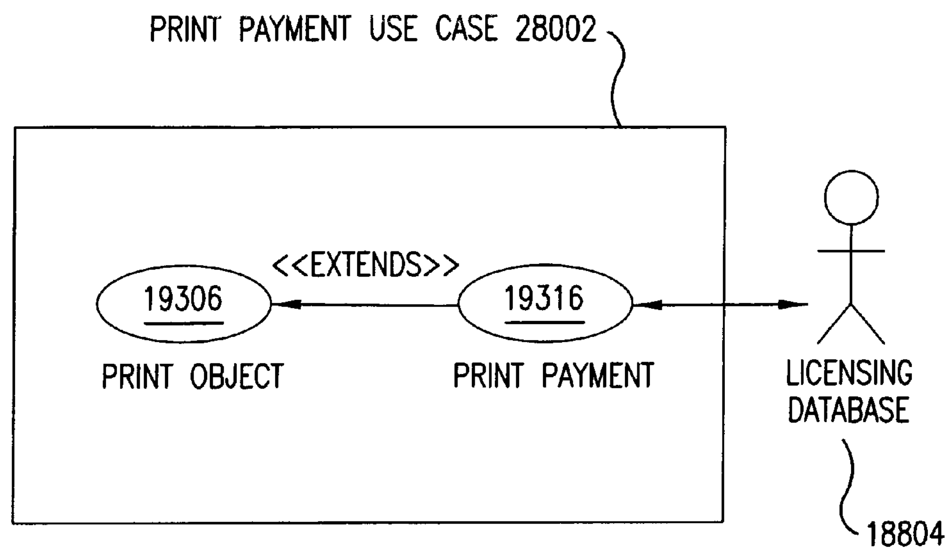

The print payment use case 28002 is diagramed in FIG. 280. This use case extends the Print Object use case. The print payment module 19316 prints a Payment, including all information in the Licensing Database 18804 about the payment, its General Ledger entries, and its allocation to royalty statement details and to expected revenue. The operation of this use case is further described below.

Step 1. The Actor in the Print Object use case selects a Payment and issues a command to print it.

Step 2. The Print payment module 19316 prints a formatted report with the Payment ID, the Currency Unit Symbol, the Amount, the Withheld Amount, the Late Payment Interest Amount, the Receipt Date, the Invoice Number, etc.

Step 3. The Print payment module 19316 prints the General Ledger Entries, printing the OL Account Number, the Account Description, the Amount, the Entry Date, and the Entry Type (credit or debit).

Step 4. The Print payment module 19316 prints the allocations of the payment to royalty statement details, including the Royalty Statement Start and End Dates, the Detail Line Number, the Product Name, the Detail Currency Unit Symbol, Detail Royalty Due, and the Amount Allocated.

Step 5. The Print payment module 19316 prints the allocations of the payment to expected revenue, including the License Agreement ID and Name, the Term Number, the Expected Currency Unit, the Expected Amount, the Expected Due Date, and the Amount Allocated.

Remove Payment

Figure 281:
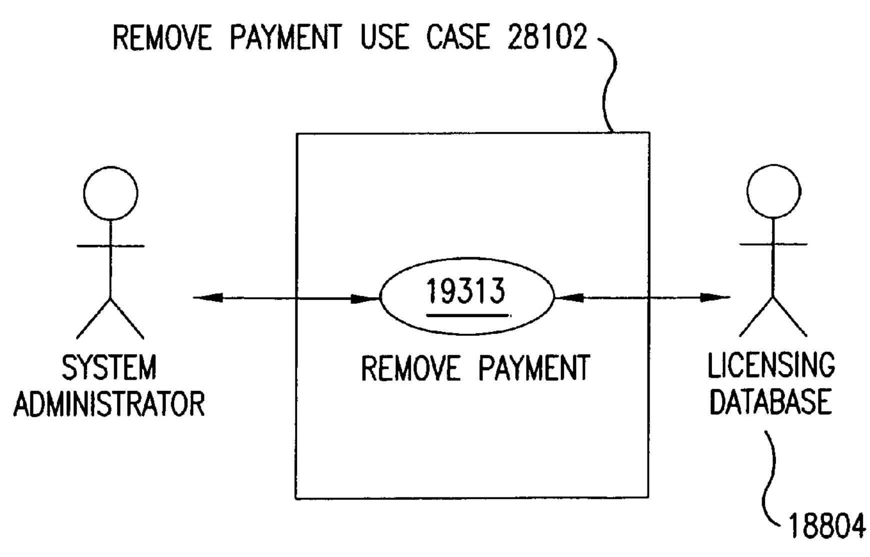

The remove payment use case 28102 is diagramed in FIG. 281. This is preferably an administrator use case. According to this use case, the System Administrator removes payments and related GL Entries and license and detail allocations from the Licensing Database 18804. This use case is further described below.

Step 1. The System Administrator begins the transaction.

Step 2. The Remove payment module 19313 displays a list of all the payments in the Licensing Database 18804, displaying the Payment ID, the Payor Name, the Receipt Date, and the Amount Step 3. The System Administrator selects one or more payments and removes them (that is, issues command(s) to remove them).

Step 4. The Remove payment module 19313 deletes the information from the Licensing database 18804 and moves it to the Recycle Bin (implementation may differ regarding deferring the actual SQL deletes, and there is no notification of commit to the System Administrator).

This use case has a number of extensions:

At any time until clearing the Recycle Bin, the administrator can restore the removed Asset.

If the System Administrator presses F1 or the equivalent, the application extends the use case with the Display Help use case.

Query Payment

Figure 282:
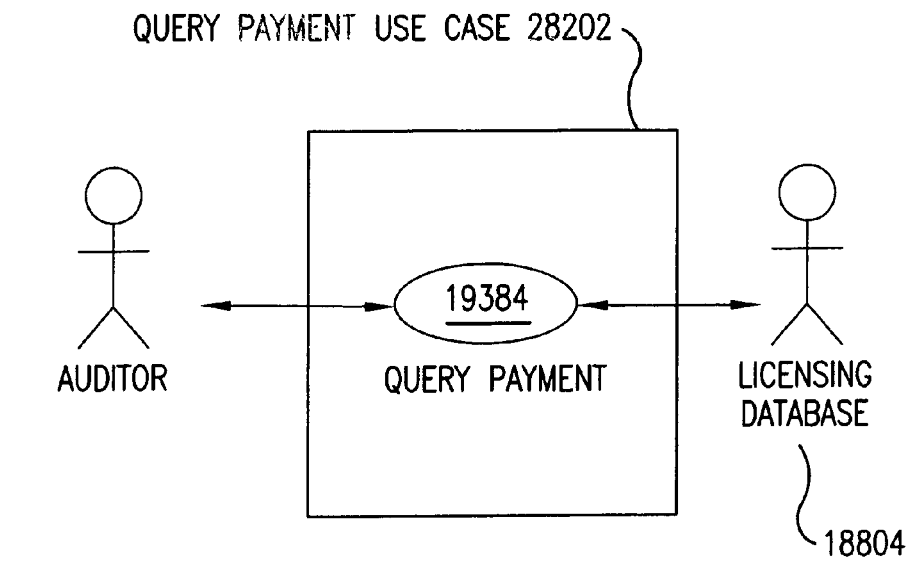

The query payment use case 28202 is diagramed in FIG. 282. According to this use case, the Auditor queries payments based on payer, on licensees or licensors, on links to royalty statements or expected revenue, on General Ledger accounts, or on receipt date. The Query payment module 19384 displays the payments, any links, and any GL entries. The operation of this use case is further described below.

Step 1. The Auditor starts the transaction.

Step 2. The Query payment module 19384 displays the licenses to which the Auditor has read access, displaying the object identifier, the Agreement ID, the Name, and the Description.

Step 3. The Auditor selects a license for query of payments.

Step 4. The Query payment module 19384 displays a query form that lets the Auditor enter selection conditions on the set of payments, including object identifier, Payor Name, payment Receipt Date, Amount, Withheld Amount, Late Payment Interest Amount, and/or Invoice Number.

Step 5. The Auditor enters query criteria and starts the query.

Step 6. The Query payment module 19384 displays the payments for the license in preferably reverse chronological order to which the Auditor has Read access, displaying the object identifier, object identifier, Payor Name, payment Receipt Date, Amount, Withheld Amount, Late Payment Interest Amount, and/or Invoice Number.

Step 7. The Auditor selects a payment.

Step 8. The Query payment module 19384 displays a list of General Ledger entries, if any, showing the Entry Type, GL Account Number, Amount, Currency Unit Symbol, and Entry Date. The Query payment module 19384 preferably orders the entries by GL Account Number.

Step 9. The Query payment module 19384 displays a list of Payment Detail Allocations, showing the Royalty Statement Start Date Time and Amount Allocated. The Query payment module 19384 preferably orders the allocations by License Name, Start Date Time, and Line Number.

Step 10. The Query payment module 19384 displays a list of License Payment Allocations, showing the License Name, Payment Number, Expected License Revenue Description and Due Date, and Amount Allocated. The Query payment module 19384 preferably orders the allocations by License OID, Term Number, and Payment Number.

Step 11. The Auditor ends the transaction.

At any time, if the Data Entry Clerk presses F1 or the equivalent, the application extends the use case with the Display Help use case.

Maintain GL Accounts

Figure 283:
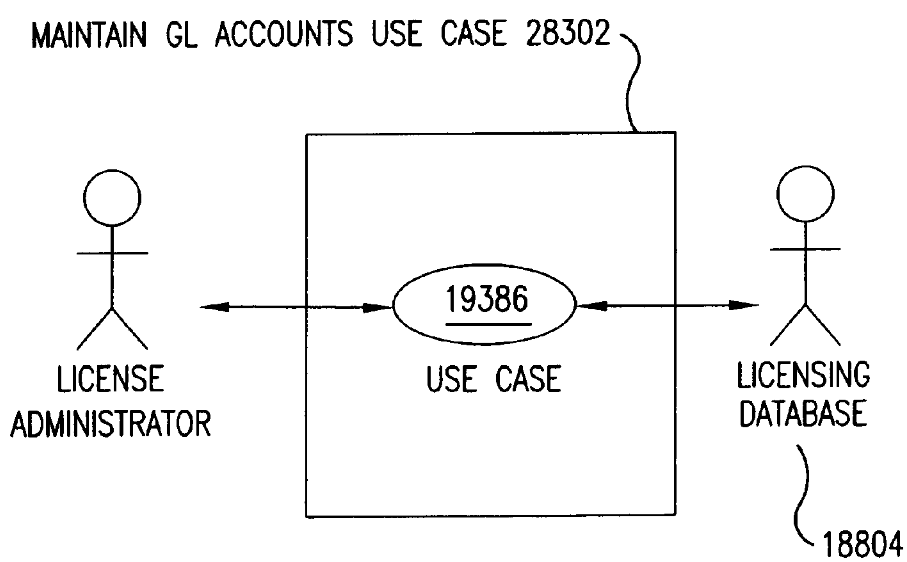

The maintain GL accounts use case 28302 is diagramed in FIG. 283. According to this use case, the License Administrator creates, updates, or removes accounts from the Licensing Database 18804. The operation of this use case is further described below.

Step 1. The License Administrator starts the transaction.

Step 2. The Maintain GL accounts module 19386 displays the list of current GL Accounts, displaying the Account Number and the Description.

Step 3. The License Administrator modifies the set of GL Accounts, performing any of the following actions on the set of accounts:

- Step 3.1. The License Administrator creates a new GL Account, entering the Account Number and the Description.
- Step 3.2. The License Administrator selects one of the current GL Accounts and modifies the Account Number or the Description.
- Step 3.3. The License Administrator selects one of the current GL Accounts and removes it.

Step 4. The License Administrator ends the transaction.

Step 5. The Maintain GL accounts module 19386 commits the changes in the Licensing Database 18804. The Maintain GL accounts module 19386 confirms the commit to the License Administrator.

If a GL Account relates to any General Ledger Entries, on modifying the account number, the Maintain GL accounts module 19386 prompts the License Administrator whether to change the account number for the Entries or to cancel the transaction.

Link Payment to Entity

Figure 327:
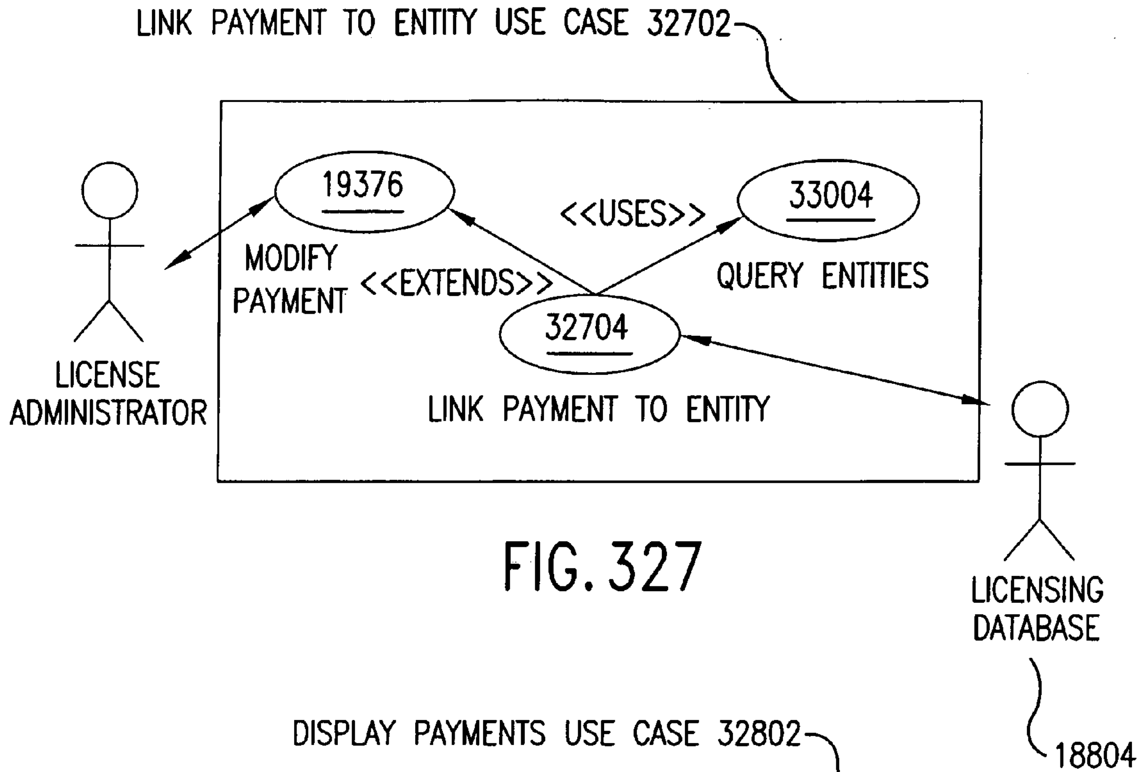

The link payment to entity use case 32702 is diagramed in FIG. 327. This use case extends the Modify Payment use case to link or unlink the portion of a payment linked to a particular license to a specific set of named entities in the Licensing Database 18804. The License Administrator allocates some portion of the portion of a payment to a specific named entity.

It will be illustrate to consider the following scenario. A licensor licenses packages of assets to licensees with a license agreement. The licensees use the assets to produce products that generate revenue. Depending on the license agreement compensation terms, the licensee pays various kinds of payments to the licensor: fees or royalties. These payments constitute a revenue stream to the licensor as a series of payments from the licensee. A single payment may encompass more than one license, so the link between payment and license has a percent allocation that allocates a specific percentage of the payment to a particular license.

The licensor is usually an organization. Often, the licensor is not the business unit or person that ultimately "gets" or recognizes the revenue from a license for accounting purposes. That entity may be an organizational child of the licensor, but not necessarily, and there may be more than one entity that gets revenue from a license. A licensor therefore must have a way to allocate payment revenue from a particular license (a portion of a payment) to one or more named entities (people or organizations).

The operation of this use case is further described below.

Step 1. The link payment to entity module 32704 passes in the object identifier for a license agreement and a payment (a License Payment link).

Step 2. The System displays the current set of links to entities from this license-payment link, displaying the name, description, and entity type for each linked entity.

Step 3. The License Administrator uses the Query Entities use case to display a list of entities. The License Administrator selects a single named entity from the result of the query and links it to the license-payment link. The Query Entity use case returns the object identifier for the entity to this use case.

Step 4. The link payment to entity module 32704 displays a form that lets the license administrator allocate a percentage of the license-payment amount to the entity. It displays a default value of 100% if there are no license payment allocations for this license-payment link or the difference between the sum of existing license payment allocations for this license-payment link and 100%.

Step 5. The link payment to entity module 32704 creates a link between the license-payment and the named entity, inserting a row in the License Payment Allocation table and displaying the new link in the displayed list of links.

Step 6. The License Administrator repeats steps 3-6 or ends the use case and returns to the extending use case.

If the License Administrator wants to remove a given link, he or she selects it in the displayed list of links and tells the System to delete the link. The System then removes the link from the display and schedules the link for deletion from the database (the extending use case is running the transaction). The License Administrator can remove or add any number of links in this use case.

Display Payments

Figure 328:
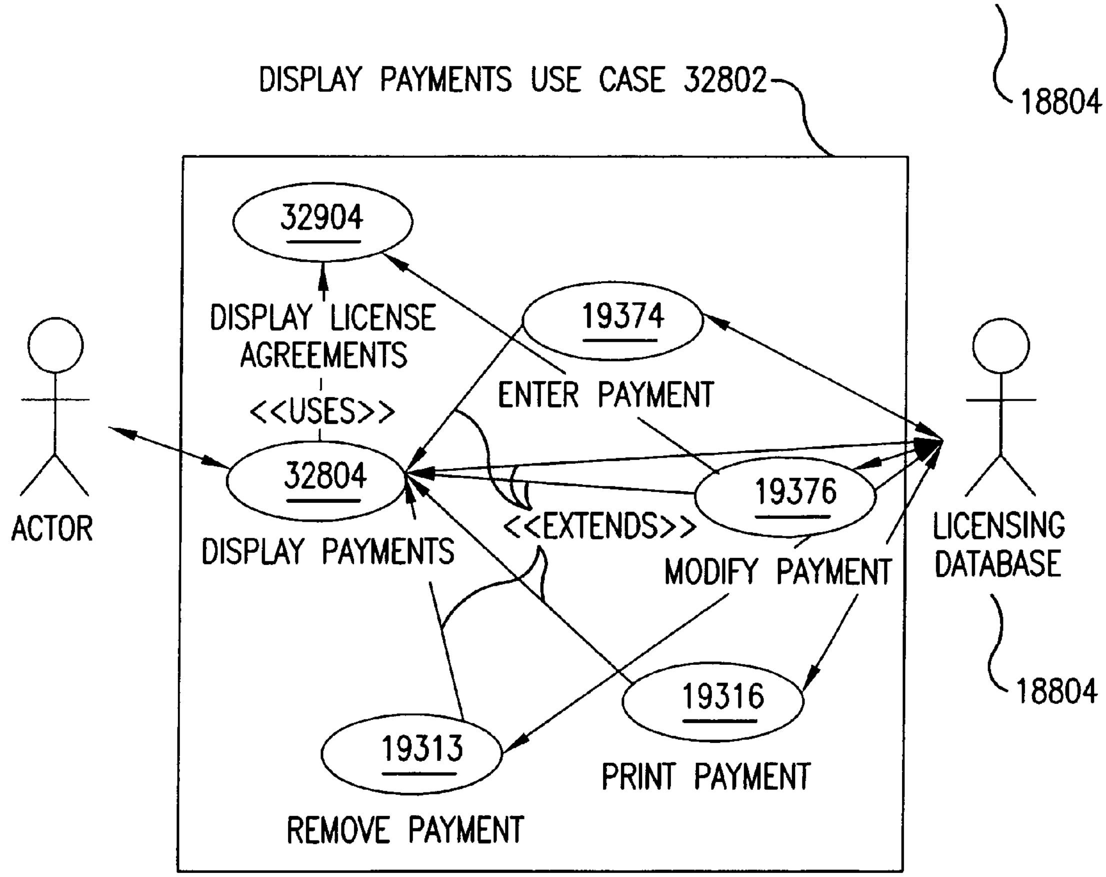

The display payments use case 32802 is diagramed in FIG. 328. This use case displays a table of license agreements with the basic data for each agreement. The Actor may select one or more agreements and conduct further operations such as Modify License Agreement. The operation of this use case is further described below:

Step 1. The Actor starts the transaction.

Step 2. The display payments module 32804 displays a table of all the License Agreements to which the Actor has read access using the Display License Agreements use case.

Step 3. The Actor selects a single license agreement from that table.

Step 4. The display payments module 32804 displays a table of all the Payments from the Licensing Database 18804 to which the Actor has read access. Each row of the table corresponds to a single Payment. The columns include the Payor Name, the Currency Unit Symbol, the Payment Amount, the Late Payment Interest Amount, the Receipt Date, the Invoice Number, and the Payment-to-License Allocation Percent.

Step 5. The Actor ends the transaction.

This use case has a number of extensions:

If the Actor wants to enter a new payment, the Enter Payment use case extends this one in a separate transaction. When the extending use case ends, the display payments module 32804 displays the new payment and its fields in the table.

If the Actor wants to see or modify the details of the payment, the Modify Payment use case extends this one in a separate transaction. The Actor selects a payment from the table and initiates the extending use case. The saved changes from the extending use case appear in the table when that use case ends.

If the Actor wants to print a payment, the Print Payment use case extends this one. The Actor selects one or more payments from the table and initiates the extending use case.

If the Actor is the License Administrator and wants to remove the selected payments, the Remove Payment use case extends this one. The Actor selects one or more payments from the table and initiates the extending use case. When the extending use case returns, the display payments module 32804 removes the selected payment or payments from the table.

Time Period Use Cases

The invention supports time period related structures. For example, Royalties and Fees often have a recurring payment. For example, a royalty may be due at the end of every quarter, on every June 15, or something similar. Most license royalties and fees call for monthly, quarterly, or annual payments.

Generally, recurring periods may terminate in one of two ways. A count-limited period has a certain number of periodic payments. For example, you could have a yearly fee due on June 15th for five payments. A date-limited period goes to a certain end date: a royalty paid quarterly on the 15th of the second month of the quarter ending on Feb. 15, 2015.

The beginning interval from the start date to the first recurring date may differ significantly in size from the other dates, as may the period from the last recurring date to an end date for a date-terminated period. For example, you may owe an annual fee every June 15th, with the sequence starting on June 1. The first interval will be 15 days, while the second and onwards will be one year.

In this section, time period use cases are described.

Enter Recurring Time Period

Figure 332:
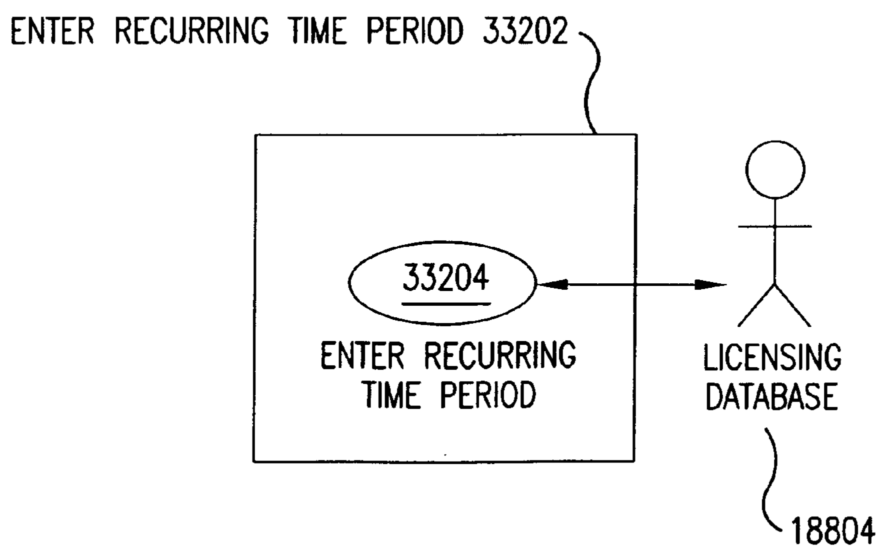

The enter recurring time period use case 33202 is diagramed in FIG. 332. This use case is used by other use cases that must enter a recurring period of some kind into the Licensing Database 18804. The use case permits the actor to enter the repetition structure for the recurring period. The operation of this use case is further described below.

Step 1. The enter recurring time period module 33202 displays a data entry form containing the Time Unit (default Year), the Repetition (default 1), and the Recurring Period Type (default Count Limited).

Step 2. The Actor chooses a Time Unit, a Repetition, and/or a Recurring Period Type.

Step 3. The enter recurring time period module 33202 returns the appropriate object back to the using use case. The enter recurring time period module 33202 sets the Time Period's Time Period Type field to "R" to indicate a recurring period object.

This use case has a number of extensions.

Depending on the Time Unit, the enter recurring time period module 33202 displays a set of options that the actor can use to control complex recurring structures.

If Time Unit is Year, the enter recurring time period module 33202 displays the Yearly options and allows the actor to choose between two sets of options:

Specific Month and Specific Day: June 15th, November 2

Ordinal Week of Month and Day of Week and Specific Month: first Tuesday in January If Time Unit is Quarter, the enter recurring time period module 33202 displays the Quarterly options and allows the actor to choose between three sets of options:

Specific Day and Month: first day of second month of quarter

Specific Day of Week and Month: first Monday in second month of quarter

Specific Day: 45th day of quarter

If Time Unit is Month, the enter recurring time period module 33202 displays the Monthly options and allows the actor to choose between two sets of options:

Specific Day: 15th, 21st

Ordinal Week of Month and Day of Week: first Tuesday of the month

If Time Unit is Week, the enter recurring time period module 33202 displays the Weekly options and allows the actor to enter the day of the week: Tuesday If Time Unit is Day, the enter recurring time period module 33202 displays nothing.

If the actor sets the Recurring Period Type to Count Limited, the enter recurring time period module 33202 displays the Number of Recurrences. This controls the number of recurring dates within the whole period.

If the actor sets the Recurring Period Type to Date Limited, the enter recurring time period module 33202 displays the End Date field. This controls the number of dates within the whole period by ending the whole period at a certain date.

Modify Recurring Time Period

Figure 336:
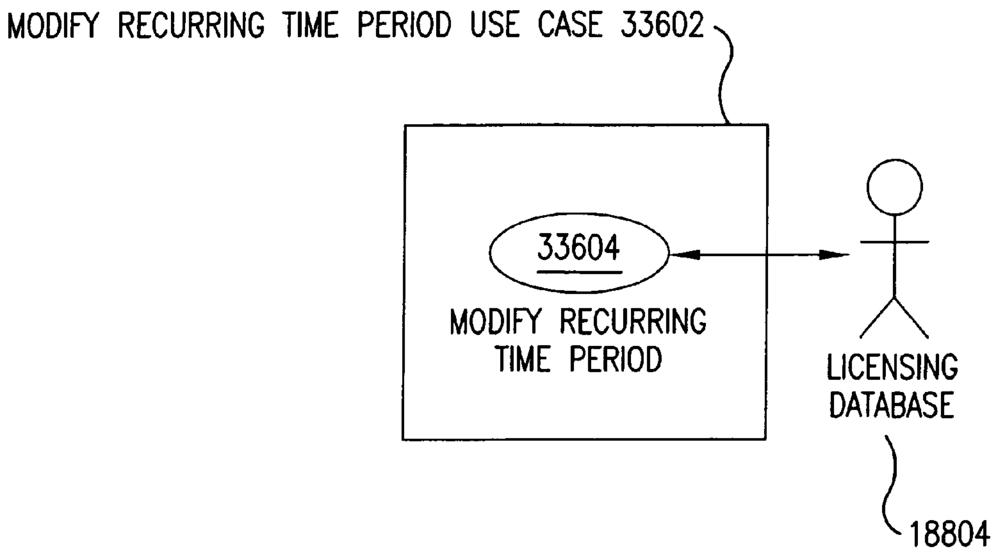

The modify recurring time period use case 33602 is diagramed in FIG. 336. This use case is used by other use cases that must modify a recurring period of some kind in the Licensing Database 18804. The use case permits the actor to modify the existing repetition structure for the recurring period or to change the type of period completely between the two concrete types (date-limited and count-limited). The operation of this use case is further described below.

Step 1. The actor passes in the object identifier for a time period to modify (:TimePeriod_ID).

Step 2. The modify recurring time period module 33604 displays a data entry form containing the Time Unit (default Year), the Repetition (default 1), and the Recurring Period Type (default Count Limited), all displaying the current values for the time period the actor passes in (:TimePeriod_ID) queried from the Licensing database 18804.

Step 3. The Actor changes the Time Unit, a Repetition, and/or the Recurring Period Type.

Step 4. The modify recurring time period module 33604 returns the appropriate object back to the using use case.

This use case has a number of extensions.

If the Recurring Period Type is Count Limited, the modify recurring time period module 33604 adds the Count_Limited_Recurring_Period table to the following SQL queries as the <concrete subclass> and displays the Number of Recurrences. This controls the number of recurring dates within the whole period. If the actor changes the Recurring Period Type to Date Limited, the modify recurring time period module 33604 changes to display the End Date field and deletes the count-limited row when the transaction completes, replacing it with a new Date_Limited_Recurring_Period row.

If the Recurring Period Type is Date Limited, the modify recurring time period module 33604 adds the Date_Limited_Recurring_Period table to the following SQL queries as the <concrete subclass> and displays the End Date field. This controls the number of recurring dates within the whole period by ending the period at a certain date. If the actor changes the Recurring Period Type to Count Limited, the modify recurring time period module 33604 changes to display the Number of Recurrences field and deletes the date-limited row when the transaction completes, replacing it with a new Count_Limited_Recurring_Period row.

Depending on the Time Unit, the modify recurring time period module 33604 displays a set of options that the actor can use to control complex recurring structures.

If Time Unit is Year, the modify recurring time period module 33604 queries the Yearly options, displays them, and allows the actor to modify the options, choosing between two sets:

Specific Month and Specific Day: June 15th, November 2

Ordinal Week of Month and Day of Week and Specific Month: first Tuesday in January If Time Unit is Quarter, the modify recurring time period module 33604 queries the Quarterly options, displays them, and allows the actor to choose between three sets:

Specific Day and Month: first day of second month of quarter

Specific Day of Week and Month: first Monday in second month of quarter

Specific Day: 45th day of quarter

If Time Unit is Month, the modify recurring time period module 33604 queries the Monthly options, displays them, and allows the actor to choose between two sets:

Specific Day: 15th, 21st

Ordinal Week of Month and Day of Week: first Tuesday of the month

If Time Unit is Week, the modify recurring time period module 33604 displays the Weekly options and allows the actor to enter the day of the week: Tuesday If Time Unit is Day, the modify recurring time period module 33604 queries and displays nothing.

Reports Use Cases

Reports are a critical part of the Licensing module 18702. It is through reports that the license administrator and auditor (or any other user) obtain a great amount of useful information from system.

All available reports are listed in a reports pane 28404 of a reports view 28402 (FIG. 284).

Preferably, a report engine is used to generate the reports. When the user selects a report, the licensing system 18702 generates one or more commands that collectively encapsulates the user-selected report type and any user-provided parameters. The details of these commands will be apparent to persons skilled in the relevant art(s). These commands are in the language of the report engine. The report engine generates the report pursuant to the commands. In doing so, the report engine accesses data (as indicated in the commands) in the databases discussed herein. In an embodiment, a commercial reporting module is used as the report engine, such as the commercially available Crystal Reports product.

Generate Report

Figure 285:
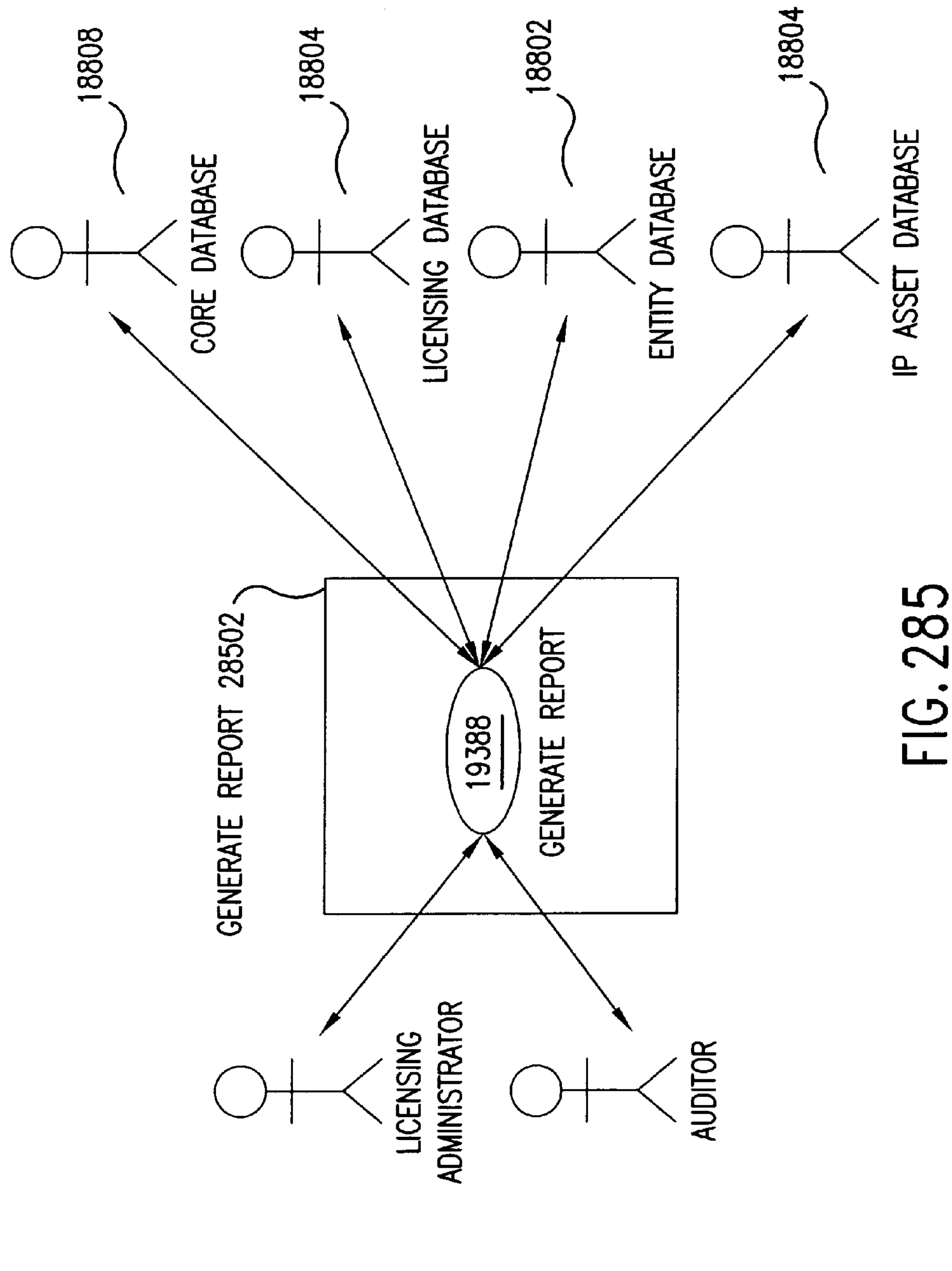
Figure 288A:
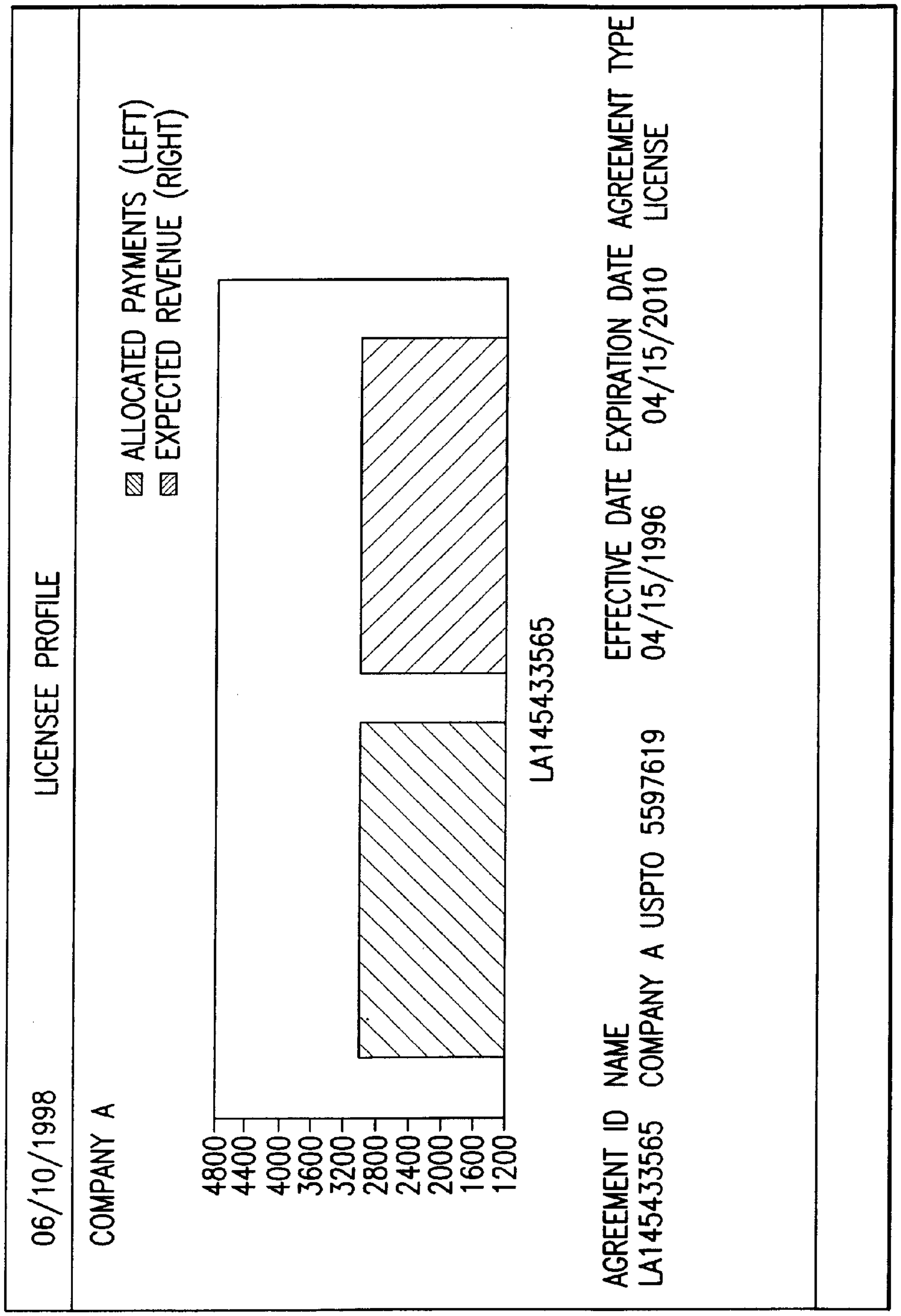
Figure 288B:
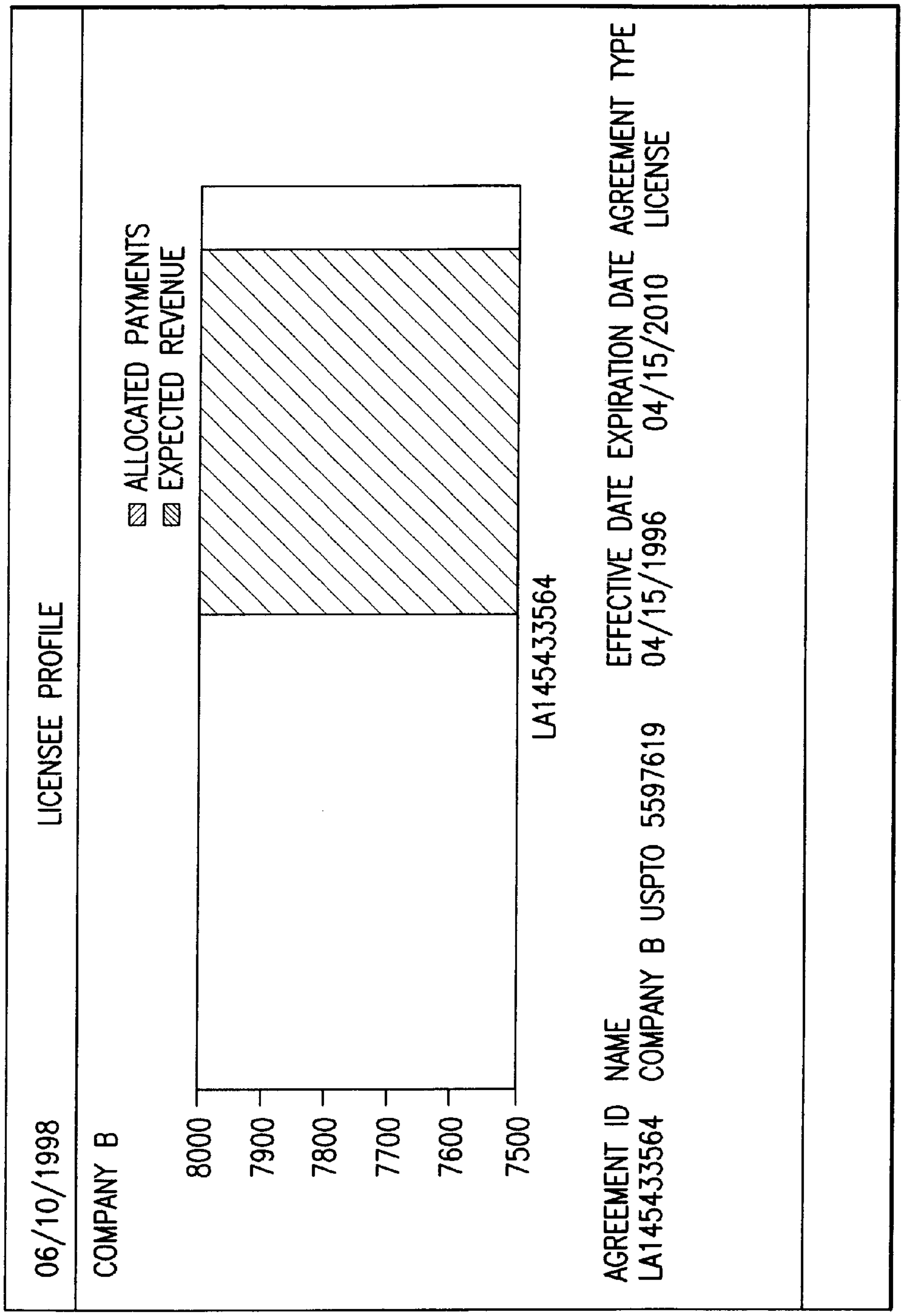
Figure 288C:
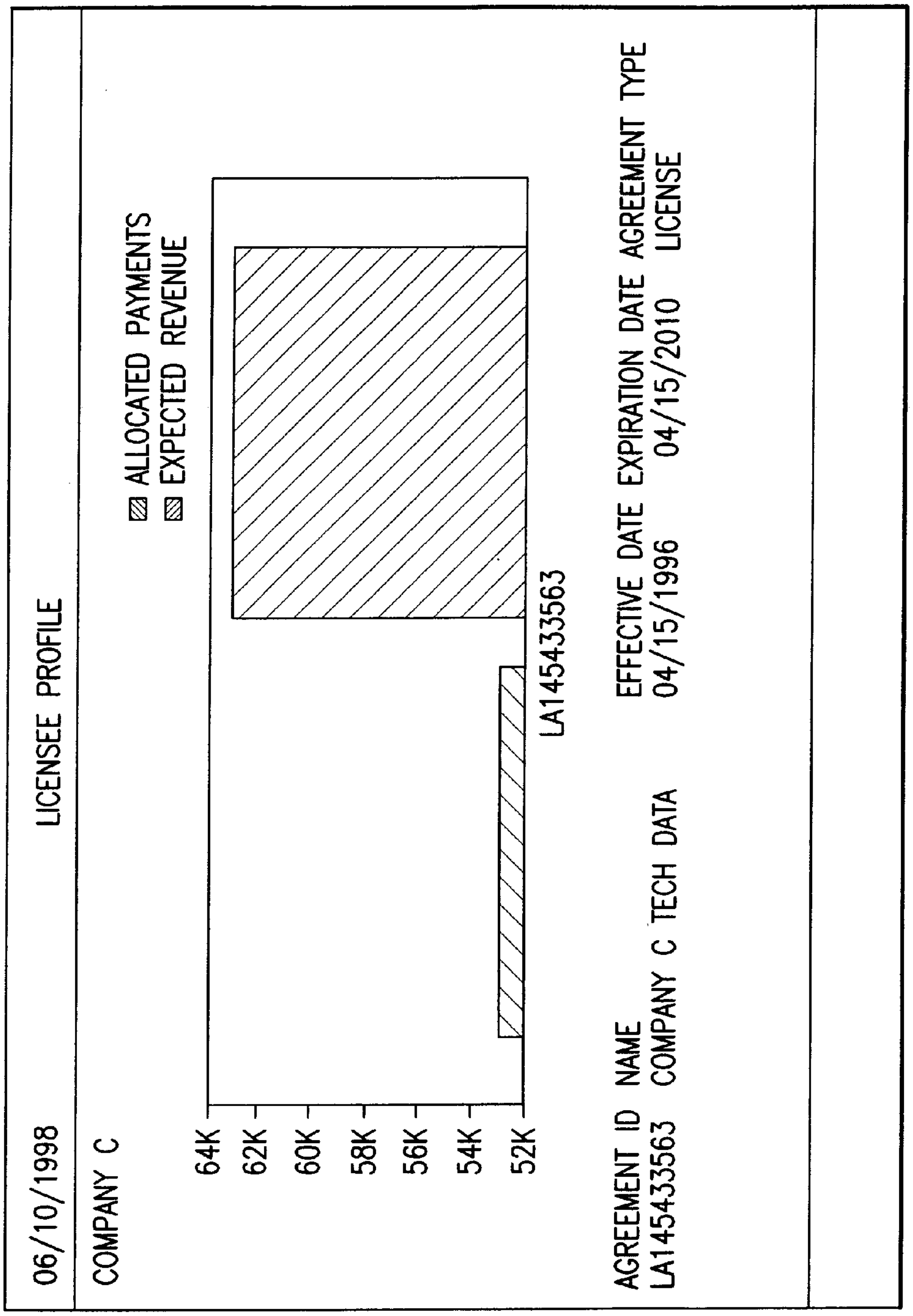
Figure 288D:
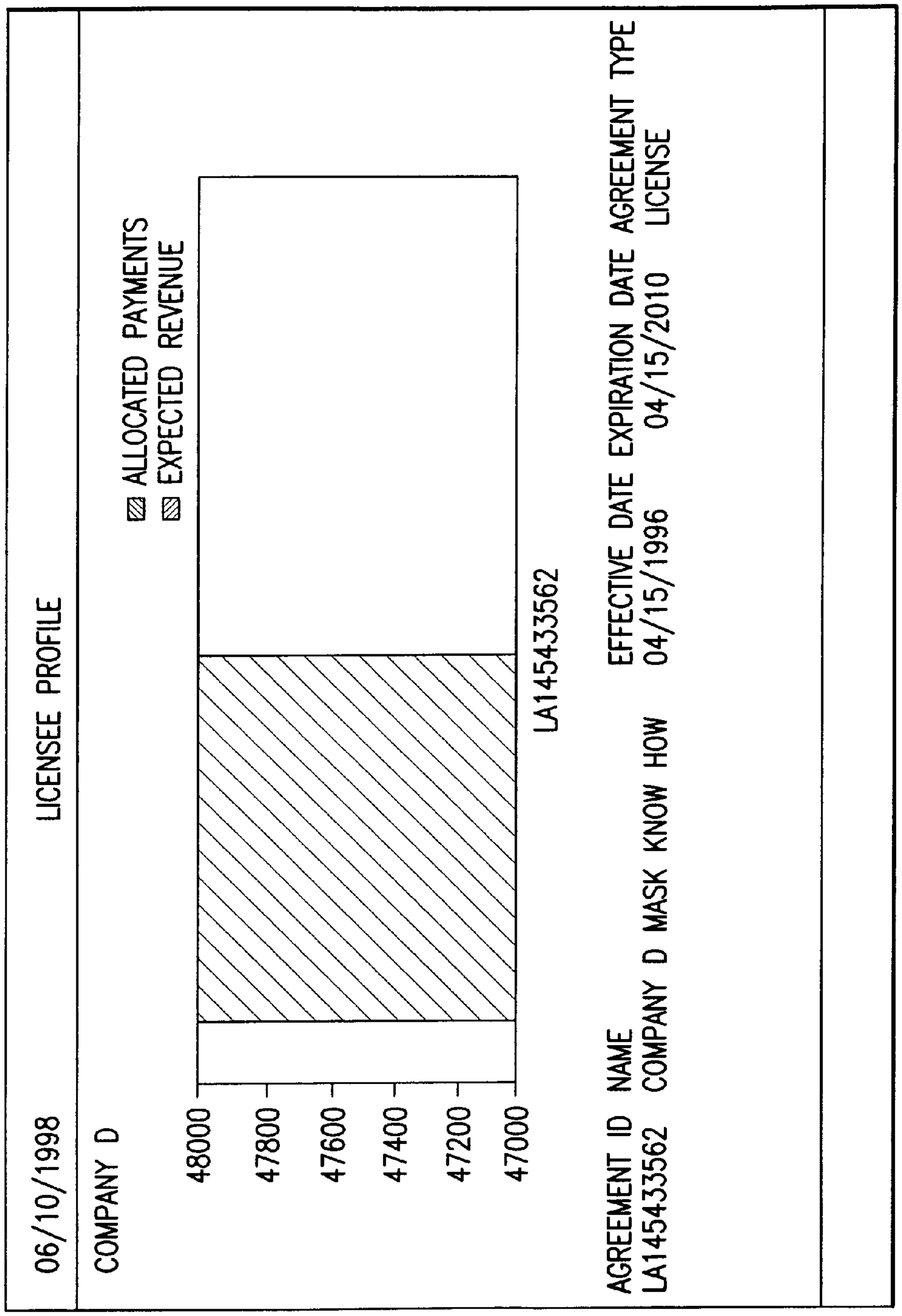
Figure 288E:
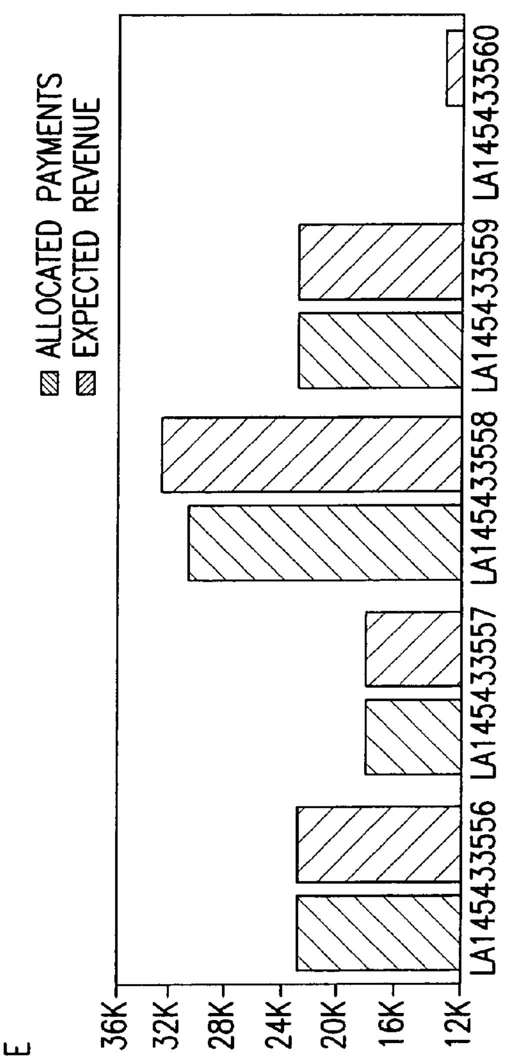
Figure 288F:
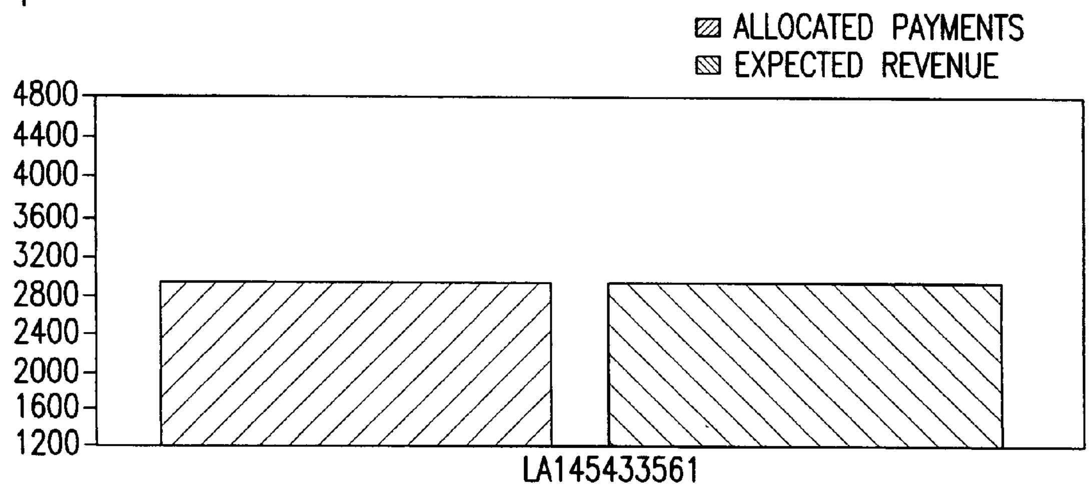

The generate report use case 28502 is diagramed in FIG. 285. The License Manager or Auditor (the "Actor") requests a particular report from a list the Generate report module 19388 displays. The Generate report module 19388 runs and displays or prints the selected report. Preferably, to run a report on an individual object, the Print Object use case or related print use case is used. The operation of this use case is further described below.

Step 1. The Actor begins the transaction to run a report.

Step 2. The Generate report module 19388 constructs a list of available reports, displaying the name and description for the report in the reports view 28402 (FIG. 284).

Step 3. The Actor selects a report and requests that it be run, supplying appropriate parameters through a parameter form as requested and required, including the report destination (print or screen or file), ending the transaction.

Step 4. The Generate report module 19388 runs the report and sends it to the indicated destination.

The following are examples of reports: These are presented for illustrative purposes, and the invention is not limited to these examples. The invention is directed to include any reports of interest that can be generated from the information contained in the databases described herein. Implementation of these and other reports will be apparent to persons skilled in the relevant art(s). It is noted that license related reports can be in a plurality of forms, such as those shown in the figures, and in forms including hyperbolic trees (described above).

Payment exception report: This report tracks the payment amount allocated to a license agreement and compares it to the expected revenue amount providing a balance due. Discrepancies between the expected revenue and the allocated revenue are flagged preferably in red within parenthesis. An example payment exception report is shown in FIGS. 286A-286C.

IP Asset—Agreement Financial Detail (Summary of Intellectual Property): This report lists the license agreements for each licensed IP asset package, providing the payment amount allocated to the asset package and the expected revenue. An example IP Asset—Agreement Financial Detail (Summary of Intellectual Property) report is shown in FIGS. 287A-287D.

Licensee Profile: This graph and detail report provides an overall view of a licensee's agreements. The graph presents total allocated payments and total expected revenue for each agreement. An example Licensee Profile report is shown in FIGS. 288A-288F.

Agreement Summary: The purpose of this report is to provide "front page" agreement and contact information and to list the compensation terms of the agreement. An example of this report is shown in FIG. 289.

Licensee Asset Package Summary: The purpose of this report is to summarize which asset packages and individual assets are licensed by each licensee. An example of this report is shown in FIGS. 290A and 290B.

Payment Allocation Report: This report lists the payments for each agreement and the breakout for each IP asset. An example of this report is shown in FIGS. 291A-291C.

Royalty Statement Summary: This report lists the royalty statements for each agreement providing the line item details for each royalty statement. An example of this report is shown in FIG. 292.

IP Asset—Historical Royalties: This report for each asset in a licensed package lists the agreements that license out the asset and provides a running total of royalties earned. An example of this report is shown in FIG. 293.

The Summary of Intellectual Property Report relates an IP asset to its overall licensing revenue.

The Intellectual Property Licensee Summary Report provides a summary of agreements for each licensee.

The Royalty Expense Allocation Report tracks royalty earnings posted in the General Ledger but not yet verified.

The Licensee Historical Earned Royalty Graph shows Guaranteed Minimum, Actual Payment, Expensed payment, and Term Required totals for a specified Licensee by time period (date range or audit period selection).

The IP Historical Earned Royalty Graph shows G/L total and Expensed total for an IP Asset.

The Overdue Payment Graph shows Statement Received dates, Term total by due date, Payment total by payment date with some sort of flag and value for overdue interest owed or paid.

The Draft License is a report that is in the form of a license agreement document, that is generated by the system based on information in the databases. This draft document can be modified as necessary to produce the actual license agreement document.

Security Use Cases

In an embodiment, Licensing system security includes the security features described above. In other embodiments, Licensing system security includes any combination of the above with one or more other features, such as the following administrative use cases, the ability to assign a security classification in the various document and payment entry and modification use cases, and the ability to change privileges on asset groups.

Administer Entities (Users)

Figure 294:
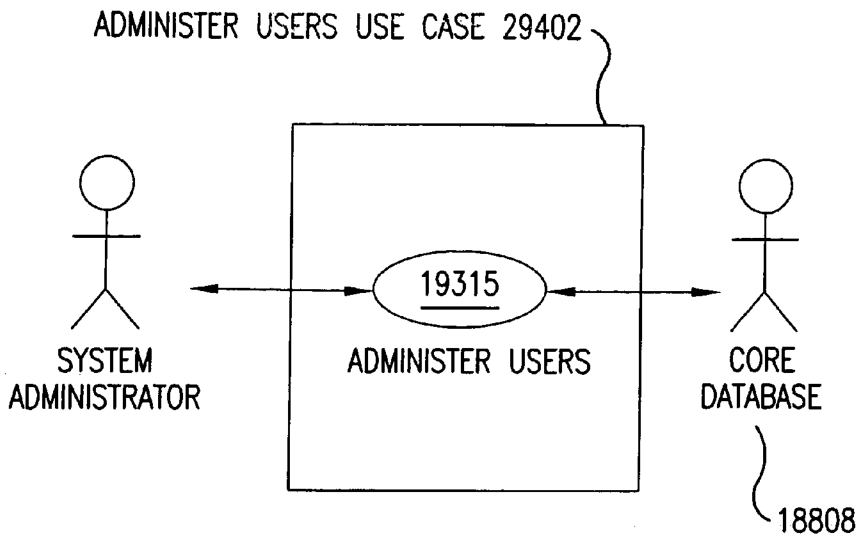

The administer users use case 29402 is diagramed in FIG. 294. According to this use case, the system Administrator creates, modifies, and/or removes users from the core database 18808.

Step 1. The System Administrator starts the transaction.

Step 2. The Administer entities module 19315 displays a list of users ordered by name, displaying the User Name, User Full Name, and Password (the password field appears but the actual password does not); there is also a Confirm Password for validating password entry.

Step 3. The System Administer takes one of the following actions:

Step 3.1. The System Administrator creates a new User, entering the User Name, the Full_Name, and the Password (twice) (the Administer entities module 19315 generates the User ID). The Administer entities module 19315 encrypts the password.

Step 3.2. The System Administrator selects one of the current Users and modifies the Name, the Full Name, or the Password.

Step 3.3. The System Administrator selects one of the current Users and removes it.

Step 4. The System Administrator ends the transaction.

Step 5. The Administer entities module 19315 commits the changes in the core database 18808. The Administer entities module 19315 confirms the commit to the System Administrator.

This use case has a number of extensions:

If the System Administrator presses F1 or the equivalent, the application extends the use case with the Display Help use case.

If removing a User, the Administer entities module 19315 deletes the information from the Licensing database 18804 and moves it to the Recycle Bin (implementation may differ regarding details on deferring the actual SQL deletes, and there is no notification of commit to the System Administrator). The Administer entities module 19315 confirms the commit to the System Administrator. At any time until clearing the Recycle Bin, the administrator can restore the removed. User and its related information.

Administer Security Classes

Figure 295:
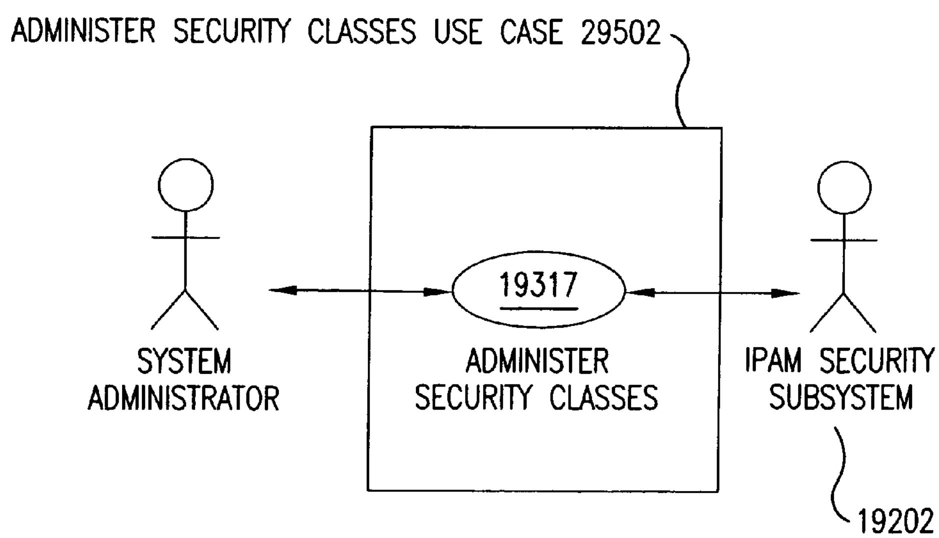

The administer security classes use case 29502 is diagramed in FIG. 295. According to this use case, the system Administrator sees a list of all security classes. The system Administrator can add a new class to the list, can modify the name and access control list of a class, or can remove a class. This use case is further described below.

Step 1. The System Administrator starts the transaction.

Step 2. The Administer security classes module 19317 displays a list of Security Classes, displaying the Security Class ID and Name, and a list of the Entities, displaying the Entity ID and User Name.

Step 3. The System Administer takes one of the following actions:

Step 3.1. The System Administrator creates a new Security Class, entering the Name (the Administer security classes module 19317 generates the Security Class ID), and requests that the IPAM Security Subsystem create the object.

Step 3.2. The System Administrator selects one of the current Classes and modifies the Name.

Step 3.3. The System Administrator selects one of the current Security Classes and requests that the IPAM Security system 19202 remove it.

Step 3.4. The System Administrator selects a Security Class. The Administer security classes module 19317 displays the permissions for that Security Class for each Entity. The System Administrator then modifies the permissions for any entity, including those with no permissions. The System Administrator requests the IPAM Security Subsystem 19202 to set the permissions for the modified Security Class and Entities.

Step 4. The System Administrator ends the transaction.

Step 5. The Administer security classes module 19317 commits the changes in the Licensing Database 18804. The Administer security classes module 19317 confirms the commit to the System Administrator.

At any time, if the System Administrator presses F1 or the equivalent, the application extends the use case with the Display Help use case.

Grant Permissions

Figure 296:
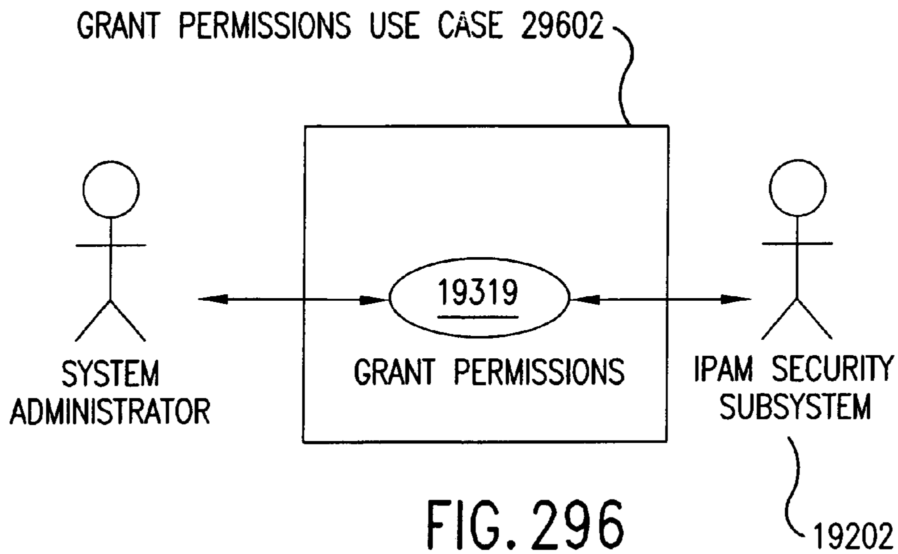

The grant permissions use case 29602 is diagramed in FIG. 296. According to this use case, the System Administrator selects a secure object (an asset package or classifier), selects an entity (user or user group), and grants read, write, and/or delete permission to the entity for the object. The grant permissions module 19319 makes the permissions permanent through the IPAM Security Subsystem 19202. This use case is further described below.

Step 1. The System Administrator starts the transaction.

Step 2. The Grant permissions module 19319 displays a list of the secure objects to which the System Administrator has access based on their current authentication user name. It gets this from the IPAM Security Subsystem 19202. The Grant permissions module 19319 displays the objects sorted into two groups, asset packages and classifiers, distinguishing them by type (an icon, separate panes, or whatever). The asset packages display the Package OID and the Name. The classifiers display the Security Class OID and the Name.

Step 3. The System Administrator selects a secure object.

Step 4. The Grant permissions module 19319 displays a control that lists available entities ordered by entity type and name, which it gets through the IPAM Security Subsystem 19202.

Step 5. The System Administrator selects one or more entities.

Step 6. The Grant permissions module 19319 displays the current permission settings on the secure objects (Read, Write, Delete), distinguishing settings that are the same for all selected secure objects and entities from those that are different (for example, a greyed check mark).

Step 7. The System Administrator sets the permission flags (Read, Write, Delete) to new values as required, then ends the transaction.

Step 8. The Grant permissions module 19319 passes the changes to the IPAM Security Subsystem 19202, which updates the security tables in the Core Database 18808.

Administer Roles

Figure 300:
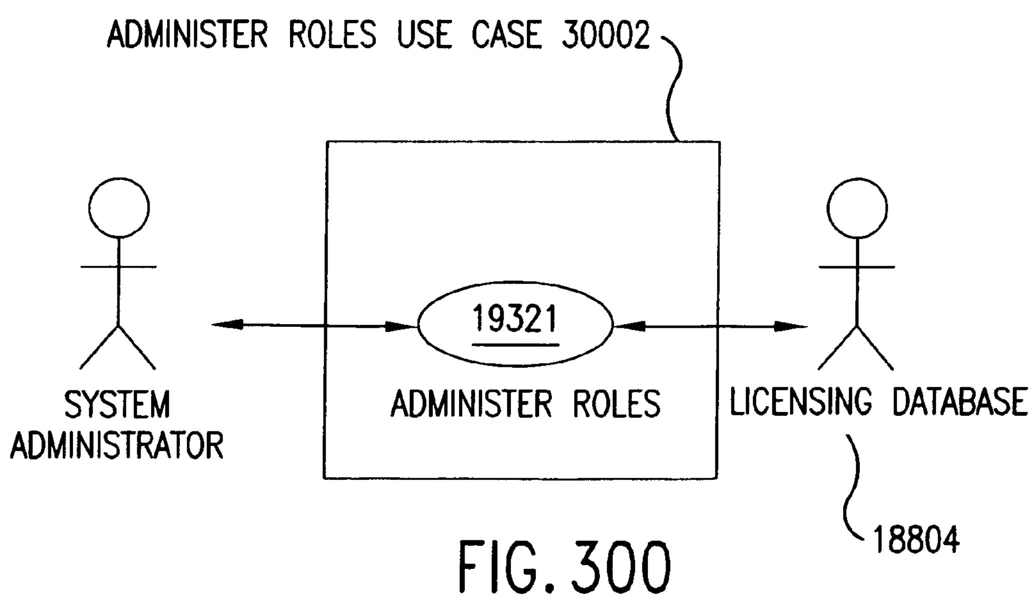

The administer roles use case 30002 is diagramed in FIG. 300. According to this use case, the System Administrator creates, modifies, and/or removes roles from the Licensing database 18804. The operation of this use case is further described below.

Step 1. The System Administrator starts the transaction.

Step 2. The Administer roles module 19321 displays a list of Roles, displaying the Role ID, Name, and Description.

Step 3. The System Administer takes one of the following actions:

- Step 3.1. The System Administrator creates a new Role, entering the Name and Description (the Administer roles module 19321 generates the Role ID)
- Step 3.2. The System Administrator selects one of the current Roles and modifies the Name or the Description.
- Step 3.3. The System Administrator selects one of the current Roles and removes it.

Step 4. The System Administrator ends the transaction.

Step 5. The Administer roles module 19321 commits the changes in the Licensing database 18804. The Administer roles module 19321 confirms the commit to the System Administrator.

This use case has a number of extensions:

- If the System Administrator presses F1 or the equivalent, the application extends the use case with the Display Help use case.
- If removing a Role, the Administer roles module 19321 deletes the information from the licensing database 18804 and moves it to the Recycle Bin (implementation may differ regarding details on deferring the actual SQL deletes, and there is no notification of commit to the System Administrator). The Administer roles module 19321 confirms the commit to the System Administrator. At any time until clearing the Recycle Bin, the administrator can restore the removed Role and its related information.

Currency Use Cases

The various monetary amounts in Licensing module 18702 may be in any currency. This can cause problems when payments, royalty statements, and compensation terms list the amounts in different currencies. The Convert Currency use case provides a currency conversion mechanism for the generate report module 19388. This is visible to the user when the user takes an action that needs to operate on amounts in different currencies.

Currency conversion depends on a database of conversion ratios. These ratios vary over time. Depending on the customer's needs, the customer could want to have a different ratio every day, every month, or every year. Or, they could just want a single conversion rate. The Maintain Currency Conversions use case corresponds to a menu entry that lets the License Administrator enter open-ended time intervals and conversion ratios that hold during those intervals.

Convert Currency

Figure 298:
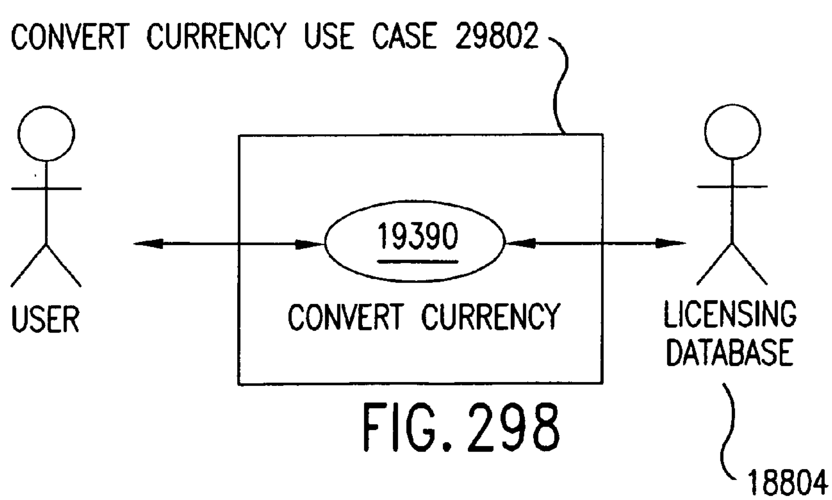

The convert currency use case 29802 is diagramed in FIG. 298. This use case is used by several other use cases to convert monetary amounts. The User passes the monetary amount, the currency, and the date to the use case. The Convert currency module 19390 converts the currency using the currency conversion intervals from the Licensing database 18804 and returns the dollar amount. The operation of this use case is further described below.

Step 1. The using use case passes in the monetary amount, the currency object identifier, and the date of the transaction.

Step 2. The Convert currency module 19390 looks up the currency conversion rate in the licensing database 18804. The conversion rate depends on the date of the transaction, because currency rates fluctuate with time.

Step 3. The Convert currency module 19390 returns the converted amount in dollars.

This use case has a number of extensions:

- If the currency doesn't exist, the Convert currency module 19390 displays an error message: "Currency <oid> doesn't exist."
- If there are no currency intervals for the currency with a date less than or equal to the transaction date, the Convert currency module 19390 displays an error message: "No conversions for currency as of <Transaction Date>".

Maintain Currency Conversions

Figure 299:
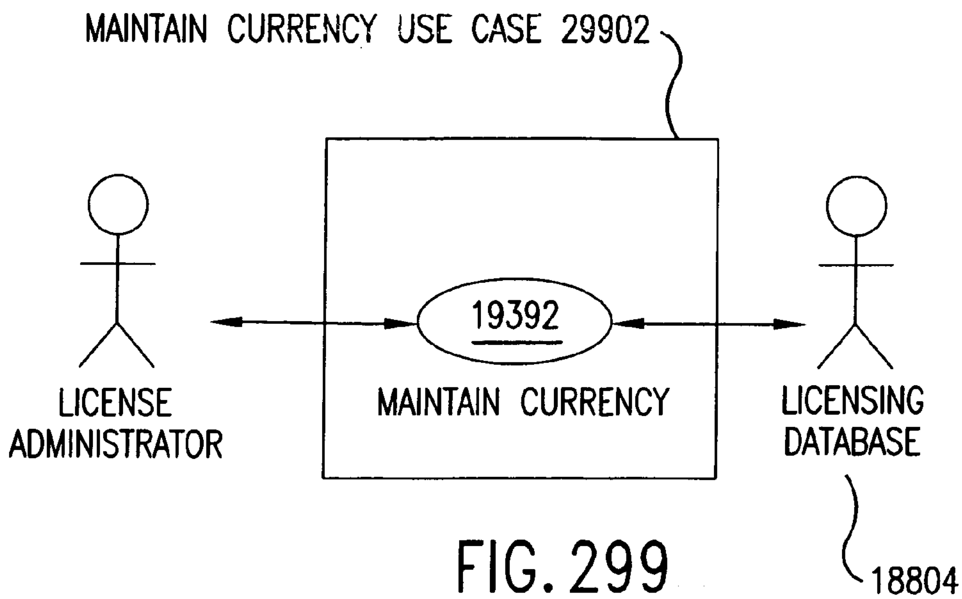

The maintain currency conversions use case 29902 is diagramed in FIG. 299. According to this use case, the License Administrator performs various currency maintenance functions:

- Adding a new currency
- Modifying an existing currency
- Removing a currency
- Adding a new currency conversion interval
- Removing an existing interval
- Modifying an existing interval The operation of this use case is further described below.

Step 1. The License Administrator begins the transaction.

Step 2. The Maintain currency use case 29902 displays a list of currencies, displaying the Unit Name, Country, and Unit Symbol for the currency:

Step 3. The License Administrator selects a currency or adds a new currency. The License Administrator optionally changes the Unit Name, Country, or Unit Symbol or removes the currency.

Step 4. If the currency is new, the Maintain currency use case 29902 creates a new currency object identifier. The Maintain currency use case 29902 displays the time interval layout of the currency, displaying the Start Date, the Dollar Conversion Rate, and the Description, if any:

Step 5. The License Administrator selects an interval, if there are any.

Step 6. The License Administrator removes the selected interval or changes the Start Date, Dollar Conversion Rate, or Description fields.

Step 7. The License Administrator repeats steps 3-6 or commits the transaction.

Step 8. The Maintain currency use case 29902 inserts any new currencies, updates any changed currencies, and deletes any removed currencies (including any currency intervals). The Maintain currency use case 29902 inserts any new intervals, updates any changed intervals, and deletes any removed intervals. The Maintain currency use case 29902 confirms the commit to the License Administrator.

This use case has an extension. Specifically, if the License Administrator wants to add a new interval to the existing set, the Maintain currency use case 29902 displays the new interval at the bottom of the list of current intervals. The License Administrator enters the Start Date, the Description, and the Dollar Conversion Rate. When the License Administrator selects another interval, the Maintain currency use case 29902 sorts the list and puts the new interval in its proper place in the list ordered by date.

Top Level Operational Examples of the Licensing System

An example thread of operation through the licensing system 18702 shall now be described with reference to a flowchart 30102 in FIG. 301. In should be understood that the present invention, including the licensing system 18702, is very powerful, very flexible, very adaptable, and very user-responsive. According to the invention, users can employ and/or adapt the functions, modules, components, objects, etc., describe herein to pursue their own strategies, goals, needs, requirements, desires, etc. Users are not limited to the particular examples described herein, such as the example in FIG. 301. Accordingly, it should be understood that the example of FIG. 301 is provided for purposes of illustration, and is not limiting.

In the following, the steps are said to be performed by a "user." Generally, this user can be any person desiring to use the licensing system 18702, including any of the actors described herein. Also, different users can perform different steps.

In step 30104, the user defines entities. These entities will later be assigned to roles, such as licensee and licensor. See, inter alia, the Administer Entity use case.

In step 30106, the user creates IP (intellectual property) assets. This involves entering patent assets if the licensing system 18702 is not integrated with the IPAM database 316. If the licensing system 18702 is integrated with the IPAM database 316, then there is no need to enter patent assets as such patent assets are accessible from the IPAM database 316 (although in some embodiments, the user is allowed to enter patent assets even when the licensing system 18702 is integrated with the IPAM database 316, since, for example, the IPAM database 316 may not include all U.S. and/or foreign patents, reissues, reexaminations, etc.). This step also includes entering trademark assets, entering trade secret assets, entering copyright assets, entering know how assets, etc. See, inter alia, the Enter Patent, Enter Trademark, Enter Copyright, Enter Trade Secret, and Enter Know How use cases.

In step 30108, the user creates asset packages. Each asset package includes IP assets to license. There are three types of asset packages: standard, group, and descriptive. When entering a standard asset package, the user manually selects assets for inclusion into the asset package (this can be done via drag and drop operations, for example). When entering a group asset package, the user selects an IPAM group. The assets in the IPAM group become the contents of the asset package. When entering a descriptive asset package, the user provides a description of the assets being licensed, such as "All patents and patent applications currently existing as of Jun. 18, 1997." See, inter alia, the Create IP Asset Package use case.

In step 30110, optionally, the user provides a revenue allocation percentage for each asset in an asset package. An asset's revenue allocation percentage within an asset package indicates the degree to which that asset contributed to license revenue attributed to the asset package. For example, if an asset within an asset package has an allocation percentage of 65%, and a license revenue of $100 is attributed to the asset package, then that asset is considered to have been responsible for generating $65 of the $100 license revenue. See, inter alia, the Create IP Asset Package use case.

In step 30112, the user creates a license agreement. See, inter alia, the Enter License Agreement use case. In doing so, the user specifies the parties to the agreement, such as the licensee(s) and the licensor(s). These parties are entities who were defined in step 30106. See, inter alia, the Link to Party use case.

The license agreement is an instrument that operates to license IP assets from the licensor(s) to the licensee(s). According to an embodiment of the invention, the IP assets that are being licensed via the license agreement are specified via asset packages. Specifically, in step 30112, the user identifies one or more asset packages that contain the IP assets that are desired to be licensed via the license agreement. These identified asset packages are linked to the license agreement. See, inter alia, the Link to Asset Package use case.

A license agreement includes a number of terms agreed upon by the parties, such as whether the license is limited to particular territories, whether the license is exclusive or not exclusive, whether the license includes grant back provisions, etc. Importantly, a license also includes compensation terms, which specify the compensation that the licensee pays to the licensor for the benefit of receiving the license to the IP assets contained in the linked asset packages. Accordingly, also in step 30112, the user enters compensation terms for the license. See, inter alia, the Enter Compensation Term use case.

In step 30114, optionally, the user determines the expected revenue of the license agreement. This is preferably done on a per compensation term basis. Specifically, for each compensation term, a schedule of expected future revenue payment(s) is calculated, based on the type and characteristics of the term. For example, if Term1 is a lump sum payment of $100 to be paid on Jan. 1, 2000, then the expected revenue of Term 1 is calculated to be $100 to be received by the licensor on Jan. 1, 2000. If Term2 is an ongoing royalty based on per unit sales, where the royalty rate is $1 per 100 units and the estimated unit sales is 1000 per period (specified via the Enter Compensation Term use case), then the expected revenue of Term2 is calculated to be $10 per period. These expected future revenue payments are displayed in the expected revenue tab 27208 of the payment dialog 27202 (FIG. 272). See, inter alia, the Enter Compensation Term and Create Expected Revenue use cases.

In step 30116, the user receives a royalty statement related to the license from the licensee. Licensees are typically required to send such royalty statements to the licensor, such as on a quarterly basis. The user enters the royalty statement into the system. This includes entering the period to which the royalty statement applies. This also includes entering the details of the royalty statement, where each detail corresponds to a product, the number of units of the product sold during the period, the revenue generated by the sales, and the royalty due. This information is obtained from the royalty statement. See, inter alia, the Enter Royalty Statement use case.

In step 30118, the user receives a license revenue payment related to the license. The user enters the payment into the system. This includes entering the amount of the payment. Optionally, this also includes allocating the payment to terms of the license. See FIG. 274. For example, assume that a license has terms Term1 and Term2, and that in step 30114 it was calculated that on a per period basis the expected revenue of Term1 is $100, and the expected revenue of Term2 is $200. Assume that the payment is for $275. In step 30118, the user may elect to allocate $100 of the $275 payment to Term1, and the remaining $175 of the $275 payment to Term2. In this example, the expected revenue of Term1 is fully satisfied by the payment, but the expected revenue of Term2 is short by $25. This is an example of how the invention can aid the user in tracking license payments.

Optionally, step 30118 also includes allocating the payment to details of royalty statements received by the licensor from the licensee. See FIG. 273. For example, suppose that a royalty statement having details Detail1 and Detail2 are associated with the license agreement Detail1 has an expected royalty of $125, and Detail2 has an expected royalty of $250. Assume that the payment is for $275. In step 30118, the user can elect to allocate $125 of the $275 payment to Detail1, and the remaining $150 of the $275 payment to Detail2. In this example, the expected royalty of Detail1 is fully satisfied by the payment, but the expected royalty of Detail2 is short by $100. This is another example of how the invention can aid the user in tracking license payments.

With regard to the operation of step 30118, see, inter alia, the Enter Payment, Modify Payment, Link to Expected Revenue, and Link to Detail use cases.

In step 30120, the user runs reports based on his needs, requirements, interests, etc. Examples of reports supported by the invention include, but are not limited to: compare payments to royalty statement details; compare payments to expected revenue; determine the revenues (payments) attributable to each asset in an asset package; and any other report discussed herein. It is noted that the invention is not limited to the reports discussed herein. Any report, particularly any financial related report, relating to the subject matter discussed herein and/or derivable from the data discussed herein is contemplated by the invention. Implementation of such reports will be apparent to persons skilled in the relevant art(s).

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer based method for managing intellectual property (IP) related transactions, comprising:

facilitating a user to define, using a computing device, a plurality of indexes, to increase searching performance;

accessing, using the computing device, a first database comprising information representative of at least one IP asset having at least one of said plurality of user-defined indexes for one or more data fields representing said at least one IP asset within said first database;

accessing, using the computing device, a second database comprising information representative of at least one IP asset package, each package comprising at least one IP asset;

accessing, using the computing device, a third database comprising information representative of at least one license agreement, each agreement associated with at least one IP asset package; and processing, using the computing device and at least one of said plurality of user-defined indexes, in a manner specified by a received command, information representative of at least one of:

said at least one IP asset;

said at least one IP asset package; or said at least one license agreement.

2. The method of claim 1, further comprising:

accessing, using the computing device, a fourth database comprising information representative of at least one royalty statement, each royalty statement associated with at least one license agreement;

accessing, using the computing device, a fifth database comprising information representative of at least one payment, each payment associated with at least one license agreement; and enabling processing of, using the computing device and at least one of said plurality of user-defined indexes, in a manner specified by a received command, information representative of at least one of:

said at least one IP asset;

said at least one IP asset package;

said at least one license agreement;

said at least one royalty statement; or said at least one payment.

3. The method of claim 2, further comprising:

accessing, using the computing device, a sixth database comprising information representative of entities and entity roles;

wherein said at least one license agreement specifies one or more of said entities as parties to said at least one license agreement.

4. The method of claim 2, wherein said at least one royalty statement comprises information pertaining to one or more royalty statement details, wherein each of said one or more royalty statement details corresponds to a product and comprises information indicative of a number of units of the product sold during a period of said at least one royalty statement, revenue generated by the sales, or royalty due.

5. The method of claim 2, wherein said at least one payment is allocated to one or more terms of said at least one license agreement.

6. The method of claim 2, wherein said at least one payment is allocated to one or more details of one or more royalty statements associated with said at least one license agreement.

7. The method of claim 2, wherein accessing the third database comprises comparing any payment amounts allocated to said at least one license agreement to any expected revenue amounts of said at least one license agreement; and generating a payment exception report based on results of the comparing.

8. The method of claim 2, wherein accessing the third database comprises generating an IP asset report listing any license agreements involving said at least one IP asset package, wherein the IP asset report includes information indicative of any payment amounts allocated to said at least one IP asset package, or any expected revenue of said at least one IP asset package.

9. The method of claim 2, wherein accessing the third database comprises generating a licensee profile report comprising information indicative of total allocated payments or total expected revenue for each of said at least one license agreement.

10. The method of claim 2, wherein accessing the third database comprises generating an agreement summary report comprising information indicative of at least contact information or compensation terms of said at least one license agreement.

11. The method of claim 2, wherein accessing the third database comprises generating a licensee asset package summary report comprising information indicative of any asset packages or any IP assets licensed to each licensee.

12. The method of claim 2, wherein accessing the third database comprises generating a payment allocation report comprising information indicative of any payments associated with said at least one license agreement, or allocation of said any payments to terms of said at least one license agreement.

13. The method of claim 2, wherein accessing the third database comprises generating a royalty statement summary report comprising information indicative of any royalty statements, or details of said any royalty statements, associated with said at least one license agreement.

14. The method of claim 2, wherein accessing the third database comprises generating a historical royalties report listing any license agreements that license an IP asset, and comprising information indicative of royalties earned for said IP asset per license agreement.

15. The method of claim 2, wherein accessing the third database comprises generating a summary of IP report comprising information indicative of overall licensing revenue of an IP asset.

16. The method of claim 2, wherein accessing the third database comprises generating an IP license summary report that provides a summary of license agreements for each licensee.

17. The method of claim 2, wherein accessing the third database comprises generating a royalty expense allocation report that tracks royalty earnings posted in a general ledger but not yet verified.

18. The method of claim 2, wherein accessing the third database comprises generating a licensee historical earned royalty report comprising information indicative of Guaranteed Minimum, Actual Payment, Expensed payment, or Term Required totals for said at least one license agreement.

19. The method of claim 2, wherein accessing the third database comprises generating an IP historical earned royalty group comprising information indicative of license agreement total or Expensed total for an IP Asset.

20. The method of claim 2, wherein accessing the third database comprises:

generating an Overdue Payment report comprising information indicative of Statement Received dates, Term total by due date, or Payment total by payment date.

21. The method of claim 1, wherein said at least one IP asset comprises at least one of:

a patent asset;

a copyright asset;

a trade mark asset;

a trade secret asset; or a know how asset.

22. The method of claim 1, wherein said at least one IP asset package comprises at least one of:

a standard IP asset package;

a group IP asset package; or a descriptive IP asset package.

23. The method of claim 22, wherein said standard IP asset package comprises any selected combination of said at least one IP asset.

24. The method of claim 22, wherein said group IP asset package is associated with a group, said group IP asset package comprising any assets in said group.

25. The method of claim 24, wherein said group includes one or more patents, and wherein said group IP asset package comprises said one or more patents.

26. The method of claim 22, wherein said descriptive IP asset package is associated with a description, and wherein said descriptive IP asset package comprises assets satisfying said description.

27. The method of claim 1, wherein said at least one IP asset package comprises a revenue allocation percentage for each of said at least one IP asset in said at least one IP asset package.

28. The method of claim 1, wherein said at least one license agreement comprises one or more specified compensation terms.

29. The method of claim 28, wherein said at least one license agreement further comprises information pertaining to expected revenue of said at least one license agreement.

30. The method of claim 29, wherein said expected revenue is automatically calculated for said one or more specified compensation terms.

31. The method of claim 28, wherein said one or more specified compensation terms comprises one or more of an ongoing royalty per unit term, royalty per sales term, minimum guarantee term, advance term, ongoing fee term, or lump sum fee term.

32. The method of claim 28, wherein said one or more specified compensation terms comprises at least one term that includes a recurring payment.

33. The method of claim 1, wherein said at least one license agreement comprises one or more terms related to at least one of territorial restrictions or field-of-use restrictions.

34. The method of claim 1, wherein accessing the third database comprises generating a report based on said processing, wherein said report comprises at least one hyperbolic tree to visualize data resulting from said processing.

35. A non-transitory computer-readable storage medium having instructions stored thereon that in response to execution by a computing device causes the computing device to perform operations for managing intellectual property (IP) related transactions, the instructions comprising:

instructions to facilitate a user to define, using the computing device, a plurality of indexes to increase searching performance;

instructions to access, using the computing device, a first database comprising information representative of at least one IP asset having at least one of said plurality of user-defined indexes for one or more data fields representing said at least one IP asset within said first database;

instructions to access a second database comprising at least a second one of said plurality of user-defined indexes for one or more data fields associated with information representative of at least one license agreement, wherein each license agreement is associated with at least one IP asset; and instructions to process, using at least one of said plurality of user-defined indexes, in a manner specified by a received command, information representative of at least one of said at least one IP asset or said at least one license agreement.

36. The non-transitory computer-readable storage medium of claim 35, the instructions further comprising:

instructions to access a third database comprising information representative of at least one royalty statement, each royalty statement associated with at least one license agreement;

instructions to access a fourth database comprising information representative of at least one payment, each payment associated with at least one license agreement; and instructions to process, in a manner specified by a received command, using at least one of said plurality of user-defined indexes, information representative of at least one of:

said at least one IP asset;

said at least one license agreement;

said at least one royalty statement; or at least one payment.

37. A system for managing intellectual property (IP) related transactions, the system comprising:

one or more computers;

means for facilitating a user to define a plurality of indexes to increase searching performance;

means for accessing a first database stored on a computer readable storage medium, said first database comprising information representative of at least one IP asset having at least one of said plurality of user-defined indexes for one or more data fields representative of said at least one IP asset within said first database;

means for accessing a second database stored on a computer readable storage medium, said second database comprising information representative of at least one license agreement, each license agreement associated with at least one IP asset; and means for processing, by said one or more computers, a manner specified by a received command, and by searching at least one of said plurality of user-defined indexes, information representative of at least one of said at least one IP asset or said at least one license agreement.

38. The system of claim 37, further comprising:

means for accessing a third database stored on a computer readable storage medium, said third database comprising information representative of at least one royalty statement, each statement associated with at least one license agreement;

means for accessing a fourth database stored on a computer readable storage medium, said fourth database comprising information representative of at least one payment, each payment associated with at least one license agreement; and means for processing by said or more computers, of, in a manner specified by a received command, information representative of at least one of:

said at least one IP asset;

said at least one license agreement;

said at least one royalty statement; or at least one payment.

39. A non-transitory computer-readable storage medium having instructions stored thereon, that in response to execution by a computing device causes the computing device to perform operations for managing intellectual property (IP) related transactions, the instructions comprising:

instructions to define a plurality of indexes to increase searching performance;

instructions to access a first database comprising information representative of at least one IP asset having at least one of said plurality of user-defined indexes for one or more data fields representative of said at least one IP asset within said first database;

instructions to access a second database comprising at least a second one of said plurality of user-defined indexes for one or more data fields associated with information representative of at least:

one license agreement; and one license agreement, wherein each license agreement is associated at least one IP asset; and instructions to process, in a manner specified by a received command, and by searching the at least one of said plurality of user-defined indexes and the at least second one of said plurality of user-defined indexes, information representative of said at least one IP asset or said at least one license agreement.

40. The non-transitory computer-readable storage medium of claim 39, the instructions further comprising:

instructions to access a third database comprising information representative of at least one royalty statement, each royalty statement associated with at least one license agreement;

instructions to access a fourth database comprising information representative of at least one payment, each payment associated with at least one license agreement; and instructions to process, in a manner specified by a received command, information representative of at least one of:

said at least one IP asset;

said at least one license agreement;

said at least one royalty statement; or at least one payment.

41. A computer-implemented method of managing intellectual property (IP) related transactions, comprising:

defining, by a computing device, a plurality of indexes to increase searching performance;

receiving, via the computing device, information representative of at least one IP asset having at least one of said plurality of user-defined indexes associated with or more data fields representative of said at least one IP asset;

receiving, via the computing device, information representative of at least one license agreement, each license agreement associated with at least one IP asset; and processing, by the computing device, in a manner specified by a received command, and by searching the at least one of said plurality of user-defined indexes, information representative of at least one of said at least one IP asset, or said at least one license agreement.

42. The method of claim 41, further comprising:

receiving information representative of at least one royalty statement, each royalty statement associated with at least one license agreement;

receiving information representative of at least one payment, each payment associated with at least one license agreement; and processing, by the computing device, in a manner specified by a received command, and by searching the at least one of said plurality of user-defined indexes, information representative of at least one of:

said at least one IP asset;

said at least one license agreement;

said at least one royalty statement; or said at least one payment.

43. A system for managing intellectual property (IP) related transactions, the system comprising:

one or more processors;

means for facilitating a user to define a plurality of indexes to increase searching performance;

means for enabling a user to enter information representative of at least one IP asset having at least one of said plurality of user-defined indexes associated with or more data fields representative of said at least one IP asset;

means for enabling said user or another user to enter information representative of at least one license agreement, each license agreement associated with at least one IP asset; and means for processing, by said one or more processors, in a manner specified by a received command, and by searching the at least one of said plurality of user-defined indexes, information representative of at least one of said at least one IP asset or said at least one license agreement.

44. The system of claim 43, further comprising:

means for enabling a user to enter information representative of at least one royalty statement, each royalty statement associated with one or more of said at least one license agreement;

means for enabling said user or another user to enter information representative of at least one payment, each payment associated with at least one license agreement; and means for processing, by said one or more processors, in a manner specified by a received command, and by searching the at least one of said plurality of user-defined indexes, information representative of at least one of:

said at least one IP asset;

said at least one license agreement;

said at least one royalty statement; or said at least one payment.

45. A computer program product comprising control logic stored in a non-transitory computer-readable storage medium, said control logic comprising:

means for enabling a computing device to facilitate a user to define a plurality of indexes to increase searching performance;

means for enabling said computing device to facilitate said user or another user to enter information representative of at least one IP asset having at least one of said plurality of user-defined indexes associated with or more data fields representative of said at least one IP asset;

means for enabling said computing device to facilitate said user or another user to enter information representative of at least one license agreement, each license agreement associated with at least one IP asset; and means for enabling said computing device to process, in a manner specified by a received command, and by searching the at least one of said plurality of user-defined indexes, information representative of at least one of said at least one IP asset or said at least one license agreement.

46. The computer program product of claim 45, wherein said control logic further comprises:

means for enabling a computing device to facilitate a user to enter information representative of at least one royalty statement, each royalty statement associated with at least one license agreement;

means for enabling said computing device to facilitate said user or another user to enter information representative of at least one payment, each payment associated with at least one license agreement; and means for facilitating said computing device to facilitate processing of, in a manner specified by a received command, information representative of at least one of:

said at least one IP asset;

said at least one license agreement, said at least one royalty statement; or said at least one payment.

47. A computer-implemented method of processing data including data related to intellectual property (IP) related transactions, comprising:

facilitating a user to define a plurality of indexes to increase searching performance;

accessing, by a computing device, at least one patent database of information representative of patents having at least one of said plurality of user-defined indexes for one or more data fields representative of said at least one patent within said first database;

accessing, by the computing device, one or more groups, each of said one or more groups comprising any of said patents represented in said at least one patent database;

accessing at least one IP asset package comprising assets specified in at least one of said one or more groups;

accessing, by the computing device, a database comprising at least a second one of said plurality of user-defined indexes for one or more data fields associated with information representative of at least one license agreement wherein each license agreement is associated with at least one IP asset package; and processing, by the computing device, in a manner specified by a user command, and by searching the at least one of said plurality of user-defined indexes and the at least second one of said plurality of user-defined indexes, information representative of at least one of:

said at least one IP asset package;

said at least one license agreement; or said one or more groups.

48. A computer-implemented method of processing data, comprising:

facilitating a user to define an index to increase searching performance;

accessing, by a computing device, at least one first database of information representative of patents having said user-defined index;

accessing, by the computing device, at least one second database of non-patent information;

accessing at least one group formed according to non-patent criteria of interest to a user, said at least one group comprising one or more patents represented in said at least one first database that map to said non-patent criteria; and automatically processing, by the computing device and by searching said user-defined index, at least one patent in said at least one group with further consideration of at least one of patent information or non-patent information.

49. The method of claim 48, wherein said non-patent information comprises information related to intellectual property (IP) related transactions.

50. A computer-implemented method of processing data, comprising:

facilitating a user to define an index to increase searching performance;

accessing, by a computing device, at least one first database of information representative of patents having said user-defined index;

accessing, by the computing device, at least one second database of non-patent information;

accessing at least one group formed according to one or more of the following criteria: a product, a group of products, one or more technologies, one or more field of uses, one or more product applications, one or more processes, one or more product-by-processes, one or more prior art references, one or more prior art citations, one or more citing patents, frequency of prior art citations, one or more patent classes, one or more patent subclasses, one or more related patent applications, one or more related issued patents, one or more corresponding foreign patent applications, one or more corresponding foreign issued patents, one or more patent application filing dates, one or more patent issue dates, one or more patent claims, one or more pending patent application claims, one or more issued patent claims, one or more patentees, one or more inventors, one or more authors, one or more patent assignments, one or more patent application assignments, one or more assignors, one or more assignees, one or more licensors, one or more licensees, one or more license agreements, one or more competitors, one or more infringers, one or more litigations, one or more litigation parties, one or more patent annuity payment due dates, one or more patent maintenance payment due dates, one or more bill of materials, sales data, one or more publications, one or more product trademarks, one or more trademark licenses, one or more service marks, one or more service mark licenses, one or more copyrights, one or more copyright licenses, one or more trade secrets, one or more trade secret licenses, know-how, one or more know-how licenses, one or more mergers, one or more acquisitions, one or more transfers of ownership, one or more corporate entities, one or more prosecuting law firms, one or more responsible patent examiners, one or more inventors, one or more persons associated with patents, one or more patent statuses, or one or more transfers of licenses, wherein said at least one group comprises one or patents from said first database that map to said one or more criteria; and automatically processing, by the computing device and by searching said user-defined index, at least one patent in said at least one group with further consideration of at least one of patent information or non-patent information.

51. The method of claim 50, wherein said non-patent information comprises information related to intellectual property (IP) related transactions.

* * * * *

UNITED STATES PATENT AND TRADEMARK OFFICE

CERTIFICATE OF CORRECTION

PATENT NO. : 7,949,728 B2
APPLICATION NO. : 11/513360
DATED : May 24, 2011
INVENTOR(S) : Rivette et al.

It is certified that error appears in the above-identified patent and that said Letters Patent is hereby corrected as shown below:

Title Page 3, item (56), under "Other Publications", in Column 1, Line 38, delete "Technolgies," and insert -- Technologies, --.

Title Page 3, item (56), under "Other Publications", in Column 1, Line 48, delete "Protability" and insert -- Portability --.

Title Page 3, item (56), under "Other Publications", in Column 1, Line 72, delete "IrnagingWorld," and insert -- ImagingWorld, --.

Title Page 3, item (56), under "Other Publications", in Column 2, Line 20, delete "coopertive" and insert -- cooperative --.

Title Page 3, item (56), under "Other Publications", in Column 2, Line 24, delete "TexcWare" and insert -- TextWare --.

Title Page 3, item (56), under "Other Publications", in Column 2, Line 26, delete "Technolgies," and insert -- Technologies, --.

Title Page 3, item (56), under "Other Publications", in Column 2, Line 33, delete "Simpicity" and insert -- Simplicity --.

Title Page 3, item (56), under "Other Publications", in Column 2, Line 36, delete ""Zylmage" and insert -- "ZyImage --.

Title Page 3, item (56), under "Other Publications", in Column 2, Line 42, delete "USAPTO" and insert--USPTO --.

Title Page 3, item (56), under "Other Publications", in Column 2, Line 58, delete ""Zylmage" and insert -- "ZyImage --.

Signed and Sealed this
Eleventh Day of October, 2011

David J. Kappos

David J. Kappos
*Director of the United States Patent and Trademark Office*

Title Page 3, item (56), under “Other Publications”, in Column 2, Line 60, delete ““Zylmage 3.0 will facillitate” and insert -- “ZyImage 3.0 will facilitate --.

Title Page 4, item (56), under “Other Publications”, in Column 1, Line 25, delete ““Detaware” and insert -- “Dataware --.

Title Page 4, item (56), under “Other Publications”, in Column 1, Line 32, delete “Technolgies,” and insert -- Technologies, --.

Title Page 4, item (56), under “Other Publications”, in Column 1, Line 34, delete “Technolgies,” and insert -- Technologies, --.

Title Page 4, item (56), under “Other Publications”, in Column 1, Line 43, delete ““PatenImages,” and insert -- “PatentImages, --.

Title Page 4, item (56), under “Other Publications”, in Column 1, Line 68, delete “PatenImages,” and insert -- PatentImages, --.

Title Page 5, item (56), under “Other Publications”, in Column 1, Line 27, delete “Formating” and insert -- Formatting --.

Title Page 5, item (56), under “Other Publications”, in Column 2, Line 43, delete ““Maiming” and insert -- “Manning --.

Title Page 5, item (56), under “Other Publications”, in Column 2, Line 58, delete ““Maiming” and insert -- “Manning --.

Title Page 5, item (56), under “Other Publications”, in Column 2, Line 58, delete “Serivces:” and insert -- Services: --.

Title Page 6, item (56), under “Other Publications”, in Column 2, Line 17, delete “Gather. Analyze. and” and insert -- Gather, Analyze, and --.

Column 206, line 49, in Claim 7, delete “comprises” and insert -- comprises: --.

Column 206, line 56, in Claim 8, delete “comprises” and insert -- comprises: --.

Column 206, line 64, in Claim 9, delete “comprises” and insert -- comprises: --.

Column 207, line 2, in Claim 10, delete “comprises” and insert -- comprises: --.

Column 207, line 8, in Claim 11, delete “comprises” and insert -- comprises: --.

Column 207, line 13, in Claim 12, delete “comprises” and insert -- comprises: --.

Column 207, line 19, in Claim 13, delete "comprises" and insert -- comprises: --.

Column 207, line 25, in Claim 14, delete "comprises" and insert -- comprises: --.

Column 207, line 31, in Claim 15, delete "comprises" and insert -- comprises: --.

Column 207, line 35, in Claim 16, delete "comprises" and insert -- comprises: --.

Column 207, line 39, in Claim 17, delete "comprises" and insert -- comprises: --.

Column 207, line 44, in Claim 18, delete "comprises" and insert -- comprises: --.

Column 207, line 47, in Claim 18, delete "payment," and insert -- Payment, --.

Column 207, line 50, in Claim 19, delete "comprises" and insert -- comprises: --.

Column 207, line 63, in Claim 21, delete "trade mark" and insert -- trademark --.

Column 209, lines 26-27, in Claim 37, delete "computer readable" and insert -- computer-readable --.

Column 209, lines 32-33, in Claim 37, delete "computer readable" and insert -- computer-readable --.

Column 209, line 37, in Claim 37, delete "a" and insert -- in a --.

Column 209, lines 44-45, in Claim 38, delete "computer readable" and insert -- computer-readable --.

Column 209, lines 49-50, in Claim 38, delete "computer readable" and insert -- computer-readable --.

Column 210, line 12, in Claim 39, delete "associated at" and insert -- associated with at --.

Column 212, line 2, in Claim 46, delete "agreement," and insert -- agreement; --.

Column 212, line 23, in Claim 47, delete "agreement" and insert -- agreement; --.

Column 214, line 12, in Claim 50, delete "one or" and insert -- one or more --.